US012169687B2

(12) United States Patent
Dvorak et al.

(10) Patent No.: US 12,169,687 B2
(45) Date of Patent: Dec. 17, 2024

(54) METHODS AND SYSTEMS FOR SPREADSHEET FUNCTION AND FLEX COPY PASTE CONTROL OF FORMATTING AND USE OF SELECTION LIST PANELS

(71) Applicant: Adaptam Inc., Palo Alto, CA (US)

(72) Inventors: Robert E. Dvorak, Portola Valley, CA (US); Yuriy Garin, San Carlos, CA (US); Alexey Verkhovskiy, Calgary (CA)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 18/142,560

(22) Filed: May 2, 2023

(65) Prior Publication Data

US 2023/0351104 A1 Nov. 2, 2023

Related U.S. Application Data

(60) Provisional application No. 63/337,576, filed on May 2, 2022.

(51) Int. Cl.
*G06F 3/048* (2013.01)
*G06F 40/103* (2020.01)
*G06F 40/18* (2020.01)

(52) U.S. Cl.
CPC ............ *G06F 40/18* (2020.01); *G06F 40/103* (2020.01)

(58) Field of Classification Search
CPC ............................... G06F 40/18; G06F 40/103
See application file for complete search history.

(56) References Cited

U.S. PATENT DOCUMENTS 8,726,143 B2 5/2014 Simkhay et al.
10,311,141 B1 * 6/2019 Olkin ...................... G06F 40/18
(Continued)

FOREIGN PATENT DOCUMENTS

AU 2005202721 A1 * 4/2006 ........... G06F 17/246
JP 3853827 B1 * 12/2006 ........... G06F 17/246
(Continued)

OTHER PUBLICATIONS

U.S. Appl. No. 16/031,339, filed Jul. 10, 2018, U.S. Pat. No. 11,182,548, Nov. 23, 2021, Issued.
(Continued)

*Primary Examiner* — Rashawn N Tillery
(74) *Attorney, Agent, or Firm* — Haynes Beffel & Wolfeld LLP; Ernest J. Beffel, Jr.

(57) ABSTRACT

Disclosed is a method giving an alternative to typing, cell selecting, single list selecting and pasting in arguments for a built-in spreadsheet function and flex copy paste capabilities through the use of a broad spectrum of selection list panels supporting multiple selections from multiple lists with fixed and/or situationally specific specification options. Those and other arguments can be invisible in the spreadsheet formula text while more understandably visible in UIs. Also disclosed is function and flex copy-paste control of cell formatting overriding any cell formatting otherwise applied to those cells employing a broad spectrum of specification types and selection list panels not previously utilized for spreadsheet functions or copy paste.

40 Claims, 141 Drawing Sheets
(138 of 141 Drawing Sheet(s) Filed in Color)

(56) References Cited

U.S. PATENT DOCUMENTS

| | | | | |
|---|---|---|---|---|
| 11,657,217 | B2 * | 5/2023 | Dvorak | G06F 40/18 715/810 |
| 11,699,032 | B2 * | 7/2023 | Shirolkar | G06F 16/2228 715/219 |
| 11,972,204 | B2 * | 4/2024 | Dvorak | G06F 3/04842 |
| 11,977,835 | B2 * | 5/2024 | Dvorak | G06F 3/0482 |
| 2002/0118221 | A1 * | 8/2002 | Hudson | G06F 9/453 715/711 |
| 2004/0103366 | A1 * | 5/2004 | Peyton-Jones | G06F 40/18 715/213 |
| 2005/0010862 | A1 * | 1/2005 | Bauchot | G06F 40/18 715/214 |
| 2006/0101013 | A1 * | 5/2006 | Kenney | G06F 16/2428 |
| 2006/0282818 | A1 * | 12/2006 | DeSpain | G06F 40/18 717/109 |
| 2007/0244672 | A1 * | 10/2007 | Kjaer | G06F 40/18 703/2 |
| 2008/0244091 | A1 * | 10/2008 | Moore | H04L 67/565 709/204 |
| 2011/0197118 | A1 * | 8/2011 | Williamson | G06F 40/18 715/217 |
| 2013/0073939 | A1 * | 3/2013 | Honsowetz | H04L 63/083 715/212 |
| 2014/0047385 | A1 * | 2/2014 | Ruble | G06F 16/4393 715/810 |
| 2015/0169532 | A1 * | 6/2015 | Otero | G06F 40/18 715/212 |
| 2015/0199328 | A1 | 7/2015 | Danziger et al. | |
| 2016/0055139 | A1 * | 2/2016 | Creason | G06F 40/18 715/217 |
| 2017/0228358 | A1 * | 8/2017 | Hirzel | G06F 40/18 |
| 2019/0034400 | A1 * | 1/2019 | Alda | G06F 9/54 |
| 2019/0340219 | A1 | 11/2019 | Schoedl | |
| 2024/0069988 | A1 * | 2/2024 | Patel | G06F 40/18 |

FOREIGN PATENT DOCUMENTS

| | | | | |
|---|---|---|---|---|
| JP | 2016218747 | A * | 12/2016 | |
| WO | WO-2005043406 | A2 * | 5/2005 | G06F 17/246 |
| WO | WO-2005045725 | A2 * | 5/2005 | G06F 17/246 |
| WO | WO-2007046326 | A1 * | 4/2007 | G06F 17/246 |

OTHER PUBLICATIONS

U.S. Appl. No. 16/031,379, filed Jul. 10, 2018, U.S. Pat. No. 11,354,494, Jun. 7, 2022, Issued.

U.S. Appl. No. 16/031,759, filed Jul. 10, 2018, U.S. Pat. No. 11,017,165, May 25, 2021, Issued.

U.S. Appl. No. 16/191,402, filed Nov. 14, 2018, U.S. Pat. No. 11,036,929, Jun. 15, 2021, Issued.

U.S. Appl. No. 17/359,430, filed Jun. 25, 2021, U.S. Pat. 11,836,444, Dec. 5, 2023, Issued.

U.S. Appl. No. 17/359,418, filed Jun. 25, 2021, U.S. Pat. No. 11,657,217, May 23, 2023, Issued.

U.S. Appl. No. 17/384,404, filed Jul. 23, 2021, 20220027555, Jan. 27, 2022, Allowed.

U.S. Appl. No. 17/374,898, filed Jul. 13, 2021, U.S. Pat. No. 11,694,023, Jul. 4, 2023, Issued.

U.S. Appl. No. 17/374,901, filed Jul. 13, 2021, U.S. Pat. No. 11,972,204, Apr. 30, 2024, Issued.

U.S. Appl. No. 17/752,814, filed May 24, 2022, U.S. Pat. No. 11,977,835, May 7, 2024, Issued.

U.S. Appl. No. 17/903,934, filed Sep. 6, 2022, U.S. Pat. No. 12,050,859, Jul. 30, 2024, Issued.

U.S. Appl. No. 17/988,641, filed Nov. 16, 2022, 20230153518, May 18, 2023, Pending.

U.S. Appl. No. 18/074,301, filed Dec. 2, 2022, 20230177751, Jun. 8, 2023, Pending.

U.S. Appl. No. 18/142,557, filed May 2, 2023, 20230367956, Nov. 16, 2023, Pending.

* cited by examiner

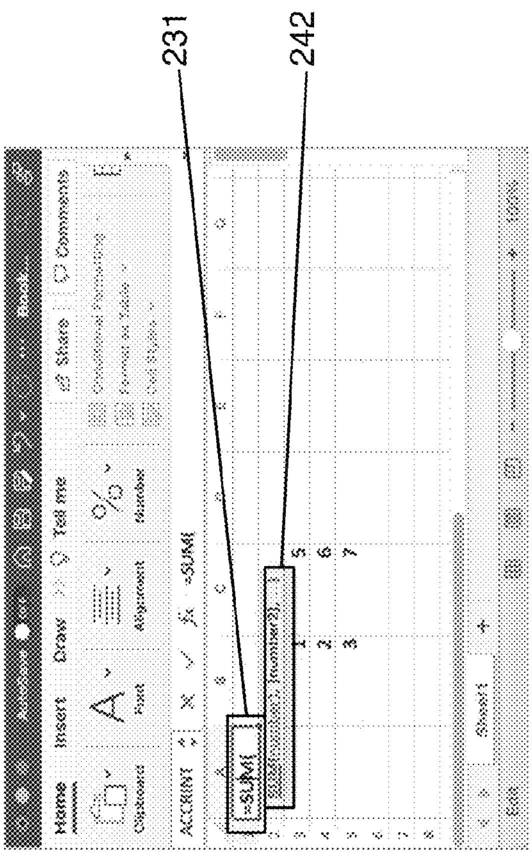
FIG. 2A – Prior Art
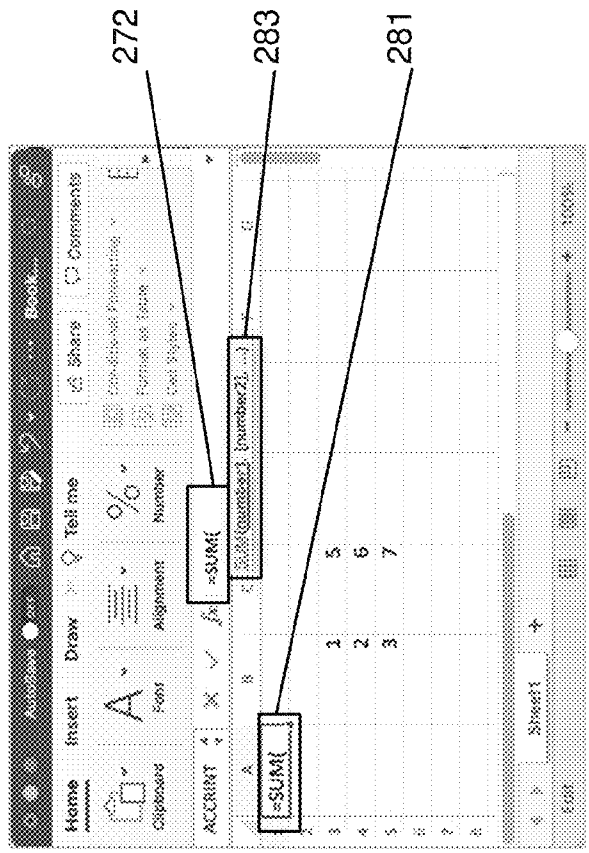
FIG. 2B – Prior Art

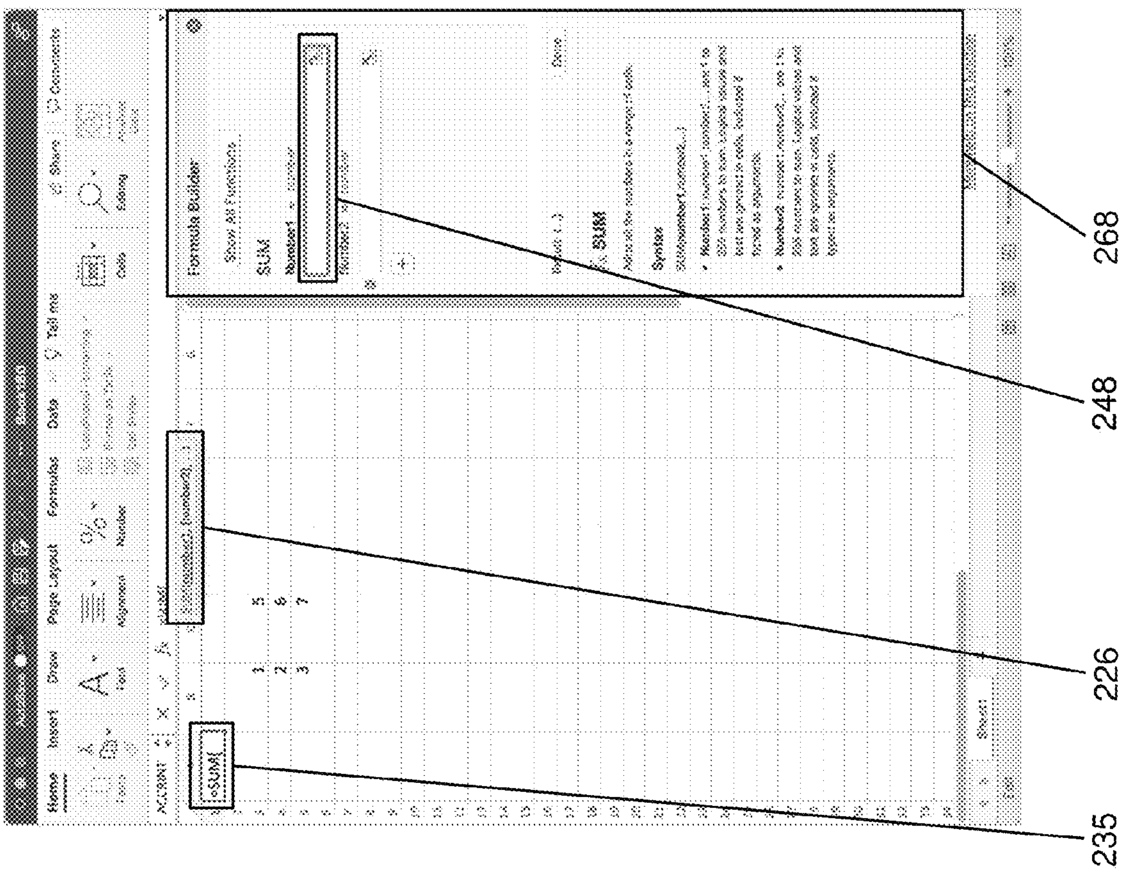
FIG. 2C – Prior Art

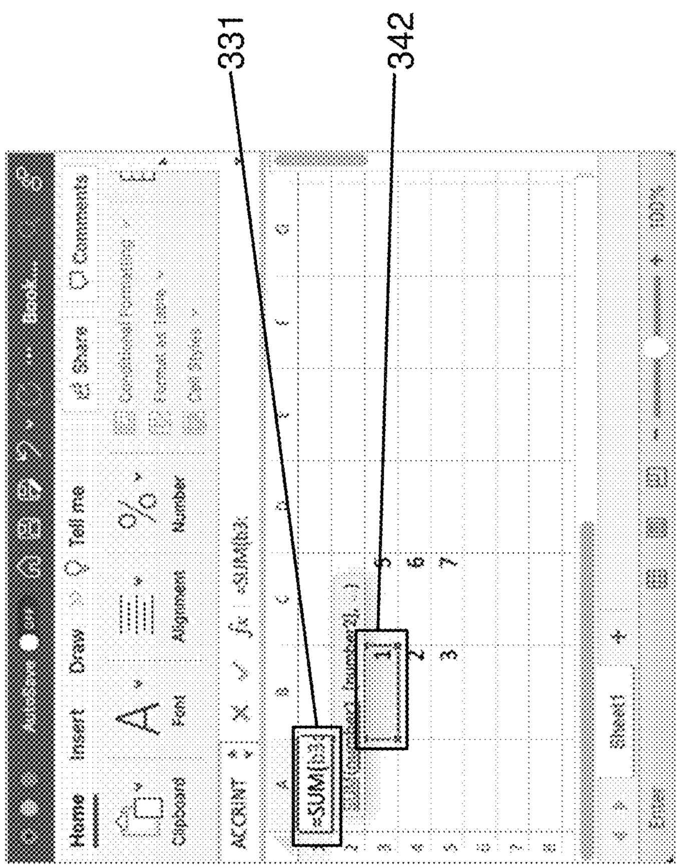
FIG. 3A – Prior Art
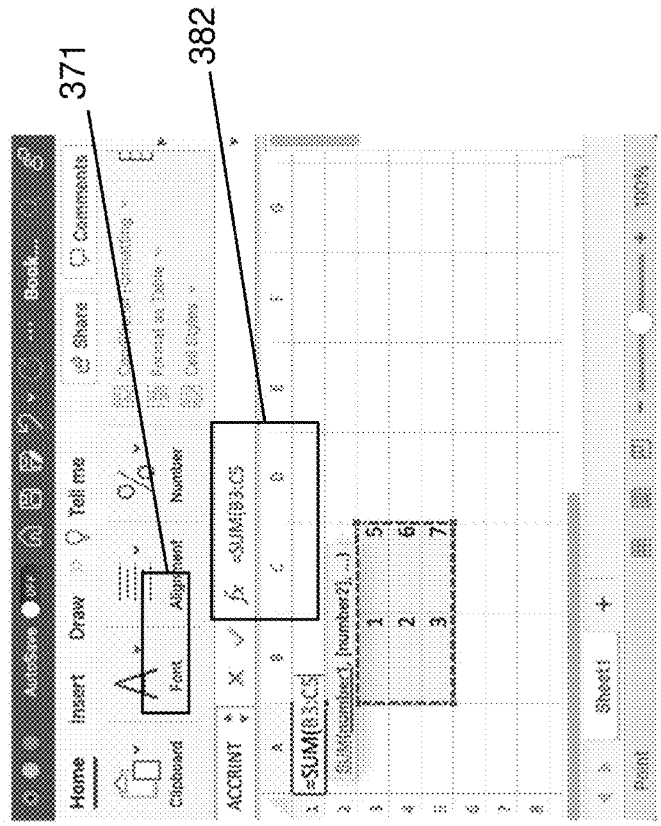
FIG. 3B – Prior Art

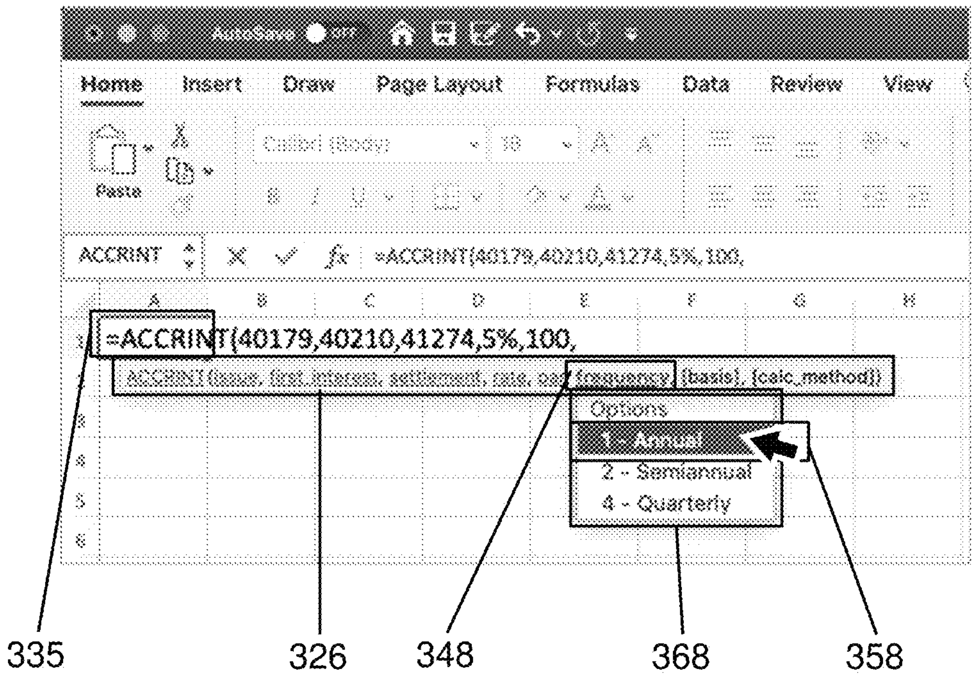
FIG. 3C – Prior Art
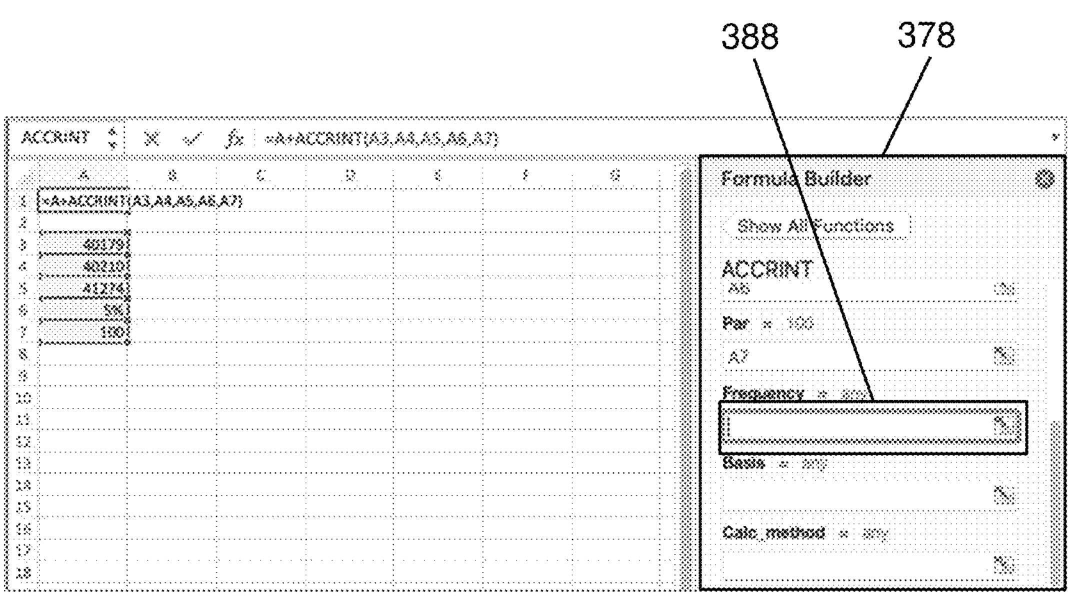
FIG. 3D – Prior Art

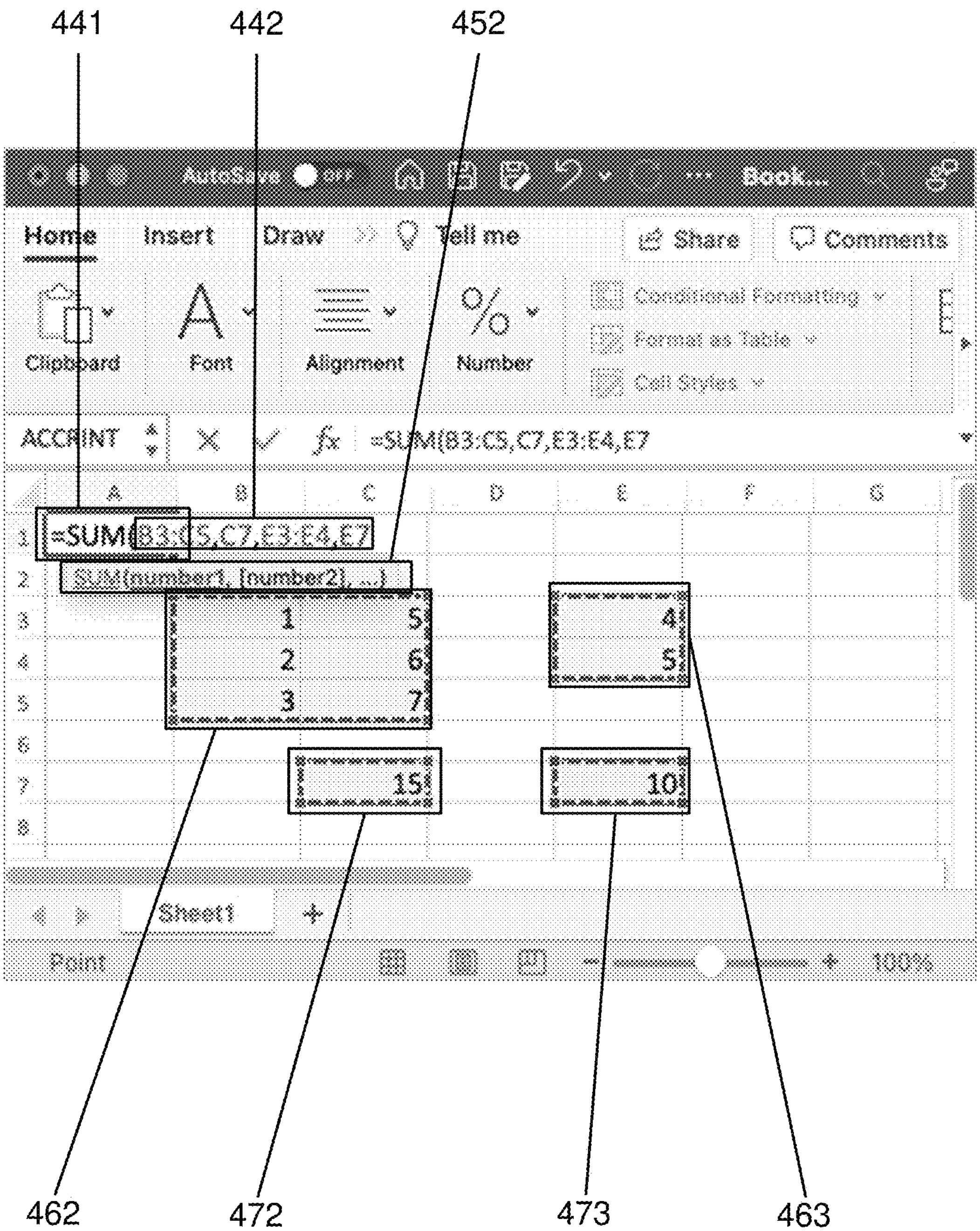
FIG. 4A – Prior Art

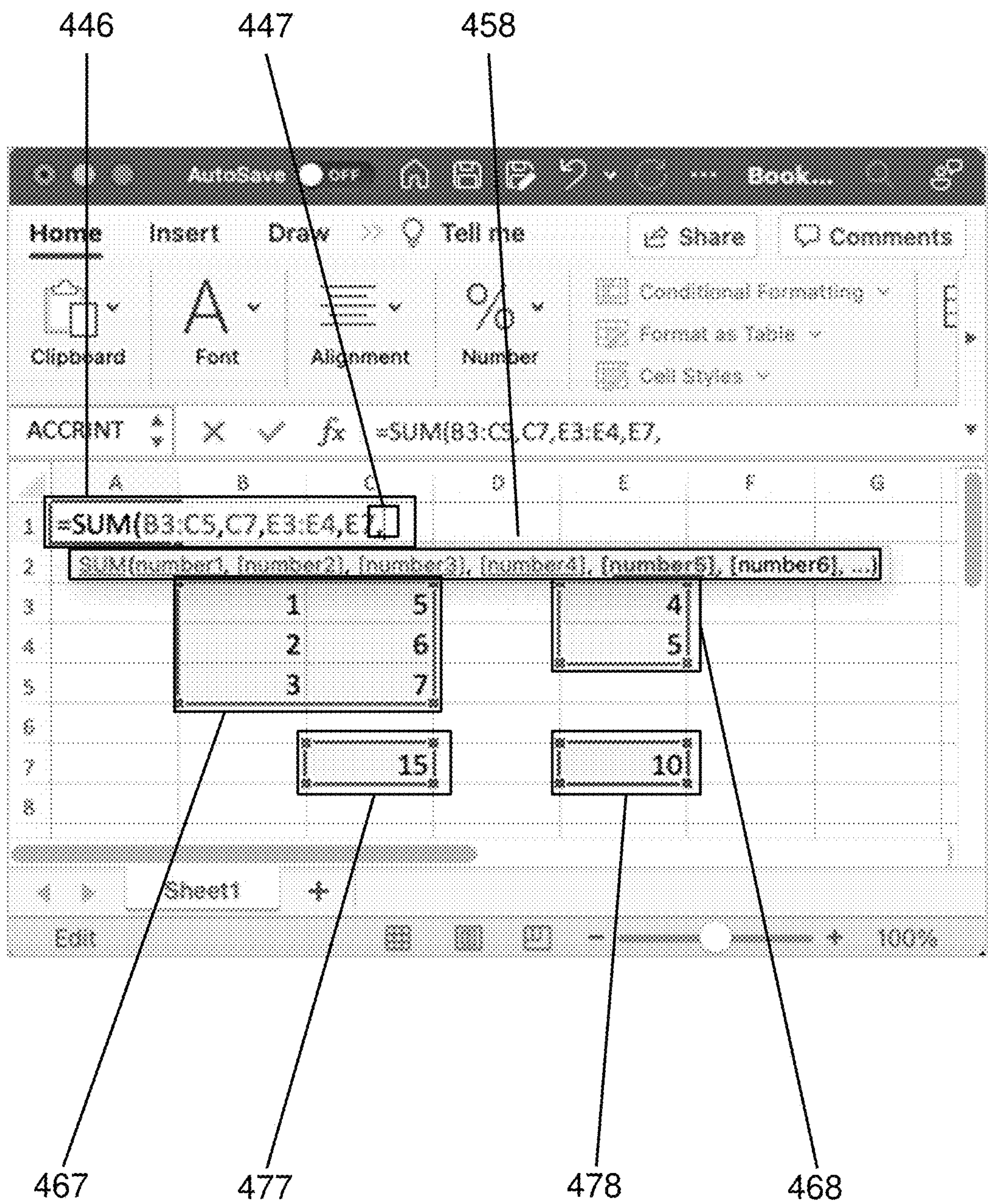
FIG. 4B – Prior Art

| Traditional Spreadsheet Function Argument Specification Types | Examples | | | | | |
|---|---|---|---|---|---|---|
| | RAND | FORMULATEXT | IF | SUM | COUNTIFS | ACCRINT |
| 0. No input | X | | | | | |
| 1. Typed inputs | | X | X | X | X | X |
| 2. Cell or cell range specification(s) | | X | X | X | X | X |
| | | | X | X | X | X |
| 3. Paste in argument(s) | | X | X | X | X | X |
| | | | X | X | X | X |
| 4. Select from fixed list | | | | | | X |

FIG. 5

Our Selection List Panel types

| List type | Content type | Number specifications | Overall WRITE_2D | field_V | field_H | field_2D | constraint | ALL | BLANKS | COLLAPSE | FORMATS | LABELS | LIMIT | OUTPUTS | SORT VERTICAL | SORT HORIZONTAL | TOTALS & SUBTOTALS |
|---|---|---|---|---|---|---|---|---|---|---|---|---|---|---|---|---|---|
| Single list | Fixed Content | 1. Single specification | X | | | | | X | | X | X | X | X | | | | |
| | | 2. Multiple specifications | X | | | | | | | | X | X | X | | | | |
| | Situationally variable content | 3. Single specification | X | | | X | | | | | X | | | | | | |
| | | 4. Multiple specifications | | | | | | | | | | | | | | | |
| Multiple separate (unrelated) lists | Fixed Content | 5. Single specification | | | | | | | | | | | | | | | |
| | | 6. Multiple specifications | | | | | | | | | | | | | | | |
| | Situationally variable content | 7. Single specification | X | X | X | | X | | | | X | X | | | | | |
| | | 8. Multiple specifications | X | | | | | | | | X | X | | | | | |
| | Mixed fixed and situationally variable content | 9. Single specification | X | | | | | | | | X | | | | | | X |
| | | 10. Multiple specifications | X | | | | | | | | X | | | | | | X |
| Multiple related lists | Fixed Content | 11. Single specification | X | | | | | | | | X | | | | | | |
| | | 12. Multiple specifications | X | | | | | | | | X | | | | | | |
| | Situationally variable content | 13. Single specification | | | | | | | | | | | | | | | |
| | | 14. Multiple specifications | X | | | | | | | | X | | | | | | |
| | Mixed fixed and situationally variable content | 15. Single specification | X | | | | | | X | | | | | | | | |
| | | 16. Multiple specifications | X | | | | | | X | | X | | | | | | |
| Multiple cascading selector lists | Fixed Content | 17. Single specification set | X | | | | | | | | X | | | | | | |
| | | 18. Multiple specification sets | X | | | | | | | | X | | | | | | |
| | Situationally variable content | 19. Single specification set | X | | | | | | | | | | | X | | | |
| | | 20. Multiple specification sets | X | | | | | | | | | | | X | | | |
| | Mixed fixed and situationally variable content | 21. Single specification set | X | | | | | | | | X | | | X | | | |
| | | 22. Multiple specification sets | X | | | | | | | | X | | | X | X | X | |
| Reorderable specification lists | Fixed Content | 23. Movement | | | | | | | | | | | | | | | |
| | | 24. Selection | | | | | | | | | | | | | | | |
| | Situationally variable content | 25. Movement | X | | | | | | | | | | | X | | | |
| | | 26. Selection | X | | | | | | | | | | | X | | | |
| | Mixed fixed and situationally variable content | 27. Movement | X | | | | | | | | | | | X | X | X | |
| | | 28. Selection | X | | | | | | | | | | | X | X | X | |
| 29. Combinations across options lists | | | X | | | | | | | | X | | | | X | X | |

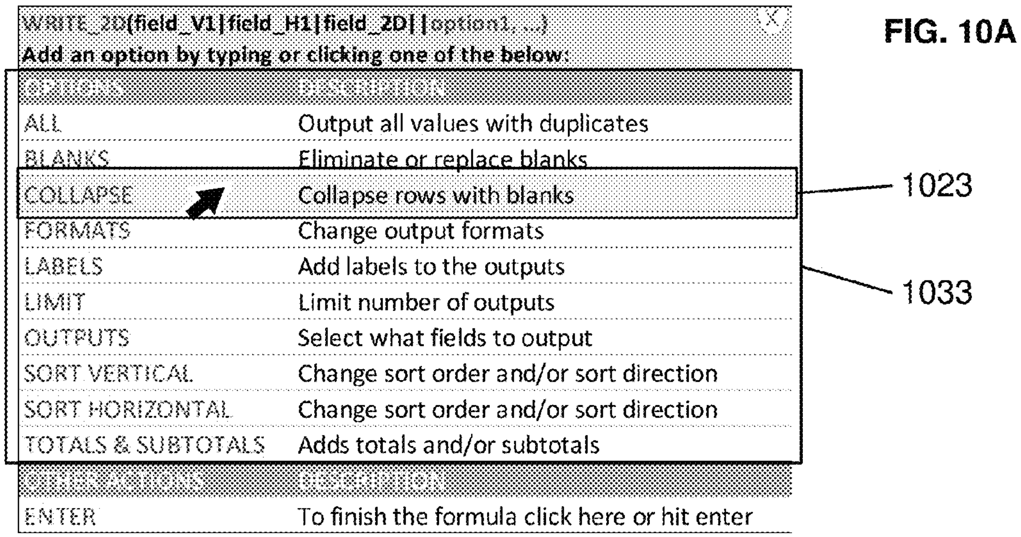
FIG. 10A
FIG. 10B
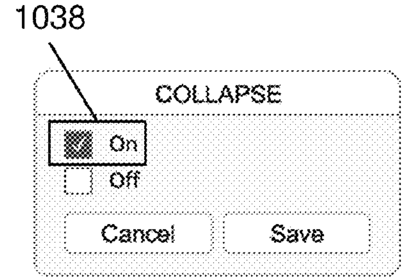
FIG. 10C
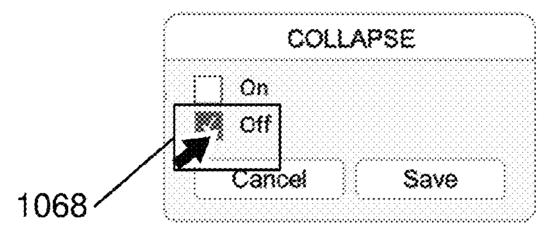
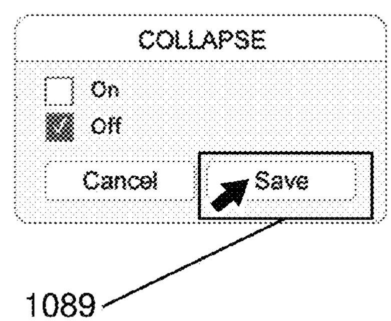
FIG. 10D
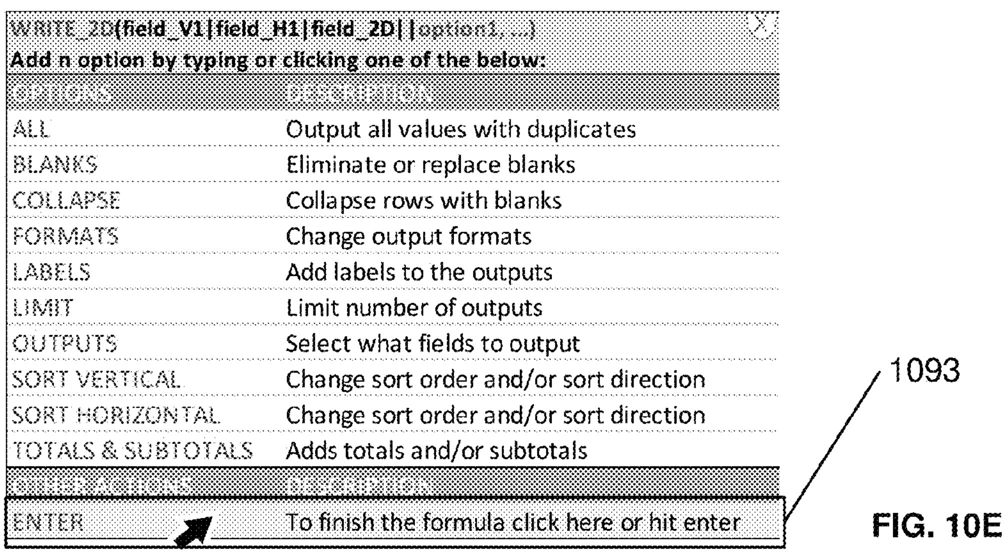
FIG. 10E

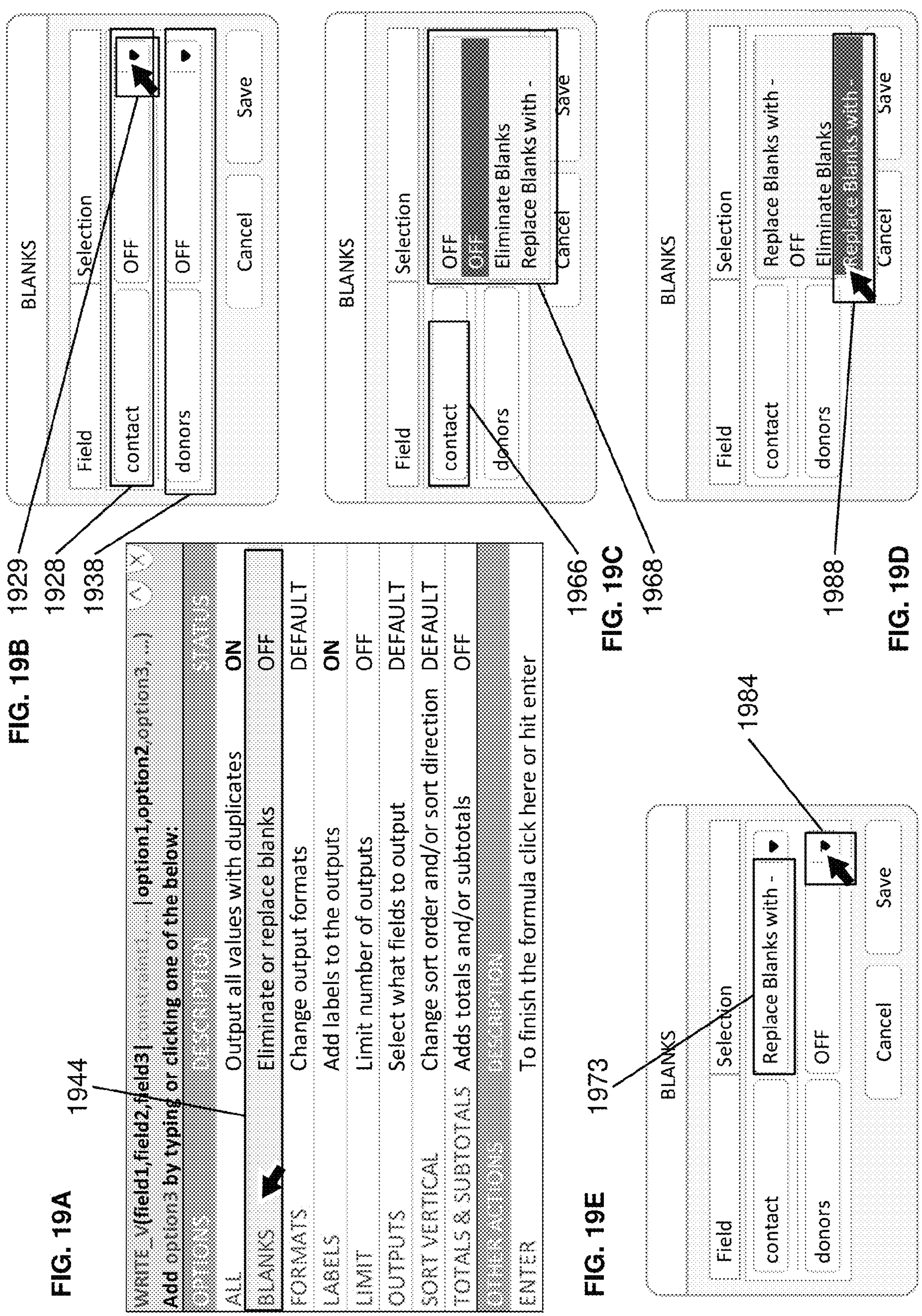
FIG. 19A
WRITE_V(field1,field2,field3| option1,option2,option3,...)
Add option3 by typing or clicking one of the below:
OPTIONS DESCRIPTION STATUS
ALL Output all values with duplicates ON
BLANKS Eliminate or replace blanks OFF
FORMATS Change output formats DEFAULT
LABELS Add labels to the outputs ON
LIMIT Limit number of outputs OFF
OUTPUTS Select what fields to output DEFAULT
SORT VERTICAL Change sort order and/or sort direction DEFAULT
TOTALS & SUBTOTALS Adds totals and/or subtotals OFF
OTHER ACTIONS DESCRIPTION
ENTER To finish the formula click here or hit enter
1944
FIG. 19B
BLANKS
Field Selection
contact OFF
donors OFF
Cancel Save
1929
1928
1938
FIG. 19C
BLANKS
Field Selection
contact
donors
OFF
OFF
Eliminate Blanks
Replace Blanks with -
Cancel Save
1966
1968
FIG. 19D
BLANKS
Field Selection
contact
donors
Replace Blanks with -
OFF
Eliminate Blanks
Replace Blanks with -
Cancel Save
1988
FIG. 19E
BLANKS
Field Selection
contact Replace Blanks with -
donors OFF
Cancel Save
1973
1984

ALL Prior Art

ALL Prior Art

ALL Prior Art

ALL Prior Art

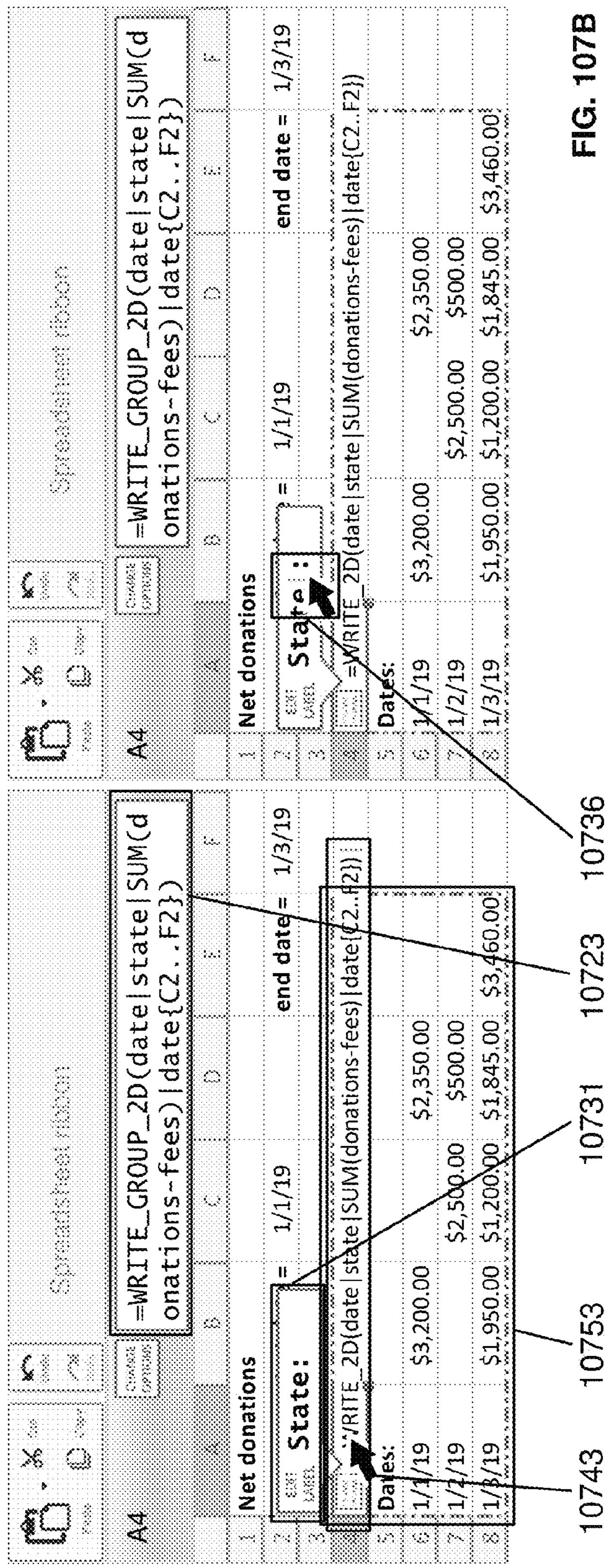
FIG. 107A
FIG. 107B
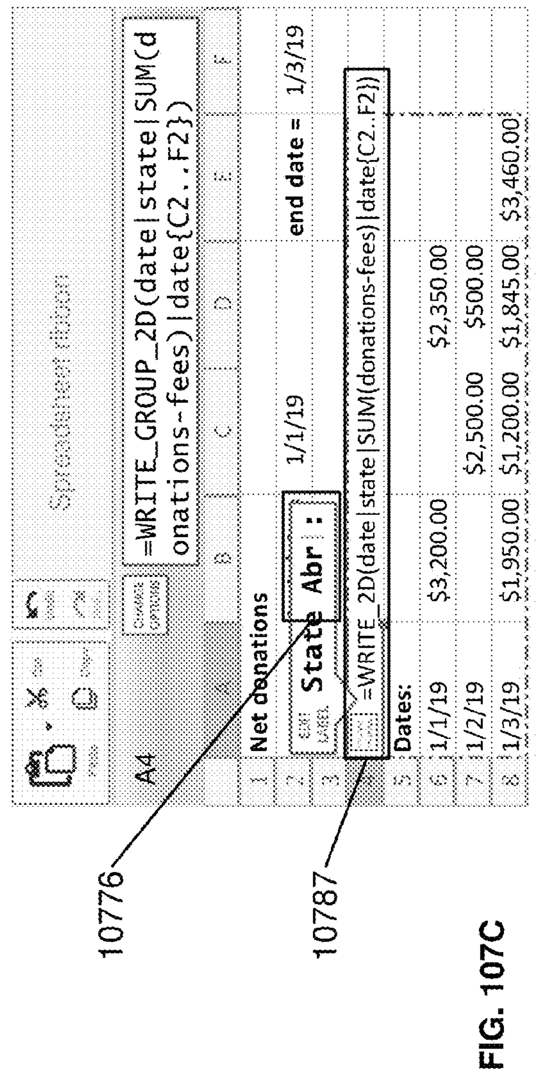
FIG. 107C

ALL Prior Art

ALL Prior Art

11500
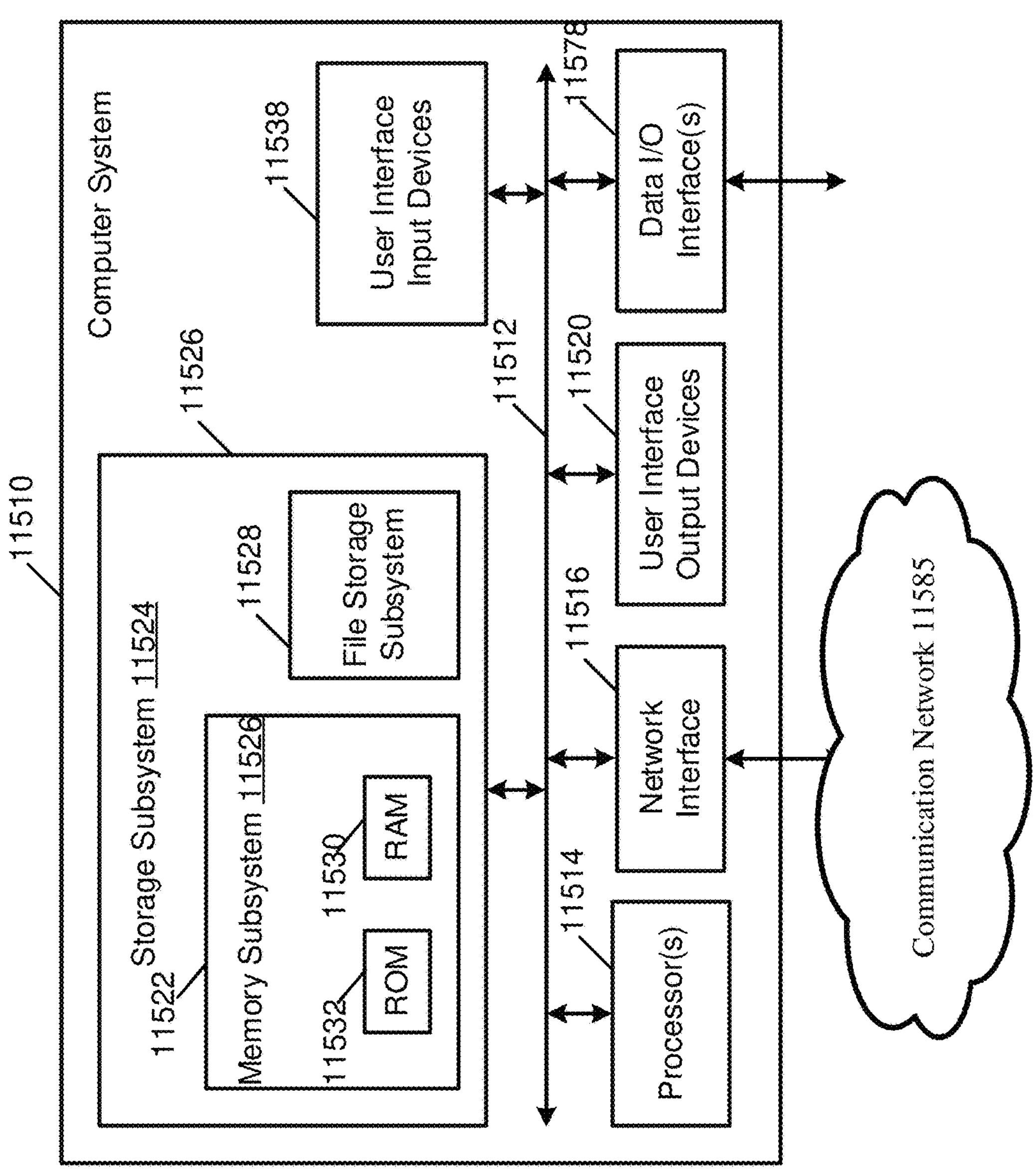
Fig. 115 Computer System

METHODS AND SYSTEMS FOR SPREADSHEET FUNCTION AND FLEX COPY PASTE CONTROL OF FORMATTING AND USE OF SELECTION LIST PANELS

CROSS-REFERENCE

This application claims priority to and the benefit of U.S. Application No. 63/337,576 titled "Methods and Systems for Spreadsheet Function and Flex Copy Paste Control of Formatting and Use of Selection List Panels," filed 2 May 2022.

RELATED APPLICATIONS

This application is related to and incorporates by reference the following applications:

Contemporaneously filed U.S. application Ser. No. 18/142,557 titled "Methods and Systems for Bucketing Values in Spreadsheet Functions," filed 2 May 2023, which claims the benefit of U.S. Application No. 63/337,572 filed 2 May 2022, and U.S. application Ser. No. 16/031,339 titled "Methods and Systems for Providing Selective Multi-Way Replication and Atomization of Cell Blocks and Other Elements in Spreadsheets and Presentations," filed 10 Jul. 2018, now U.S. Pat. No. 11,182,548, issued 23 Nov. 2021, which claims the benefit of U.S. Provisional Application No. 62/530,835, filed Jul. 10, 2017, and U.S. application Ser. No. 16/031,379 titled "Methods and Systems for Connecting a Spreadsheet to External Data Sources with Formulaic Specification of Data Retrieval," filed 10 Jul. 2018, now U.S. Pat. No. 11,354,494, issued 7 Jun. 2022, which claims the benefit of U.S. Provisional Application No. 62/530,786, filed Jul. 10, 2017, and U.S. application Ser. No. 16/031,759 titled "Methods and Systems for Connecting A Spreadsheet to External Data Sources with Temporal Replication of Cell Blocks," filed 10 Jul. 2018, now U.S. Pat. No. 11,017,165, issued 25 May 2021, which claims the benefit of U.S. Provisional Patent Application No. 62/530,794, filed on Jul. 10, 2017, and U.S. application Ser. No. 16/191,402 titled "Methods and Systems for Connecting A Spreadsheet to External Data Sources with Ordered Formulaic Use of Data Retrieved," filed 14 Nov. 2018, now U.S. Pat. No. 11,036,929, issued 15 Jun. 2021, which claims the benefit of U.S. Provisional Patent Application No. 62/586,719, filed on 15 Nov. 2017, and U.S. application Ser. No. 17/359,430 titled "Methods and Systems for Constructing a Complex Formula in a Spreadsheet Cell," filed 25 Jun. 2021 which claims the benefit of U.S. Application No. 63/044,990, filed 26 Jun. 2020, and U.S. application Ser. No. 17/359,418 titled "Methods and Systems for Presenting Drop-Down, Pop-Up or Other Presentation of a Multi-Value Data Set in a Spreadsheet Cell," filed 25 Jun. 2021 which claims the benefit of U.S. Application No. 63/044,989, filed 26 Jun. 2020, and U.S. application Ser. No. 17/384,404 titled "Method and System for Improved Spreadsheet Charts," filed 23 Jul. 2021 which claims the benefit of U.S. Application No. 63/055,581, filed 23 Jul. 2020.

U.S. application Ser. No. 17/374,898 titled "Method and System for Improved Spreadsheet Analytical Functioning," filed 13 Jul. 2021 which claims the benefit of U.S. Application No. 63/051,280, filed 13 Jul. 2020, and U.S. application Ser. No. 17/374,901 titled "Method and System for Improved Ordering of Output from Spreadsheet Analytical Functions," filed 13 Jul. 2021 which claims the benefit of U.S. Application No. 63/051,283, filed 13 Jul. 2020, and U.S. application Ser. No. 17/752,814 titled "Method and System for Spreadsheet Error Identification and Avoidance," filed 24 May 2022 which claims the benefit of U.S. 63/192,475, filed 24 May 2021, and U.S. application Ser. No. 17/903,934 titled "Method and System For Improved 2D Ordering of Output From Spreadsheet Analytical Functions," filed 6 Sep. 2022 which claims the benefit of U.S. Application No. 63/240,828, filed 3 Sep. 2021, and U.S. application Ser. No. 17/988,641 titled "Methods And Systems for Sorting Spreadsheet Cells With Formulas," filed 16 Nov. 2022 which claims the benefit of U.S. Application No. 63/280,590, filed 17 Nov. 2021, and U.S. application Ser. No. 18/074,301 titled "Method and System for Improved Visualization of Charts in Spreadsheets," filed 2 Dec. 2022 which claims the benefit of U.S. Application No. 63/285,945, filed 3 Dec. 2021.

BACKGROUND

Today's spreadsheets have a broad range of capabilities with the leading spreadsheets having over four hundred built-in (predefined) functions. However, as these functions become more diverse, powerful and complex little has been done to simplify their usage. Users have very limited options for specifying function arguments. Those options can be summarized as 1) type the argument content, 2) select a cell or cell range input into the argument(s), 3) paste in an argument(s) (difficult to do in Microsoft Excel), or 4) select an input specification from a fixed list (available in only a few functions). In most spreadsheets these specifications are a done directly into the function within the cell or the cell formula bar. One spreadsheet adds the option of typing or selecting cell references into a function formula building UI. However, none of the existing spreadsheets has a broader set of function argument specification UIs with input controls tailored to the specific type of input (making the specification more intuitive to the user) and generating a record of the specification which is easier to understand than a coded (text) argument within the function formula. None of the existing spreadsheet technologies situationally alter the function syntax and argument selection options based on the previous argument selections thereby eliminating argument options which are no longer applicable. Therein lies opportunities to simplify more complex function specifications with a broader range of UI input controls more tailored to the required inputs and to situationally alter the specification options presented to the user.

Today's spreadsheet functions have only three argument structures 1) fixed arguments (e.g., IF function three arguments), 2) repeating arguments (e.g., SUM) or 3) fixed followed by repeating arguments (e.g., SUMIFS). This construct limits the ease of specifying functions which have more than one repetitive type of argument because it requires a specification as to where to the end the first repetition and start the second and so on. Current spreadsheet optional arguments have to have a specified position in function formulas requiring a user who only wants to specify the sixth optional argument to setup five empty comma separated arguments beforehand. Making it very easy for the user to erroneously put the desired specification in the wrong argument. Therein lies an opportunity to change the existing spreadsheet function syntax to easily accommodate more than one repetitive argument or argument pairs and to eliminate the fixed syntax for optional arguments so that they can be entered in the order desired without having to deal with unused options.

As spreadsheet function arguments become more numerous and more complicated not only are changes required to simplify their specification, but users would benefit from simplification to the recorded function formula. Today's spreadsheets require the recording of all specifications in an argument in the formula, which can result in very complicated formulas hard for a user to understand. Therein lies an opportunity to instead record the spreadsheet function specification in another way where its presentation is more understandable to the user. This becomes even more important when combined with the new capability of spreadsheet functions to control the formatting of spreadsheet cells. In existing spreadsheets, the functions that deliver the content and the formatting of the cells are two entirely separate processes. This is also true for our flex copy paste capability where the population of the content in the cell is separate from the cell formatting process. Therein lies an opportunity for spreadsheet functions and our flex copy paste to control the formatting of the cells into which they are populating values, whether that be one cell or many cells.

Finally, in situations where the functions involved populate values in many cells the value displayed in the cell holding the overall formula may be controlled by many visible or invisible arguments. However, in some situations it is easier to edit or replace that value directly rather than changing each of the individual arguments determining its content. Therein lies an opportunity to create a doubly editable situation for the cell where the user can separately edit the formula and one of its output values.

The technology disclosed makes the before mentioned spreadsheet opportunities a reality thereby making specifying correct spreadsheet cell function formulas dramatically easier across an even broader set of function capabilities (e.g., formatting control).

SUMMARY

The disclosed technology adds a broad spectrum of spreadsheet predefined function and flex copy-paste argument specification approaches and capabilities. Going well beyond the typed specification, cell selection specification, paste and fixed list (i.e., does not change based on prior argument inputs) selection specification to include single lists, multiple lists, related lists, cascading lists and reorderable lists allowing single or multiple selections from fixed list content, situationally tailored list content (e.g., changes base on prior argument inputs) and combinations of fixed and situationally tailored list content. Another embodiment then supports making those arguments invisible to the user in the spreadsheet text formula while more understandably visible to users in UIs.

Embodiments of the disclosed spreadsheet technology support a spreadsheet function formula in one cell instantiating the values and formatting in more than one cell overriding any cell formatting otherwise applied to those cells. Additional embodiments support flex copy-paste control of spreadsheet cell formatting overriding any cell formatting otherwise applied to those cells. Both the function-controlled formatting and the flex copy-paste controlled formatting control the formatting of different ranges of cells as the user inputs change the range of cells they output.

Embodiments also separate the cell value from the formula that produces that value allowing separate specification of the value and the formula thereby making it easier for users to make changes. Additional embodiments of the disclosed technology add flexibility to the syntax used for spreadsheet functions. Eliminating the limitations of fixed argument structures allowing easy specification of multiple repetitive argument types and freeing optional arguments from fixed argument positions.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

Figure 1A:
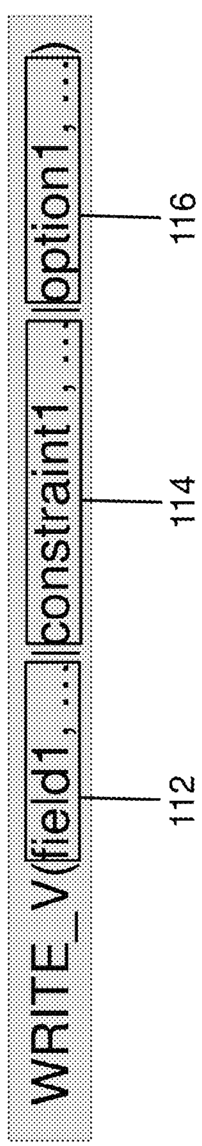
Figure 1B:
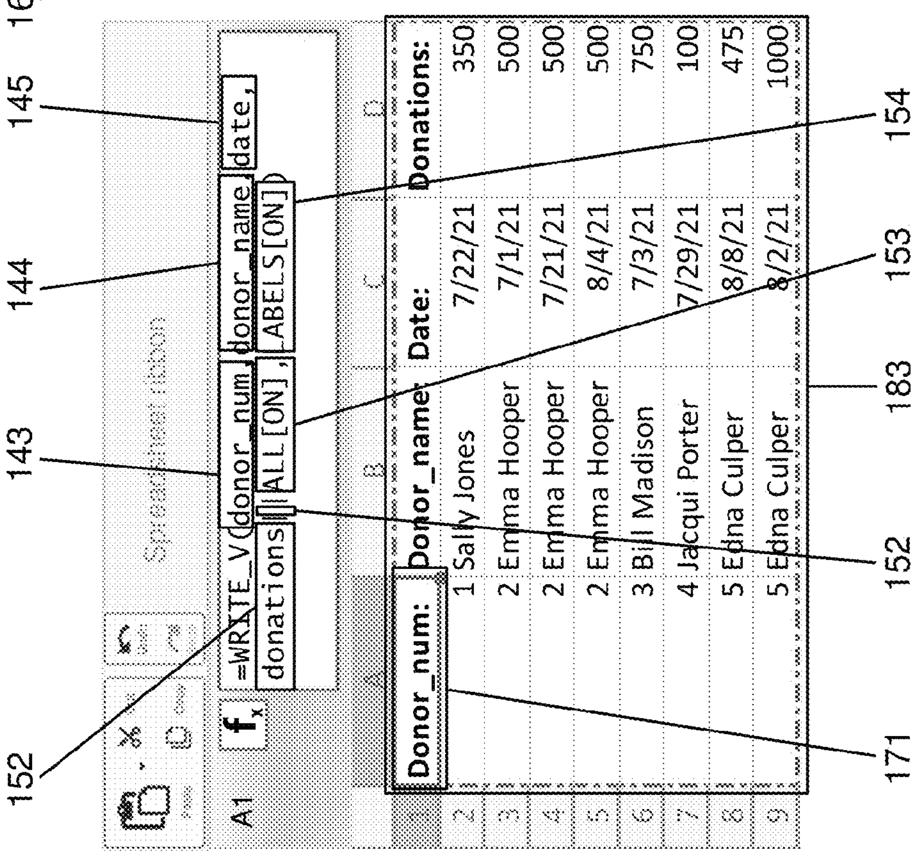
Figure 1C:
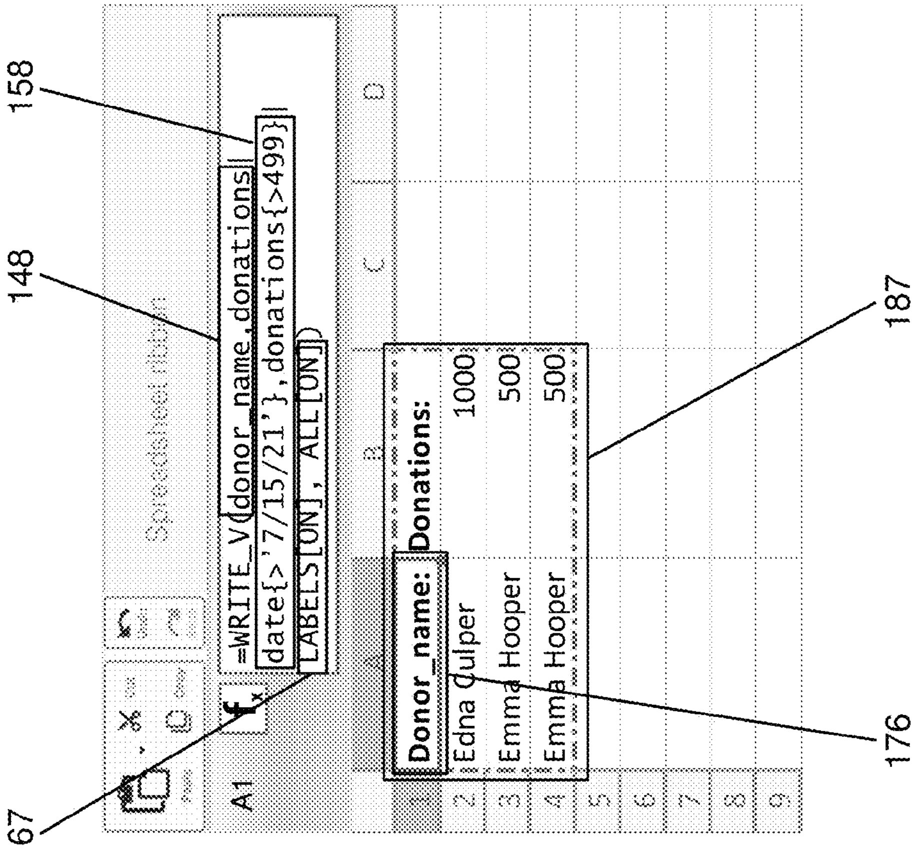

FIGS. 1A, 1B and FIG. 1C example our spreadsheet function argument groups and named arguments.

FIGS. 2A, 2B and 2C example the three-spreadsheet function argument specification locations (in-cell, formula bar and function formula builder) for Microsoft Excel.

Figure 114A:
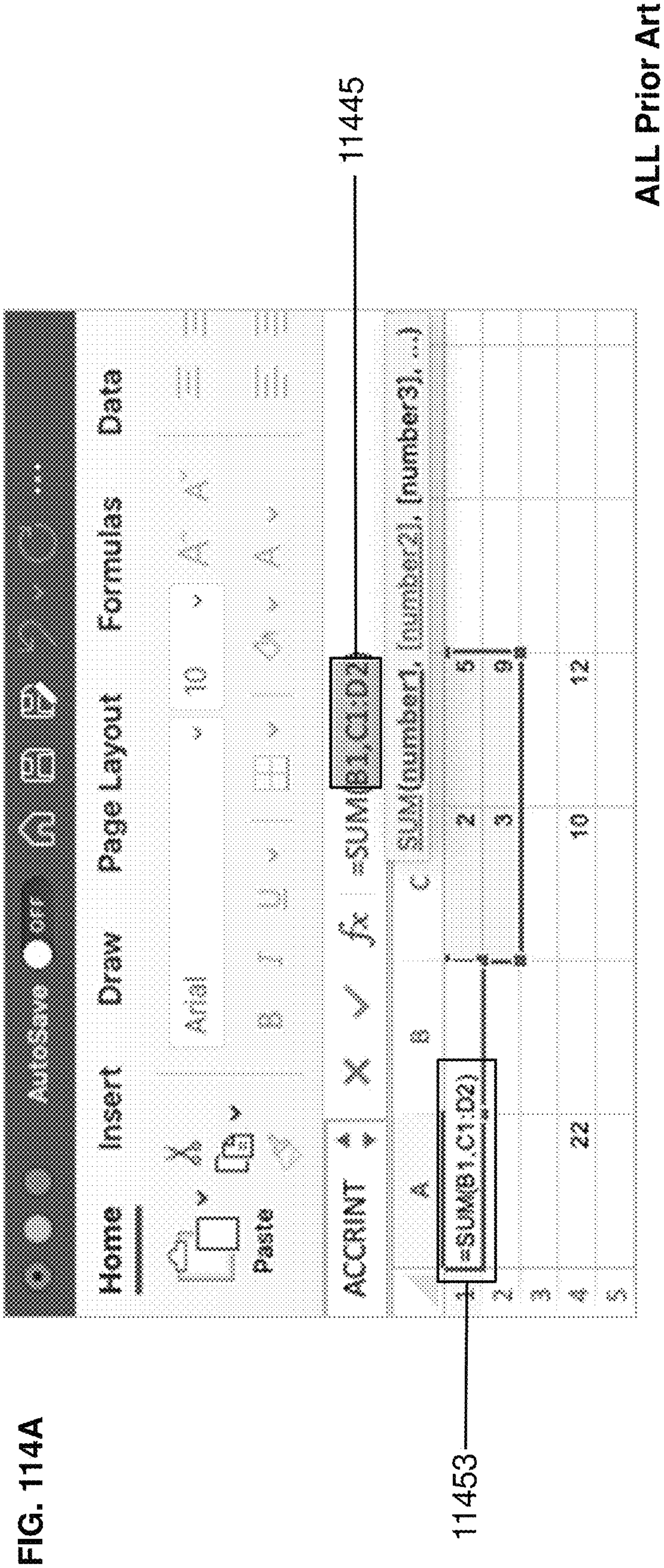
Figure 114B:
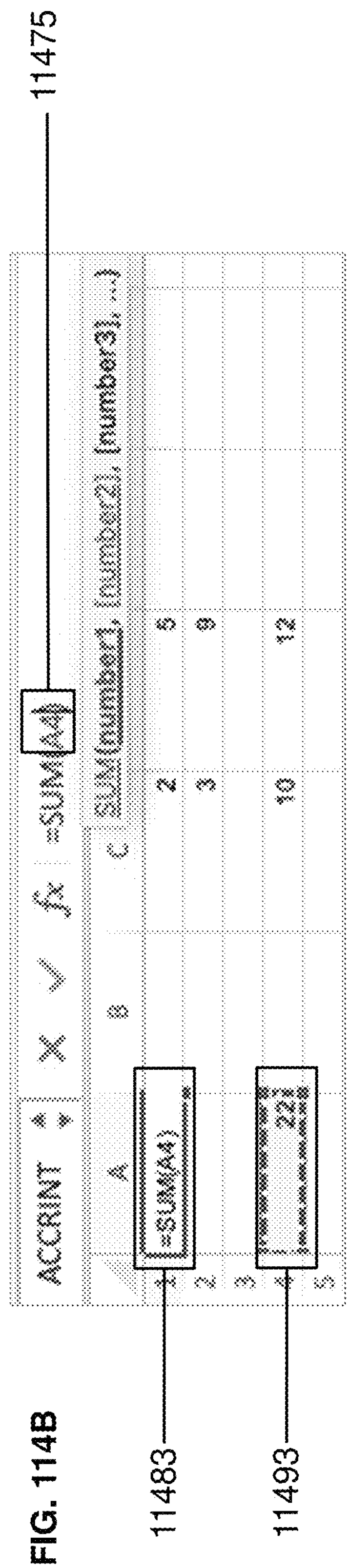

FIGS. 3A, 3B, 3C and 3D example three-spreadsheet function argument specification types (typing, cell range selecting and fixed list selecting) while FIG. 114A and FIG. 114B examples the fourth type (copy pasting in the specification) for Microsoft Excel.

FIG. 4A and FIG. 4B example simultaneous selection of multiple individual cell ranges and multi-cell ranges into a Microsoft Excel function.

FIG. 5 lists the four function argument specification types in existing spreadsheets including only one selection type from a list.

FIG. 6 lists the twenty-nine-function argument specification list types supported by our selection list panel technology, twenty-eight of which are not supported in existing spreadsheets.

Figure 7:
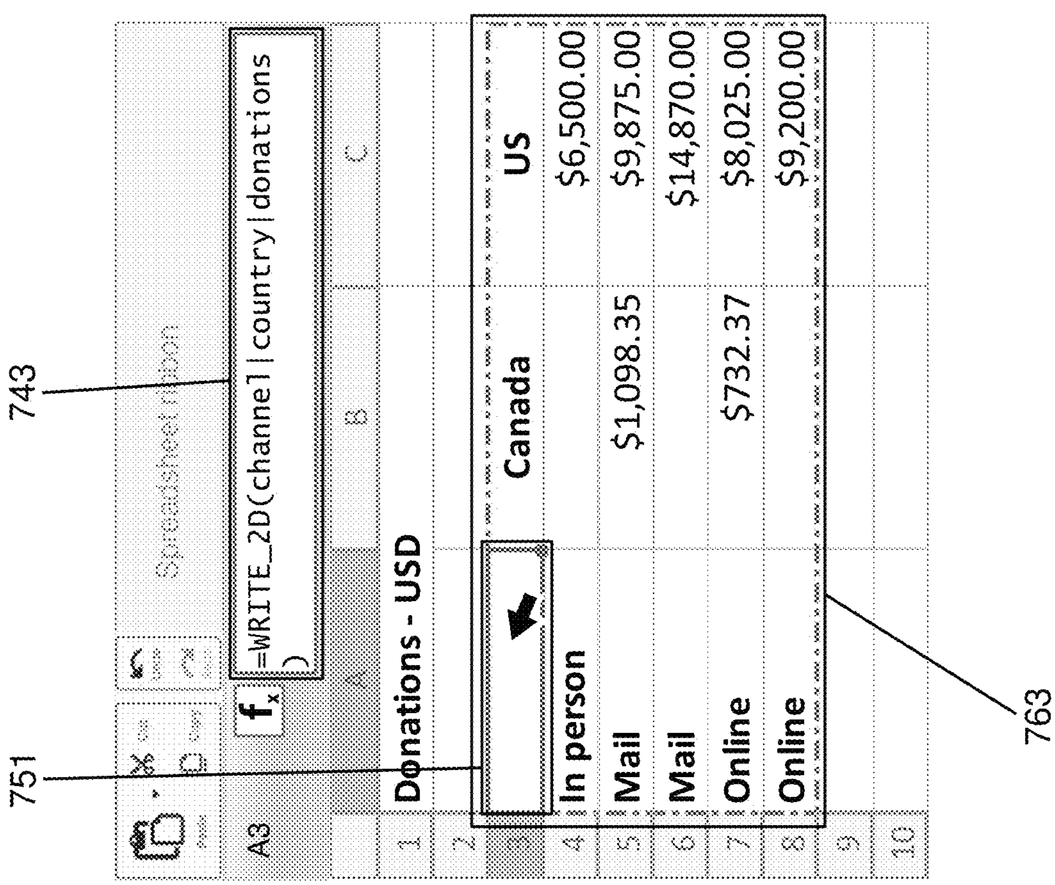
Figure 8:
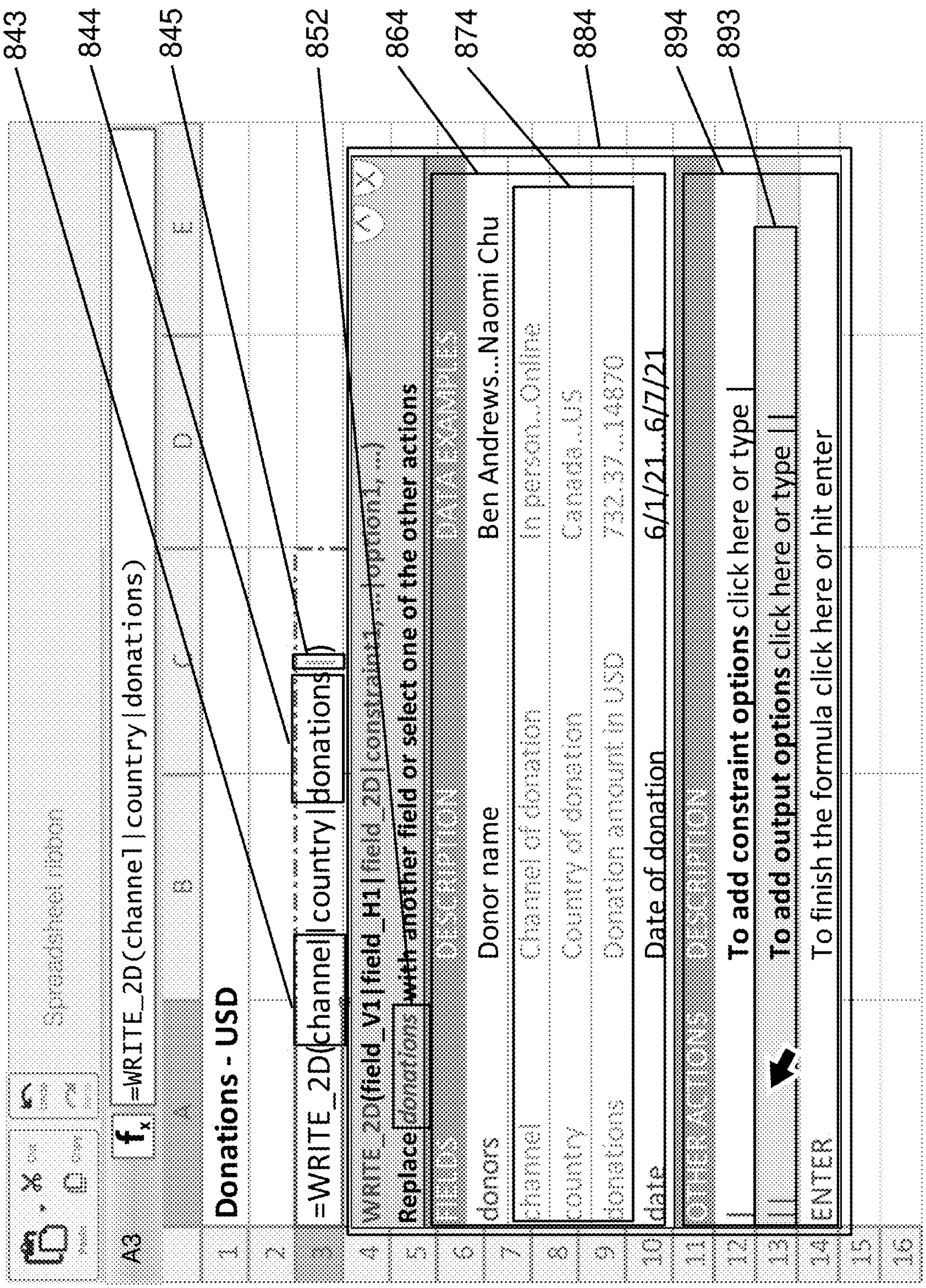

FIG. 7 and FIG. 8 example the automatic list deployment triggered by the cursor within the function parentheses in our technology.

FIG. 9 and FIGS. 10A, 10B, 10C, 10D and 10E example the use of our 'Multiple separate lists with situationally variable content' and a 'Single list with fixed content' popup.

Figure 11B:
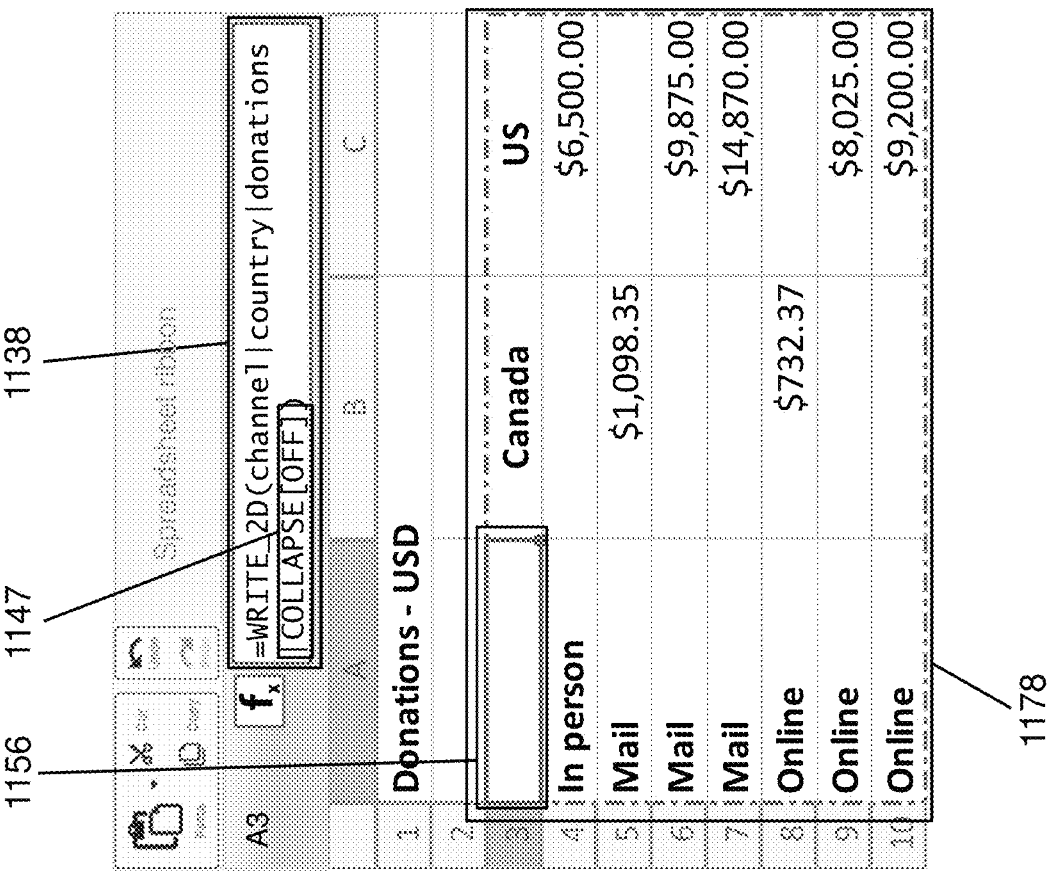
Figure 11A:
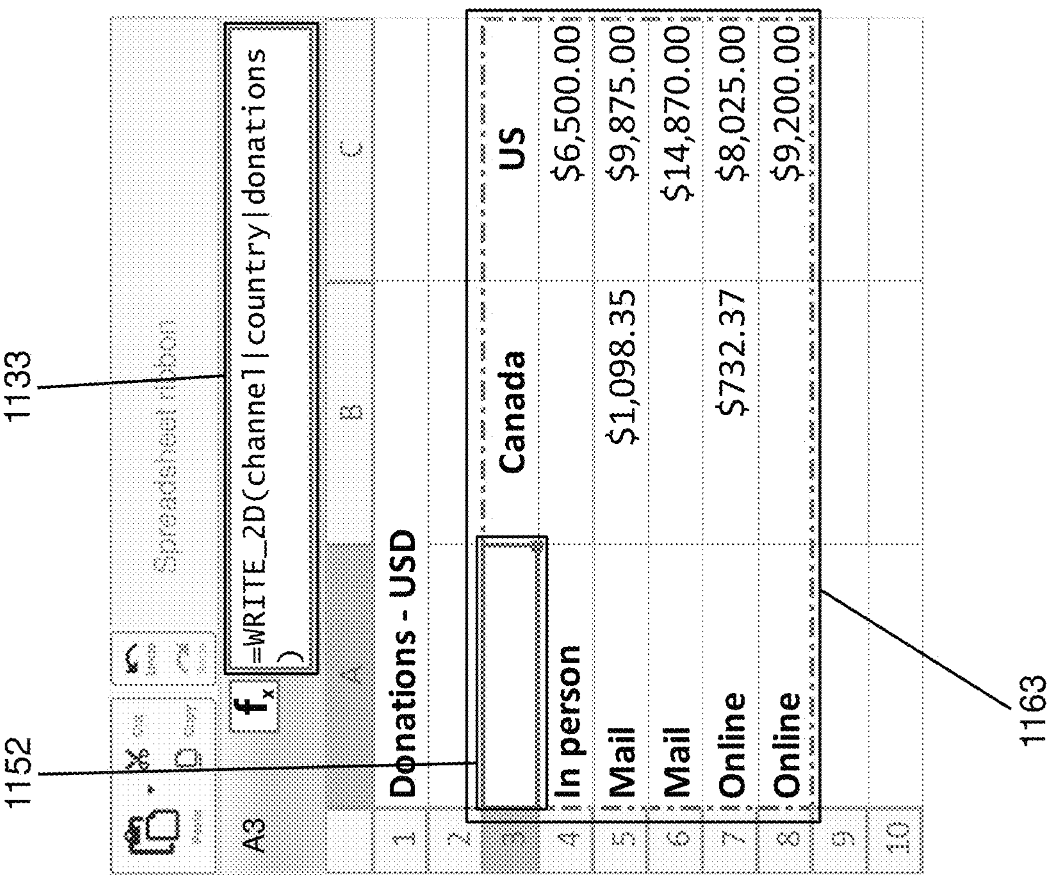

FIG. 11A and FIG. 11B example the before and after for the series of user list specifications done in FIG. 8 through FIG. 10E.

Figure 12:
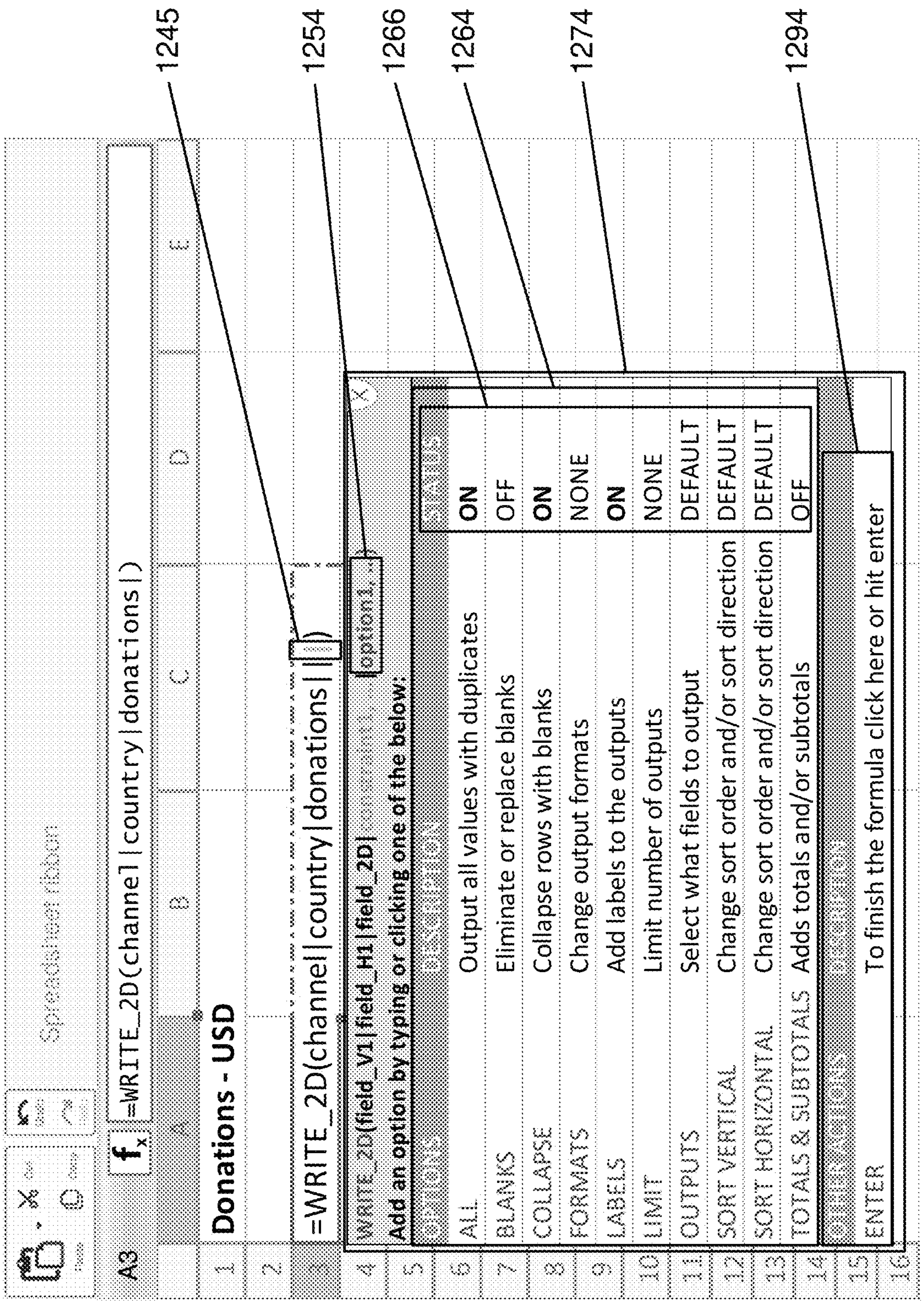
Figure 13B:
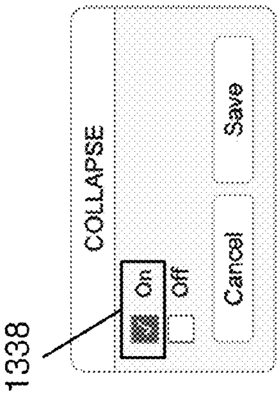
Figure 13C:
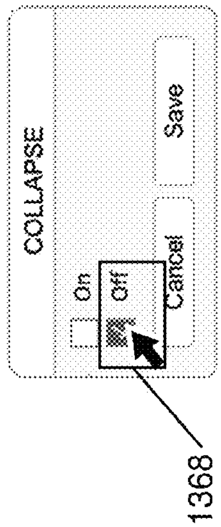
Figure 13D:
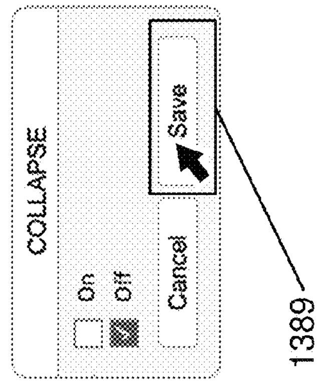
Figure 13A:
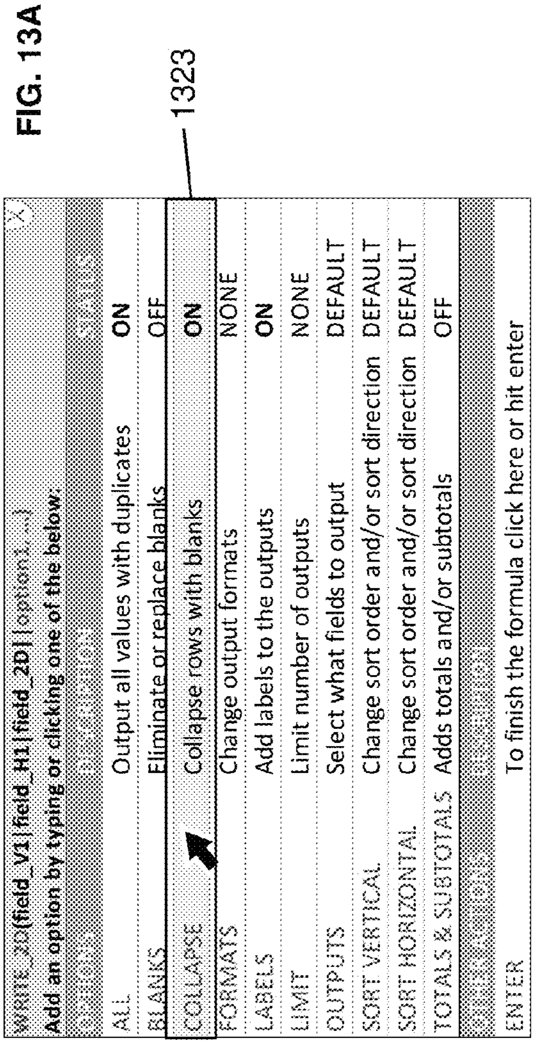
Figure 13E:
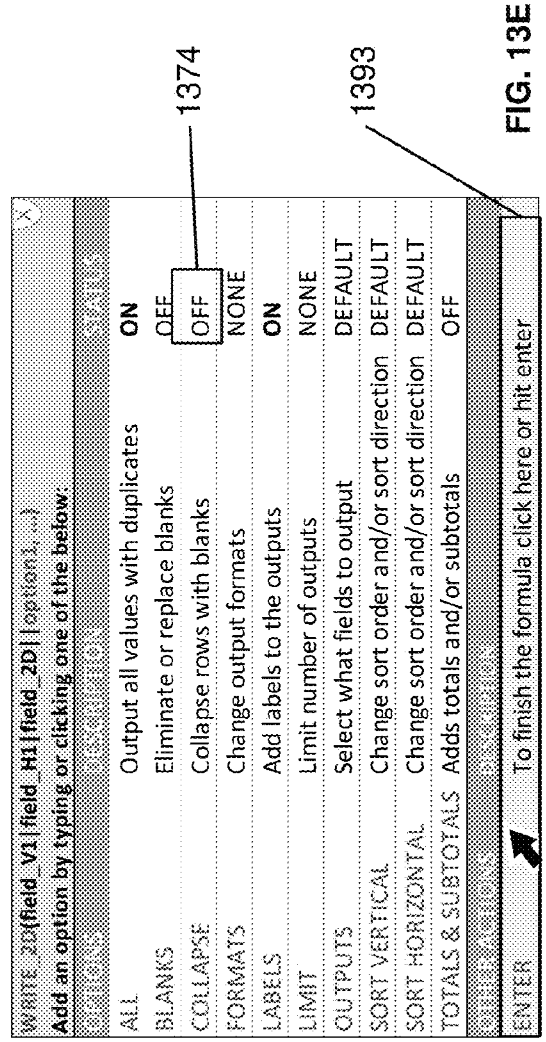

FIG. 12 examples a 'Multiple separate lists with situationally variable content' where one of the lists includes a 'Status'.

FIGS. 13A, 13B, 13C, 13D and 13E example the use of 'Multiple separate lists with situationally variable content' including a 'Status' and a 'Single list with fixed content' popup.

Figure 14A:
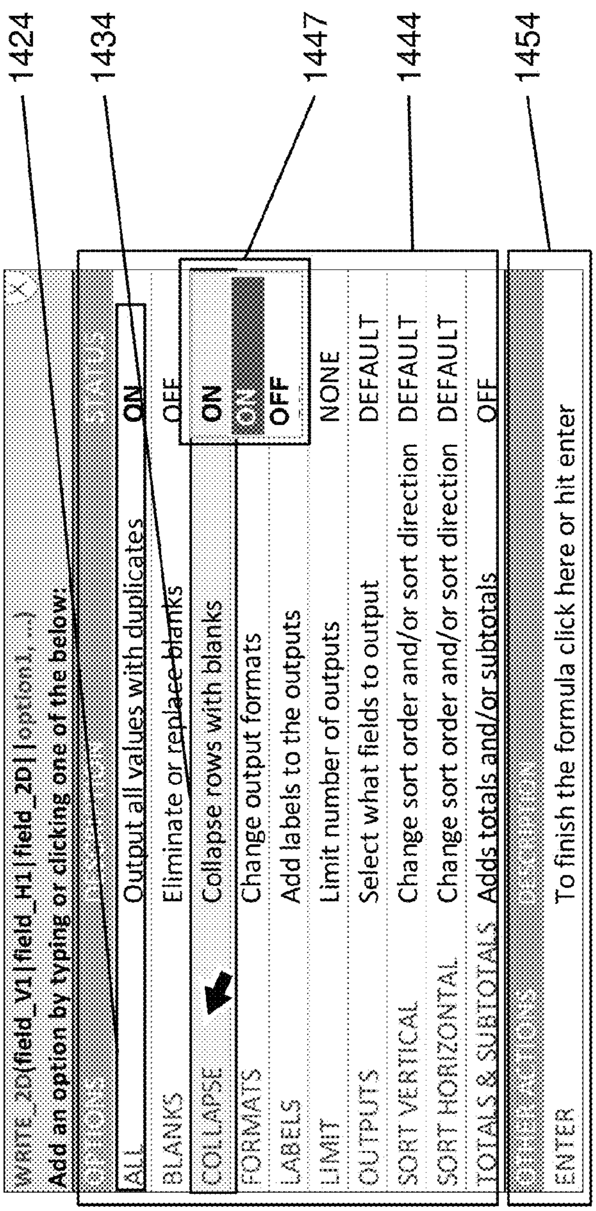
Figure 14B:
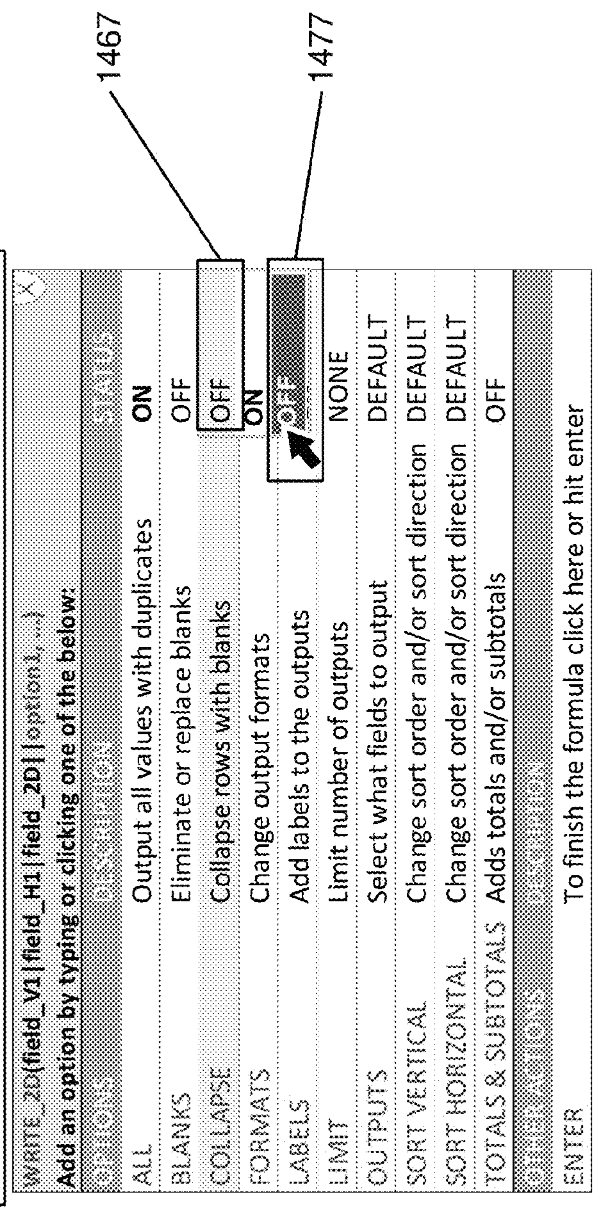

FIG. 14A and FIG. 14B examples the use of 'Multiple separate lists with situationally variable content' including a 'Status' supporting a dropdown specification list from the 'Status'.

FIGS. 15, 16A, 16B, 16C, 16D and 16E example 'Multiple separate lists' and 'Multiple related lists' with 'Situationally variable content'.

Figure 15:
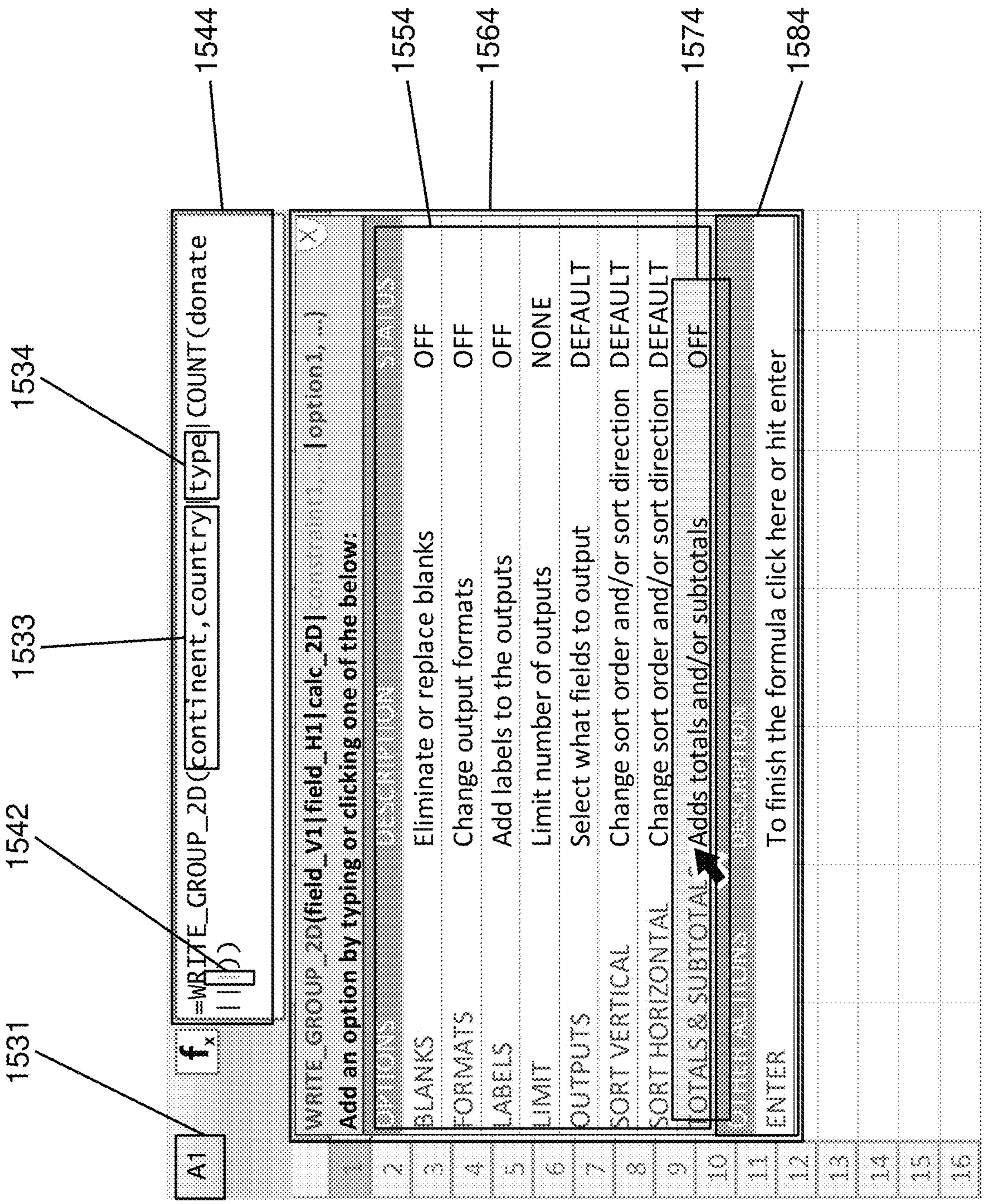
Figure 16A:
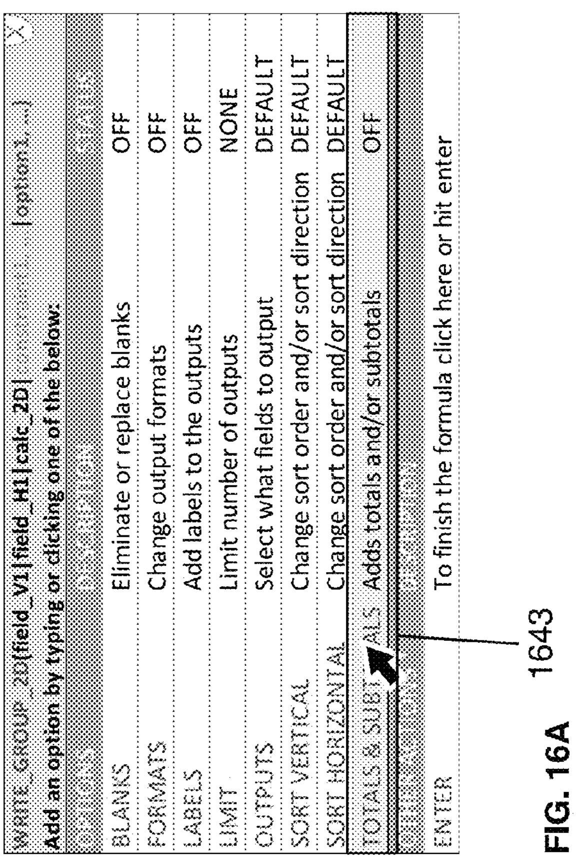
Figure 16B:
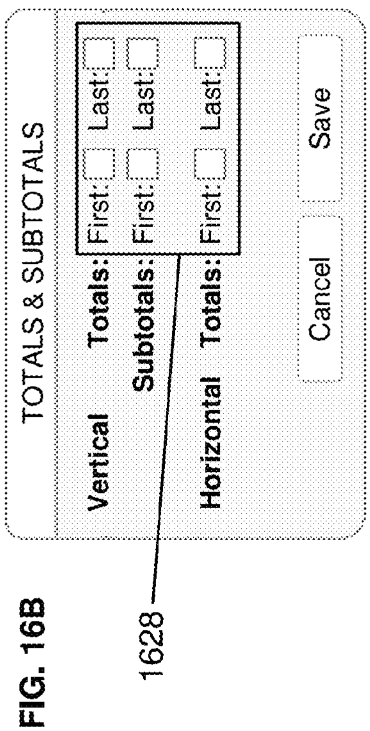
Figure 16C:
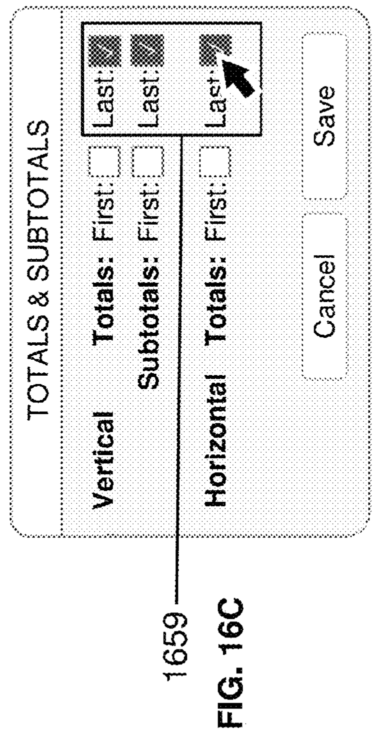
Figure 16D:
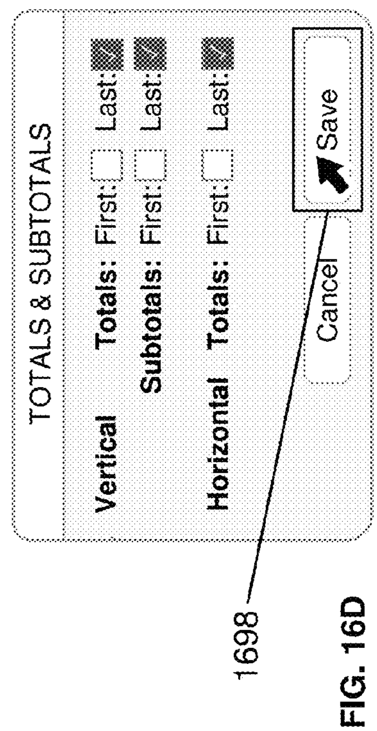
Figure 16E:
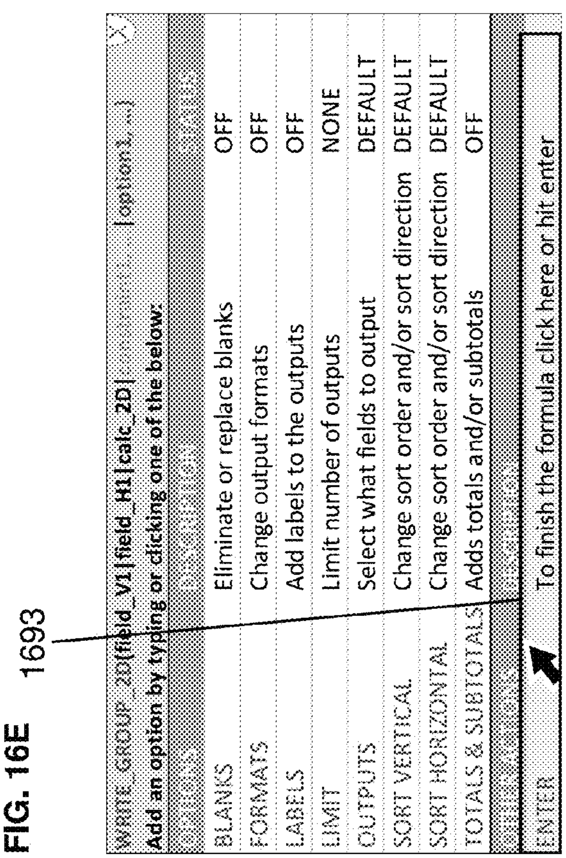
Figures 17A, 17B:
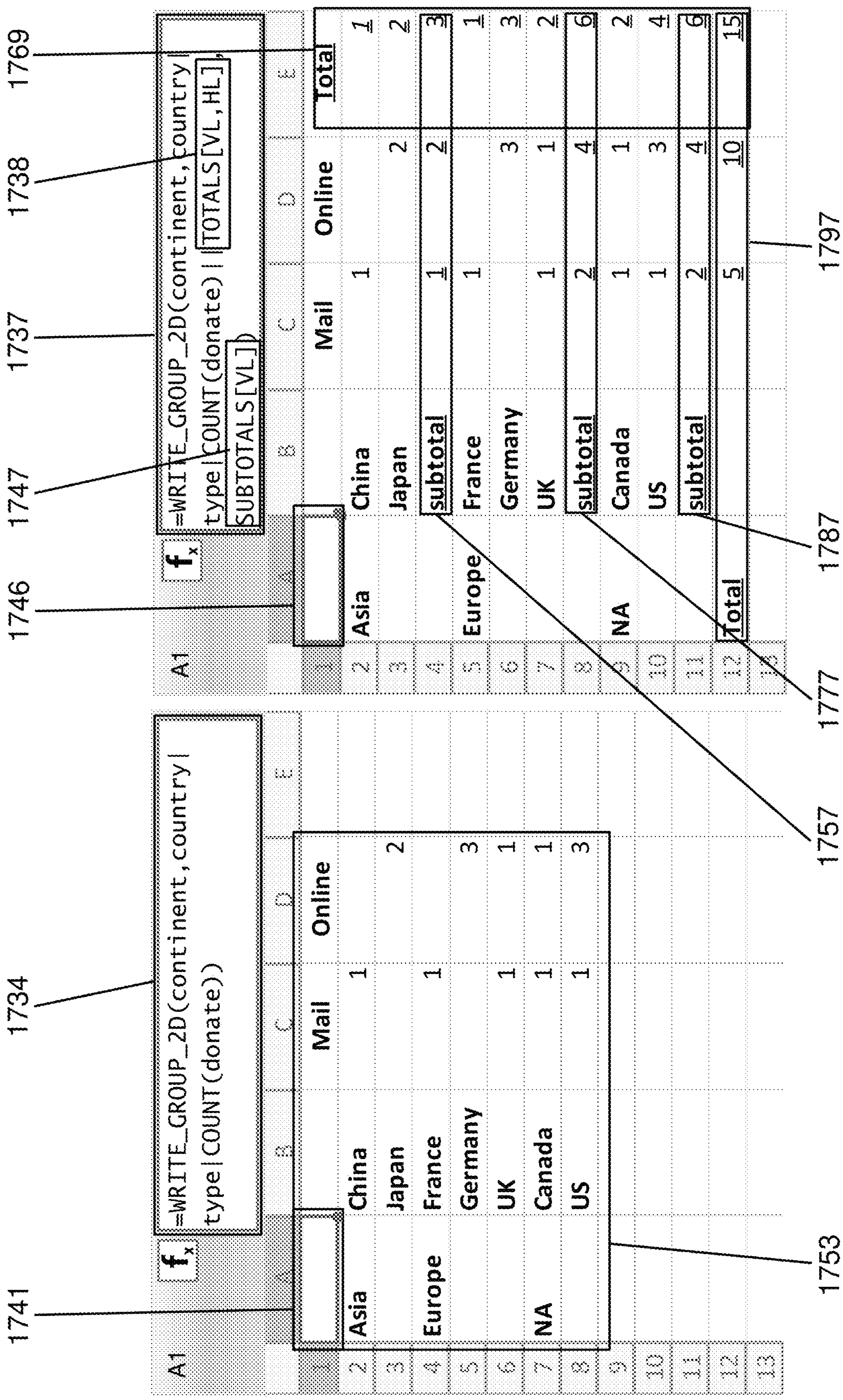

FIG. 17A and FIG. 17B example the before and after for the series of user list specifications done in FIG. 15 through FIG. 16E.

FIGS. 18A, 18B, 19A, 19B, 19C, 19D, 19E, 20A, 20B, 20C, 20D and 20E example our technology supporting 'Multiple related lists' with 'Situationally variable content' in a selection list panel UI with dropdowns.

Figure 21B:
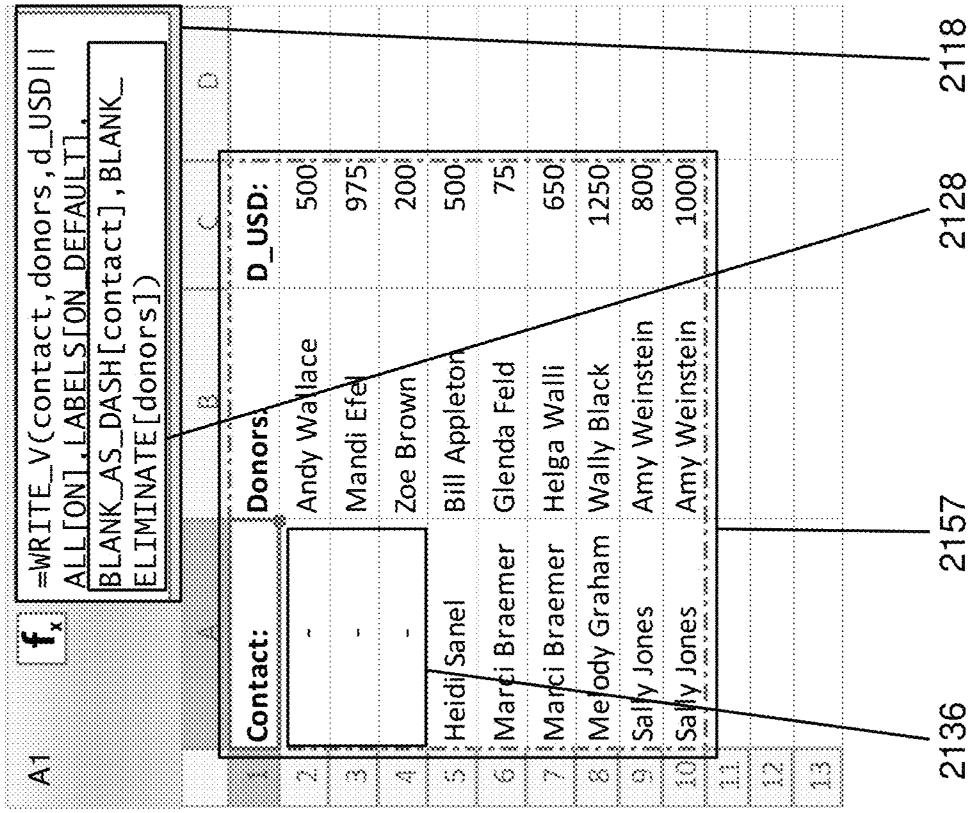
Figure 21A:
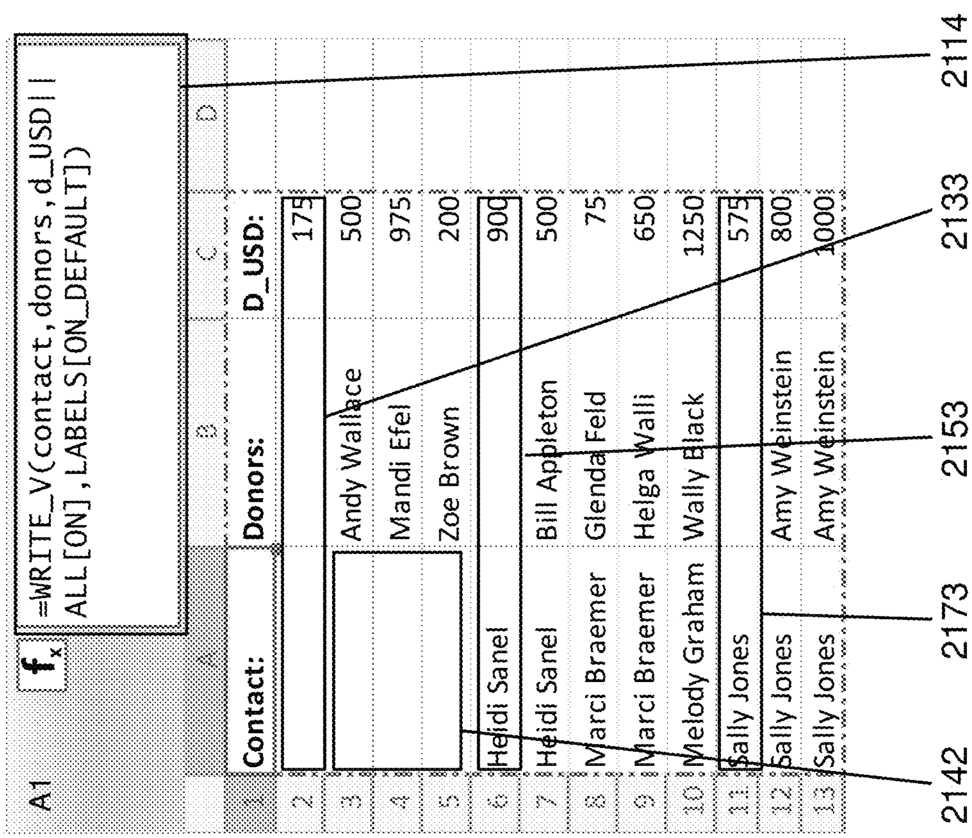

FIG. 21A and FIG. 21B example the before and after for the series of user list specifications done in FIG. 18B through FIG. 20E.

FIGS. 22, 23, 24A, 24B, 24C, 24D, 25A, 25B, 25C and 25D example two embodiments of our 'Reorderable specification lists' spreadsheet function argument specification types.

Figure 24A:
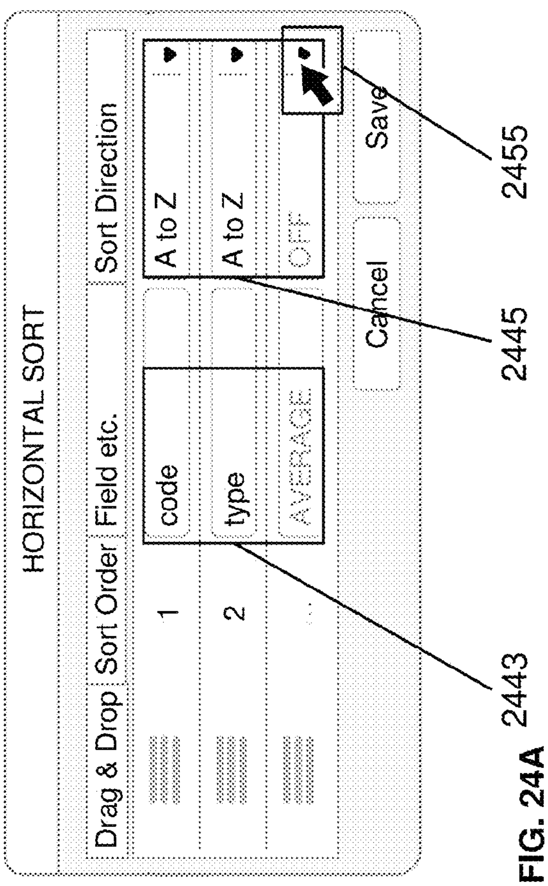
Figure 24B:
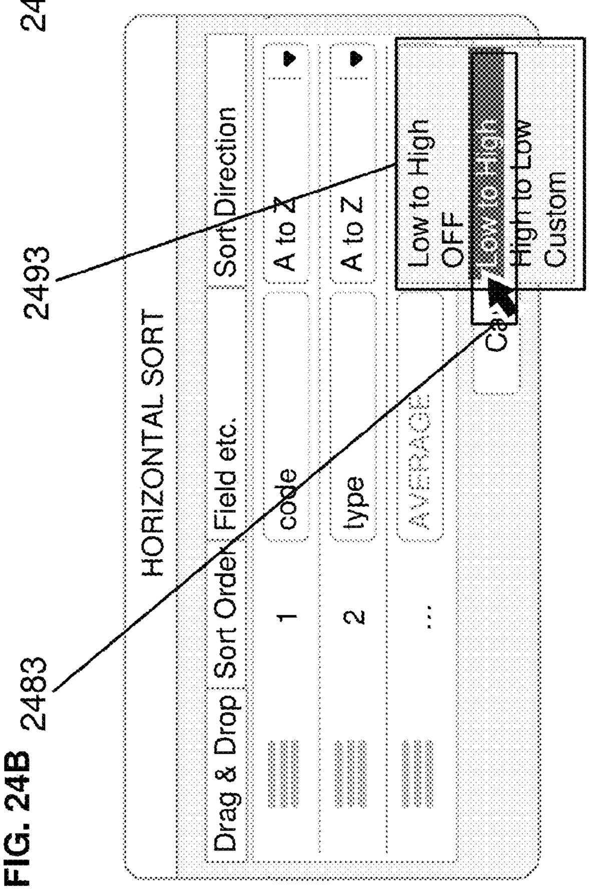
Figure 24C:
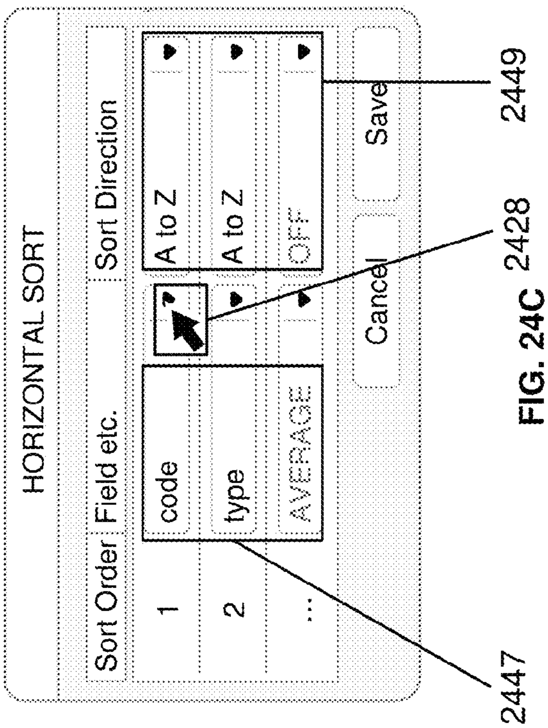
Figure 24D:
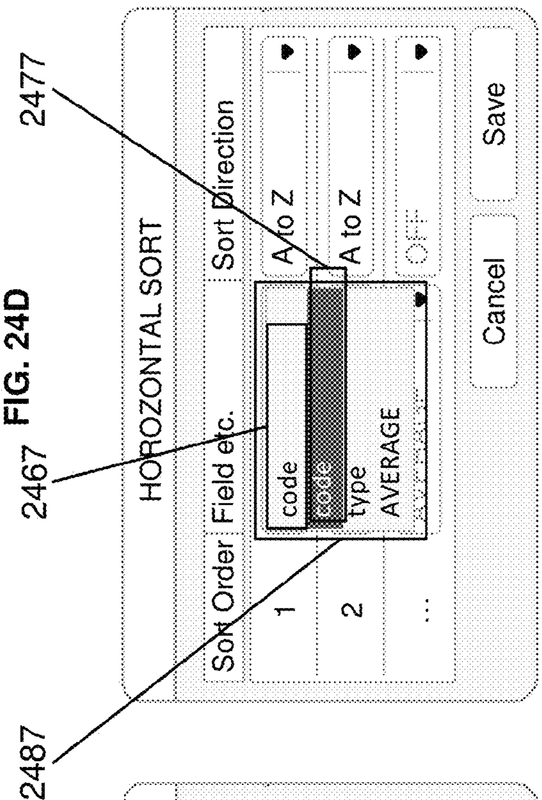
Figures 25A, 25B, 25C, 25D:
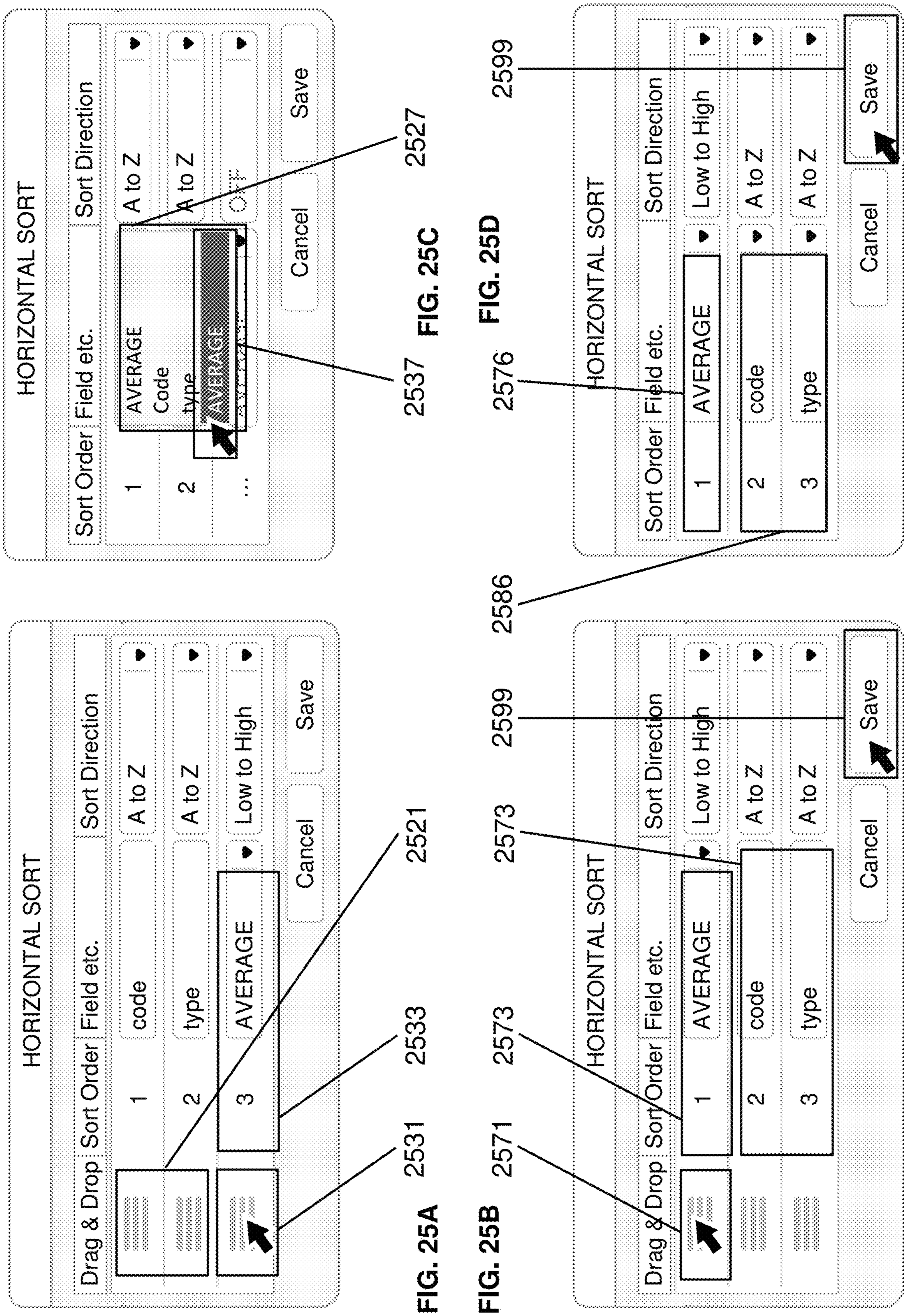
Figure 26C:
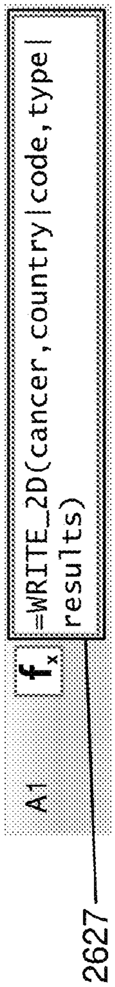
Figure 26B:
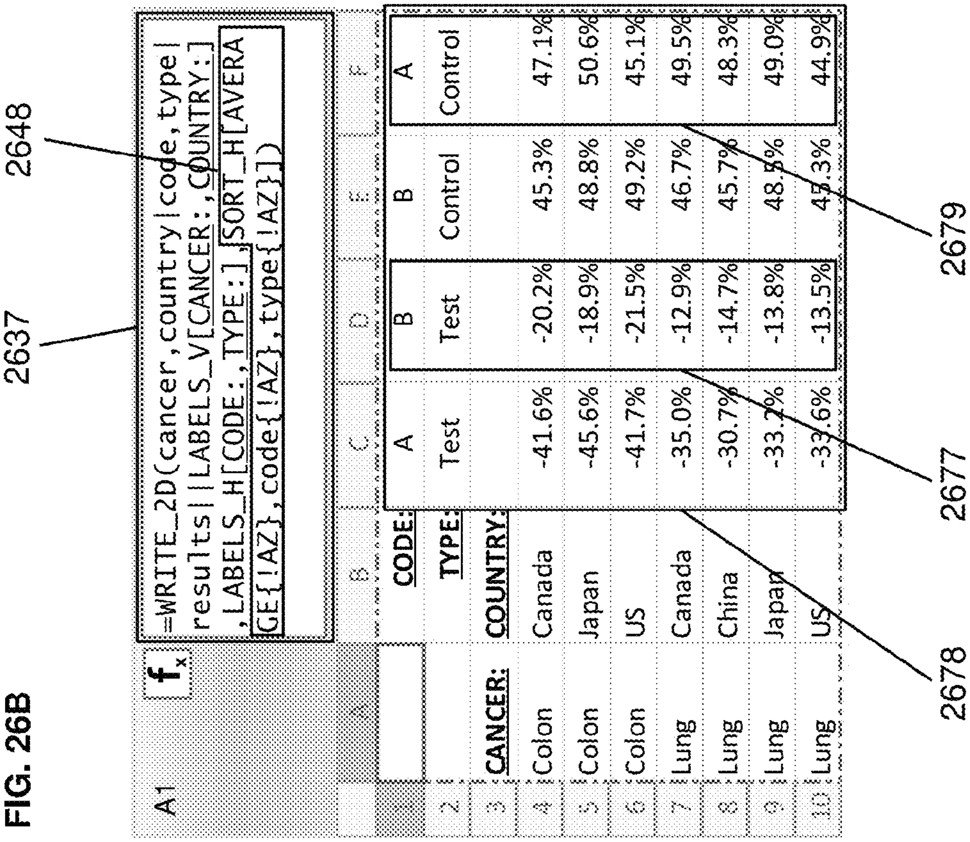
Figure 26A:
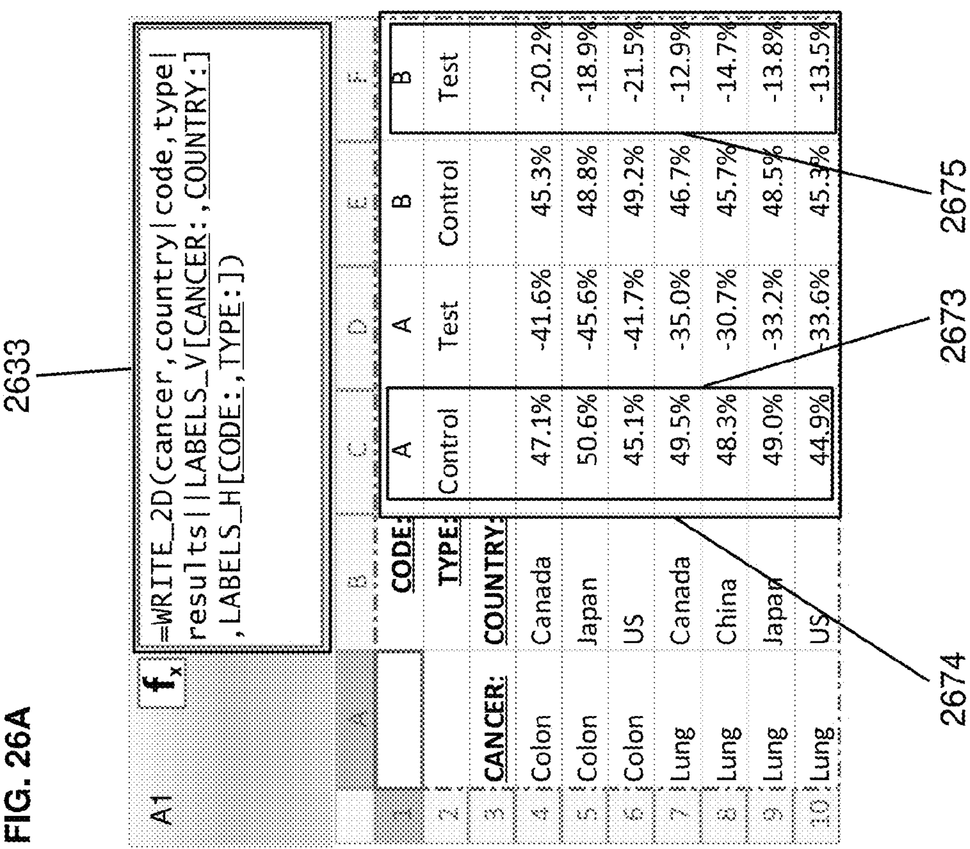

FIGS. 26A, 26B and 26C example with visible and invisible arguments, the before and after for the series of selection list panel specifications done in FIG. 23 through FIG. 25D.

Figure 27A:
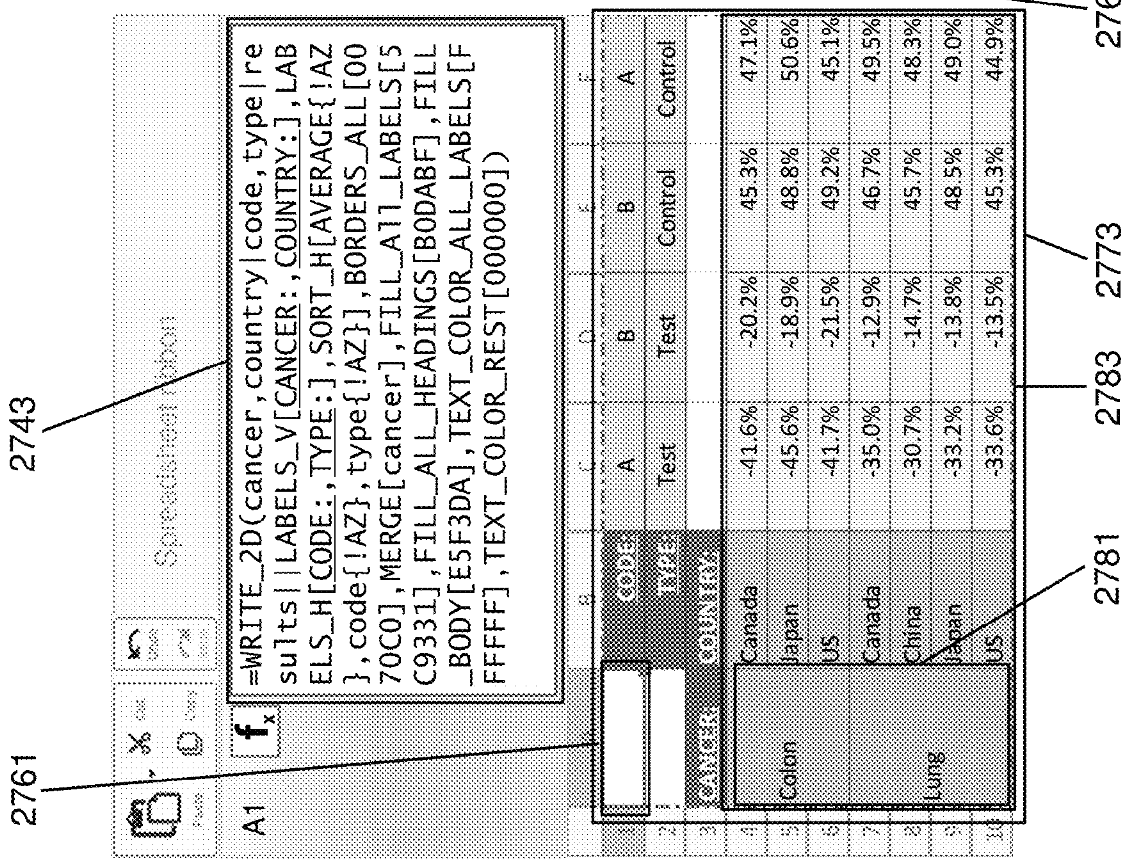
Figure 27B:
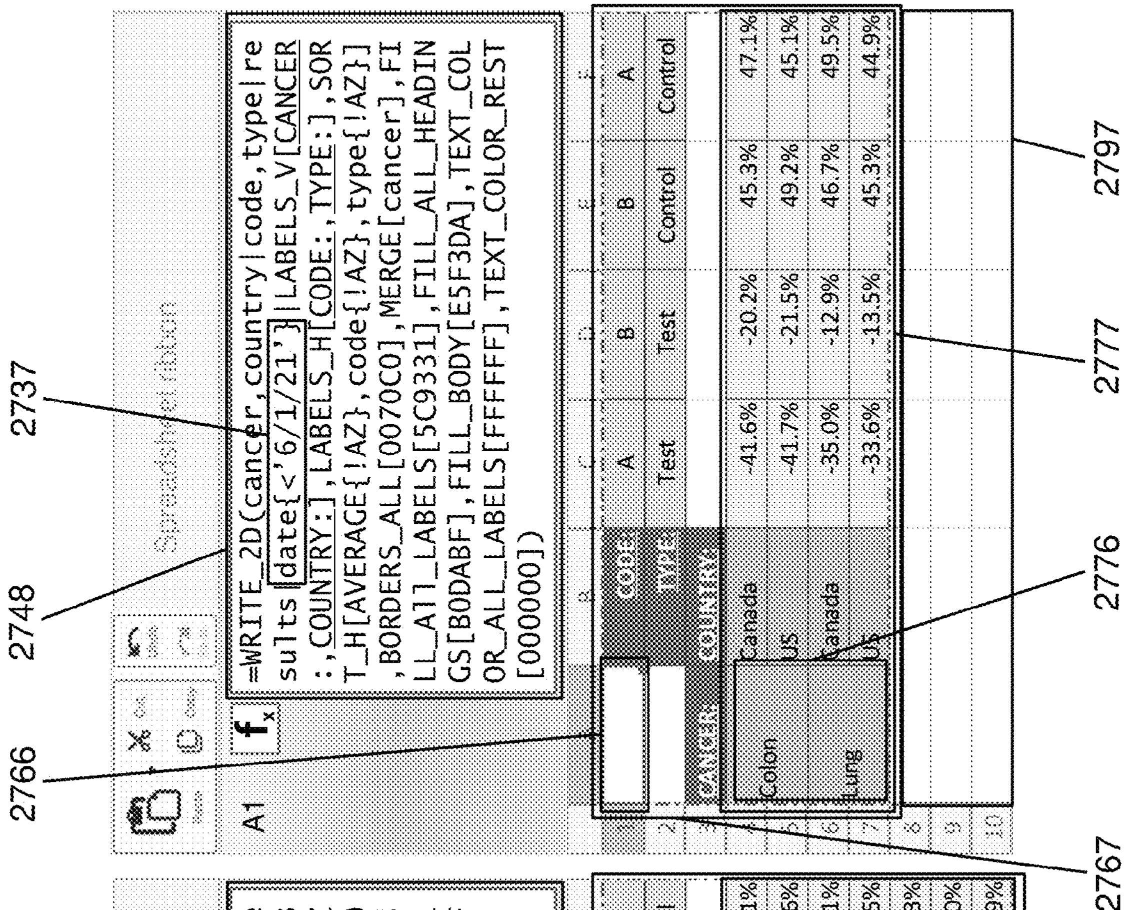

FIG. 27A and FIG. 27B example our 'WRITE_2D' function formulas (not the cells) controlling the formatting of cells they instantiate.

Figure 28B:
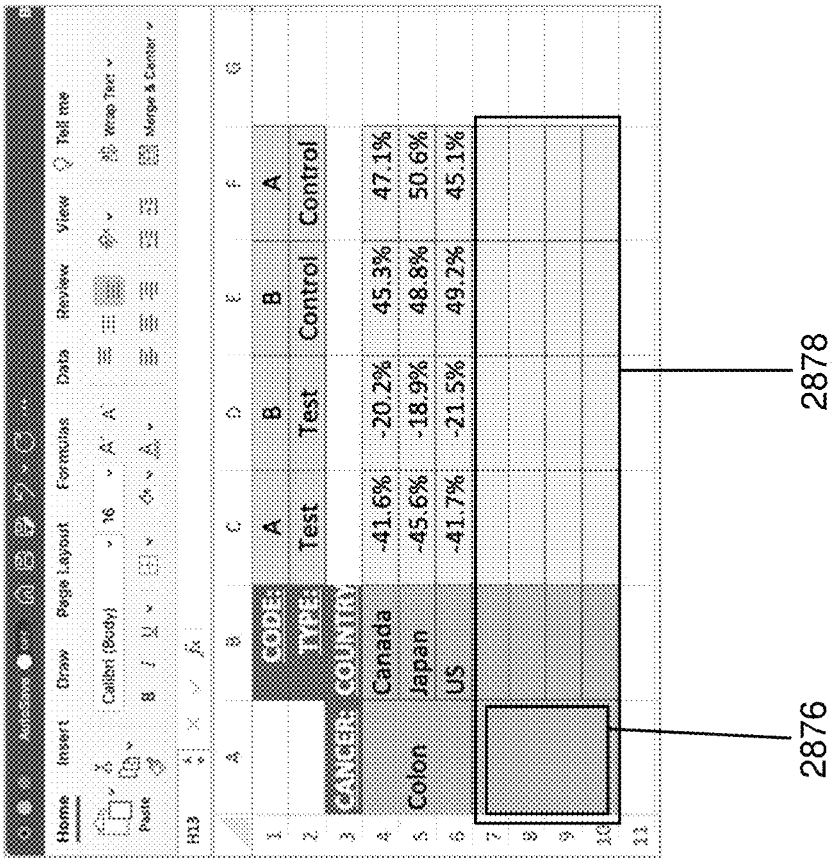
Figure 28A:
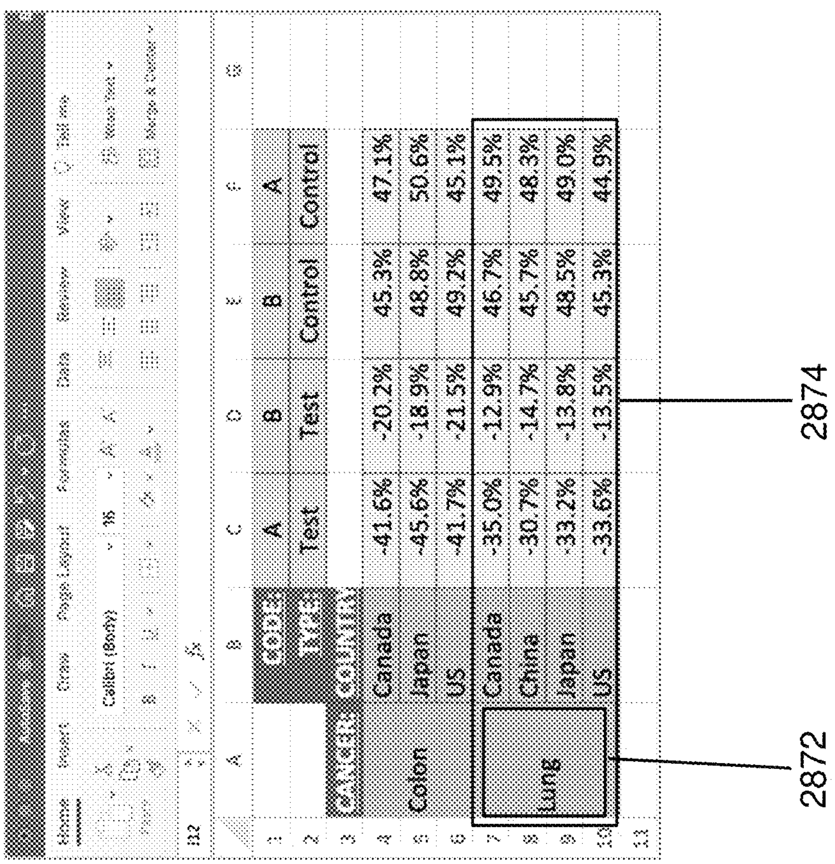
Figures 29A, 29B, 29C, 29D:
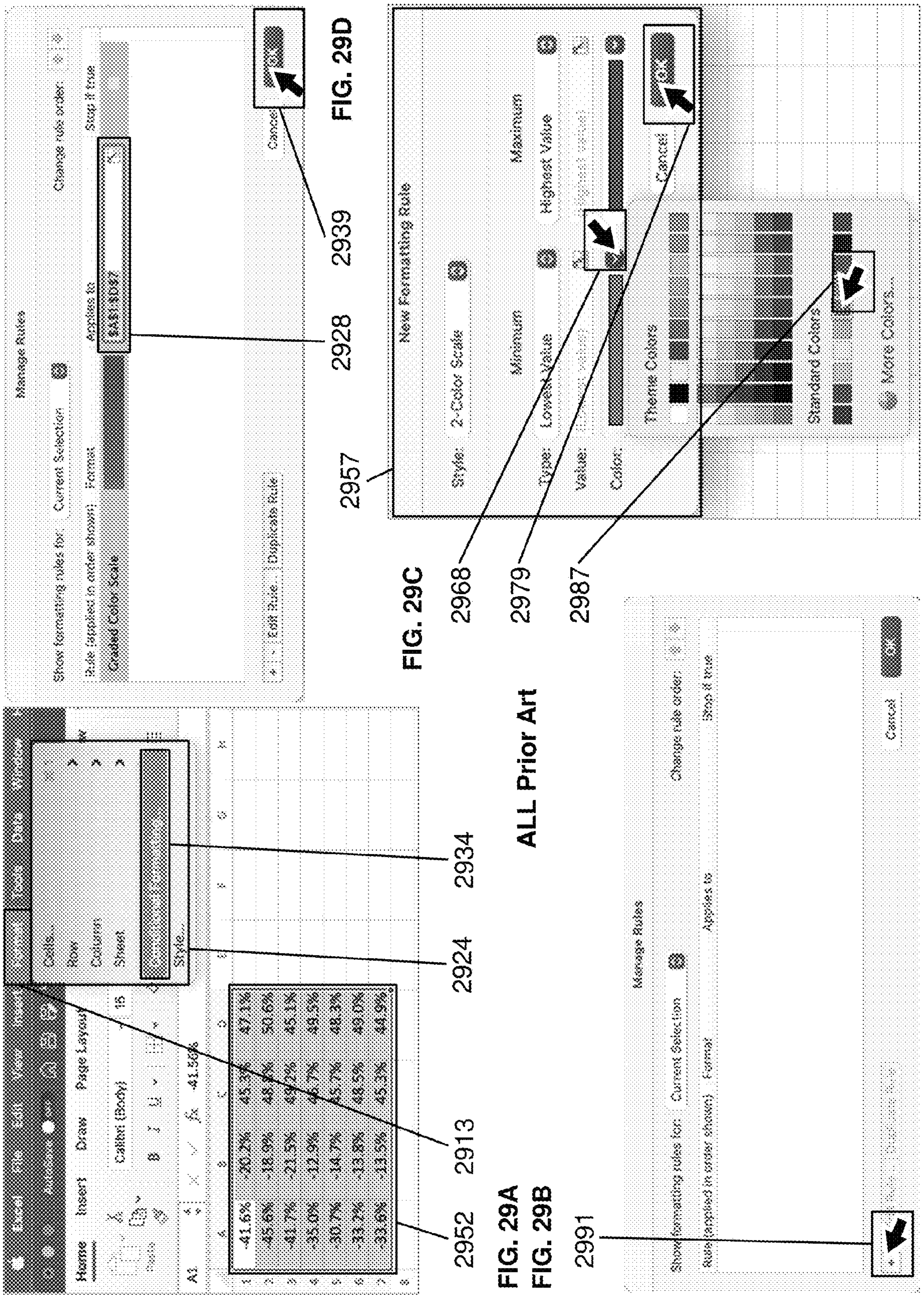

FIG. 28A and FIG. 28B example how cells control the formatting in existing spreadsheets using Microsoft Excel.

FIGS. 29A, 29B, 29C and FIG. 29D example a user applying conditional formatting in Microsoft Excel (representing existing spreadsheets).

Figures 30A, 30B, 30C:
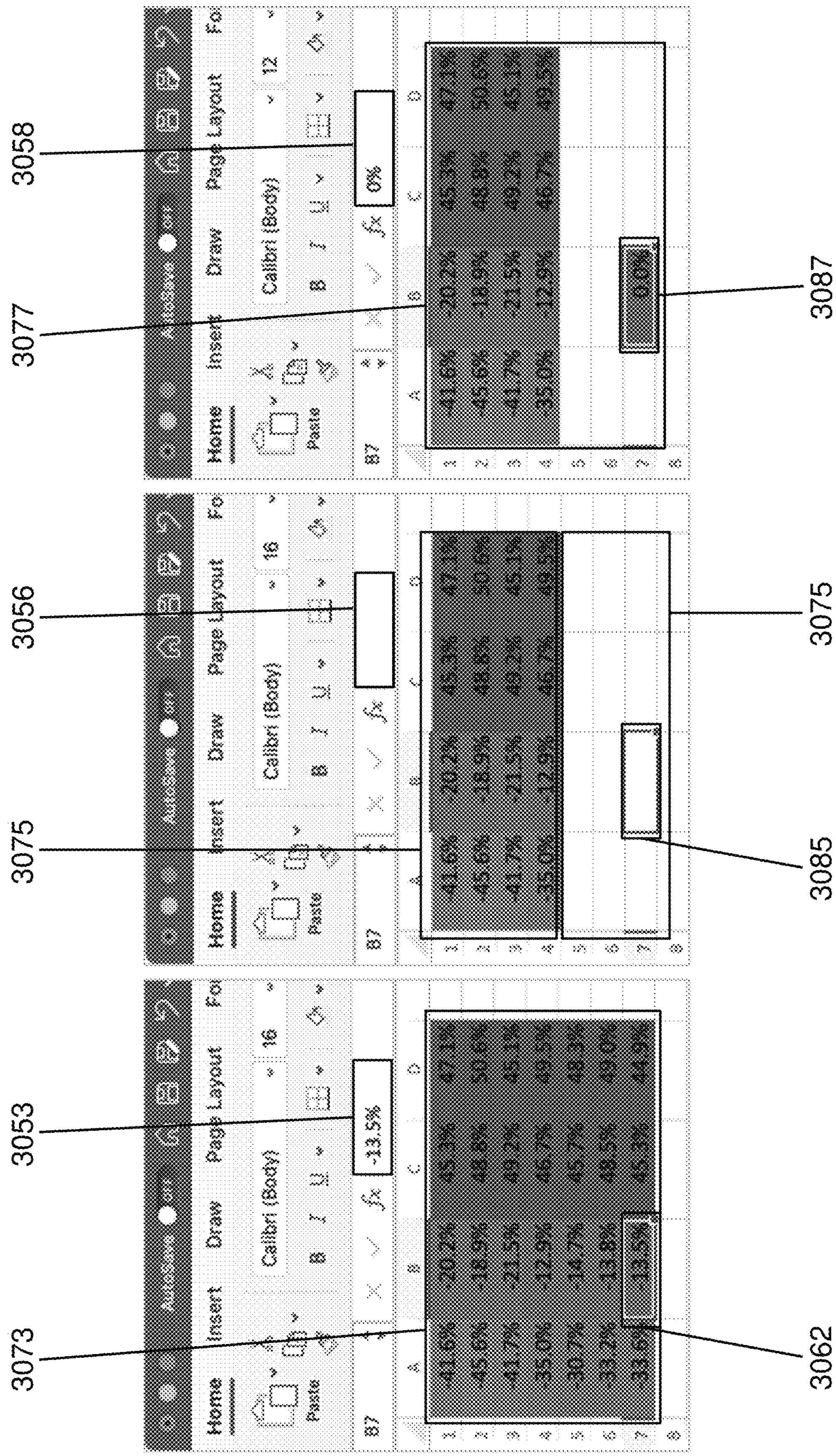

FIGS. 30A, 30B and 30C example the cell control of those conditional formats applied in Microsoft Excel.

FIGS. 31A, 31B, 32A, 32B, 33A, 33B, 33C, 33D, 34A, 34B, 34C, 34D, 34E, 35, 36A and 36B example several of our spreadsheet argument specification types, including 'Multiple cascading selector lists' and 'Combinations across options lists', used for specifying function-controlled formats.

Figure 35:
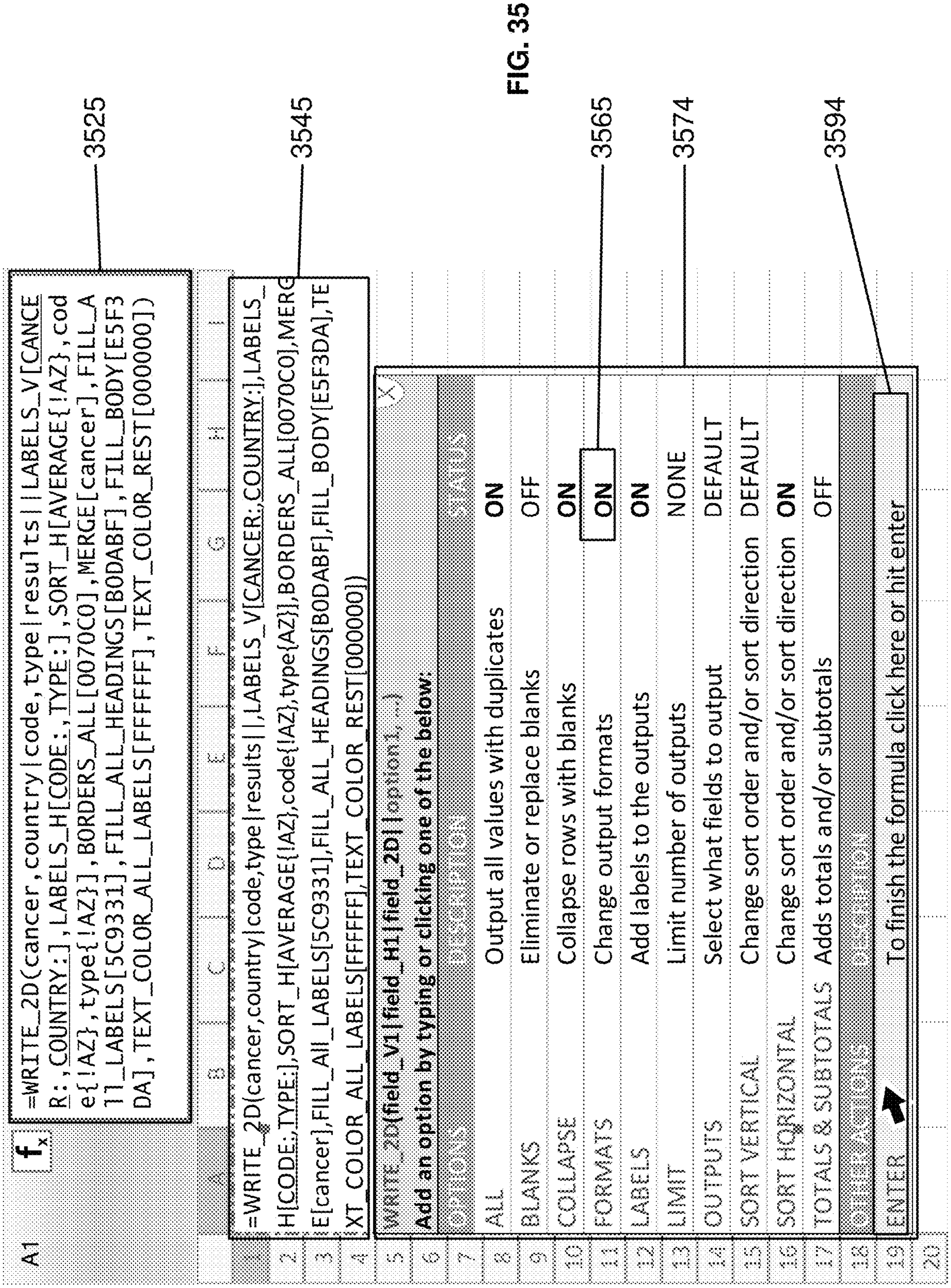
Figure 36A:
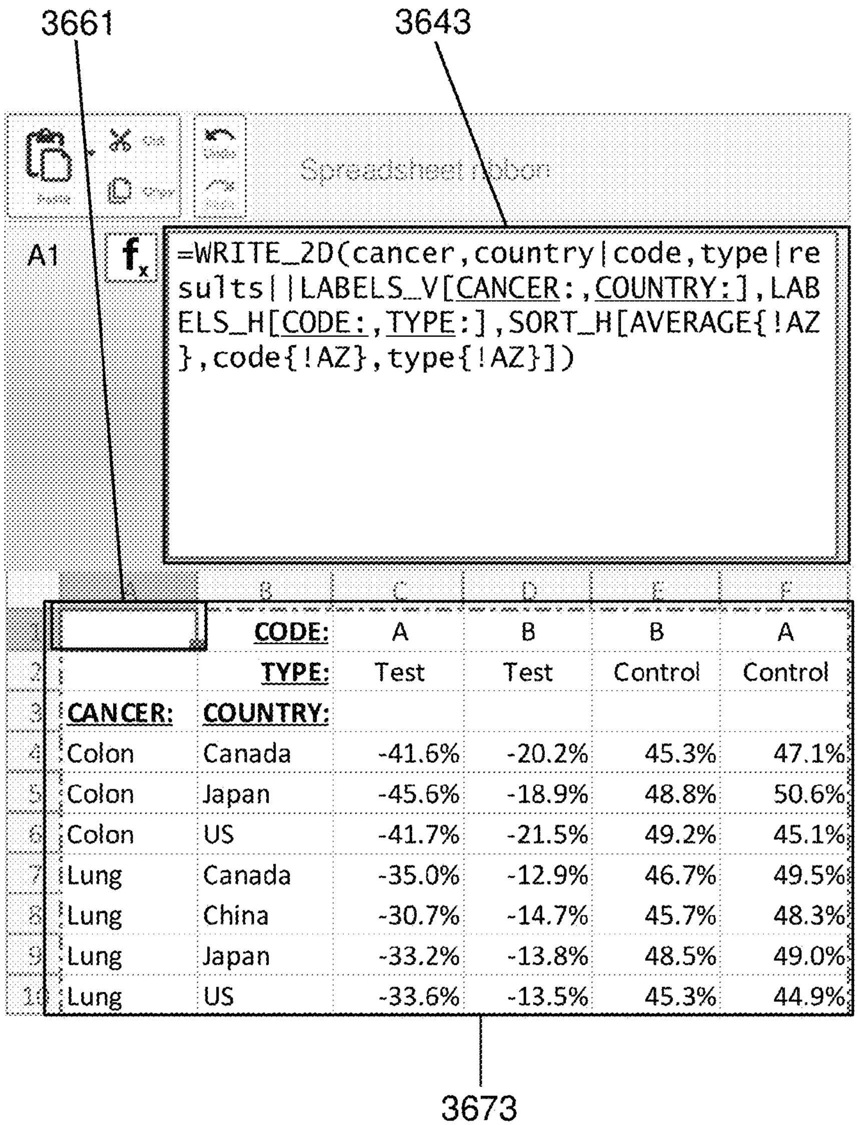
Figure 36B:
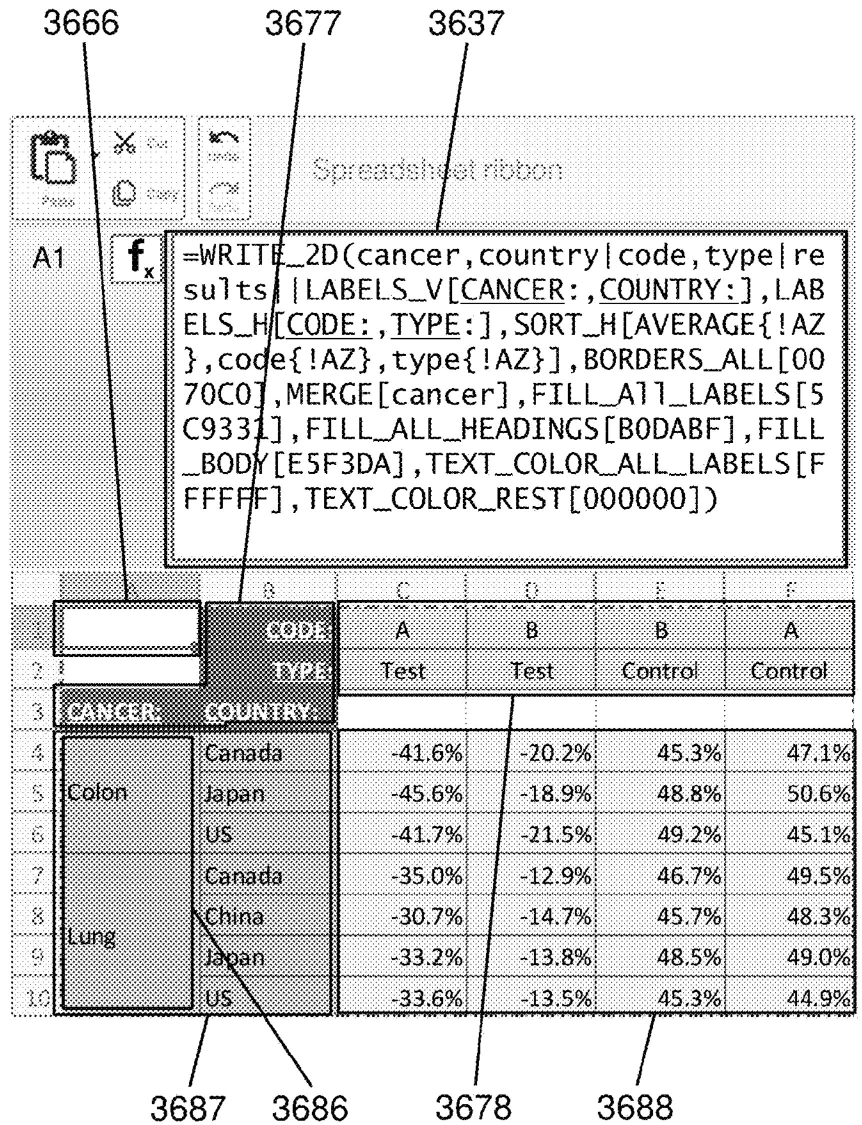

FIG. 36A and FIG. 36B example the before and after for the series of selection list panel function formatting specifications done in FIG. 31A through FIG. 35.

Figure 37A:
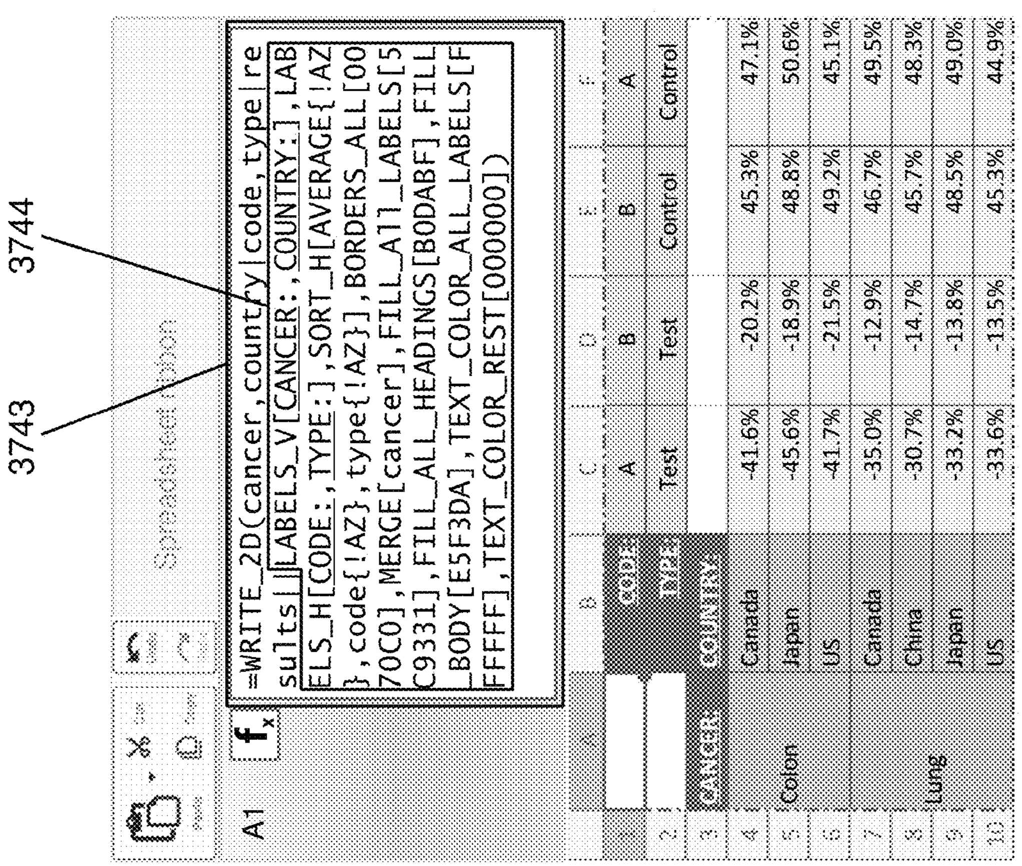
Figure 37B:
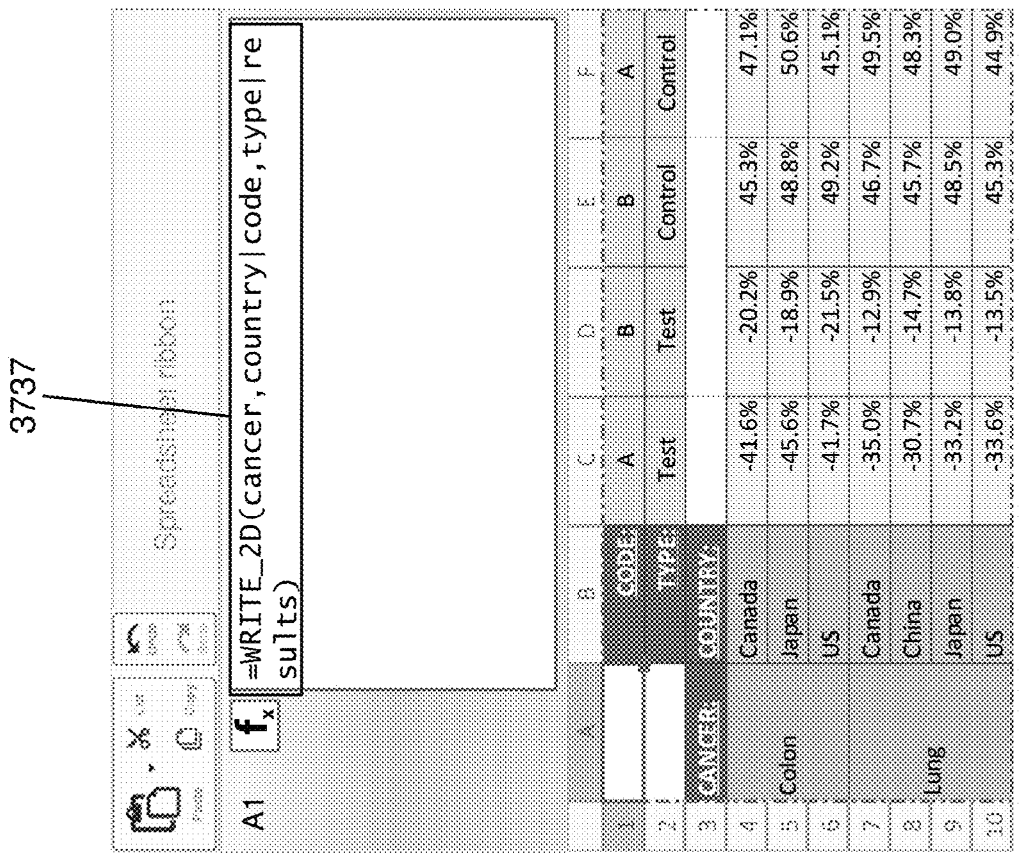

FIG. 37A and FIG. 37B example one embodiment of how our invisible function arguments work.

FIGS. 38A, 38B, 38C and 38D contrast one embodiment of accessing our invisible function argument specifications (automatic cursor triggered access) with a comparable version of our visible argument technology.

FIGS. 39, 40A, 40B, 40C, 40D and FIG. 40E example the use of 'Multiple separate lists with situationally variable content' and a 'Single list with fixed content' popup populating a function with invisible arguments.

Figure 39:
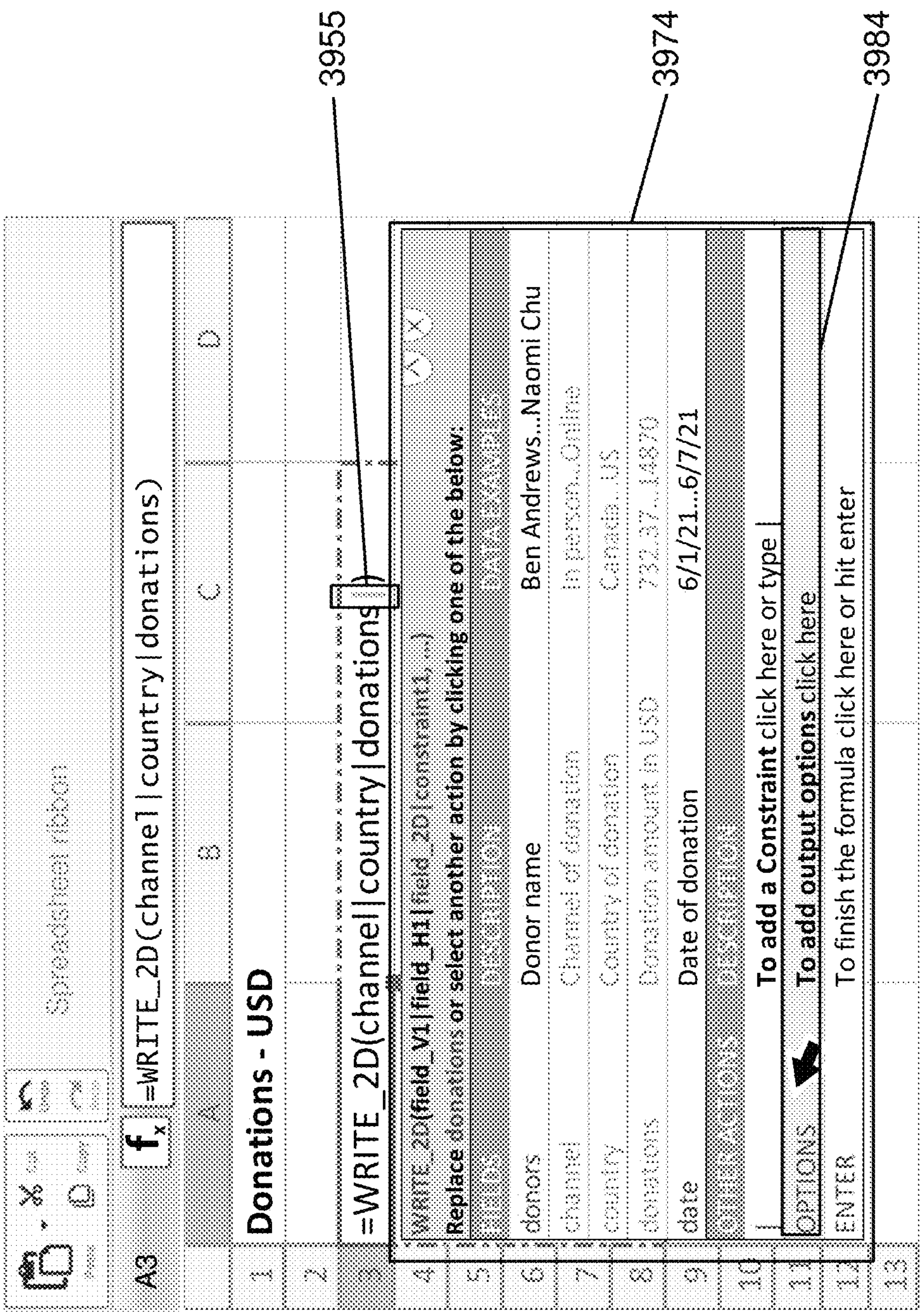
Figure 40A:
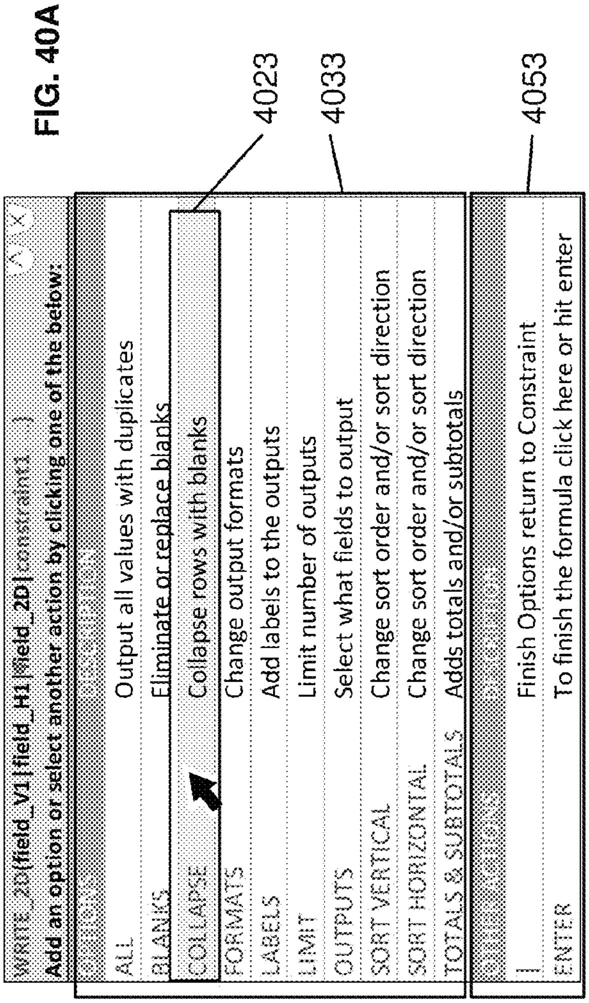
Figure 40B:
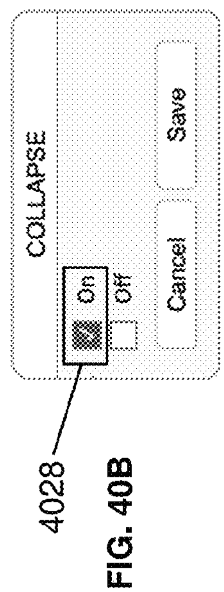
Figure 40C:
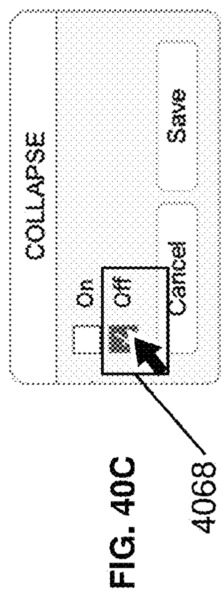
Figure 40D:
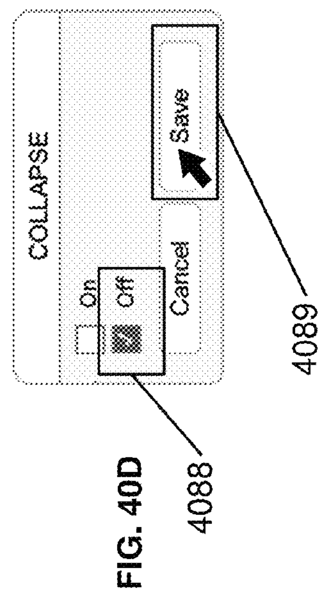
Figure 40E:
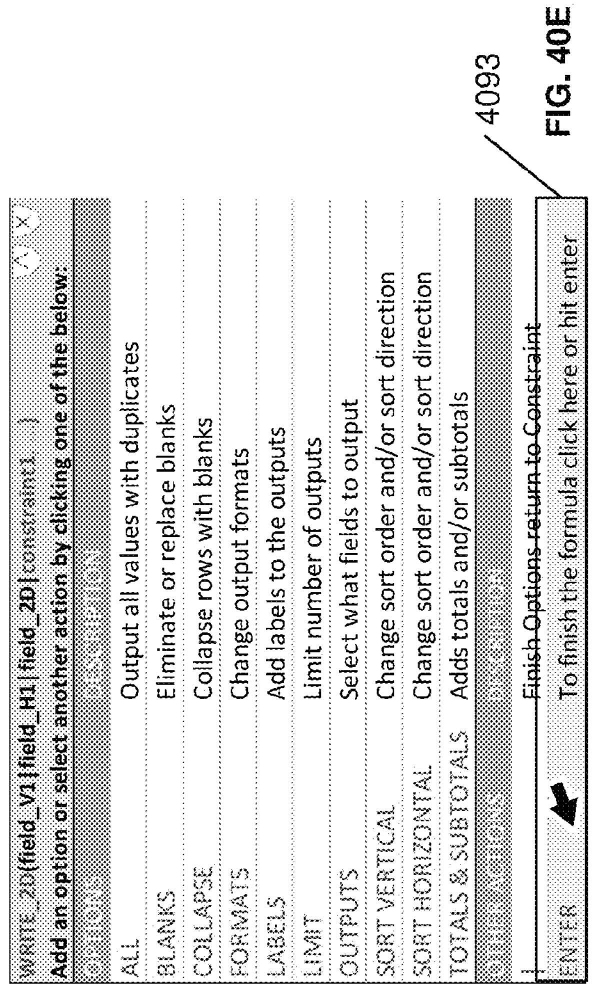
Figure 41B:
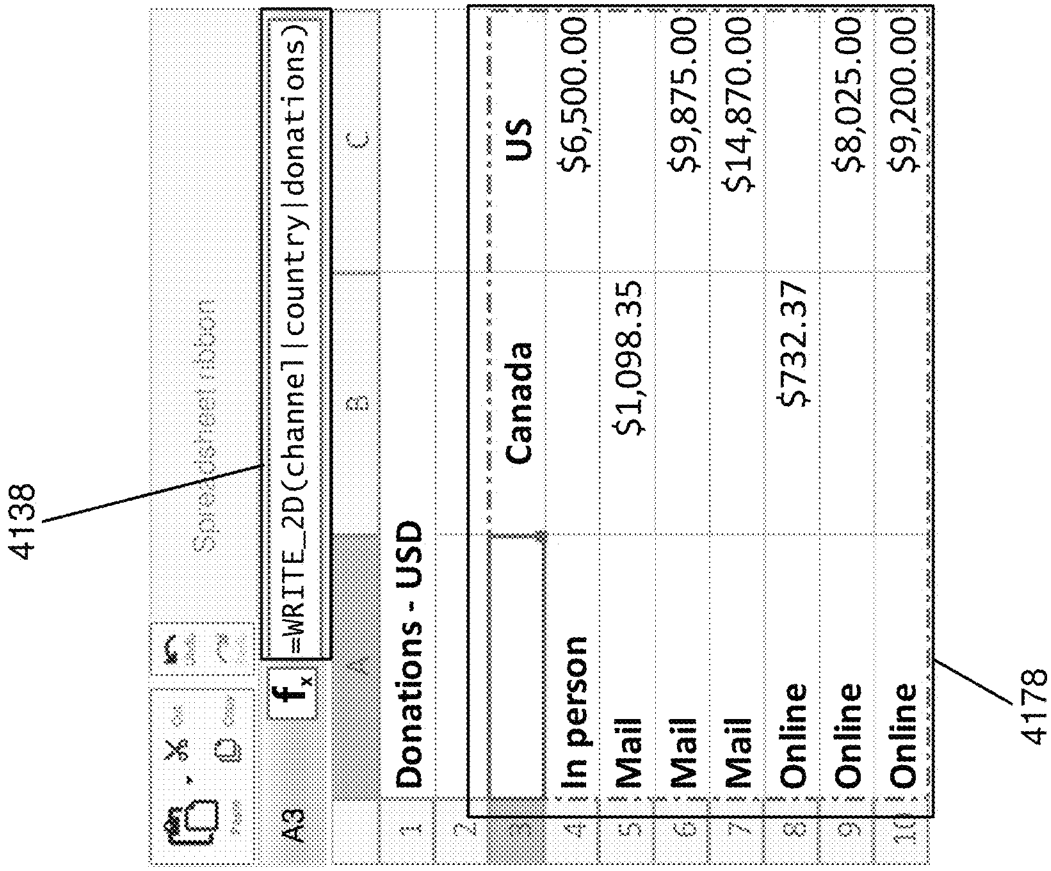
Figure 41A:
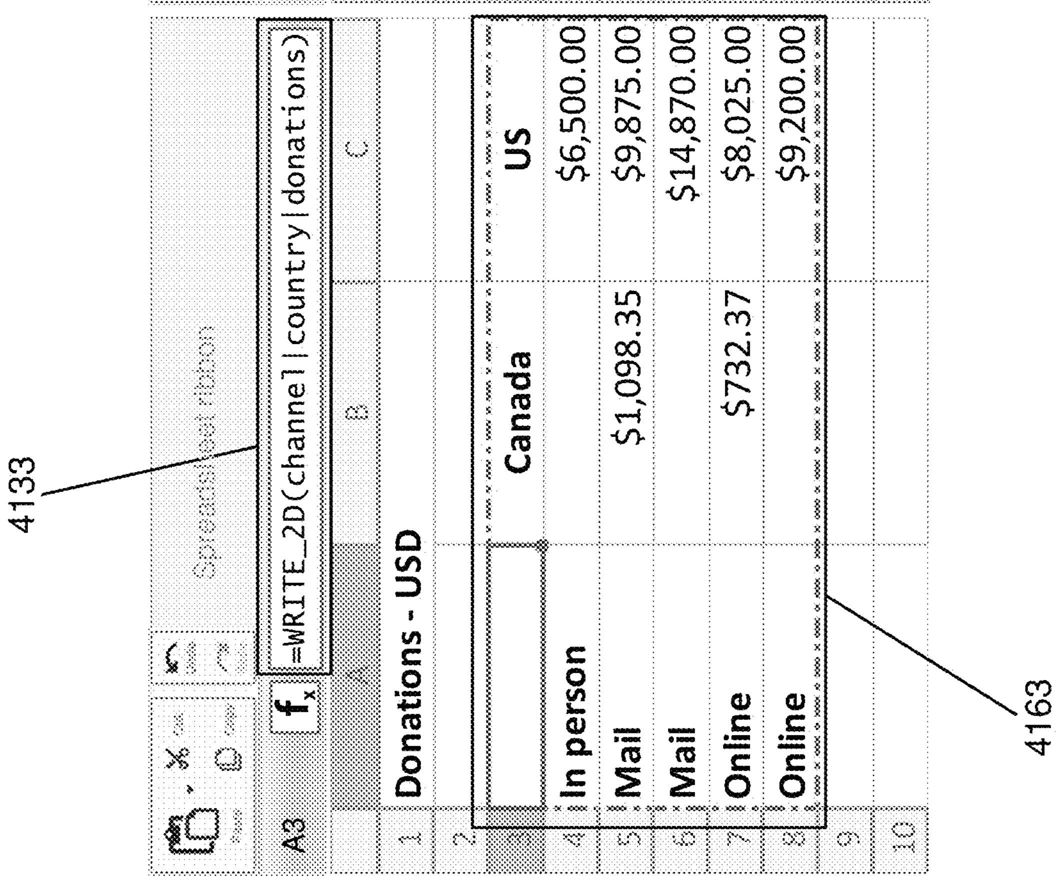
Figure 42B:
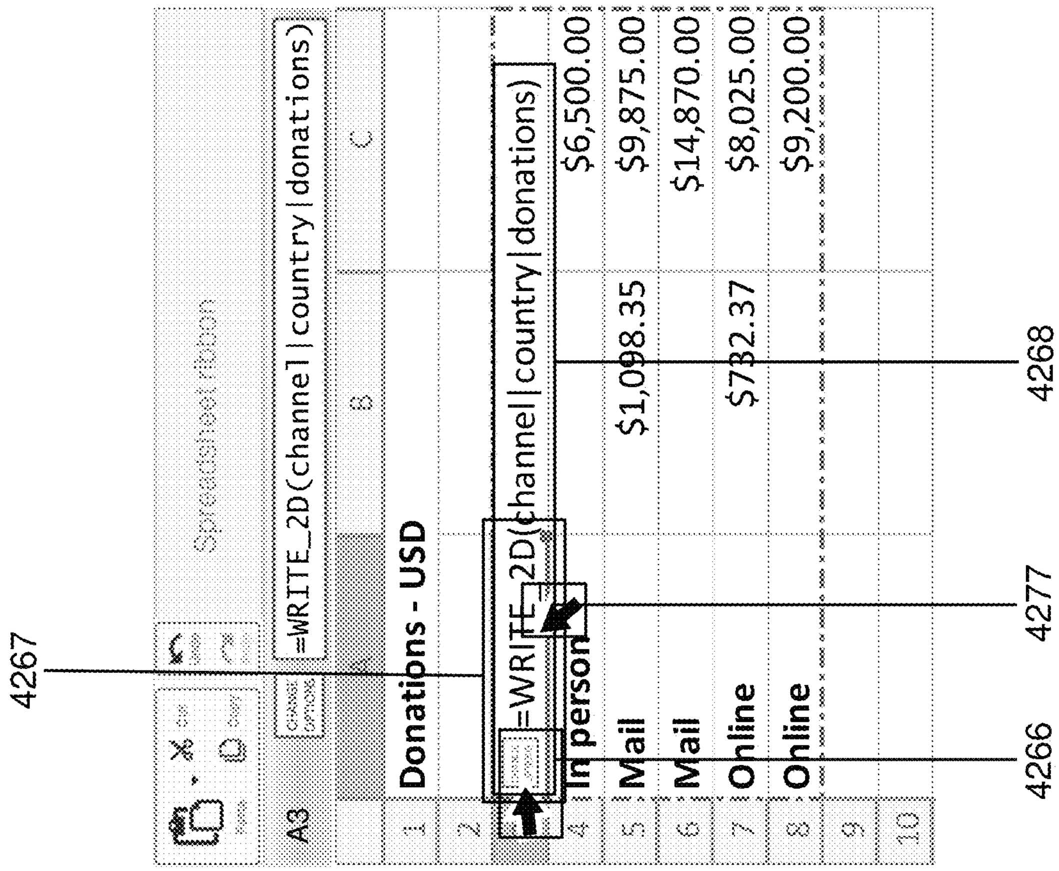
Figure 42A:
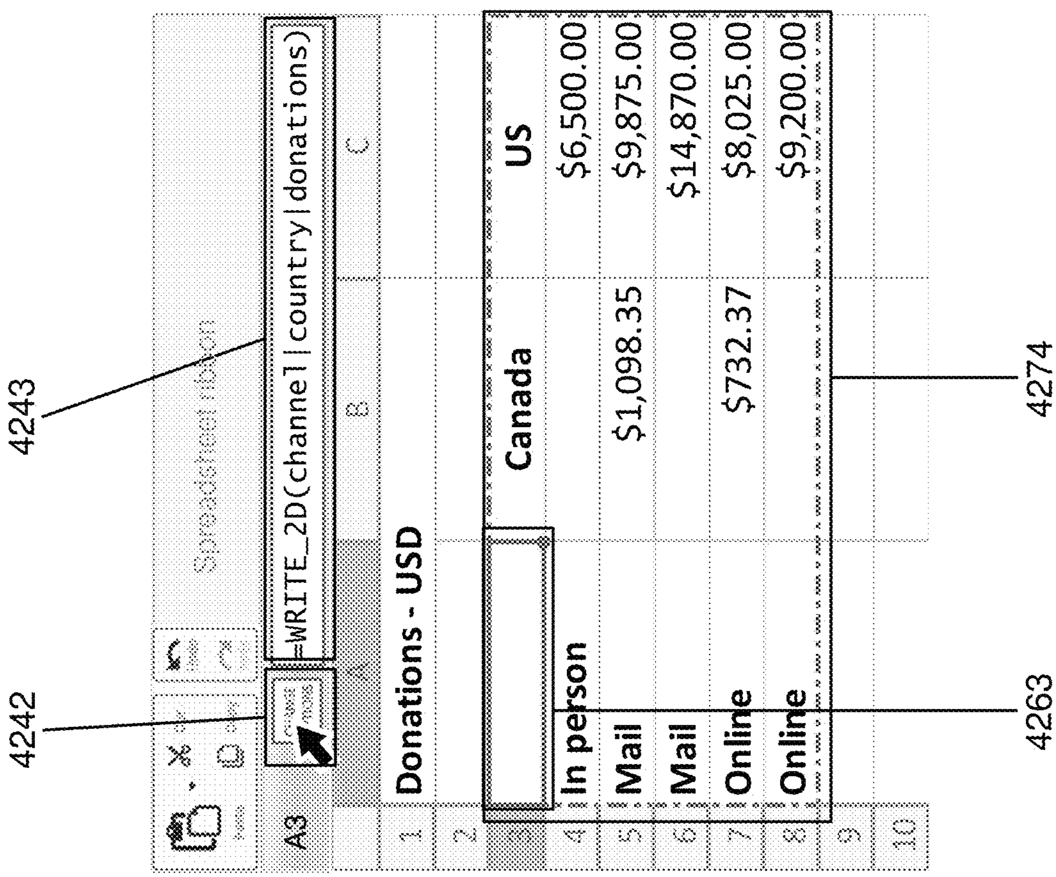

FIG. 41A and FIG. 41B example the before and after for the series of user list specifications done in FIG. 39 through FIG. 40E populating a function with invisible arguments (as contrasted with FIG. 11A and FIG. 11B doing the same thing for a function with visible arguments).

Figure 43:
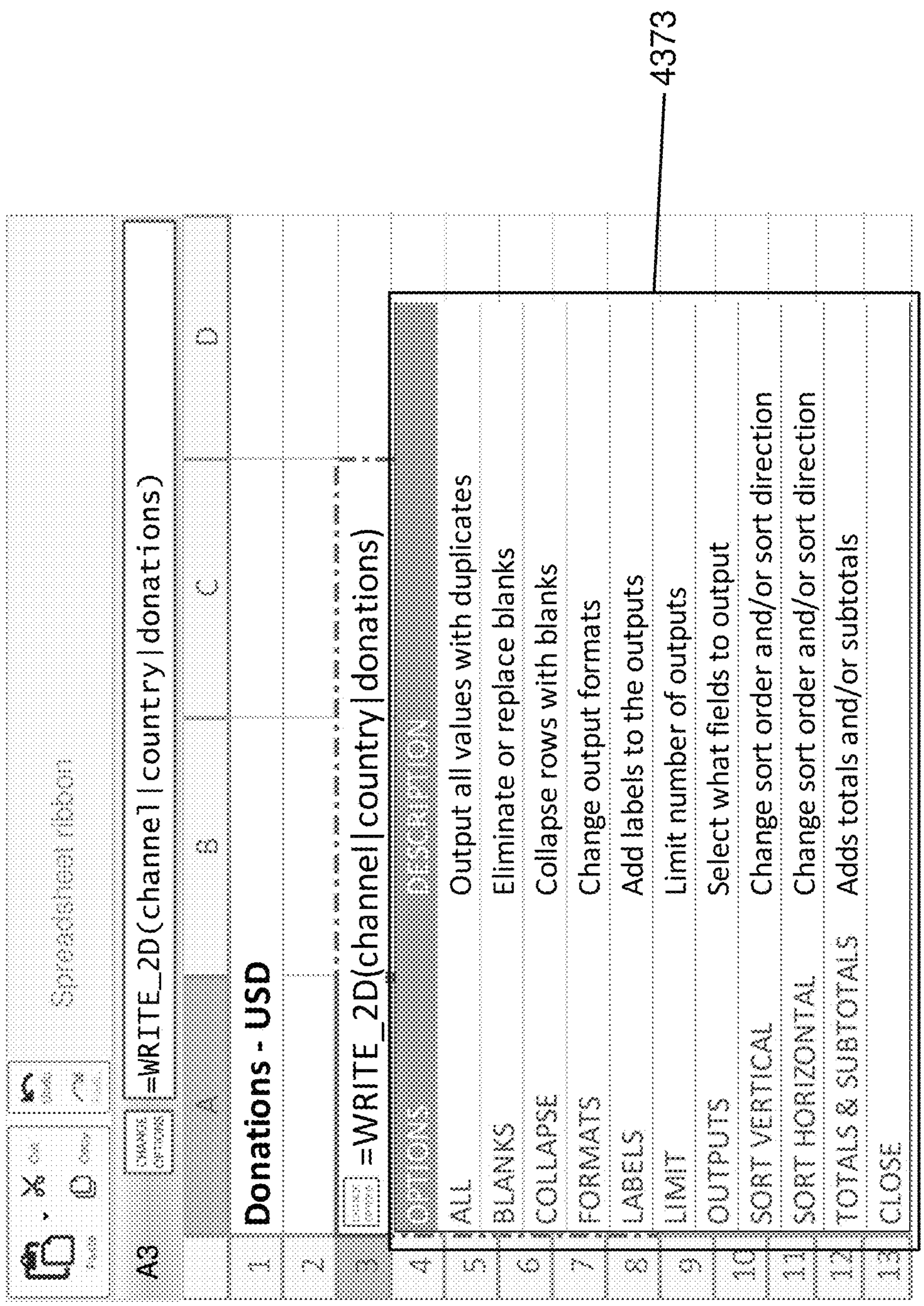
Figure 44B:
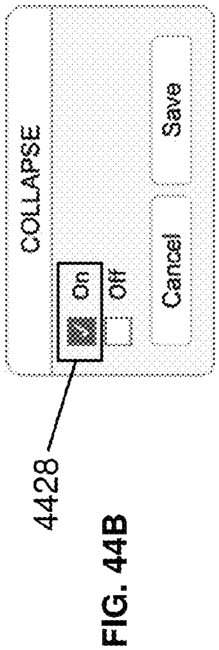
Figure 44C:
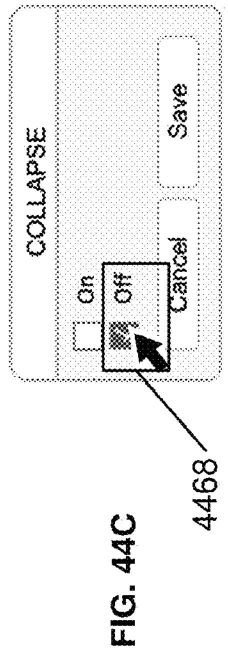
Figure 44D:
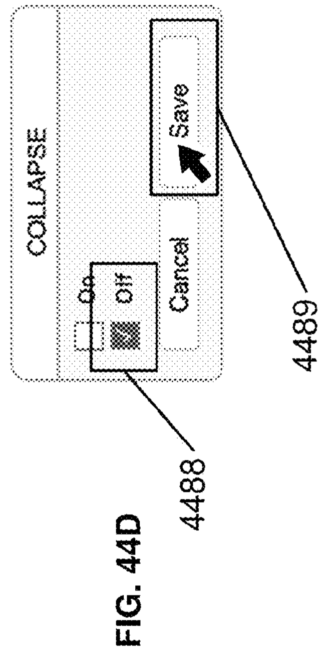
Figure 44A:
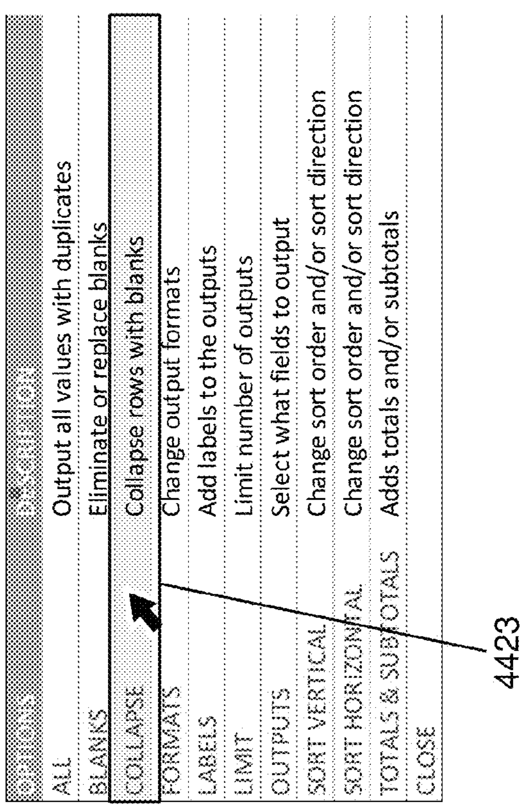
Figure 44E:
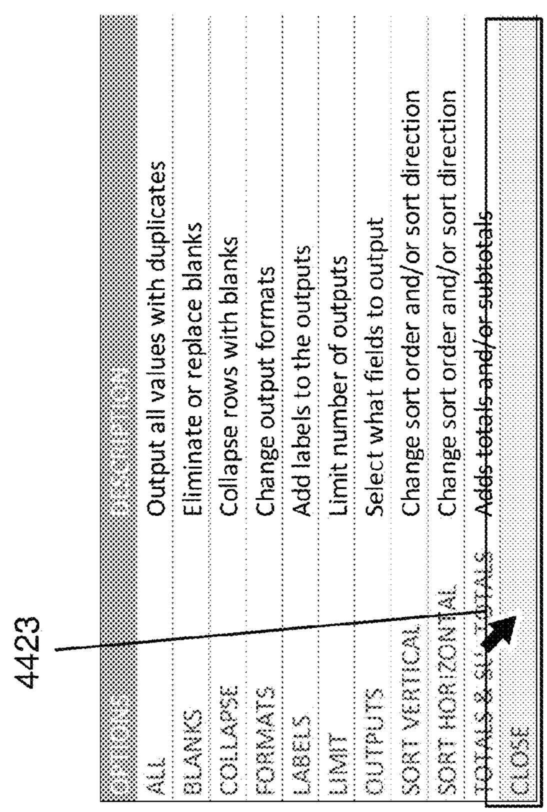
Figure 45B:
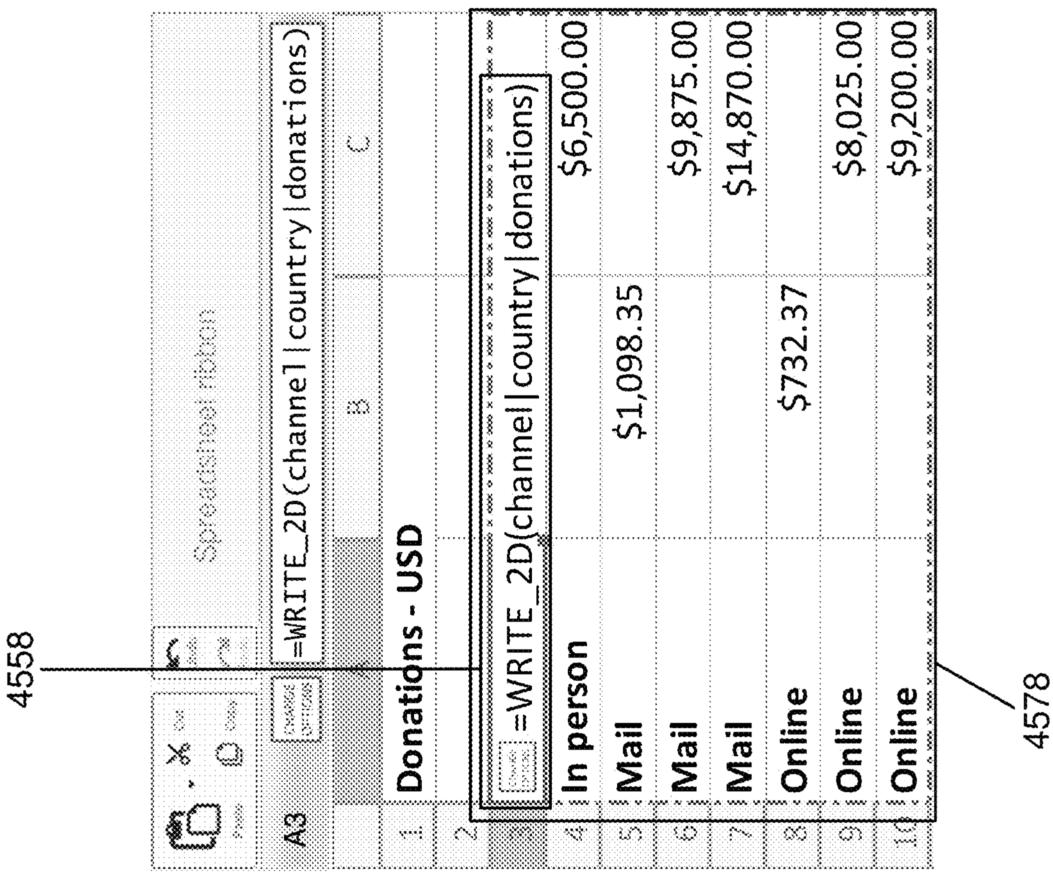
Figure 45A:
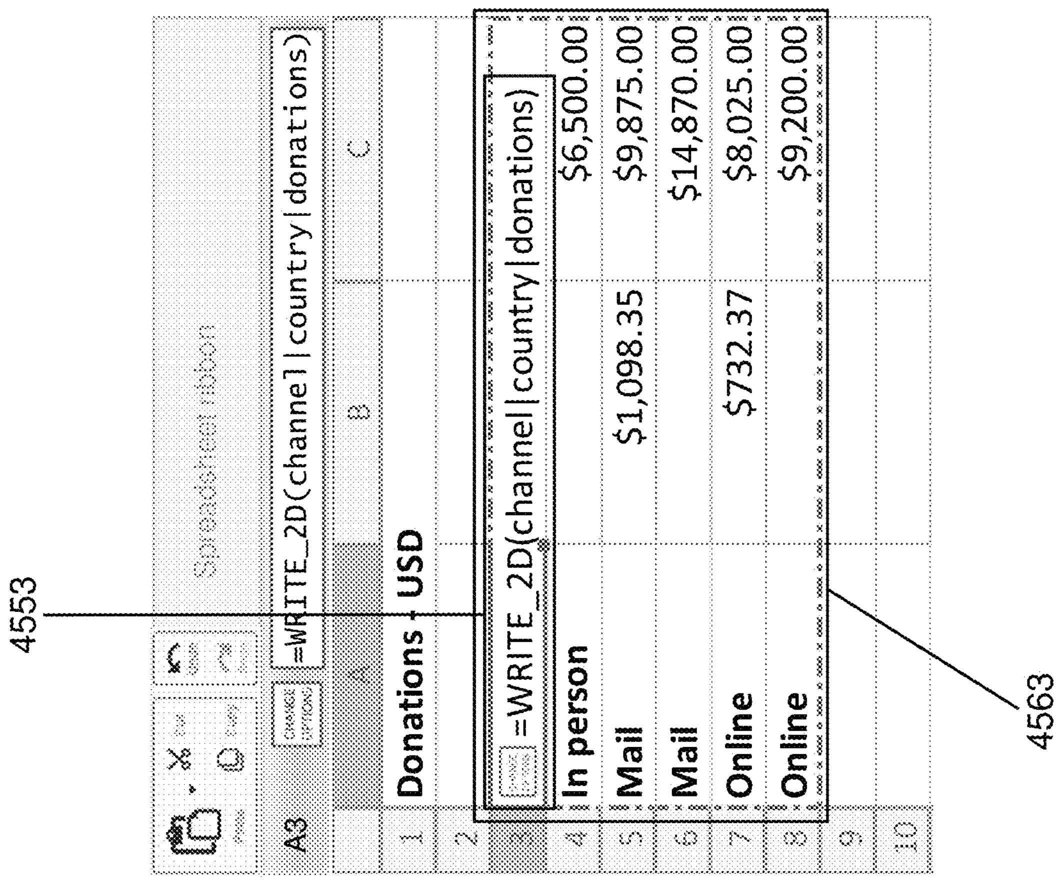

FIGS. 42A, 42B, 43, 44A, 44B, 44C, 44D, 44E, 45A and 45B example an embodiment of our technology where functions with invisible arguments trigger the appearance of a button to give users easy access for setting those capabilities (FIG. 45A and FIG. 45B can be compared with FIG. 41A and FIG. 41B and FIG. 11A and FIG. 11B for differences in our embodiments).

Figure 46:
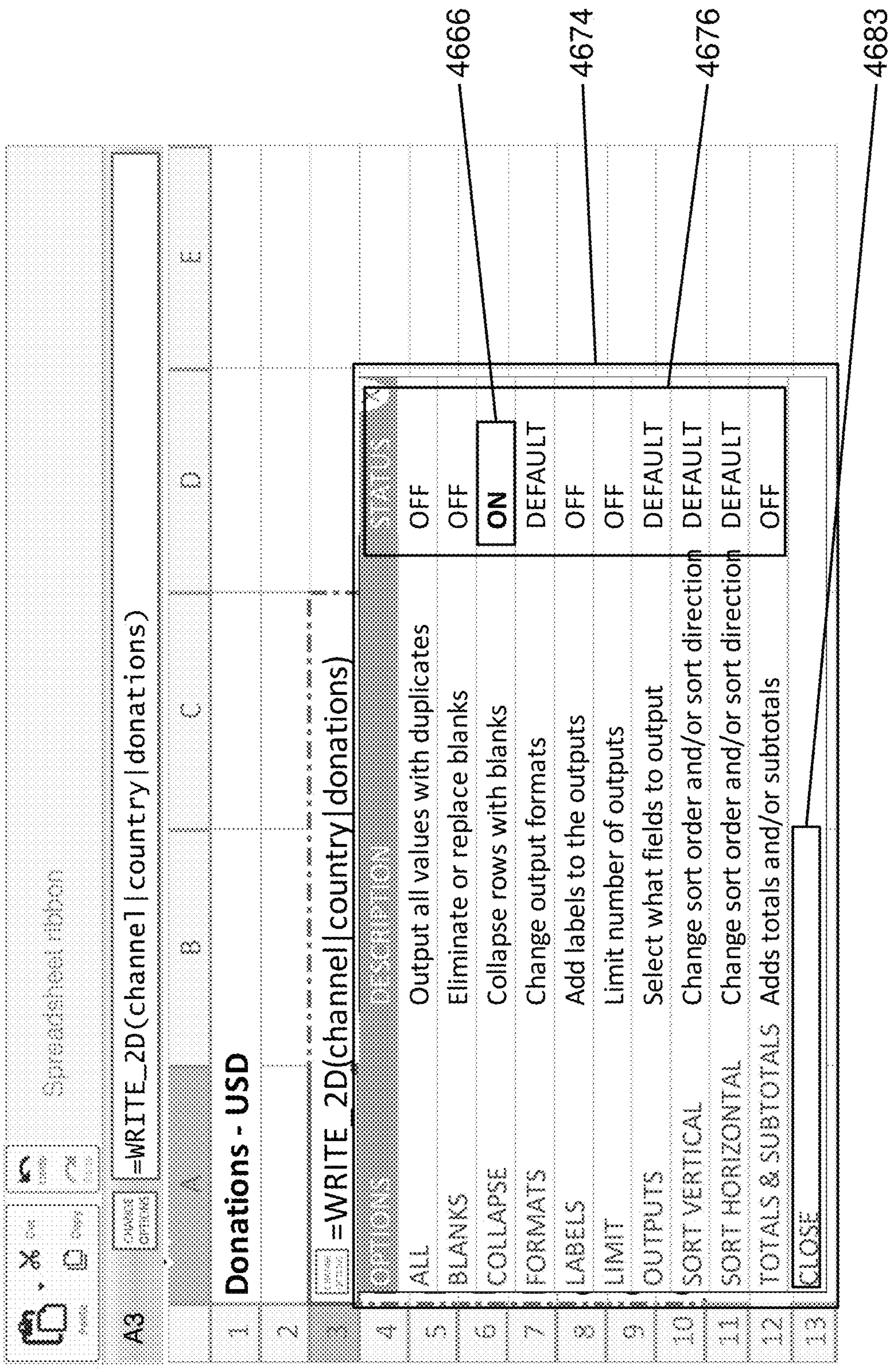

FIG. 46 examples another embodiment of our technology making more visible to the user the invisible capabilities or arguments via 'Status'.

FIGS. 47A, 47B, 48, 49A and 49B example the Microsoft Excel function Formula Builder access (through the formula bar $f_x$ button) and use (including its inability to use function argument specification lists).

Figure 50:
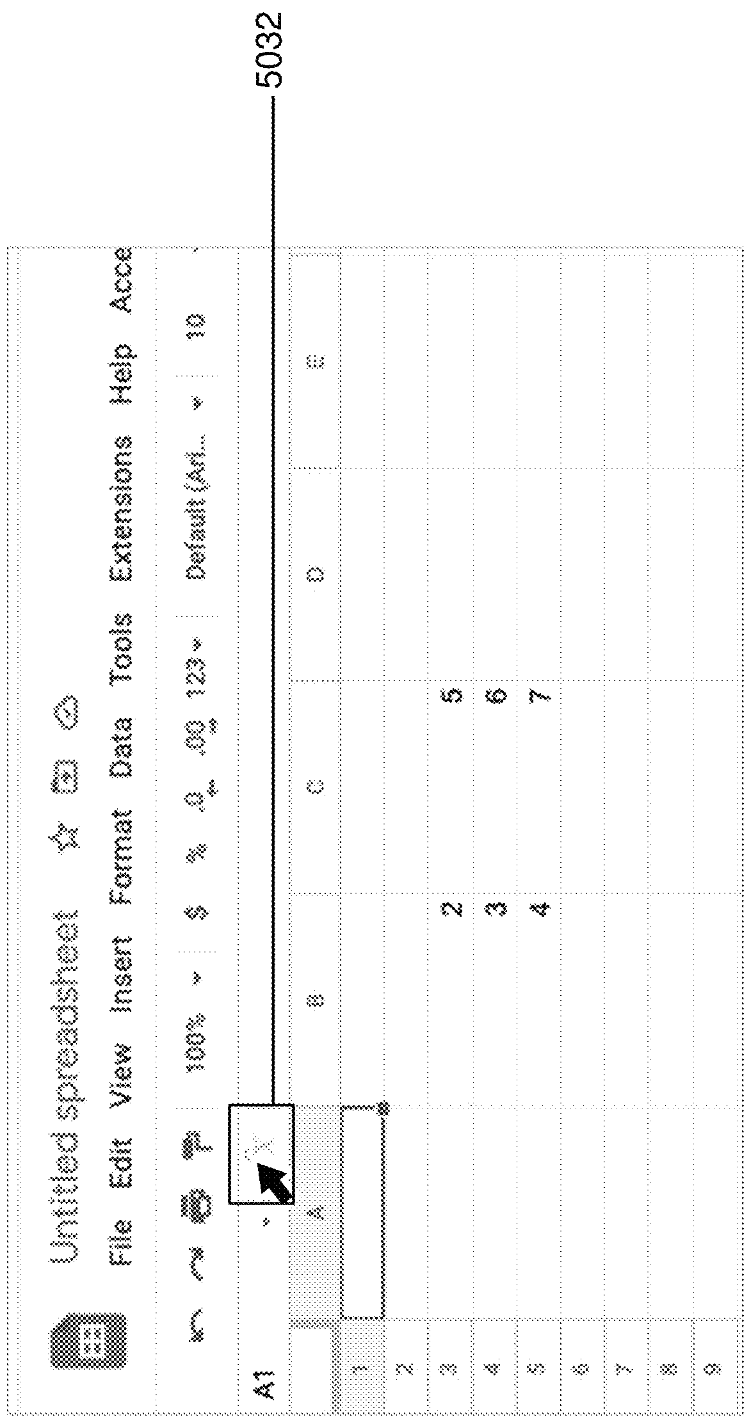

FIG. 50 examples that the $f_x$ in the Google Sheets formula bar is non-functioning and that it lacks a function Formula Builder.

FIGS. 51A, 51B, 52A, 52B, 52C, 52D 52E, 53A, 53B, 53C, 53D, 54A, 54B, 55A, 55B, 56A and 56B example an embodiment of our technology that automatically propagates related argument changes (for BLANK specifications).

Figure 55A:
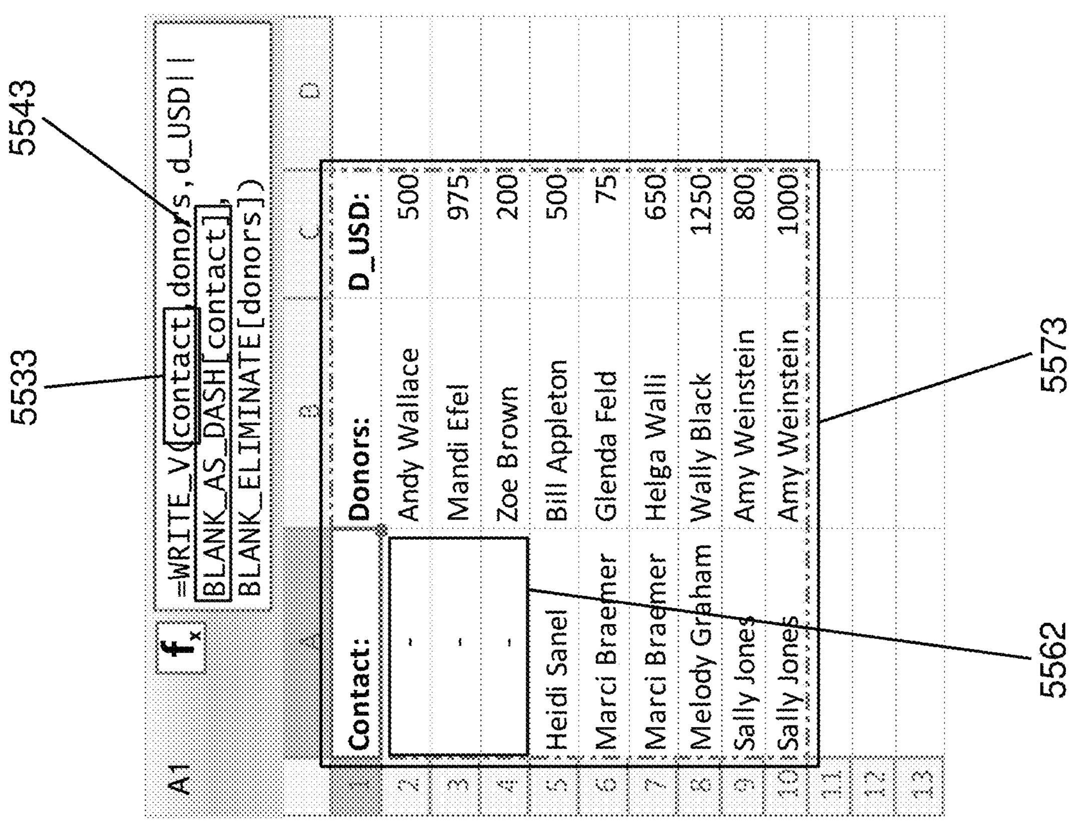
Figure 55B:
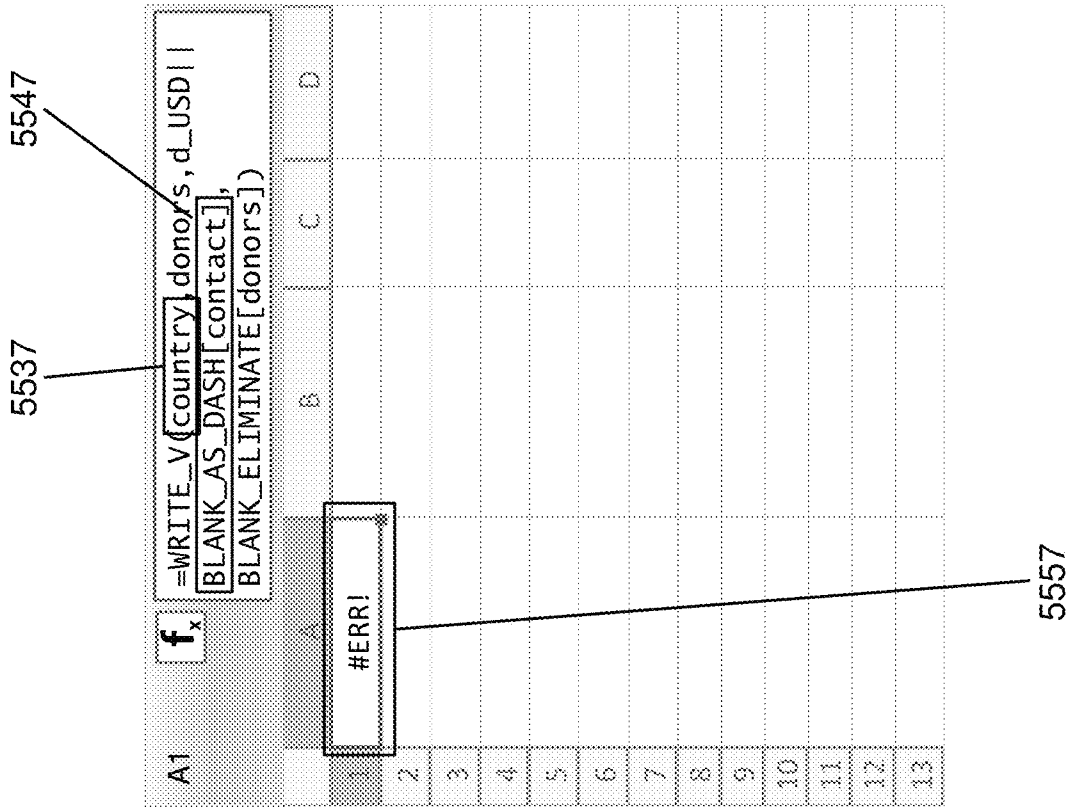
Figure 56B:
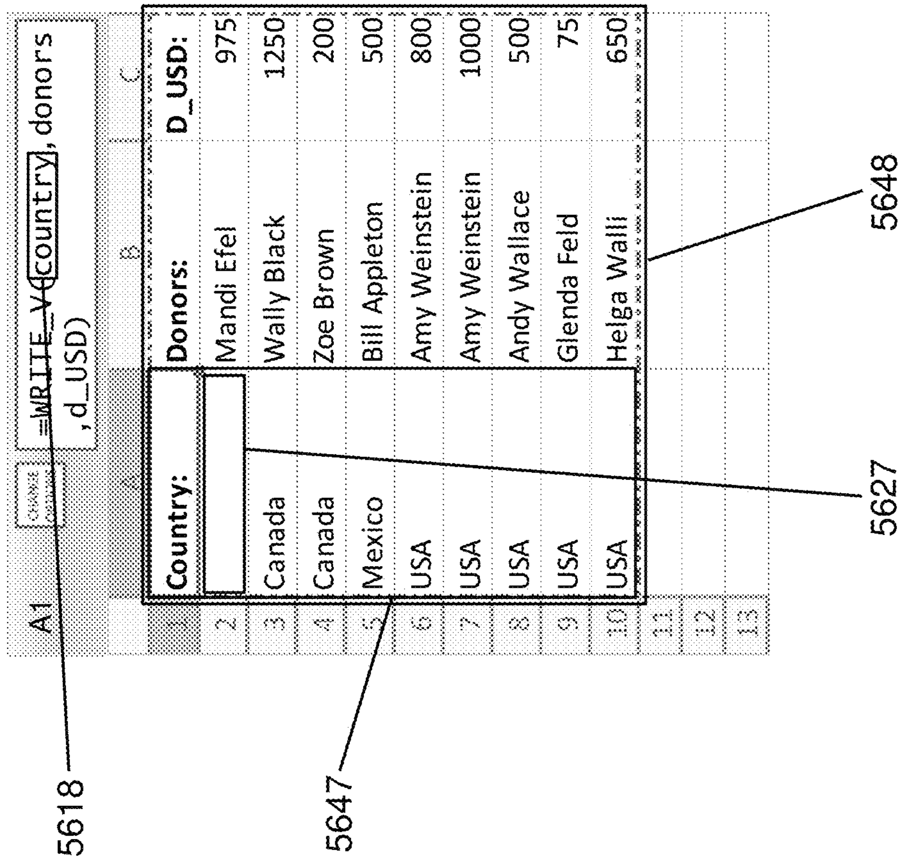
Figure 56A:
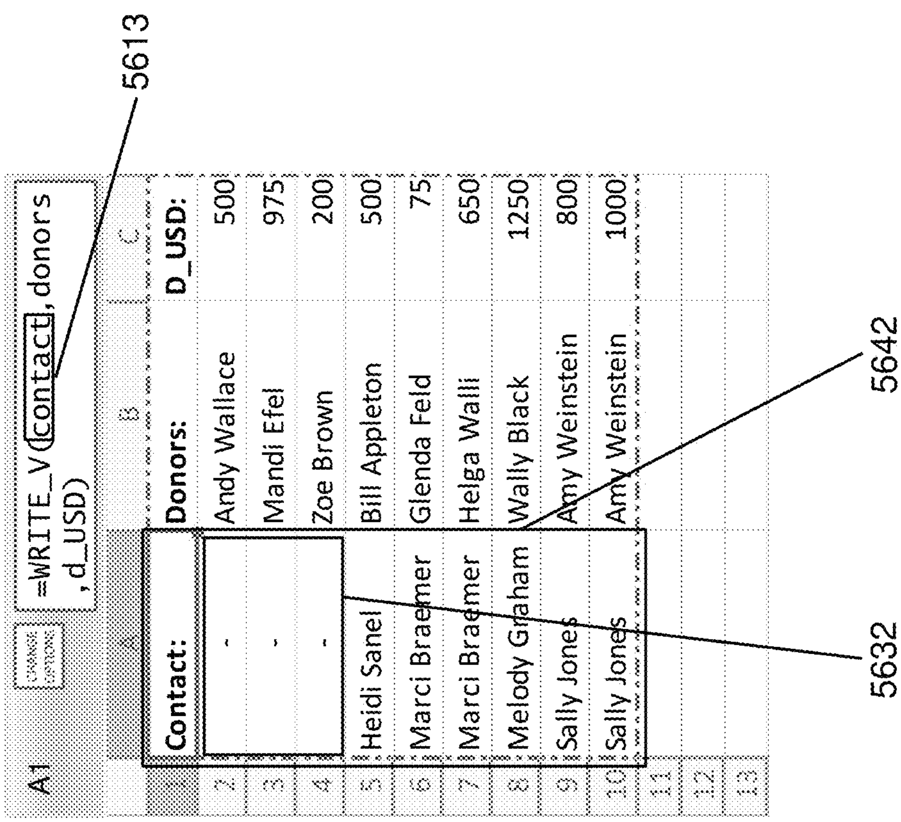
Figure 57:
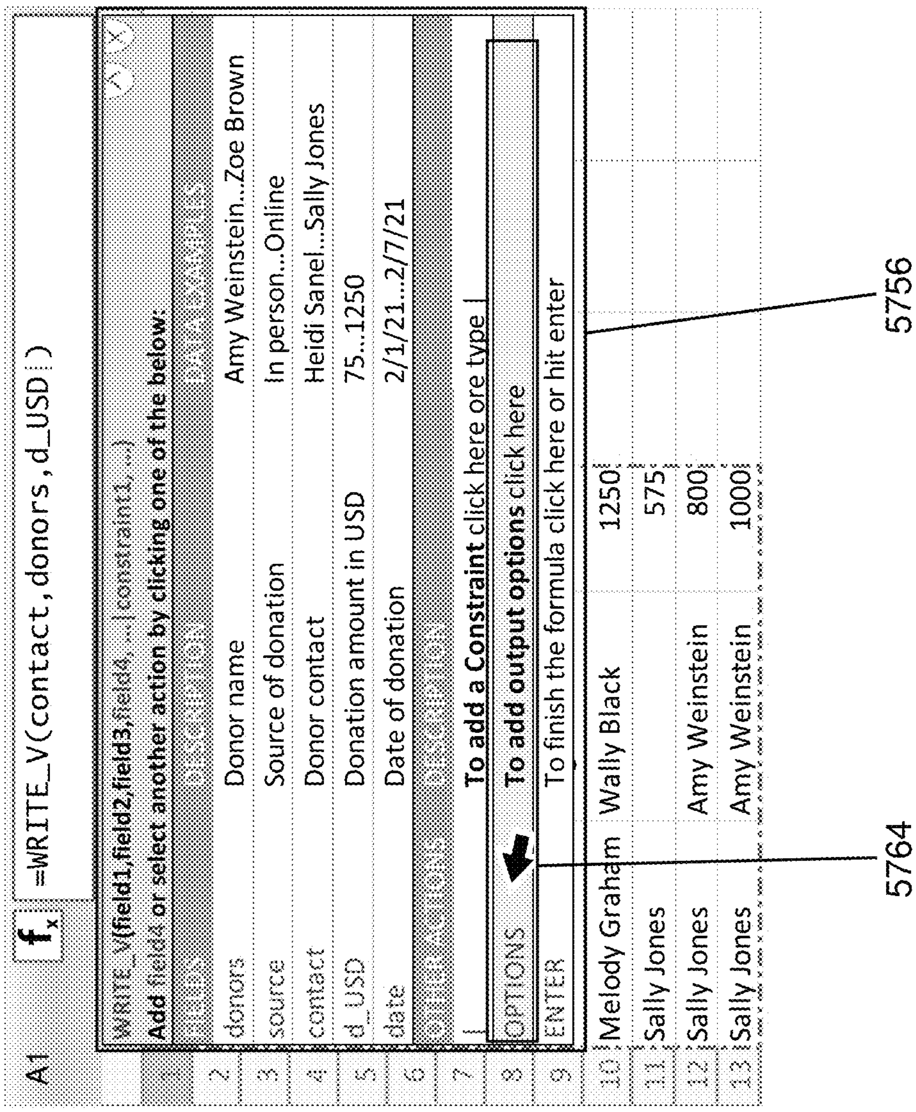

FIG. 57 examples an embodiment where the capabilities shown in FIG. 51A through FIG. 56B are accessed via our HINTs UIs.

FIGS. 58A, 58B, 59A, 59B, 60A, 60B, 61A, 61B, 62A and 62B example manual conversion of traditional cell formats to function control.

Figure 63A:
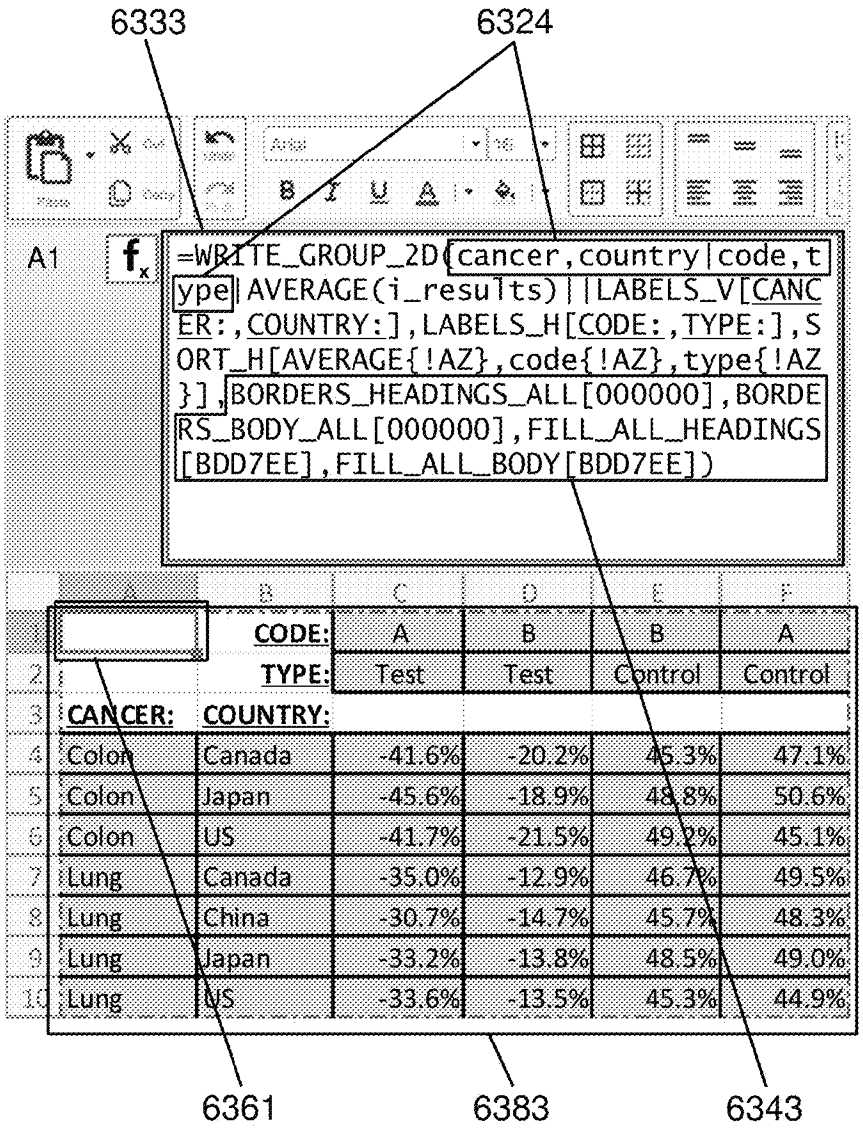
Figure 63B:
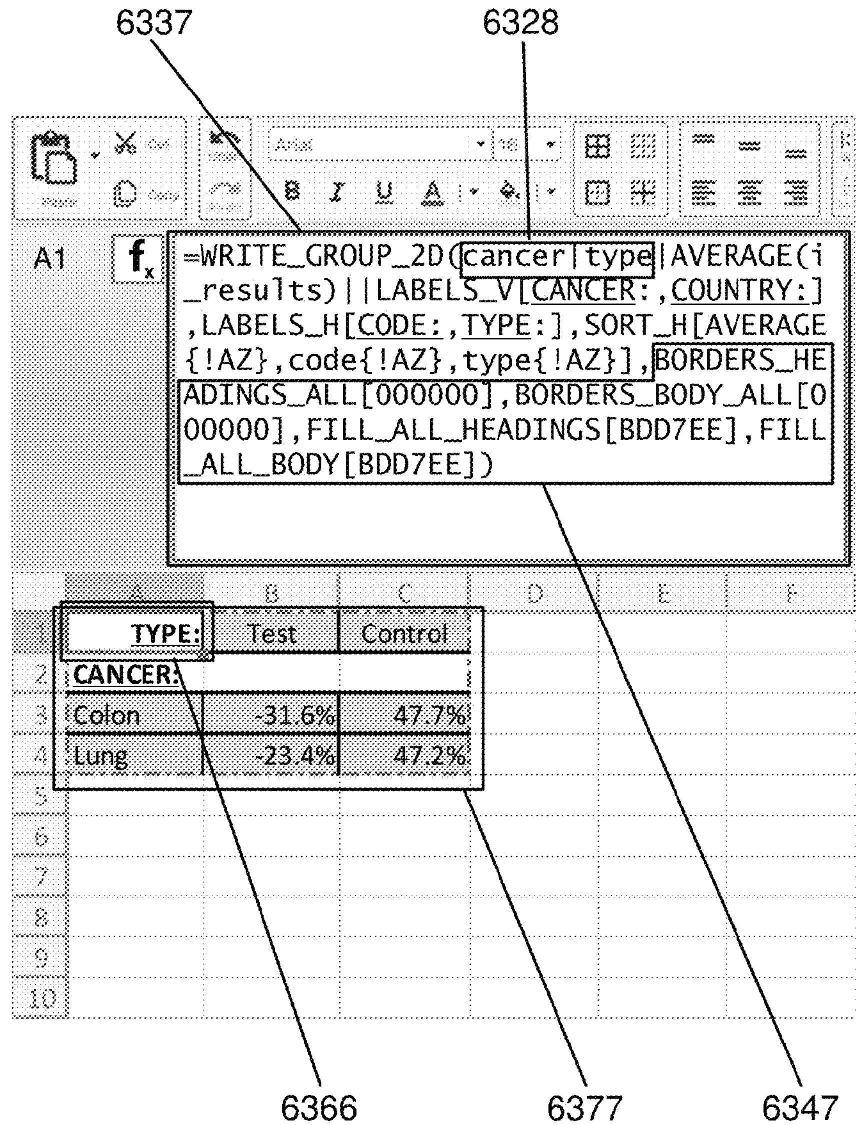

FIG. 63A and FIG. 63B example our 'WRITE' function (with all visible arguments) controlling the formats as other specifications are changed.

Figure 64B:
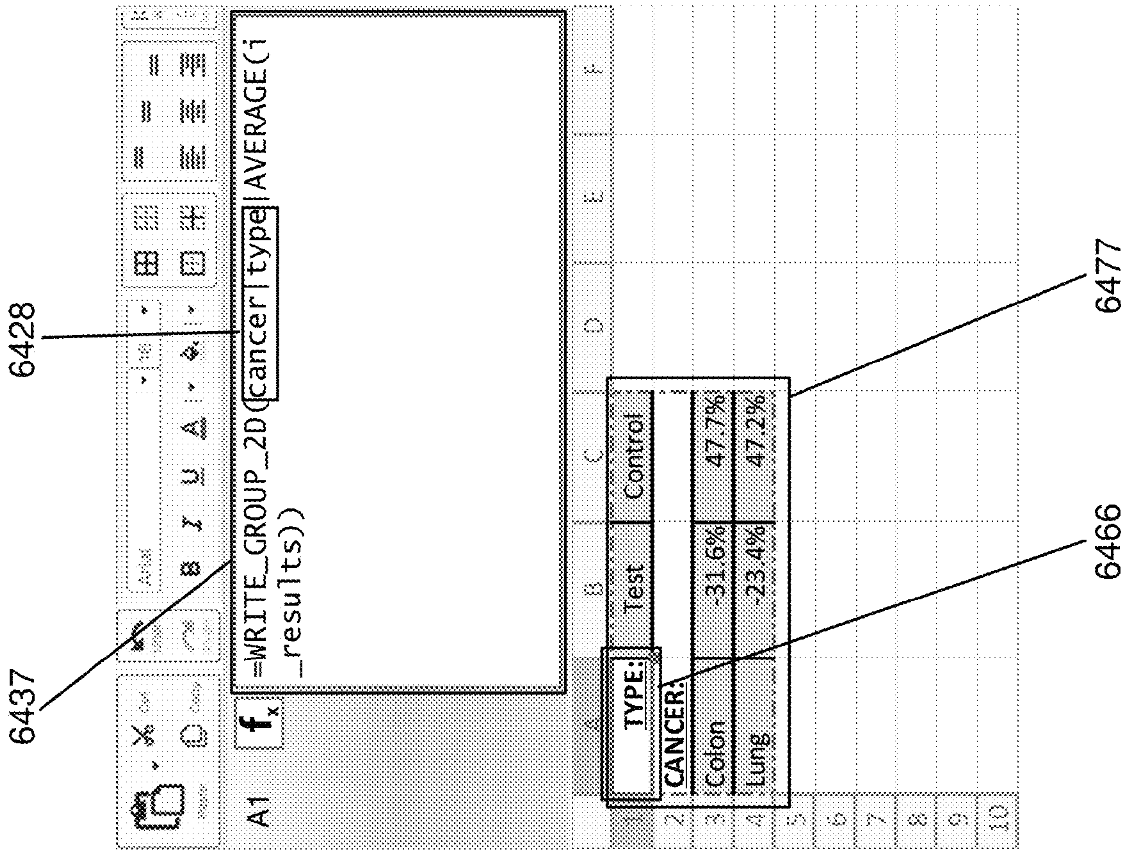
Figure 64A:
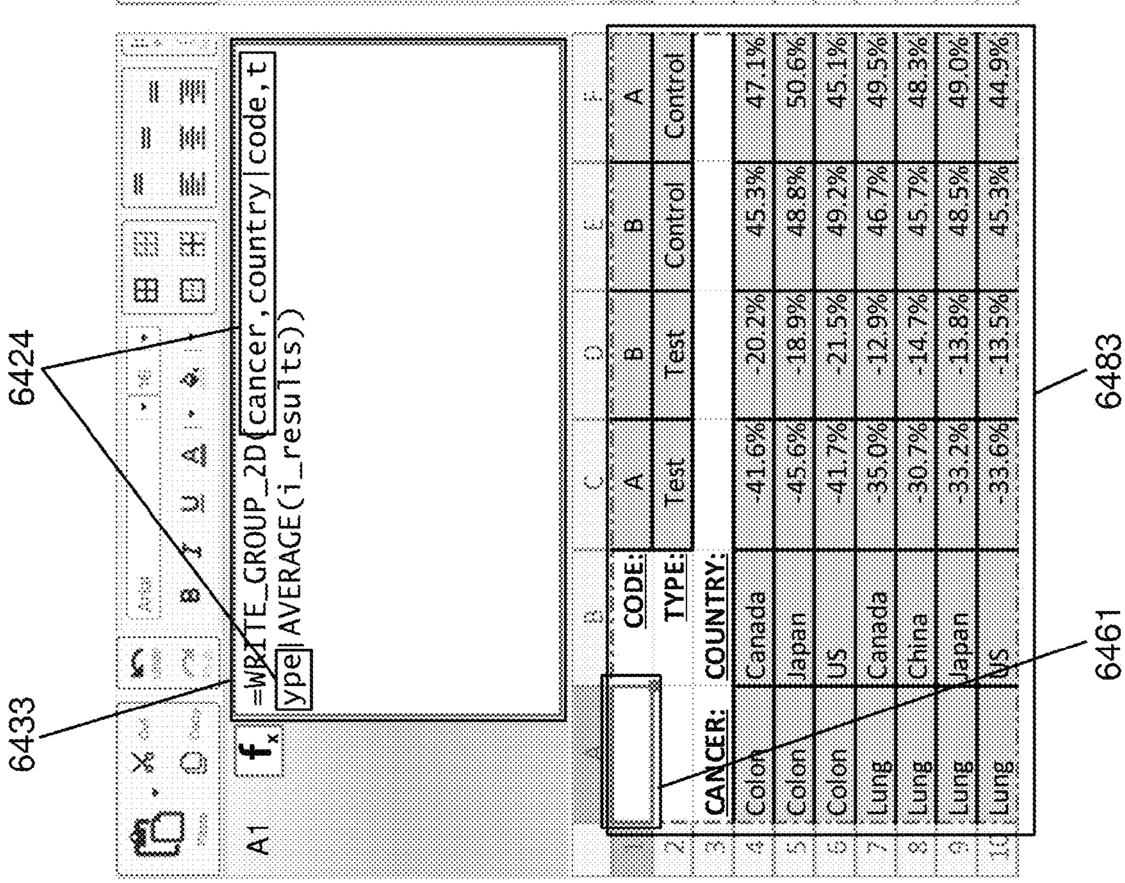

FIG. 64A and FIG. 64B example our 'WRITE' function (with some invisible arguments) controlling the formats as other specifications are changed.

Figure 65A:
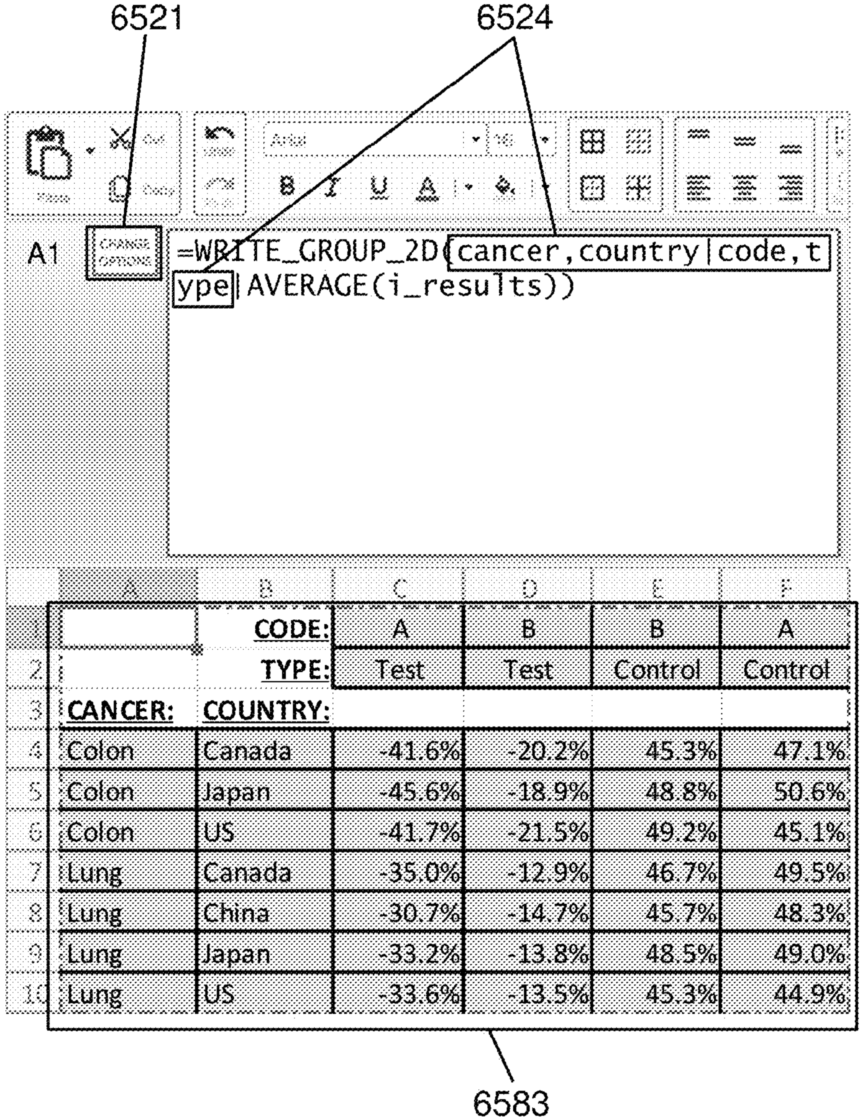
Figure 65B:
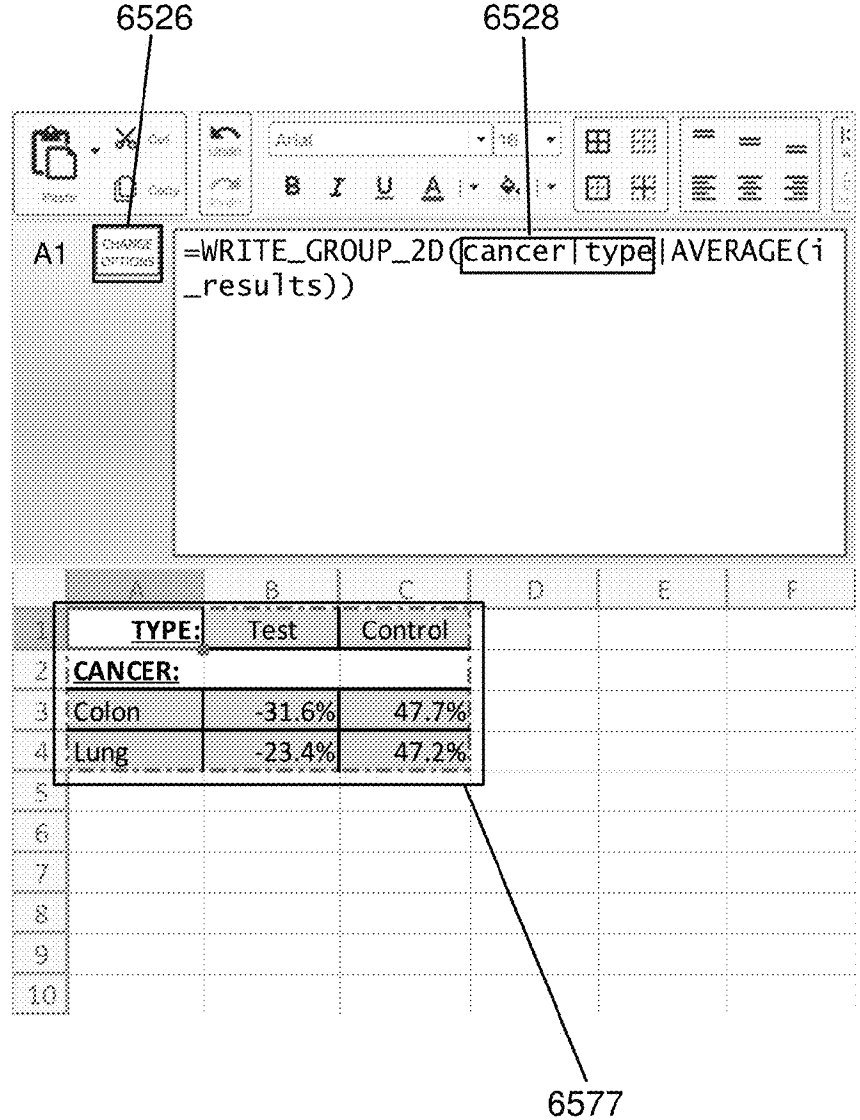

FIG. 65A and FIG. 65B example our 'WRITE' function (with some invisible arguments) supported by button list access controlling the formats as other specifications are changed.

Figure 66B:
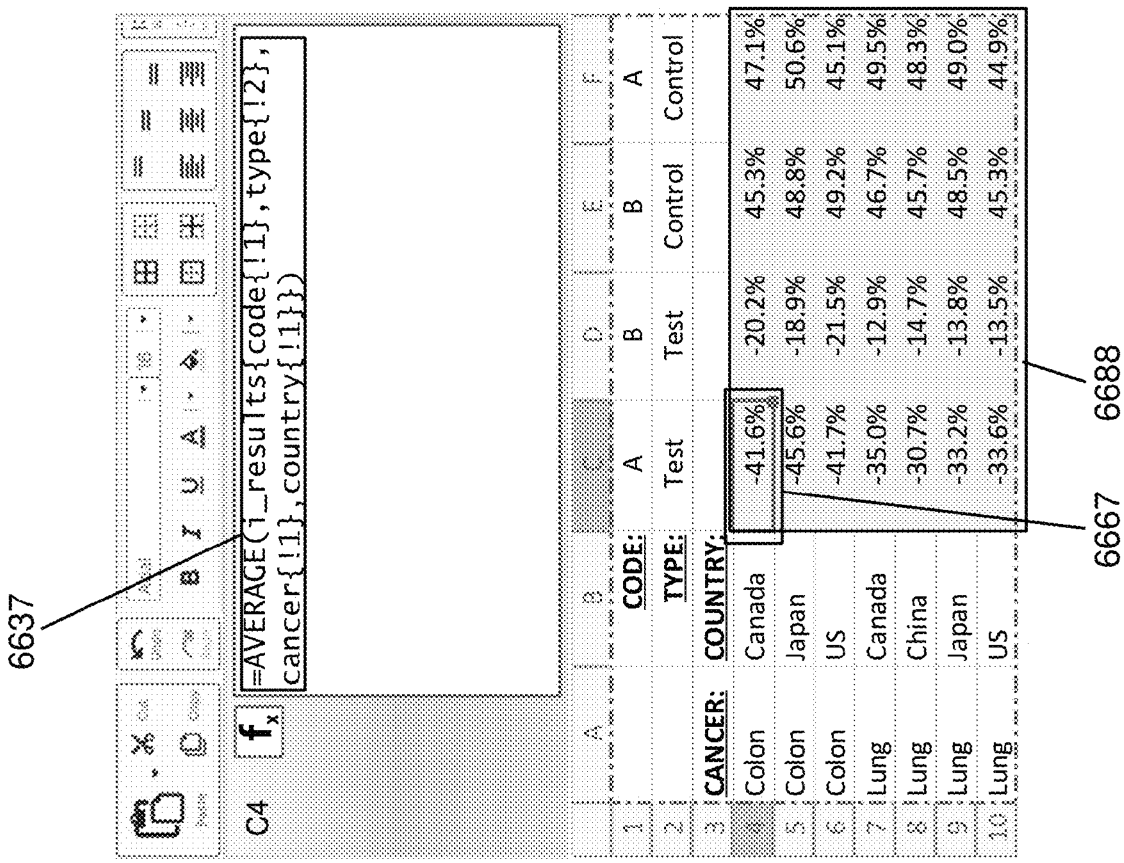
Figure 66A:
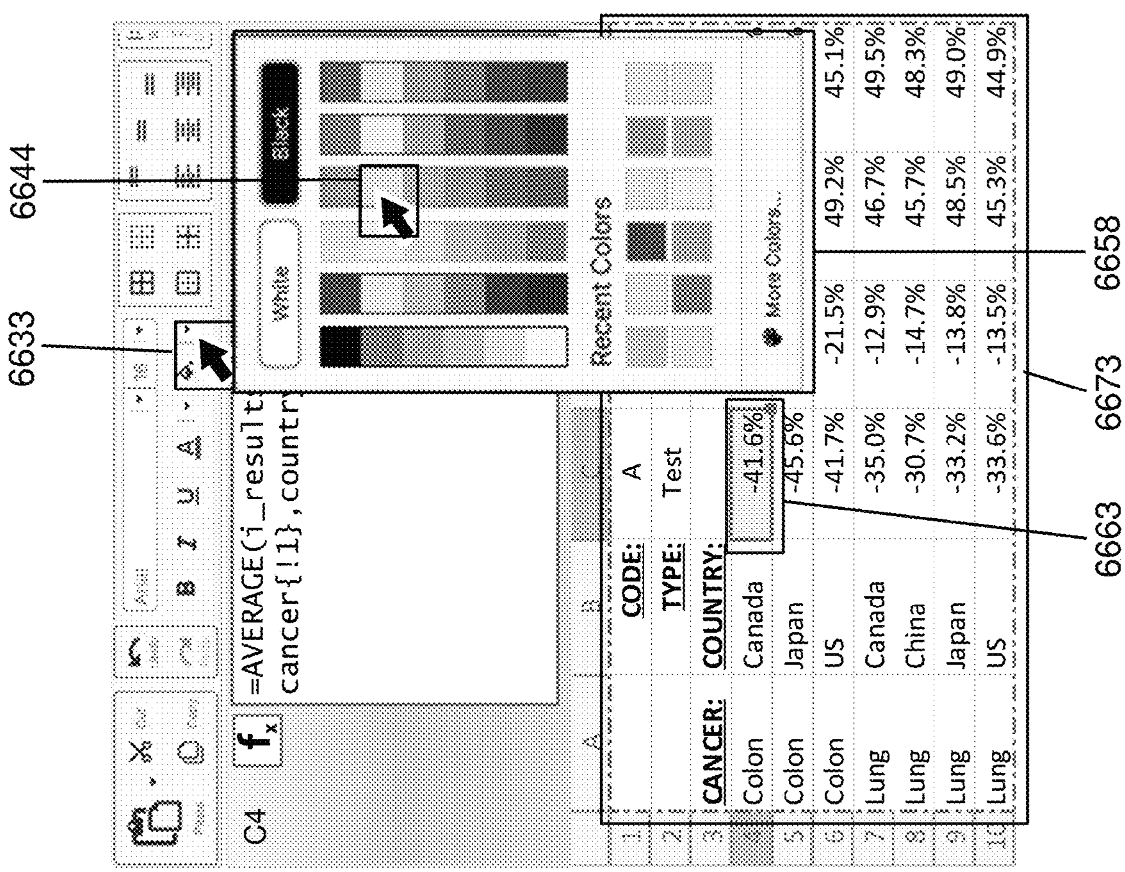

FIG. 66A and FIG. 66B example our auto conversion of cell formatting to function-controlled formats.

Figure 67B:
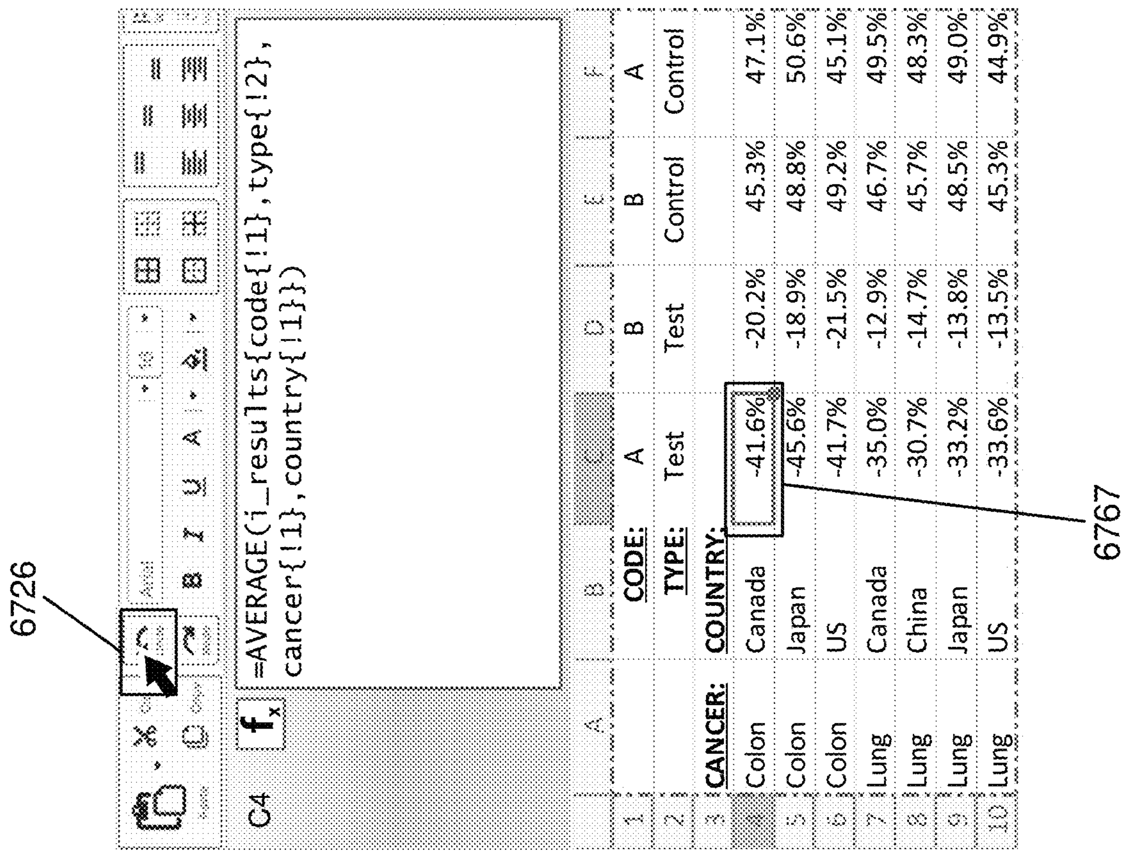
Figure 67A:
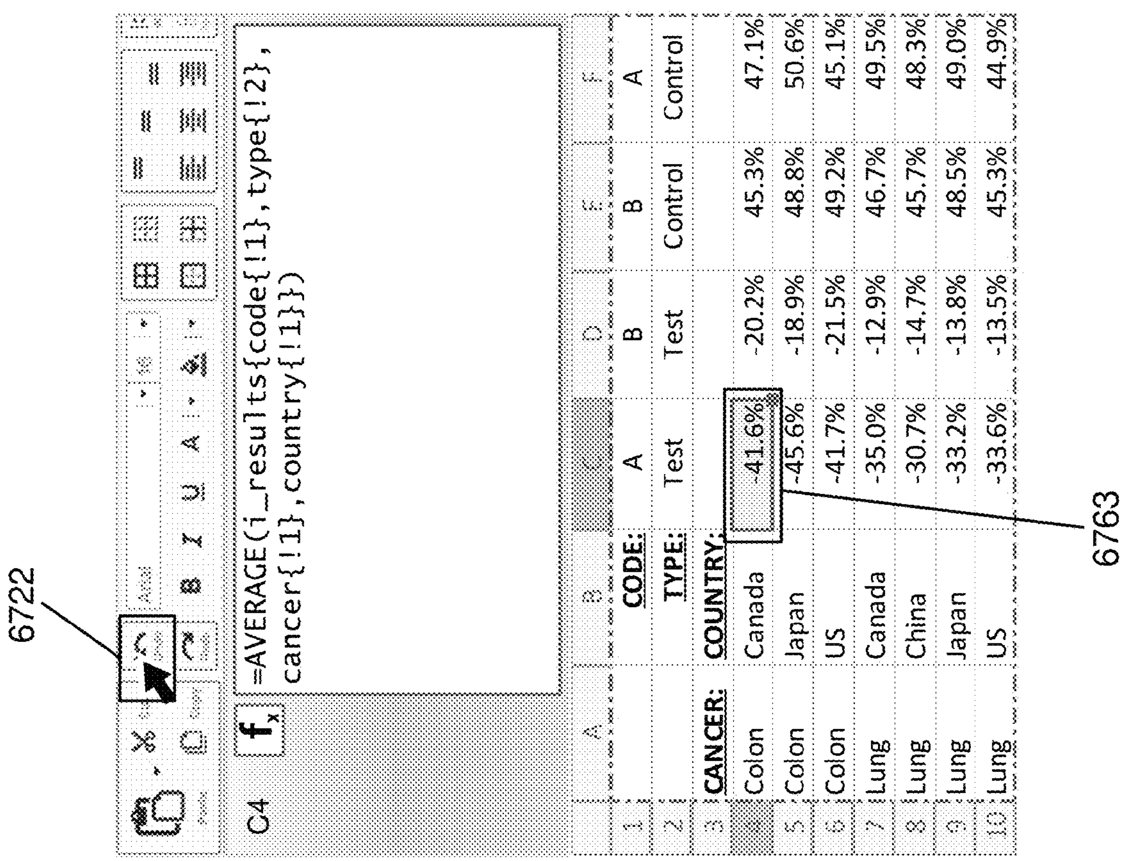

FIG. 67A and FIG. 67B examples UNDO use to change the number of cells auto converted to function formatting and additional use to remove the function control.

Figure 68A:
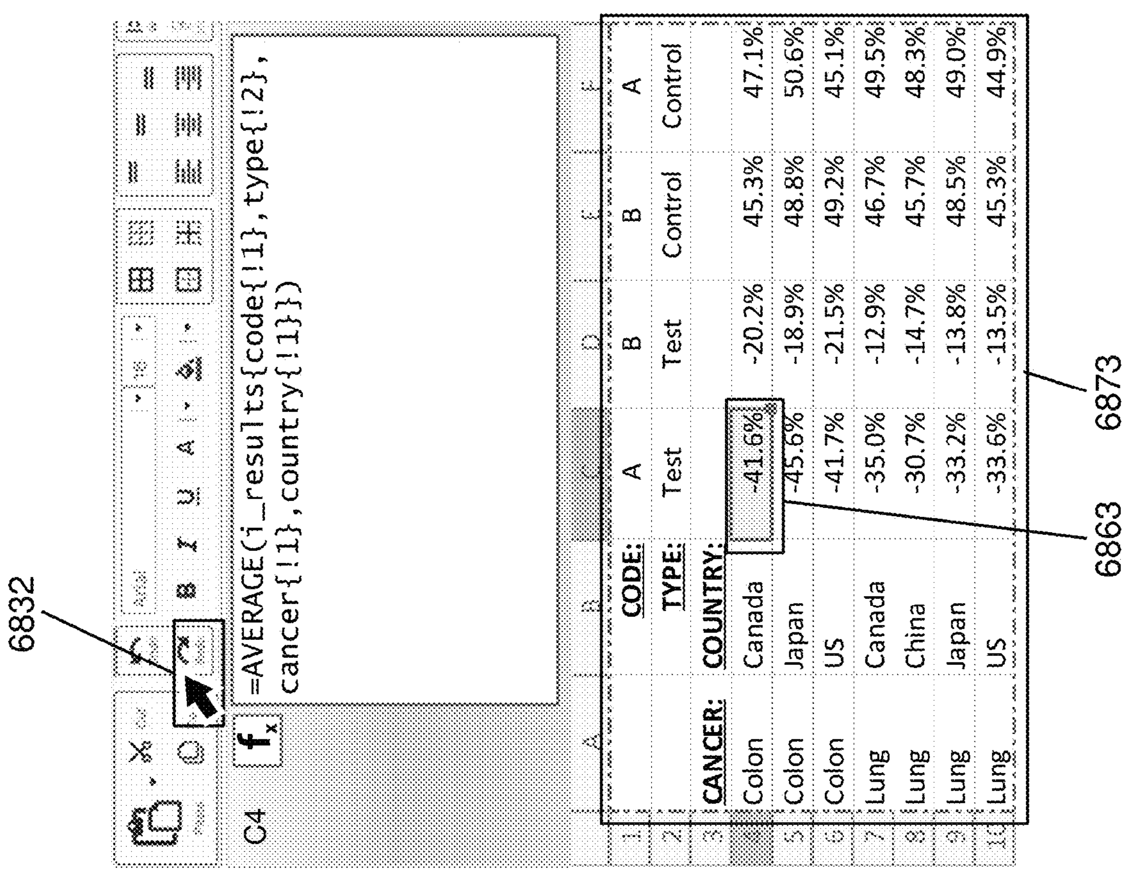
Figure 68B:
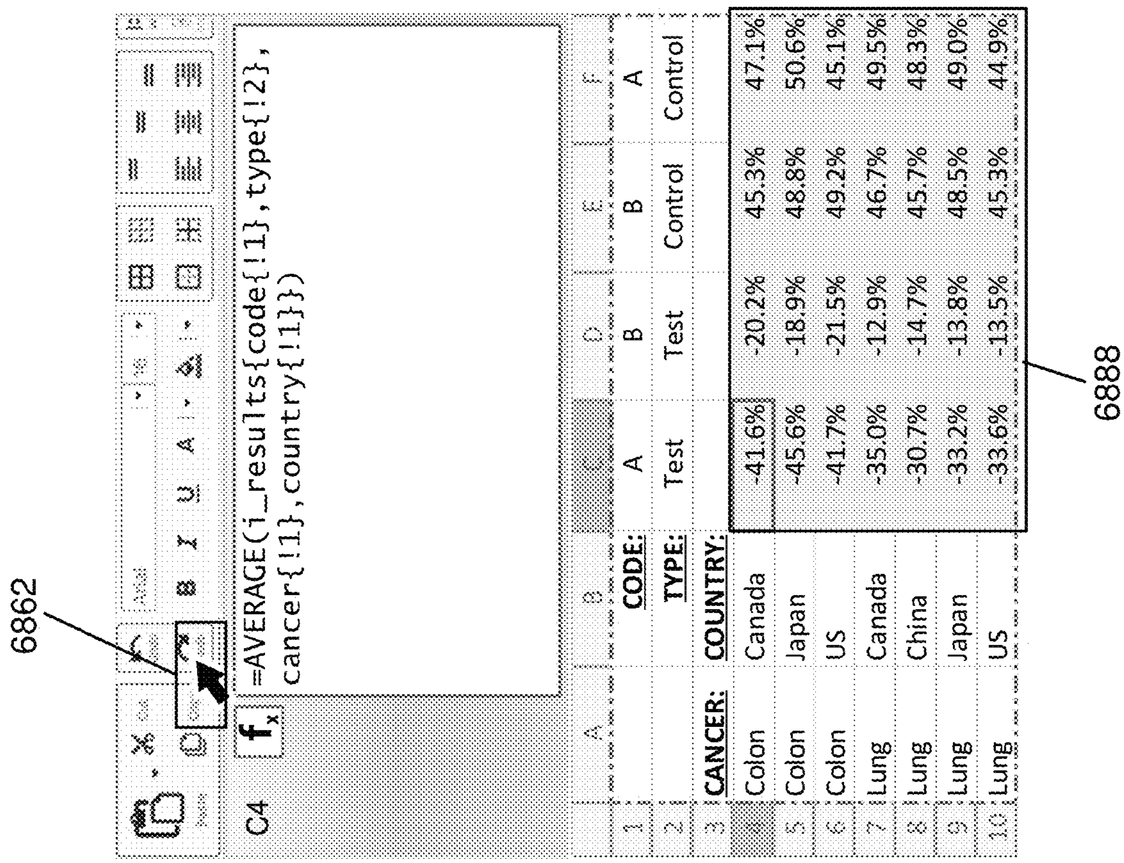

FIG. 68A and FIG. 68B example the re-instantiation of auto converted formatted cell(s) using REDO and additional use to re-expand its use.

Figure 69B:
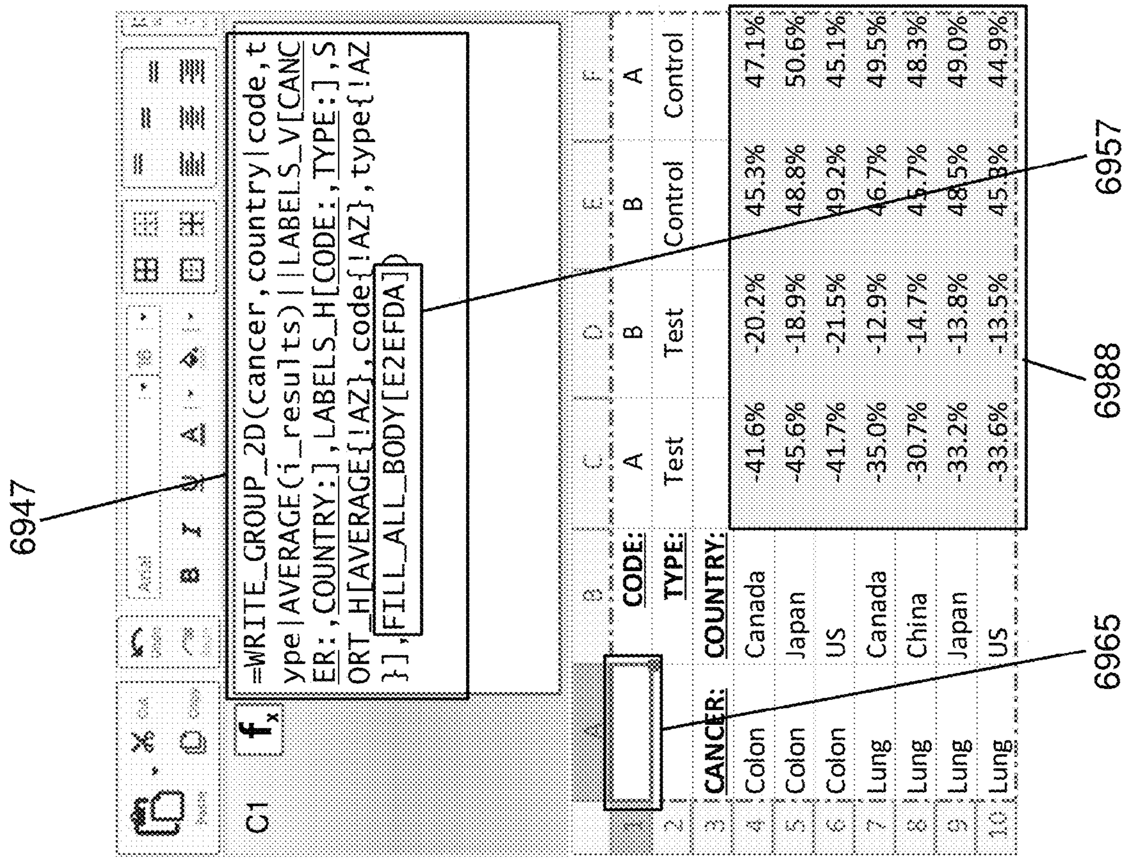
Figure 69A:
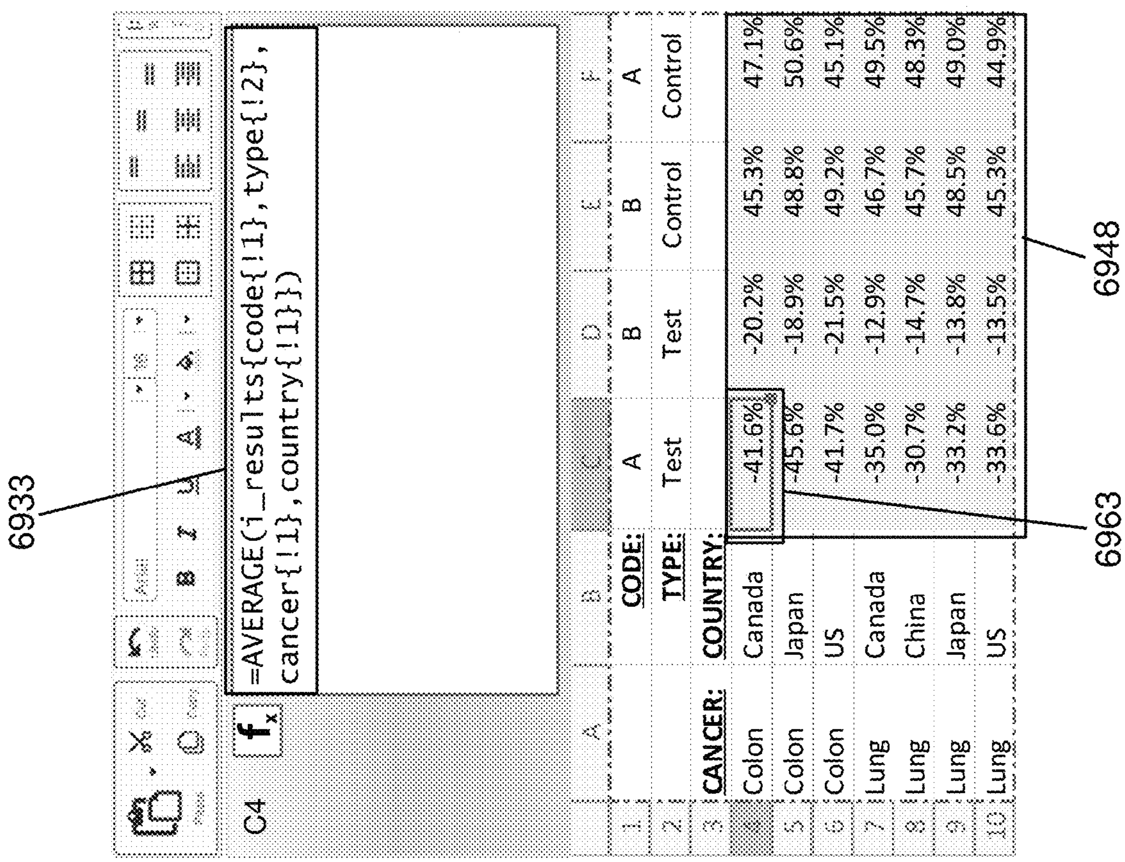

FIG. 69A and FIG. 69B example the result of auto conversion of cell formatting to function-controlled formats in a function with all visible arguments.

Figure 70A:
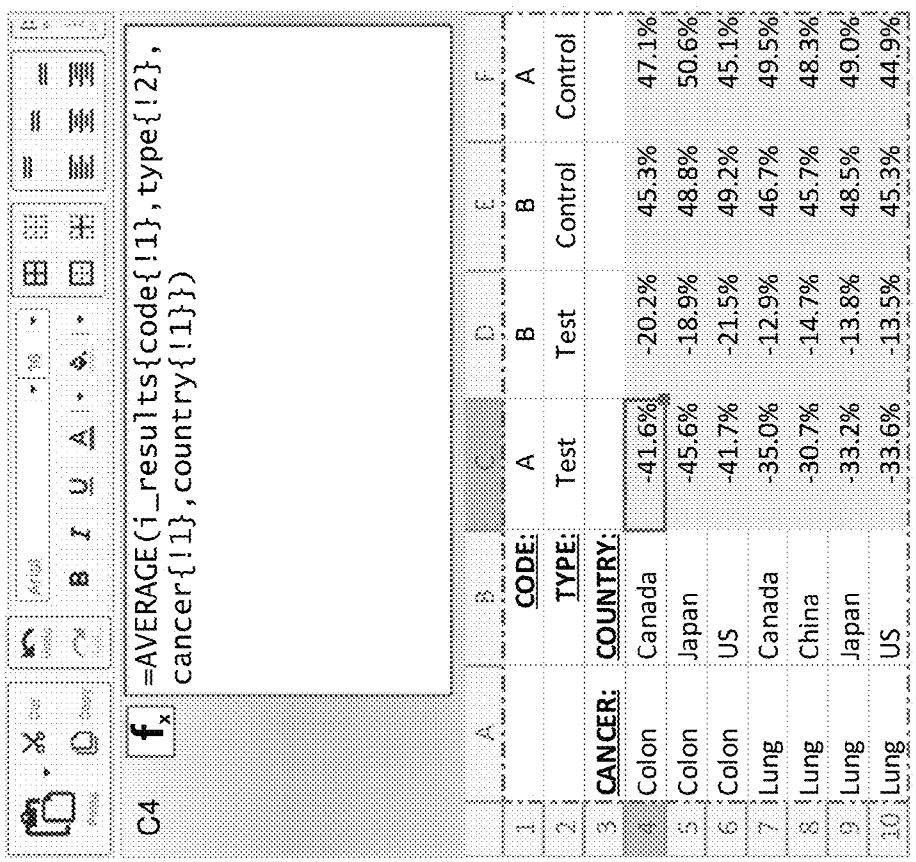
Figure 70B:
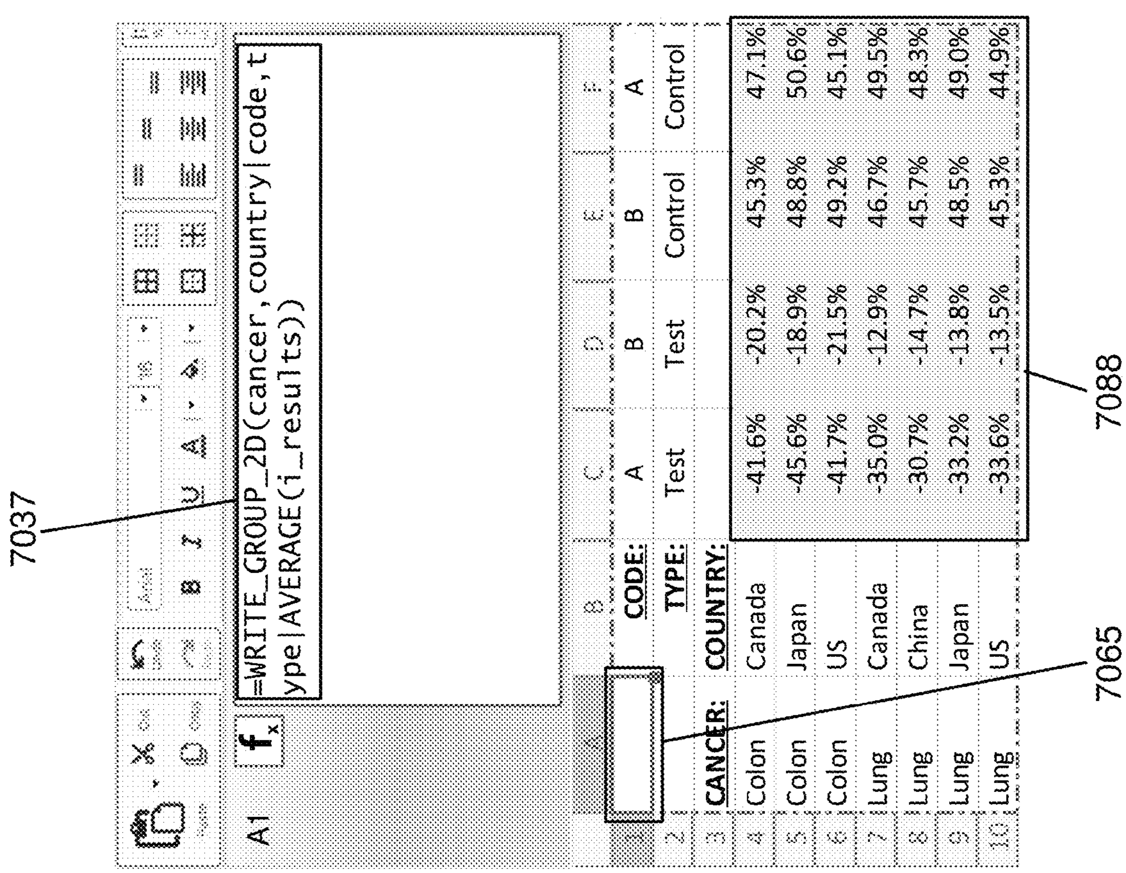

FIG. 70A and FIG. 70B example the result of auto conversion of cell formatting to function-controlled formats in a function with invisible formatting arguments.

Figure 71B:
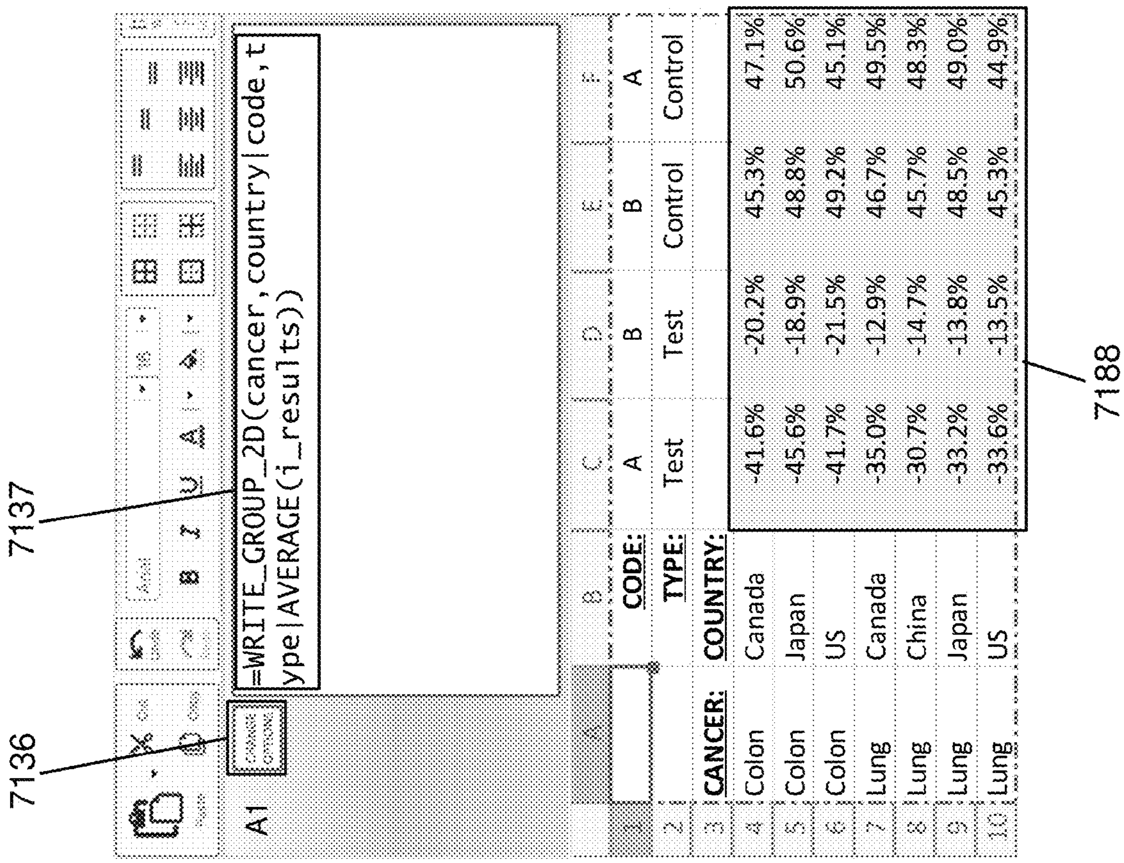
Figure 71A:
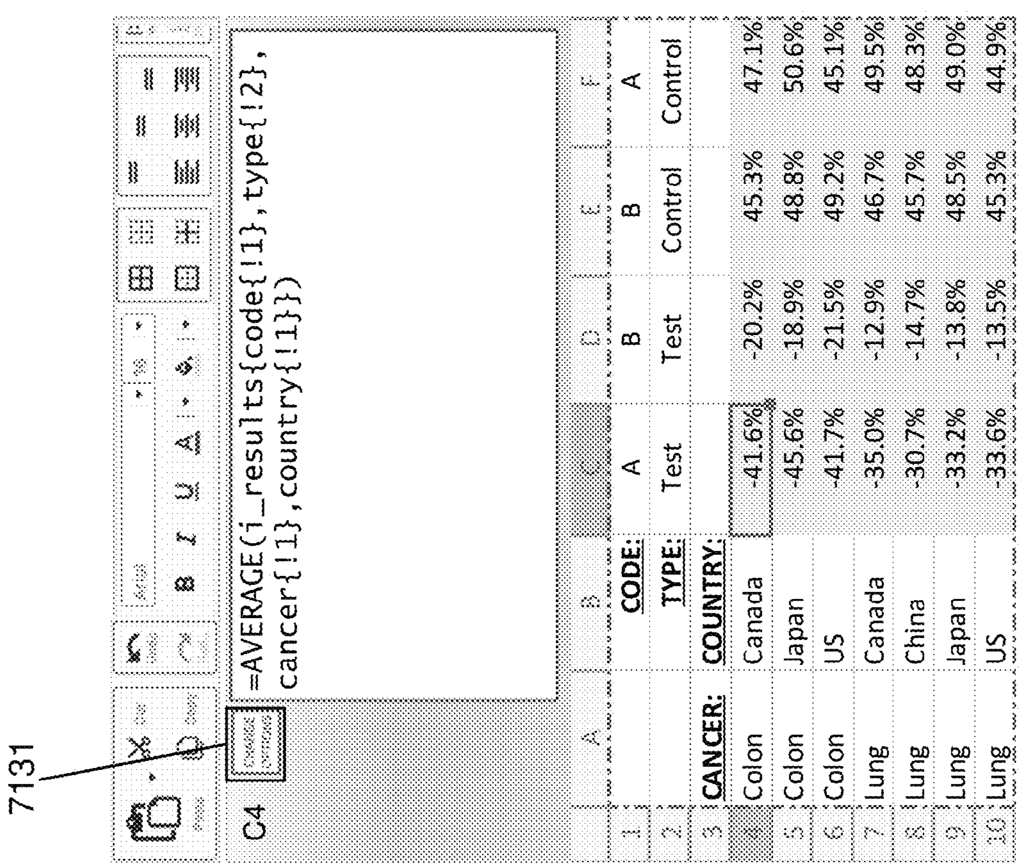

FIG. 71A and FIG. 71B examples our auto conversion of cell formatting to function-controlled formats in a function working in combination with our button accessible formatting options.

FIGS. 72A, 72B, 73A, 73B, 74A, 74B and 75 example the addition of more function-controlled formats (e.g., font color, italics and an additional fill color) using our auto conversion and auto expansion of cell formatting to function-controlled formats.

Figure 76B:
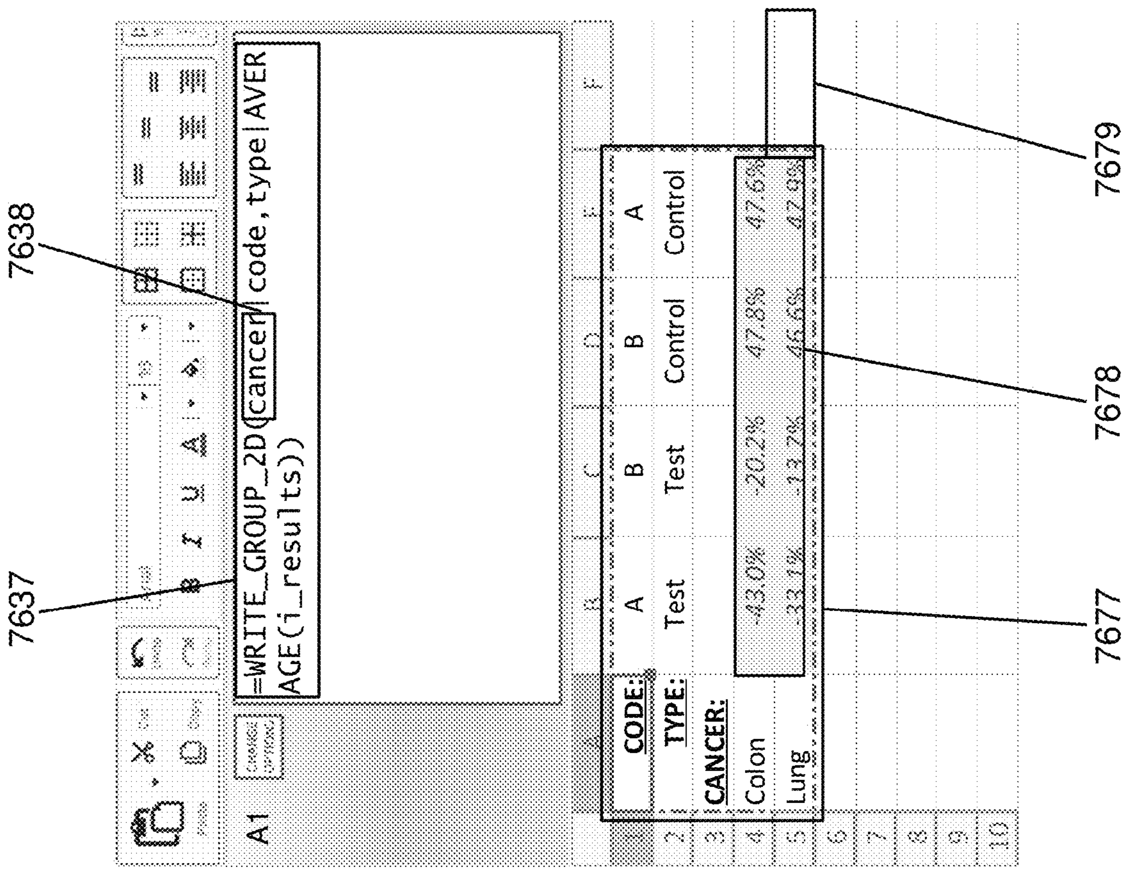
Figure 76A:
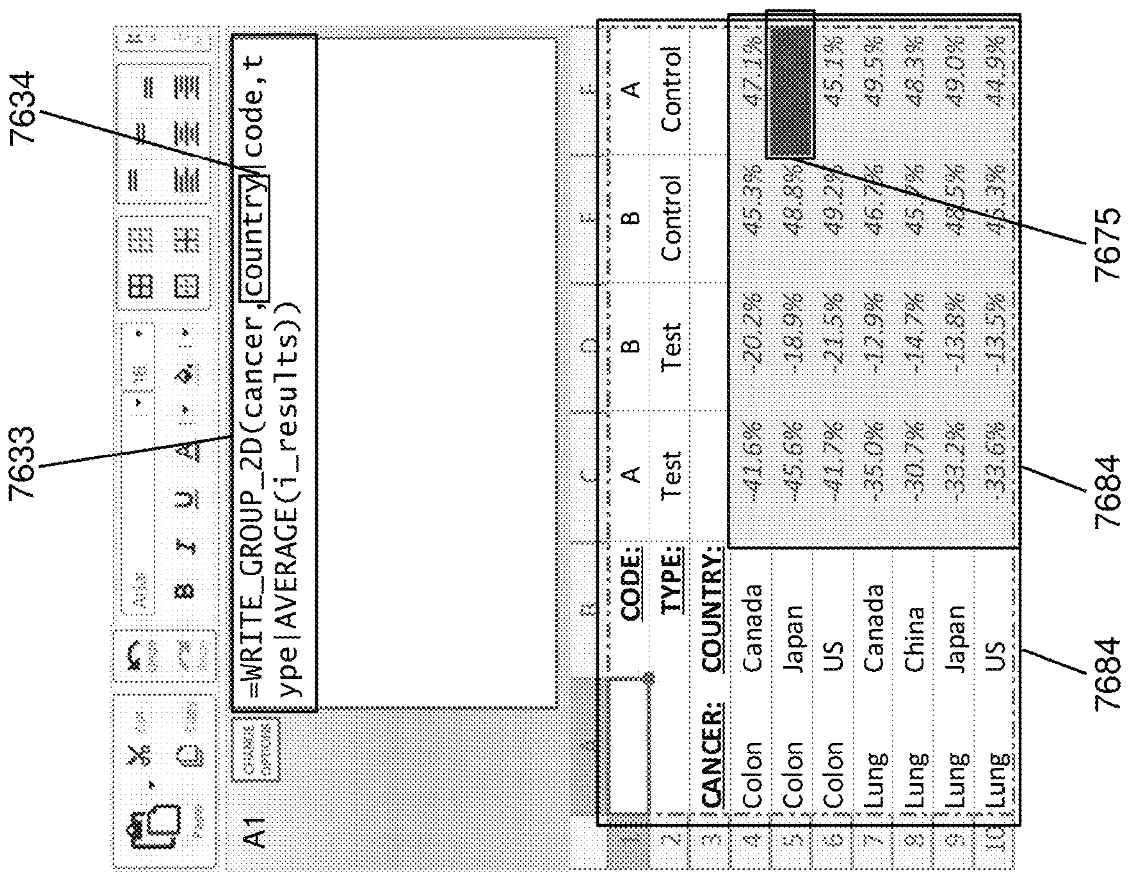

FIG. 76A and FIG. 76B example the spreadsheet function specified formatting automatically flexing its propagation with changes in the instantiation of the function formula for a function with invisible formatting arguments.

Figure 77B:
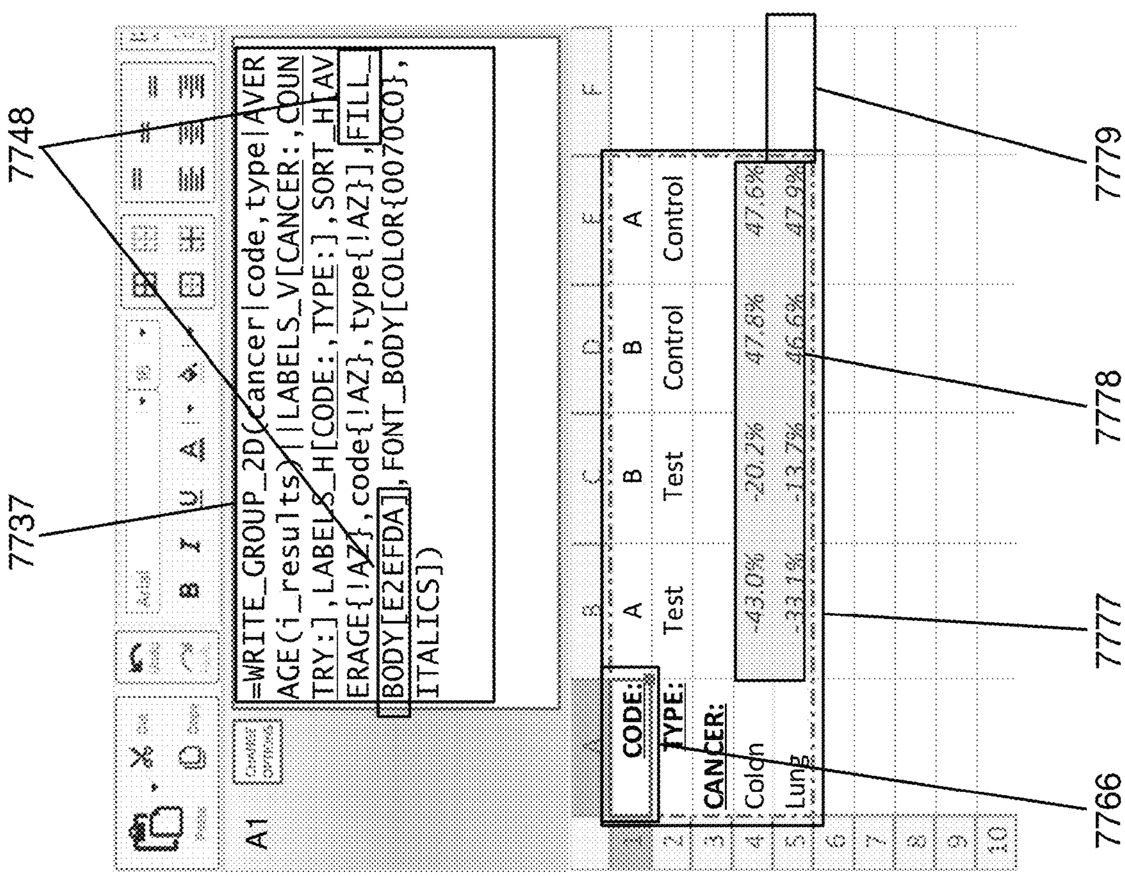
Figure 77A:
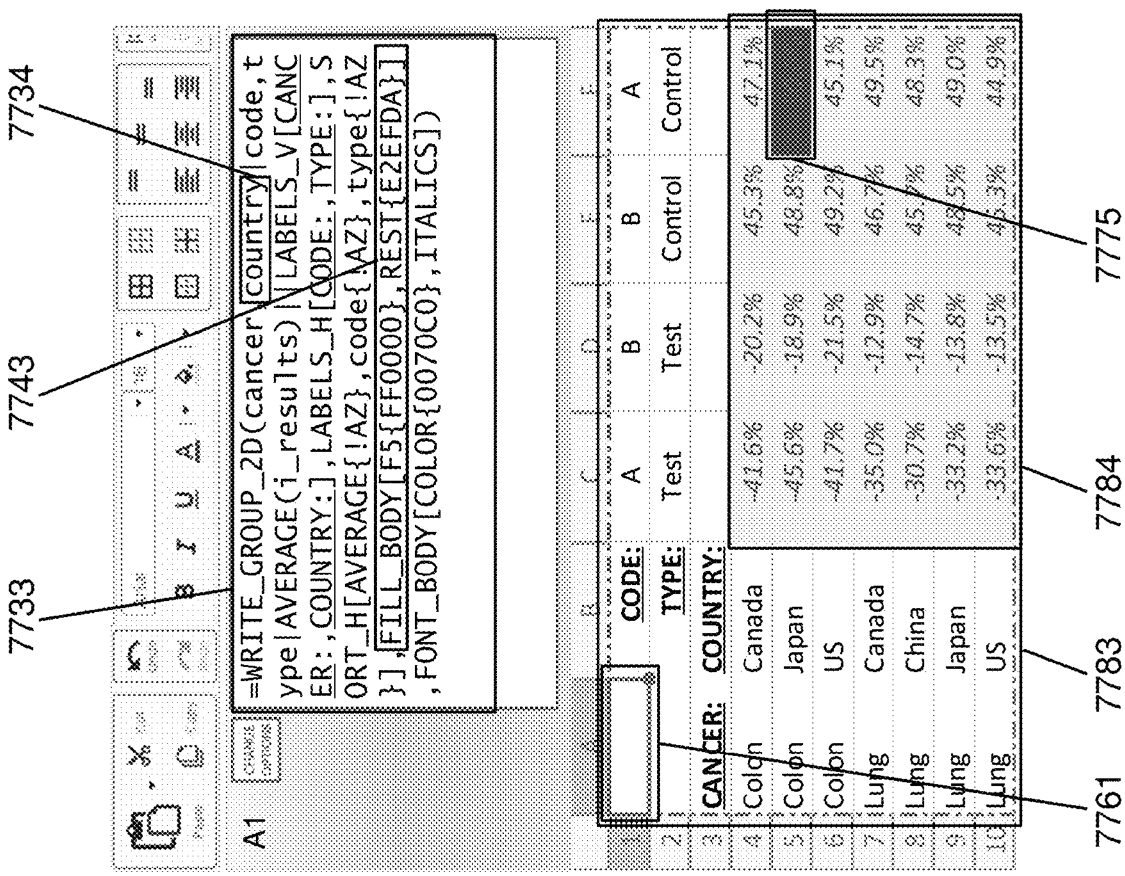
Figures 78A, 78B:
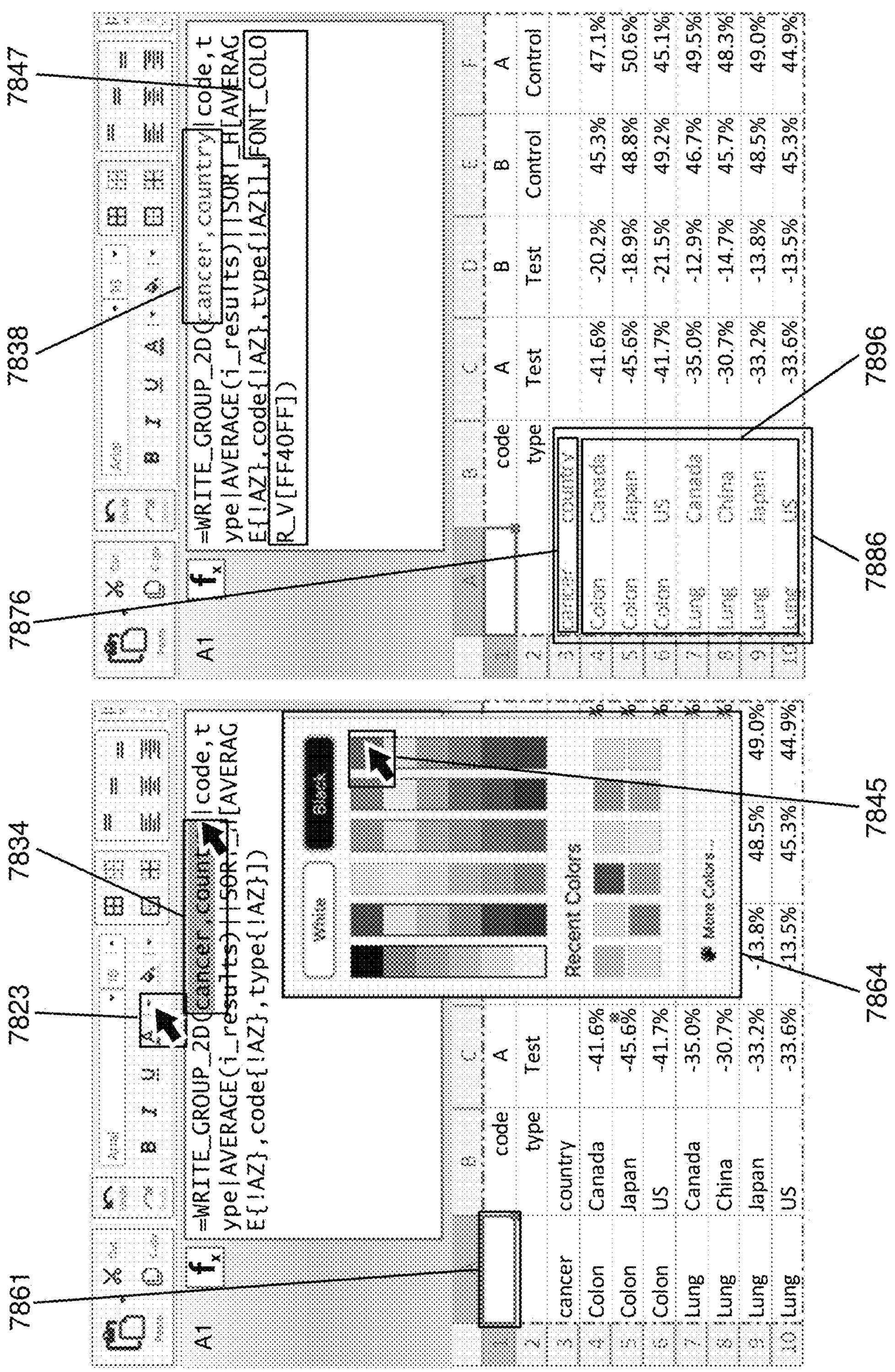

FIG. 77A and FIG. 77B example the spreadsheet function specified formatting automatically flexing its propagation with changes in the instantiation of the function formula for a function with visible formatting arguments, FIG. 78A and FIG. 78B example our spreadsheet function-controlled formatting technology done through the normal cell formatting UIs applied to an argument in the function formula, which then instantiates the formatting to the corresponding argument populated cell values.

Figure 79B:
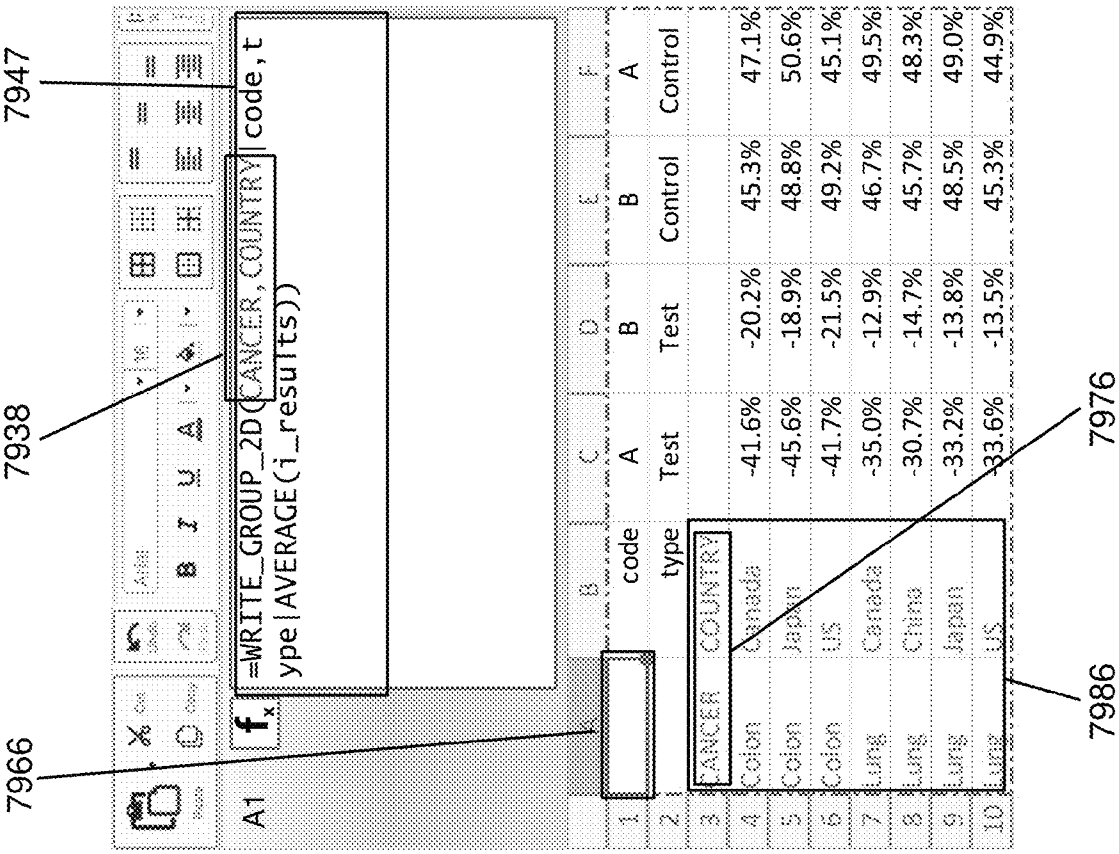
Figure 79A:
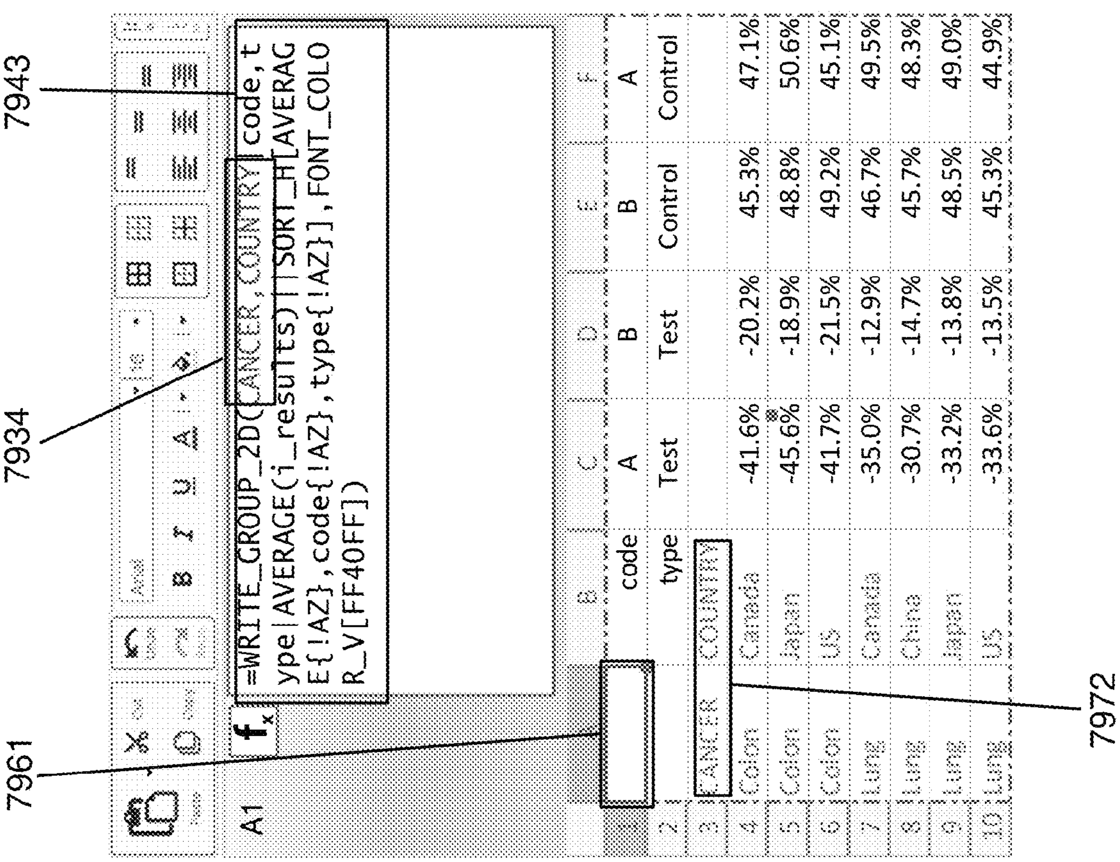

FIG. 79A and FIG. 79B further example our spreadsheet function-controlled argument formatting technology working with visible arguments and invisible arguments.

Figure 80B:
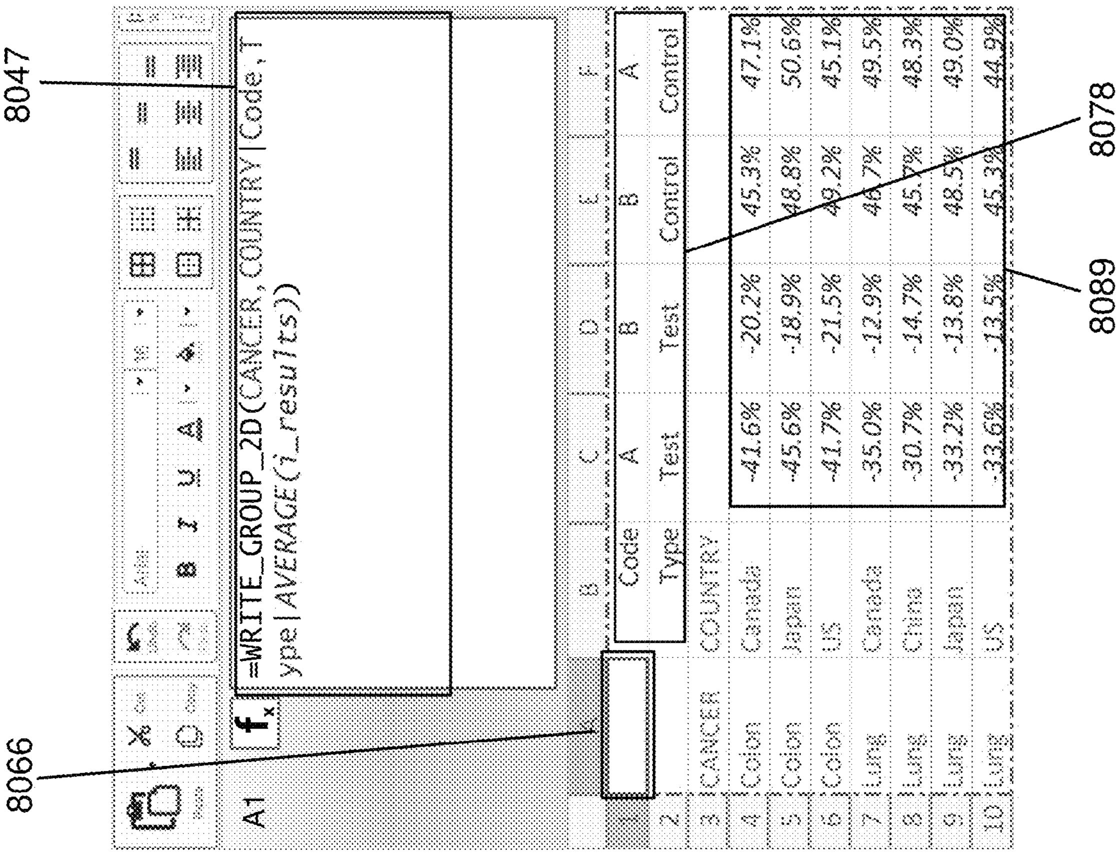
Figure 80A:
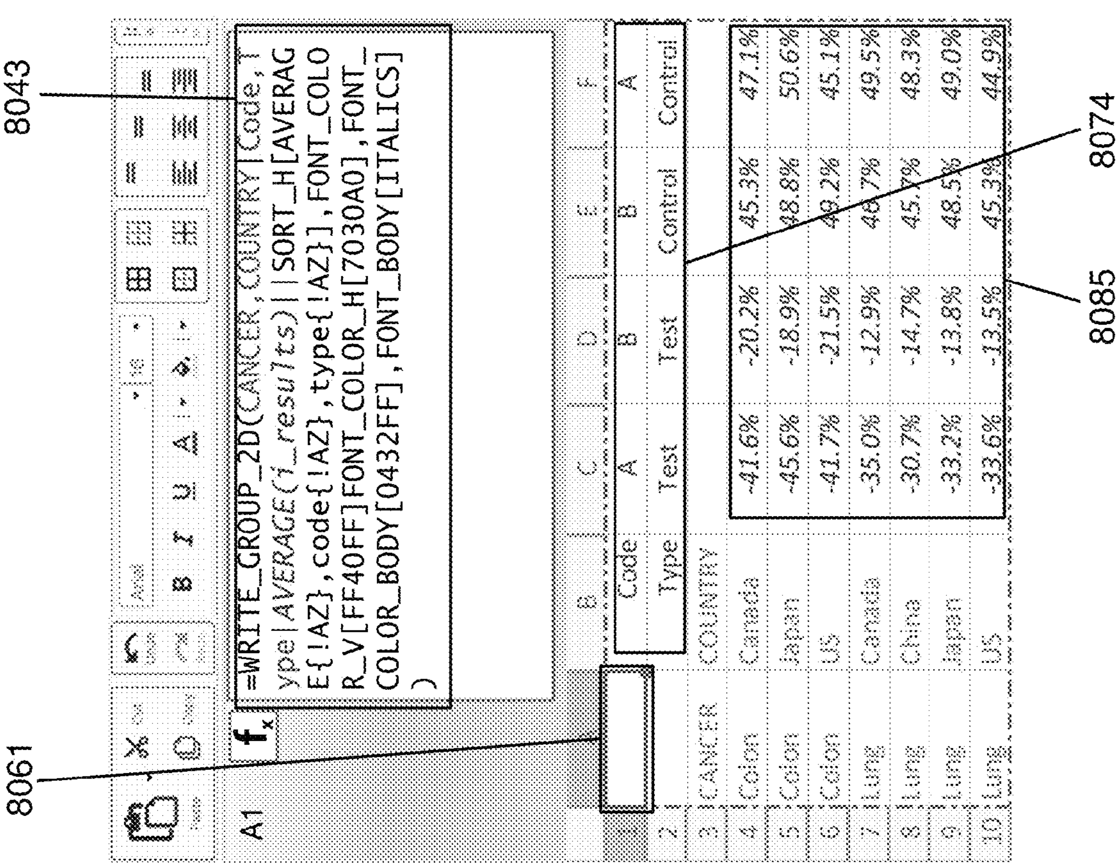

FIG. 80A and FIG. 80B example in both our visible and invisible argument technologies our spreadsheet function-controlled argument formatting technology working for all the cell populating arguments of a 'WRITE_GROUP_2D' function.

FIGS. 81A, 81B, 82A, 82B, 83, 84A and 84B example conditional formats controlled by our function technology.

FIGS. 85A, 85B, 86A and FIG. 86B example how our function rather than the cells controls the conditional formatting.

Figure 87A:
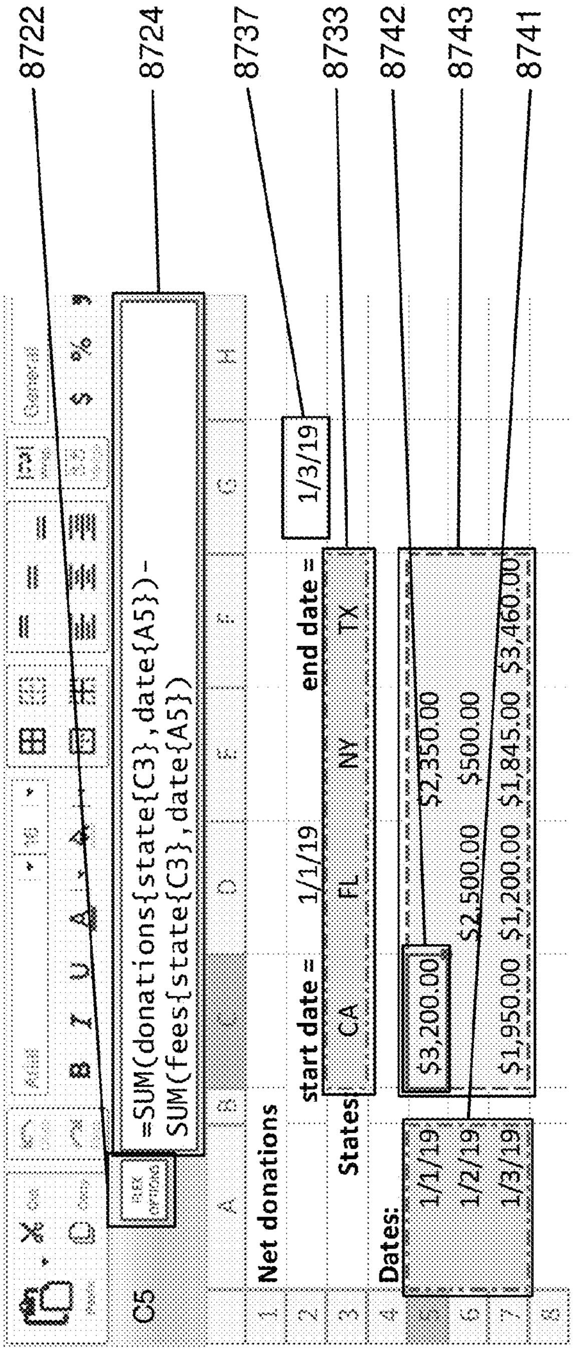
Figure 87B:
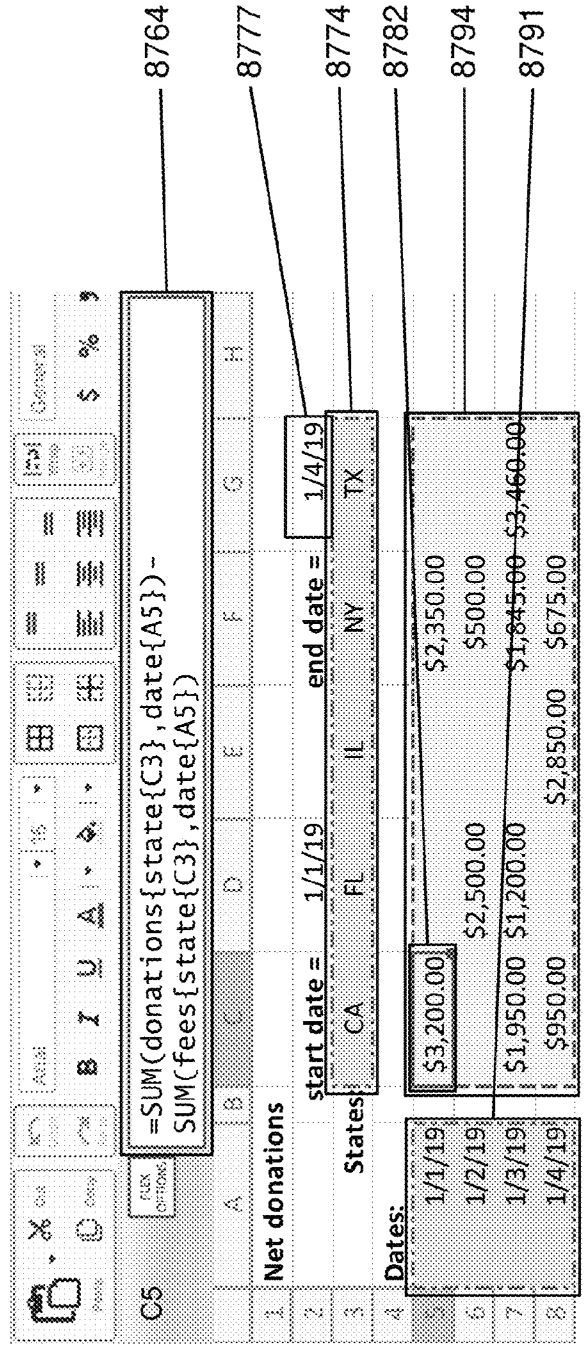

FIG. 87A and FIG. 87B examples how our flex copy paste controlled-format technology works after it is set up/instantiated.

FIGS. 88A, 88B, 89A, 89B, 90A, 90B, 91A, 91B, 92A, 92B, 92C, 92D, 93A, 93B and 93C example a user selection embodiment of how the flex copy paste and its control of cell formatting works in our technology with invisible and visible formatting arguments.

Figure 94A:
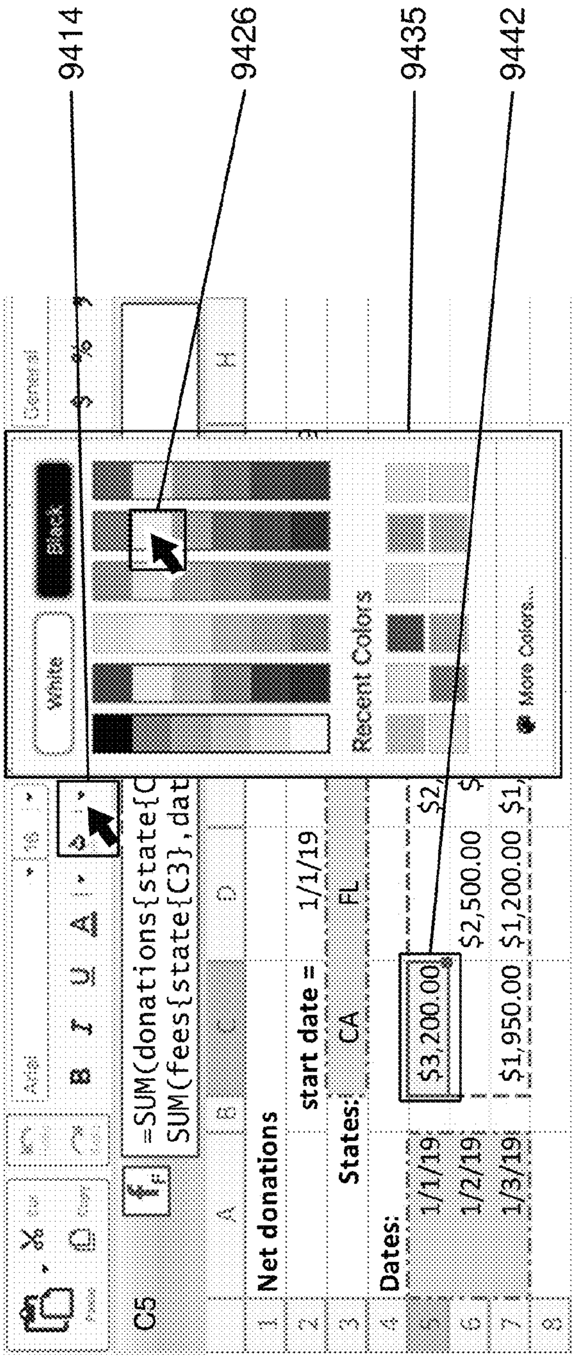
Figure 94B:
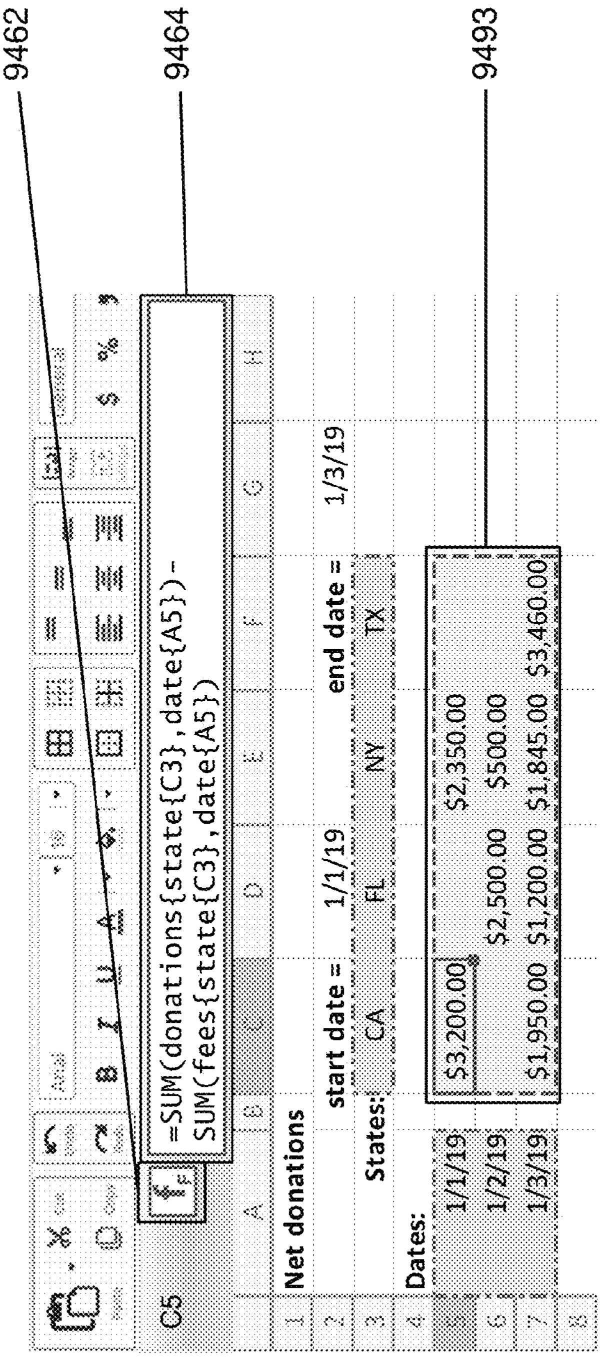

FIG. 94A through FIG. 94B example an auto conversion embodiment of how our flex copy paste controlled formatting is specified.

Figure 95A:
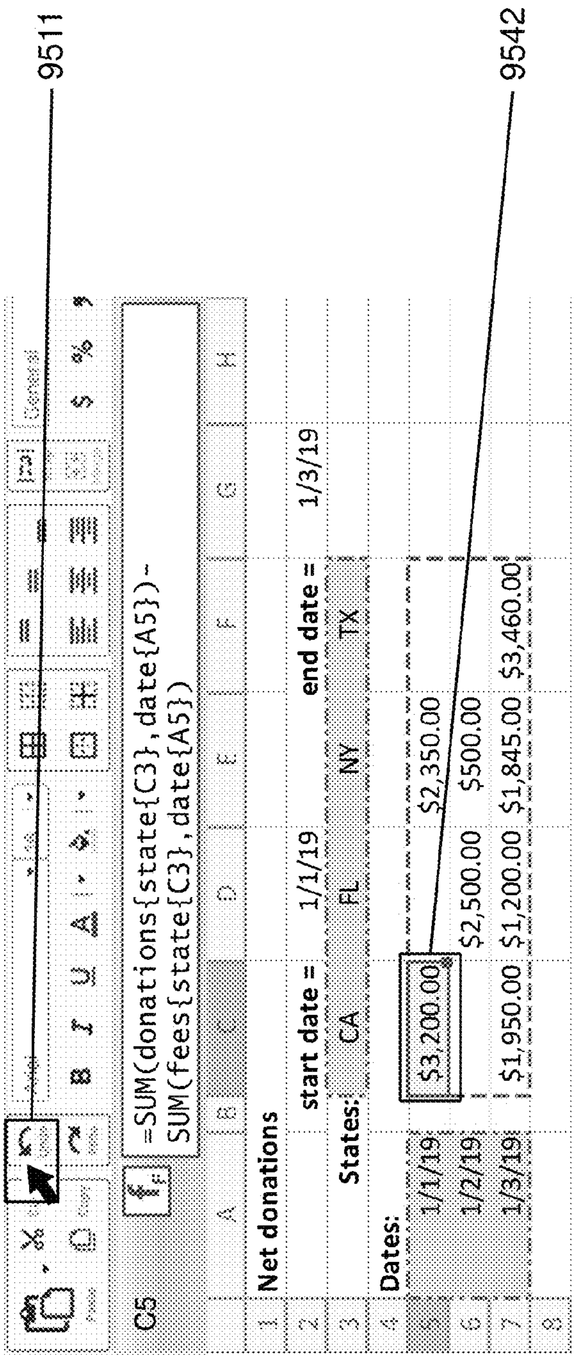
Figure 95B:
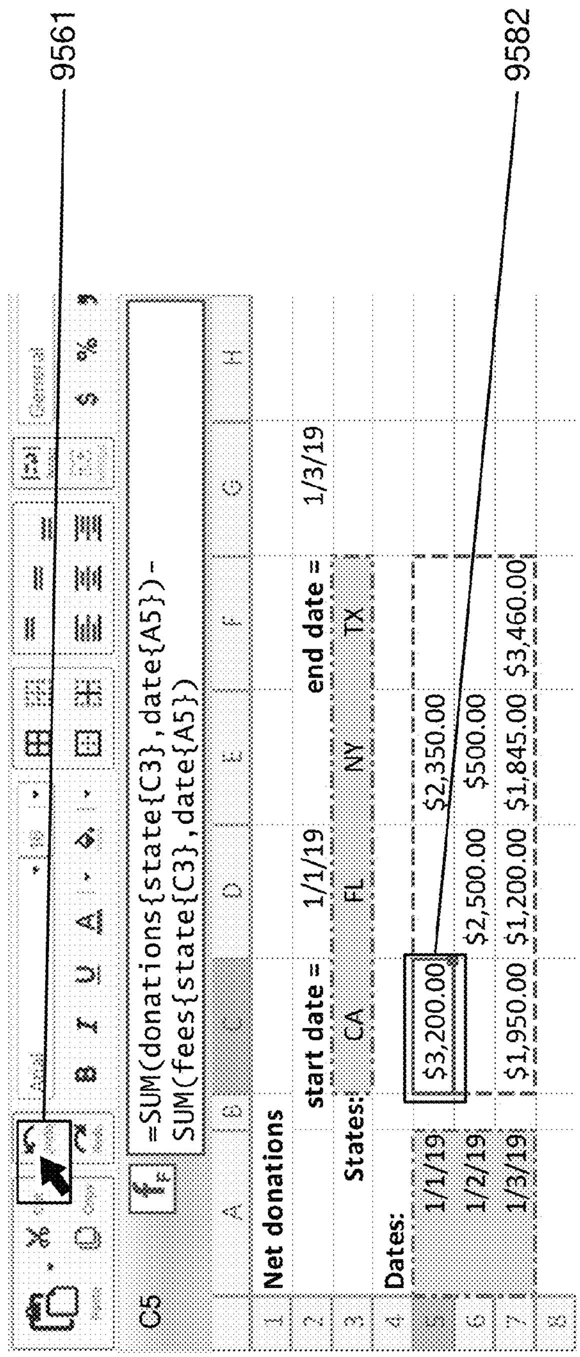
Figure 96A:
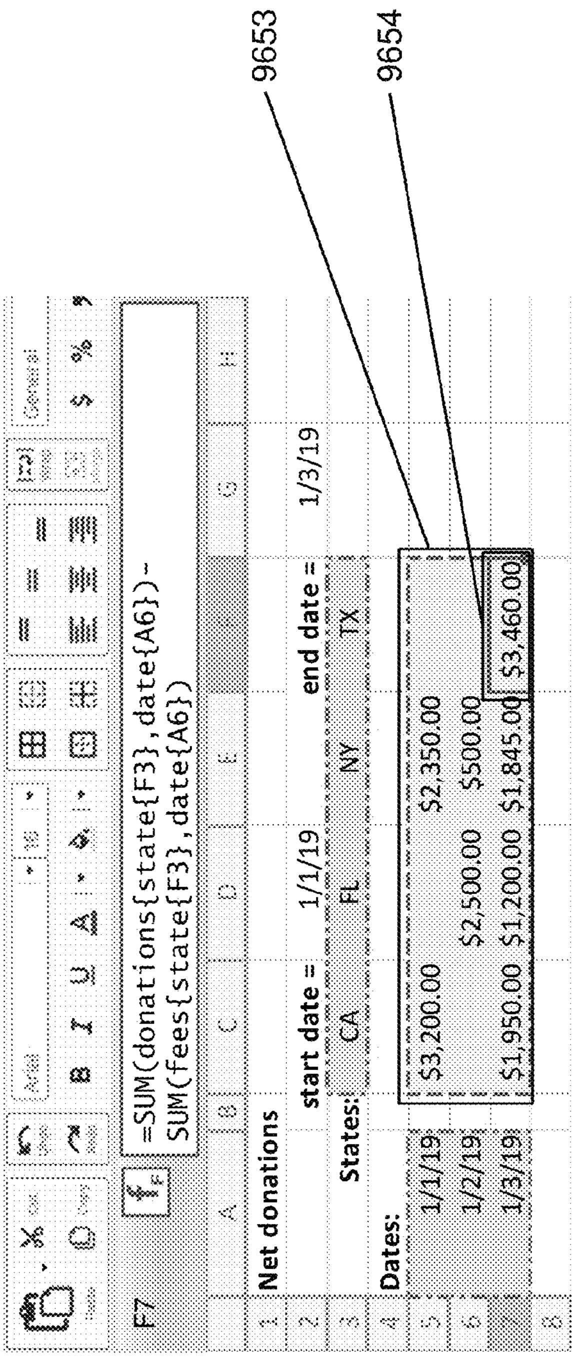
Figure 96B:
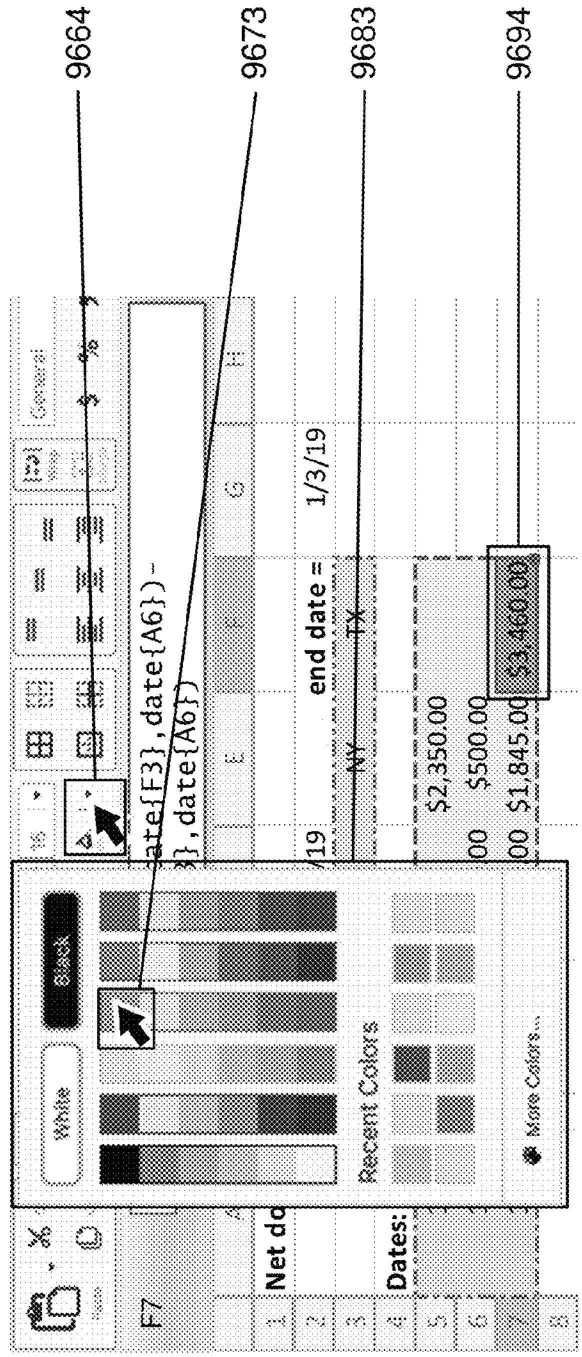

FIG. 95A and FIG. 95B example the impact of UNDO on our auto conversion variant of flex copy paste formatting.

FIGS. 96A, 96B, 97A and 97B example an embodiment of how our auto conversion variant of flex copy paste formatting works in multiple formatting situations.

Figure 98A:
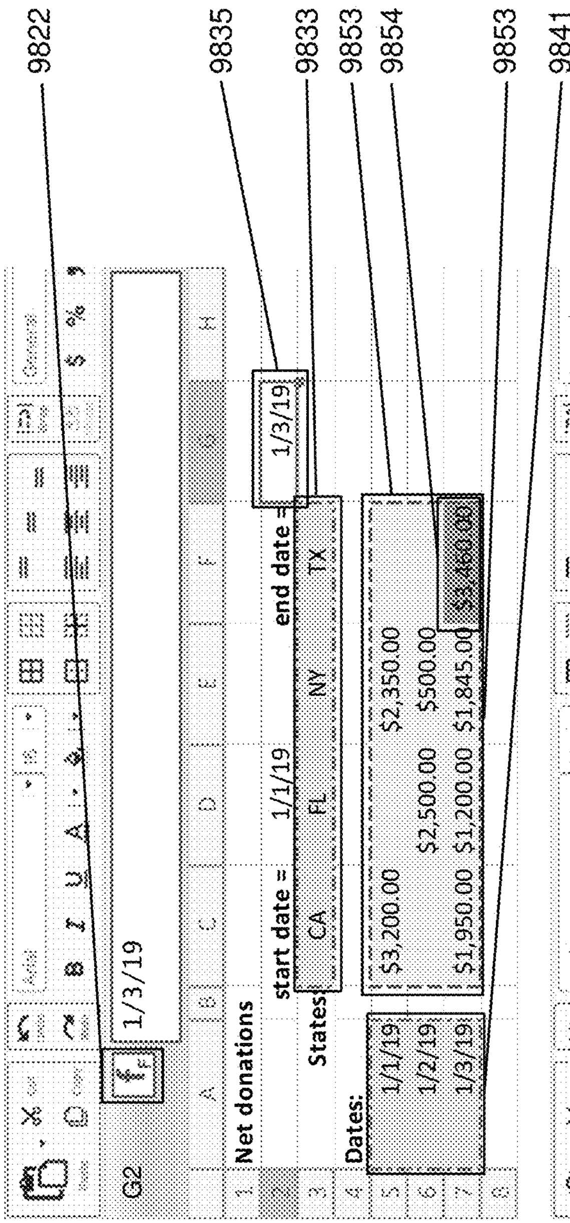
Figure 98B:
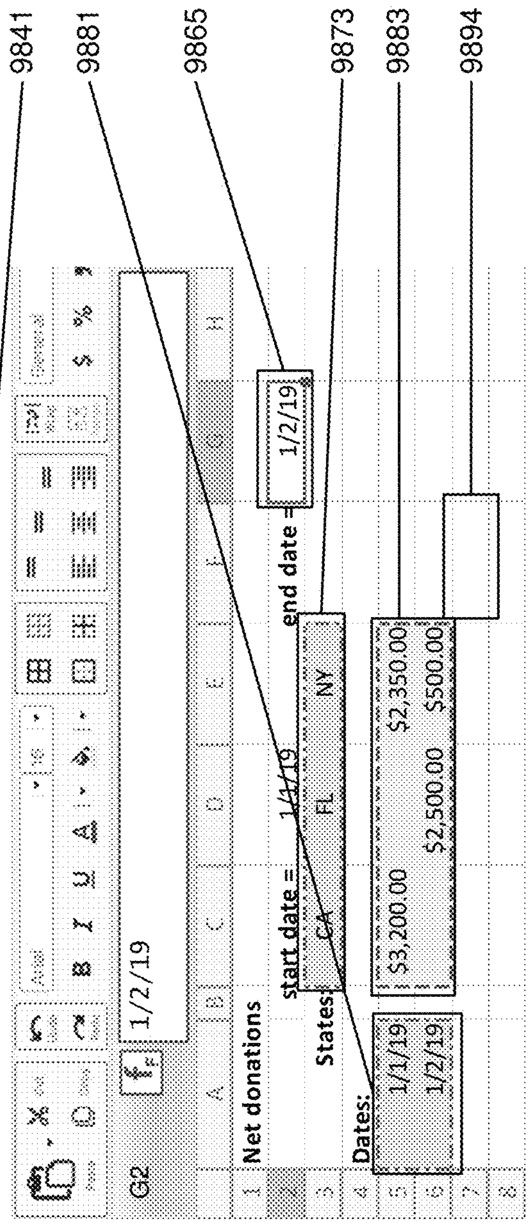
Figure 99A:
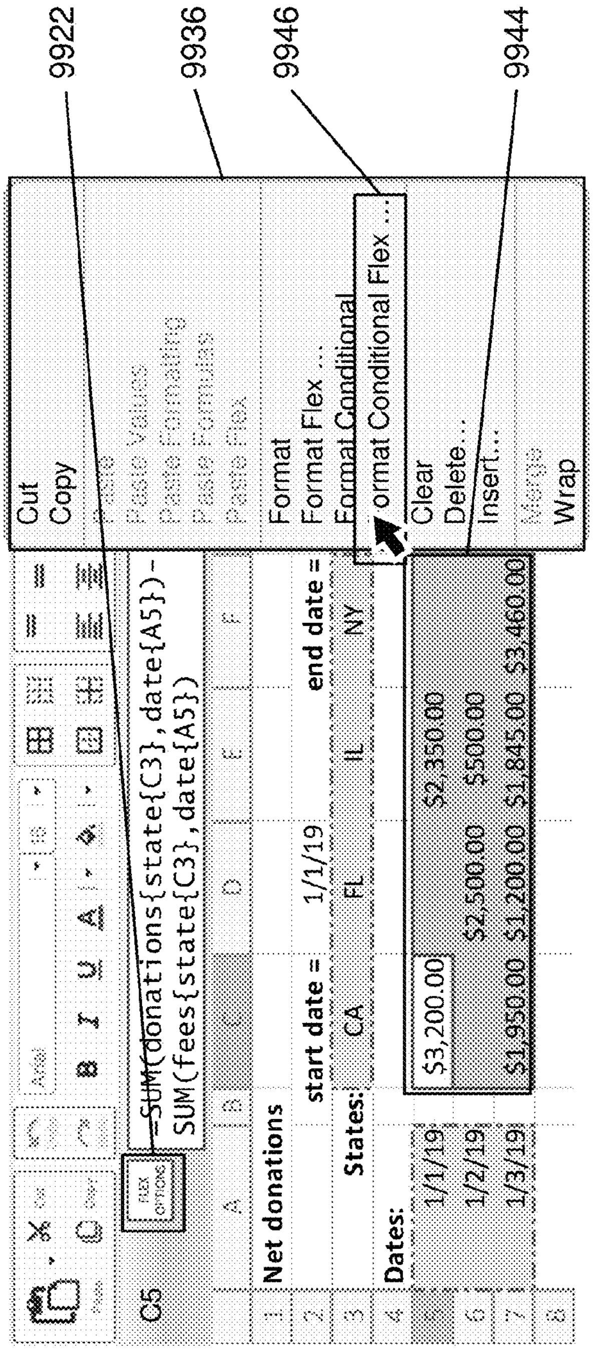
Figure 99B:
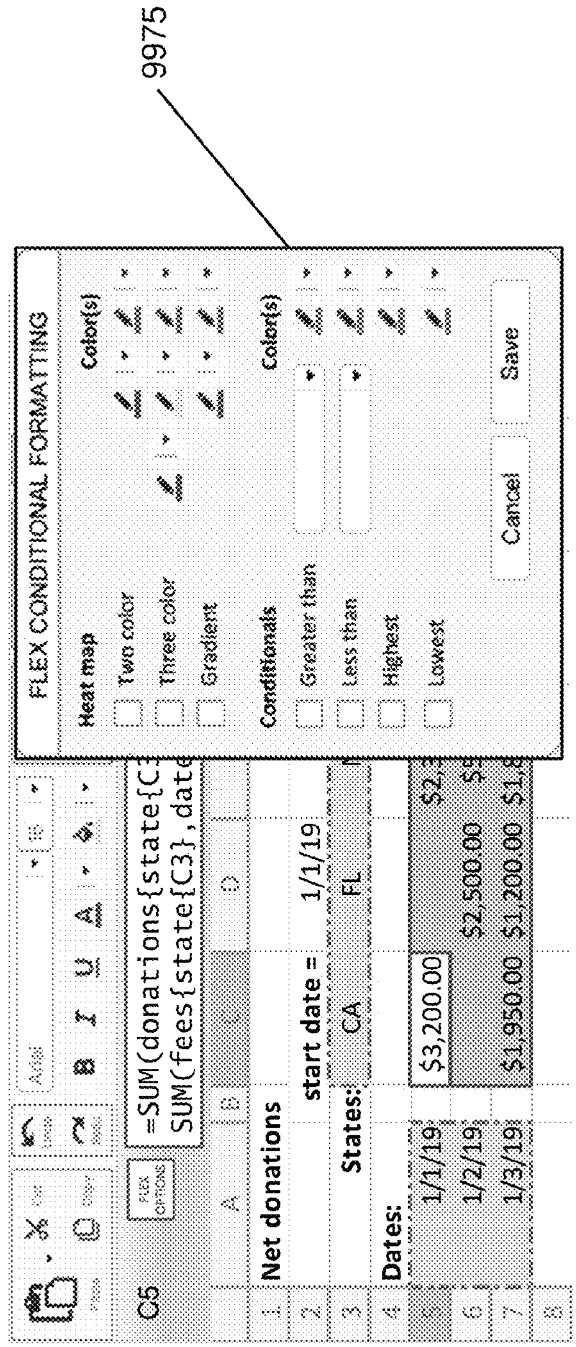

FIG. 98A and FIG. 98B then example how our flex copy paste technology controls multiple format changes with changes to the other function arguments.

FIGS. 99A, 99B, 100A and 100B example an embodiment of our flex copy paste controlled conditional formats.

FIGS. 101A, 101B, 102A, 102B, 103A and 103B example how our flex copy paste technology controls the conditional format changes.

FIGS. 104A, 104B, 105A, 105B, 105C, 106A, 106B and 106C example how our multiple separate input function technology works in the formula bar.

FIGS. 107A, 107B, 107C and 108A example how our multiple separate input function technology works in the in-cell formula.

Figure 108B:
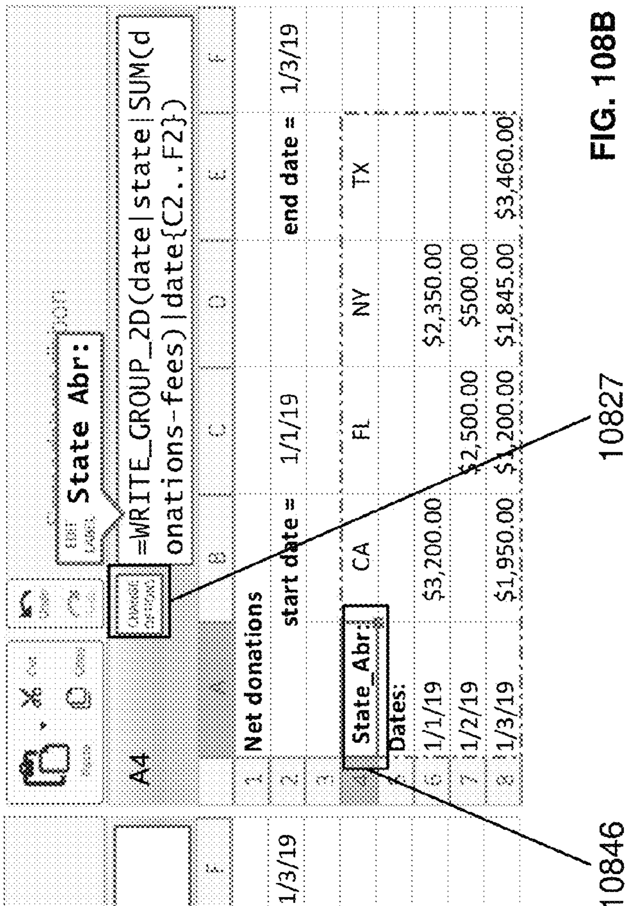
Figure 108A:
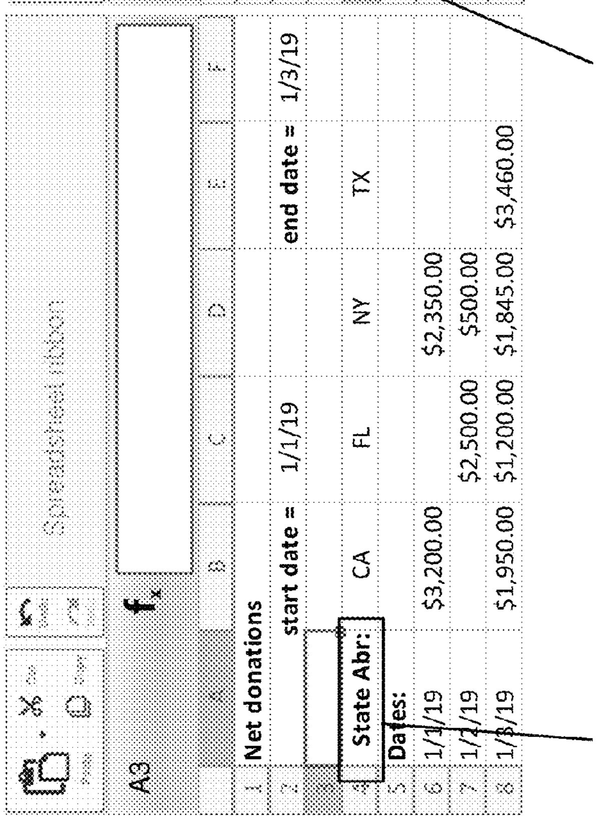
Figure 108C:
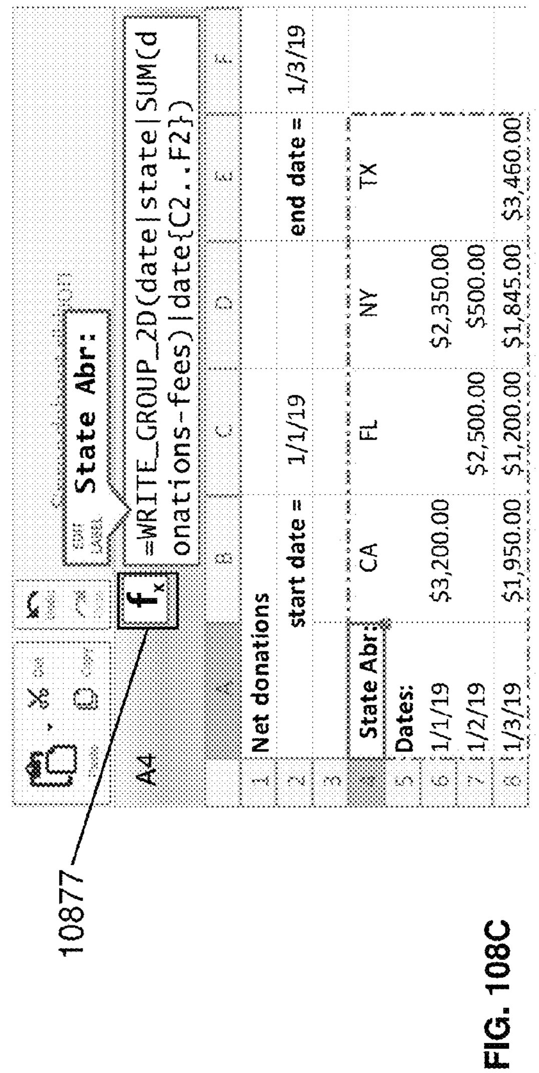

FIG. 108B and FIG. 108C examples how our multiple separate input function technology is compatible with our button access lists and our in-formula automatically accessed (HINTS) lists technologies.

Figure 109B:
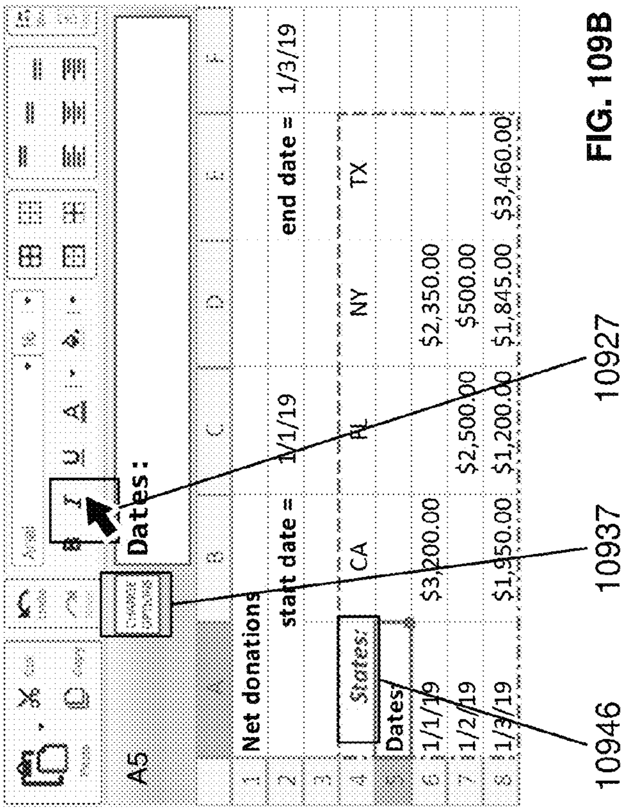
Figure 109A:
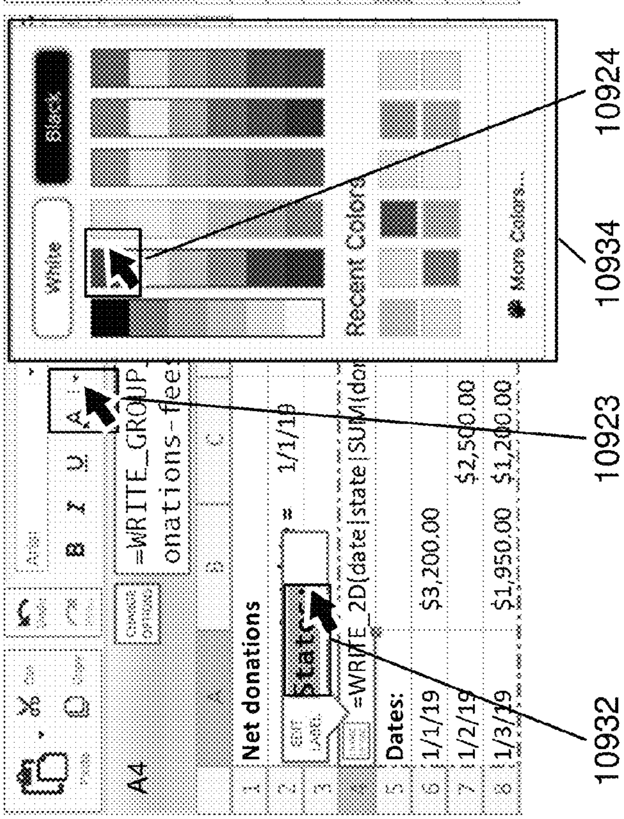
Figure 109C:
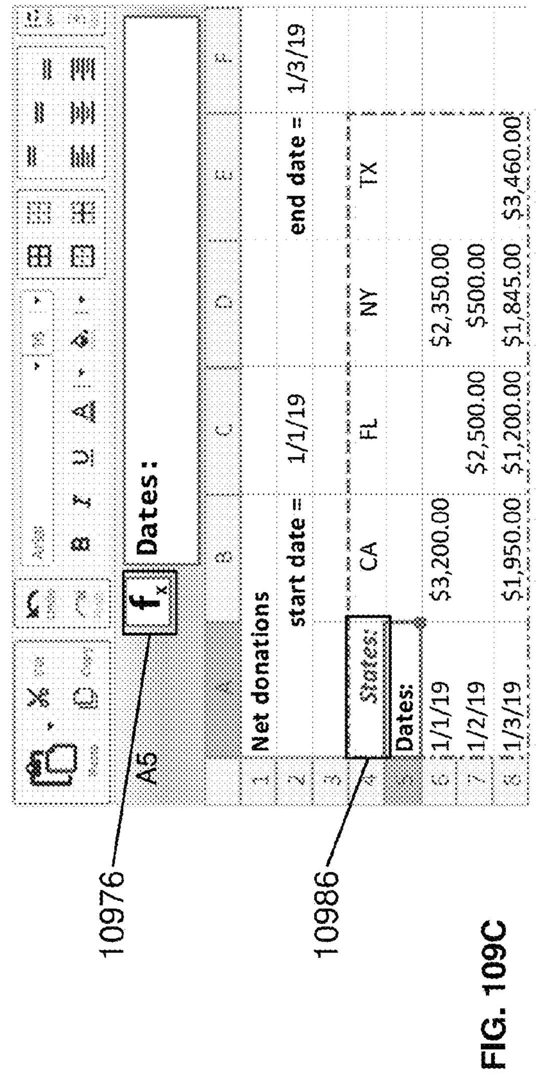

FIGS. 109A, 109B and 109C example how our multiple separate input function technology works with our in-formula in-argument formatting and is compatible with our button access lists and our in formula automatically accessed (HINTS) lists technologies.

Figure 110B:
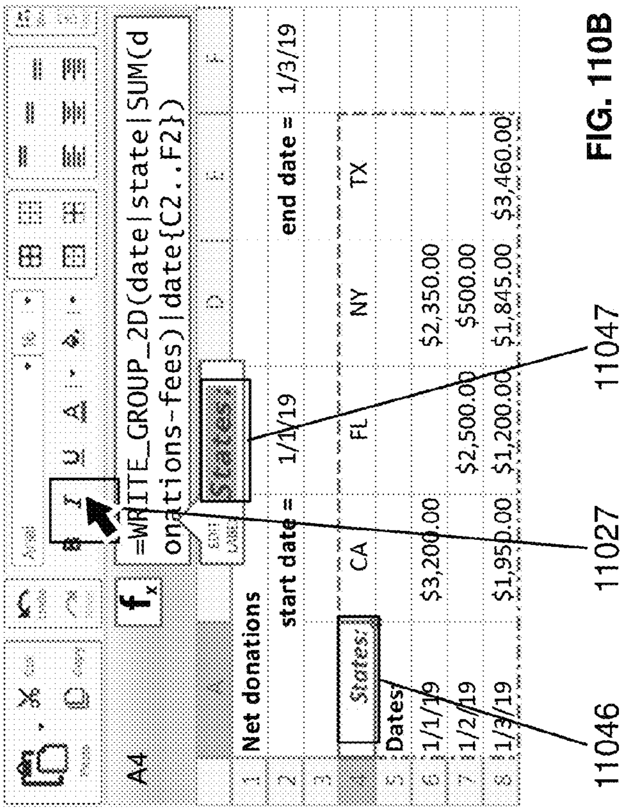
Figure 110A:
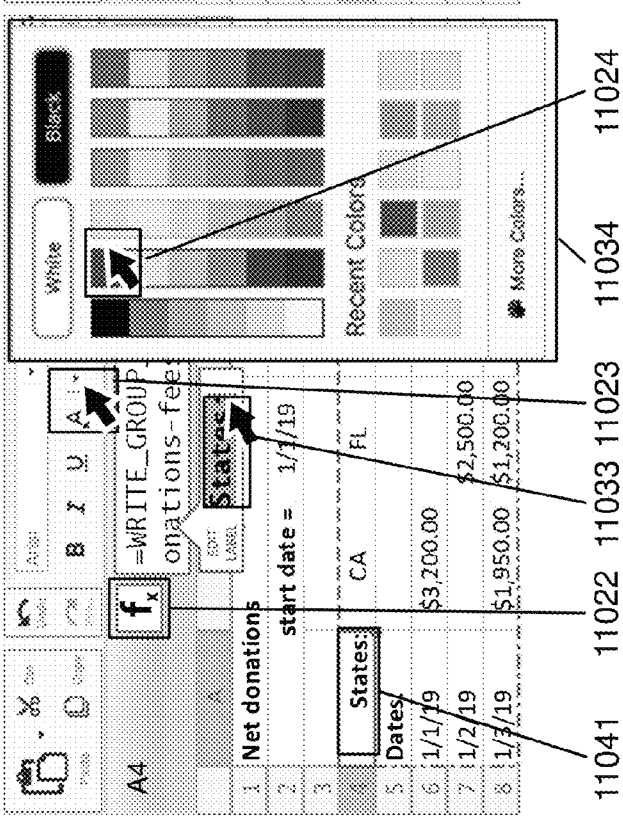
Figure 110C:
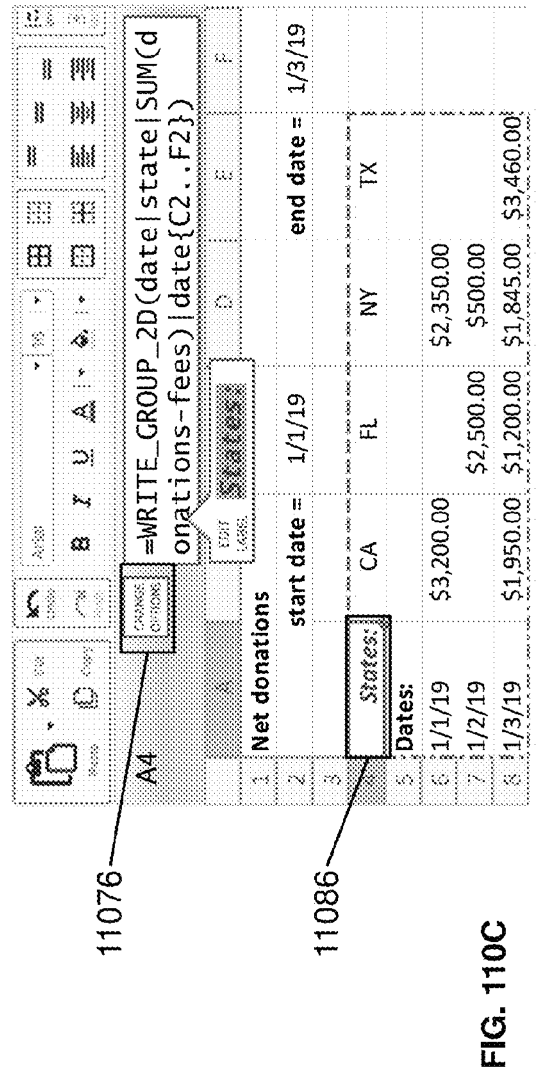

FIGS. 110A, 110B and 110C example how our multiple separate input function technology works with our formula bar in-argument formatting and is compatible with our button access lists and our in formula automatically accessed (HINTS) lists technologies.

FIGS. 111A, 111B, 112A and 112B example our manual conversion through a list embodiment of how flex copy paste formatting is specified.

Figure 113A:
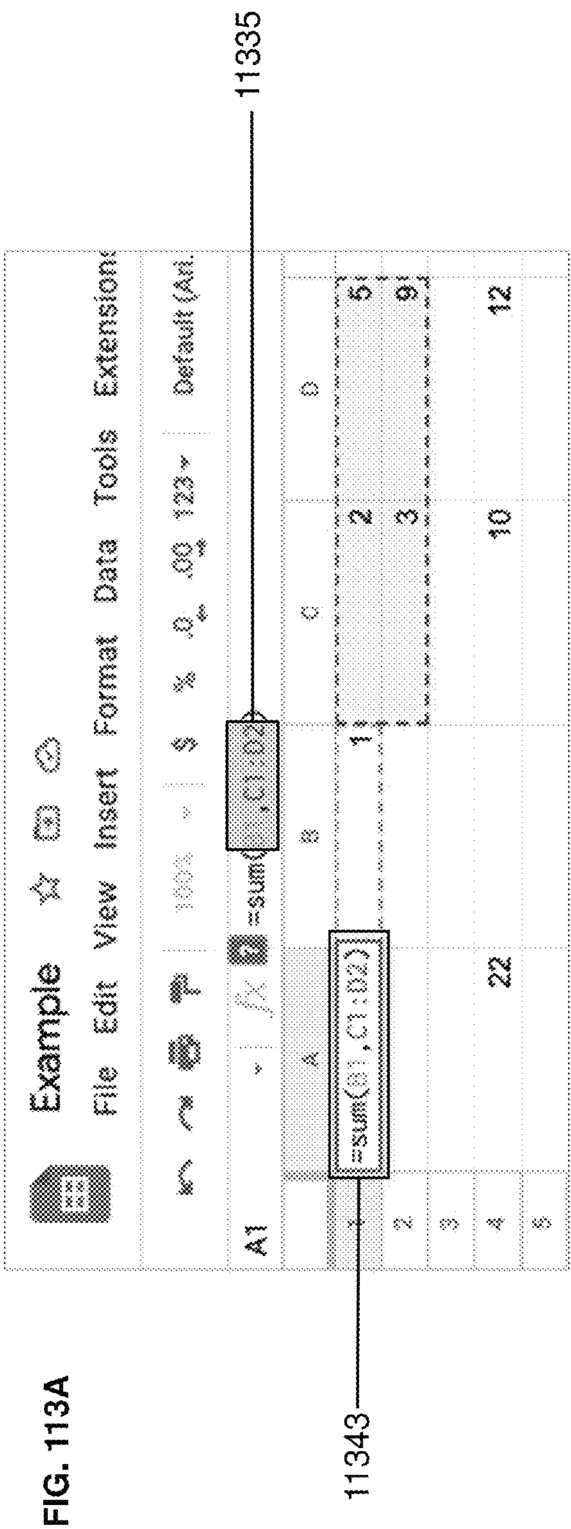
Figure 113B:
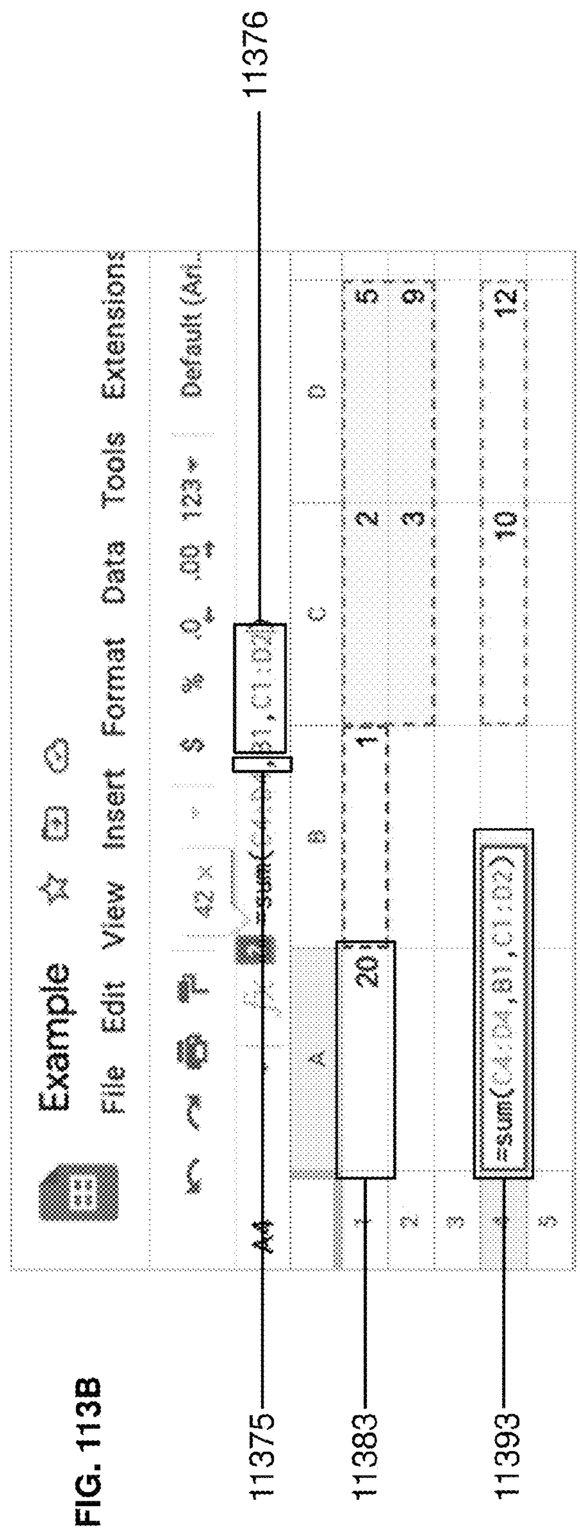

FIG. 113A and FIG. 113B example the copy paste spreadsheet function argument specification type for Google Sheets.

FIG. 114A and FIG. 114B example why the copy paste spreadsheet function argument specification type is more difficult to do in Microsoft Excel.

FIG. 115 depicts an example computer system that can be used to implement aspects of the technology disclosed.

FIGS. 116A, 116B, 116C and 116D example 'Single lists' with 'Fixed content', 'Situationally variable content', 'Single specification' and 'Multiple specifications'.

FIGS. 117A, 117B, 117C and 117D example a 'Multiple separate lists' selection list panel used for multiple specifications with visible and invisible arguments.

Figure 118B:
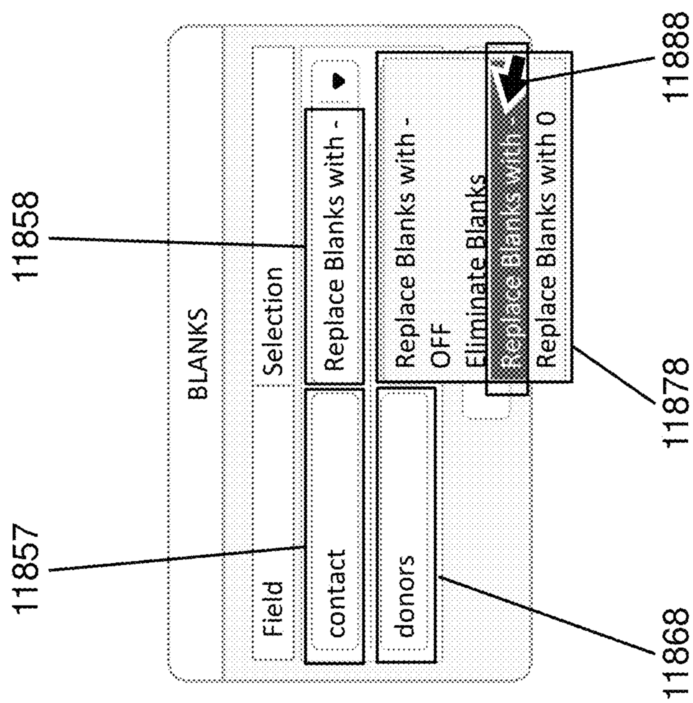
Figure 118A:
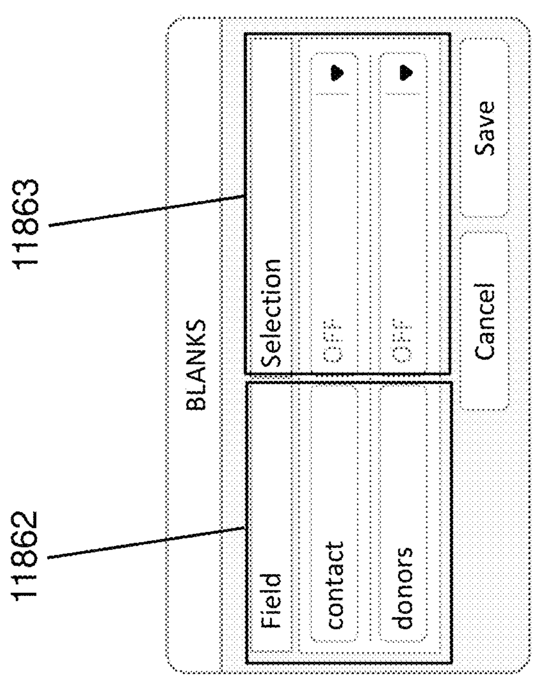

FIG. 118A and FIG. 118B example a 'Multiple related lists' with 'Mixed fixed and situationally variable content', 'Single specification' and 'Multiple specifications' selector list panel.

Figures 119A, 119B, 119C:
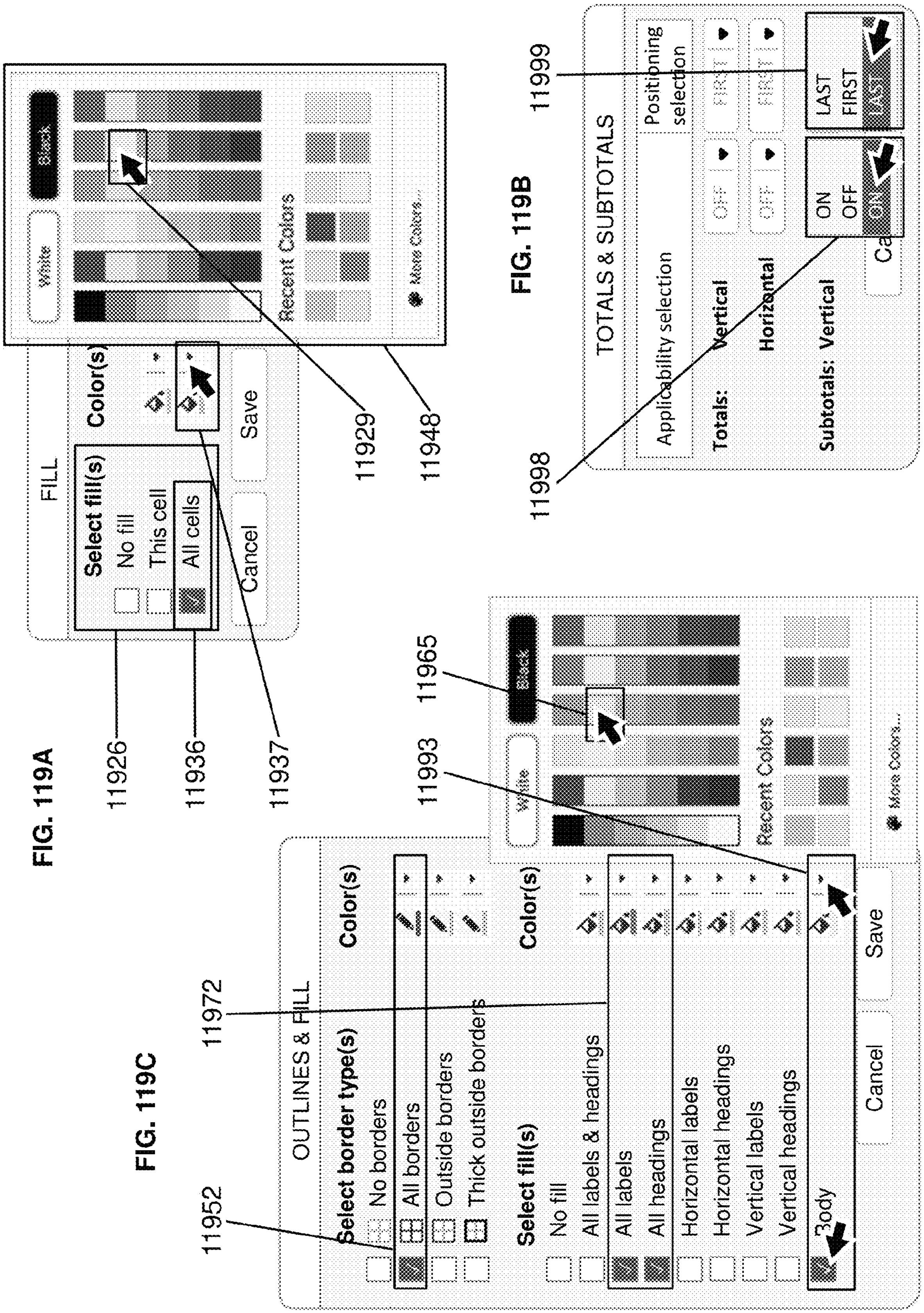

FIGS. 119A, 119B and 119C example 'Multiple cascading selector lists' with 'Fixed content', 'Mixed fixed and situationally variable content', 'Single specification set' and 'Multiple specification sets'.

Figure 102A:
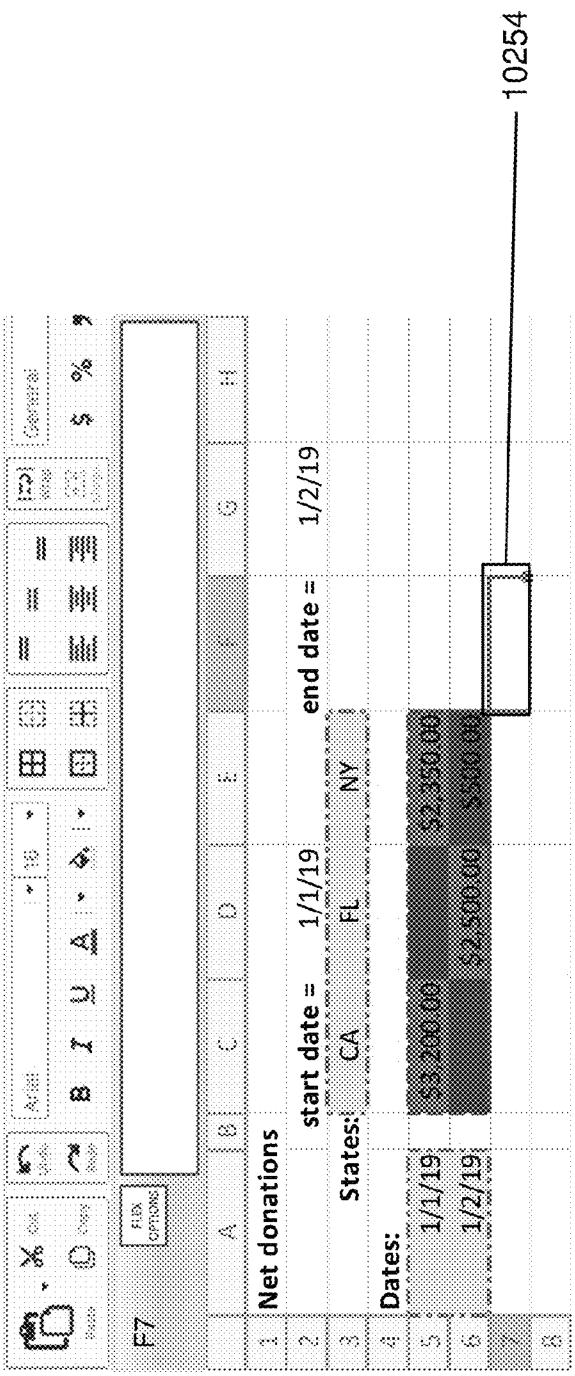
Figure 102B:
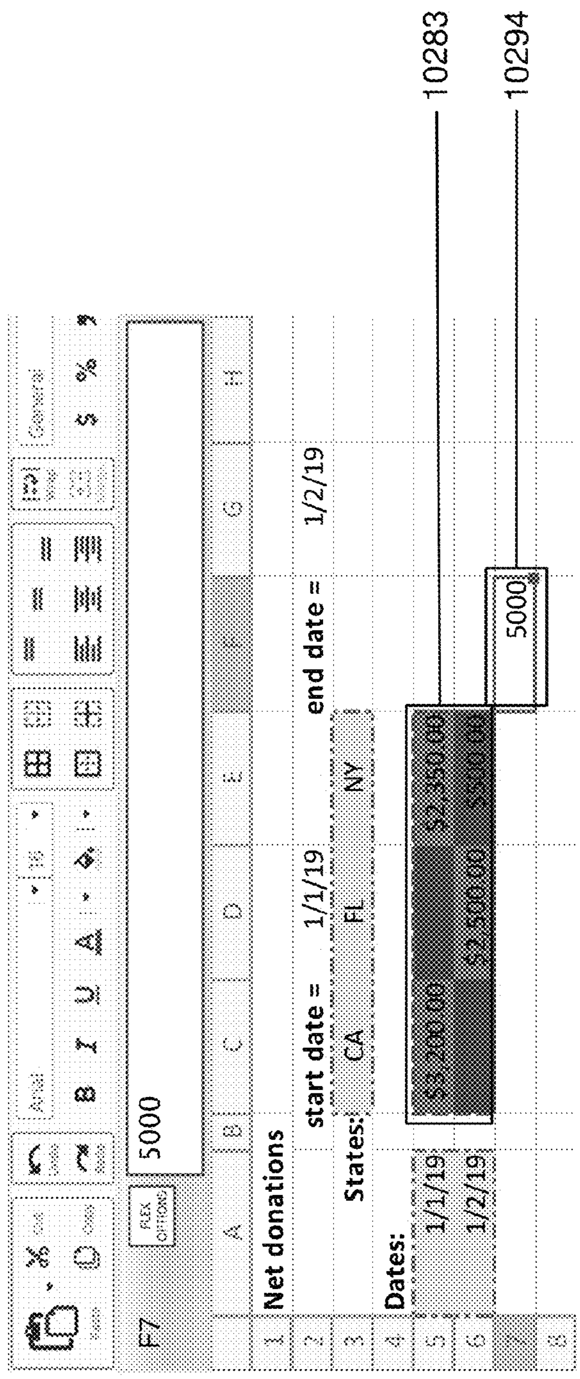
Figures 120A, 120B, 120C:
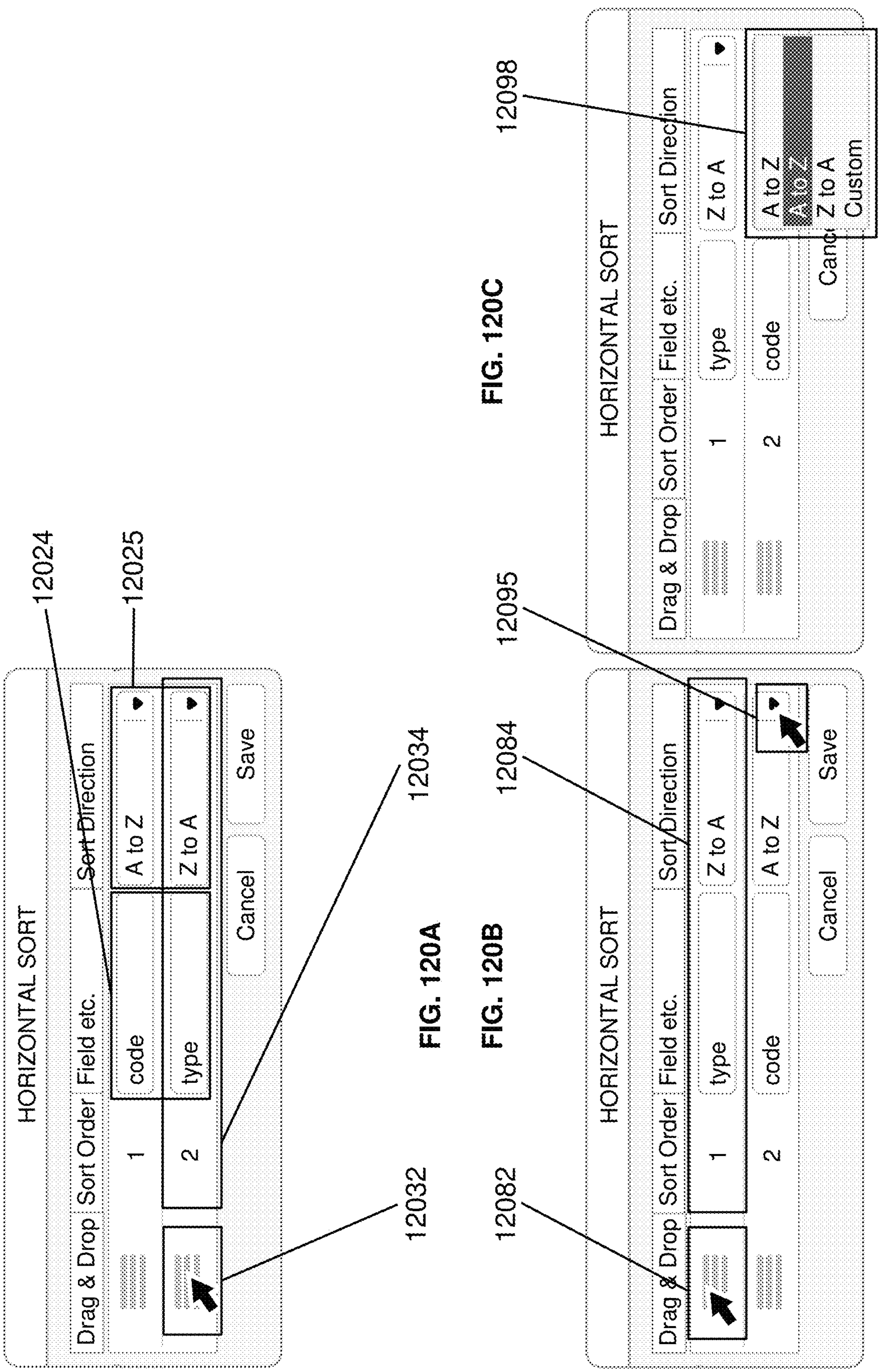

FIGS. 120A, 102B and 120C example 'Reorderable specification lists' with 'Mixed fixed and situationally variable content' and 'movement' (e.g., drag and drop).

FIGS. 121A, 121B, 121C and 121D example 'Combinations across options lists'.

FIGS. 122A, 122B, 123A and FIG. 123B example 'WRITE_V' function-controlled formats with visible and invisible functional formula arguments.

FIGS. 124A, 124B, 124C and 124D example function or flex copy paste controlled 'Multiple separate lists' and 'Multiple related lists' selector list panels used for formatting with visible or invisible functional formula arguments.

Figure 125B:
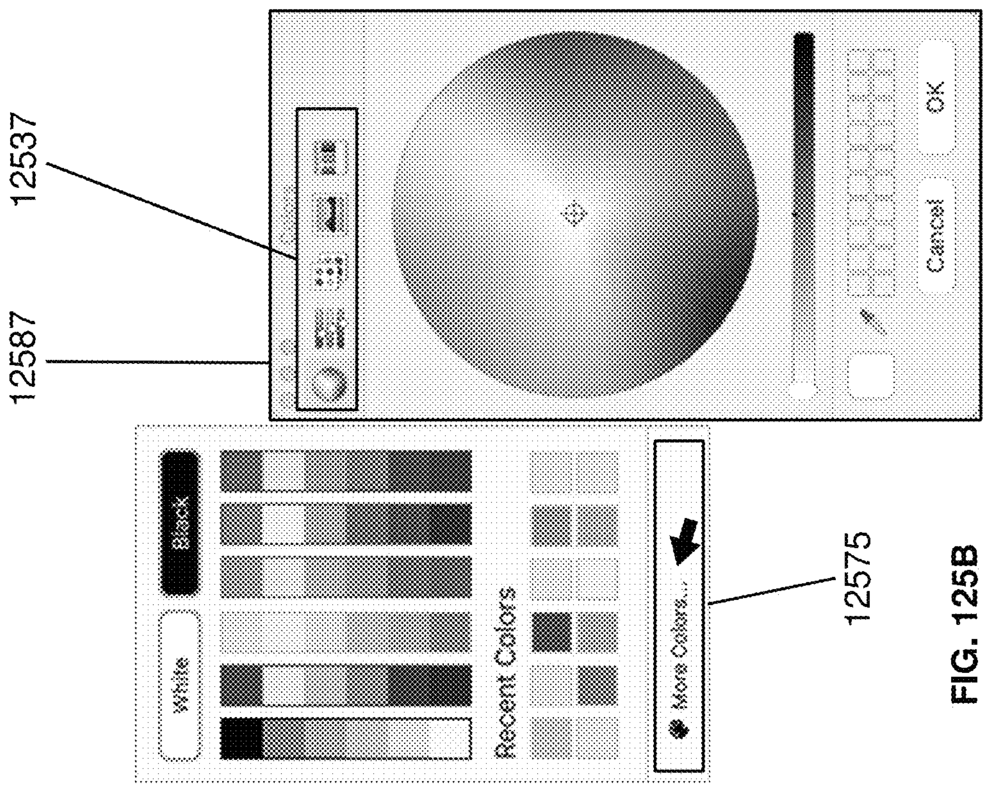
Figure 125A:
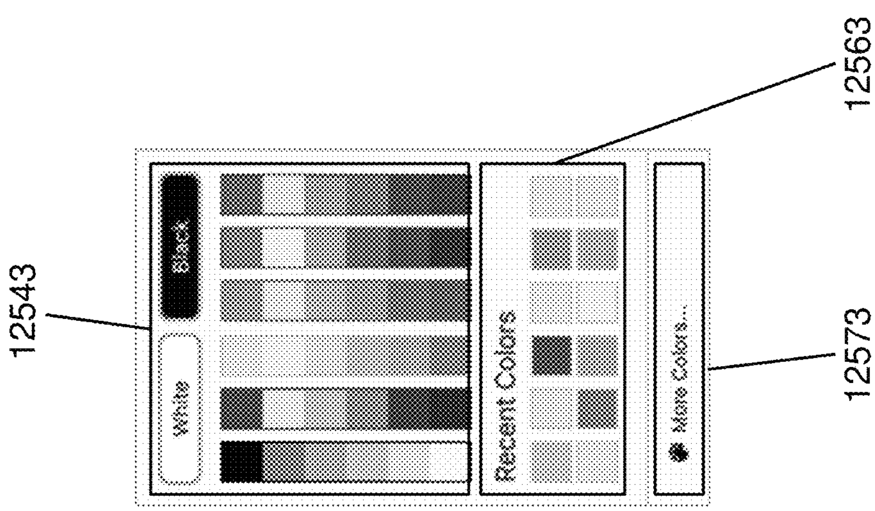

FIG. 125A and FIG. 125B example a regular color specification UI used for specifications converted from cell control to function control or flex copy paste control.

FIGS. 126A, 126B, 126C, 127A, 127B, 127C, 127D, 128A, 128B and 128C example a 'WRITE_V' connected flex copy-paste of a formulaic data field with manually specified flex copy-paste controlled formatting.

FIGS. 129A, 129B, 129C, 130A, 130B and 130C example a 'WRITE_V' connected flex copy-paste of a formulaic data field with automatic conversion of cell formatting to flex copy-paste controlled formatting.

FIGS. 131A, 131B, 131C, 132A, 132B, 132C, 132D, 133A, 133B and 133C example a data end flex copy-paste of a formulaic data field with manually specified flex copy-paste controlled formatting.

FIGS. 134A, 134B, 134C, 135A, 135B, 135C, 135D, 136A, 136B and 136C example a 'WRITE_V' connected flex copy-paste of an algebraic formula with manually specified flex copy-paste controlled formatting.

FIGS. 137A, 137B, 137C, 138A, 138B and 138C example a 'WRITE_V' connected flex copy-paste of an algebraic formula with automatic conversion of cell formatting to flex copy-paste controlled formatting.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now are used for much larger data sets and a much larger range of calculations. Spreadsheet providers like Microsoft Excel and Google Sheets cater to the specialized needs of users through many capabilities including vast numbers of spreadsheet functions (e.g., built in predefined formulas including SUM, COUNT and MIN). For example, Microsoft Excel includes more than four hundred and fifty built-in functions and Google Sheets over four hundred. And while these capabilities were put in place to avoid having to learn a programming language to answer problems, they have brought their own complexities and limitations.

Our technology addresses both the complexities and the limitations with new capabilities. Those capabilities include expanding beyond fixed and repetitive spreadsheet arguments with argument groups and arguments that are invisible in the formula while being more understandably visible to the user. Our technology eliminates the current limitation of selecting a single input from a single fixed list adding a broad spectrum of list types, situationally tailored lists, multiple lists as one time and the ability to make multiple selections at once. Our technology also supports functions controlling the formatting of the cell or cells they populate and the setting up of that formatting through list UIs or the conversion of cell specified formatting. Additionally, our technology supports multiple separate inputs into a single cell's formula. The following figures example the workings of these capabilities singly or in combinations.

Function Argument Groups

In existing spreadsheets all the function arguments are comma separated with the exception of the functions that accept no argument. So, all of the existing spreadsheet functions have in our terms one argument group which is comma separated or no argument group (in empty functions like RAND which have no arguments). That one argument group has a fixed argument order (e.g., IF, COUNTIF or ACCRINT), recurring arguments/argument pairs (e.g., SUM or MAX) or a combination of the two (e.g., SUMIFS or COUNTIFS). This creates a limitation that our spreadsheet technology has eliminated in previous filings (e.g., U.S. application Ser. No. 16/191,402) by the use of argument separators (e.g., a bar |) to separate argument groups. This allows users of our technology to have multiple argument groups of user specified (not fixed) length within a spreadsheet function. Giving the user a very easy to understand way to specify function formulas with very different combinations of inputs.

FIG. 1A examples three different argument groups (112, 114 and 116) in our 'WRITE_V' function. This allows each of the three different argument groups to have a user determined number of arguments once a minimum requirement is met. For 'WRITE_V' that minimum requirement is one argument in the first argument group 112, after that the user can specify as many or as few as they would like of arguments in each of the argument groups. Another advantage of having argument groups is they can be made fully or partially optional giving greater flexibility in the user inputs. FIG. 1B examples the user putting nothing in the second argument group 152 while putting four comma separated arguments 143, 144, 144 and 152 in the first argument group and two argument terms 153 and 154 in the third argument group. However, in the same 'WRITE_V' function in FIG. 1C the user has specified two different arguments 'donor_name,donations' (shown in 148) in the first argument group, two different arguments (shown in 158) in the second argument group and two different argument terms (shown in 167) in the third argument group. This allows the user to get very different outcomes 183 and 187 from the different formulas in the same respective 'A1' cells 171 and 176. Thereby, also exampling how our technology supports the formula in one cell, 'A1' (shown in 171 and 176) instantiating values in additional cells (shown in 183 and 187) and with formula changes altering the number of additional cells instantiated.

Argument group separators are not the only way to remove the limitations of existing spreadsheets functions with variable numbers of like argument inputs. A somewhat more cumbersome method single argument group approach would be to pair a user specified number of arguments with a type of argument in a fixed order. So, the formula in FIG. 1B:

'=WRITE_V(donor_num,donor_name,date,donations|| ALL[ON],LABELS[ON])' would be:

'=WRITE_V(4,donor_num,donor_name,date,donations, 0,2,ALL[ON],LABELS[ON])'.

Where function has a user specified number of recurring arguments (the 4, 0 and 2) preceding the recurring argument inputs. The downside of this approach is that it requires paired edits when a user changes the number of arguments in any argument term. They need to change the argument and then they need to change the paired argument term number of arguments term. For example, if the user removes donations from the first argument term they need to change the '4' to a '3' to match the reduced number of field arguments. Thus, showing the user benefit of departing from the comma only separated arguments to create our non-formula character separated argument groups (divided by bars in this embodiment but could be separated by other characters not already used in formulas).

Another method for getting around the multiple variable argument input limitation in existing spreadsheets is to use our named argument terms in what we call a named argument term group option. One embodiment of our technology for the formula FIG. 1B:

'=WRITE_V(donor_num,donor_name,date,donations|| ALL[ON],LABELS[ON])' would be:

'=WRITE_V(FIELDS[donor_num,donor_name,date,donations],CONSTRAINTS[ ],ALL[ON], LABELS [ON])'.

Where all the function arguments are put in our named argument terms which can hold no argument, a single argument or multiple arguments (the version we call a named argument term group). In this formula example the argument groups in FIG. 1B that were not already using named argument groups have been converted to them, 'FIELDS[ . . . ] and CONSTRAINTS[ . . . ]. However, given all the arguments are named argument terms there is no need to put in empty named argument terms like the 'CONSTRAINT[ ]. Therefore, the formula could instead be:

'=WRITE_V(COLUMNS[donor_num,donor_name,date, donations],ALL[ON],LABELS[ON])'

Our spreadsheet function named argument term capability is even more powerful when an embodiment of it removes the fixed order of different named argument terms within a function and/or within an argument group. In the existing spreadsheets all arguments are in a specified order (including optional arguments). However, that becomes difficult for a user in a spreadsheet function with a large number of optional arguments where the user needs to type numerous commas with no content to get to the one argument towards the end of the list they want to populate. Because our named argument terms tell the function through the name what the argument is, order is not required. As exampled with 'ALL [ON]' in FIG. 1B 154 which specifies that the user wants the 'ALL' optional capability to have the value 'ON'. This way 'ALL[ON]' can be specified as the first option argument as in FIG. 1B 154 or can be specified as the second option argument as in FIG. 1C 167 and works in both situations with no requirement of a fixed order in the option argument group. This ability to have no fixed order for named argument terms in a function and/or argument groups within a function is particularly useful for options where there is a large number of options. Instead of having to type lots of empty commas and get the position correct the user simply specifies just the option or options they want.

Function Argument Specification Types

As spreadsheets add more functionality into their predefined functions their formulas can become more complicated to create. While the complexity of those functions has increased the breadth of specification types for those spreadsheet defined function arguments/parameters in existing spreadsheets has not increased. Microsoft Excel has the broadest set of ways to input the function argument specifications which amount to doing it in one of three places, one the in-cell formula, two the cell formula bar formula or three the Function Formula Builder argument input (not available in other spreadsheets). Then a user can use one of four ways to specify the argument; 1) type it, 2) highlight the cell(s) or cell range(s) and click them in, 3) paste in an argument(s) (difficult to do in Microsoft Excel), or 4) select an input specification from fixed list (available in few functions and does not work for the Microsoft Excel Function Formula Builder).

Examples of Existing Spreadsheet Function Specification Locations and Input Types FIG. 2A through FIG. 2C examples the three-spreadsheet function argument specification locations for Microsoft Excel. FIG. 2A examples an input into the cell ‘A1’ formula 231 automatically exposing the function syntax guide 242 below the cell formula. FIG. 2B examples the user inputting into same cell ‘A1’ 281 but this time doing the input in the Formula Bar formula 272 which also automatically exposes the function syntax guide 283 but below the Formula Bar rather than below the cell 281 into which the formula is populating. FIG. 2C examples where the user has opened the SUM Function Formula Builder 268 for cell ‘A1’ 235 to input the argument specification in the first argument location 248. This triggers the syntax guide 226 putting it below the Formula Bar. Google Sheets and the other spreadsheets do not have this Function Formula Builder input but have more options around their syntax guide (e.g., disappearing, expanding out to show examples etc.), however their in-cell and formula bar inputs work in a similar way to Microsoft Excel.

FIG. 3A through FIG. 3C examples three of the spreadsheet function argument specification types for Microsoft Excel. FIG. 3A examples the user typing the specification ‘b3:’ into the SUM function first argument 331. In this example the user has not completed the range they want but the Microsoft Excel application begins to highlight the input highlighting ‘B3’ 342. FIG. 3B examples the user cell selecting the specification ‘B3:C5’ range 382 into the SUM function first argument 371. When the user adds a comma for an additional argument or types a closing parenthesis the Microsoft Excel application populates the range into the argument. FIG. 3C examples a fairly infrequently offered input option in existing spreadsheets of selecting an argument specification from a fixed set of options 368 dropping down from the function syntax guide 326. In this example it is for the ‘frequency’ argument 348 for the function “ACCRINT” being populated in cell ‘A1’ 335. It is a fixed list in that no prior argument input changes the Options’ list 368 presented to the user for argument specification. Once the user makes a selection 358, that value is populated into the formula. The typing (FIG. 3A) and cell selection (FIG. 3C) inputs also work in the Formula Bar (FIG. 2B) and Function Formula Builder (FIG. 2C) locations. However, while the fixed list selection (FIG. 3C) also works in the Formula Bar (FIG. 2B) function syntax guide it does not display and therefore work in the Function Formula Builder (FIG. 2C) location as shown here in it not showing up in FIG. 3D when the user is in the ‘Frequency’ argument 388 in the Function Formula Builder 378.

FIG. 113A and FIG. 113B examples the copy paste spreadsheet function argument specification type for Google Sheets. We switched to exampling it in Google Sheets because, as we will example in FIG. 114A and FIG. 114B, it is not as easily done in Microsoft Excel. Since what we are exampling is copy pasting an argument or more than one argument into a spreadsheet function formula in FIG. 113A, we start by clicking into an existing spreadsheet function in cell ‘A1’ 11343 and then in this example highlighting two arguments ‘B1,C1:D2’ in the formula bar formula 11335 and then copying them, in this example by shortcut control c. Then in FIG. 113B the user clicks into the formula in cell ‘A4’ 11393 and types the comma 11375 into the formula bar formula after which they paste the two arguments ‘B1,C1:D2’ 11335 from cell ‘A1’ 11343 (11383 in FIG. 113B) into the formula bar formula 11376 which then also shows up in the in-cell formula 11393. The user has copy pasted two arguments into the formula in cell ‘A4’ 11393.

This same operation does not work in Microsoft Excel as exampled in FIG. 114A and FIG. 114B. As when the user highlights and copies the two arguments ‘B1,C1:D2’ 11445 in cell ‘A1’ 11453 and tries to then move to cell ‘A4’ 11493 Excel does not exit cell ‘A1’ 11483 and instead replaces the two arguments ‘B1,C1:D2’ 11445 with ‘A4’ as shown in the formula bar formula 11475 and the in-cell formula 11483. While it is possible to pre-copy cell content (e.g., the content in a cell as text), not cell function argument(s), and paste it into a Microsoft Excel formula, that is not something normally done as user don’t typically have functional arguments sitting around in non-active formula text form.

FIG. 4A and FIG. 4B examples simultaneous selection of multiple individual cell ranges and multi-cell ranges into a Microsoft Excel function. Users in the existing spreadsheets can select one or more cells and/or cell ranges into their functions. FIG. 4A examples a Microsoft Excel user who has selected two cell ranges (462 and 463) and two cells (472 and 473) for specification into the SUM function in cell ‘A1’ 441. The selection process temporarily puts the cell references into the ‘SUM’ formula 442 but as shown in the Function syntax guide 452 those selections are not yet fully instantiated in the formula until the user adds a comma (to start the next argument) or finishes the formula with closing parenthesis. FIG. 4B examples a user typing a comma 447 into the ‘SUM’ function formula 446 which then shows the four selections (467, 468, 477 and 478) are now instantiated in the ‘SUM’ function formula 446 through the Function syntax guide 458 showing ‘number2’ through ‘number5’ having been inputted (shown in bolded blue). The specification of one or multiple cells or ranges works in all three of the input locations (FIG. 2A through FIG. 2C) in Excel and works in the first two locations for the other existing spreadsheets (which lack the Function Formula Builder).

The previously exampled four function argument specification types are representative of those found in the other existing spreadsheets. The only additional situation, no input specification for functions including RAND, does not use an argument specification. FIG. 5 recaps the four different types of Function argument specification in the existing spreadsheets with examples of function applicability and the non-input situation. Our disclosure now focuses on the "Select from a list" option which has one infrequently used approach in traditional spreadsheets of selecting from a fixed list (a list that never changes based on previous argument values). As we will now example our technology supports a dramatically broader set of select from lists options (selection list panel) in the substantially broader set of Function argument specification types supported by our technology as exampled in FIG. 6. FIG. 6 shows twenty-nine total list specification types supported by our selection list panel technology, twenty-eight of which are gray shaded 664 because they are not supported by the existing spreadsheet technologies. For comparison purposes FIG. 6 examples how one of our new functions 'WRITE_2D' (disclosed in U.S. Provisional Patent Application No. 63/240,828), can employ twenty-two of our twenty-eight newly supported specification types 667.

Selection List Panels—Twenty-Eight Additional List Specification Types

We will example a representative number of our twenty-eight additional list argument specification types and in doing so also example our functions with invisible formula arguments, functions controlling cell formats and more functions instantiating outputs to multiple cells. We will start exampling "Multiple separate lists" ('5' through '10' in FIG. 6) and 'Situationally variable content" which is a differentiating factor (not done in any existing spreadsheet function inputs) represented in each of the first column list types 661 in FIG. 6.

Selection List Panels—Multiple Separate Lists

FIG. 7 starts the example with the user starting to double clicking on cell 'A3' 751 which contains a 'WRITE_2D' formula 743 that populates the values in the area 763. In this embodiment of our technology the 'WRITE' area is outlined by the green dot dash line once a cell in the area populated 763 is single or double clicked. FIG. 8 shows the outcome of the double click and the user having moved the cursor 845 into the formula triggering in our technology a HINT (from our filing U.S. Application No. 63/192,475) exampling a FIG. 6 'Multiple separate lists, Situationally variable content, 7. Single specification' example. It displays two separate lists, one listing the 'FIELDS' 864 from which a replacement for the field 'donations' 844 (as mentioned in the instruction sentence 852) could be specified and the second listing the 'OTHER ACTIONS' 894 the user could specify. Each list is situationally variable. The 'FIELDS' list 864 displays only fields in the same data table as the first field 'channel' 843 in the 'WRITE_2D' and it disables the previously used fields 874 as they are not replacement specification options. The 'OTHER ACTIONS' list 894 situationally varies its content based on which argument term the cursor is in, only giving the applicable other actions from that point on. In this example because the function formula has all the required inputs it gives the user the complete set of remaining options 894 which includes setting up to add a constraint, setting up to add an option or finishing the formula. Had the user been in a different argument term they would have gotten a different set of 'OTHER_ACTIONS' or possibly not gotten any (e.g., if the function minimum arguments have not been fulfilled) depending upon the situation. In this situation the user then can make one specification from any of the active options in either of the two separate lists and in this example the user clicks 893 to then add output options.

Figure 9:
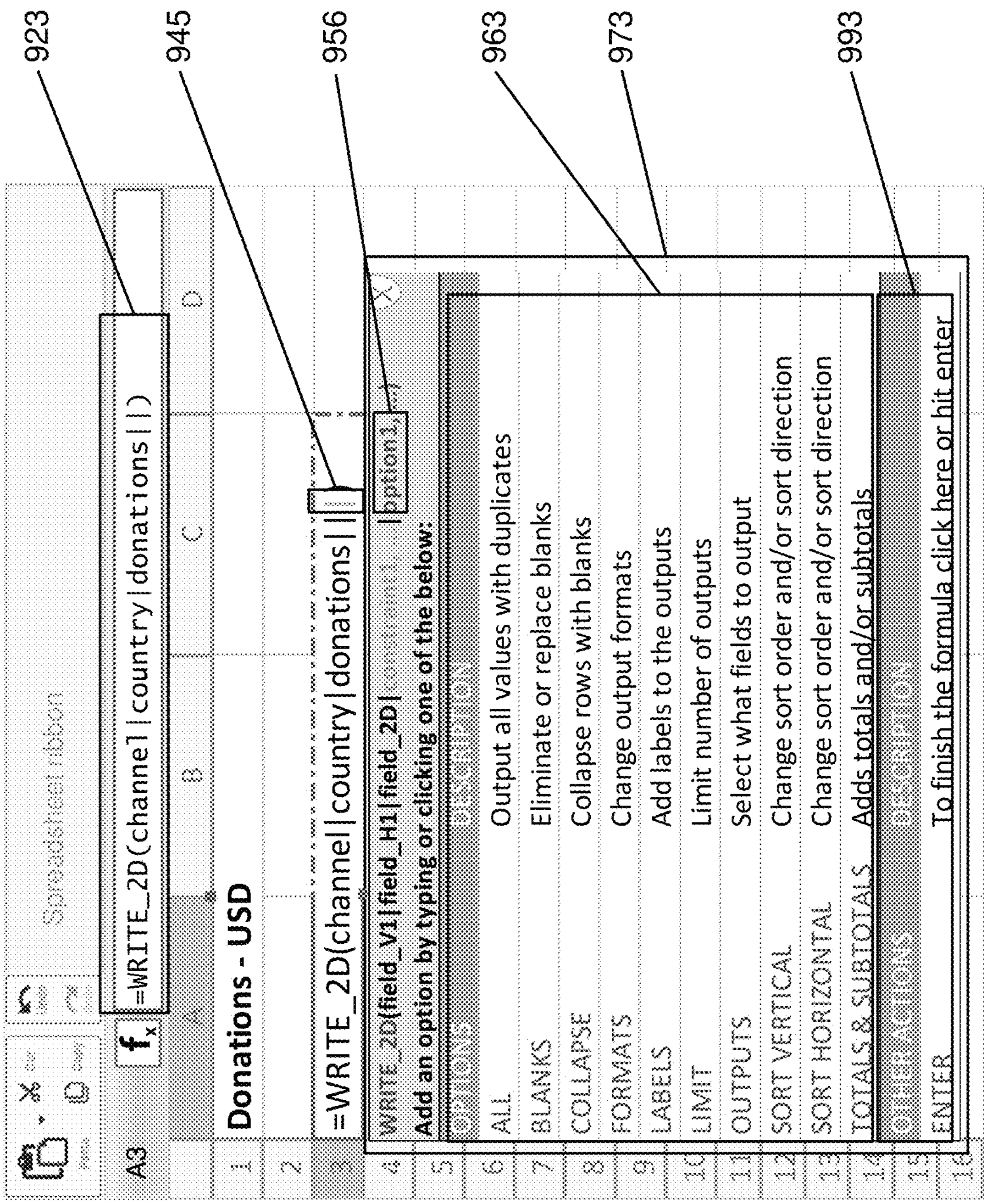

FIG. 9 examples the result of that prior selection with the cursor 945 in the options argument. At this point the user gets another FIG. 6 'Multiple separate lists, Situationally variable content, 7. Single specification' hint 973 which is very different. This hint also has two separate lists, the first 963 giving the situationally applicable 'OPTIONS' and the second 993 giving the situationally specific 'OTHER_ACTIONS'. The options list 963 is situationally determined based on the preceding argument group and argument specifications. For example, the 'BLANKS' option only displays in our technology if at least one of the preceding fields 'channel', 'country' and 'donations' has blank values (e.g., database nulls or empty cells) in their formulaic data. As discussed previously the 'OTHER_ACTIONS' 993 are situationally specific to where the cursor is and the other actions then available, leaving in this situation only 'ENTER'. Again, the user can only make one selection (specification). Note, in some of our other functions and embodiments where none of the options are situationally variable, the comparable HINT examples the FIG. 6 'Multiple separate lists, Mixed fixed and situationally variable content, 9. Single specification' hint. We will continue on with this example showing a capability we call hidden default settings which is applicable to all of the FIG. 6 first column list types 661 but here is exampled fora single list.

Selection List Panels—Single List

In FIG. 10A the user clicks the 'COLLAPSE' 1023 option which in this embodiment opens a popup (selection list panel) exampled in FIG. 10B. In this example the list FIG. 10B opens in the 'On' setting 1038 which is a hidden default setting not visible in the FIG. 9 formula 923:

'=WRITE_2D(channel|country|donations||)'

Our technology supports many different types of function default settings not displayed in a function argument which however can be changed by specifying an optional visible function formula argument or as we will discuss later specifying a setting that is invisible in the formula arguments but visible to the user through another mechanism. In this example the user decides to click 'Off' 1068 as shown in FIG. 10C. The user then clicks the 'Save' button 1089 as shown in FIG. 10D to return to the previous popup shown in FIG. 10E. At that point the user clicks the 'ENTER' 1093 'OTHER_ACTIONS' as shown in FIG. 10E. This results in the change in the 'WRITE_2D' output from the starting situation shown in FIG. 11A 1163 to the after changes output shown in FIG. 11B 1178. The COLLAPSE' selection shown in FIG. 10B through FIG. 10D examples a FIG. 6 'Single list, Fixed content, 1. Single specification' specification type.

In the embodiment of our 'WRITE_2D' technology shown in FIG. 9 through FIG. 11B 'COLLAPSE[ON]' is the default setting (In this example a named argument term but it could have been a more traditional argument) which is not shown in the formula as exampled in 1133 in FIG. 11A. Thereby exampling an option with a default setting of collapse on. However, in this embodiment, after the user changes the option to collapse off 'COLLAPSE[OFF]' 1147 it is shown in the formula 1138 as exampled in FIG. 11B. Our technology supports hidden default values in our spreadsheet functions and then the display of optional specifications overriding the defaults as shown with the named argument term 'COLLAPSE[OFF]' 1147.

Selection List Panels—with Status Selectors

Our specification input controls support other capabilities as well, such as the 'STATUS' 1266 tracker and display shown in FIG. 12 for the 'OPTIONS' 1264. This capability informs the user of the status 1266 of each of the options. Otherwise, the HINT 1274 functions as previously described in this example with the two different (separate) lists 1274 and 1294. FIG. 13A through FIG. 13E examples the same set of user actions as those in FIG. 10A through FIG. 10E with the only difference being the visibility of the status in FIG. 13A and FIG. 13E and the visible 'COLLAPSE' 'STATUS' change in value to 'OFF' 1374 in FIG. 13E. Otherwise the actions 1323, 1338, 1368, 1389 and 1393 are identical and yield the same set of changes shown in FIG. 11A and FIG. 11B. Note, the bolding of the status values can be done many different ways, bolding on values, bolding changes from the default or highlighting some other status.

FIG. 14A and FIG. 14B example a different embodiment of our technology with the 'STATUS' display exampling a related dropdown specification type 1447 for 'COLLAPSE' 1434, in FIG. 14A. The 'ALL' 1424 option in this embodiment employs the same related dropdown specification type as 1447 thereby making the two of them together in the HINT in FIG. 14A an example of a FIG. 6 'Multiple related lists, Mixed fixed and situationally variable content, 15. Single specification' specification type or 16 Multiple specifications depending upon what the user specifies. Multiple if the user specifies both 'COLLAPSE' 1434 and 'ALL' 1424 in FIG. 14A, and single if the user specifies only one. The 'ON' and 'OFF' is the fixed content. Whether the 'ALL' or 'COLLAPSE' is there is the situationally variable content because if there are no duplicates then 'ALL' will not be there and if there are no rows with blanks then 'COLLAPSE' will not be there. The fact that these lists sit within multiple separate lists 1444 and 1454 makes those in total a FIG. 6 '29. Combinations across options lists'. In FIG. 14A the user clicks 'COLLAPSE' 1434 to open the dropdown 1447 allowing the user to make the change 'ON' to 'OFF'; clicking directly on the HINT dropdown 1477 as reflected in the value 'OFF' 1467. These actions then deliver the same set of changes shown in FIG. 11A and FIG. 11B.

Selection List Panels—Multiple Related Lists

FIG. 15 through FIG. 17B example multiple separate lists (e.g., FIG. 16A and FIG. 16E) and 'Multiple related lists' selection list panels (e.g., FIG. 16B through FIG. 16D) with situationally variable content. The charity worker user in this example wants to add totals and subtotals to their 'WRITE_GROUP_2D' output so they click on the 'TOTALS & SUBTOTALS' 1574 option in the HINT 1564 in FIG. 15. The HINT was triggered by the user putting the cursor 1542 at the end of the function formula 1544 in the Formula Bar formula for cell 'A1' 1531. The HINT 1564 is another example of a multiple separate lists (two in this example 1554 and 1584) where both lists contain 'Situationally variable content' (e.g., 'BLANKS' in the first list 1554 only appears if the data includes blanks and the 'OTHER_ACTIONS' list 1584 situationally changes depending upon where the cursor is in the functional formula). Another example of FIG. 6 'Multiple separate lists, Situationally Variable Content, 7. Single specification'.

FIG. 16A through FIG. 16E examples the actions the user takes in this embodiment to do the multiple specifications for the totals and subtotals they want. This examples FIG. 6 'Multiple related lists, Mixed Fixed and Situationally Variable Content, 16. Multiple specifications' in a dedicated UI (e.g., FIG. 16B). FIG. 16A examples the 'TOTALS & SUBTOTALS' click 1643 selection in the HINT which opens in this embodiment the 'TOTALS & SUBTOTALS' popup shown in FIG. 16B. That popup examples situational content in that the listing of the Vertical and Horizontal Totals and Subtotals displayed varies by the previous function inputs. In this example the two vertical field inputs 'continent,country' 1533 in FIG. 15 give the user the option of having vertical subtotals while having only one horizontal field input 'type' 1534 means our technology will not present the option of a horizontal subtotal because the lack of a second horizontal field leaves nothing to subtotal. The fixed parts of the lists are the 'First' and 'Last' checkboxes 1628 in FIG. 16B for each total or subtotal option. The Multiple related lists are three related lists, one 'Vertical' and 'Totals: ', two 'Vertical' and 'Subtotals:' and three 'Horizontal' and 'Totals:'. In this situation the user can make one or multiple selections as they have opted to do in 1659 in FIG. 16C. Those multiple selections are then recorded within the function when the user clicks 'Save' 1698 in FIG. 16D. The totals and subtotals become visible in this embodiment once the user finishes the function formula by clicking 'ENTER' 1693 in FIG. 16E (or by just hitting the key enter). The before and after the change is shown in FIG. 17A (before) and FIG. 17B (after) with the before formula 1734 changing to the after formula 1737 containing both a 'TOTALS[VL, HL]' 1738 named argument term and a 'SUBTOTAL[VL]' 1747 named argument term in an options argument group. As our technology has the ability to populate more than one function argument from the same selection UI. In this example this delivers the totals 1797 and 1769 in the last positions vertically and horizontally, and the vertical subtotals 1757, 1777 and 1787 last within their respective subtotal groups. All of this done from the formula 1737 in cell 'A1' 1746 in FIG. 17B which changed from the formula 1734 in cell 'A1' 1741 in FIG. 17A. The same UI could have been used by the user to make a single selection, had they for example only wanted vertical totals at the bottom, thus exampling FIG. 6 'Multiple related lists, Mixed Fixed and Situationally Variable Content, 15. Single specification'.

Selection List Panels—Multiple Related Lists with Dropdowns

Figure 18B:
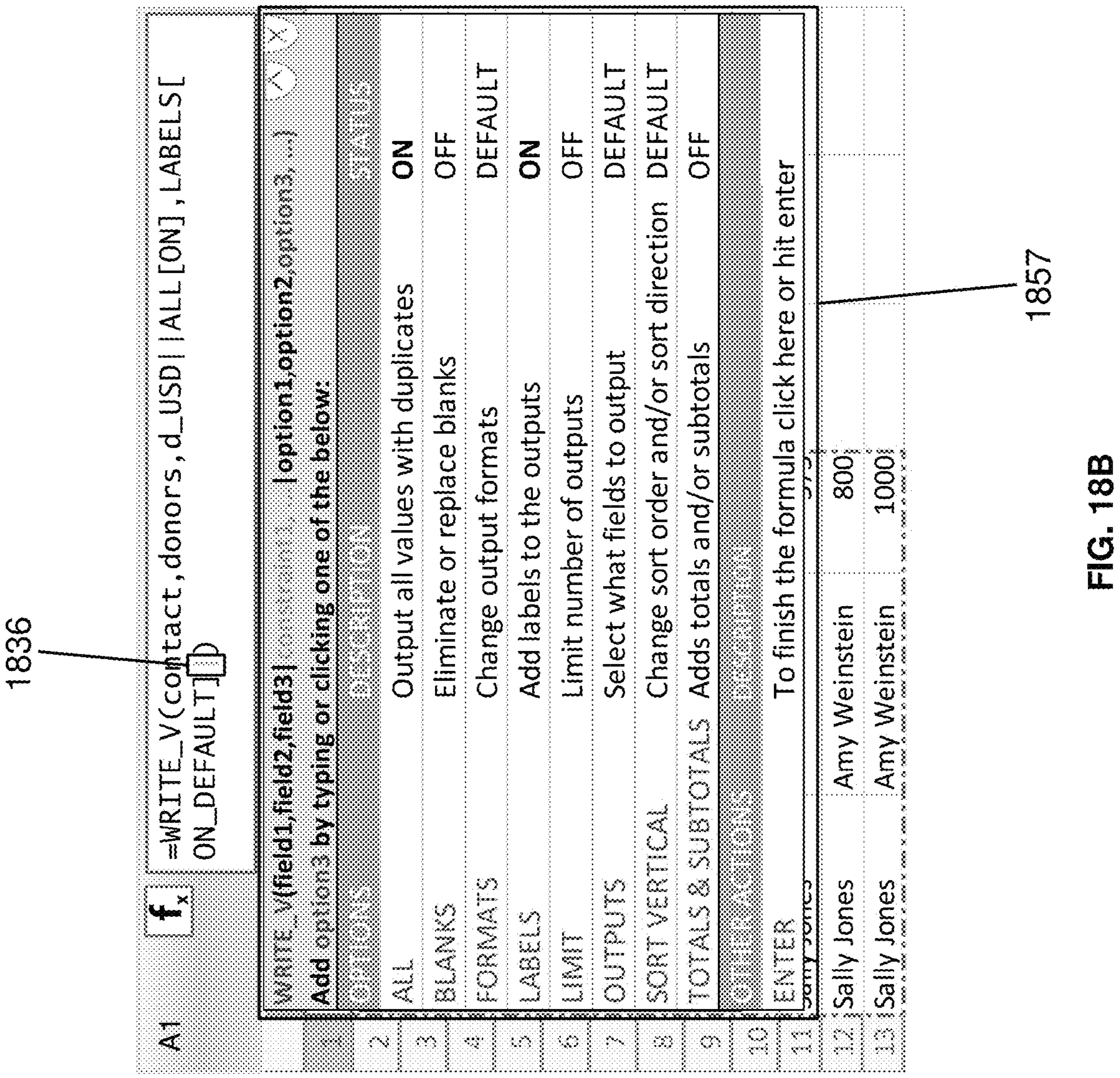
Figure 18A:
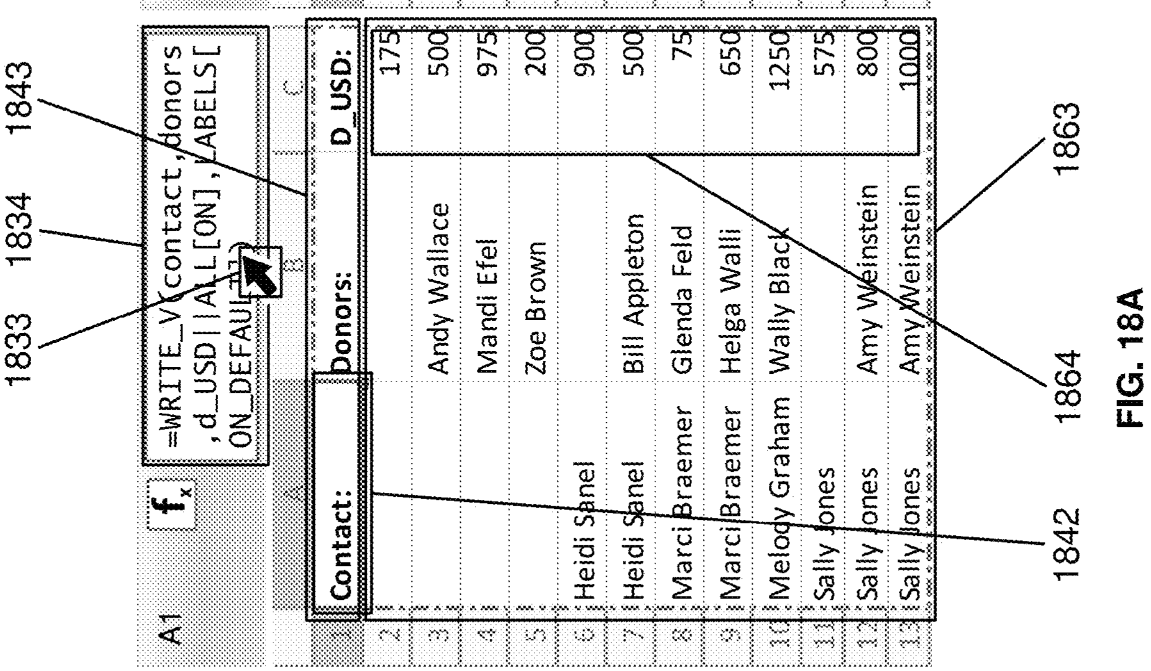
Figure 20A:
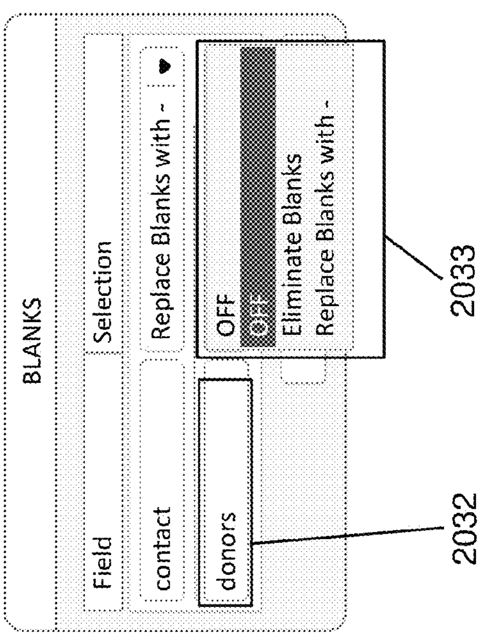
Figure 20B:
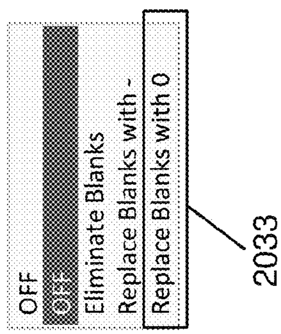
Figure 20C:
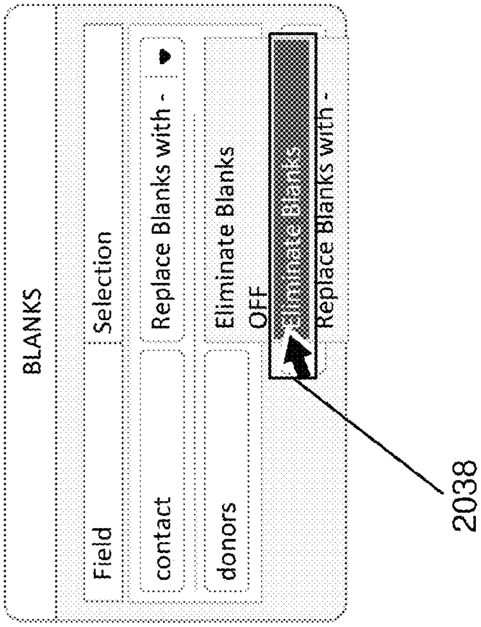
Figure 20E:
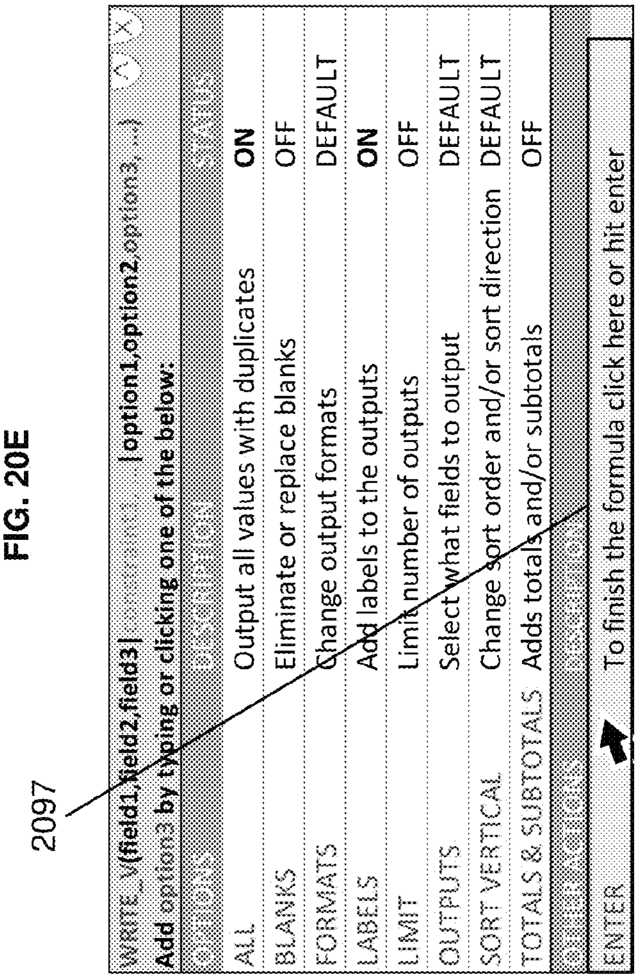
Figure 20D:
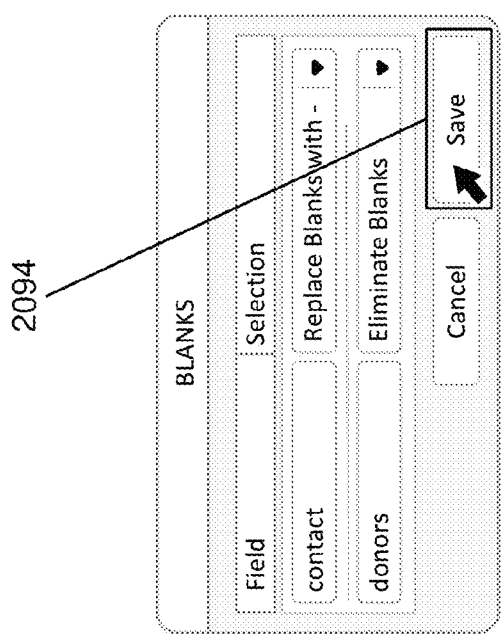

FIG. 18A through FIG. 21B example our technology supporting 'Multiple related lists' with 'Situationally variable content' in a dedicated UI selection list panel with dropdowns. FIG. 18A examples a 'WRITE_V' function formula 1834 in cell 'A1' 1842 where the charity user decides they would like to remove and alter some of the blank content. They double click 1833 into the formula bar formula 1834 putting the cursor 1836 in FIG. 18B just inside the closing parenthesis after the last populated option. This opens the HINT 1857 from which the user clicks the 'BLANKS' 1944 option in FIG. 19A. In this embodiment this automatically opens the popup in FIG. 19B which contains the 'Multiple related lists. The contact' 'OFF' related combination 1928 is one list and the 'donors' 'OFF' related combination 1938 is second list of the multiple lists. Both of those lists are situationally determined based on which formula specified fields contain blanks, in this example 'contact' and 'donors' but not 'd_USD' (which contains no blanks as shown in 1864 in FIG. 18A). The related part of the lists is the 'Field' and 'Selection' relation. The dropdown in the selection list panel is opened by the user clicking the button 1929 in FIG. 19B which opens a dropdown list of potential selections for the user as shown in 1968 in FIG. 19C. In this example that list is a situationally variable set of options that depends on the data type of the field. Text fields like 'contact' and 'donation' in this embodiment get three options, 'OFF', 'Eliminate Blanks' and 'Replace Blanks with —'. However, had one of the fields been numeric it would have gotten a fourth option 'Replace Blanks with 0' 2033 exampled in FIG. 20B. Zero makes total sense for numerical fields but would make no sense for text fields and therefore the option list offered is situationally variable. Thus, depending on the number of selections by the user this examples FIG. 6 'Multiple related lists, Situationally Variable Content, 13. Single specification' or '14' Multiple specifications'. Continuing on with the example the user then specifies 'Replace Blanks with —' 1988 in FIG. 19D to then see the changed selection in FIG. 19E 1973 before starting the process to change the 'donors' setting by clicking the dropdown 1984. This then opens for the field 'donors' 2032 the related selection dropdown 2033 in FIG. 20A from which the user selects 'Eliminate Blanks' 2038 in FIG. 20C. After which the user clicks 'Save' 2094 in FIG. 20D and then clicks 'ENTER' 2097 in FIG. 20E to see the result 2118 in FIG. 21B.

FIG. 21A and FIG. 21B example the before and after for the FIG. 6 'Multiple related lists, Situationally Variable Content, 14. Multiple specifications'. The specification 'Eliminate Blanks' 2038 for 'donors' in FIG. 20B results in the elimination of the rows 2133, 2153 and 2173 in FIG. 21A (the before) which are not shown in the output 2157 in FIG. 21B (the after). The specification 'Replace Blanks with —' 1988 for 'contact' in FIG. 19D results in the blanks 2142 in FIG. 21A (the before) being replaced by dashes in 2136 in FIG. 21B (the after). These multiple specification also result in instantiating multiple arguments 'BLANK_AS_DASH[contact], BLANK_ELIMINATE[donors]' 2128 in the function formula 2118 in FIG. 21B (the after), which of course are not there in the before function formula 2114 in FIG. 21A.

Selection List Panels—Reorderable Lists

FIG. 22 through FIG. 26B examples two embodiments of our 'Reorderable specification lists' spreadsheet function argument specification types. They will be exampled for cancer researcher who has in vitro (petri dish) test results for two different treatments (A and B) each with a test and control done for two different cancer types (Colon and Lung) in labs in several countries. They have outputted the results using one of our 'WRITE_2D' functional formulas with some options already specified. They want to sort the columns of results by the best to the worst average performance, which in this example means the treatments with largest decline in cancerous mass (most effective treatment killing the cancer) to the one least effective (one with the largest weight gain).

Figure 22:
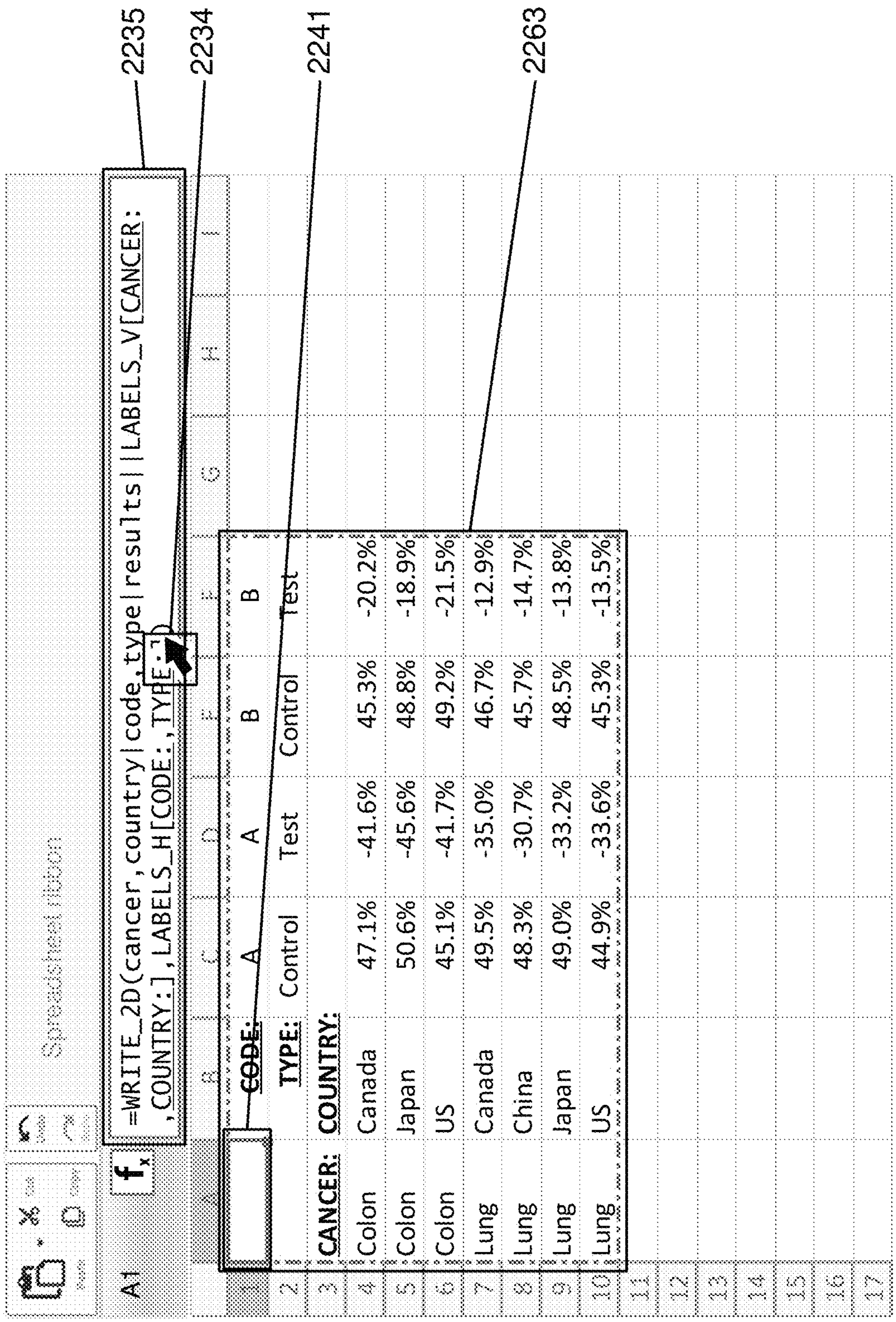
Figure 23:
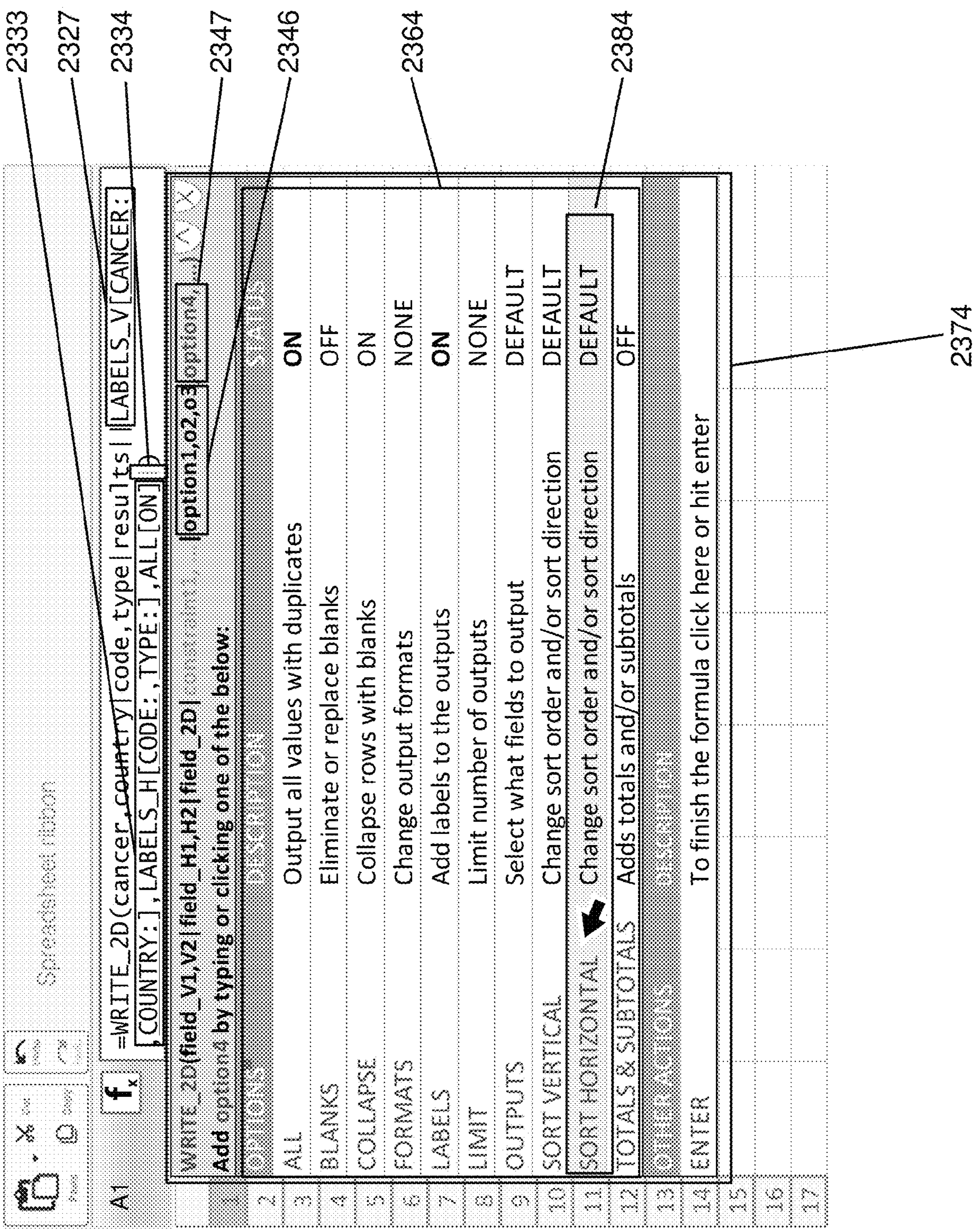

FIG. 22 examples the user clicking 2234 into the formula bar formula 2235 just before the closing parenthesis for cell 'A1' 2241. That formula has populated the values in the cells 'A1' to 'F10' and in this embodiment when a cell in the populated area 2263 is navigated through or opened the entire area is outlined with a green dot and dashed line to let the user know it is controlled by one formula, in this example the 'WRITE_2D' 2235. Other embodiments would use different ways to identify the area or not identify it. In this embodiment of our technology opening the formula with the cursor 2334 (in FIG. 23) just before the function closing parenthesis (in the options argument group) opens the HINT 2374 giving the user the option to alter or add other options 2364. The user can see that there are already three options specified looking in the syntax guide 2346 and the blue 'option4' 2347 tells the user if they select another option it will be the fourth. Looking in the formula the user can see that the options in this embodiment are supported by our named argument term technology with multiple arguments (named argument term groups) as exampled by 2333 and 2327 where:

'LABELS V[CANCER:,COUNTRY:]' has two comma separated arguments, 'LABELS H[CODE:, TYPE:]' has two comma separated arguments, and ALL[ON] has one argument.

When the user clicks on the 'SORT HORIZONTAL' 2384 option it automatically takes them to either FIG. 24A or FIG. 24C, which are two different example selection list panel UIs' for doing the same 'HORIZONTAL SORT'. In both of these examples the user is presented with a situational first list showing the previously specified horizontal fields 'code' and 'type' and 'AVERAGE' (2443 and 2447) and a second specification list that has fixed 'Sort Direction' options (2445 and 2449). Because the user wants to sort by the best performance they start by turning on the 'AVERAGE' calculation to determine the best vs. the worst performance. In both examples this is initiated by clicking a dropdown selector (2455 and 2428). In FIG. 24B the user gets a 'Sort Direction' dropdown selector 2493 where they select 'Low to High' 2483 replacing 'OFF' and thereby making 'AVERAGE' the '3' 2533 'Sort Order' in FIG. 25A. However, the user wants it as the first sort so in this embodiment they grab the third sort 'Drag & Drop' (movement) icon 2531 and drag it above the first and second sorts 2521 to get the position 2571 in FIG. 25B so that 'AVERAGE' is now the '1' 2573 'Sort Order'. When the user clicks 'SAVE' 2599 they get the results shown in FIG. 26B (as compared to the before in FIG. 26A).

Picking back up with the other UI approach example the user clicked on the first sort dropdown 2428 in FIG. 24C and was presented with a dropdown of the options 2487 in FIG. 24D showing 'code' as the current selection 2467 and 2477. The user then selects 'AVERAGE' 2537 in the dropdown 2527 as shown in FIG. 25C. In this embodiment that automatically moves 'AVERAGE' 2576 to the '1' 'Sort Order', turns it on with the first sort order 'Low to High' as its default setting and displaces the other sorts in the remaining order. This is a little different than in a typical spreadsheet multi-sort where it would simply replace 'code' with 'AVERAGE' which our technology could have done. With the order as the user wants it (2576 and 2586) and identical to that of the other approach in FIG. 25B the user gets the same result shown in FIG. 26B when they click 'SAVE' 2599.

Summarizing, FIG. 24A, FIG. 24B, FIG. 25A and FIG. 25B examples FIG. 6, 'Reorderable lists, Mixed fixed and situationally variable content, 27. Movement', while FIG. 24C, FIG. 24D, FIG. 25C and FIG. 25D examples FIG. 6, 'Reorderable lists, Mixed fixed and situationally variable content, 28. Selection'. FIG. 26A and FIG. 26B example the 'HORIZONTAL SORT' before and after either of the reorderable specifications. The columns of the after output 2678 have been resorted relative to the before order 2674. For example, the first column 'A' 'Control' 2673 (before) has moved to the last column 2679 (after). The last column 'B' 'Test' 2673 (before) has moved to the second column 2677 (after). From a sorting formula specification basis many changes have been made, 'AVERAGE' has been added to the sort and made "Sort Order' '1', 'code' has been moved to 'Sort Order' '2' and 'type' has been moved to 'Sort Order' '3'. These multiple specifications are captured in the argument 'SORT_H[AVERAGE{!AZ},code{!AZ},type{!AZ}] (2648) which is in the after formula 2637 but not in the before formula 2633. This single named argument term group successfully captured many different specifications, another capability of our technology. Had this been done in an embodiment with invisible arguments the formula result would instead look like 2627 in FIG. 26C.

Out technology also supports a broader set of reorderable specifications where the multiple lists all have fixed content or where the multiple list all have situationally determined content. However, since we have already exampled the combination of fixed content and situationally variable content in the preceding examples we will next example 'Multiple cascading selector lists' while simultaneously exampling our new technology where our functions control not only the cell values but the formatting of the cells instantiated by the function.

Function Controlled Formats (Vs. Cell-Controlled Formats)

Before we example our function-controlled formats and "Multiple cascading selector lists", we will introduce what our function-controlled formats technology does. It enables our functions to control the formatting (e.g., font, font size, bolding, underlining, fill and borders) of the cells which they instantiate overriding any existing cell applied formats and changing the formatting as dictated by the function. Before explaining how our technology works we will example it and its differences from existing spreadsheet technologies and then we will example how our technology works.

FIG. 27A and FIG. 27B examples our 'WRITE_2D' function formulas (2743 and 2748) controlling the formatting of cells they instantiate. In FIG. 27A the cancer researcher has formatted, via our function technology, the output of the 'WRITE_2D' function in FIG. 26B. In FIG. 27B the user has added a constraint 'date{<'6/1/21'}' eliminating the 'Japan' and 'China' results (because those tests were done after 6/1/21). Our 'WRITE_2D' technology instantiates a smaller output in cells 'A1' to 'F7' 2767 versus the previously unconstrained output in cells 'A1' to 'F10' 2773 as disclosed in U.S. Provisional Patent Application No. 63/240,828. However, with our new technology the 'WRITE_2D' also controls the formatting of those cells such that the cells no longer instantiated by the function 'A8' to 'F10' 2797 return to their unformatted state (e.g., general values and no fill, the default font and type size which in this example was their previous state). The merging of the 'Colon' and 'Lung' heading cells 2781 automatically adjust to their smaller merged states 2776 with the merging controlled by the function not the cells that are being merged. As contrasted with how formatting works in existing spreadsheets where it is only controlled by the cell and not by any spreadsheet predefined function.

FIG. 28A and FIG. 28B examples how formatting works in existing spreadsheets using Microsoft Excel. We have set up the same values and formatting as FIG. 27A as none of the existing spreadsheets have 'WRITE' functions. So, a function cannot change the content in FIG. 28A so instead we will clear the contents as shown in FIG. 28B. Clearing the content does not change the formats as the fill and borders are the same in 2878 as in 2874 and the merge is the same in 2876 as in 2872. And if a user where to type a value into one of those cells they would find the font, type size and general or percent value formatting is still applicable. That is not the case in our technology for our function set formatting, as should a user type a value into any of the cells in 2797 in FIG. 27B there would be none of the specialized formatting seen in the same cell in FIG. 27A because the function removed it when it stopped instantiating the cells. Even with more advanced existing spreadsheet formatting capabilities, like the conditional formatting exampled in FIG. 29A through FIG. 30C, the cell controls the formatting and it is still there if the content is no longer there as shown in FIG. 30A through FIG. 30C.

FIG. 29A through FIG. 29D examples a user applying conditional formatting in Microsoft Excel (representing existing spreadsheets). It is a formatting capability setup from the 'Format' menu dropdown 2924 by selecting the 'Conditional Formatting . . . ' selection 2934 in this example for the cells 'A1' to "D7' 2952. This opens the popup in FIG. 29B where the user needs to know to click the '+' 2991 in the lower left corner to open the popup 2957 in FIG. 29C to set a conditional formatting rule. The user decides they want green for the lowest values so the click the color dropdown 2968 to get the color selector in which they click green 2987. Then they click 'OK' 2979 to get to the popup shown in FIG. 29D, which is the popup in FIG. 29B with the added rule set applied to the range '$A$1:$D$7' 2928. When the user clicks 'OK' 2939 they get the conditionally formatted cells 3073 in FIG. 30A. If the user then erases some or all of the values as done by the user for cells 'A5' to 'D7' 3075 in FIG. 30B the formatting remains as shown by typing a value '0.0%' into cell 'B7' 3087 in FIG. 30C and seeing the conditional formatting reappear despite it not showing in 3085. The conditional formatting is in the cell area 3073, 3075 and 3077 whether it is showing or not. Our format controlling functions technology works very differently than existing spreadsheets adding an entirely new dimension to how formats are controlled.

Function Controlled Formats—Selection List Panel Examples (Including Multiple Cascading Selector Lists)

Figure 31B:
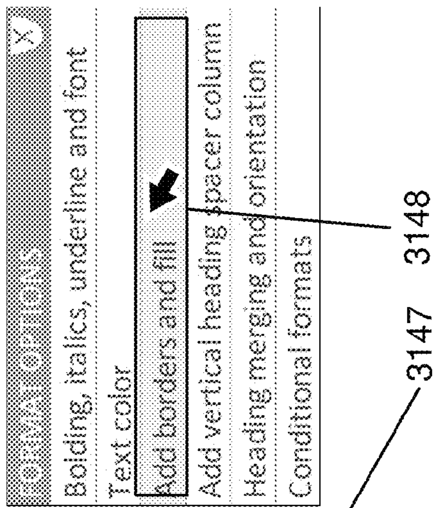
Figure 31A:
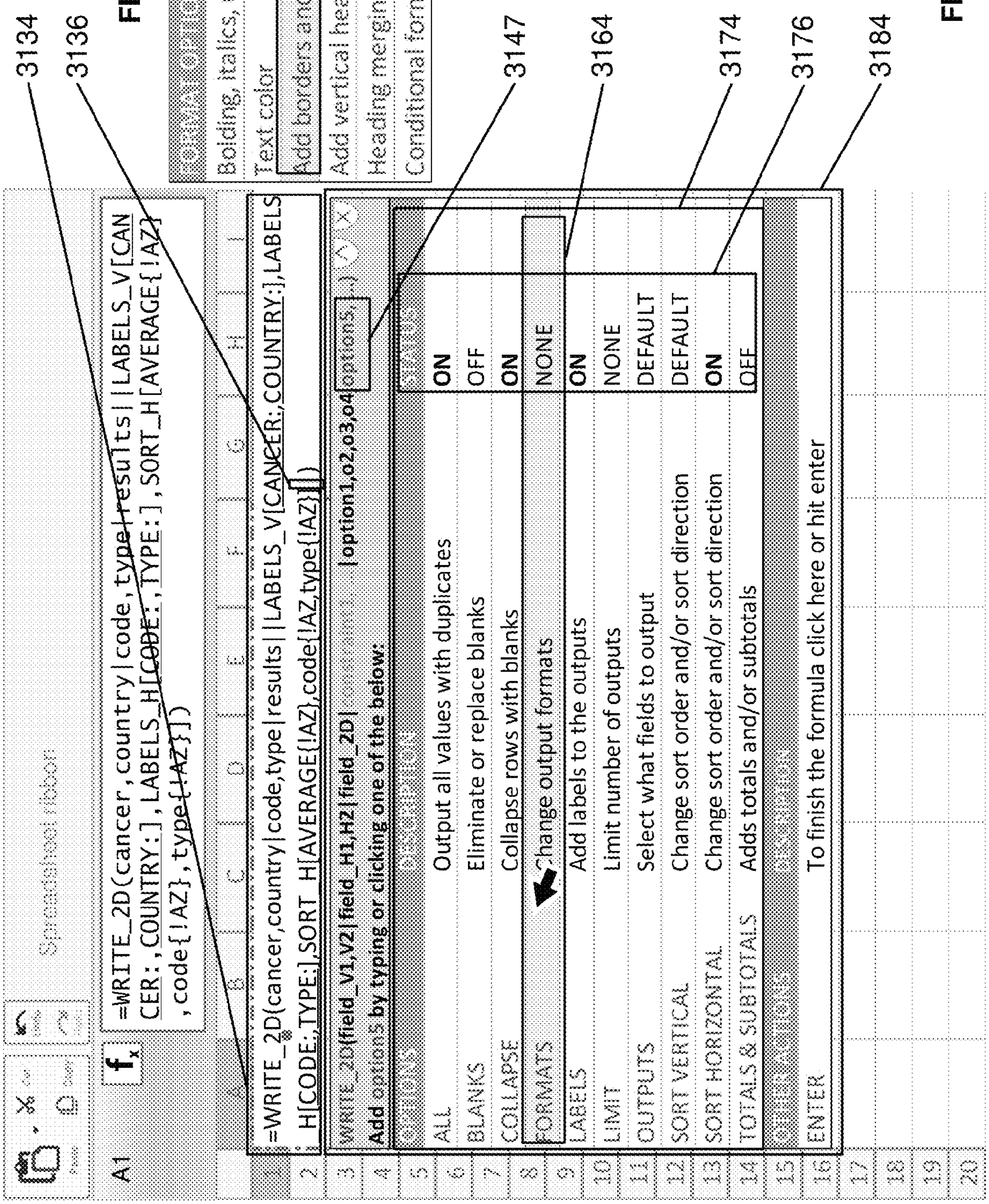

FIG. 31A through FIG. 36B examples a number of our spreadsheet argument specification types, including 'Multiple cascading selector lists', used for specifying function-controlled formats. Our charity user wants to format the output in FIG. 26B via the function rather than the cells so that when the output changes the formats change like exampled in FIG. 27A and FIG. 27B. To do so the charity user will example creating the 'WRITE_2D' formula in FIG. 27A starting from the formula in FIG. 26B. FIG. 31A examples the user reopening the formula in cell 'A1' 3134 with the cursor 3136 just before the function closing parenthesis therefore in our technology opening a HINT 3184 giving the user the opportunity to add 'option5' 3147 in the option selection list 3174. They select and click on 'FORMATS' 3164 which in this embodiment opens the popup selector in FIG. 31B. The user then clicks on 'Add borders and fill' 3148 which automatically opens the selection list panel popup in FIG. 32A.

Figure 32B:
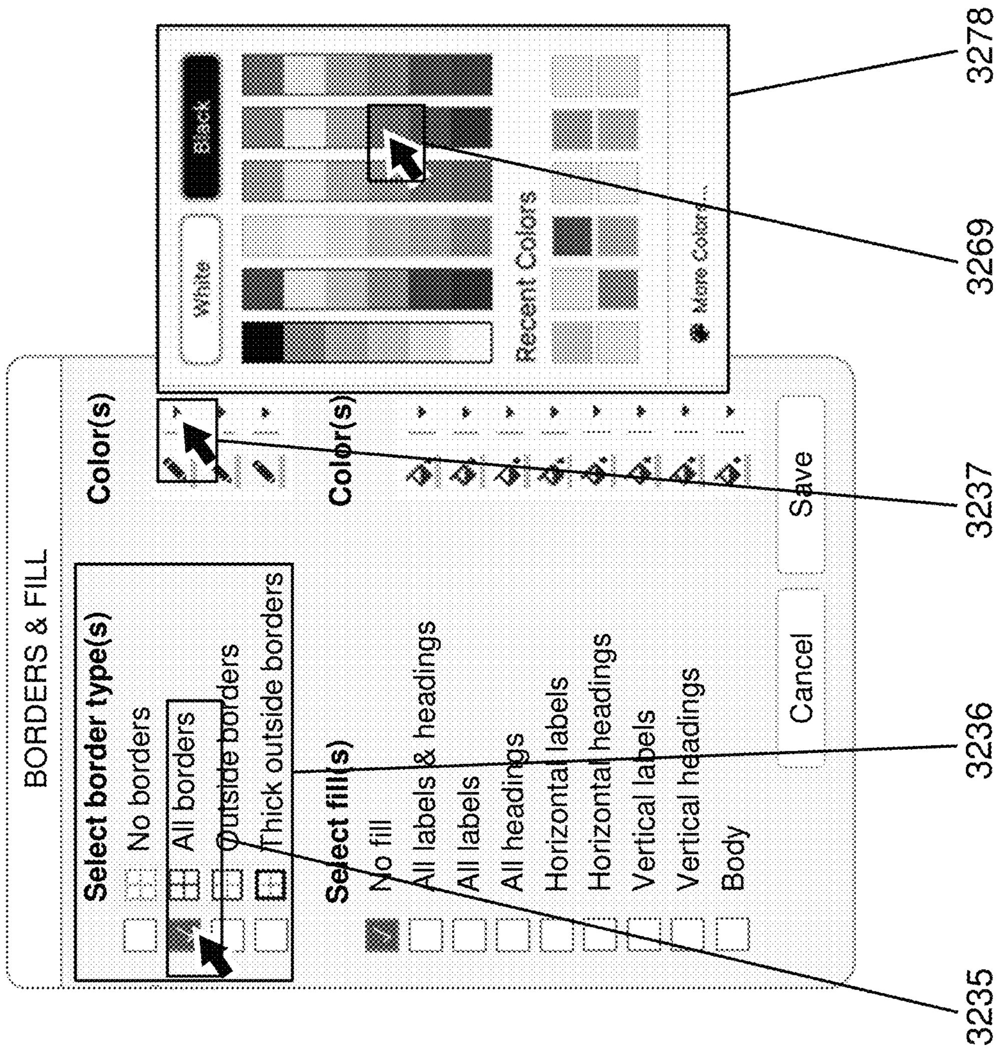
Figure 32A:
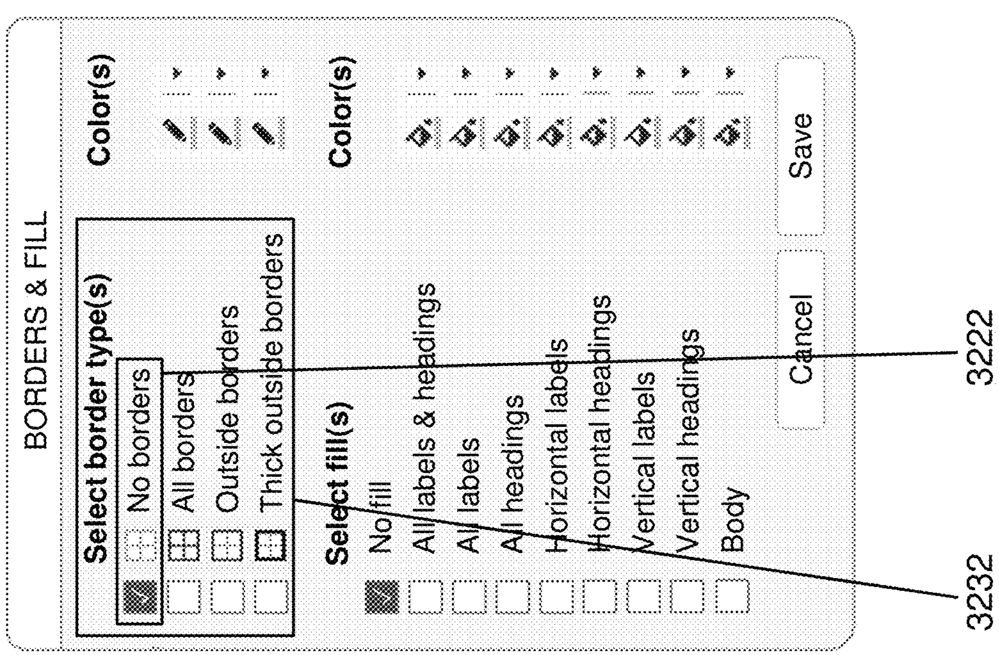

FIG. 32A examples a 'BORDERS & FILL' popup selector where the user can make begin to make one or more sets of cascading selections. The user has decided they want to color all the borders of the cells with instantiated values blue. The first decision is to change the 'Select border type(s)' 3232 from 'No border' 3222. In FIG. 32B the user selects from the Select border type(s)' list 3236 'All borders' checking the box 3235 (first border selection) which then cascades to selecting the border color which they start clicking the 'Color(s)' selector 3237. They then select a blue color 3269 in the color selector 3278 making the second of the cascading selections completing the 'Single specification set'. Thus, they have completed a FIG. 6 'Multiple cascading selector lists, Fixed content, 17. Single specification set'.

The user then decides they would like to fill the output with three different shades of green, a dark shade for the labels, a lighter shade for the headings and the lightest shade of green for the body of the output. They replicate in FIG. 33A the same multiple cascading selection process exampled in FIG. 32A and FIG. 32B for the 'All labels' 3343 selection of dark green, for the 'All headings' 3353 selection of a lighter green, and for the 'Body' 3363 selection of an even lighter green. These specifications exampled the FIG. 6 'Multiple cascading selector lists, Mixed fixed and situational variable content, 22. Multiple specification sets'. It is situationally variable because the if the labels capability was turned off then those selections would not be there and are thus situationally variable on the function settings. The color selections are visible in the popup in FIG. 33A and then visible in the output shown in FIG. 36B. At that point the user is done setting up 'BORDERS & FILL' so they click the 'Save' button 3374 and are returned to the popup in FIG. 33B.

Figures 33A, 33B, 33C, 33D:
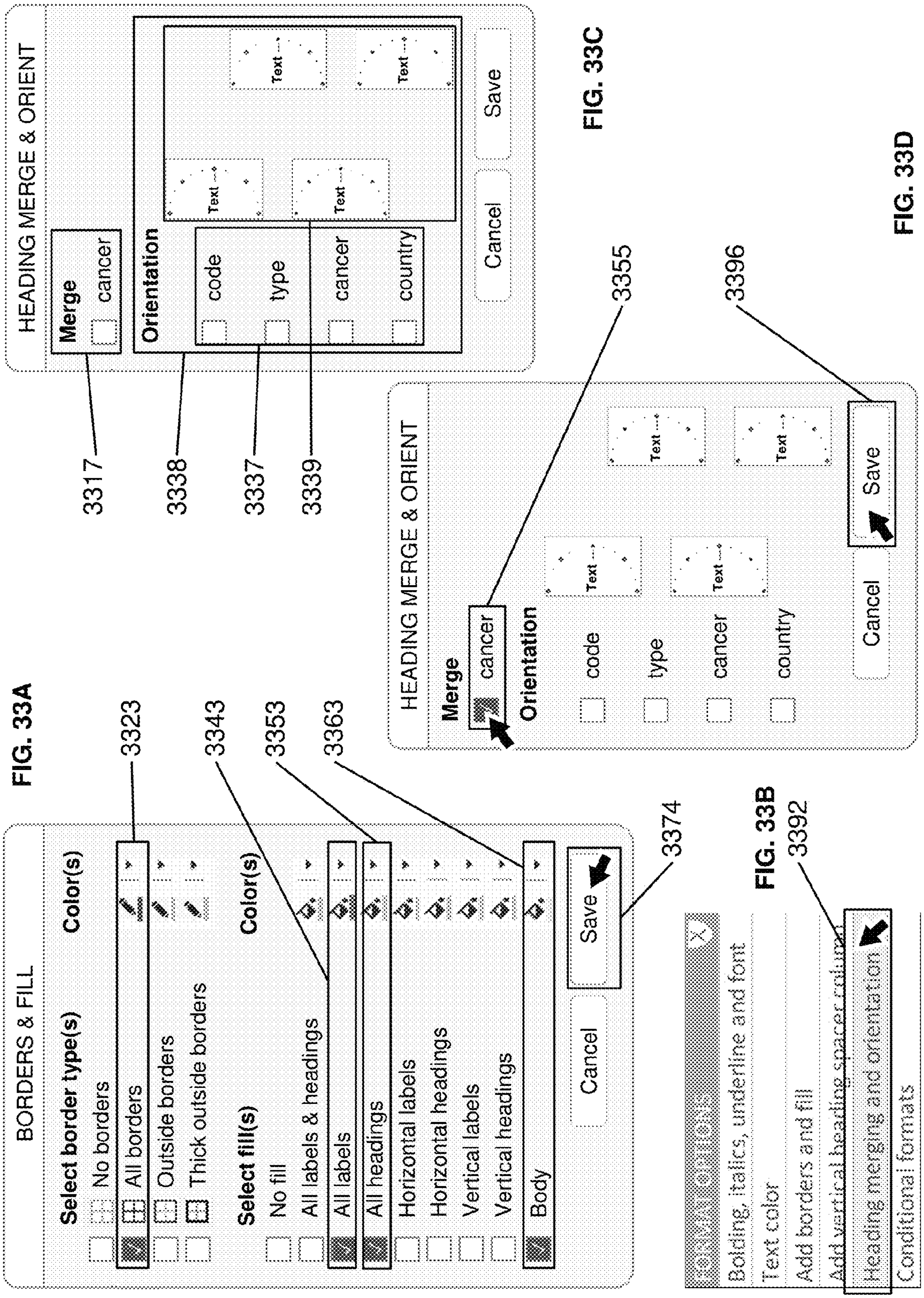
Figures 34A, 34B, 34C, 34D, 34E:
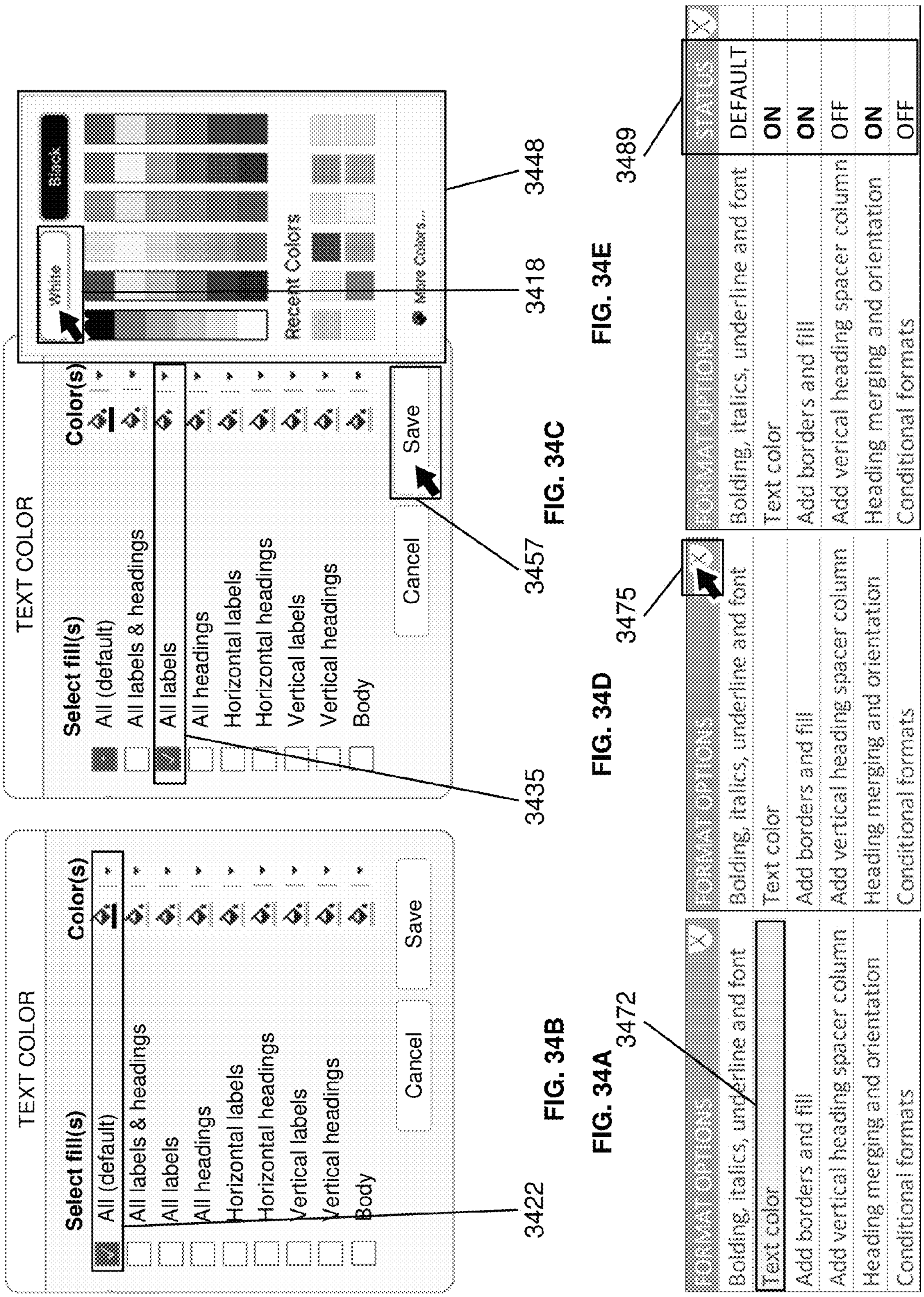

This time the user decides to click on 'Heading merging and orientation' 3392 which automatically opens FIG. 33C. FIG. 33C examples a FIG. 6 '29. Combinations across options' specification type. The 'Merge' 'cancer' check box 3317 is a 'Single list, Situationally variable content, 3. Single specification' which situationally shows only the field(s) which can be merged, which in this function formula is only 'cancer'. The 'Orientation' section 3338 of the popup in FIG. 33C examples a FIG. 6 'cascading selector lists, Mixed fixed and situationally variable content', supporting a '21. Single selection set' or a '22. Multiple selection sets' depending upon what the user does. The situational part is the fields 3337 which are situationally variable with the fields input in the function formula 3134 in FIG. 31A. The fixed part are the orientation selectors 3339 which do not change with content. The Multiple cascading is the user needs to first click specify field check box 3337 they want and then specify the orientation in its respective orientation selector 3339. Thus, with the combination of 'Merge' and 'Orientation' the popup in FIG. 33C examples a combination across options.

In this example the user makes a single specification to 'Merge' 'cancer' in FIG. 33D by checking its box 3355 and then clicks save 3396. This returns the user to the popup in FIG. 34A where the user clicks on the 'Text color' option 3472. That automatically opens the 'TEXT COLOR' popup in FIG. 34B which is another FIG. 6 'Multiple cascading selector lists, Mixed fixed and situationally variable content', supporting a '21. Single selection set' or a '22. Multiple selection sets' depending upon what the user does. In this example the user then clicks the 'All labels' option 3435 in FIG. 34C to then open the color selector 3448 and specify 'White' 3418. Then the user clicks 'Save' 3457 to go back to the popup in FIG. 34D which they click close 3457 to return to the popup HINT 3574 in in FIG. 35. Had the selector in FIG. 34A and FIG. 34D has a configuration 'STATUS' as exampled in FIG. 34E, then the 'STATUS' for 'Text' color' would show 'ON' as it does in 3489 FIG. 34E. Similarly, the HINT in FIG. 35 shows an 'ON' status for formats 3565 and the formulas in cell 3545 and the formula bar 3525 contain the multiple format arguments. The user then clicks the 'ENTER' 'OTHER_ACTIONS' 3594 to get the result in FIG. 36B.

FIG. 36A and FIG. 36B examples the before (FIG. 36A) to after (FIG. 36B) changes from our function-controlled format specifications. The before output area 3673 is transformed in the after (FIG. 36B) to have dark green fill and white text for the labels 3677, lighter green fill for the headings 3678 and 3687, even lighter fill for the body of the results 3688, merge for the 'CANCER' values 'Colon' and 'Lung' 3686 and blue borders throughout the output results 3678, 3687 and 3688. The 'WRITE_2D' formula 3637 now controls the formatting as exampled in FIG. 27A and FIG. 27B. The formula 3637 examples the large number of arguments added for formats vs. preformats 3643. These arguments are not easily done because of the number of specifications and their need to identify colors (e.g., in this embodiment using hex color numbers).

At this point we have exampled all the major categories of spreadsheet function argument specification types 661 in FIG. 6 as well as examples of '29. Combinations across options'. We have given a number of examples of 'Fixed content', 'Situationally variable content' and 'Mixed fixed and situationally variable content'. We have also given a number of examples of 'Single specification', 'Multiple specifications', 'Single specification sets' and 'Multiple specification sets'. While we will continue to example spreadsheet function argument specification types we will orient our examples to demonstrate other capabilities of our technology as well.

Invisible Function Arguments

The formula 3637 in FIG. 36B examples a challenge of existing spreadsheet technologies which record every formula specification in a function argument. In this example the option list becomes very long with many arguments that are not easy for users to understand, e.g., many users have no idea what a color hex code is. Additionally, these argument codes are not necessarily the easiest way for a user to understand what they are doing. As such, our technology supports dramatically simplifying the function arguments and using our more visual specifications to display the function formula user specifications.

Figures 38A, 38B, 38C, 38D:
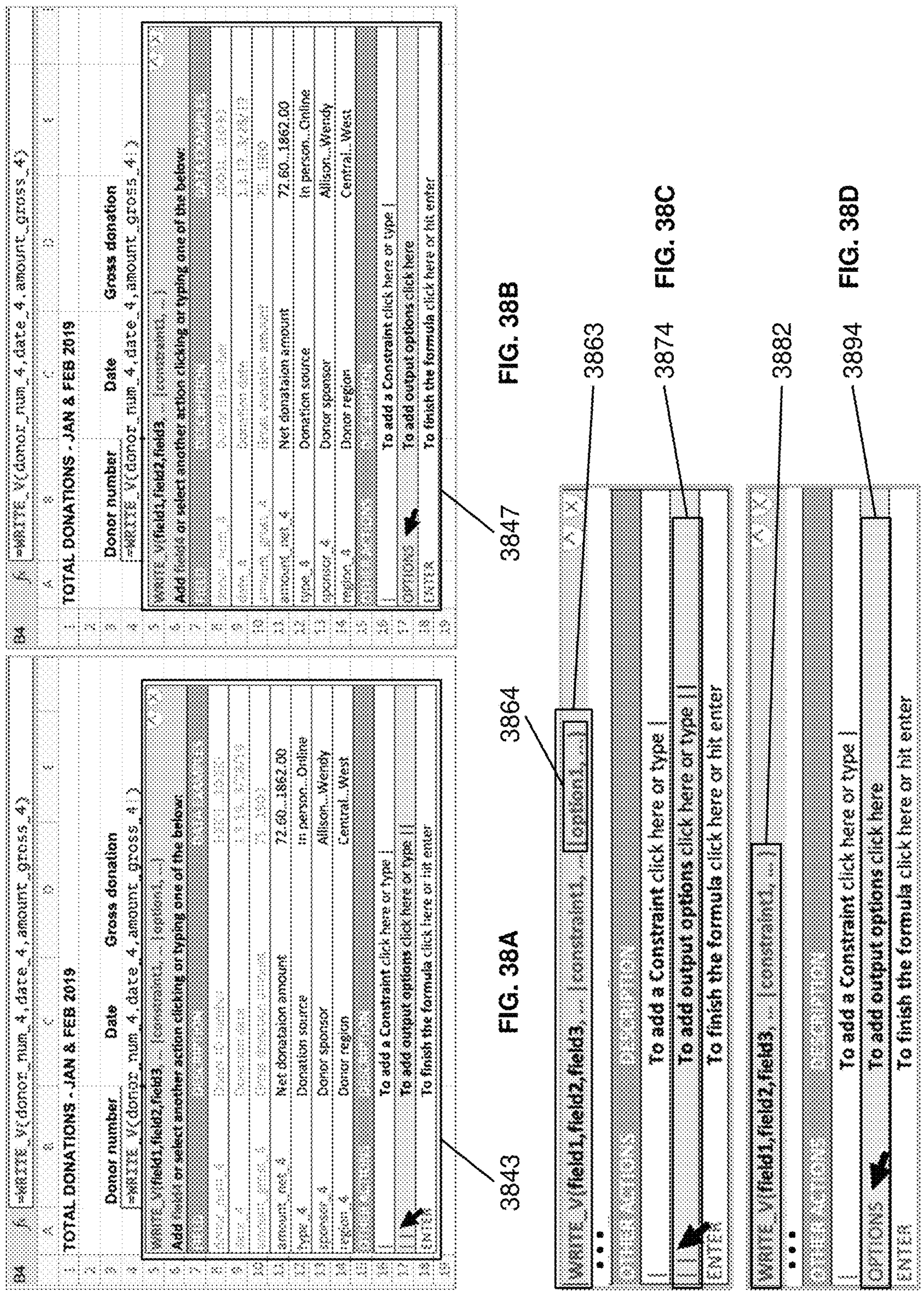

FIG. 37A and FIG. 37B example one embodiment of how our invisible function arguments work. In this embodiment the option arguments are made invisible thereby making the long and complex formula 3743 in FIG. 37A very short and simple by comparison in function formula 3737 in FIG. 37B. One way the invisible function arguments can be instantiated and revisited/altered is using our HINTs as exampled in FIG. 38A through FIG. 38D. Here we have altered an example in the U.S. Provisional Patent Application No. 63/192,475 to show how this technology is compatible with the previous HINT filing. Instead of having the options as the last argument term in the 'WRITE_V' function exampled in FIG. 38A and blown up in FIG. 38C, the options would be accessed as shown in FIG. 38B and blown up in FIG. 38D. In our previous functional formula embodiment options are an argument term 3864 in the formula syntax 3863. In our new technology options are an invisible argument term not shown in the formula syntax 3882. The new HINT 3847 looks and operates in a similar manner to the previous HINT 3843 with the user clicking an 'OPTIONS' 3894 rather than in the previous embodiment click 3874 to take them to the option argument group input 3864. Otherwise, as we will now example the specification UIs will work the same way simply recording the user specifications for use and later user review and editing, as desired, without displaying them in the function formula. Instead, in this embodiment the user reopens the option hint to see the current settings and make any desired changes.

FIG. 39 through FIG. 41 example setting up an invisible formula option argument using the 'OPTIONS' variant of our HINT technology. In FIG. 39 the user double clicks into the 'WRITE_2D' formula in cell 'A3' placing the cursor 3955 just before the formula closing parenthesis. This automatically opens our HINT 3974 showing the user their different actions. The user clicks the 'OPTIONS' 3984 selection in the 'OTHER_ACTIONS' list which allows them to specify function capabilities (arguments) without displaying them as arguments in the function formula. This action automatically opens the HINT exampled in FIG. 40A displaying the options list 4033 and the 'OTHER_ACTIONS' list 4053 which either finish the formula or return the user to adding constraints.

The option list 4033 in FIG. 40A is similar to the previously exampled similar lists as are the function argument specification UI's (e.g., FIG. 6). With the difference being that instead of instantiating arguments in the function formula the arguments/settings are invisibly instantiated in the function and seen through the option UIs rather than a function formula visible argument.

In this example the user clicks 'COLLAPSE' 4023 in the option list 4033 which opens the popup in FIG. 40B displaying the 'On' setting 4028. The user then goes through the actions as previously exampled (in FIG. 13C through FIG. 13E) specifying 'Off' 4068 in FIG. 40C and then clicking the 'Save' button 4089 in FIG. 40D. This reopens the HINT in FIG. 40E where the user clicks 'ENTER' 4093 to finish the function formula and deliver the result shown in FIG. 41B. However, in this embodiment the 'COLLAPSE' changed setting is not recorded in the formula 4138 because the capability is not captured in a visible argument as it was in FIG. 11B 1147 'COLLAPSE[OFF]'. The formulas before 4133 and after 4138 the 'COLLAPSE' change are no different yet the results before 4163 and after 4178 are different and reflect the change in the 'COLLAPSE' setting from on to off.

This visibility of invisible arguments/settings is supported in our technology in a number of ways. FIG. 42A through FIG. 45B examples one such embodiment where for functions with invisible arguments/settings in the function formula a button appears which allows users to access those settings. In this embodiment the button 'CHANGE OPTIONS' button 4242 (in FIG. 42A) appears in the formula bar proximate to the formula bar formula 4243 when a user clicks or otherwise enters the cell holding the formula, in this example 'A3' 4263. In a related embodiment it would display anytime the user is within a cell within the area 4274 instantiated by the function formula. In this embodiment an in-cell formula button also displays when the user double clicks 4277 into the cell holding the formula, in this example the formula 4268 in cell 'A3' 4267 which displays the button 4266 proximate to the formula. Note this button is just one way of visually letting the user know an option has been set, our technology supports many other visual ways (e.g., cell corner flags, formula bar and cell outlines, formula color changes to name just a few) of showing the user that an option is set.

Clicking either the in-cell 'CHANGE OPTIONS' button 4266 or the formula bar 'CHANGE OPTIONS' button 4242 automatically opens the HINT 4373 in FIG. 43 which is an example of a FIG. 6 'Single list, Situationally variable content, 3. Single specification' specification type which could be used multiple times to help set multiple specifications. The user then specifies the 'COLLAPSE' option 4423 in FIG. 44A which opens the same popup for the same actions as in FIG. 40B through FIG. 40D here in FIG. 44B through FIG. 44D 4328, 4468 and 4489 returning the user to the popup FIG. 44E where the user clicks 'CLOSE' 4423 to deliver the result in FIG. 45B, again displaying the result difference 4578 (after) versus 4563 (before) with no change to the formulas 4558 (after) versus 4553 (before) because the 'COLLAPSE' option arguments are recorded in the formula invisibly. FIG. 45A and FIG. 45B can be compared with FIG. 41A and FIG. 41B and FIG. 11A and FIG. 11B to see differences in our embodiments.

FIG. 46 examples another embodiment of our technology making more visible to the user the invisible capabilities or arguments as an alternative to the HINTs in FIG. 44A and FIG. 44E. It is the addition of the 'STATUS' 4676 to the HINT 4674 showing the setting status of each of the function argument invisible capabilities, as example by the 'ON' 4666 for 'COLLAPSE'.

Microsoft Excel Button Use

The use of a button proximate to the spreadsheet formula bar is not unique, Microsoft Excel uses its $f_x$ button in the formula bar as a way to access its Function Formula Builder as exampled in FIG. 47A through FIG. 49B. What is very different in our spreadsheet function technology is what happens after the user clicks the button because what happens in Excel is going straight to an argument-by-argument way to enter the function argument specifications as previously described using no lists. What happens in our spreadsheet are function dependent using some subset of twenty-nine specifications list types laid out in FIG. 6 and signals that an invisible option has been set in the formula within the cell.

Figure 47B:
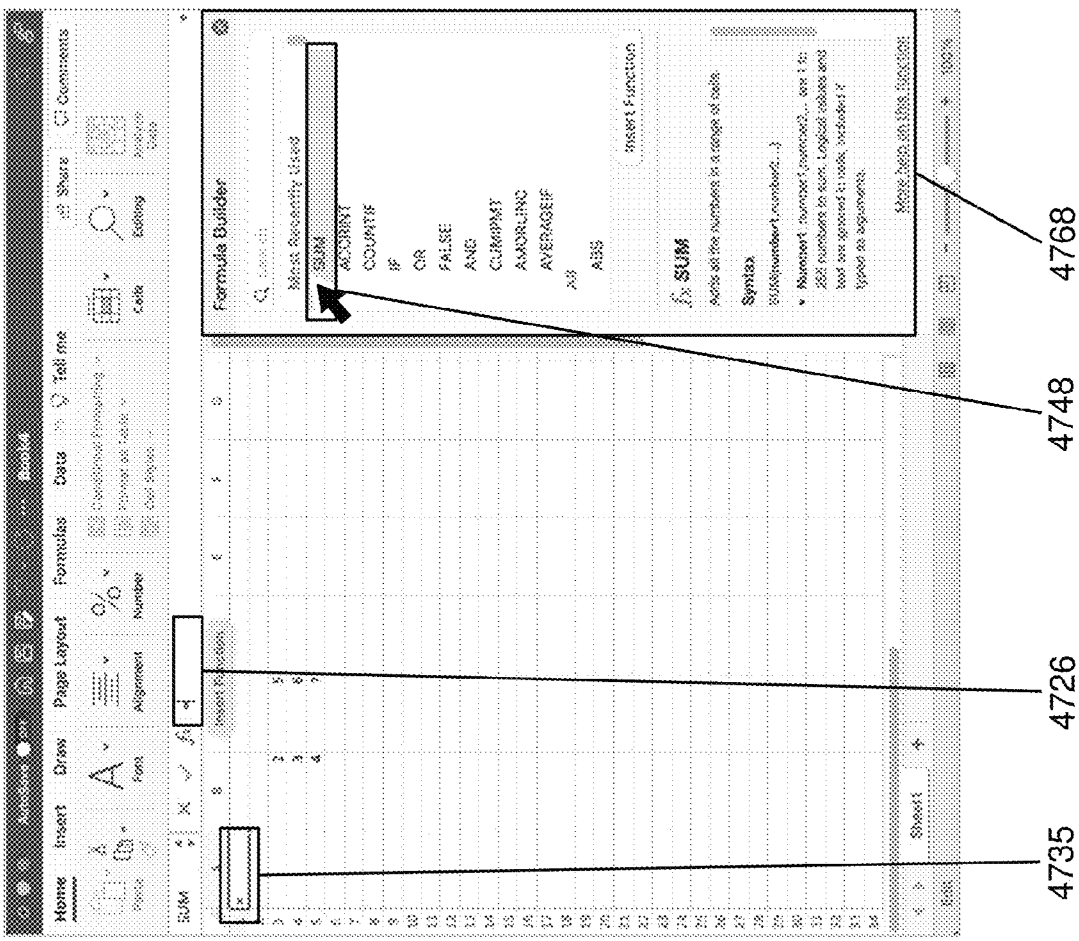
Figure 47A:
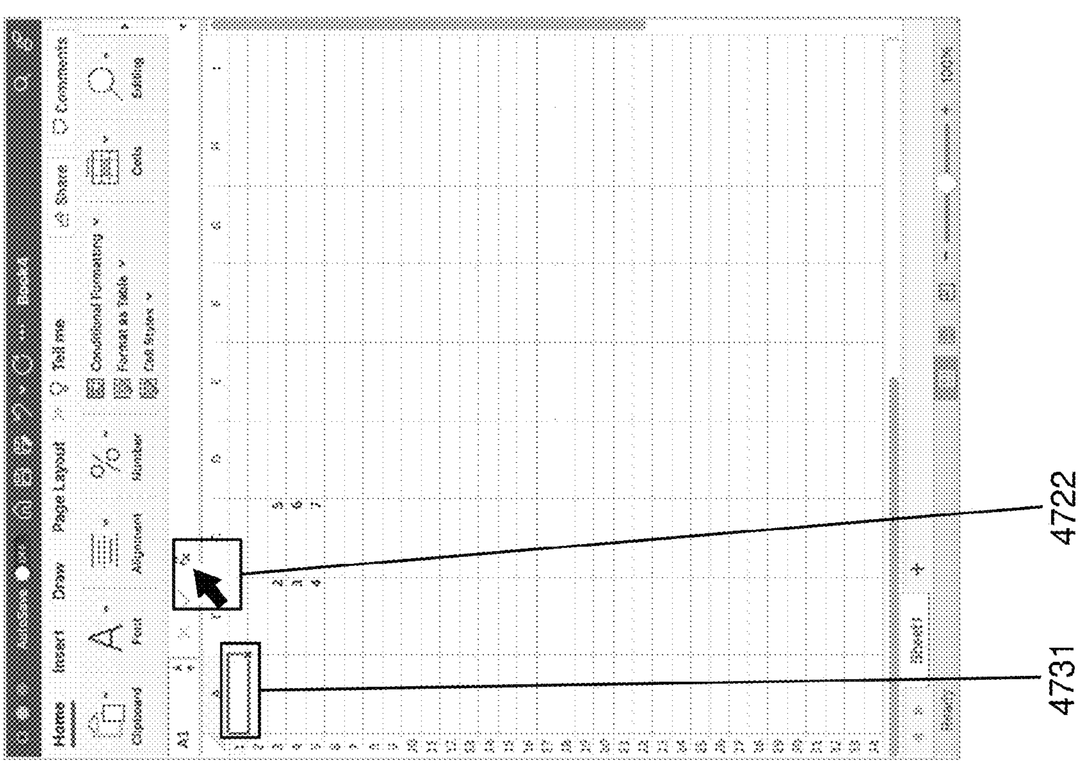
Figure 48:
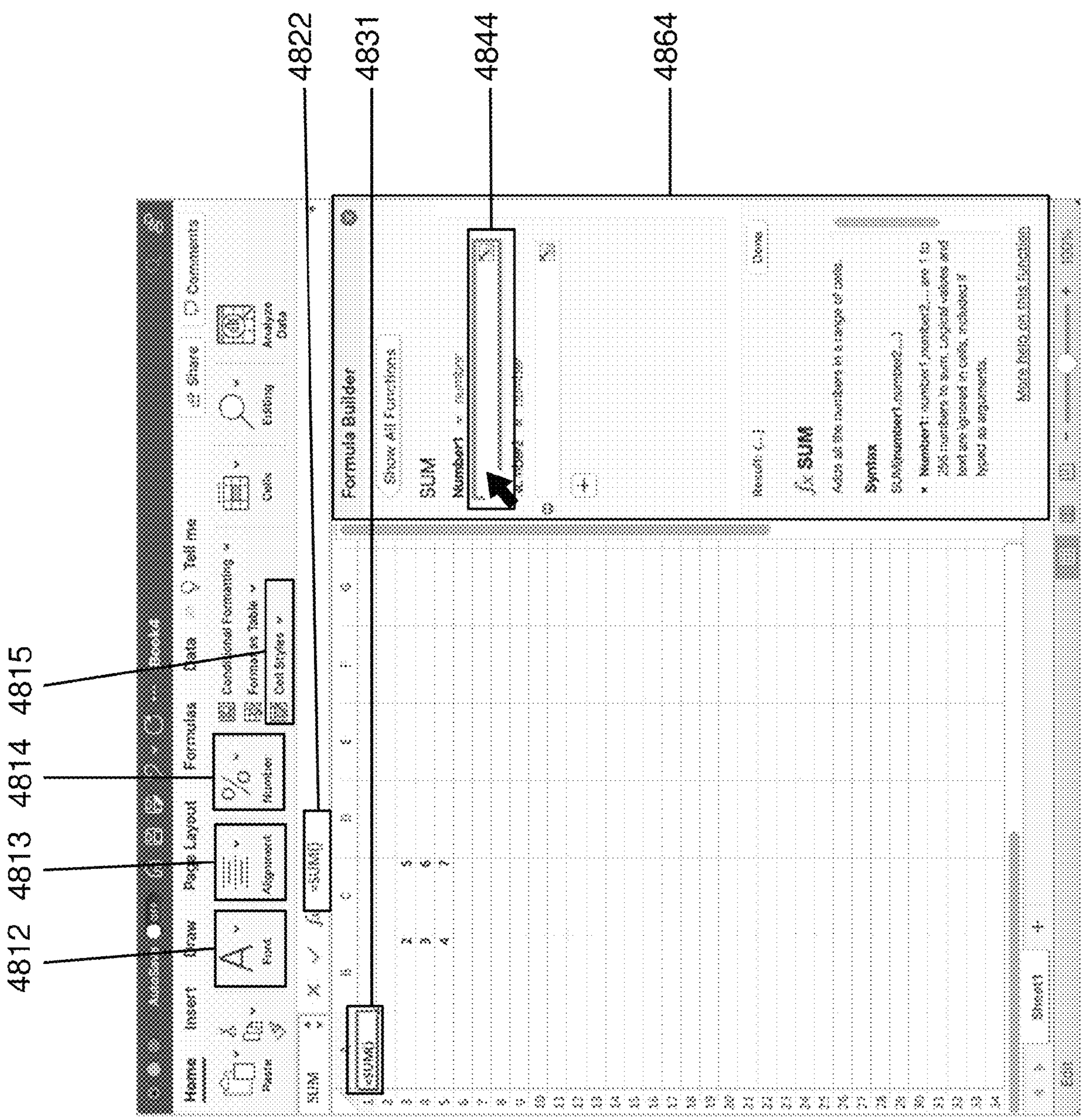
Figures 49A, 49B:
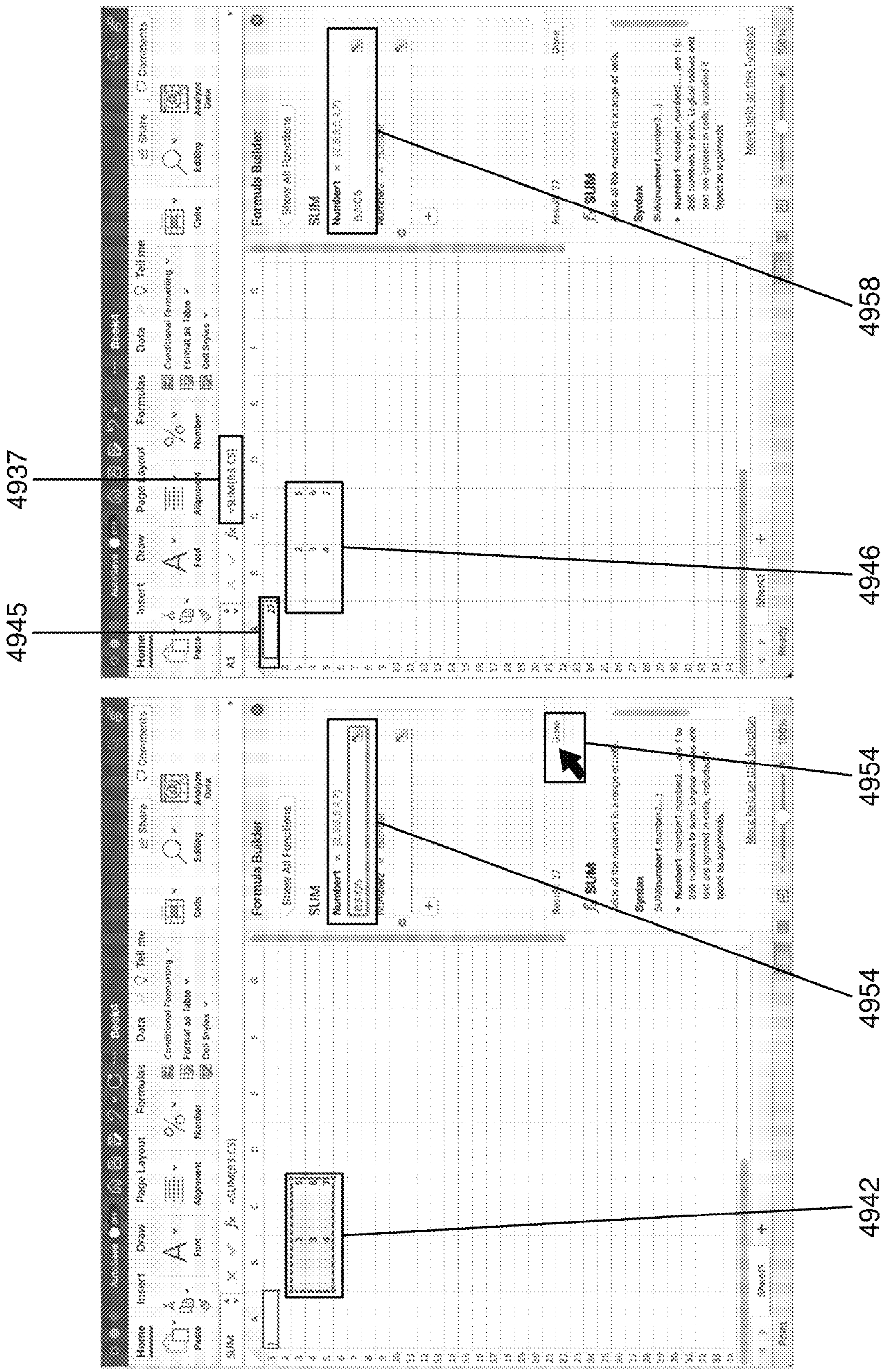

FIG. 47A through FIG. 49B example the use of the Microsoft Excel $f_x$ button in the formula bar for instantiating a SUM function. FIG. 47A examples a user clicking the '$f_x$ button' 4722 from cell 'A1' 4731 which inserts an '=' sign in both the in-cell formula 4735 and the formula bar formula 4726 while opening the Function Formula Builder 4768 function selector as shown in FIG. 47B. The Function Formula Builder then works as previously described with the user here clicking 'SUM' 4748 which populates the SUM function in the formula bar formula 4822 in FIG. 48 and the in-cell formula 4831 while opening the SUM specific Function Formula Builder 4864 with the user cursor in the first argument 4844. The user then highlights the cell range 'B3:C5' 4942 in FIG. 49A which populates into the Function 'Formula Builder' first argument 4954. The user then clicks the 'Done button' 4954 that then completes the formula delivering the value '27' in cell 'A1' 4945 as well as the completed SUM formula in the 'Formula Bar' 4937 and the first argument of the 'Formula Builder' 4958.

As previously mentioned Google Sheets does not have a Formula Builder equivalent and clicking on its formula bar $f_x$ 5032 does nothing, as exampled in FIG. 50. Invisible function formula arguments do not exist in any of the existing spreadsheet functions.

Automatically Propagated Related Argument Changes

There are other advantages of invisible function arguments. FIG. 51A through FIG. 56B examples an embodiment of our technology that automatically propagates related argument changes (for BLANK specifications). This automatic propagation of changes across arguments reduces user ERRORS. It is simpler with invisible arguments where the user is not confused by seeing these changes taking place and being concerned they have created a problem.

Figure 51B:
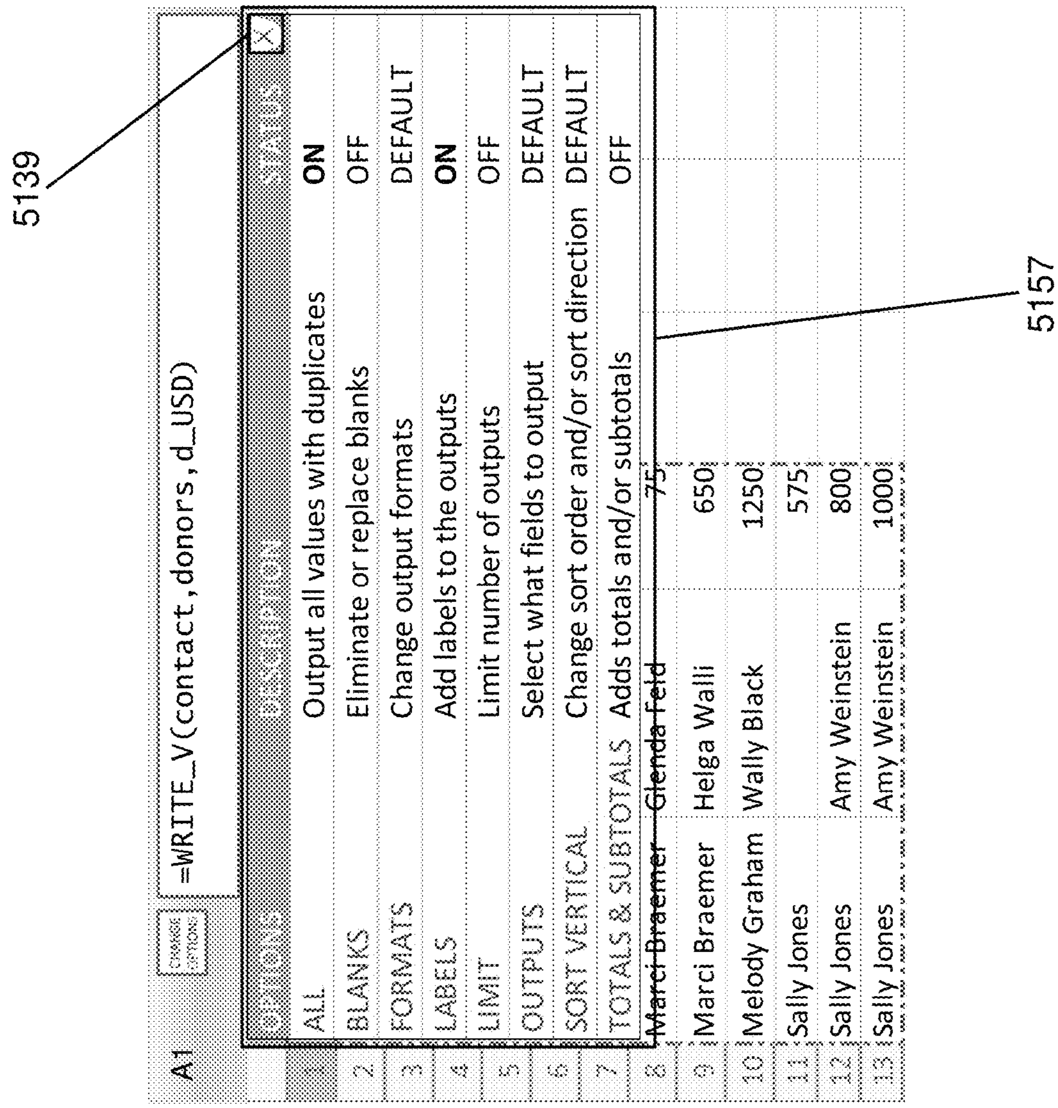
Figure 51A:
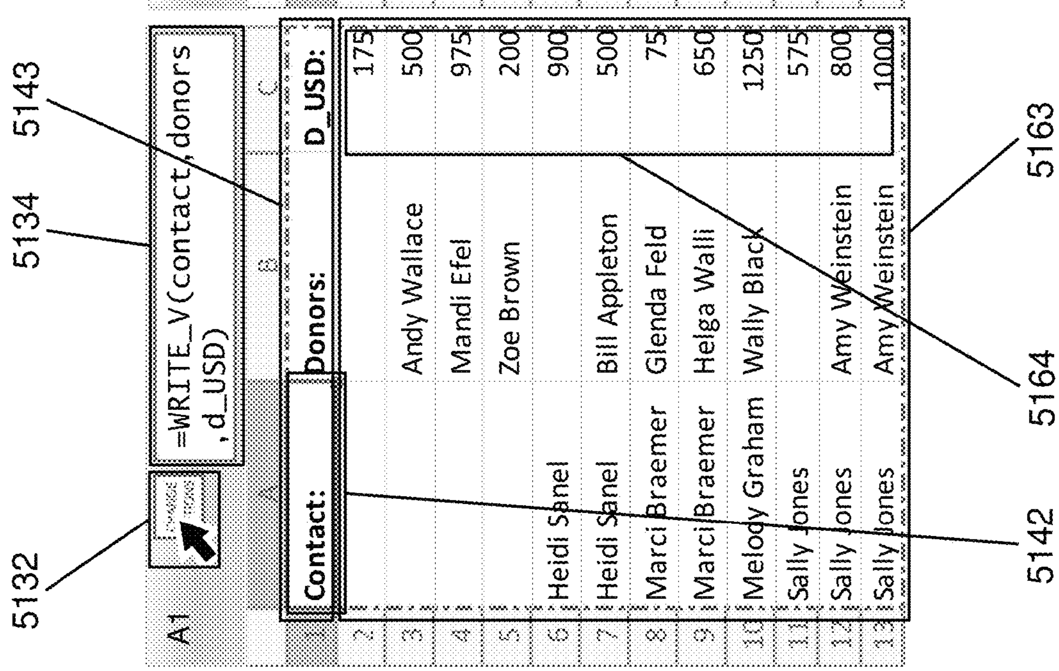
Figure 52A:
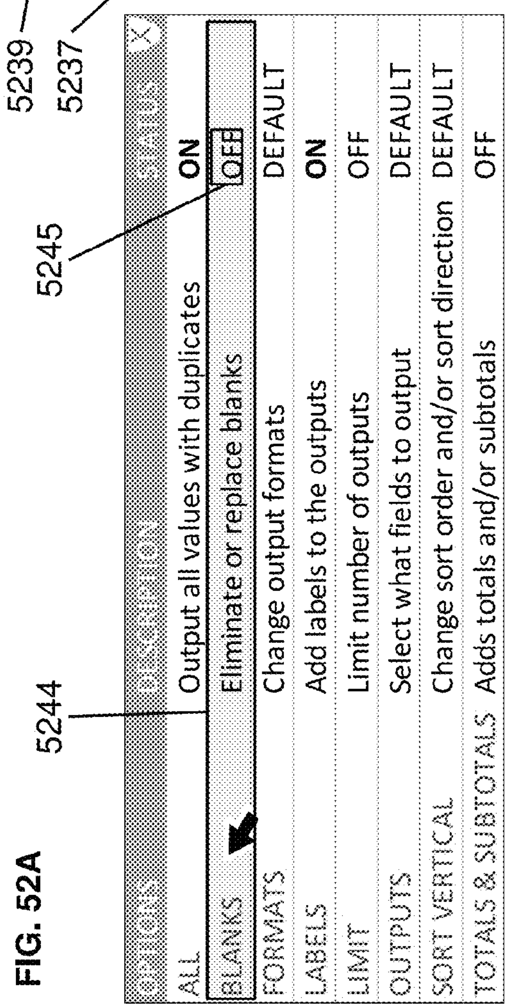
Figure 52B:
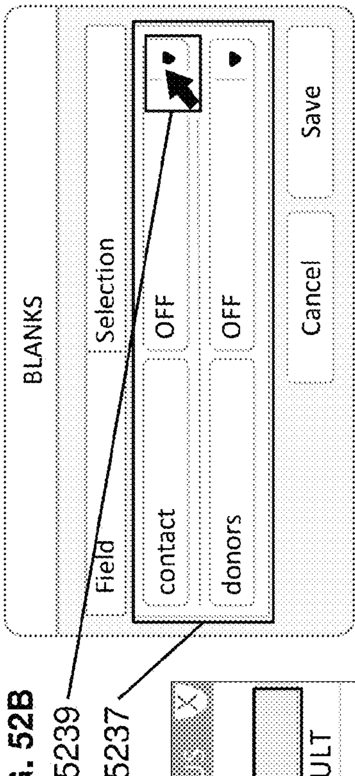
Figure 52C:
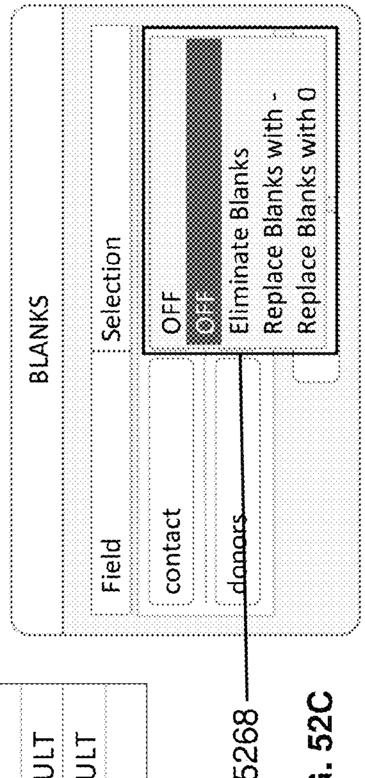
Figure 52D:
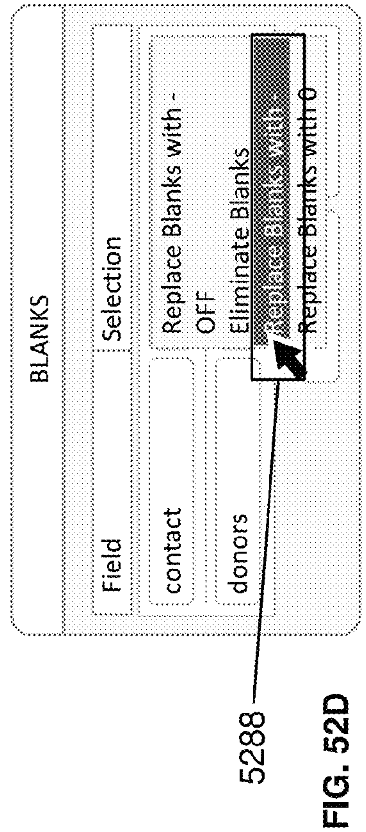
Figure 52E:
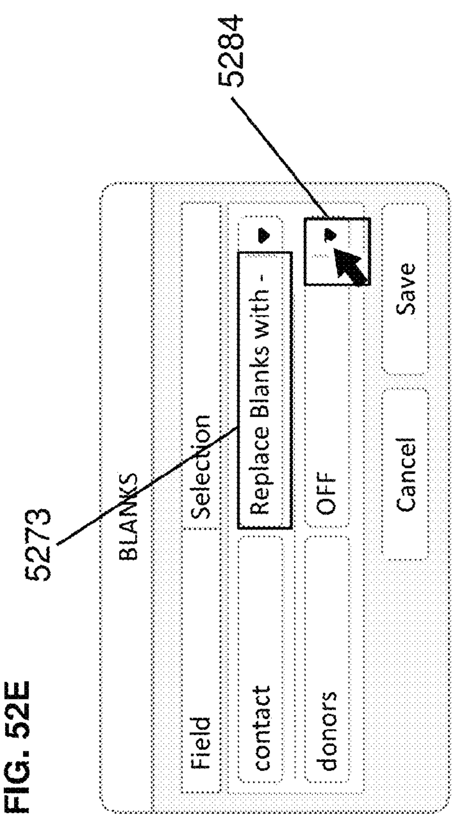
Figure 53A:
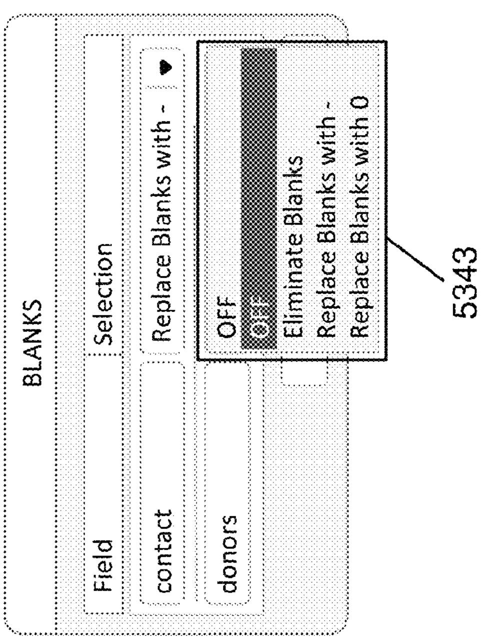
Figure 53B:
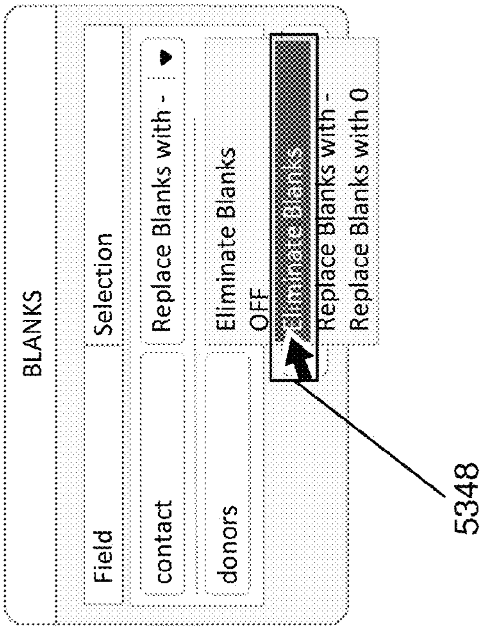
Figure 53C:
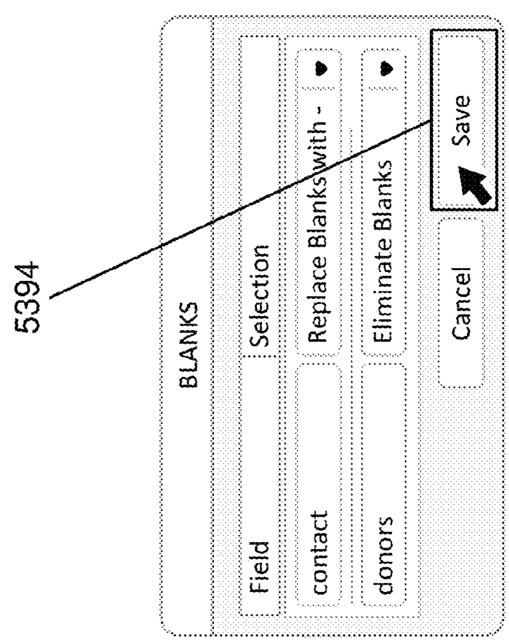
Figure 53D:
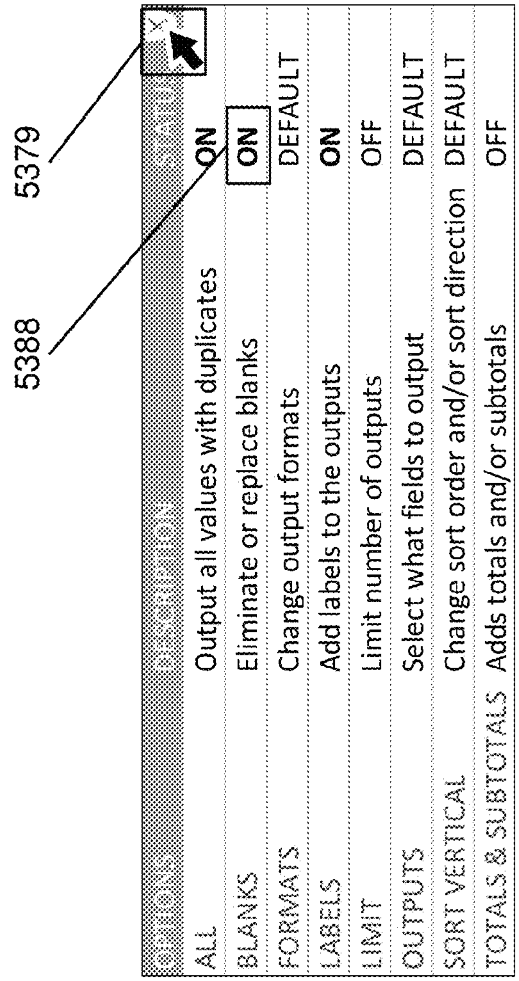

FIG. 51A examples a 'WRITE_V' function formula 5134 in cell 'A1' 5142 where the charity user decides they would like to remove and alter some of the function instantiated blank content. They click the 'CHANGE OPTIONS' button 5132 which automatically opens the HINT 5157 in FIG. 51B. That HINT 5157 can have a close line at the bottom like the one 4683 in FIG. 46 or just rely on the corner 'X' 5139 as it does here. Then in FIG. 52A the user clicks the 'BLANKS' 5244 option. In this embodiment this automatically opens the popup in FIG. 52B which contains a situationally determined list of the previously specified fields 5237 that contain blanks, in this example 'contact' and 'donors' but not 'd_USD' which contains no blanks as shown in 5164 in FIG. 51A. As previously described for an embodiment of our technology with all visible arguments, the user clicks the dropdown button 5239 in FIG. 52B which opens a list of potential selections for the user as shown in 5268 in FIG. 52C. The user then specifies 'Replace Blanks with —' 5288 in FIG. 52D and then sees the changed value in the popup as shown in FIG. 52E 5273 before starting the process to change the 'donors' setting by clicking the dropdown 5284. This then opens selection dropdown 5343 in FIG. 53A from which the user selects 'Eliminate Blanks' 5348 in FIG. 53B. After which the user clicks 'Save' 5394 in FIG. 53C and then closes the option clicking the 'X' 5379 in FIG. 53D to see the result 5448 in FIG. 54B.

Figure 54B:
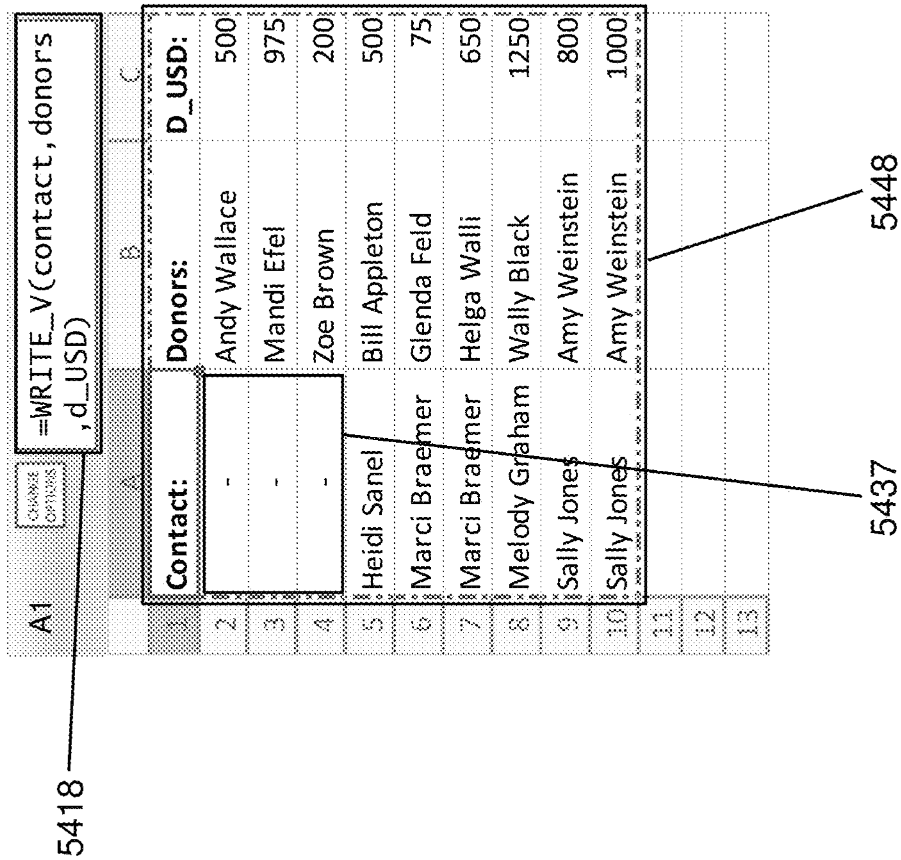
Figure 54A:
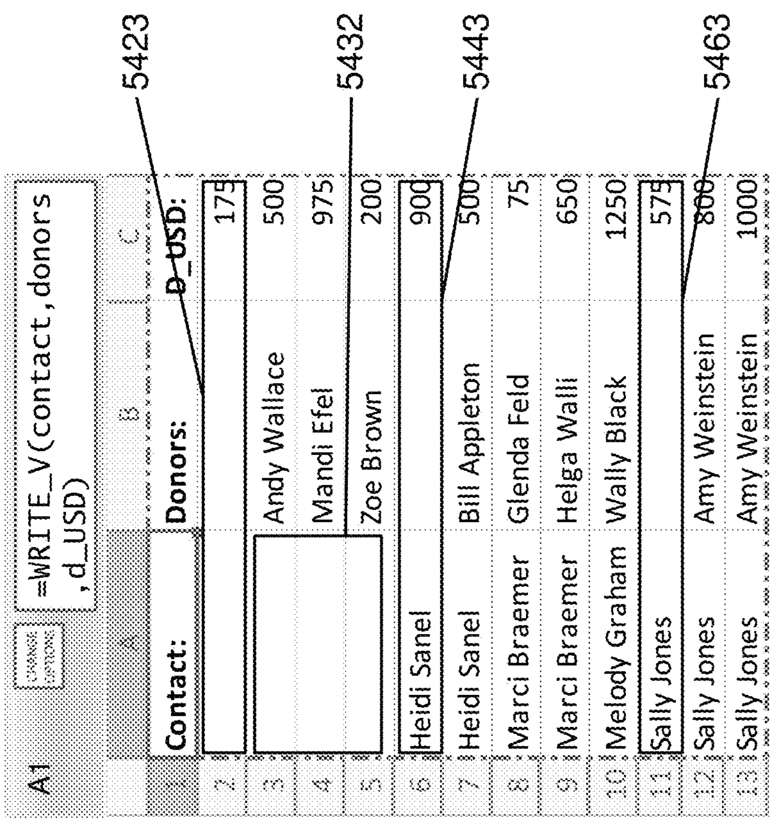

FIG. 54A and FIG. 54B example the before and after for the user specifications. Like before when the arguments were visible the specification 'Eliminate Blanks' 5338 in FIG. 53B results in the elimination of the rows 5423, 5443 and 5463 in FIG. 54A (the before) which are not shown in the output 5448 in FIG. 54B (the after). The specification 'Replace Blanks with —' 5288 in FIG. 52D results in the blanks 5432 in FIG. 54A (the before) being replaced by dashes '-' in 5437 in FIG. 54B (the after). In this embodiment all of these changes are recorded invisibly and not shown in the function formula 5418. As we will describe next that combined with our auto propagation technology facilitates formula changes without errors.

FIG. 55A and FIG. 55B example what happens when the charity user decides to change their 'WRITE' function formula in an embodiment with all the arguments visible and no function across argument automation. The user looks at the output 5573 in FIG. 55A and realizes they would rather see what country the donor was from rather than their contact person. So, the user replaces 'contact' 5533 in the WRITE formula with 'country' 5537 (in FIG. 55B) and hits ENTER to get the result '#ERR!' 5557. The reason for the error is the user did not also change 'contact' in the 'BLANK_AS_DASH' option term 5547 and therefore has an erroneous function argument because 'contact' is no longer included in the formula.

FIG. 56A and FIG. 56B examples what happens with that same change in our technology. The combination of the invisible formula and the across function argument/capability automatic resetting of any subsequent function formula usage of a specification removed from a formula resulting in the desired user change happening without further user work. When the user replaces 'contact' 5613 (in FIG. 56A) with 'country' 5618 (in FIG. 56B) and hits ENTER they get the successful resulting output 5648. Our technology has removed the invisible equivalent of the 'BLANK_AS_DASH[contact]' option term 5543 in FIG. 55A and put the 'country' BLANK settings at the default. In this embodiment that default setting is to show them as empty as seen in cell 'A2' 5627. The automatic removal and/or resetting of subsequent use of the removed specification avoids the error in FIG. 55B and the invisible options hides the complexity and possible concern from the user. The across function argument automatic removal and/or resetting of subsequent use of the removed specification capability within our technology works without invisible arguments and would likewise avoid the error as function formula arguments disappear or change automatically. However, some users may find it worrisome seeing arguments disappear and not exactly knowing why or how. This capability is particularly important when a specification is involved in many additional arguments that the user would need to change correctly without our automated capability.

The capabilities exampled in FIG. 51A through FIG. 56B using button accessed options could just have easily been accessed through a HINT 5756 with the 'OPTIONS' 5764 access as shown in FIG. 57. They could also be specified using a combination of button activated and HINT activated specifications or other modes of access.

Function Controlled Formats—Using Typical Cell Formatting UIs

An embodiment of our technology allows users to employ the familiar format a cell and its contents approaches to specify formatting controlled by one of our spreadsheet functions. This capability works with both our visible and invisible function formula arguments. We will first example our technology working with visible arguments and then with invisible ones. The conversion process from the familiar cell formatting setup to Function controlled formats can be done manually or automatically in our technology, we will first example the manual approach.

Function Controlled Formats—Manual Conversion

Figure 58A:
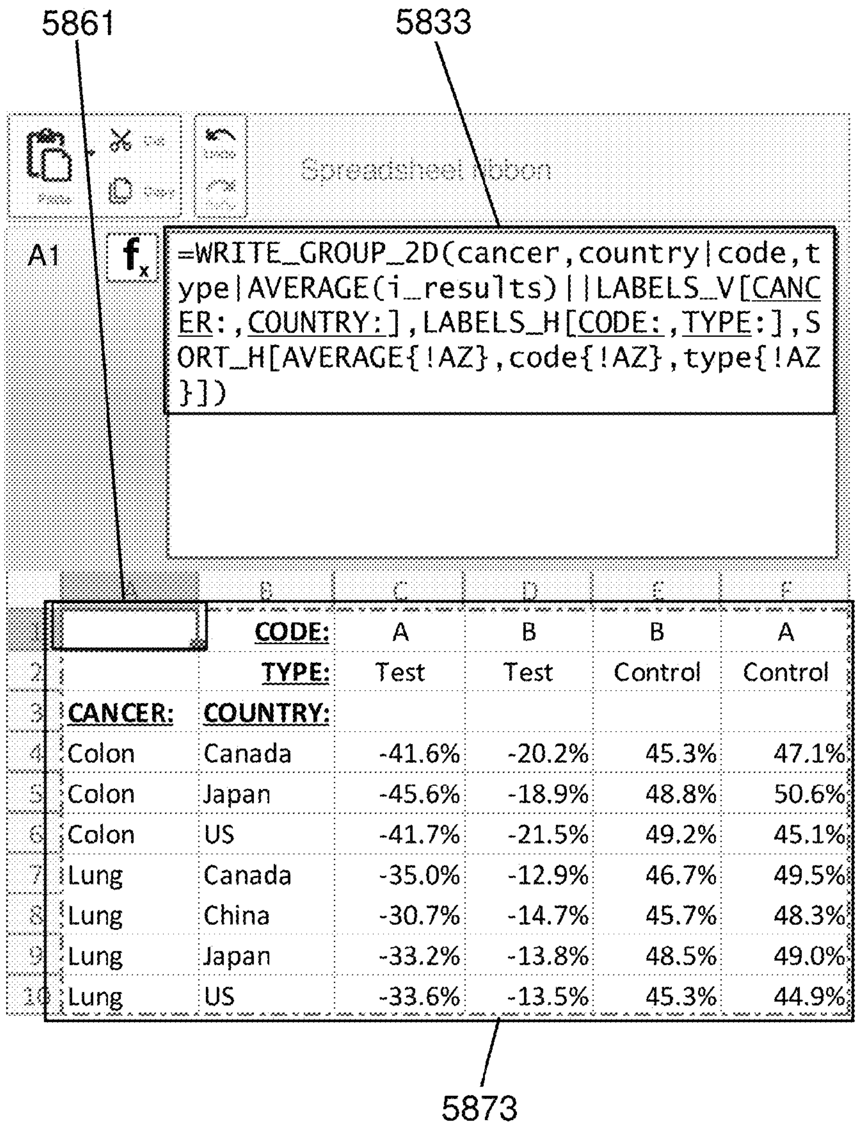
Figure 58B:
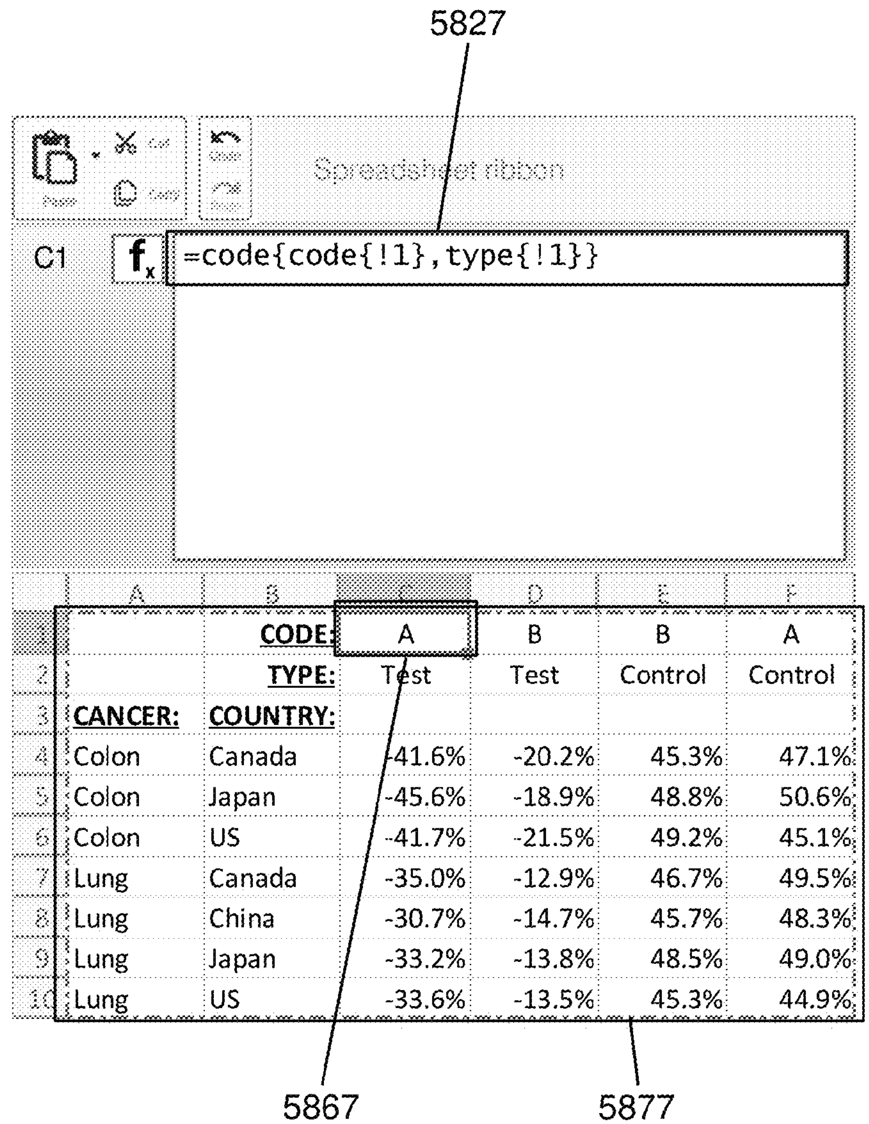

FIG. 58A through FIG. 61B examples the cancer researcher in an embodiment with all visible arguments using the manual conversion of typical cell formatting approaches to function (not by the cell) control. The one thing to note is the cancer researcher has a more granular data set than previous examples with each individual test result (i_results). Therefore, they are using a different version of our 'WRITE' function the 'WRITE_GROUP_2D' that allows the user to do range function calculations, in this example 'AVERAGE(i_results)' which calculates the average test result. FIG. 58A examples the 'WRITE_GROUP_2D' function formula 5833 that instantiates the values in the cells 'A1' through 'F10' 5873 which in this embodiment are green dot dash outlined anytime a user is in a cell within its range. When the user moves to cell 'C1' 5827 (in FIG. 58B) the range outlining 5877 remains despite the cell formula 5827 showing only the value for what is in that cell 'C1' 5867. However, in this embodiment when the user does the typical cell formatting they are given some new options not available in any existing spreadsheet, to have the function takeover the formatting applied. One embodiment of how this works in our technology is exampled in FIG. 59A through FIG. 61B.

Figure 59B:
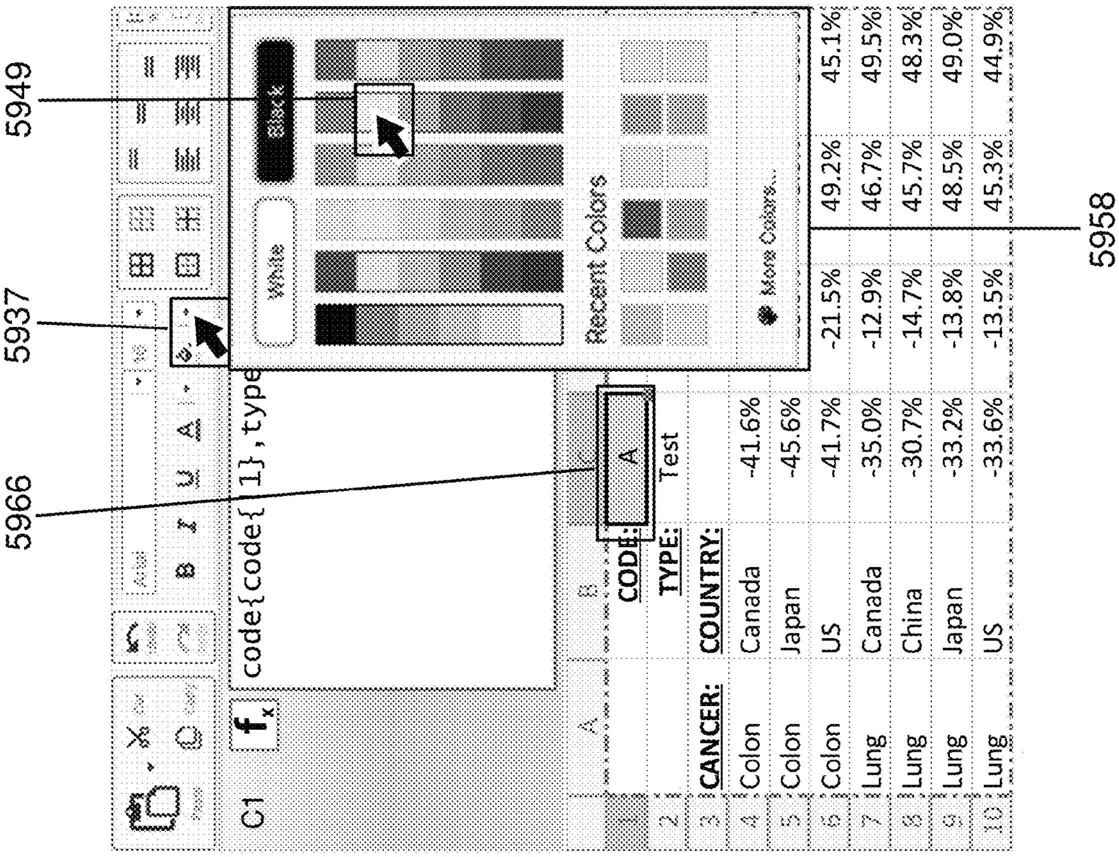
Figure 59A:
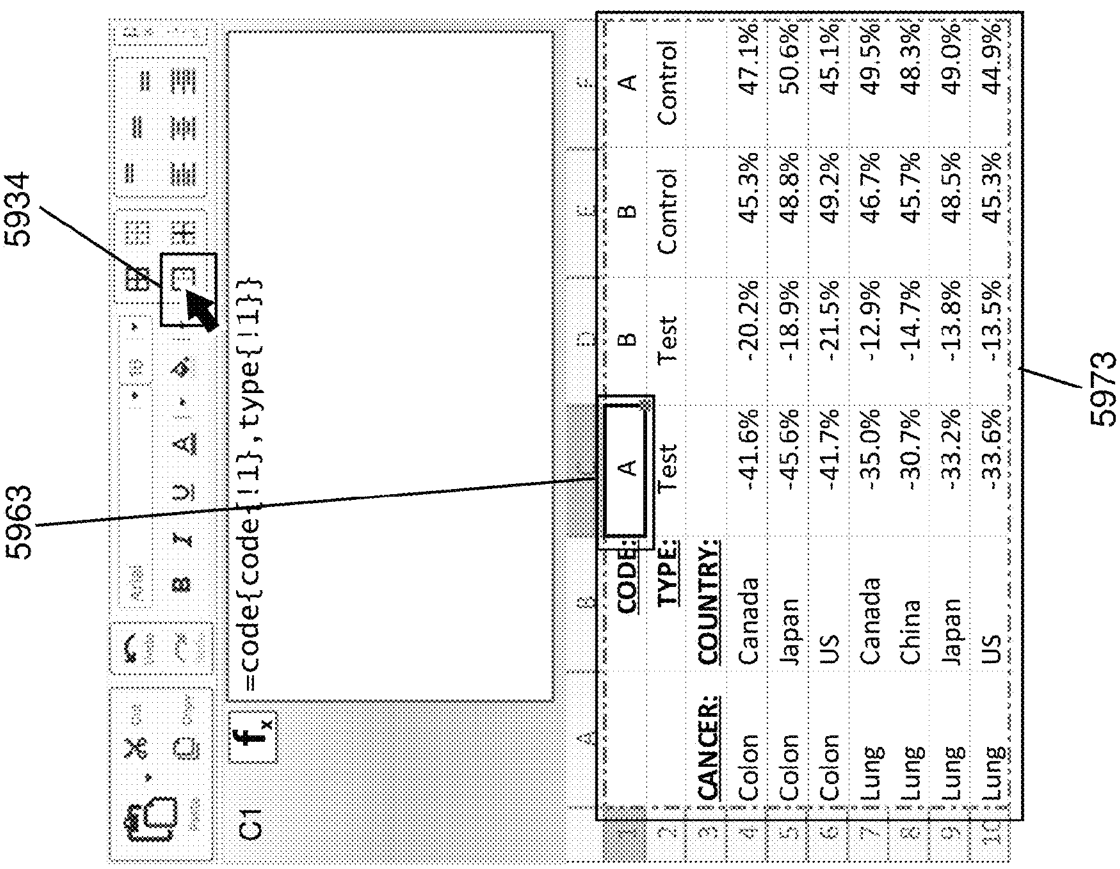

In FIG. 59A the user applies a border clicking 5934 as they normally would. Then in FIG. 59B the user the user specifies a cell fill as they normally would clicking the popup button 5937 and then clicking the desired fill color 5949 in the selection list panel to instantiate the blue fill in cell 'C1' 5966. Note the color selector fully exampled in FIG. 125A and FIG. 125B is a FIG. 6 'Multiple separate lists, Mixed fixed and situationally variable content, 9. Single specification'. This embodiment contains at least three lists two of which have fixed options, the top color selectors 12543 and the 'More colors . . . ' 12573, and the 'Recent Colors' list 12563 is situationally variable based on the recent colors used. In this embodiment the 'More colors . . . ' button 12575 opens five different color selection lists 12537 as exampled in the popup 12587 FIG. 125B. While these color selector panel lists, and their variants in different spreadsheets, are used extensively in spreadsheets they are not used by existing spreadsheets for specifying function arguments.

Figures 60A, 60B:
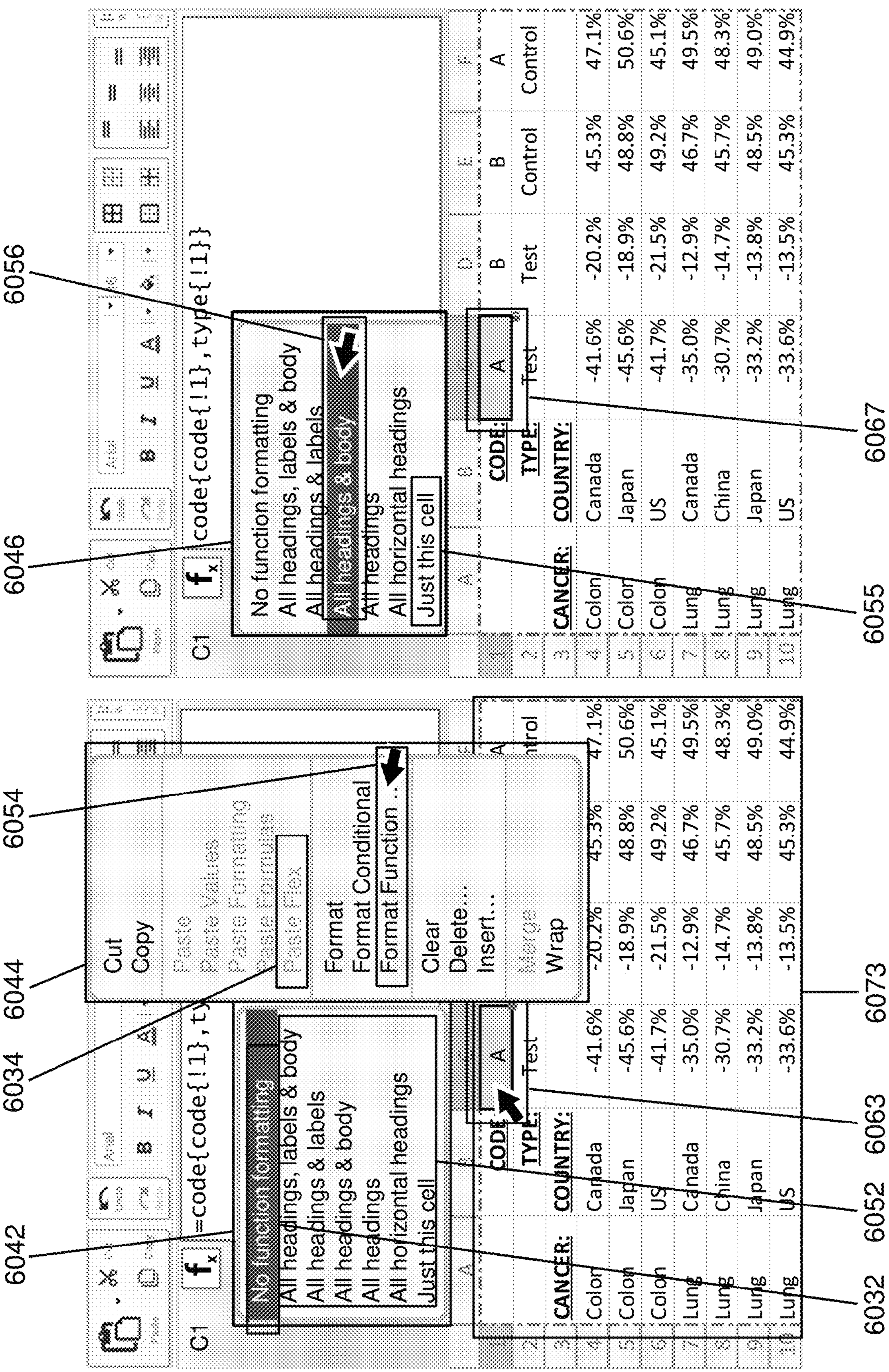

At this point the user of our technology then has function formatting options that are not available in existing spreadsheets that in this example are accessed by the user via right click menus 6044 and then 6042 accessed from the cell 'C1' 6063 in FIG. 60A. When the user right clicks in cell 'C1' 6063 they get the right click menu 6044 from which they click the new capability in our technology of 'Format Function . . . ' 6054. This opens the second popup 6042 which supports the user (manual) selection of the type of function-controlled formatting, in this example displaying a list of six different options 6052. In this embodiment the popup list 6042 opens with a default setting of 'No function formatting' 6032 (the existing technology cell-controlled formatting). FIG. 60B then examples the user clicking the 'All headings & body' specification 6056 in the popup 6046 to get the result in FIG. 61A where the WRITE resulting vertical headings 6182, horizontal headings 6164 and body 6184 all have the blue fill and outside borders. In this embodiment none of those applied arguments show up in the formula 6123 for cell 'C1' 6163 because they are controlled by the function and therefore in the function formula. However, in FIG. 61B when the user moves to cell 'A1' 6166 the fill and border arguments 6147 are shown in the function formula 6137. Note, in different embodiments the formatting arguments could be shown in the formulas of all the impacted cells.

Figure 61B:
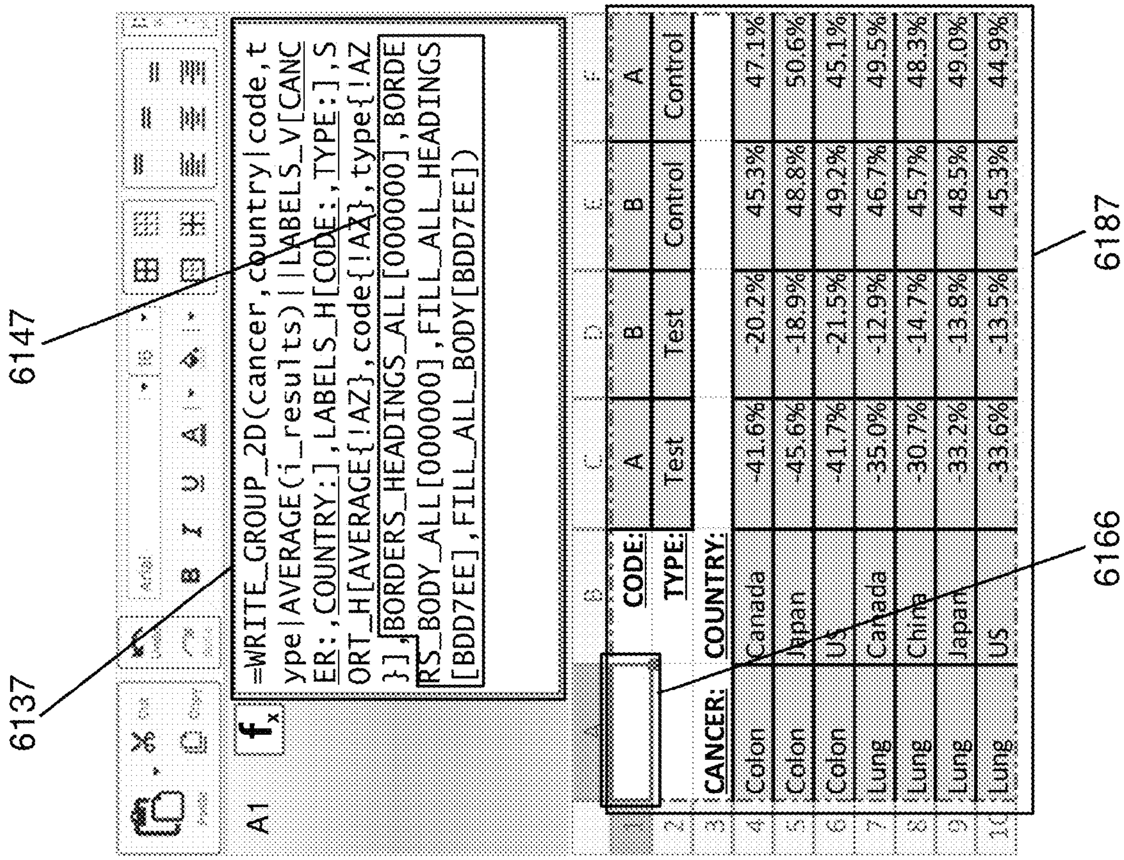
Figure 61A:
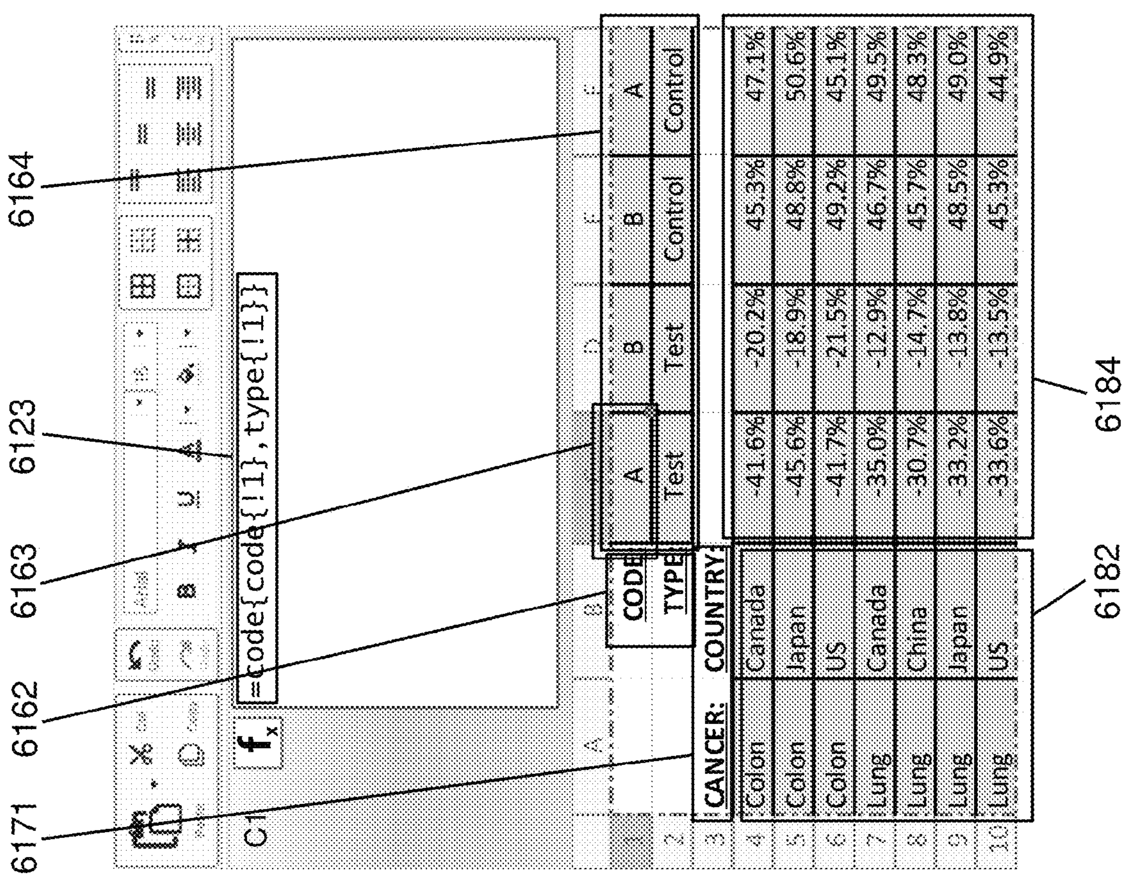

FIG. 61A and FIG. 61B examples just one of the many function formatting specification types supported by our technology. If the user had instead selected 'Just this cell' 6055 in the popup 6046 in FIG. 60B then only that one cell 6067 would have the formatting but the formatting would be controlled by the 'WRITE' function. Meaning that if the cell were to get sorted to another location by the 'WRITE' function the formatting would shift to that new cell location. If the content of that cell were to disappear, for example because 'code' is replaced in the function formula, then the formatting would disappear and be replaced with the relevant formatting within the function (e.g., similar to the BLANKS exampling in FIG. 56A and FIG. 56B).

Figure 62B:
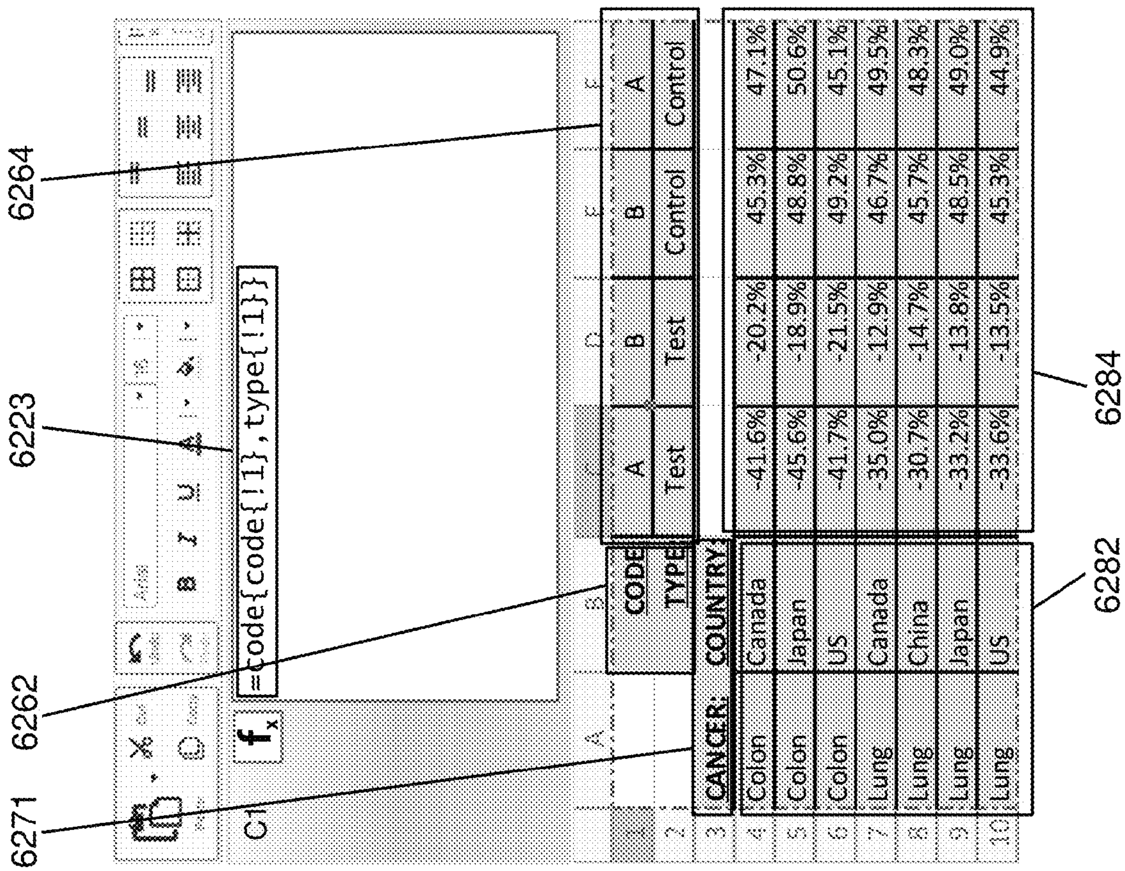
Figure 62A:
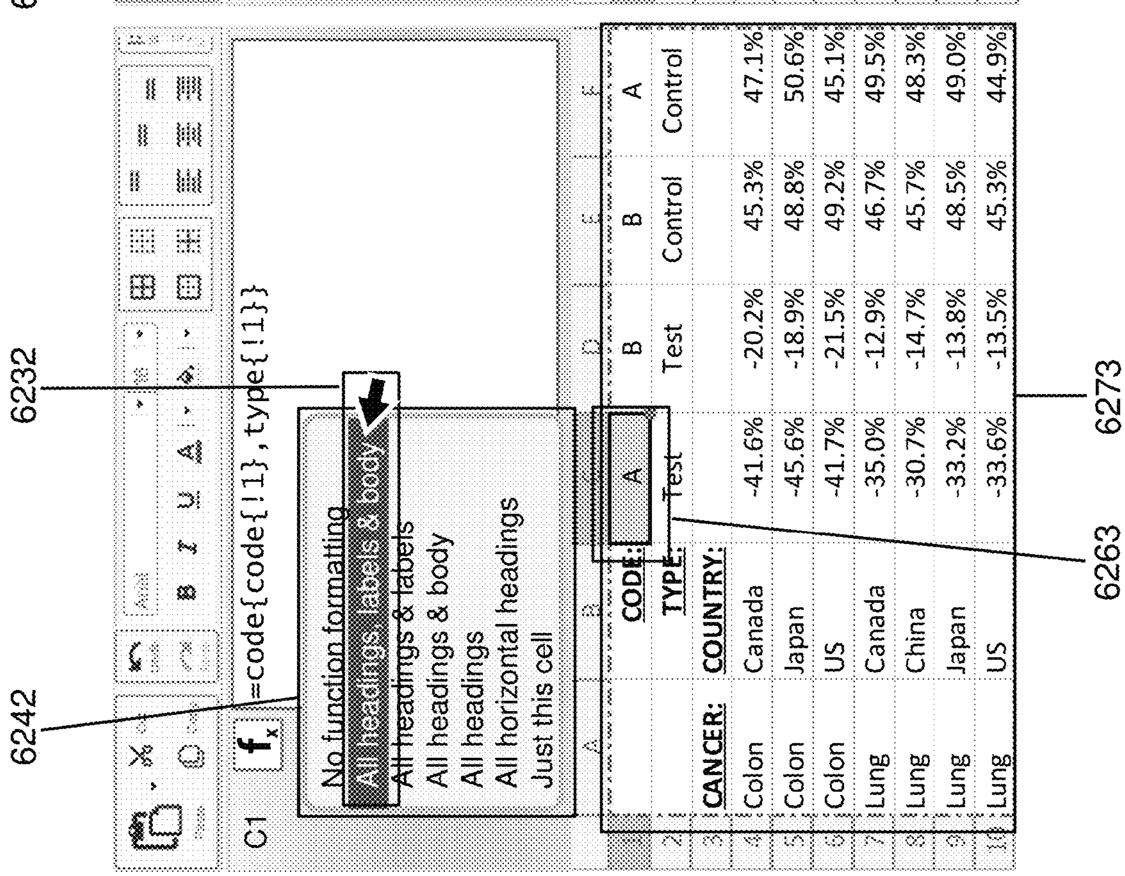

Had the user selected the option 'All headings, labels & body' 6232 as shown in popup 6242 in FIG. 62A the borders and fill is applied to 6262, 6271, 6264, 6282 and 6284 in FIG. 62B. If the user had specified the next option 'All headings & labels' the borders and fill would have been applied to 6262, 6271, 6264 and 6282 but not 6284. If the user had specified the option 'All headings' the borders and fill would have been applied to only 6264 and 6282. Finally, if the user had specified the option 'All horizontal headings' the borders and fill would have been applied to only 6264. The borders and fill for each of the previous options in the popup 6242 beginning with 'All' flex with changes to the formulas as exampled next.

Function Controlled Formats—Auto Propagation

FIG. 63A and FIG. 63B examples how our 'WRITE' function with our format technology controls the formats as other specifications are changed. In this situation the cancer researcher decides to collapse down the results to simply the test and control average results. They do so by changing the first two argument groups from 'cancer,country|code,type' 6324 to 'cancer|type' 6328 which changes the before result in cells 'A1' to 'F10' 6383 in FIG. 63A to the after the change results in cells 'A1' to 'C4' 6377 in FIG. 63B. The changed formula 6328 in cell 'A1' 6366 controls the formats and shrank the respective headings and body with their formula specified 6347 borders and fill. Those arguments of 'WRITE' function formula 6347 in FIG. 63B (after change) and 6343 in FIG. 63A (before) are unchanged.

The capabilities exampled in FIG. 59A through FIG. 62B are supported by the other variants of our technology. As exampled in FIG. 64A and FIG. 64B our technology for converting typical cell formatting to function controlled formatting works for our invisible arguments. Where the conversion of the cell formats could be initiated by a right click menu as exampled in FIG. 60A or started from one of our HINTs. The function control of the formatting then works the same way as exampled in FIG. 64A and FIG. 64B by the changes from the before result in cells 'A1' to 'F10' 6483 in FIG. 64A to the after the change results in cells 'A1' to 'C4' 6477 in FIG. 64B all done by the function formulas 6437 (after 6428 removal of 'country' change) and 6433 (before 6424 removal of 'country' change) which have invisible formatting arguments/specifications. Similarly, the formatting capabilities are supported in our technology when the options can be button (6521 or 6526) accessed as exampled in FIG. 65A and FIG. 65B. The button accessed formula formatting supports the same formula change 6528 (after) and 6524 (before) delivering the same change in results 6577 (after) and 6583 (before) complete with the formatting changes. These formatting capabilities and supported changes work whether the option visibility and access button is adjacent to the formula bar or overlayed on or adjacent to the cell that accepted the formula and whether the formatting arguments are visible or invisible.

Function Controlled Formats—Auto Conversion

FIG. 66A through FIG. 71B examples auto conversion of cell formatting to function-controlled formats. In the first example the user wants to green fill the entire body (calc argument) of the 'WRITE' result. The user is in cell 'C4' 6663 in FIG. 66A which is a cell within the body (calc argument) of the 'WRITE' formula therefore having a calculated output formula 6637 for cell 'C4' 6667 or 6663. They then click into the fill ribbon dropdown 6633 and click the light green fill 6644 they desire. In this embodiment of our technology when the user clicks into any body cell 6688 and formats it, that formatting auto propagates to the entire body of the 'WRITE' result. So, when the user clicks the light green 6644 in the selection list panel 6658 they first see it fill the cell 'C4' fill with light green 6663. However, after a moment or two the light green fill auto propagates to the entire body of the function output 6688 as shown in FIG. 66B. The cell formatting has also been auto converted to function-controlled formatting.

In this embodiment if the user then clicks the 'Undo' button 6722 once as done in FIG. 67A then it reverses the application of the fill to the entire body and leaves only the cell 'C4' 6763 with the light green fill. Thus, telling the function that they only want to fill the single cell but not undoing the auto conversion of the function-control of the formatting. In this embodiment if the user then clicks the 'Undo' button 6726 one more time as exampled in FIG. 67B then the fill in C4' 6767 automatically disappears. However, if the user clicks the 'Redo' button 6832 as exampled in FIG. 68A then the fill in 'C4' 6863 automatically reappears auto converted to control by the function. If the user then clicks the 'Redo' button 6862 again as exampled in FIG. 68B then the fill auto propagates to the rest of the 'WRITE' body 6888 and stays controlled by the function. In a different embodiment clicking the 'UNDO' button (or shortcut equivalent) the second time could revert the formatting to cell-control, requiring in that embodiment clicking 'UNDO' a third time to eliminate the formatting. In that embodiment the 'REDO' would mirror those changed having an additional click.

In another embodiment of our technology the clicking of the second 'UNDO' could retain the color formatting but revert it to the normal cell control found in a typical spreadsheet, so that the function has no control over the cell formatting. In this embodiment clicking; UNDO' a third time would time would then remove the fill as exampled by C4' 6767 in FIG. 67B. 'REDO' would then work like the reverse of this stepping back through adding the fill, then putting it under function control and finally propagating it as shown in 6888 in FIG. 68B.

This auto conversion of normal cell formatting capability is supported in our technology when all the formula arguments are visible as exampled in FIG. 69A and FIG. 69B. When the user moves from the auto converted cell 'C4' 6963 to the cell 'A1' 6965 holding the 'WRITE' formula 6947 the user can then see the 'FILL ALL BODY[E2EFDA]' argument 6957 which is controlling the green fill formatting 6988. This capability is also supported in our technology if the function has invisible formatting arguments as exampled in FIG. 70A and FIG. 70B. Where the function formula 7037 in cell 'A1' 7065 controlling the formatting in the body 7088 does not show a visible fill argument. The technology also works for joint auto conversion and button accessible (e.g., 7131 and 7136) formatting options as exampled in FIG. 71A and FIG. 71B. In this example showing a formula 7137 with invisible option arguments that control the capabilities including the body fill 7188.

Figure 72B:
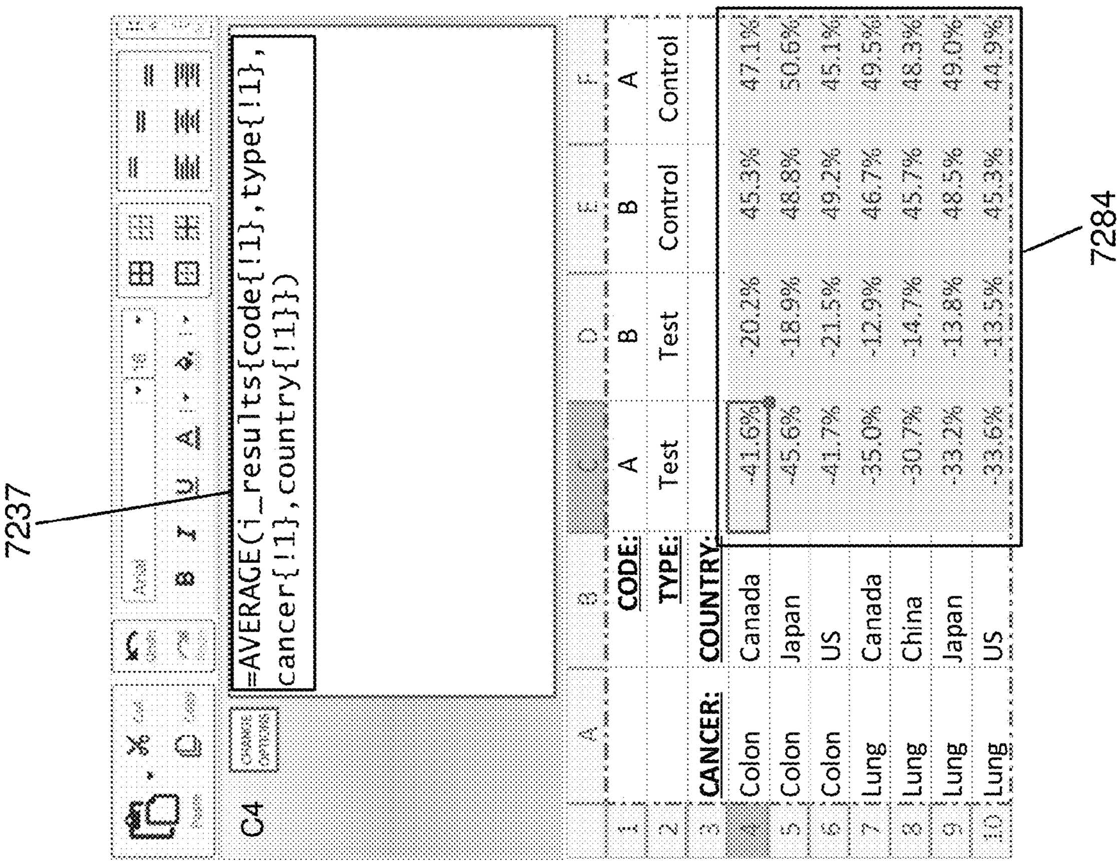
Figure 72A:
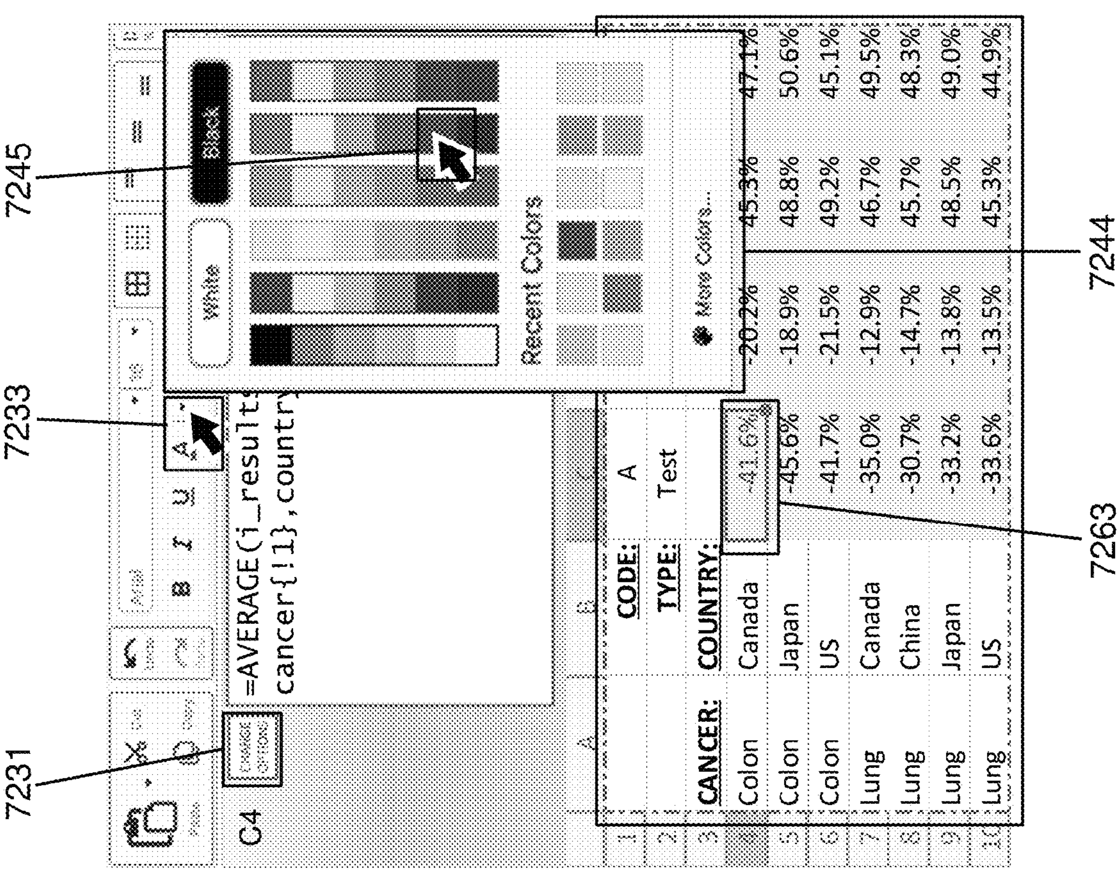
Figure 73A:
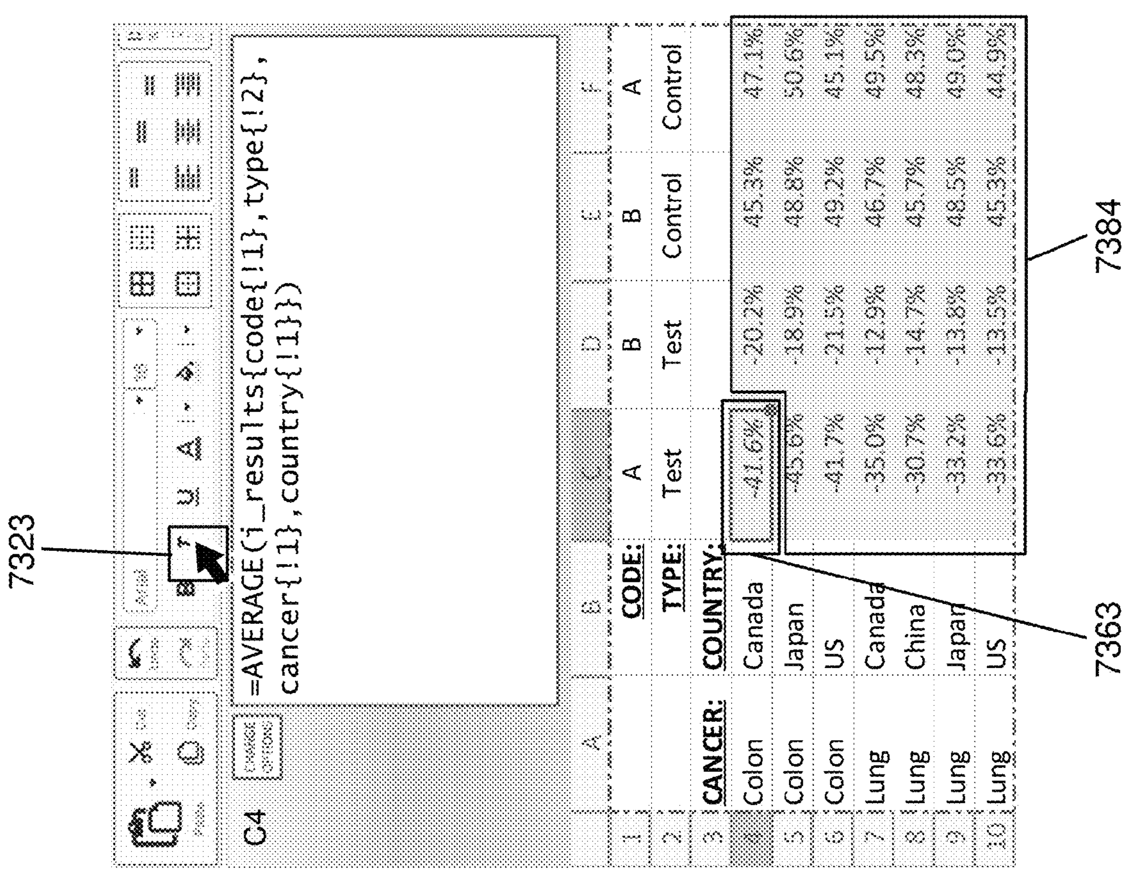
Figure 73B:
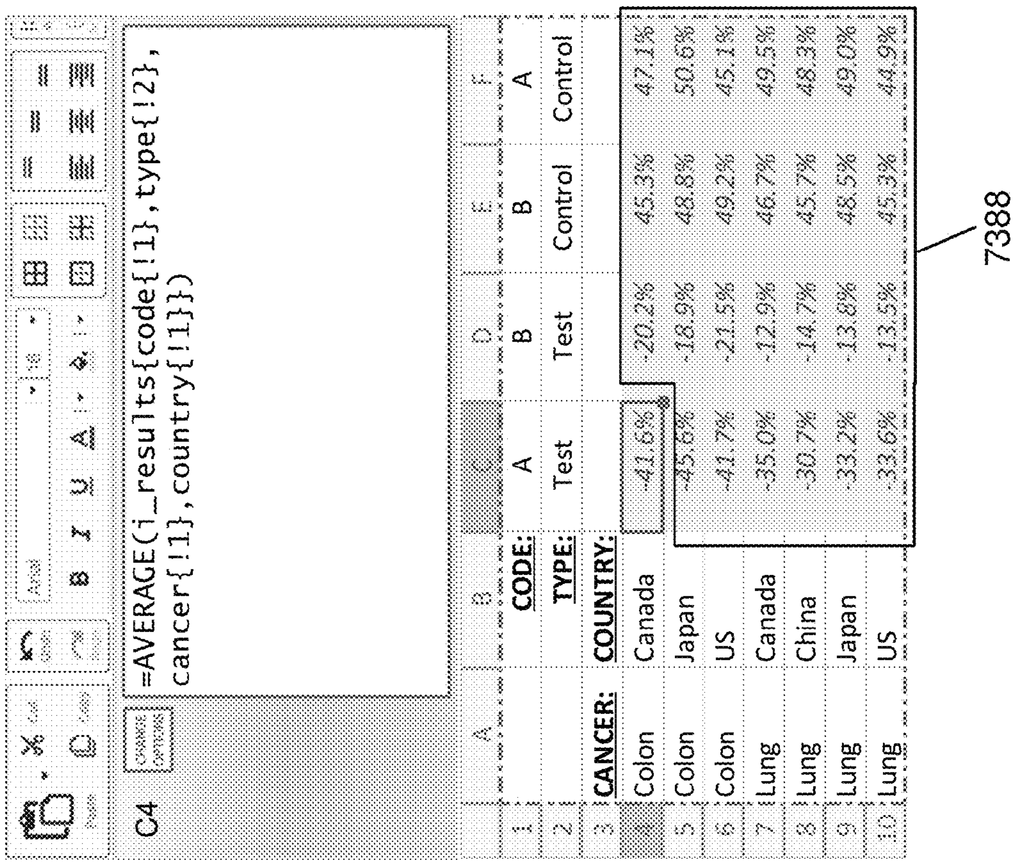

FIG. 72A through FIG. 73B examples the cancer researcher adding additional formats. FIG. 72A examples the user clicking the font color selector 7233 and then clicking a blue color 7245 as they normally would however our auto conversion technology automatically moves control of the font color to the function and briefly displays the blue font in cell 'C4' 7263 before auto propagating it to all of the function body 7284 shown in FIG. 72B. FIG. 73A examples the user adding italics 7323 to the cell 'C4' 7363 it then auto replicates to the rest of the body 7388 (shown in FIG. 73B) changing from the non-italics 7384 in FIG. 73A.

Figure 74B:
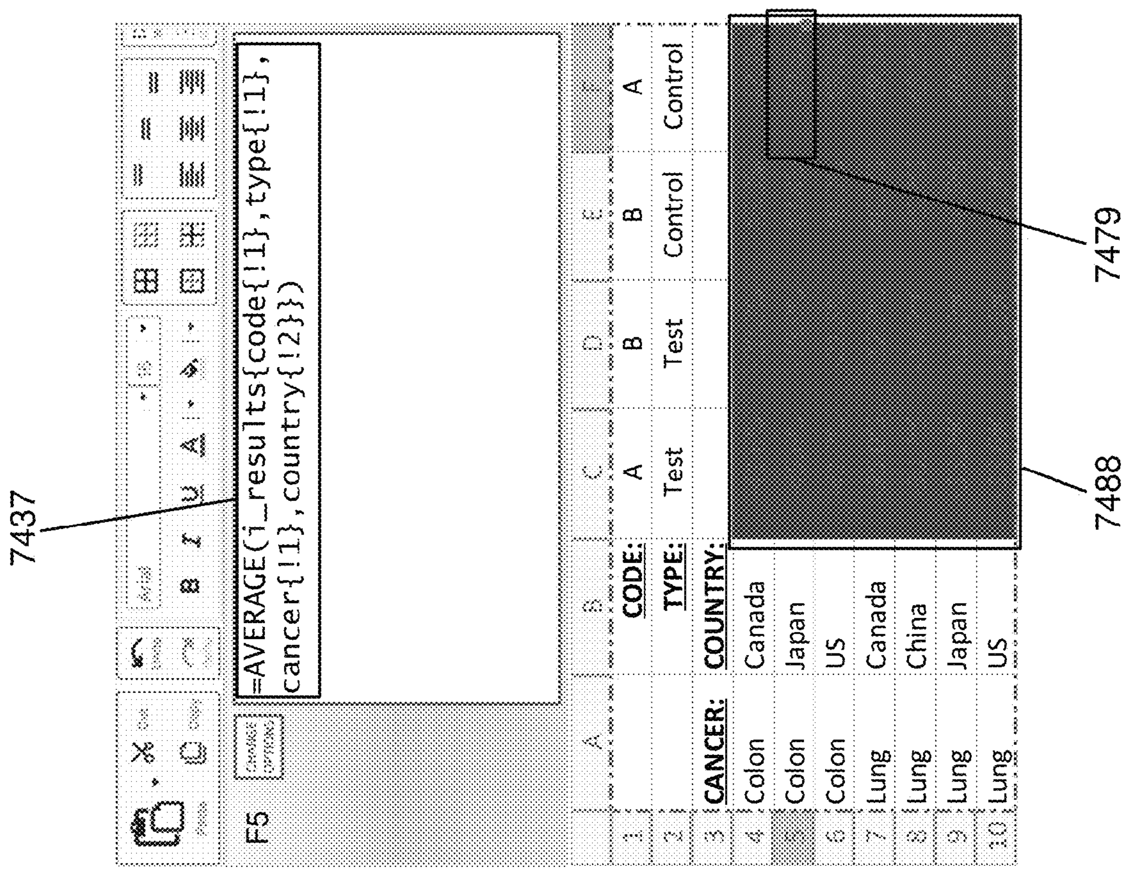
Figure 74A:
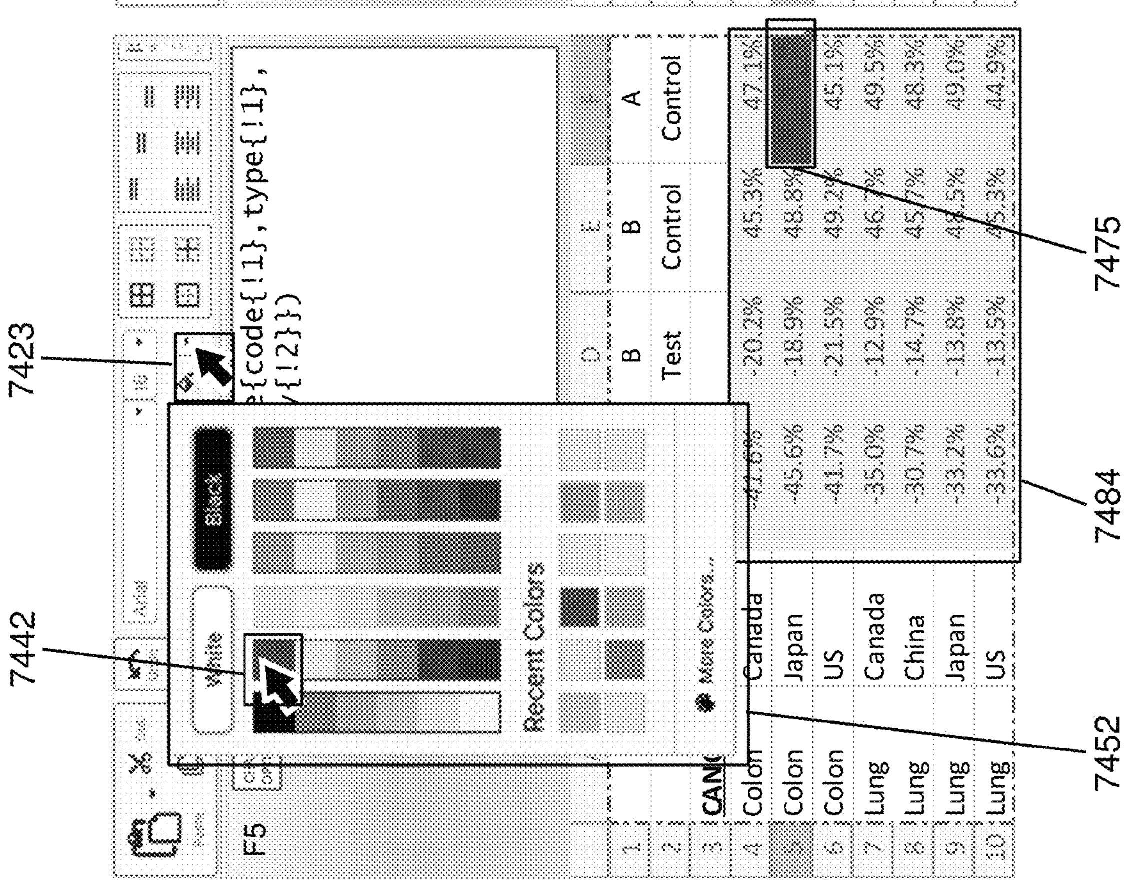
Figure 75:
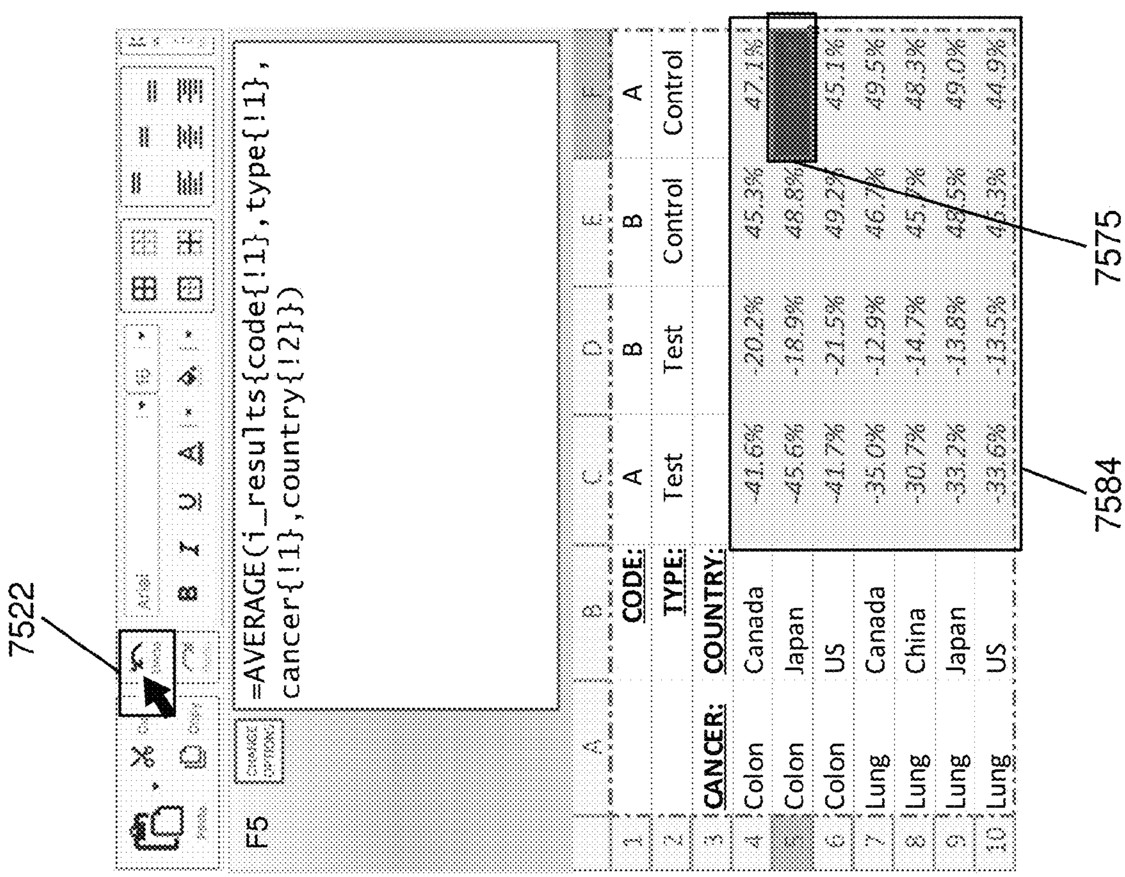

FIG. 74A examples the user then filling cell 'F5' 7475 red by clicking the fill ribbon button 7423 and then clicking the red fill 7442 in the color selector 7452 as they normally would. As previously described for this embodiment this results first in the auto conversion to function controlled and then auto propagation of the red to all the cells in the body 7488 (in FIG. 74B). However, the user only wanted to put red in the worst performing combination in cell "F5' 7479 so in they click the 'Undo' button 7522 in FIG. 75 once reverting the red fill to only cell 'F5' 7575 reverting the other body cells 7584 to the previous green fill. In this embodiment the red formatting is controlled by the function not controlled as in a normal spreadsheet by the cell.

While the preceding auto conversion examples have been for the body of a 'WRITE_GROUP_2D' function it works for the headings, the labels and the different argument groups for our different functions (e.g., WRITE_V, WRITE_CALC_H, FILTER)

Function Controlled Formats—Auto Conversion Auto Propagation

FIG. 76A and FIG. 76B examples the spreadsheet function specified formatting automatically flexing its propagation with changes in the instantiation of the function formula for a function with invisible formatting arguments. It examples how the function control of the formatting in-cell 'F5' works in this embodiment. When the user decides they want to see the 'CODE:' and 'TEST' results by 'CANCER:' not by 'CANCER:' and 'COUNTRY:' they remove 'country' 7634 from the formula 7633 as shown in FIG. 76B where cancer 7638 is the only remaining vertical specification in the formula 7637. This changes the function result from the ten-row output in cells 'A1' to 'F10' 7684 in FIG. 76A to the five-row output in cells 'A1' to 'E5' 7677 in FIG. 76B. The content cell 'F5' 7675 no longer exists and therefore neither does its formatting 7679 in our technology. The body of the results 7678 reverts to what is now the 'ALL BODY' formatting with an argument which is invisible in this example (because the formulas 7633 and 7684 have invisible formatting arguments). That formatting is what was in the rest of the body cells 7684 had before the formula change to add the red fill.

FIG. 77A and FIG. 77B examples the spreadsheet function specified formatting automatically flexing its propagation with changes in the instantiation of the function formula for a function with visible formatting arguments. It examples the same set of formula changes as FIG. 76A and FIG. 76B but with visible format arguments. When the user removes 'country' 7734 from the formula 7733 in cell 'A1' 7761 our technology automatically removes and resets the impacted arguments in this example the 'FILL BODY' argument 'FILL BODY[F5{FF0000},REST{E3EFDA}]' 7743 (before in FIG. 77A)

becomes

'FILL BODY[E3EFDA]' 7748 (after in FIG. 77B).

Had the user also previously changed the font, font color, italics or other format in cell 'F5' 7775 from the rest of the body formatting those arguments would have been removed and the argument term reverted to the remaining values. Whether the arguments are visible or invisible does not change the outcome of the results.

While the auto conversion and auto removal and reset examples in FIG. 77A and FIG. 77B and in FIG. 56A and FIG. 56B have used a 'WRITE' function and changes to the body of that 'WRITE' output, our technology works for all areas of all of our multi-cell output functions (e.g., any type of WRITE function for any of the body, headings, and labels or their combinations) and works for any other of our functions where inputs are repeated across arguments (whether visible or invisible).

Function Controlled Formats—Function Argument Specification

Another embodiment of our technology supports formatting in the actual function arguments propagated to the function outputs. That technology is compatible with our visible and invisible arguments and our technologies using HINTs, buttons or other ways of setting arguments/capabilities. FIG. 78A through FIG. 80B example some of the different variants and capabilities.

FIG. 78A and FIG. 78B examples our spreadsheet function-controlled formatting technology done through the normal cell formatting UIs applied to an argument in the function formula, which then instantiates the formatting to the corresponding argument populated cell values. FIG. 78A examples the cancer researcher wanting to alter the formatting of their cancer test results generated using a 'WRITE_GROUP_2D' function. In this embodiment the user applies the formatting directly in the formula and our technology then replicates that formatting to the cells instantiated by that argument. The user decides they would like the vertical headings and their labels to be a bright pink. Therefore, they highlight the two arguments in that argument term 'cancer,country' 7834 of the formula in cell 'A1' 7861 and then click the font color selector button in the ribbon 7823 to open the color selector 7864. The user then clicks the bright pink color 7845 and sees the result in FIG. 78B in the pink applied to the two arguments 'cancer, country' 7834 which then instantiate it in the function output 7886 from those arguments. In this embodiment the color is instantiated to both the heading outputs 7896 and their column labels 'cancer' and 'country' 7876. Had the labels option been turned off the pink would have still been instantiated into the headings 7896. In this embodiment the color change to the vertical argument 'cancer,country' 7838 is recorded in an argument 7847:

FONT COLOR V[FF40FF]

This name argument term gives the hex color number for the bright pink and records it is the font color for the vertical (V) heading (the only vertical argument in the function). Note, in our technology had the labels been separately listed in the formula or other input, which will be discussed later, they could have been colored differently. The user also could have decided to color 'cancer' one color and 'country' another color which then would be replicated in the output.

FIG. 79A examples a further capability of our technology to replicate the case used in the function formula in the output labels. In this embodiment our technology automatically populates the field names as the labels for the headings as exampled in 'cancer' and country' appearing as the labels 7876 in FIG. 78B 7886 above their heading values 7896. Our technology supports the user making case changes in the formula and those case changes being replicated to the output. So, when the user changes the argument terms 'cancer, country' 7838 in FIG. 78B to 'CANCER,COUNTRY' 7934 in FIG. 79A the label outputs in the spreadsheet change from in 'cancer' and country' 7876 in FIG. 78B to 'CANCER,COUNTRY' 7972 in FIG. 79A. FIG. 79B examples that in our technology with invisible arguments (formula 7947 in FIG. 79B versus 7943 in FIG. 79A) the user would get the same set of results for the color change. In a different embodiment those case changes would have been replicated to the values outputted, the non-capitalized values in 7986.

FIG. 80A and FIG. 80B example in both or visible and invisible argument technologies our spreadsheet function-controlled argument formatting technology working for all the arguments of a 'WRITE_GROUP_2D' function. In these examples the user colored the horizontal headings purple and case wise changed them to initial cap 'Code,Type'. The user then colored the group (range or array function) calculation argument blue and italicized it 'AVERAGE(i_results)' using the typical click commands as previously exampled. Those changes where then instantiated in the outputs 8074 and 8085 for the formula 8043 with visible arguments in FIG. 80A and the outputs 8078 and 8089 for the formula 8047 with several invisible arguments in FIG. 80B.

Our technology supports this in-formula formatting replication to fills and borders realizing that visually displaying that in the formula will change the look of the formula to include those features, e.g., outlining arguments or background filling them. Our technology supports users making the formatting they desire function controlled.

Function Controlled Conditional Formats

FIG. 81A through FIG. 86B examples conditional formats controlled by our function technology. The function UI interface for supporting the conditional formats could be any of our previously exampled function UIs and the recording of the conditional formats could be in visible arguments or invisible arguments. FIG. 81A through FIG. 85B examples conditional formats instantiated using our HINT technology with a visible named argument group.

Figure 81B:
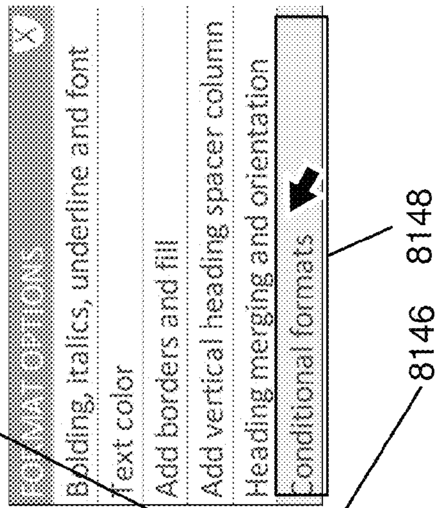
Figure 81A:
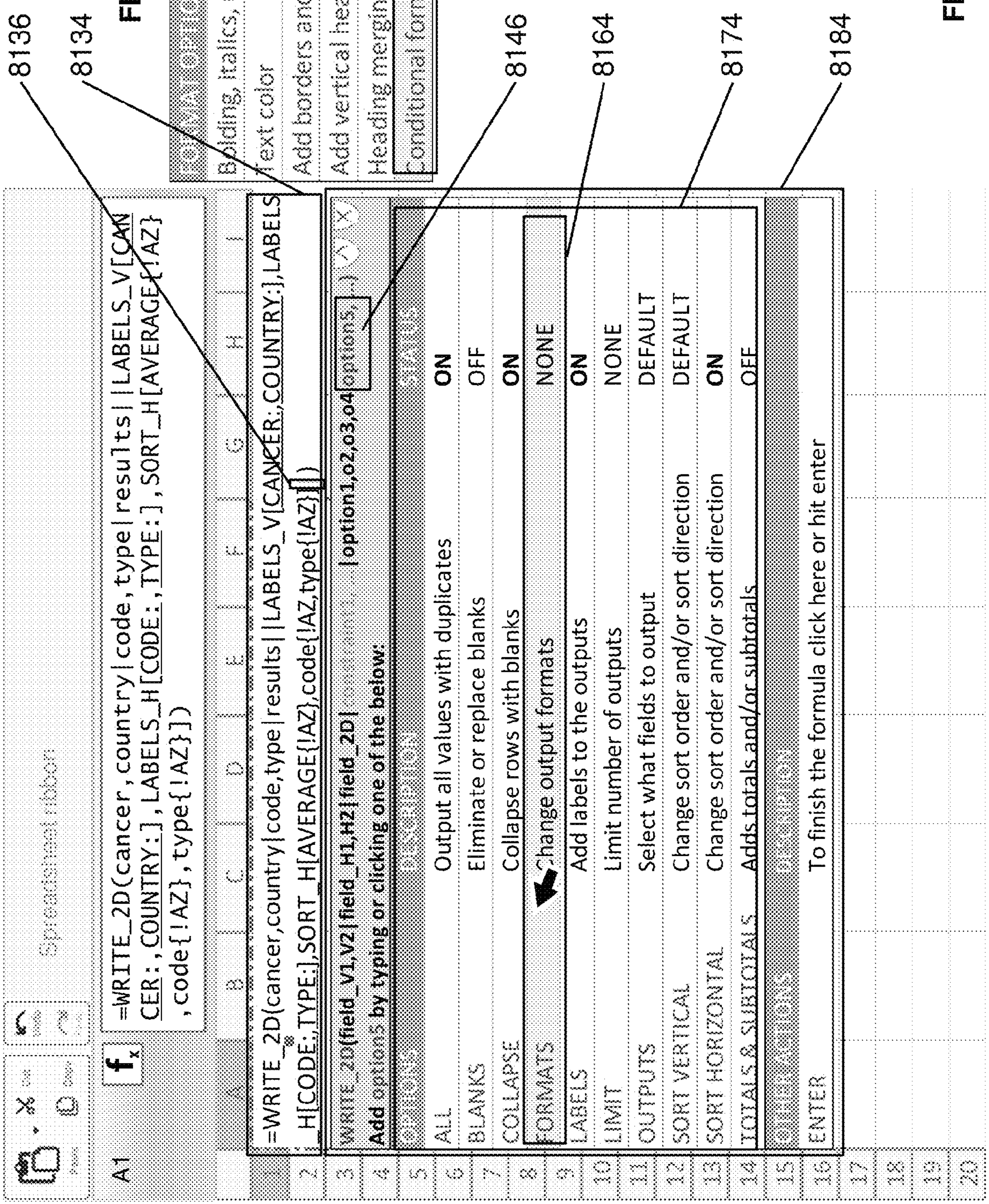

FIG. 81A examples the cancer researcher applying conditional formats to a 'WRITE_2D' function formula. They have already filled in the required arguments and are now about to input their fifth option setting 8146 into the formula 8134. In this example they do that via clicking a 'FORMAT' selection 8164 in the HINT 8184. This opens a 'FORMAT OPTIONS' popup shown in FIG. 81B. The user then clicks the 'Conditional formats' option 8148 which in this embodiment opens the 'CONDITIONAL FORMATTING' popup in FIG. 82A.

Figure 82B:
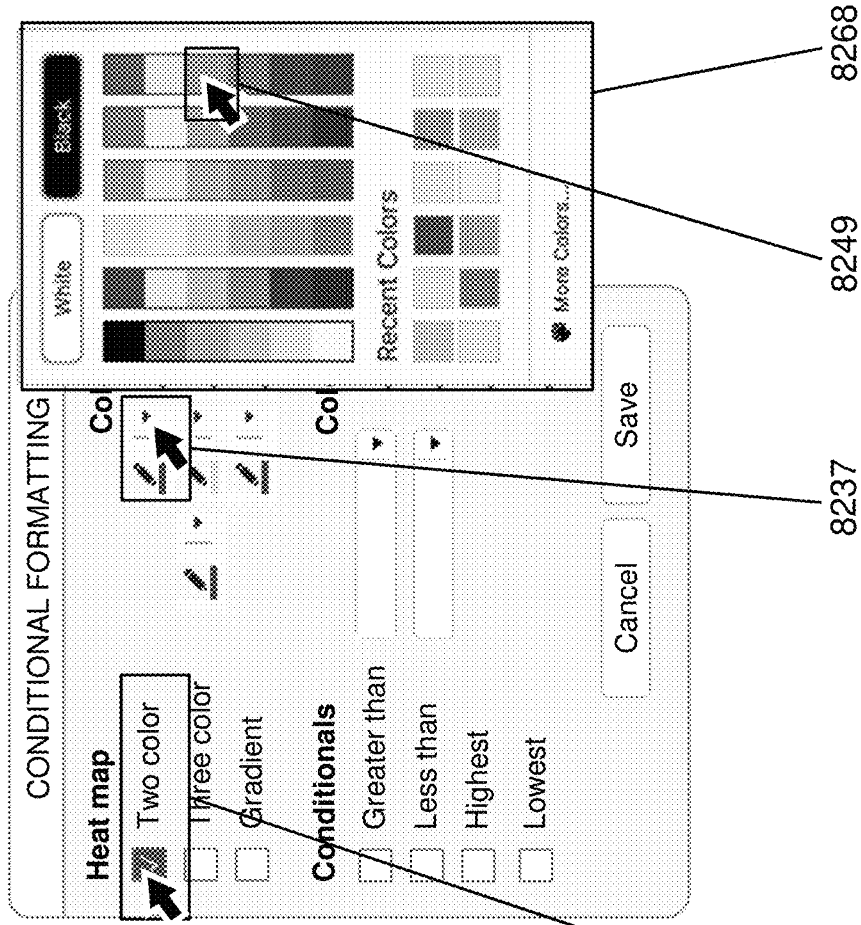
Figure 82A:
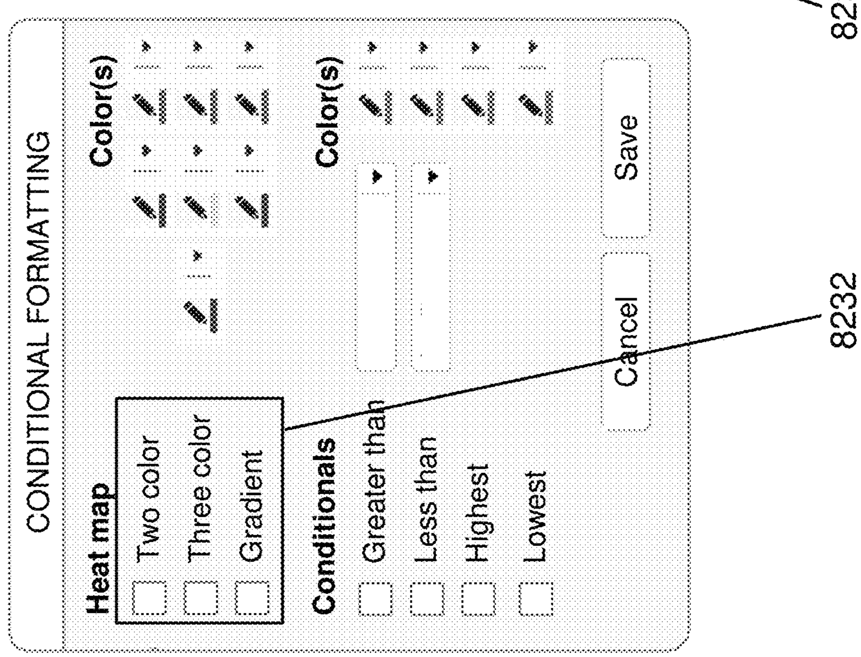
Figure 83:
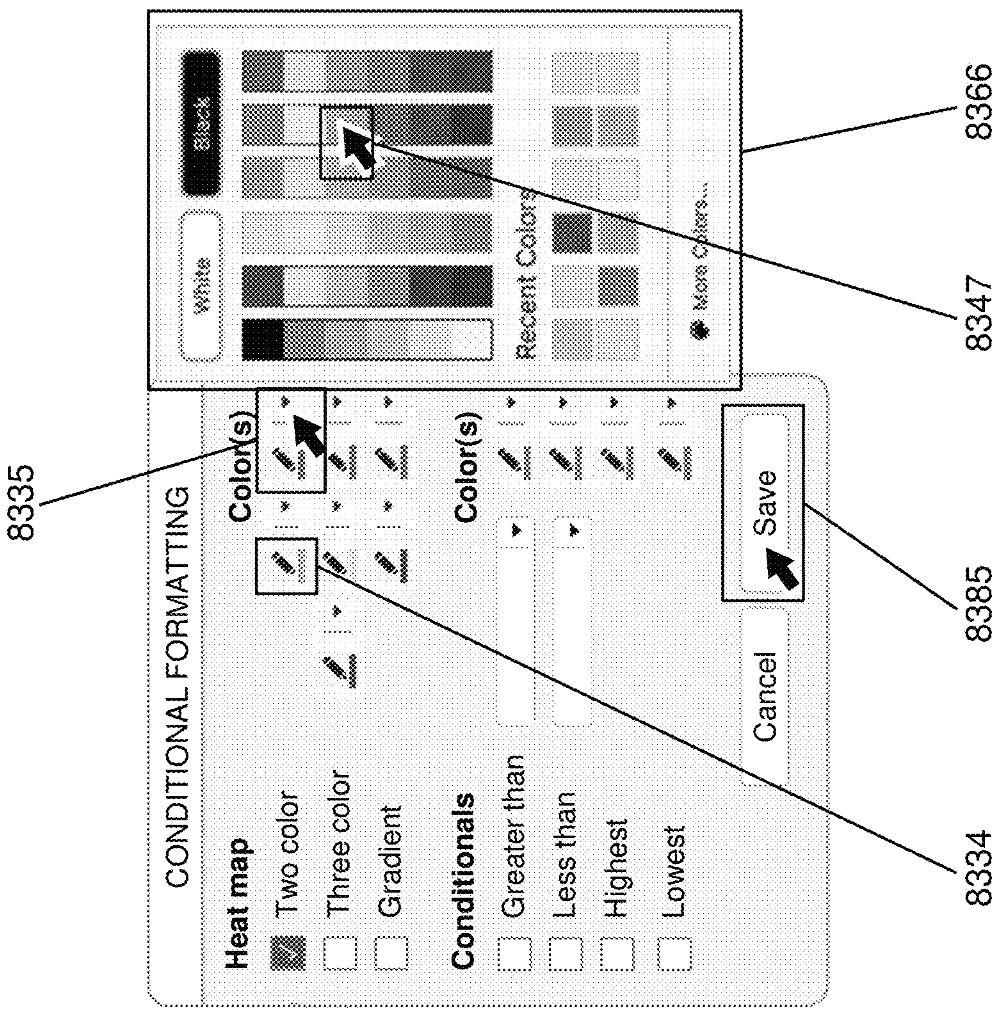

FIG. 82A examples two different sets of conditional formatting options presented to the user. There are many additional ways to set up conditional formatting, this embodiment has a 'Heat map' set which examples FIG. 6 'Multiple cascading selector lists, Fixed Content, 18. Multiple selections'. Where both the 'Heat map options' 8232 and the color selectors '8268 are fixed lists. In this example the user clicks in FIG. 82B the selection list panel 'Two color' 'Heat map' 8235 and then clicks the color button 8237 getting the color selector popup 8268 where they select violet 8249. In FIG. 83 the user sees the violet selection 8334 and then clicks the color button 8335 getting the color selector popup 8366 where they select blue 8347 upon which the user clicks the 'Save' button 8385 to generate the outcome in FIG. 84B.

Figure 84B:
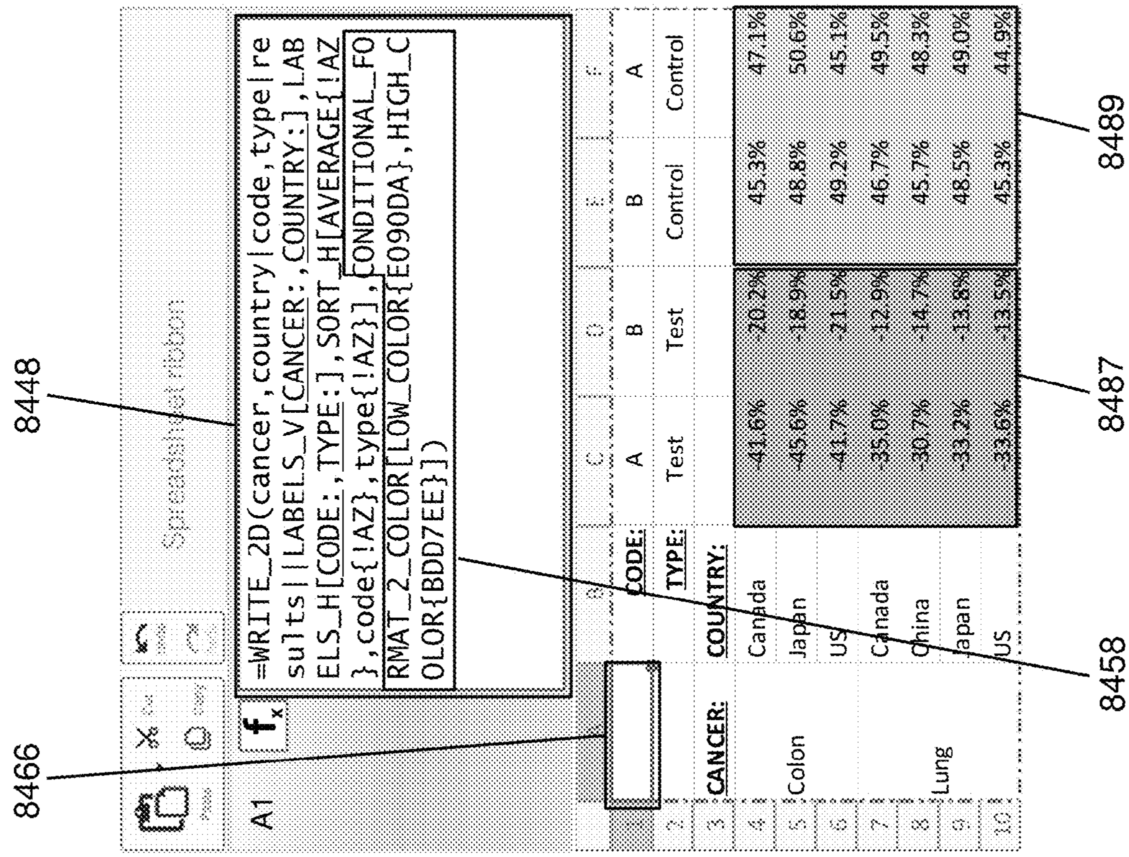
Figure 84A:
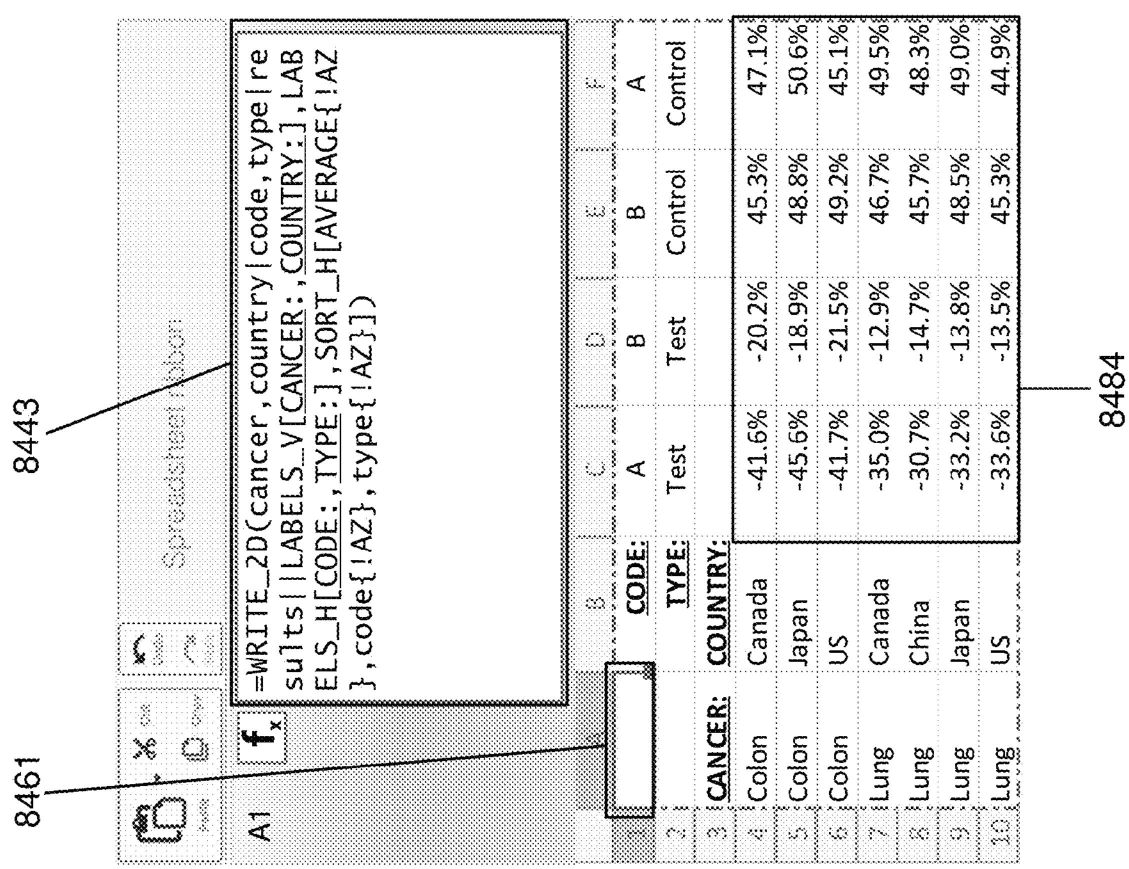
Figure 85B:
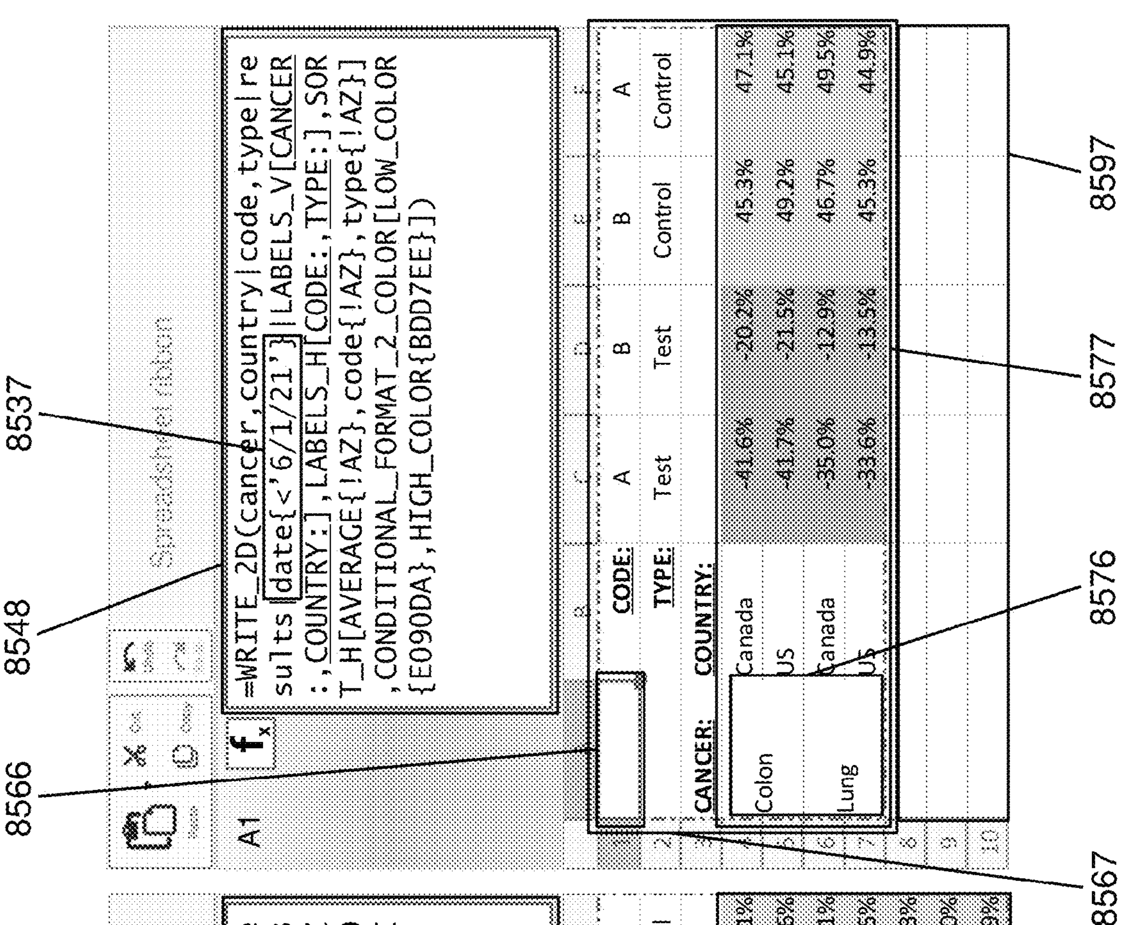
Figure 85A:
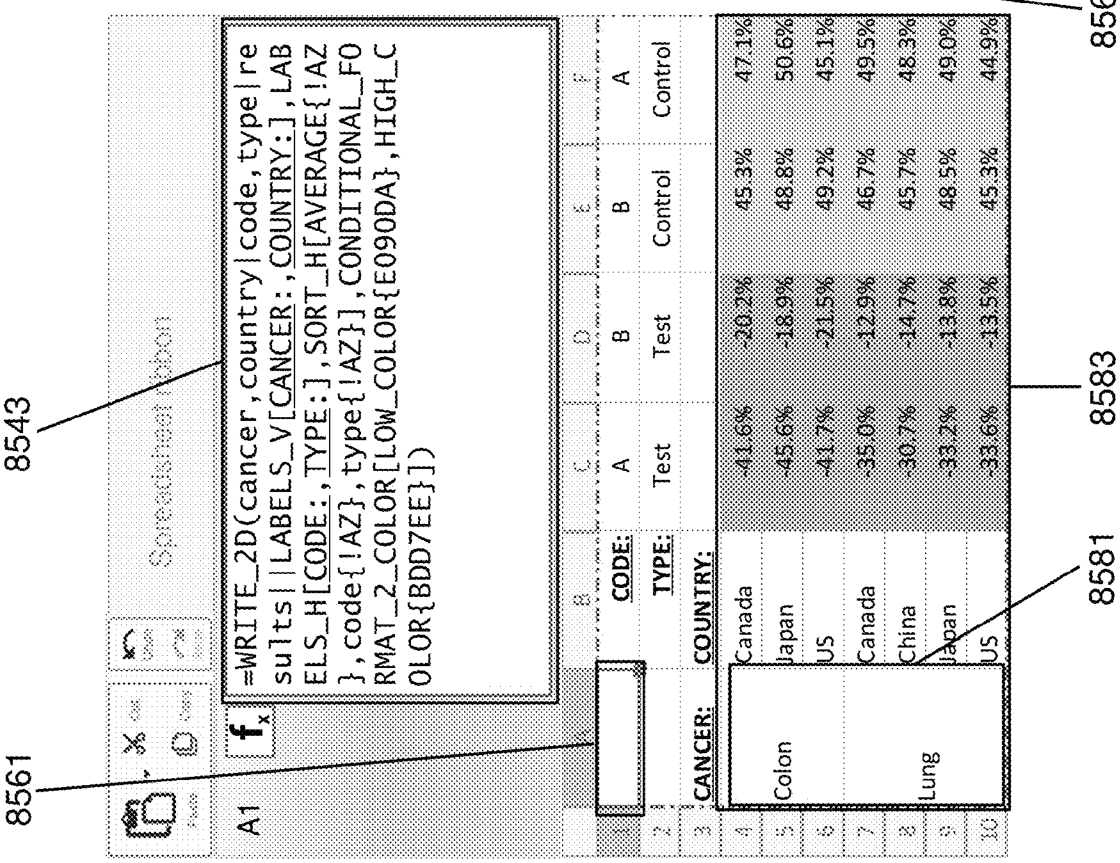

FIG. 84A and FIG. 84B examples the before and after heat map conditional formats set up by the user. It colors the values in FIG. 84B so that the lowest fifty percent of the values are violet 8487 and those in highest fifty percent blue 8489. In this embodiment the control of the conditional formatting is shown in a visible argument 8458 in the formula 8448 for cell 'A1' 8466. Where the argument was not there in the preconditional-formatting formula 8443 (the before) shown in FIG. 84A for cell 'A1' 8461. And where the values in the body of the 'WRITE_2D' formula were not color formatted 8484. Note in this embodiment the conditional formatting visible argument is a named argument term group (group, because it has multiple arguments), but could have been done other ways.

Figure 86A:
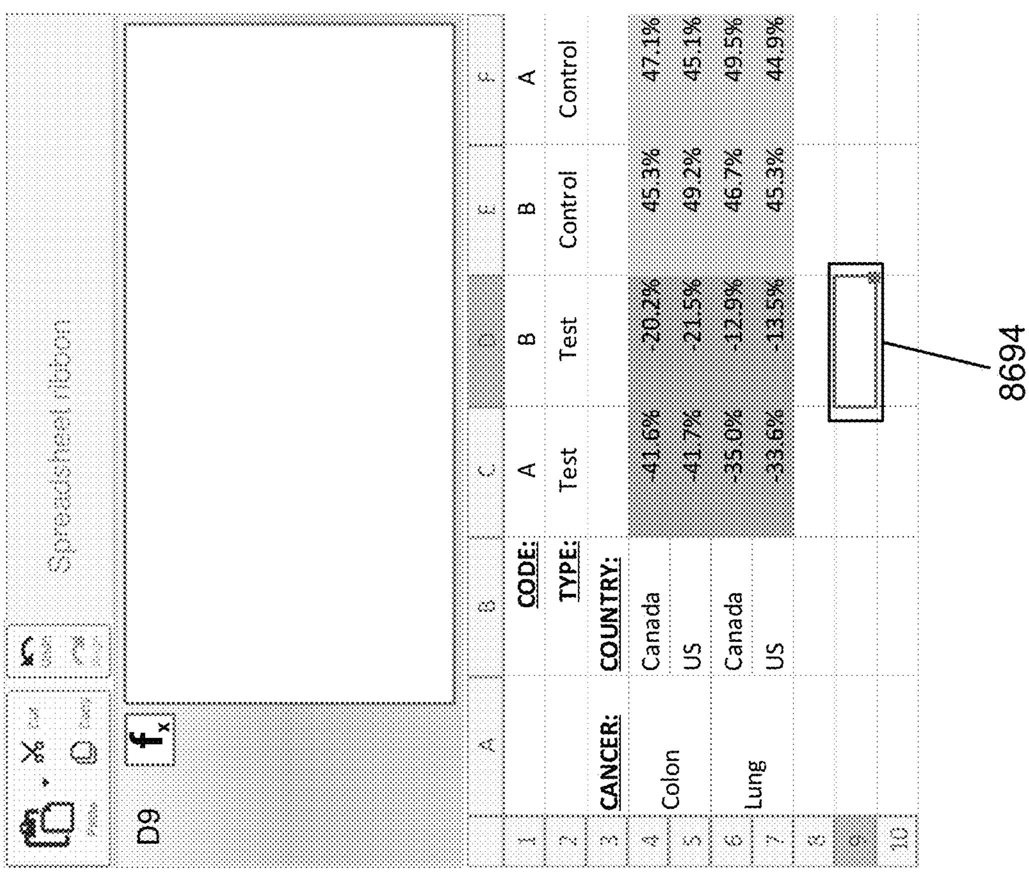
Figure 86B:
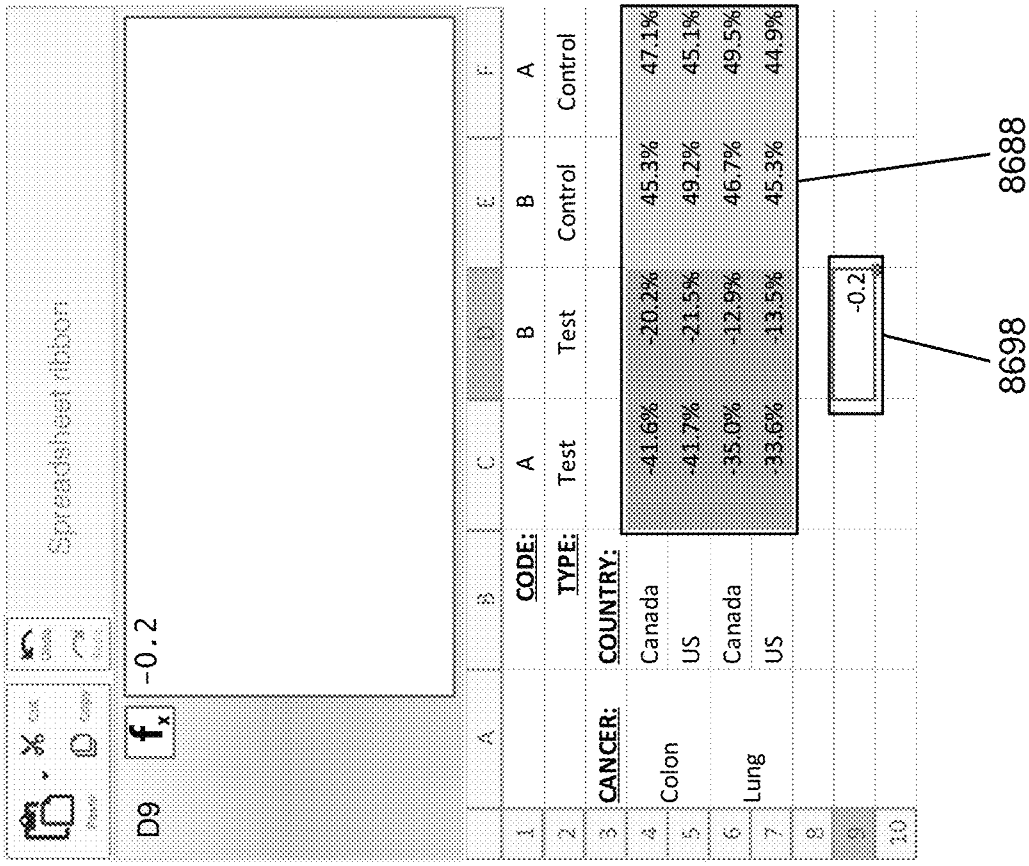

FIG. 85A through FIG. 86B examples how our function rather than the cells controls the conditional formatting. In FIG. 85B the cancer researched decides to look only at the result prior to '6/1/21' by adding that constraint 'date{<'6/1/21'} 8537 to the formula 8548 (vs. 8543 shown in FIG. 85A which is before the date constraint). This reduces the number of rows for each of the two cancer types 8576 (vs. 8581) removing three rows of results 8597. FIG. 86A and FIG. 86B then examples how our function not the cell controls the conditional formatting. This is exampled by the user putting a value '−0.2' into cell 'D9' 8698 which is in the cell area original conditionally formatted as shown in 8583 in FIG. 85A. If the conditional formatting of that cell was controlled by the cell then the value '−0.2' in cell 'D9' 8698 would have a fill of violet instead of the No fill it shows. Which is identical to what is shown for the blank value 8694 in FIG. 86A. This is very different than what was exampled in FIG. 30A through FIG. 30C when applying conditional formatting in an existing spreadsheet (in that example Microsoft Excel). We could further example if the body of the 'WRITE_2D' expanded the conditional fill formatting would expand as was exampled in FIG. 103A and FIG. 103B but we will not replicate variant examples as our technology has many different options for setting up our formatting technologies and works in many combinations of the capabilities.

Instead, we will move onto how our technology for control of formatting works for the flexible copy and paste capability disclosed in our U.S. application Ser. No. 16/191,402. There are multiple versions of our flex copy paste, we will now example how our formatting control works for the flex copy paste version connected to WRITE functions.

Flex Copy Paste Formatting Control

FIG. 87A and FIG. 87B examples how our flex copy paste controlled formatting works after it is set up/instantiated. With this new technology our flexing copy paste capability has the ability to control the formatting of the cells that it populates overriding any cell formatting applied to those cells. In the embodiment in FIG. 87A when the user enters a cell that is flex copy paste populated it triggers a blue dashed line around the entire range of cells within the flex copy paste area 8743. This doted blue line simply lets the user know they are in a flex copy pasted area. Note the blue dashed line for the flex copy paste area has no relationship to the blue fill the user selected to fill the flex copy paste area. It also triggers a green dot dash line around the range(s) of cells populated by the related WRITE functions, 8741 and 8733 in this example. This was triggered by the user entering the cell 'C5' 8742 which populates the cell formula in the formula bar 8724 and in this embodiment exposes the 'FLEX OPTIONS' button 8722 adjacent to formula in the formula bar.

FIG. 87A and FIG. 87B then example how the flex works when the user alters a date input in cell 'G2' from '1/3/19' 8737 in FIG. 87A to '1/4/19' 8777 in FIG. 87B. This adds an additional day of data to the results causing the Horizontal WRITE to populate five cells 8774 in FIG. 87B instead of four cells 8733 in FIG. 87A. It also causes the Vertical WRITE to populate four cells 8791 in FIG. 87B instead of three cells 8741 in FIG. 87A. This causes the flex copy paste populated area to populate twenty cells 8794 in FIG. 87B instead of the twelve cells 8743 in FIG. 87A with the flex copy paste controlled blue fill. That is because this flex copy paste is automatically connected to both of the WRITEs (8774 and 8791) and flexes as they flex using their values as inputs. Using our format controlling flex copy paste the blue fill is populated in those eight additional cells in 8794. Thus, exampling how our technology allows our flex copy paste to control the formatting of the cells that it instantiates.

Figure 88A:
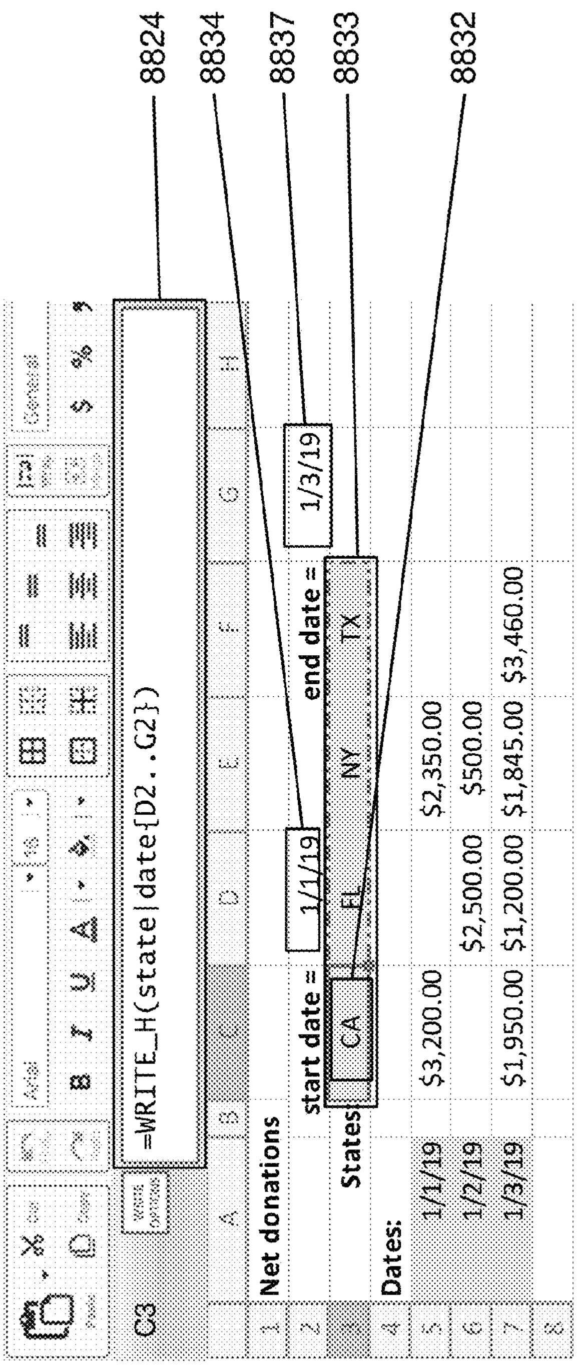
Figure 88B:
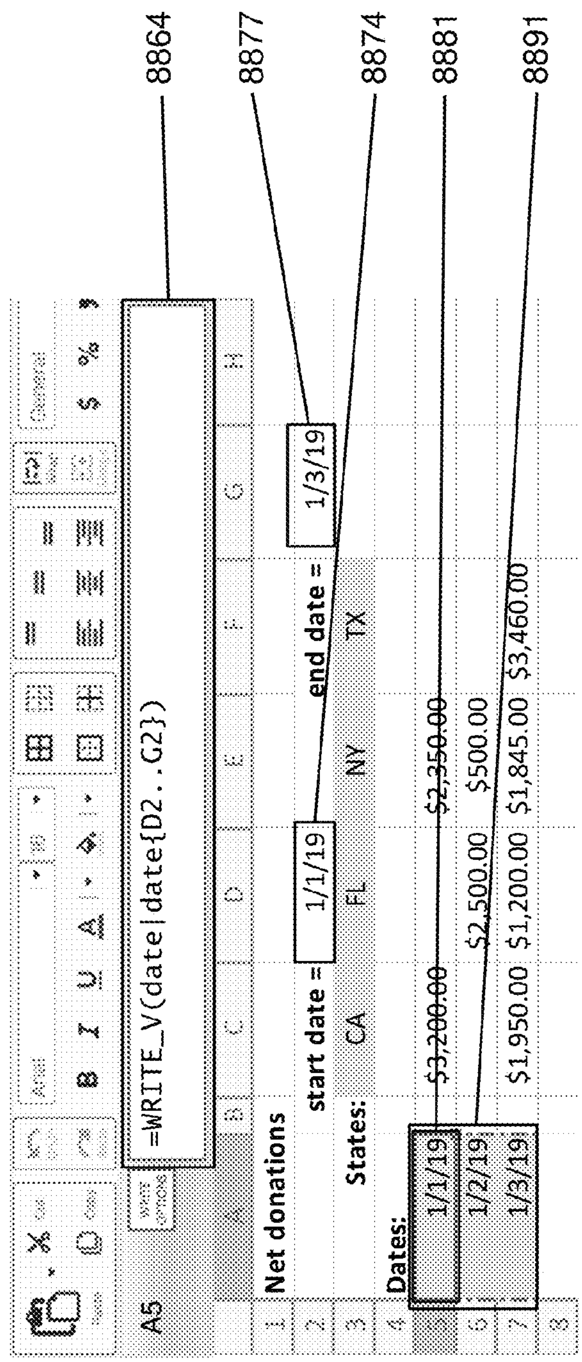

FIG. 88A through FIG. 93C examples one embodiment of how the flex copy paste and its control of cell formatting works in our technology. FIG. 88A examples the 'WRITE_H' (horizontal) used by the flex copy paste. The formula 8824 in cell 'C3' 8832 instantiates the values in the cells 'C3' through 'F3' 8833. The formula '=WRITE_H(state|date{D2 . . . G2}' 8824 is constrained to dates between and including '1/1/19' 8834 and '1/3/19' 8837. FIG. 88B examples the 'WRITE_V' (vertical) used by the flex copy paste. The formula 8864 in cell 'A5' 8881 instantiates the values in the cells 'A5' through 'A7' 8891. The formula '=WRITE_V(date|date{D2 . . . G2})' 8864 is constrained to dates between and including '1/1/19' 8874 and '1/3/19' 8877. Thereby listing all the dates 8891 in the data starting with '1/1/19' and ending with '1/3/19'.

Figure 89A:
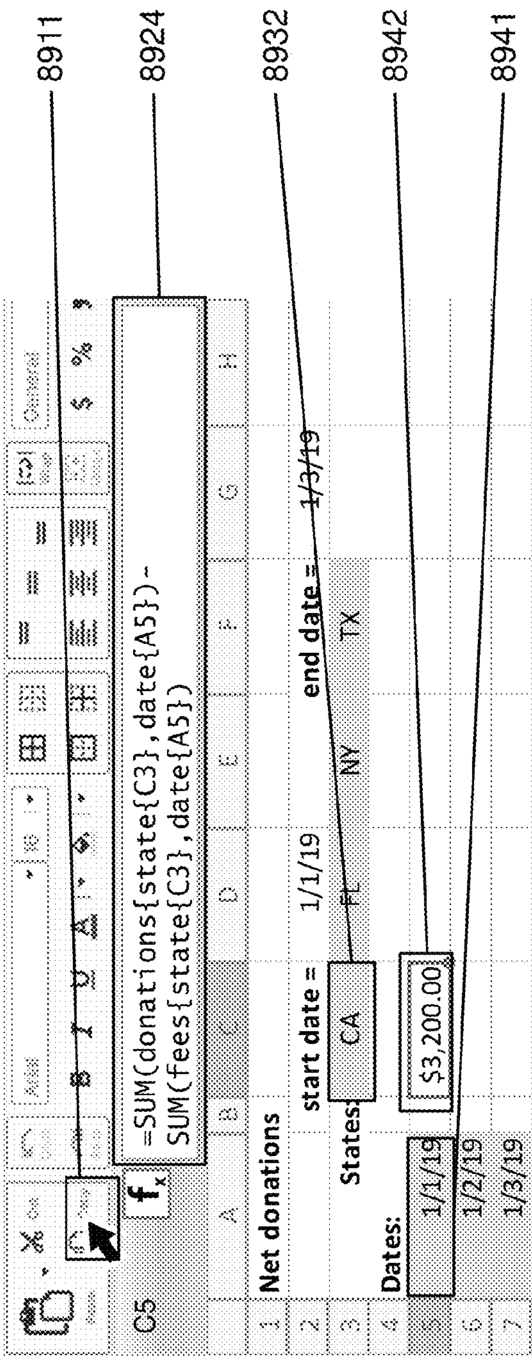
Figure 89B:
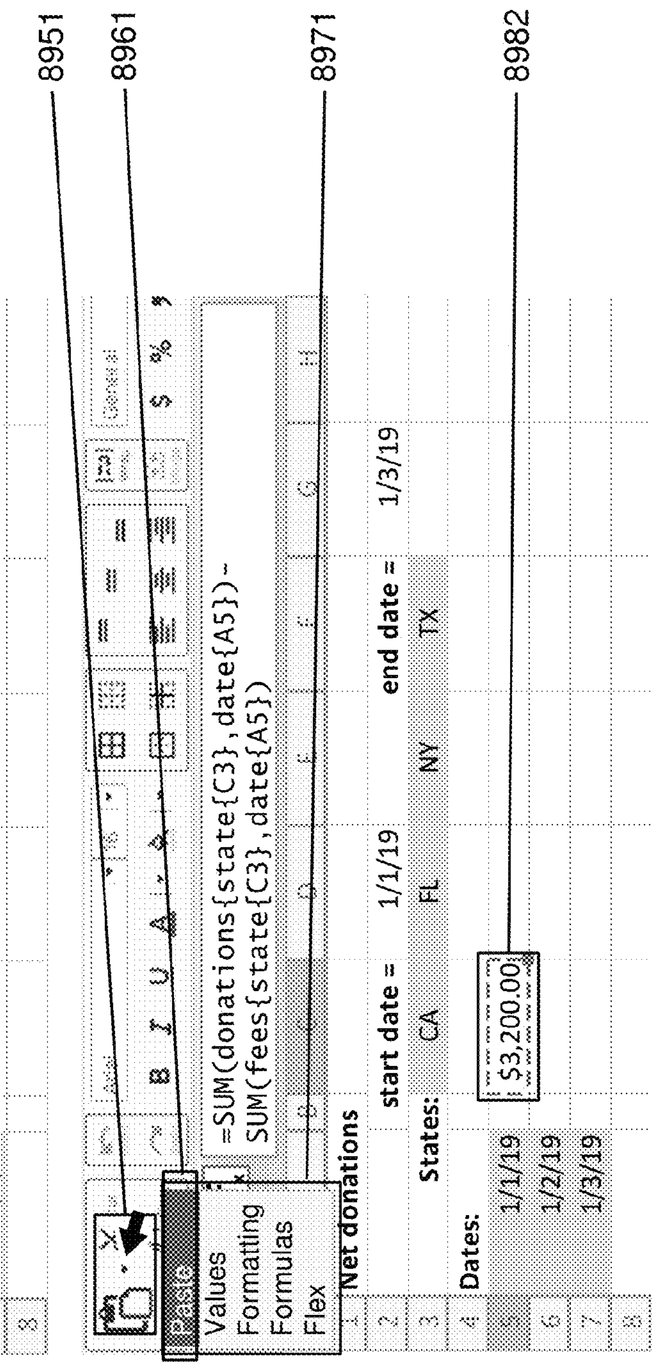

FIG. 89A through FIG. 90B examples one embodiment of how the user sets up the flex copy paste in our technology. In FIG. 89A the charity user has set up a formula 8924 in cell 'C5' 8942 that calculates the net donations from a specified state for a specified date. They want to replicate that calculation for all the states and all the dates instantiated by the two 'WRITE' functions that were exampled in FIG. 88A and FIG. 88B. In this embodiment of our technology this connection is done by the formula 8924 they wrote in cell 'C5' specifying the use of cells 'C3' 8932 and 'A5' 8941 which are populated by the horizontal and vertical 'WRITE' function formulas 8824 in FIG. 88A and 8864 in FIG. 88B. After they click on the 'Copy' button 8911 they then click on the 'Paste' dropdown button 8951 to access the paste options 8971. At this point the cell 'C5' 8982 is ready for pasting but unlike a regular copy paste the user in this embodiment does not need to highlight the target paste area because they are going to change it from the regular 'Paste' 8961 variant to one that only exists in our technology and works differently.

Figure 90A:
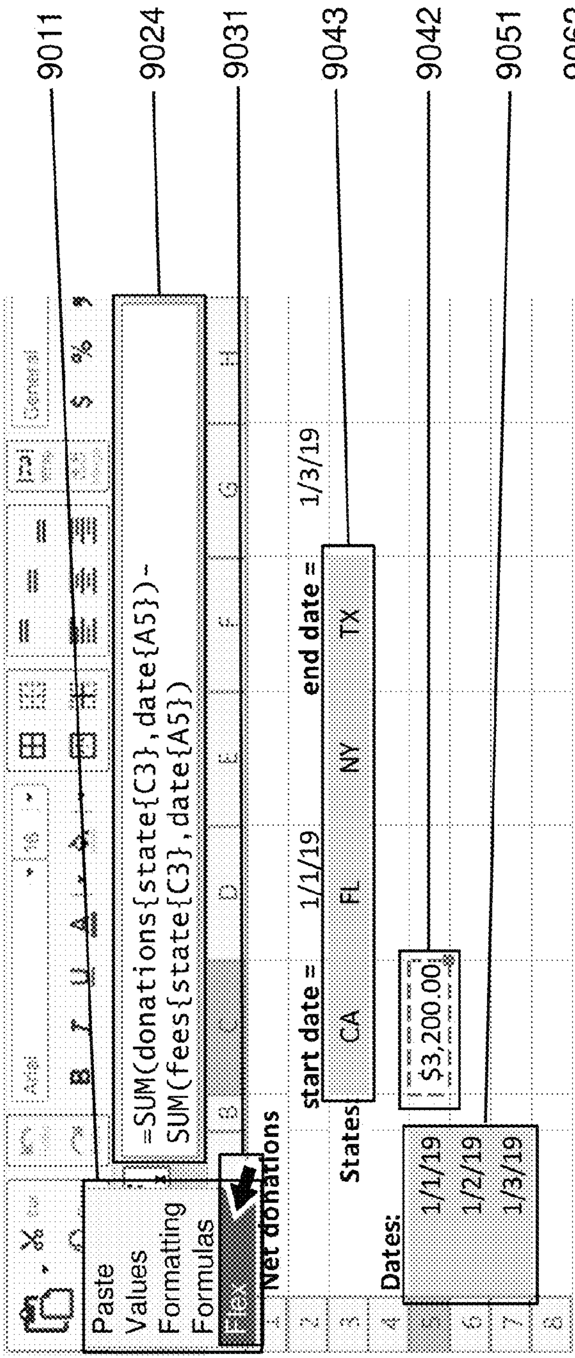
Figure 90B:
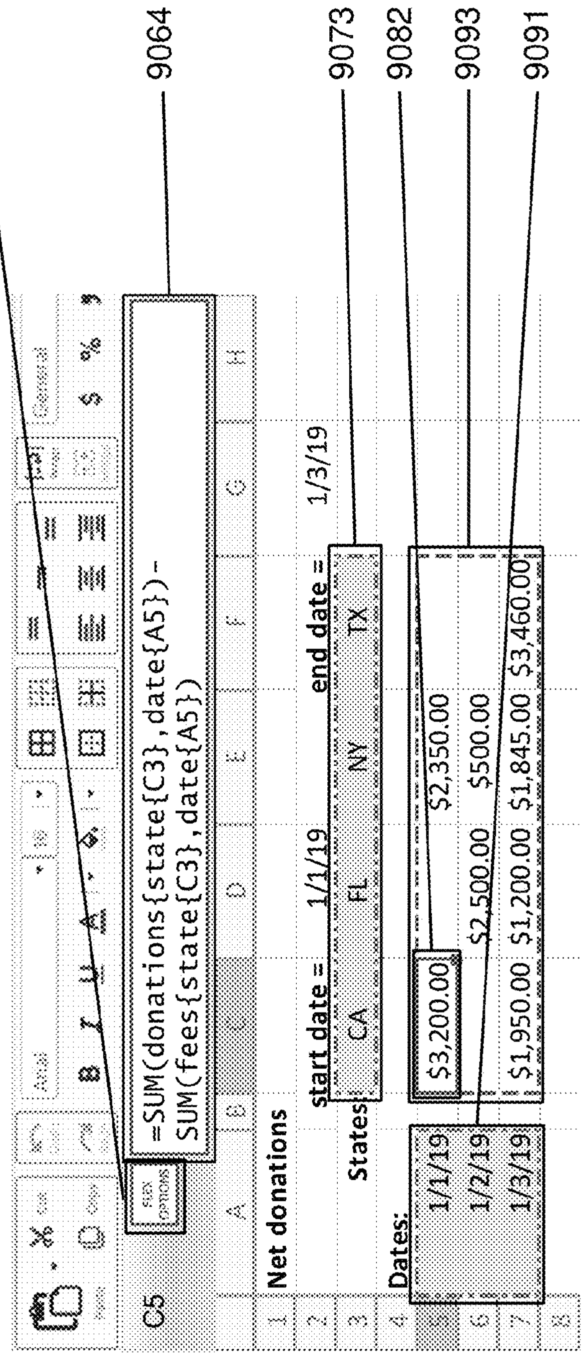
Figure 91A:
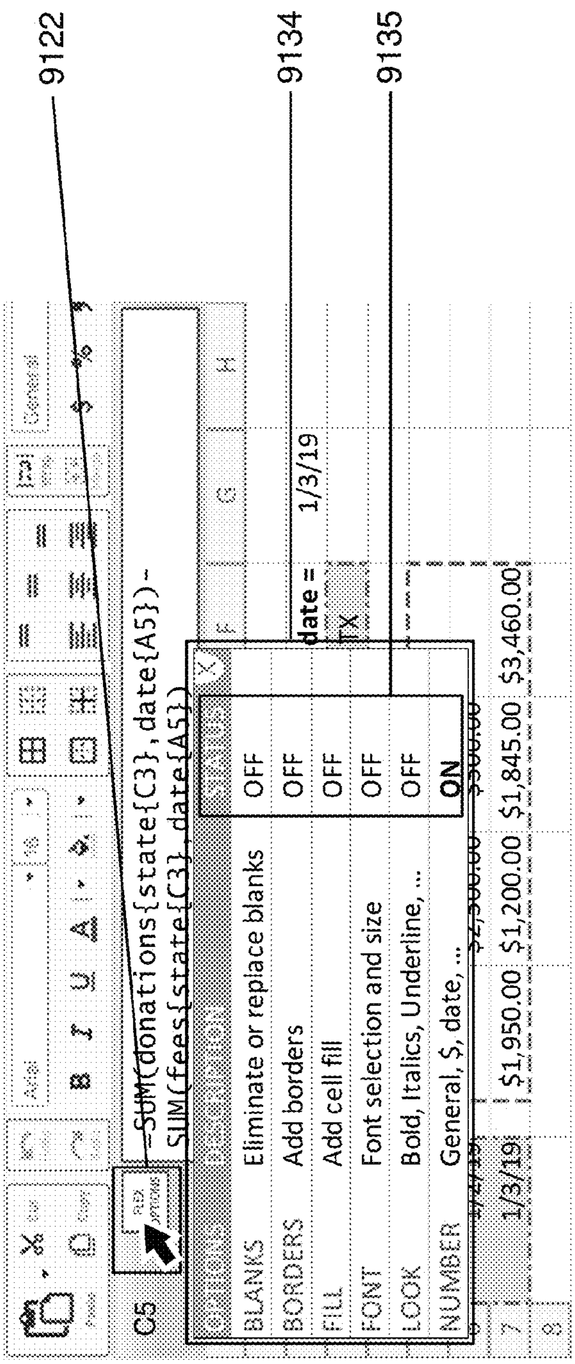
Figure 91B:
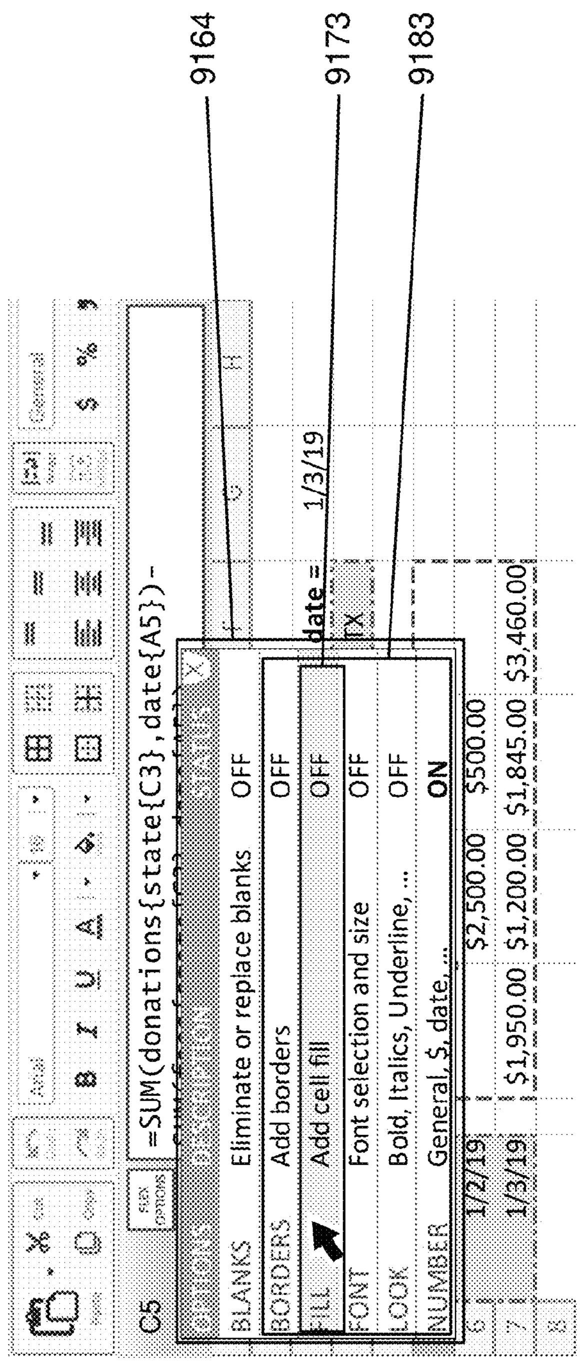
Figure 92A:
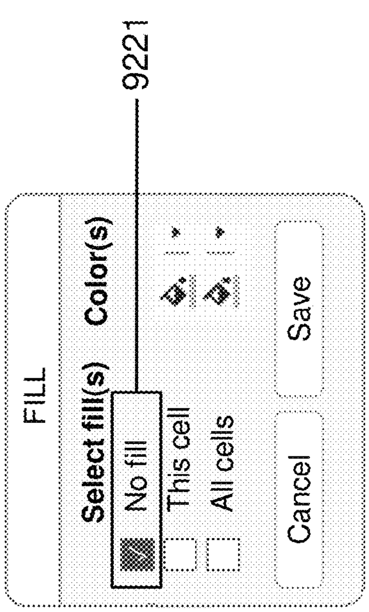
Figure 92B:
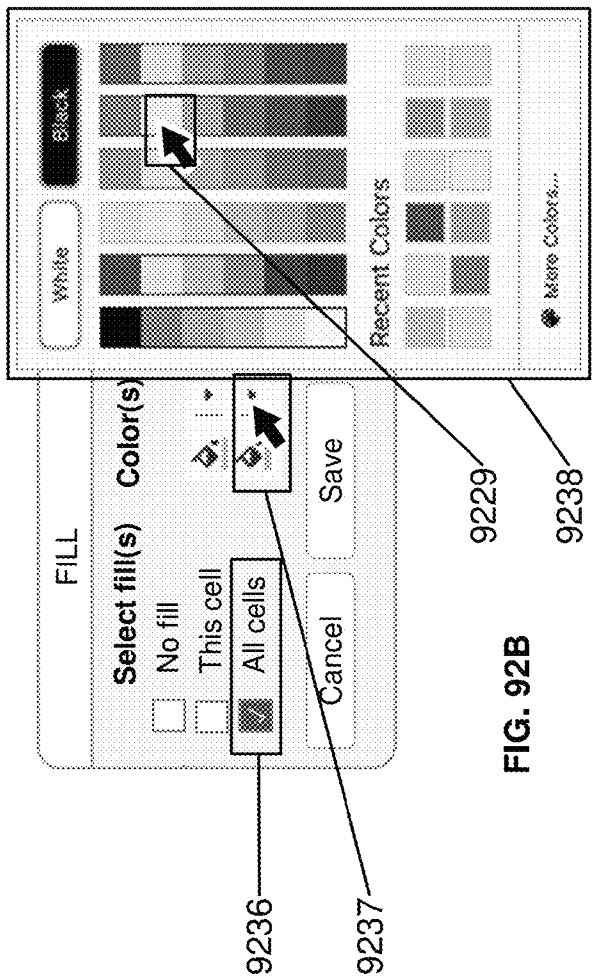
Figure 92C:
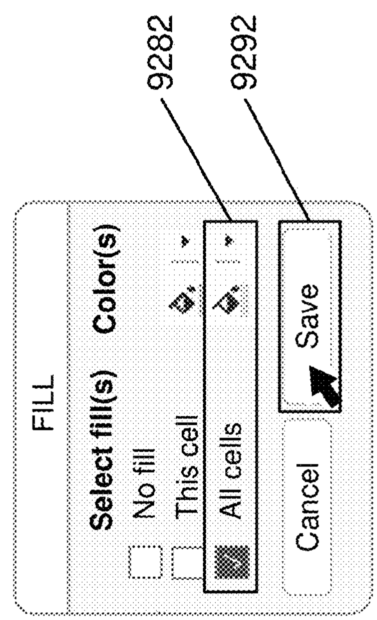
Figure 92D:
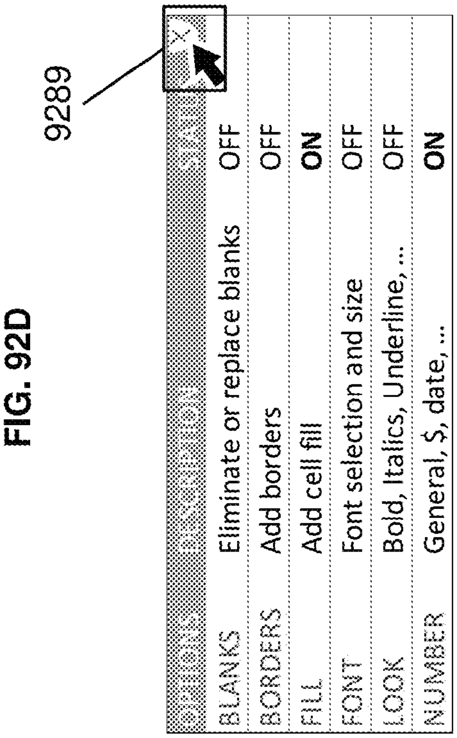

In FIG. 90A the user selects the 'Flex' 9031 paste option which automatically populates the range defined by the WRITE or WRITEs used in the formula 9024 in the cell being copied 9042. In this example that formula is connected to the WRITE formulas populating the ranges 9043 and 9051. The result is shown in FIG. 90B where the flex copy paste instantiated the values (and formulas) in the cells 'C5' through 'F7' 9093. Our technology automatically determined that range based on the horizontal and vertical boundaries created by the connected 'WRITE' function instantiated areas 9073 and 9091. Therefore, the user did not need to specify any paste range because our technology automatically does that. In this embodiment the user was also automatically presented a 'FLEX OPTIONS' button 9062 adjacent to the cell 'C5' 9082 formula 9064 in the formula bar. Because the user is in a cell within the flex copy paste area 9093 this embodiment displays the blue dotted line outlines of that area and the green dot dash outlines of the connected 'WRITE' function instantiated areas 9073 and 9091. Thus, letting the user easily see their flex copy paste and its connected WRITEs.

There are other UI interfaces and types of flex copy paste supported by our technology exampled in our U.S. application Ser. No. 16/191,402. And there would be a right click flex 'Paste Flex' 6034 UI option appropriately active as shown in FIG. 60A, right click menu 6044, user shortcuts and other access methods. Rather than exampling more of those variants now we will move on to exampling a couple of different embodiments for setting up in our technology the flex copy paste controlling of the formatting of the cells instantiated and then briefly example other flex copy paste types and situations.

FIG. 91A through FIG. 93C examples one embodiment for setting up the flex copy paste formatting control. It is similar to previous examples for our Function control of formatting applied to flex copy paste. The charity user decides they would like the net donation calculated values to be filled with a light blue color. In this embodiment they click the 'FLEX OPTIONS' button 9122 in FIG. 91A which automatically opens the 'OPTIONS' selector popup 9134. The user then clicks the 'FILL' 9173 option in that popup 9164 in FIG. 91B. This opens the 'FILL' popup in FIG. 92A with the current default of 'No fill' checked 9221. The user then clicks in FIG. 92B the 'All cells' check box 9236 and then clicks the color selector dropdown 9237 to open the color selector 9238. The user then clicks the light blue 9229 which in this embodiment returns them to the 'FILL' popup in FIG. 92C with the light blue color selected for 'All cells' 9282 (note: a FIG. 6 'Multiple cascading selector lists, Fixed content, 17. Single specification set' selector list panel). The user then clicks the 'SAVE' button 9292 which returns them to the 'OPTIONS' selector popup in FIG. 92D. The user then clicks the 'X' 9289 to get the fill result 9343 in FIG. 93A. In this embodiment of the technology the formatting specification is invisible in the formula 9324 for cell 'C5' 9342 or any of the other cells instantiated by the flex copy paste. However, in a different embodiment exampled in FIG. 93B the formatting specification 9356 is visible in the formula 9354 for cell 'C5' 9342 or any of the other cells instantiated by the flex copy paste.

Figure 93A:
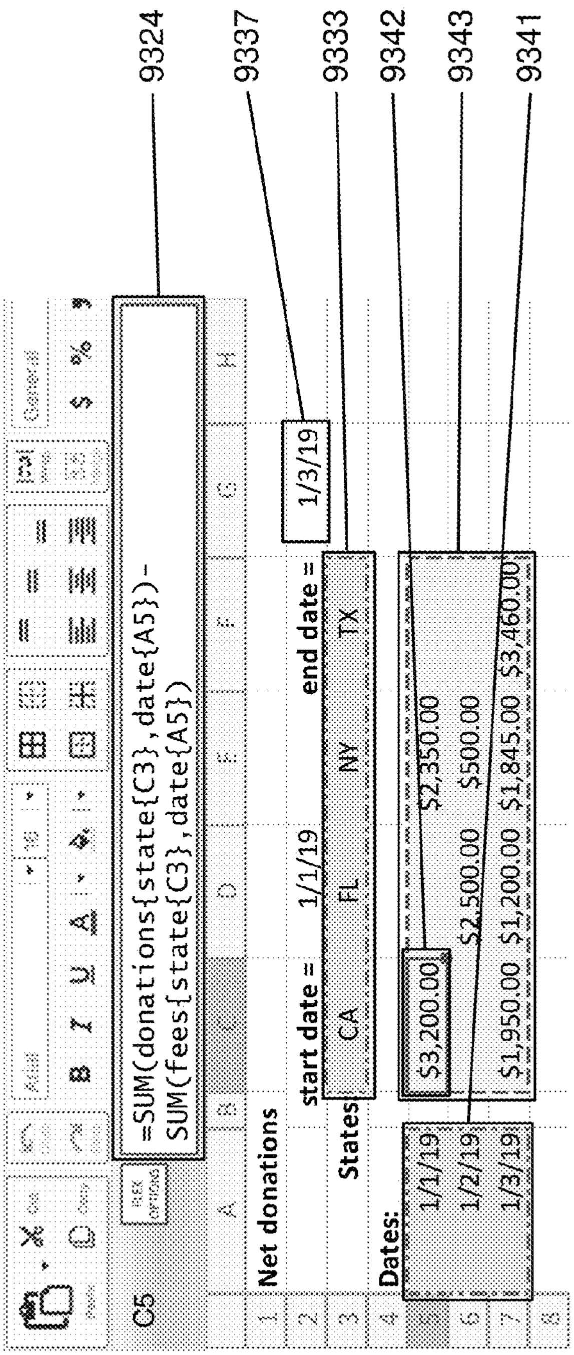
Figure 93B:
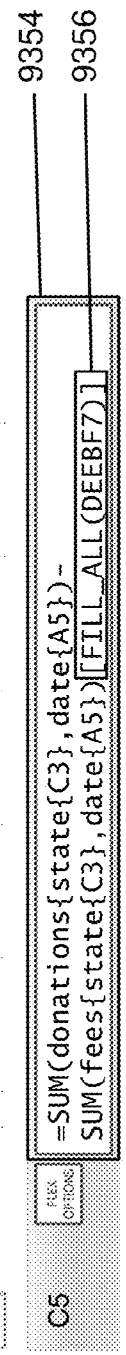
Figure 93C:
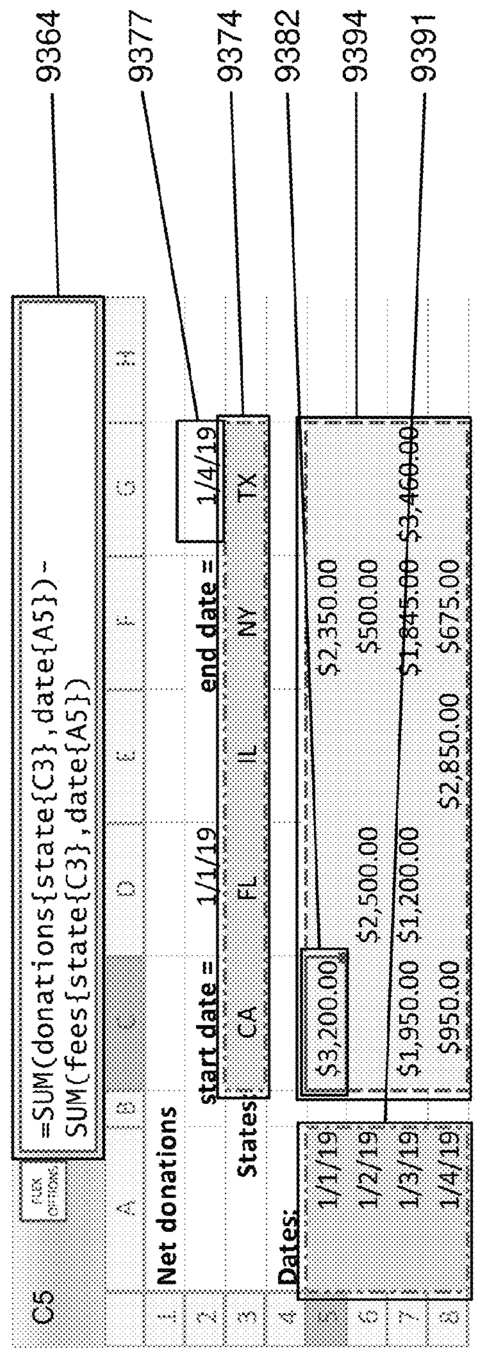

The flexing of the values, formulas and formatting works as again exampled here by the change of date '1/3/19' 9337 (FIG. 93A) to '1/4/19' 9377 (FIG. 93C). This adds an additional day of data to the results causing the Horizontal WRITE to populate five cells 9374 (FIG. 93C) instead of four cells 9333 (FIG. 93A). It also causes the Vertical WRITE to populate four cells 9391 (FIG. 93C) instead of three cells 9341 (FIG. 93A). This causes the flex copy paste populated area to populate twenty cells 9394 (FIG. 93C) instead of the twelve cells 9343 (FIG. 93A) complete with the light blue fill. Thus, completing and end-to-end exampling of how our technology allows our flex copy paste to control the formatting of the cells that it instantiates. This example used our button accesses formatting setup for the flex copy paste control, but our technology supports other methods of setting up the capabilities such as our HINT based approach.

Flex Copy Paste Formatting Control—Auto Conversion

FIG. 94A through FIG. 95B examples another embodiment of how our flex copy paste formatting is specified, one of our auto conversion variants. This parallels the previous similar approach for spreadsheet function formatting specification converting a traditional cell formatting setup to one controlled instead by our flex copy paste technology. FIG. 94A examples the user formatting cell as they would in a traditional spreadsheet clicking the fill selector button 9414 to get the fill selector 9435 within which they specify the light blue fill by clicking 9426 to fill the cell 'C5' 9442 light blue. However, in this embodiment a moment or two after that cell fill population our technology automatically fills the entire flex copy paste range 9493 as shown in FIG. 94B. In this embodiment the user was not given the 'FLEX OPTIONS' button as exampled in FIG. 90B 9062 but instead was given a blue '$f_F$' formula indicator 9462 in the formula bar button letting the user know they were in a F for Flex cell (rather than a plain x formula cell). It also lets the user know that this embodiment is also supported by our HINT technology. Our technology supports multiple types of different specification of the flex copy paste control of the formatting so these examples could have had the 'FLEX OPTIONS' button and all its capabilities or even a combination of our button technology and our HINT technology.

However, in this embodiment if the user really only wanted to fill the single cell within the flex copy paste range they simply click the 'Undo' button 9511 as exampled in FIG. 95A (or use the shortcut, right click menu undo or other method) to fill only that cell, cell 'C5' 9542 in this example. If the user realizes that they didn't want to use the fill at all then they simply repeat the 'Undo' 9561 (or other method) as exampled in FIG. 95B to remove the fill as shown in cell 'C5' 9582. In a different embodiment an additional Undo step is added with a reversion to cell-controlled formatting, as previously described. While our technology supports other ways of specifying the formatting control we will now example the nature of the control in more complicated situations.

Figure 97A:
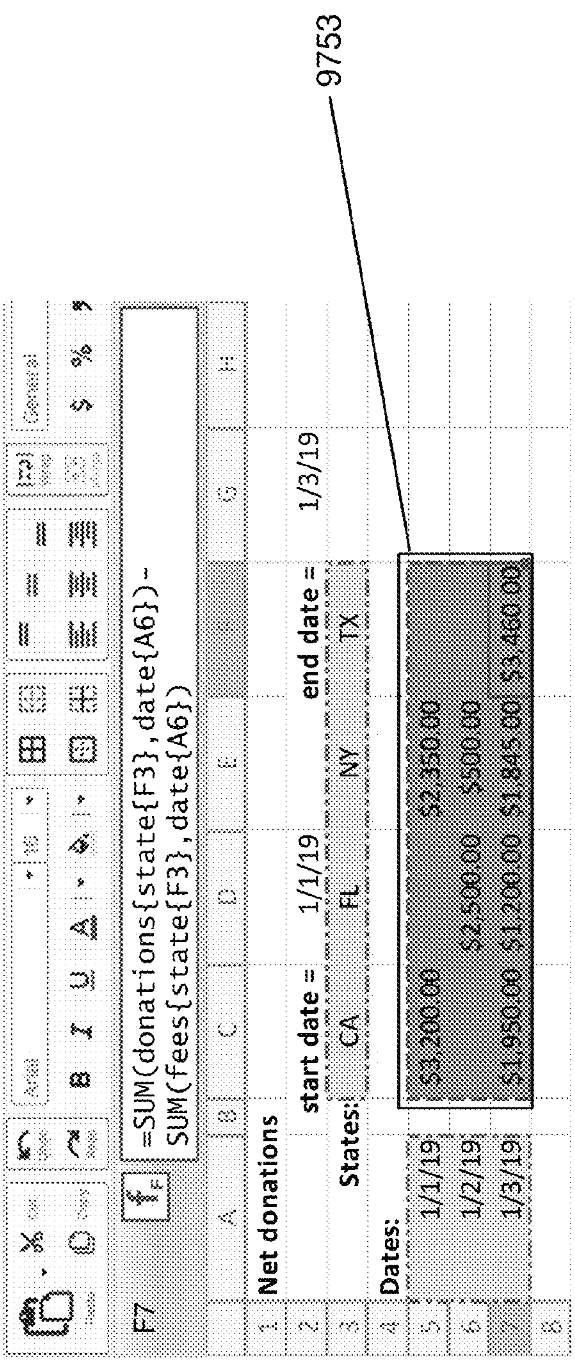
Figure 97B:
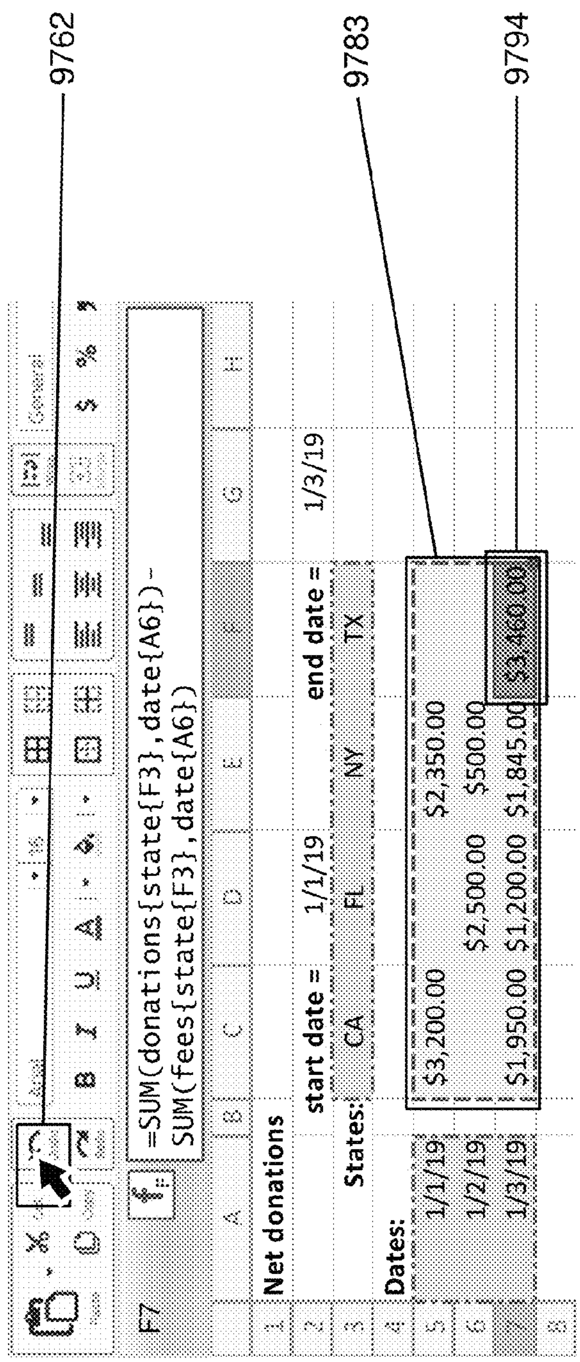

FIG. 96A through FIG. 97B examples our auto conversion variant of flex copy paste formatting in multiple formatting specification user situations. The user situation is similar to the outcome in FIG. 94B. In this example they elect to add a bright green fill to the date and state combination with the highest donations. They therefore click into cell 'F6' 9654 and then as exampled in FIG. 96B click the fill selector button 9664 to get the fill selector 9683 within which they specify the bright green fill by clicking 9673 to fill the cell 'F6' 9694 bright green. A moment or two after that cell fill population our technology automatically fills the entire flex copy paste range 9753 as shown in FIG. 97A. The user then simply clicks the 'Undo' button 9762 as shown in FIG. 97B to revert to the single cell 'F6' populated with the bright green fill 9794 and the remaining cells in the flex copy paste range 9783 reverting back to the light blue fill all flex copy paste controlled.

Flex Copy Paste Formatting Control—Manual Conversion

Figure 111A:
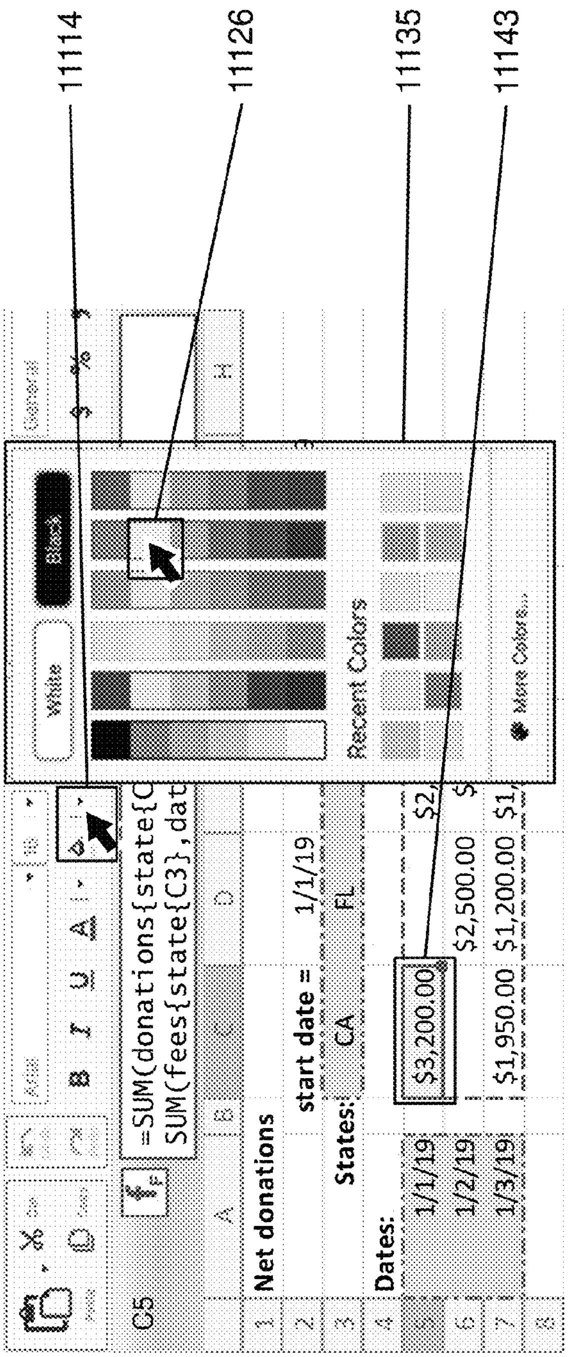
Figure 111B:
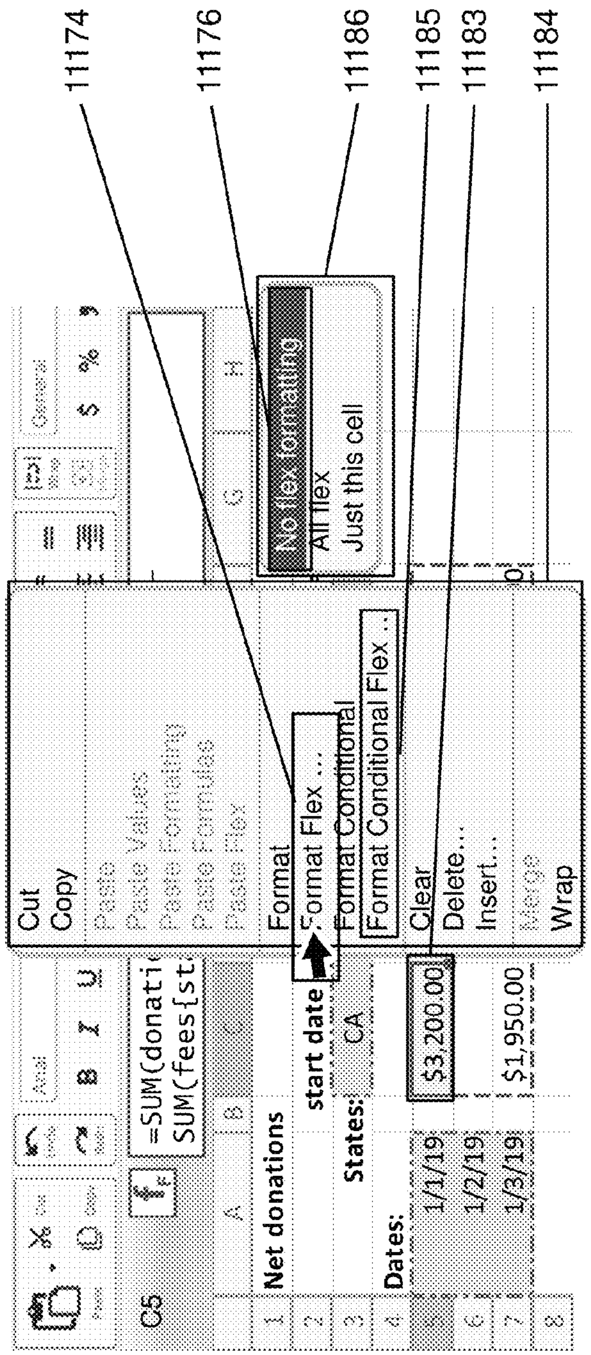

FIG. 111A through FIG. 112B examples another embodiment of how flex copy paste formatting is specified, our manual conversion through a list variant. In FIG. 111A the user formats cell 'C5' 11143 as they normally would in a traditional spreadsheet clicking the ribbon fill color selector button 11114 to get the selector 11135 where the user clicks the light blue 11126 which then fills cell 'C5' 11143. The difference in our technology is they are in a flex copy paste populated cell 11183 as shown in FIG. 111B and when in this embodiment they right click in the cell 11183 they get a menu popup 11184 with two 'Flex' formatting options 11174 and 11185. The user clicks the 'Format Flex' option 11174 which to get another popup 11176 that shows the user that the current setting is 'No flex formatting' 11176.

Figure 112A:
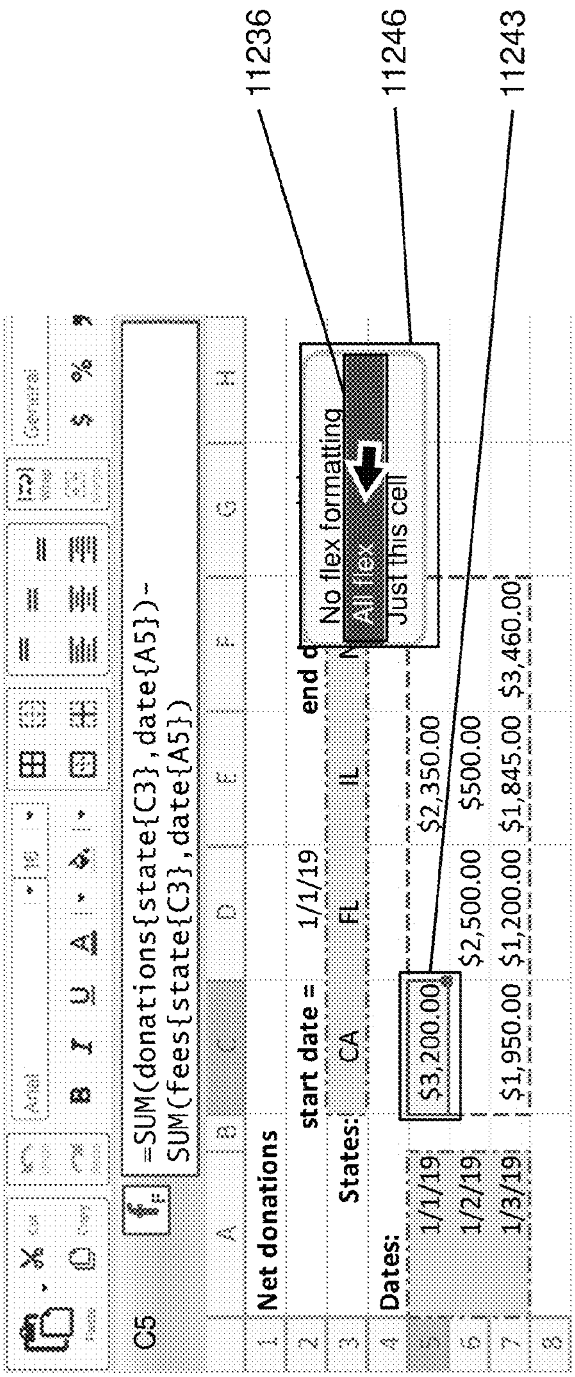
Figure 112B:
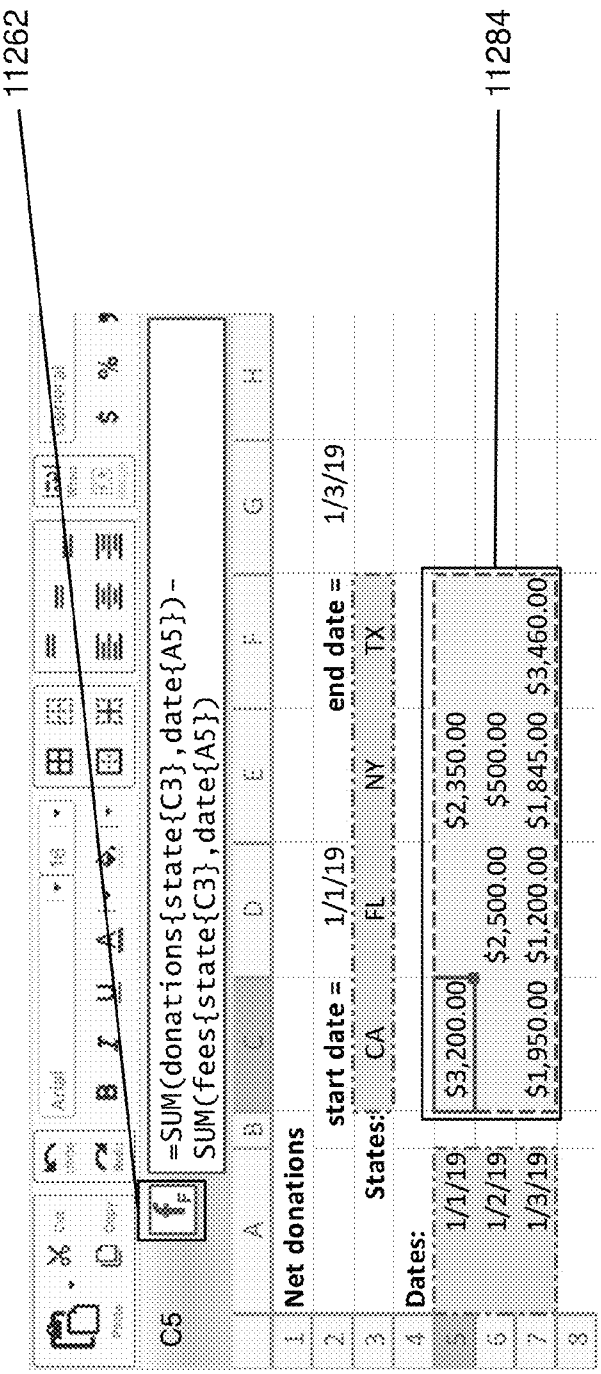

FIG. 112B then examples the user changing that specification by clicking on 'All flex' 11236 in the popup 11246. This not only changes the fill to be in all the affiliated flex copy paste cells 11284 in FIG. 112B including the original cell 'C5' 11243 but has changed the control of the light blue fill format to the flex copy paste. So that any changes to size of the flex copy paste cell range will also change the fill as next exampled in FIG. 98A and FIG. 98B. Additionally, the blue '$f_F$' formula indicator 11262 in the formula bar lets the user know they were in a F for Flex cell (rather than a plain x formula cell). In this embodiment it also lets the user know that the flex copy paste is supported by our HINT technology. Our technology supports multiple types of different specification of the flex copy paste control of the formatting so these examples could have had the 'FLEX OPTIONS' button and all its capabilities, a combination of our button technology and our HINT technology or another specification UI.

Flex Copy Paste Formatting Control—Auto Propagation

FIG. 98A and FIG. 98B then examples how our flex copy paste technology controls multiple format changes. The user changes the end date from '1/3/19' 9835 in FIG. 98A to '1/2/19' 9865 in FIG. 98B. This removes the '1/3/19' row of information from the WRITE 9881 in FIG. 98B (vs 9841 in FIG. 98A) and shrinks the horizontal WRITE 9873 in FIG. 98B (vs 9833 in FIG. 98A) by one column. The result shrinks the flex copy paste range from twelve cells 9853 in FIG. 98A to the six cells 9883 in FIG. 98B with light blue fill. The bright green fill in cell 9854 disappears because that value no longer exists and the cell 'F7' 9894 is unpopulated by the flex copy paste therefore reverting back to its original state.

Our flex copy paste control of formatting can handle more complicated combinations of cell formatting such as bolding, italics, number types and more as previously exampled for functions. However, we will now go beyond those formats to example how conditional formats can be supported by flex copy paste in our technology.

Flex Copy Paste Conditional Formatting Control

FIG. 99A through FIG. 102B examples conditional formats controlled by our flex copy paste technology. The charity worker has decided they would like to add conditional formatting to their analysis in FIG. 99A. There are many different ways the user can start the process in our technology, the user could have started the process using the 'FLEX OPTIONS' button 9922. However, in this example the user has highlighted the cells 'C5' through 'F7' 9944 and then right clicked to get the menu 9936. The user then clicks 'Format Conditional Flex . . . ' 9946 which opens the selector list panel popup 9975 in FIG. 99B. There is a broad spectrum of possible modes of conditional formatting, popup 9975 examples some modes of heat maps and conditionals which the user can elect to use.

Figure 100A:
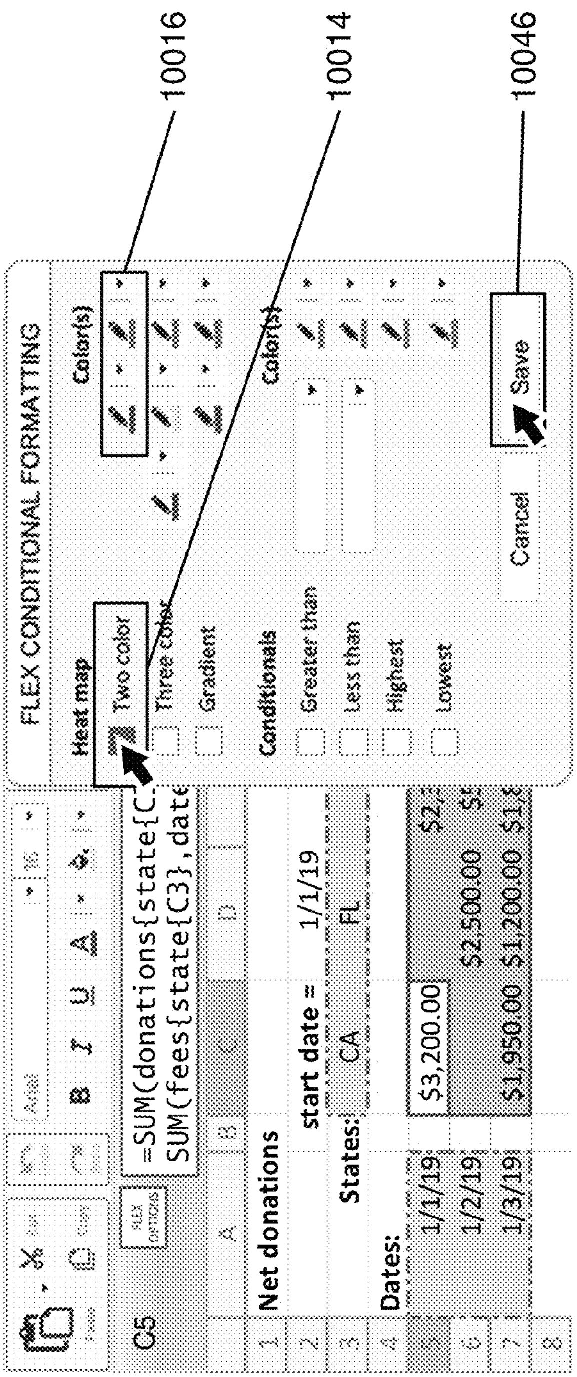
Figure 100B:
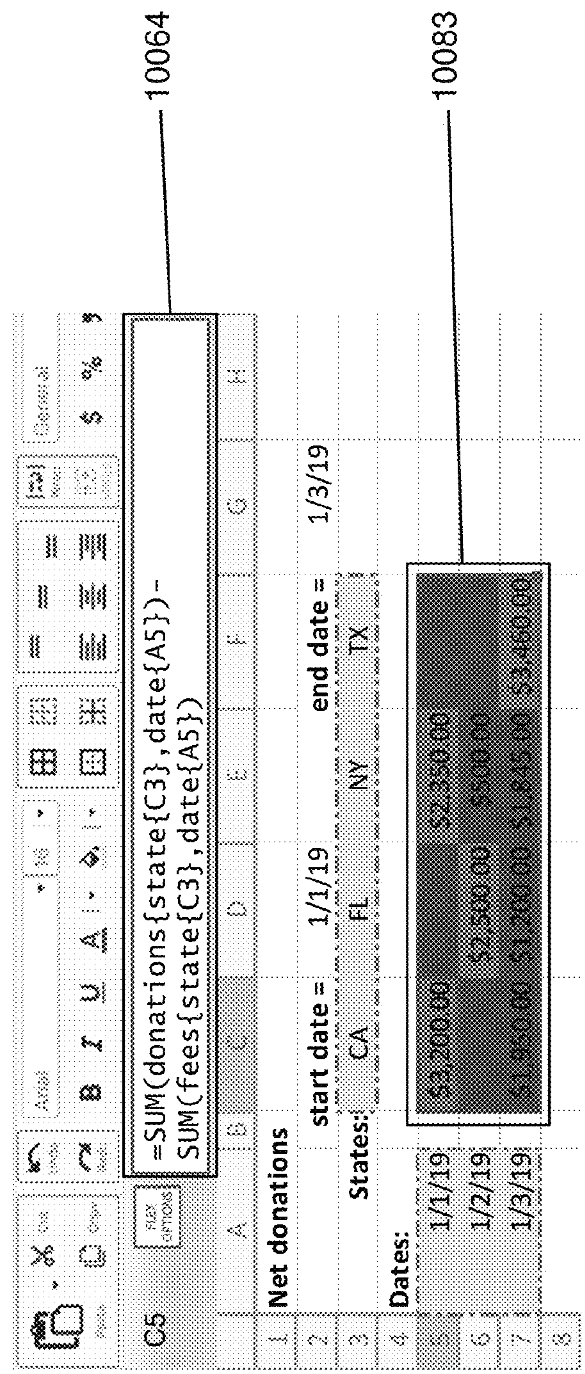
Figure 101A:
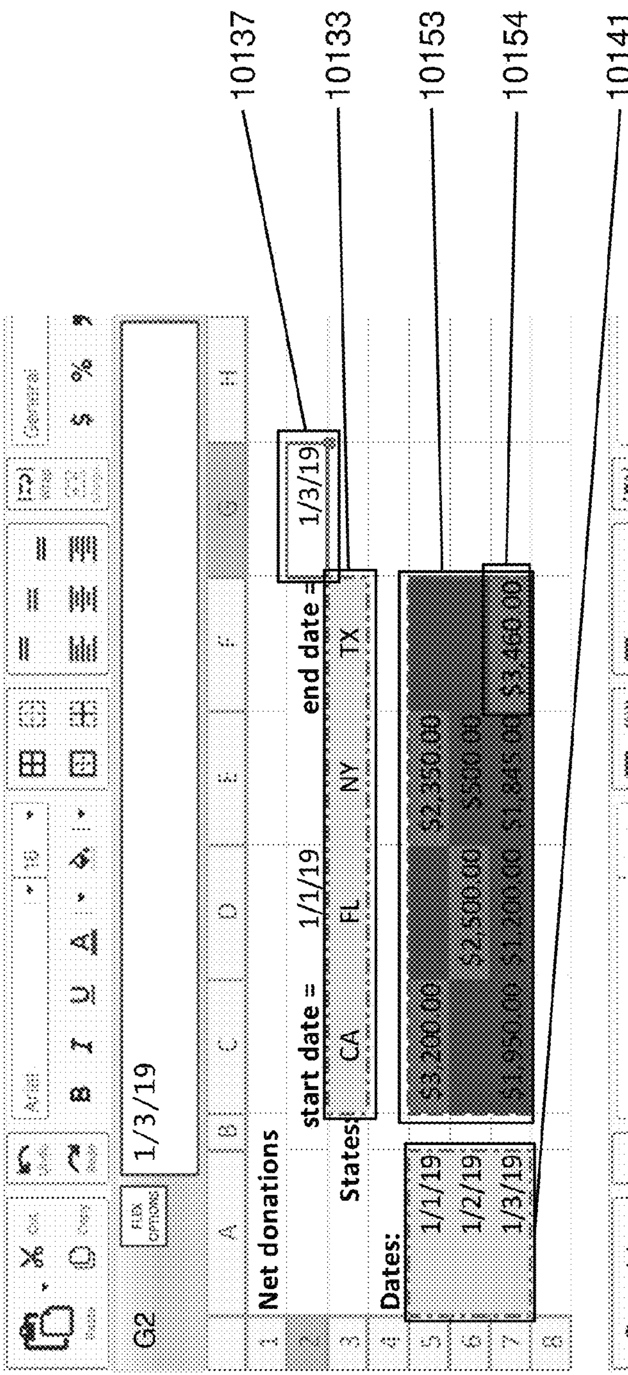
Figure 101B:
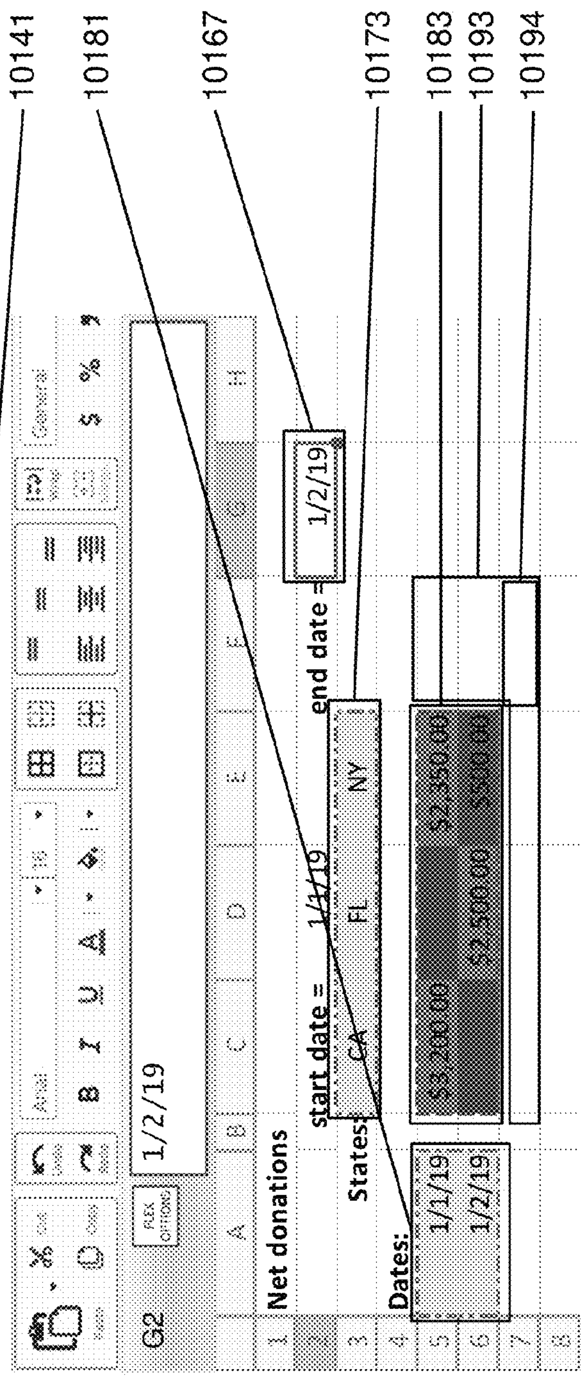

FIG. 100A examples the user selecting a 'Two color' heat map 10014 where they are happy with the red (below average) and green (above average) default colors 10016. Therefore, the user clicks the 'Save' button 10046 to get the conditional formats 10083 in FIG. 100B. In this embodiment of our technology null or blank cells are given the below average red color, although they could easily be set to show no formatting. However, there is a big difference between conditional formatting in conventional spreadsheets (see FIG. 29A through FIG. 30C) and what happens in our technology for flex copy paste or our function-controlled cells where the cell does not control the formatting. In this embodiment the conditional formatting specification arguments are invisible, as the formula 10064 is unchanged and has no formatting arguments. However, in a different embodiment those arguments are visible in the formulas.

FIG. 101A through FIG. 103B examples how our flex copy paste technology controls the conditional format changes. The user changes the end date from '1/3/19' 10137 in FIG. 101A to '1/2/19' 10167 in FIG. 101B. This removes the '1/3/19' row of information from the WRITE 10181 in FIG. 101B (vs 10141 in FIG. 101A before) and shrinks the horizontal WRITE 10173 in FIG. 101B (vs 10133 in FIG. 101A before) by one column. The result shrinks the flex copy paste range from twelve cells 10153 in FIG. 101A before to the six cells 10183 with conditional fill in FIG. 101B. The bright green fill in cell 10154 in FIG. 101A disappears because that value no longer exists and the cell 'F7' 10194 in FIG. 101B is unpopulated by the flex copy paste therefore reverting back to its original state. It is not surprising that conditional formatting is gone in the flex copy paste cells 10193 in FIG. 101B as removing values from a conventionally conditionally formatted cell hides the formatting, but the difference in our technology is it removes the conditional formatting. FIG. 102A through FIG. 103B examples the real difference where our flex copy paste controls where conditional formatting is applied.

FIG. 102A and FIG. 102B examples how when a user inputs a value into the previously conditional formatted cell 'F7' 10294 in FIG. 102B no conditional formatting appears, as it would in a traditional spreadsheet conditional formatted area. This is because the flex copy paste area controls the conditional formatting not the cells and that flex copy paste area has contracted to the six cells 10283 in FIG. 102B which does not contain cell 'F7' 10294. So, despite cell 'F7' 10294 being originally in the twelve cells 10253 in FIG. 100B that originally were conditionally formatted, because the function-controlled space has contracted to the six cells 10283 in FIG. 102B it has no conditional formatting when empty 10254 in FIG. 102A or containing a value '5000' 10294 in FIG. 102B.

Figure 103A:
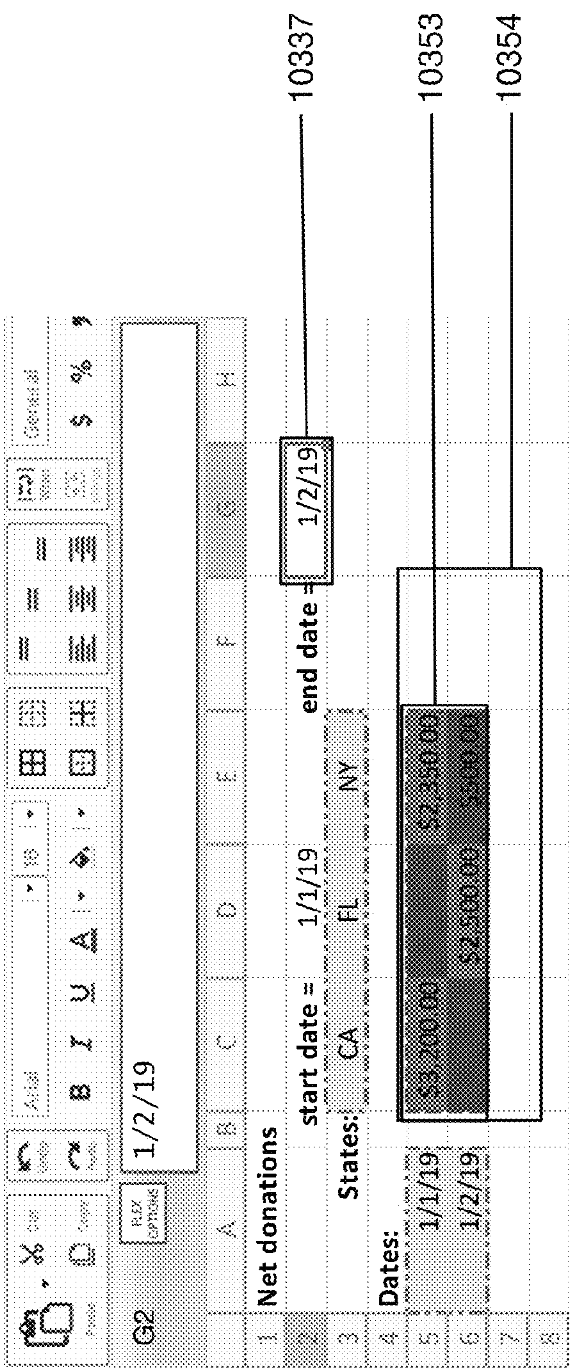
Figure 103B:
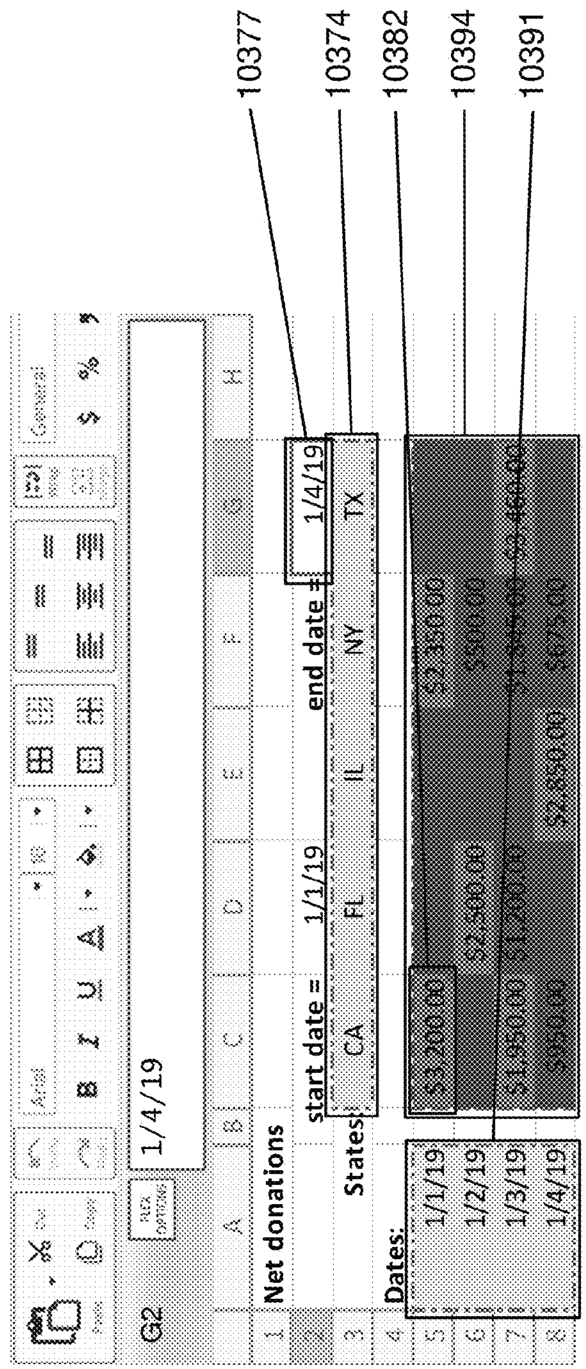

FIG. 103A and FIG. 103B further examples how our flex copy paste controls the conditional formatting as when the user changes the 'end date' '1/2/19' 10337 in FIG. 103A to '1/4/19' 10377 in FIG. 103B. The conditional formatting area 10394 in FIG. 103B expands beyond the original area 10353 exampled in FIG. 103A. The conditional formatting expands beyond the current six cells 10353 in FIG. 103A and beyond the twelve originally conditionally formatted cells 10354 in FIG. 103A (10083 in FIG. 100B) to the twenty cells 10394 in FIG. 103B. The result of the change in the horizontal 'WRITE' expanded cells 10374 in FIG. 103B and the vertical 'WRITE' expanded cells 10391 in FIG. 103B driving the increased size of the flex copy paste area 10394 in FIG. 103B.

These flex copy paste formatting examples have used our invisible arguments and examples of our spreadsheet argument specification types listed in FIG. 6. Our technology supports specifying the formats using more of the specification types and recording those arguments visibly in the cell formula. We will now more briefly example other flex copy paste situations and types starting with the simplest situation where no functions and no algebraic formulas are involved.

Flex Copy Paste Formatting Control—Simple Situation

Our preceding examples involved two-dimensional copy-paste flexing of formulas combining functions and algebraic operators. We will now example a very simple variant of the connection to a flexing function copy paste and then show a comparable data end flexing copy paste.

Figures 126A, 126B, 126C:
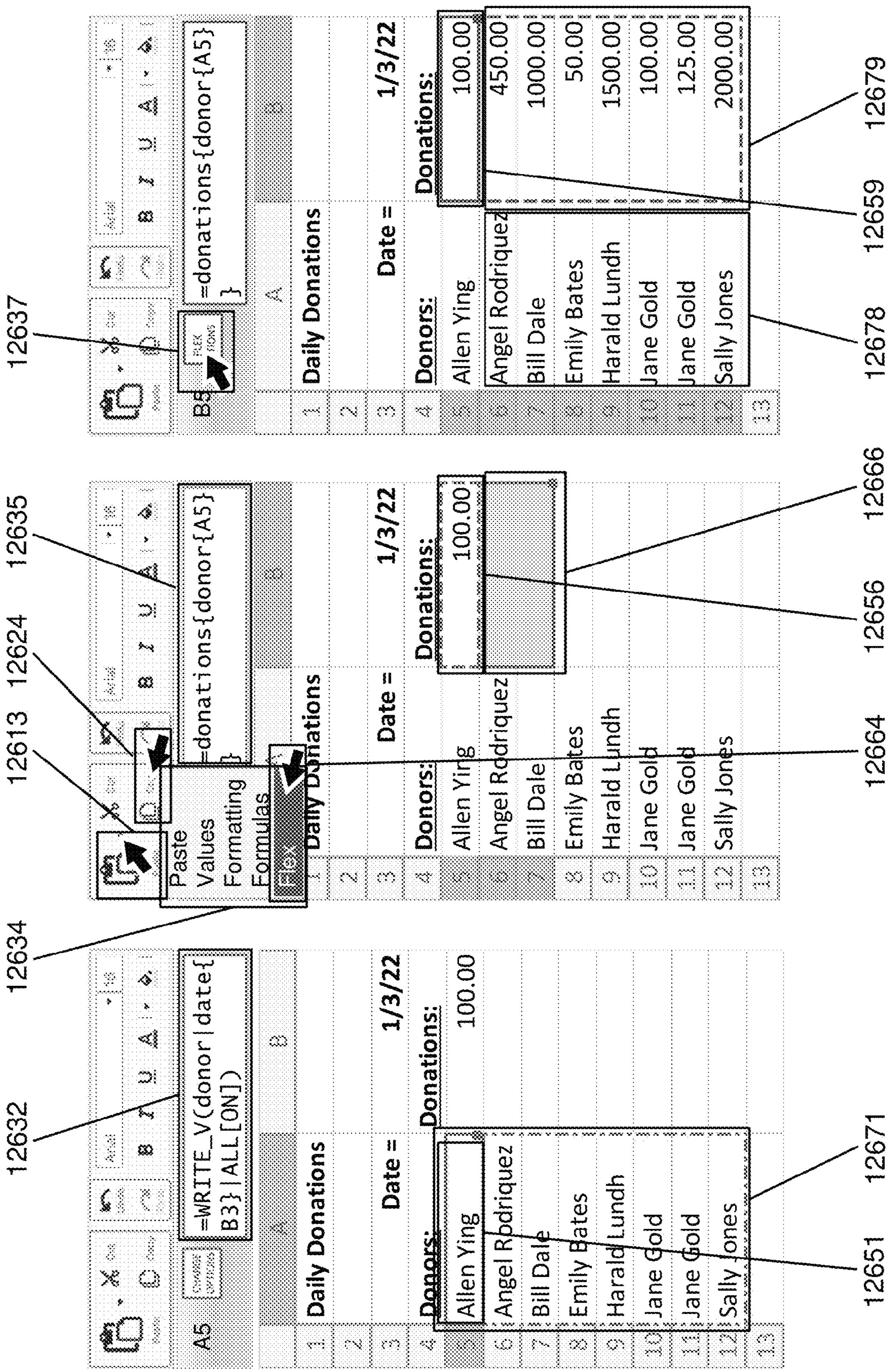

FIG. 126A through FIG. 128C examples a simple 'WRITE_V' connected flex copy-paste of a formulaic data field with manually specified flex copy-paste controlled formatting. FIG. 126A examples the 'WRITE_V' formula 12632 in cell 'A5' 12651 that populates the cells 'A5' through 'A12' 12671, to which the flex copy-paste is connected. In FIG. 126B the charity user copies cell 'B5' 12656 which contains the formula '=donations{donor{A5}}' 12635 that is connected by the cell reference 'A5' to the 'WRITE_V' 12632 exampled in FIG. 126A. In this embodiment of our previously filed flex copy-paste technology, when the user then copies 12624 cell 'B5' 12656 in FIG. 126B then click the paste type selector 12613 and select the 'Flex' 12664 option after highlighting the direction of their paste 12666 (something users are used to doing but in our technology unnecessary because the flex connection determines the paste space size and direction in this situation). Because the formula of the cell being copied references a flexing function, e.g., 'WRITE_V', our technology automatically knows that is the flex connection. The result of the copy-paste is exampled in FIG. 126C 12679 having populated cells 'B6' through 'B12' matching the 'WRITE_V' values 12678.

Figure 127A:
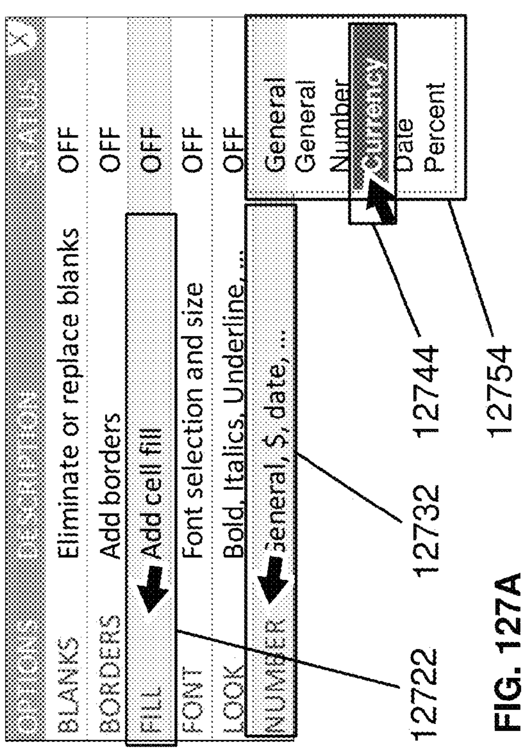
Figure 127B:
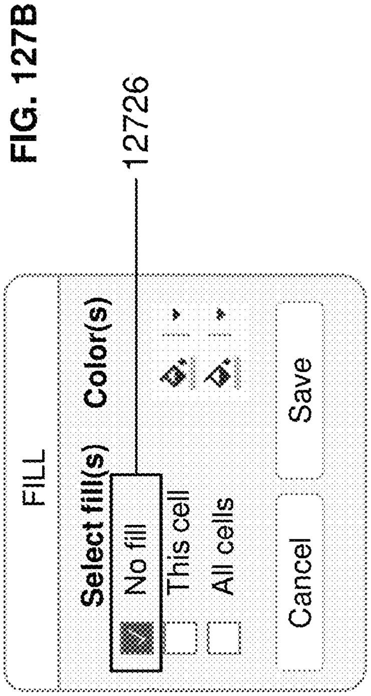
Figure 127C:
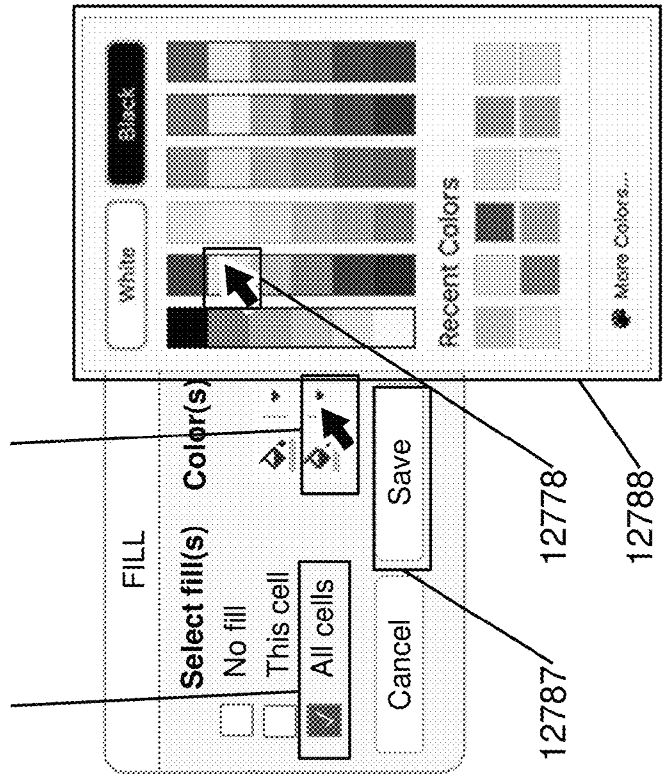
Figure 127D:
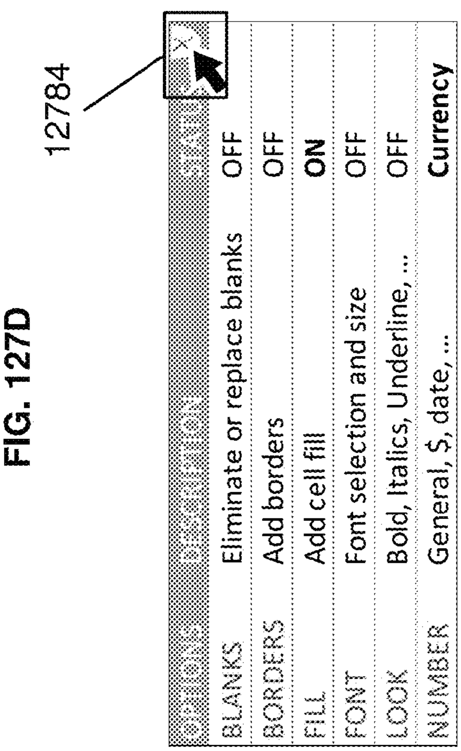

In this embodiment the user then manually accesses the 'FLEX OPTIONS' by clicking the button 12637 adjacent to the formula bar. In other embodiments they could have clicked a button in or adjacent to the in-cell formula of any of the flex copy-pasted cells. This opens a popup selection panel list in FIG. 127A that both shows the user the 'OPTIONS' they have and allows some specifications. When they click the 'NUMBER' option 12732 which opens a dropdown list selector 12754 where the user decides they would like to specify flex copy-paste controlled 'Currency' formatting of the values 12744. After making that specification, they click the 'FILL' option 12722 which opens the selection panel list exampled in FIG. 127B showing the default of 'No fill' checked 12726. The user then changes that to 'All cells' 12786 in FIG. 127C as they would like all the flex cells filled light red. The then click the color selection button 12789 and select the light red 12778 in the popup 12788. Clicking 'Save' 12787 then takes the back to the 'OPTIONS' hint/selector where they click the 'X' 12784 to instantiate the copy-paste controlled formatting changes as exampled in FIG. 128A 12872. The copy-paste instantiated cells now have light red fill and currency number formatting overriding any previous cell set formats.

Figure 128A:
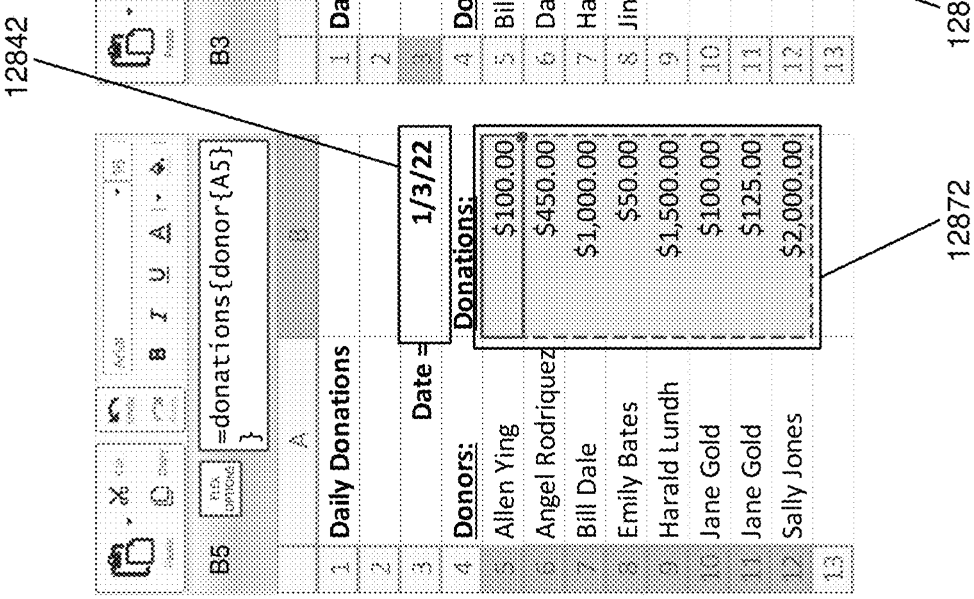
Figure 128B:
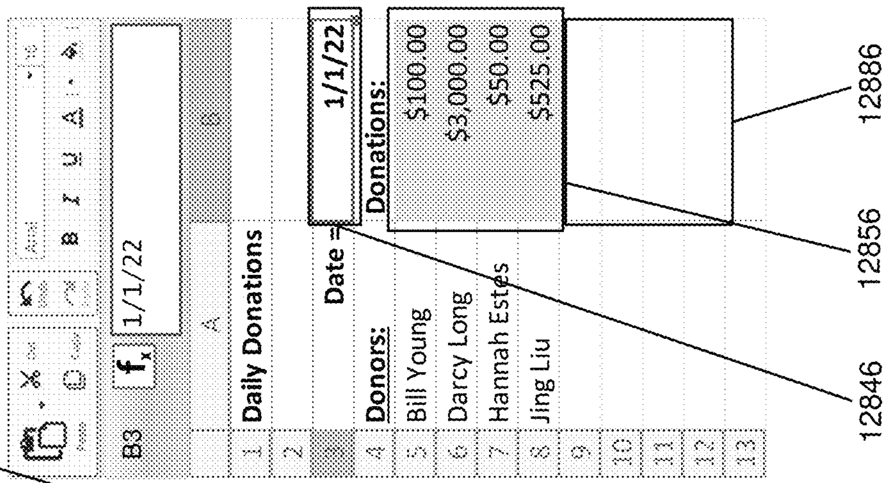
Figure 128C:
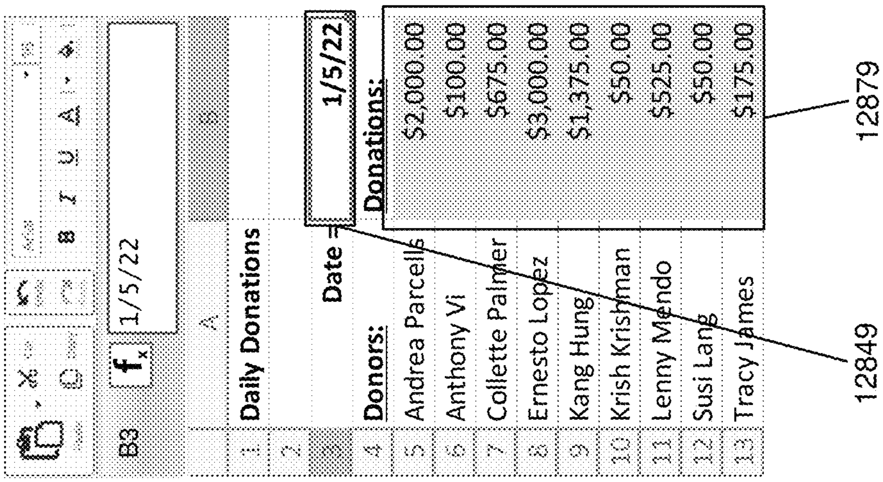

FIG. 128B and FIG. 128C then examples how changes to the 'WRITE_V' date constraint alters the flex copy-paste instantiated values and formatting. More specifically when the user decides they would like to see the donations on '1/1/22' instead of '1/3/22' they change the value in cell 'B3' 12846 in FIG. 128B and see that there were four donations 12856 instead of the eight 12872 on '1/3/22' 12842 in FIG. 128A. The flex copy-paste has removed the light red fill and currency formatting from the four cells 12886 it no longer instantiates in FIG. 128B. They user then decide they would like to see the donations on '1/5/22' 12849 as shown in FIG. 128C 12879. Now our flex copy-paste technology populates nine cells with the copy-paste controlled formatting, exampling that the capability works for both expansion and contraction of the number of cells populated. Rather than re-exampling all the other flex-copy paste capabilities for manually set formats, we will example combinations of the auto set formats.

Figure 129A:
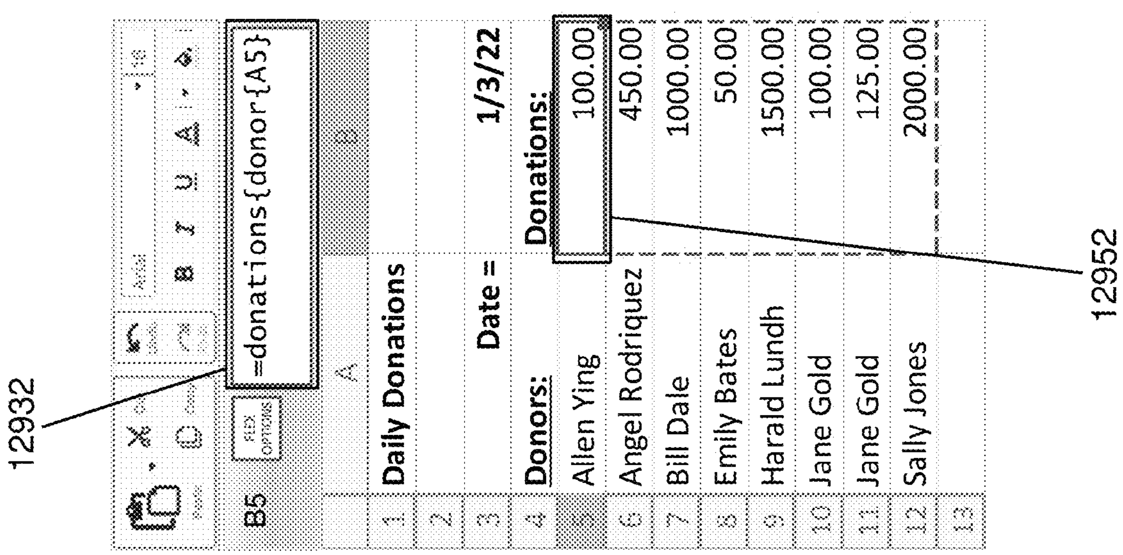
Figure 129B:
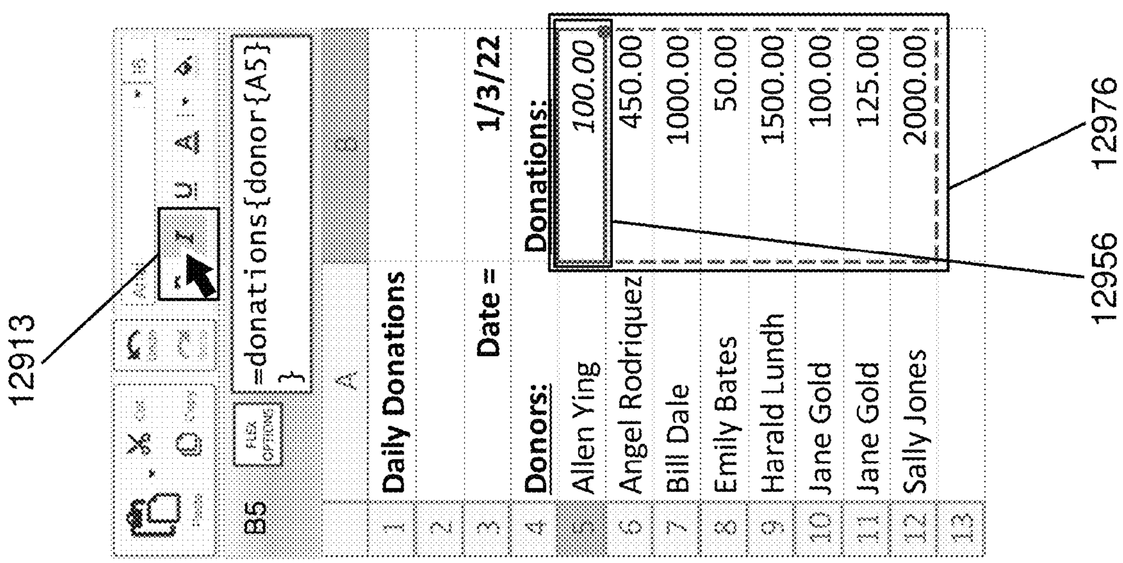
Figure 129C:
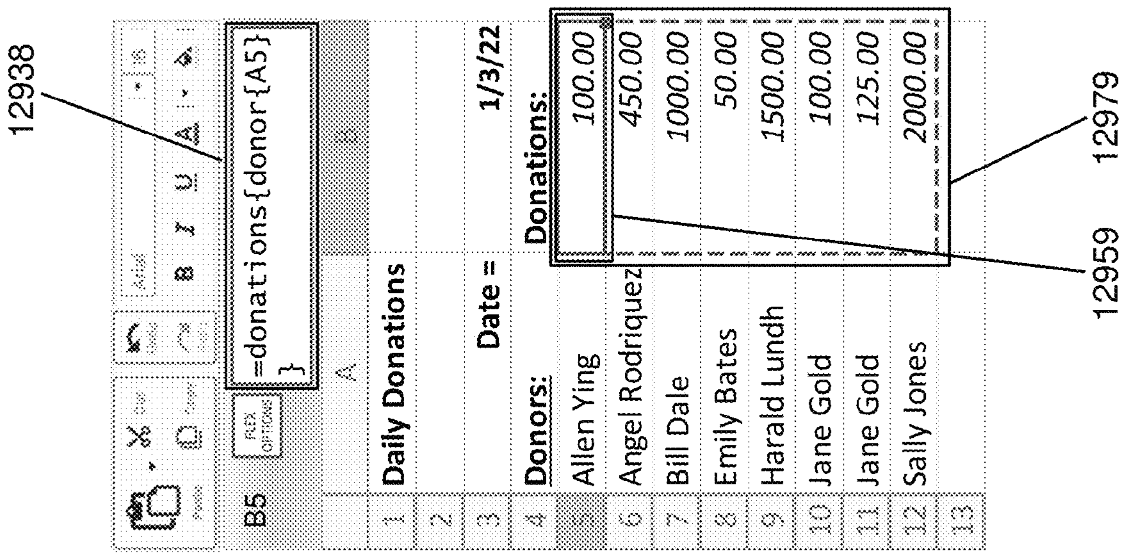

FIG. 129A through FIG. 130C examples a simple 'WRITE_V' connected flex copy-paste of a formulaic data field with automatic conversion of cell formatting to flex copy-paste controlled formatting. FIG. 129A picks up after the flex-copy paste setup in FIG. 126A through FIG. 126C with an added capability of auto conversion of regular cell formatting to copy-paste controlled in copy-paste instantiated cells. In FIG. 129B the user clicks the italics button 12913 in the ribbon as they normally would do to change a cell format. However, instead our technology automatically converts that to flex copy-paste control as shown by 12956 and then is this embodiment a very short period afterwards automatically propagates the italics to the entire copy-paste instantiated area as exampled in FIG. 129C 12979. Note in this embodiment those formatting changes have not changed the formula arguments (FIG. 129C 12938 vs. FIG. 129A 12932) however they could have been recorded visibly in the cell formulas.

Figures 130A, 130B, 130C:
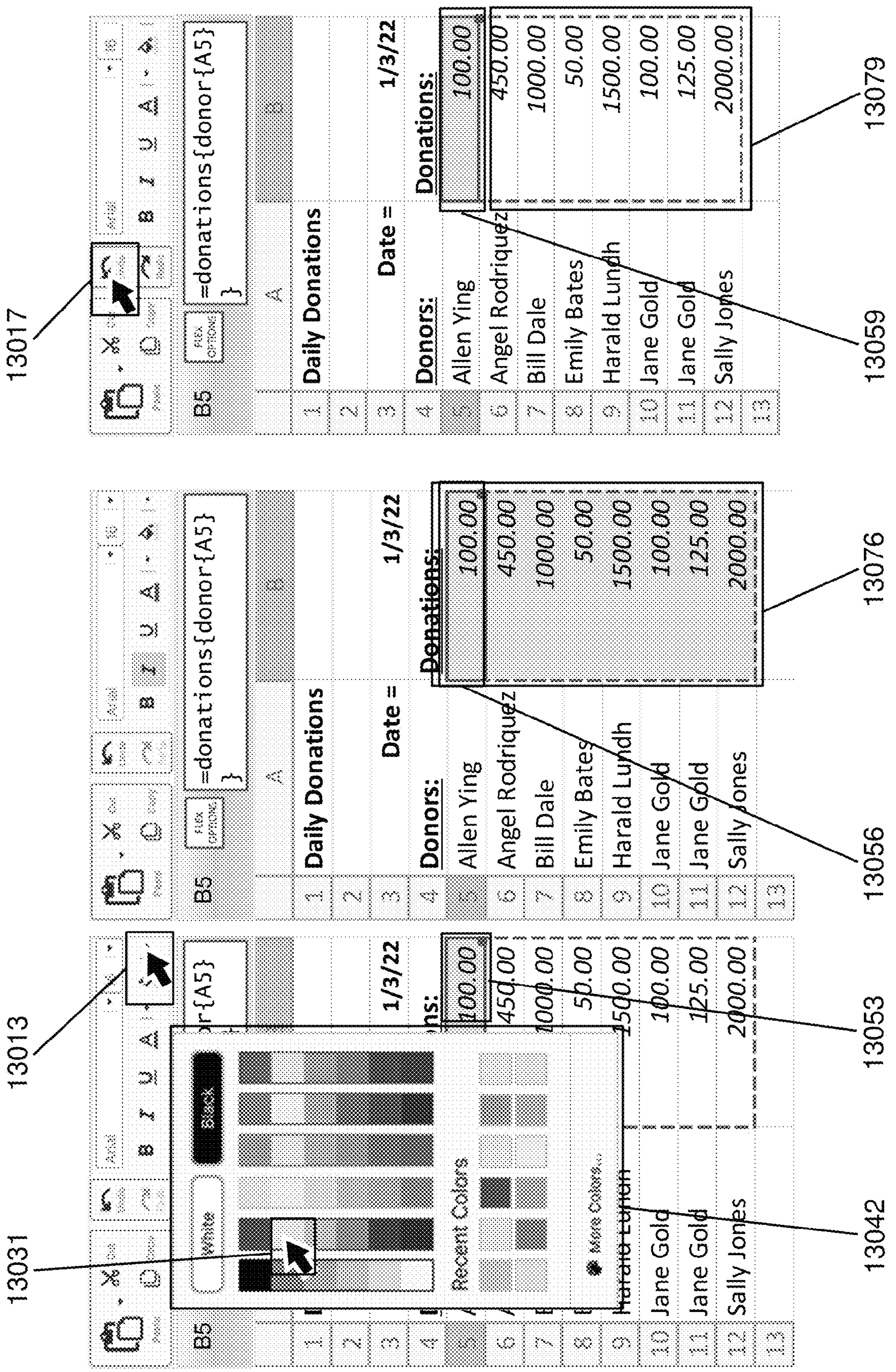

FIG. 130A and FIG. 130B examples the auto conversion of regular cell color fill actions to flex copy-paste controlled fills. The user clicks the color button 13013 as they normally would seeing the color selector UI 13042 they are used to and clicking like they normally would 13031, however like with italics the fill color briefly displays in the selected cell 13053 before then automatically instantiating all the flex copy-paste instantiated cells 13076 in FIG. 130B. However, this time the user decides they only want to populate the red fill in the selected cell so in this embodiment they click the 'Undo' button 13017 to fill only that cell 13059 as exampled in FIG. 130C. There are additional capabilities for regressing to cell-controlled formats and other ways to make the change, but instead of further exampling those we will example a different type of flex copy-paste controlling formats.

Flex Copy Paste Formatting Control—Data End Flex Copy Paste

Figures 131A, 131B, 131C:
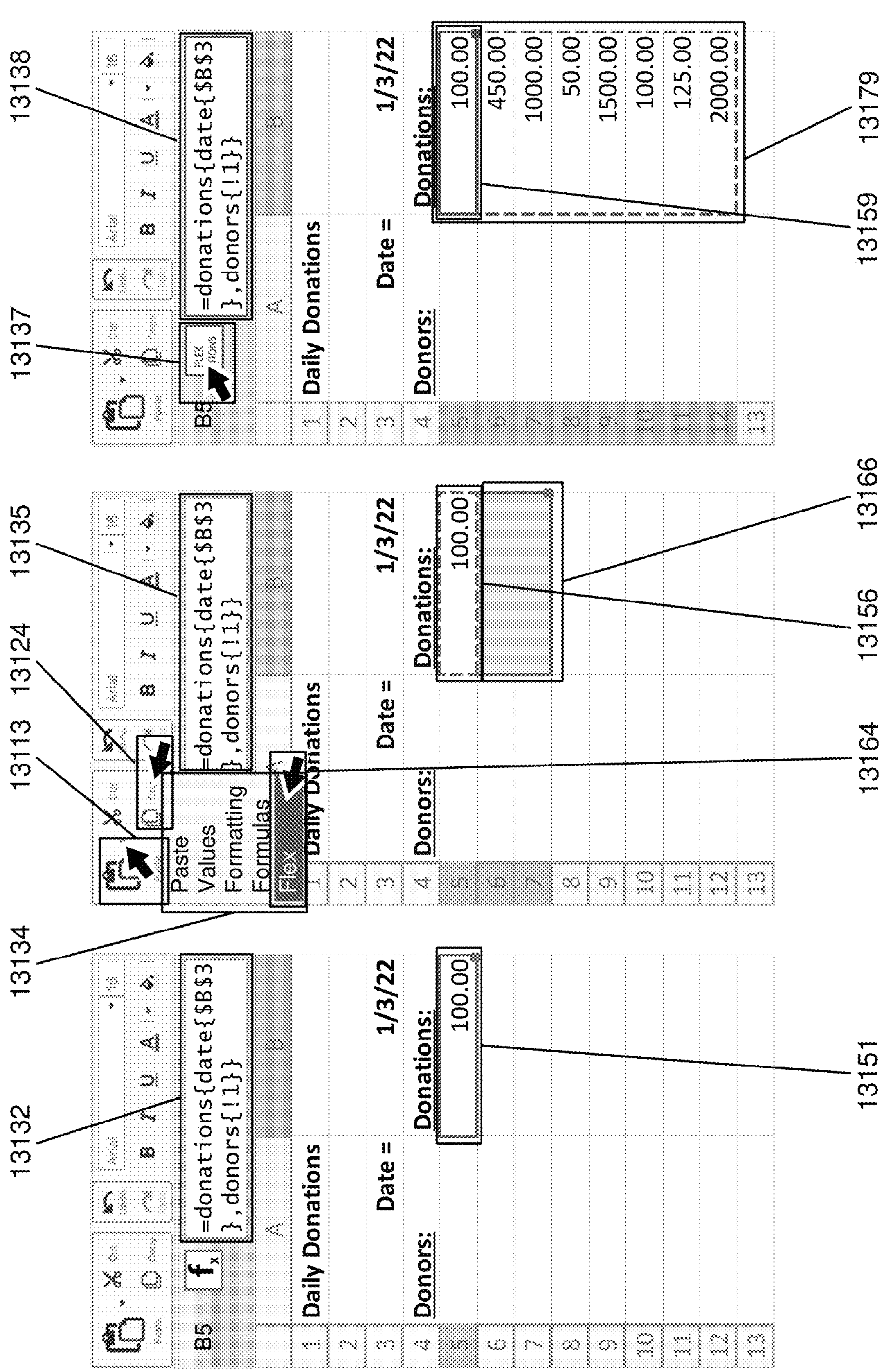

FIG. 131A through FIG. 133C examples different data end flex copy-paste versions of the flex copy-paste controlled formatting. FIG. 131A examples the cell 'B5' 13151 and formula 13132 that the user wants to copy paste. For ease of understanding purposes we will duplicate the previous flex copy-paste example except the data end version does not need a connected flexing function, e.g., the WRITE_V like in the last set of examples. Instead, the user just copies 13124 the cell 'B5' 13156 as exampled in FIG. 131B. When the user clicks the 'Paste' type selector 13113 and selects the 'Flex' 13164 option after highlighting the direction of their paste 13166 our technology knows what direction to do the paste. Our flex copy-paste technology also see there is no flexing function referenced in the formula but does see our formulaic data field 13135

'donations{date{$B$3},donors{!1}}' in the formula with a donors value '!1' which can be propagated and so will propagate it. Thus, the flex copy-paste propagates 'donations{date{$B$5},donors{! }}' until it runs out of 'donors' values constrained to the 'date' 'B3' as exampled in FIG. 131C 13179 having populated cells 'B6' through 'B12'. It populated the same values as in FIG. 126C 12679 in the same order because the 'WRITE_V' used the same order of 'donors' and had the same date constraint. Of course, with the difference being is the data end flex copy-paste does not need the 'WRITE'. As we will next show from a control of formatting perspective both flex copy-paste variants work the same way.

Figure 132B:
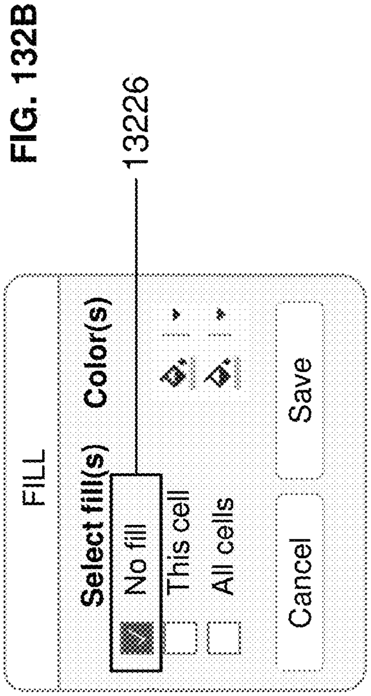
Figure 132C:
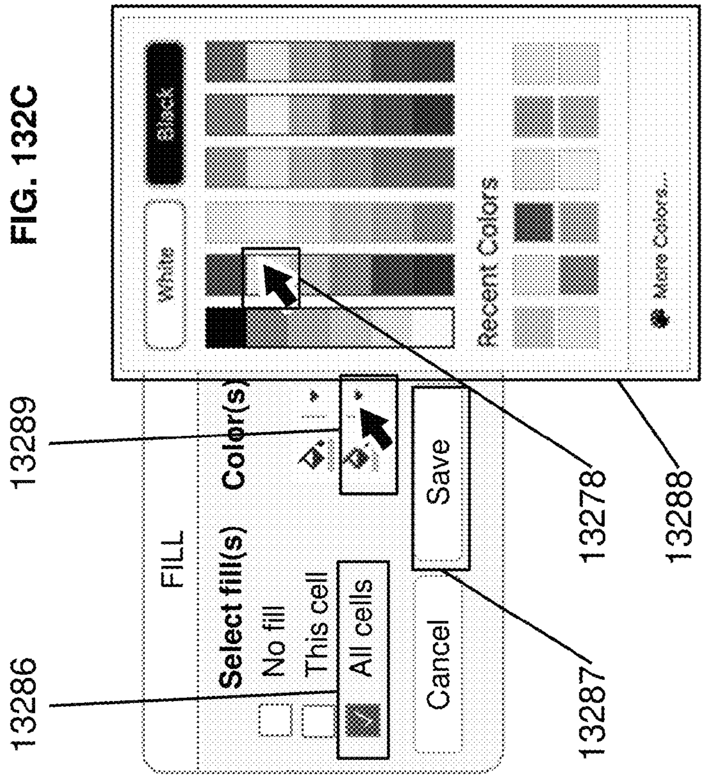
Figure 132A:
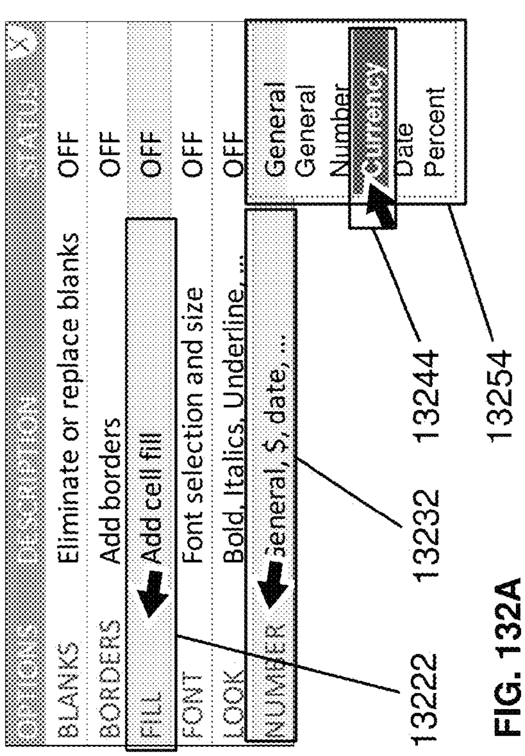
Figure 132D:
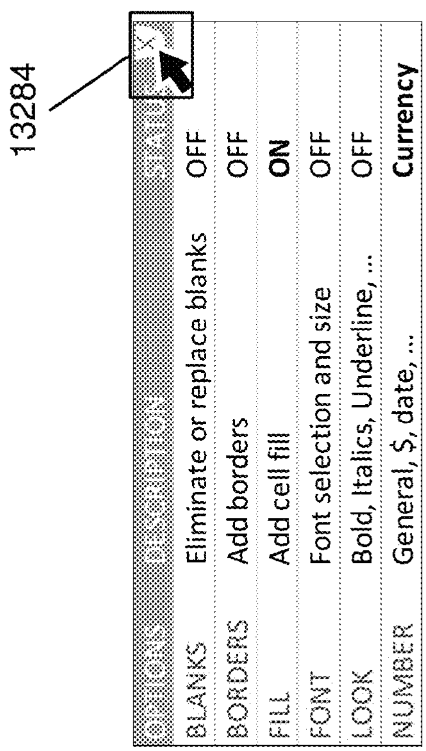

Like with the previous version of flex copy-paste, the user then manually accesses the 'FLEX OPTIONS' by clicking the button 13137 adjacent to the formula bar. In other embodiments they could have clicked a button in or adjacent to the in-cell formula of any of the flex copy-pasted cells. This opens a popup selection panel list in FIG. 132A that both shows the user the 'OPTIONS' they have and allows some specifications. When they click the 'NUMBER' option 13232 which opens a dropdown list selector 13254 where the user decides they would like to specify flex copy-paste controlled 'Currency' formatting of the values 13244. After making that specification, they click the 'FILL' option 13222 which opens the selection panel list exampled in FIG. 132B showing the default of 'No fill' checked 13226. The user then changes that to 'All cells' 13286 in FIG. 132C as they would like all the flex cells filled light red. The then click the color selection button 13289 and select the light red 13278 in the popup 13288. Clicking 'Save' 13287 then takes the back to the 'OPTIONS' hint/selector in FIG. 132D where they click the 'X' to instantiate the copy-paste controlled formatting changes as exampled in FIG. 133A 13372. The copy-paste instantiated cells now have light red fill and currency number formatting overriding any previous cell set formats.

Figure 133A:
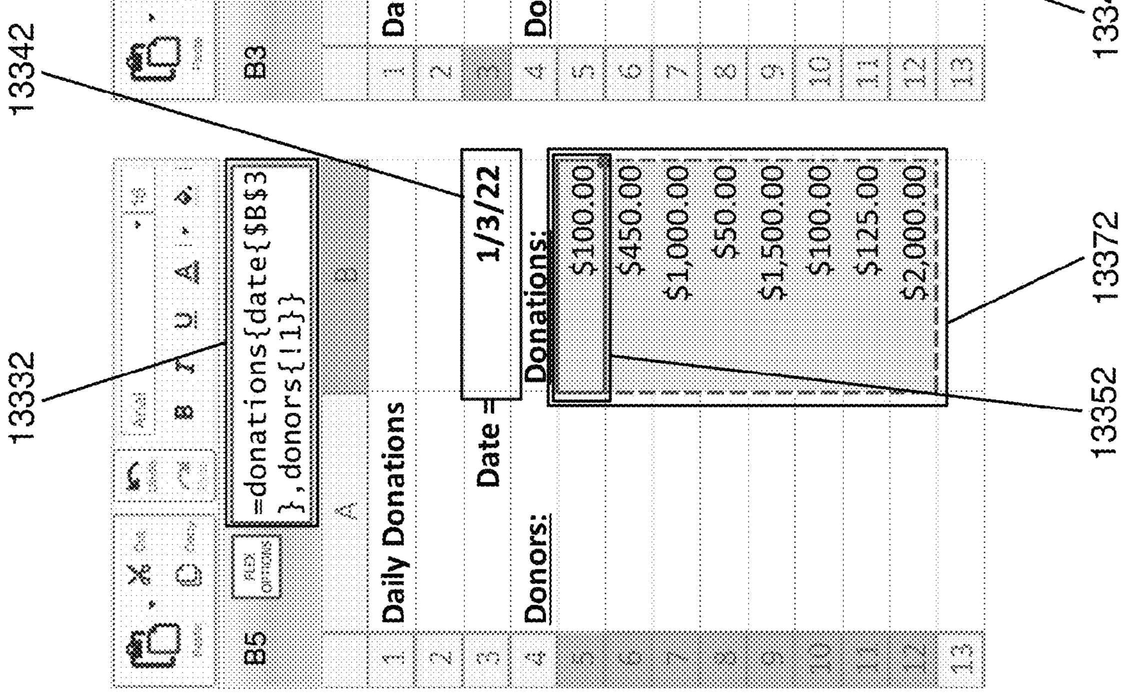
Figure 133B:
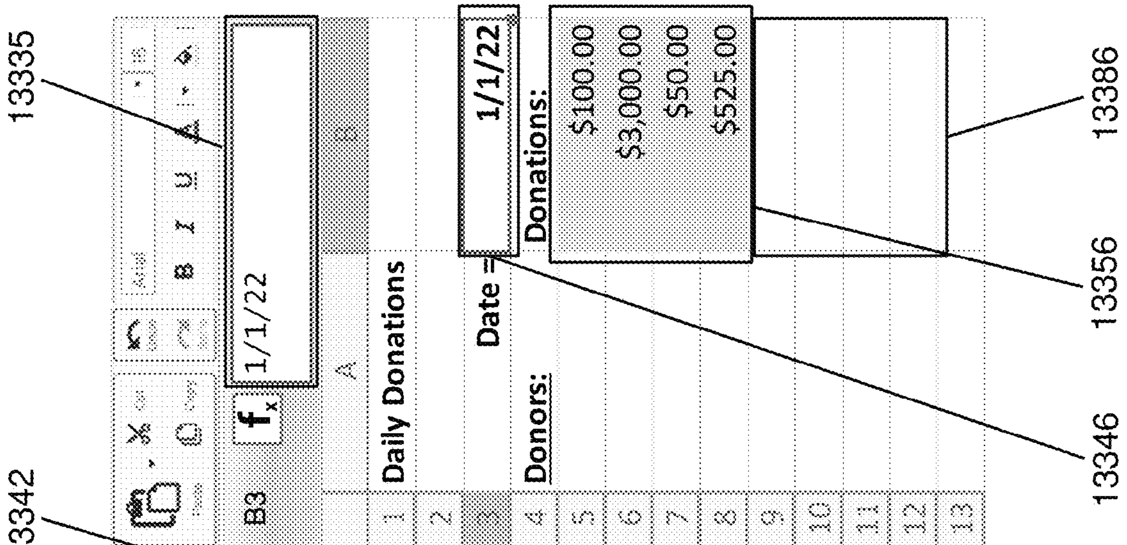
Figure 133C:
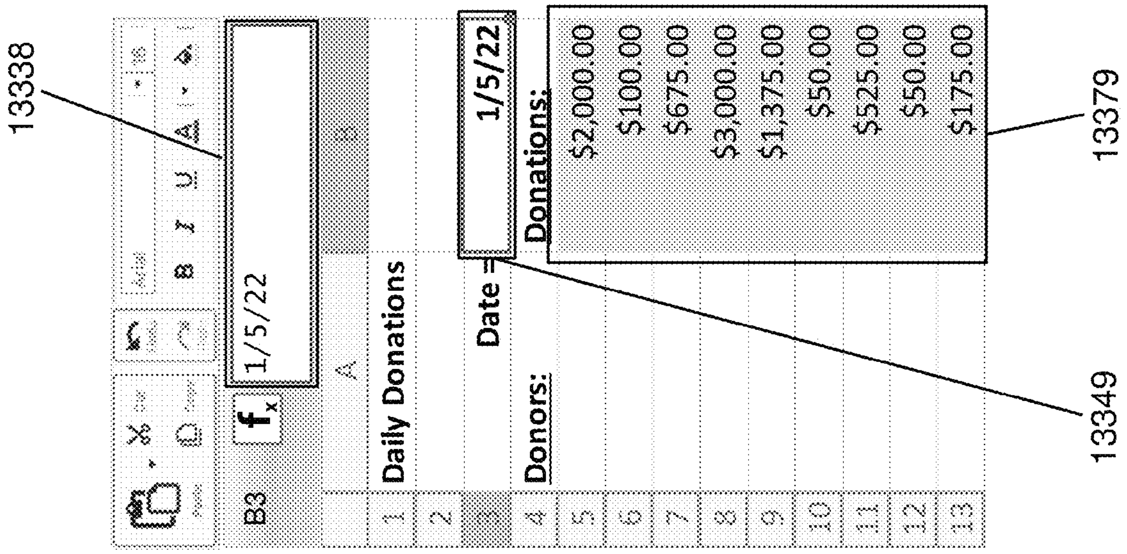

FIG. 133B and FIG. 133C then example date constraint changes alter the data end flex copy-paste instantiated values and formatting. More specifically when the user decides they would like to see the donations on '1/1/22' in FIG. 133B instead of '1/3/22' in FIG. 133A so they change the value in cell 'B3' 13346 to '1/1/22' in FIG. 133B and see that there were four donations 13356 instead of the eight 13372 in FIG. 133A on '1/3/22' 13342. The flex copy-paste has removed the light red fill and currency formatting from the four cells 13386 it no longer instantiates. They then decide they would like to see the donations on '1/5/22' 13349 as shown in FIG. 133C 13379. Now our flex copy-paste technology populates nine cells with the copy-paste controlled formatting, exampling that the capability works for both expansion and contraction of the number of cells populated. Rather than re-exampling all the other flex-copy paste capabilities for manually set formats and the automatic conversion of regular cell formatting for data end flex copy paste, we will example a flex copy paste of an algebraic formula controlling formats.

Flex Copy Paste Formatting Control—Algebraic Formula

Figures 134A, 134B, 134C:
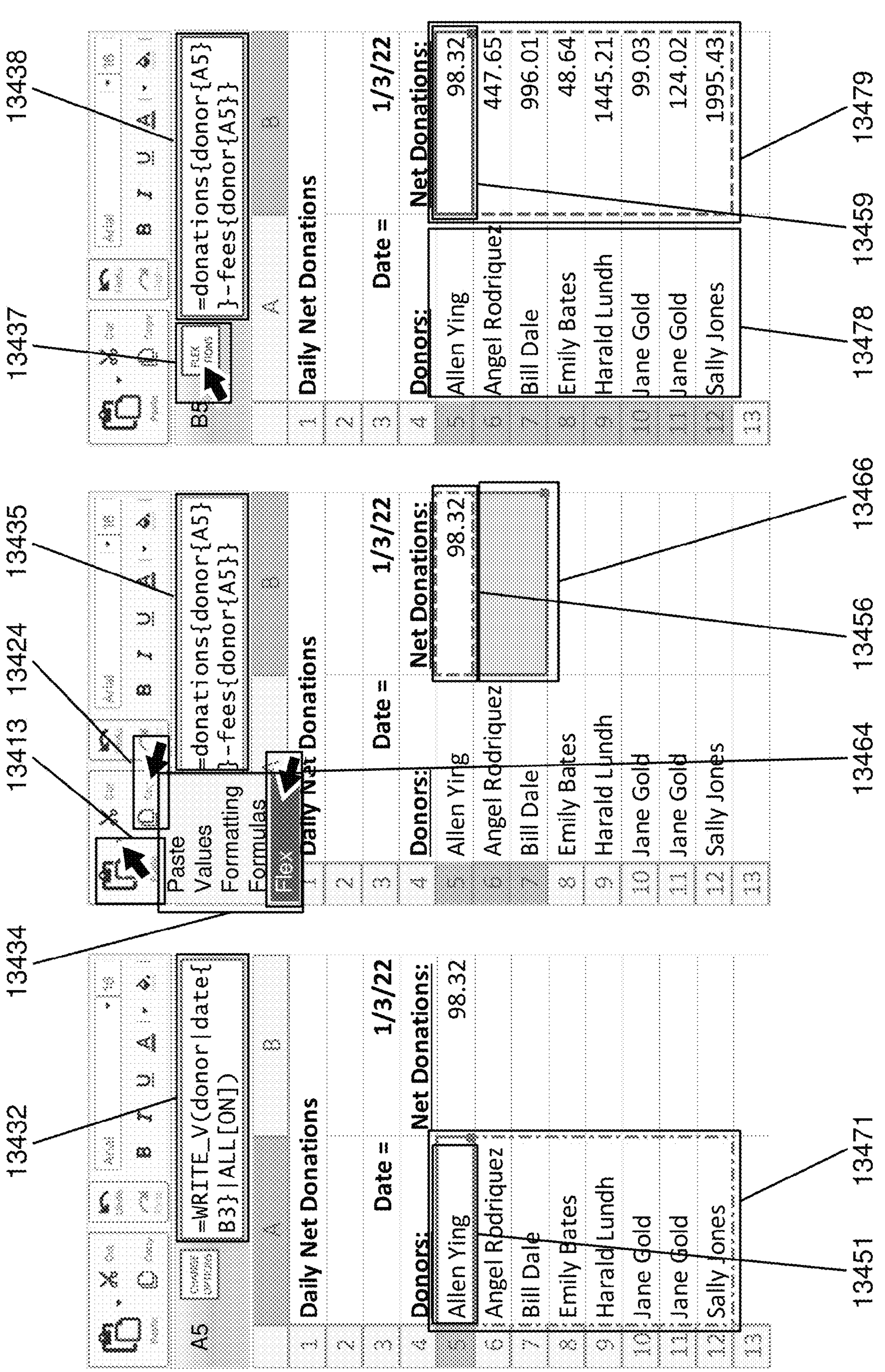

FIG. 134A through FIG. 136C examples a 'WRITE_V' connected flex copy-paste of an algebraic formula with manually specified flex copy-paste controlled formatting. Our flex copy-paste technology supports the full spectrum of our flex copy paste types (e.g., flex function connected and data end) and formulas (e.g., fields, algebraic formulas, functional formulas, and combinations). FIG. 134A examples the 'WRITE_V' formula 13432 in cell 'A5' 13451 that populates the cells 'A5' through 'A12' 13471, to which the flex copy-paste is connected. In FIG. 134B the charity user copies cell 'B5' 13456 which contains the algebraic formula 13435

'=donations{donor{A5}}−fees{donor{A5}}' that is connected by the cell references of 'A5' to the 'WRITE_V' 13432 exampled in FIG. 134A. In this embodiment of our previously filed flex copy-paste technology, when the user then copies 13424 cell 'B5' 13456 then clicks the paste type selector 13413 and selects the 'Flex' 13464 option after highlighting the direction of their paste 13466 (something users are used to doing but in our technology unnecessary because the flex connection determines the paste space in this situation). Because the formula of the cell being copied references a flexing function, e.g., 'WRITE_V', our technology automatically knows that is the flex connection. The result of the copy-paste is exampled in FIG. 134C 13479 having populated cells 'B6' through 'B12' matching the 'WRITE_V' values 13478 with the algebraic formula calculated values.

Figure 135B:
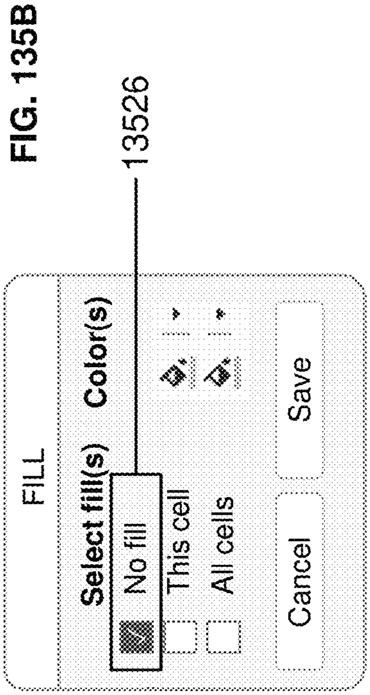
Figure 135C:
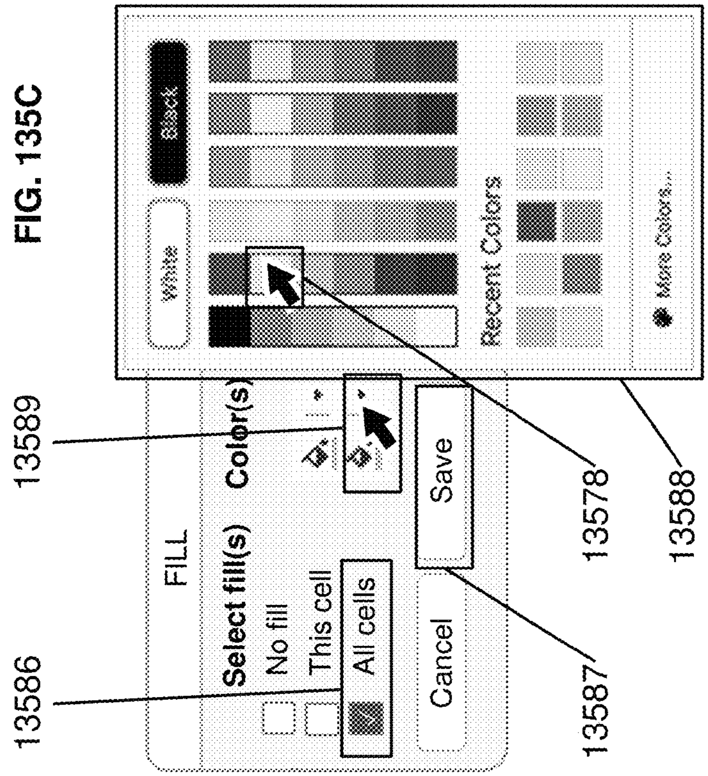
Figure 135A:
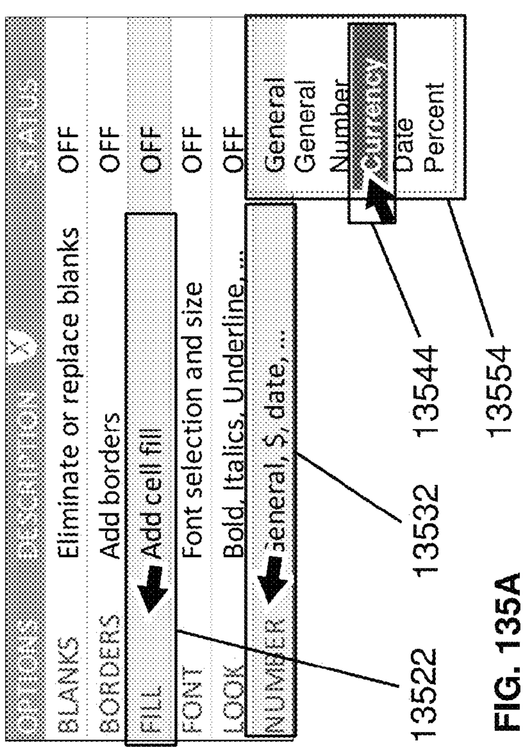
Figure 135D:
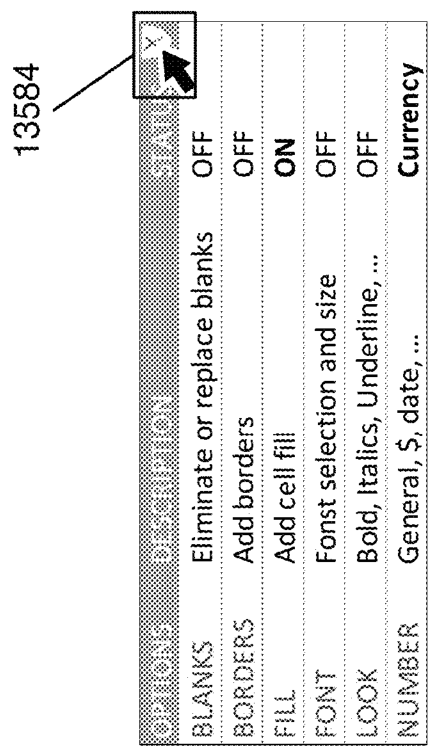

In this embodiment the user then manually accesses the 'FLEX OPTIONS' by clicking the button 13437 adjacent to the formula bar. In other embodiments they could have clicked a button in or adjacent to the in-cell formula of any of the flex copy-pasted cells. This opens a popup selection panel list in FIG. 135A that both shows the user the 'OPTIONS' they have and allows some specifications. When they click the 'NUMBER' option 13532 which opens a dropdown list selector 13554 where the user decides they would like to specify flex copy-paste controlled 'Currency' 13544 formatting of the values. After making that specification, they click the 'FILL' option 13522 which opens the selection panel list exampled in FIG. 135B showing the default of 'No fill' checked 13526. The user then changes that to 'All cells' 13586 in FIG. 135C as they would like all the flex cells filled light red. The then click the color selection button 13589 and select the light red 13578 in the popup 13588. Clicking 'Save' 13587 then takes the back to the 'OPTIONS' hint/selector in FIG. 135D where they click the 'X' 13584 to instantiate the copy-paste controlled formatting changes as exampled in FIG. 136A 13672. The copy-paste instantiated cells now have light red fill and currency number formatting overriding any previous cell set formats for a more complicated formula combining functions and an algebraic operator.

Figures 136A, 136B, 136C:
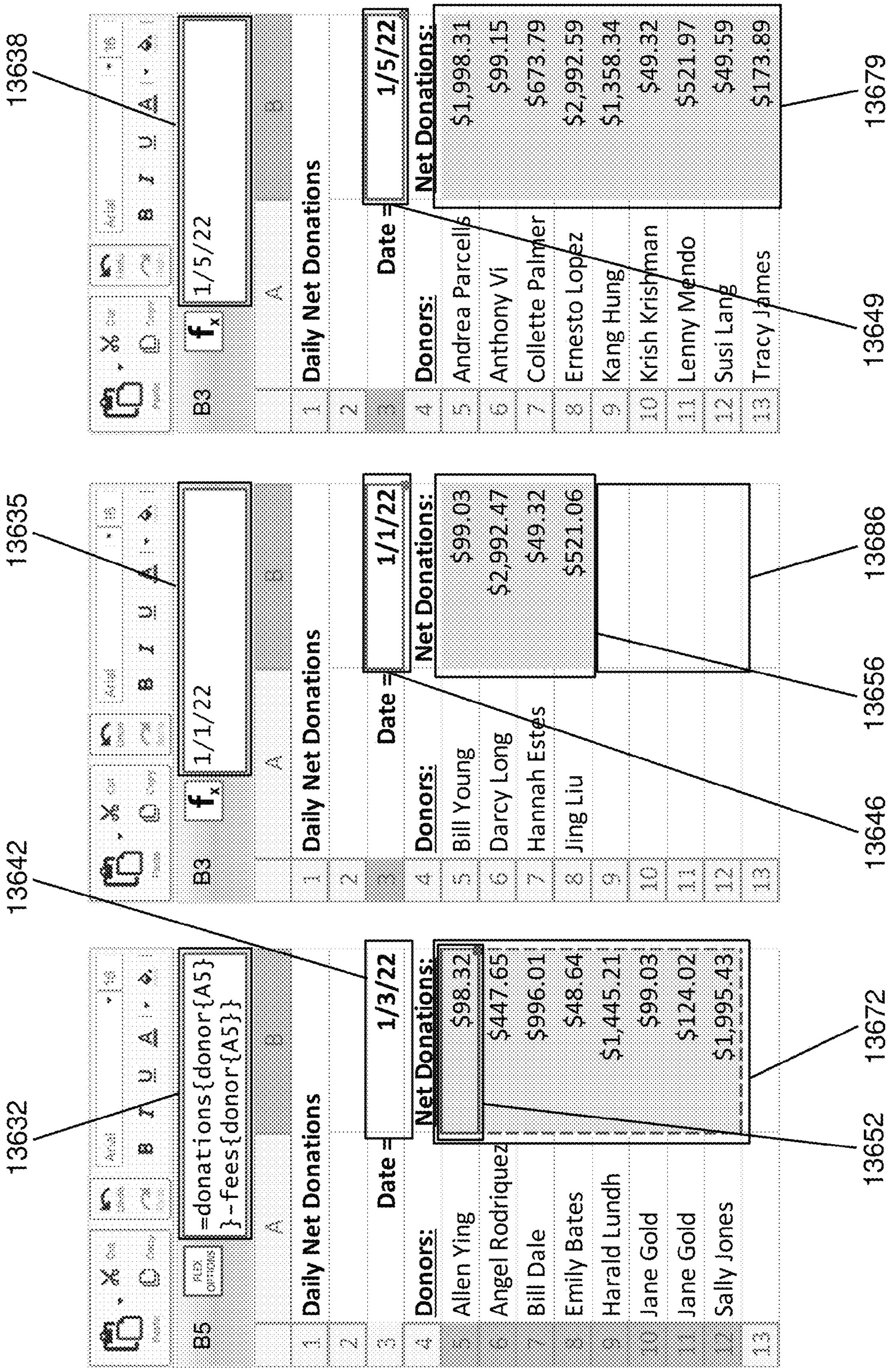

FIG. 136B and FIG. 136C then examples how changes to the 'WRITE_V' date constraint alters the flex copy-paste instantiated values and formatting. More specifically when the user decides they would like to see the donations on '1/1/22' instead of '1/3/22' they change the value in cell 'B3' to '1/1/22' 13646 in FIG. 136B and see that there were four donations 13656 instead of the eight 13672 on '1/3/22' 13642 in FIG. 136A. The flex copy-paste has removed the light red fill and currency formatting from the four cells 13686 it no longer instantiates. The user then decides they would like to see the donations on '1/5/22' 13649 as shown in FIG. 136C 13679. Now our flex copy-paste technology populates nine cells with the copy-paste controlled formatting, exampling that the capability works for both expansion and contraction of the number of cells populated. Rather than re-exampling all the other flex-copy paste capabilities for manually set formats or more complicated formulas, we will example the combination of the auto set formats.

Figure 137C:
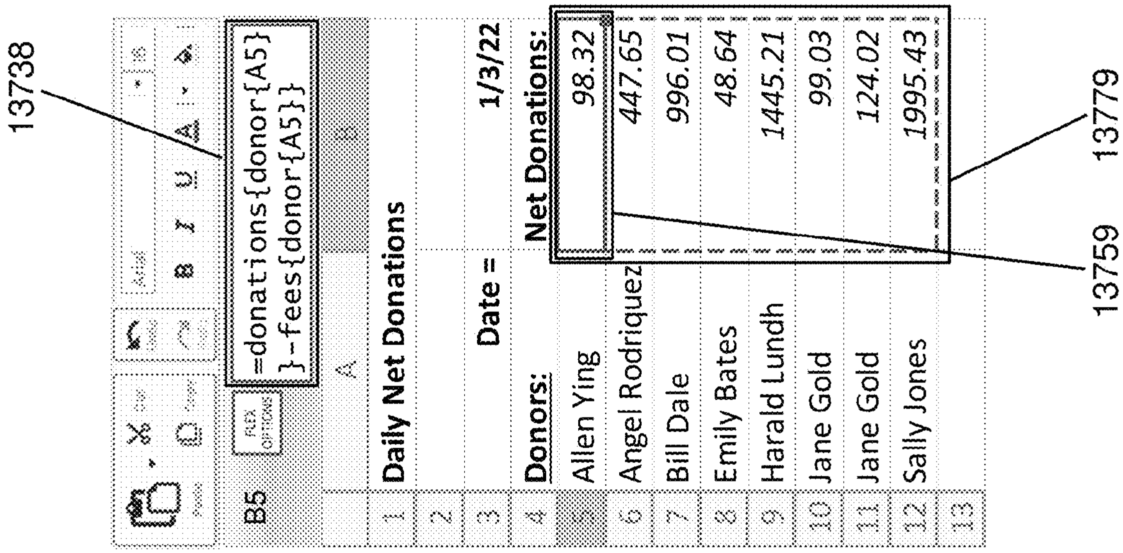
Figure 137B:
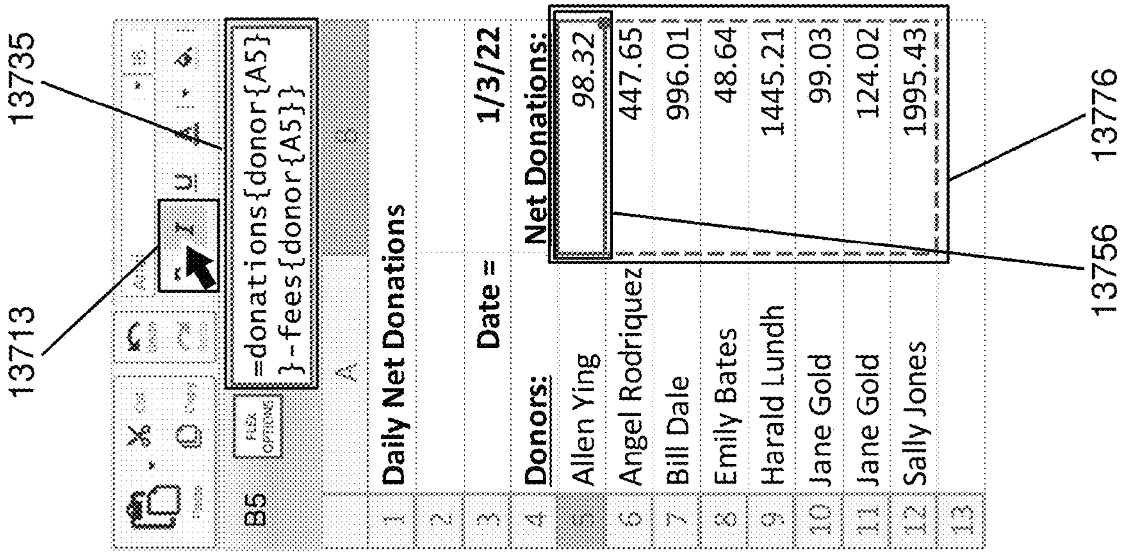
Figure 137A:
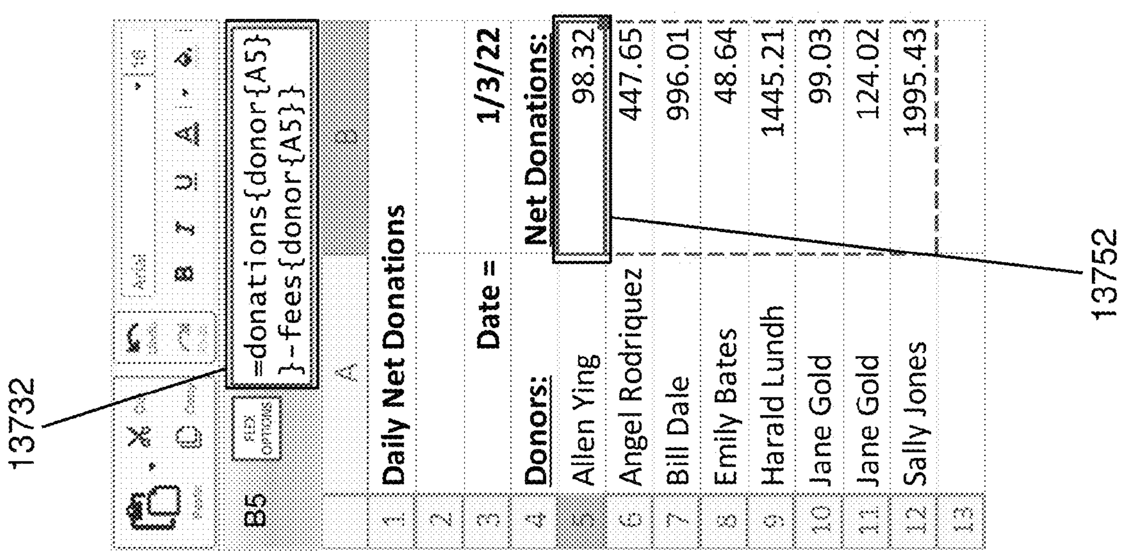

FIG. 137A through FIG. 138C examples a simple 'WRITE_V' connected flex copy-paste of a combination function/algebraic formula with automatic conversion of cell formatting to flex copy-paste controlled formatting. FIG. 137A picks up after the flex-copy paste setup in FIG. 134A through FIG. 134C with a new added capability of auto conversion of regular cell formatting to copy-paste controlled in copy-paste instantiated cells. In FIG. 137B the user clicks the italics button 13713 in the ribbon as they normally would do to change a cell format. However, instead our technology automatically converts that to flex copy-paste control as shown by 13756 and then is this embodiment a very short period afterwards automatically propagates the italics to the entire copy-paste instantiated area as exampled in FIG. 137C 13779. Note in this embodiment those formatting changes have not changed the formula arguments (FIG. 137C 13738 vs. FIG. 137A 13732) however they could have been recorded visibly in the cell formulas.

Figure 138C:
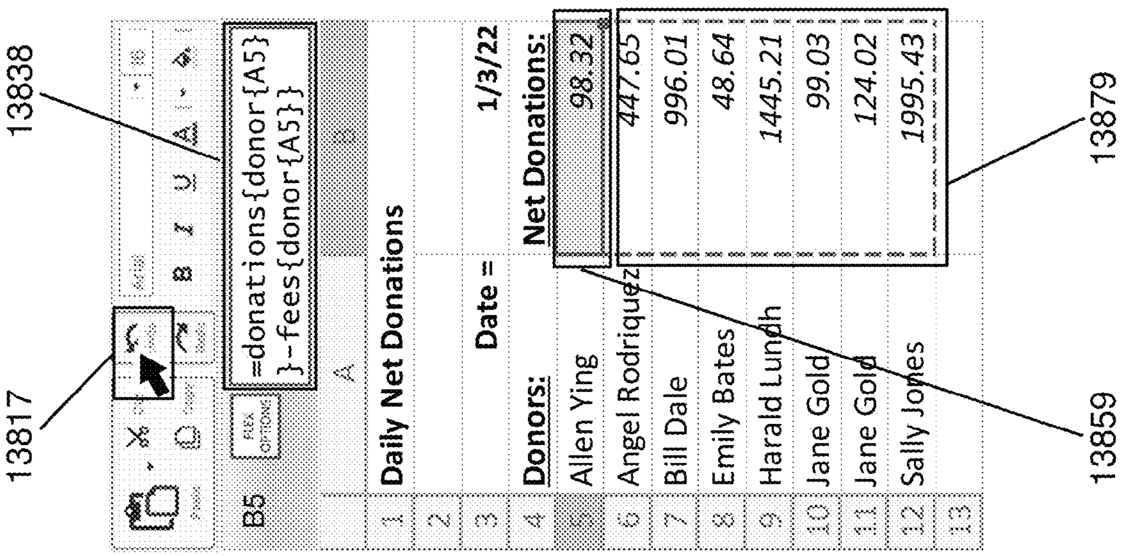
Figure 138B:
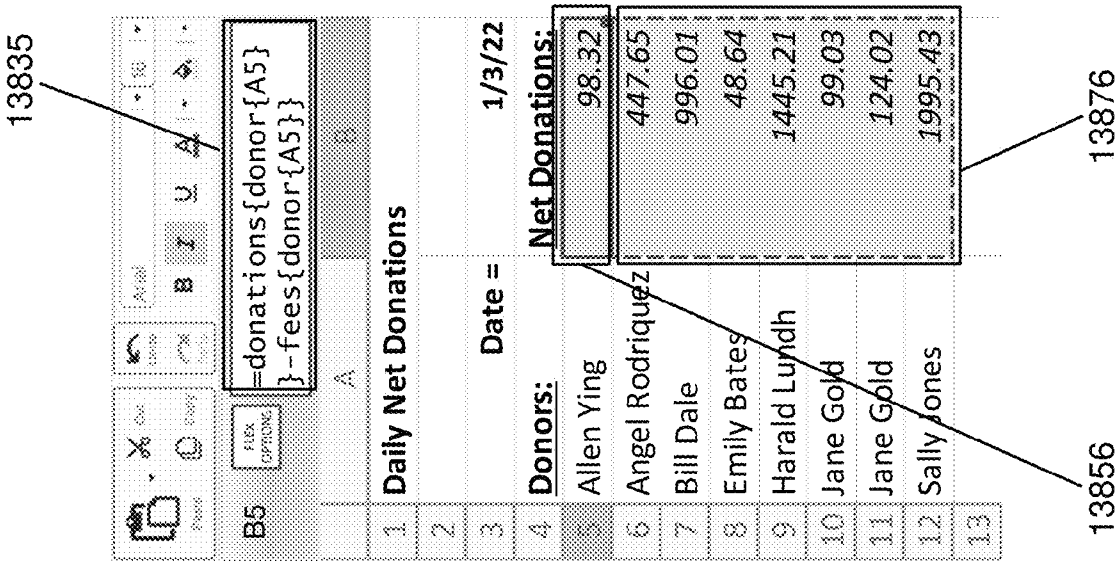
Figure 138A:
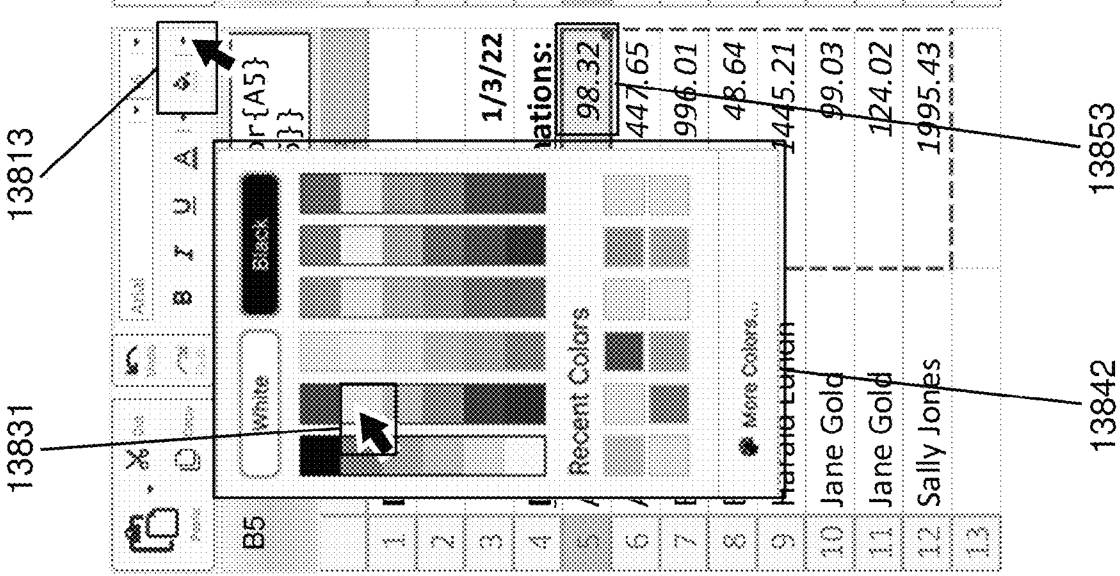

FIG. 138A and FIG. 138B examples the auto conversion of regular cell color fill actions to flex copy-paste controlled fills. The user clicks the color button 13813 as they normally would seeing the color selector UI 13842 they are used to and clicking like light red color as they normally would 13831, however like with italics the fill color briefly displays in the selected cell 13853 before then automatically instantiating all the flex copy-paste instantiated cells 13876 in FIG. 138B. However, this time the user decides they only want to populate the red fill in the selected cell so in this embodiment they click the 'Undo' button 13817 to fill only that cell 13859 as exampled in FIG. 138C. As previously discussed here are additional capabilities for regressing to cell-controlled formats and other ways to make them change, but instead of further exampling we will move on to exampling a different capability within our technology for separating inputs within a single cell.

Functions Creating Two Separate Cell Inputs

As previously described our technology supports spreadsheet functions with invisible arguments and spreadsheet functions instantiating values in multiple spreadsheet cells. We now example how our technology supports spreadsheet functions with arguments populating multiple cells and a separately visible user specifiable argument or value populating the cell. Thereby creating spreadsheet functions that modify the cell they occupy to accept two separate inputs, one for specifying the formula controlling that cell and other cells and one to specify or alter the specification of the value in the cell.

FIG. 104A through FIG. 110B examples multiple embodiments of how our separate input Function technology works. It is created for situations where one of our functions instantiates values in multiple cells and the value populated in the cell holding the formula is not easily visible or is in an invisible argument. The user therefore needs an easy way to either set the value or modify the value generated by the function.

Figure 104A:
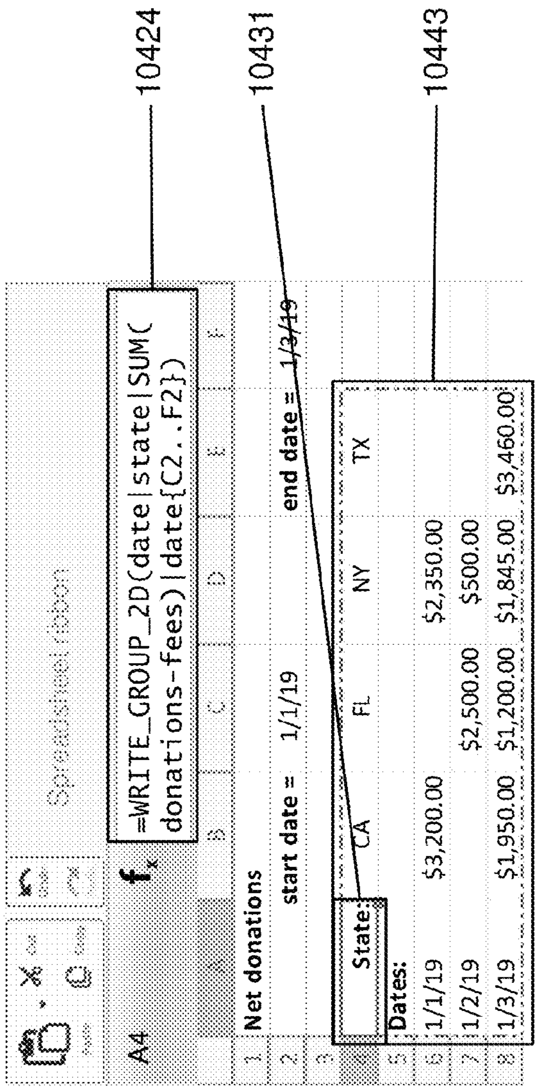
Figure 104B:
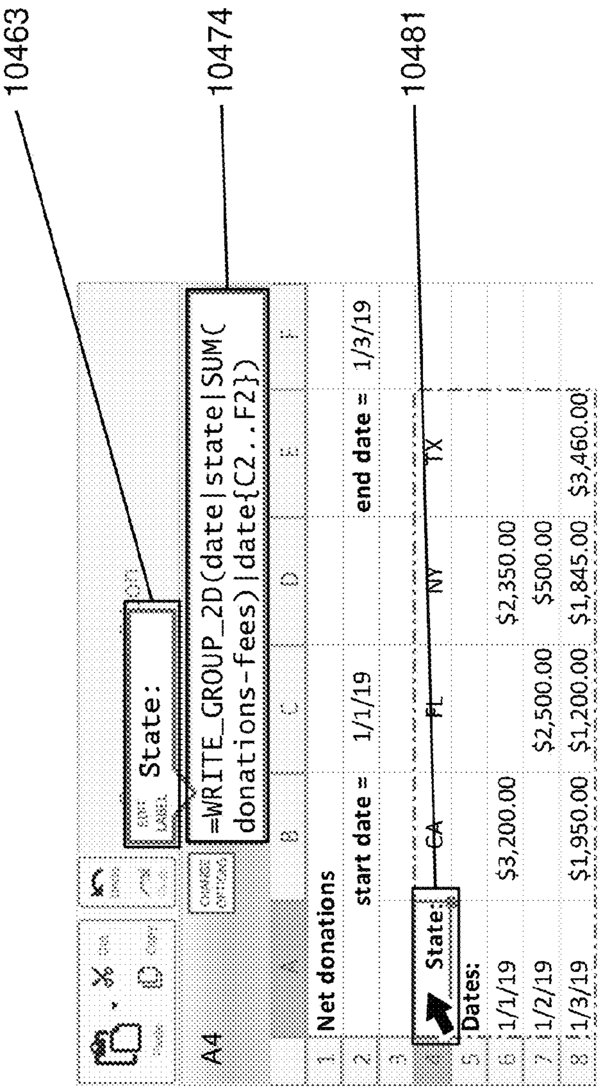
Figure 105B:
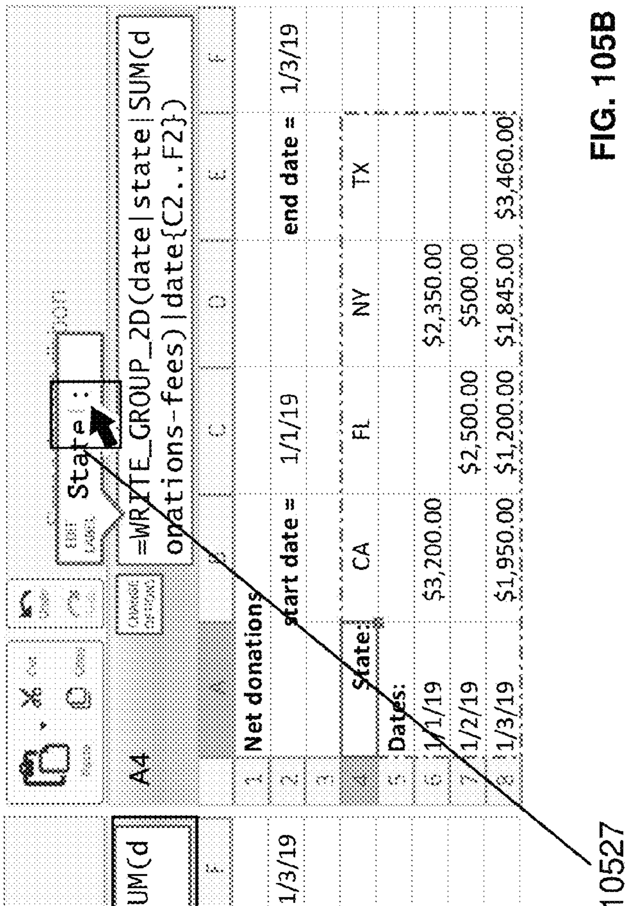
Figure 105A:
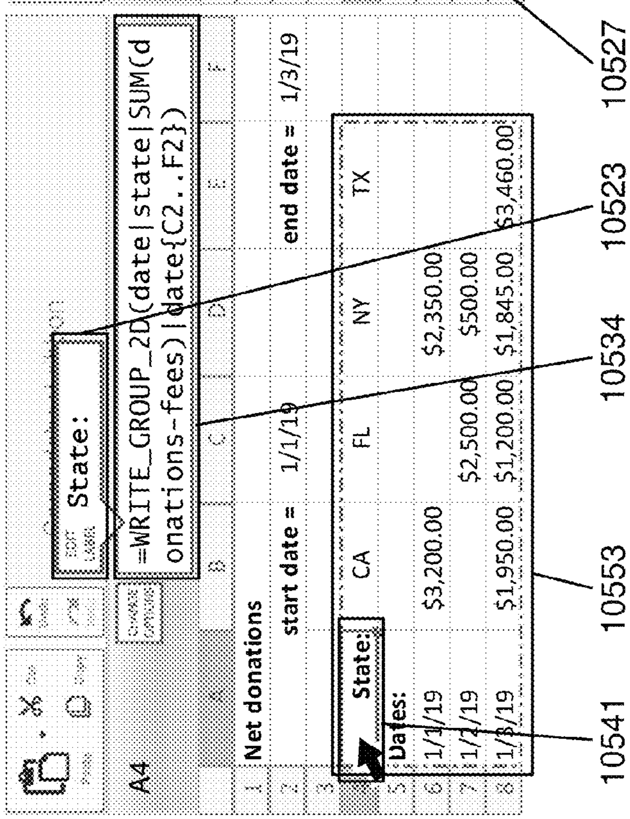
Figure 105C:
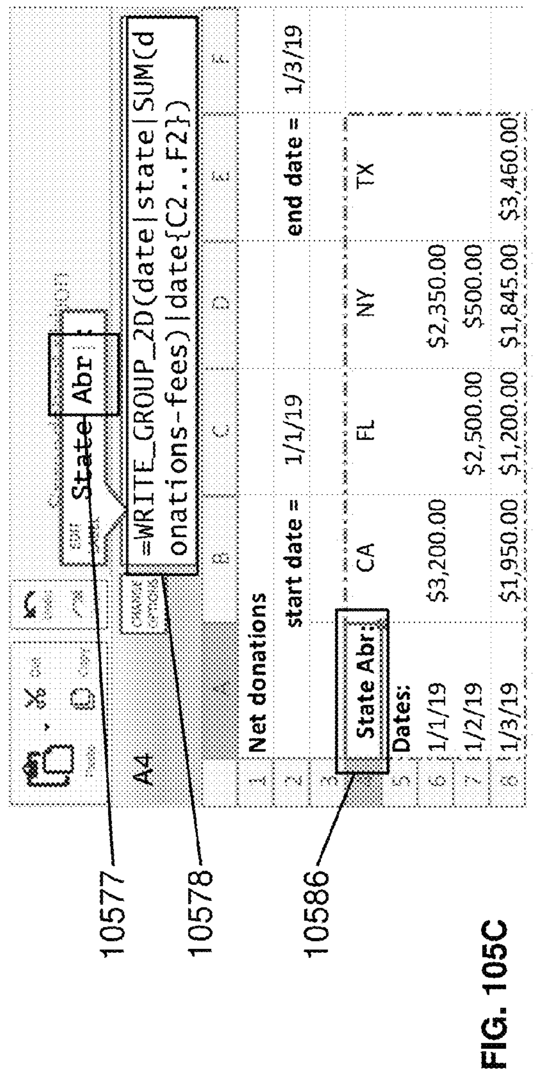

FIG. 104A and FIG. 104B example a normal formula bar (FIG. 104A) and our function driven two separate cell input formula bar (FIG. 104B). In this example, single clicking or moving into the normal cell 'A4' 10431 in FIG. 104A displays its value and shows its formula in its formula bar 10424. It triggers the green dot dash outlining of the 'WRITE' area 10443 but otherwise it presents its value and works like one would see in one of the existing spreadsheets if they had our 'WRITE' function technology. However, single clicking or moving into the cell 'A4' 10481 in FIG. 104B presents a very different formula bar with two separate inputs, one for the entire 'WRITE' formula 10474 and the second one 10463 for the cell value. In this embodiment the single click or movement into the cell 'A4' 10481 shows the 'State:' value in the cell. In this embodiment 'State:' (shown in 10481 and 10463) is the horizontal heading row label generated by either a function default or hidden function argument. FIG. 105A through FIG. 105C then examples how the user can change the label 'State:' value using the second input.

In FIG. 105A through FIG. 105C the charity user wants to change the function generated 'State:' value shown in cell 'A4' 10541 and the second input 10523 in FIG. 105A to be 'State Abr:' as shown in 10577 and 10586 in FIG. 105C. The user does this by putting the cursor in the 'EDIT LABEL' formula bar input 10527 in FIG. 105B and then adding the space and 'Abr' 10577 as shown in FIG. 105C which gives the in-cell result of 'State Abr:' shown in cell 'A4' 10586. This shows usage of one of the new formula bar inputs, however both inputs (the new one and the regular formula bar input) are functional depending upon which one the user clicks into.

Figure 106A:
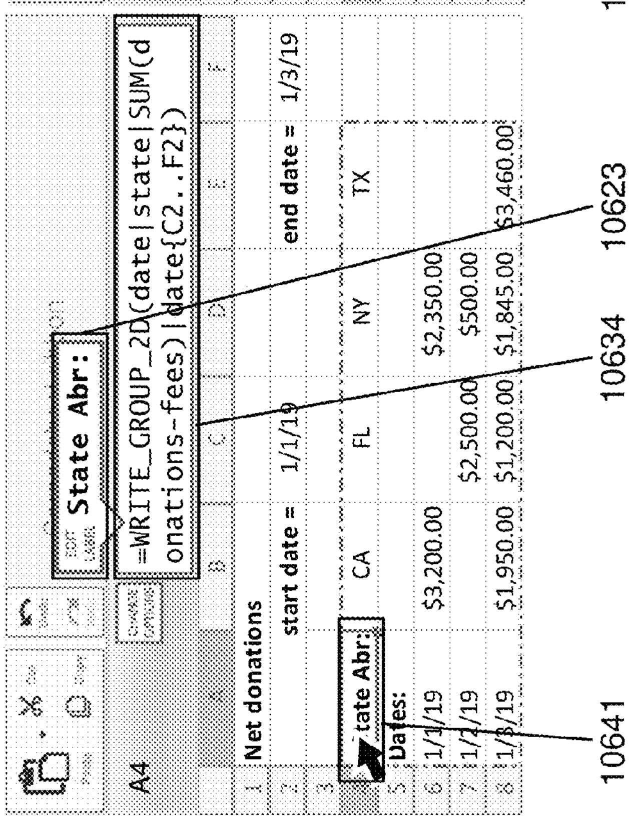
Figure 106B:
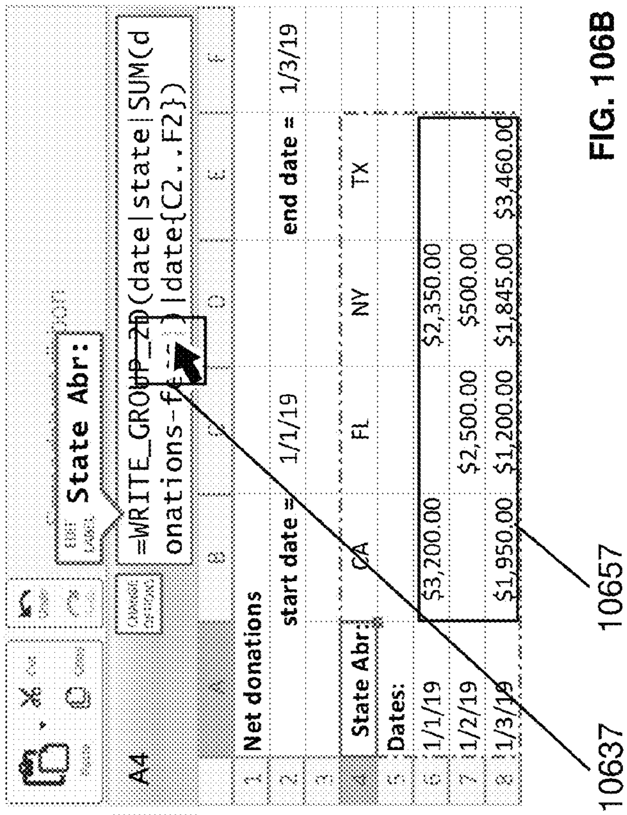
Figure 106C:
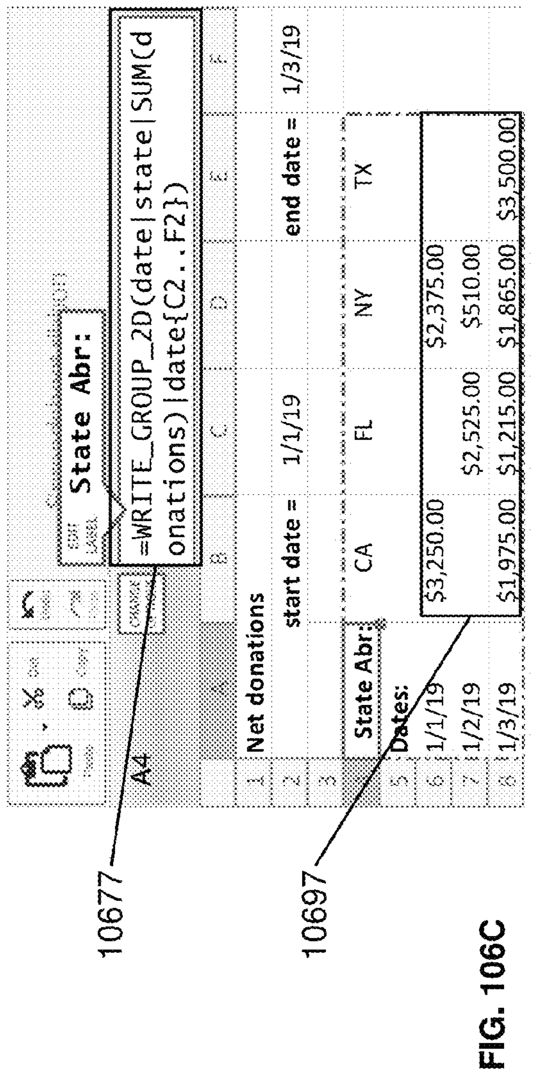

FIG. 106A through FIG. 106C examples usage of the regular formula bar input. In FIG. 106A the charity user reopens cell 'A4' 10641 showing both of the formula bar inputs 10623 (new) and 10634 (regular) in this embodiment of our technology. In FIG. 106B the user then places the cursor 10637 in the regular formula bar formula ready to edit the function formula. FIG. 106C examples the result of the user completing that formula edit where they removed '-fees' in the formula to leave the calculated values as 'SUM(donations)' in the formula 10677. This then changes the calculated values from those netting out the fees shown in FIG. 106B 10657 to those in FIG. 106C 10697 not netting out the fees and showing the 'SUM(donations)'. Thus, exampling in FIG. 105A through FIG. 106C usage of both the formula inputs.

FIG. 107A through FIG. 108C examples the same changes done by the charity user in-cell rather than in the formula bar. Thereby exampling how this embodiment of our technology works for the two different inputs in-cell. FIG. 107A through FIG. 107C examples how the user can change the label 'State:' value.

FIG. 107A examples the charity user double clicking into cell 'A4' 10743 to expose in our technology the two in-cell inputs, the regular in-cell formula input 10743 including, as previously described, the 'CHANGE OPTIONS' button and the additional input which in this example is the 'EDIT LABEL' input 10731. In this embodiment our technology displays only the regular formula input in the formula bar 10723 although our technology could have also shown the additional input there as well, as shown in 10523 in FIG. 105A. In FIG. 107B the charity user starts to change the function generated 'State:' value shown in 10731 in FIG. 107A to be 'State Abr:' value shown in 10776 in FIG. 107C. The user does this by putting the cursor in the 'EDIT LABEL' in-cell input 10736 in FIG. 107B and then adding a space and 'Abr' 10776 which gives the in-cell result of 'State Abr:' shown in cell 'A4' 10841 in FIG. 108A. The cell 'A4' 10846 can be one click opened to show the two inputs in the formula bar as exampled in FIG. 108B. The examples in FIG. 104B through FIG. 108B have been shown with the 'CHANGE OPTIONS' button 10827 which functions similar to the one exampled in FIG. 51A through FIG. 54B. Although our two separate inputs technology also applies to our technology using hints as exampled in FIG. 108C. Here the 'CHANGE OPTIONS' button 10827 in FIG. 108B has been replaced with the '$f_x$' 10877 in FIG. 108C which in this embodiment indicates that HINTs, like those exampled in FIG. 9, FIG. 12, FIG. 14A and FIG. 14B are being used along with the double input capability. Our two separate input technology works for functions with hidden or invisible arguments as well as functions with visible arguments.

Formatting in Functions Creating Two Separate Cell Inputs

Our multiple separate input technology also works with our in-formula formatting capability as exampled in FIG. 109A through FIG. 110B. The charity user decides they would like the 'States:' label in cell 'A4' which was generated by the 'WRITE_GROUP_2D' function and displayed in the 'EDIT LABEL' in-cell second input to be red. So, they highlight 'States:' 10932 and click the letter color button 10923. This opens the color selector 10934 as per normal color selection and the user clicks the bright red 10924. They follow this up by clicking the italics 'I' button 10927 in FIG. 109B to change the black normal 'States:' 10932 (before) to the red italics 'States:' 10946 (after). This example was done in an embodiment with button driven 'CHANGE OPTIONS' 10937 which could have been used for the formatting as well. The technology is also compatible to work with our HINTs as exampled by the outcome of the same actions delivering the same outcome in FIG. 109C 10986 in an embodiment using HINTs as indicated by the '$f_x$' 10976 rather than the 'CHANGE OPTIONS' button 10937 in FIG. 109B. Although recognizing that our HINTs and 'CHANGE OPTIONS' can work together.

FIG. 110A through FIG. 110C examples the same actions as FIG. 109A through FIG. 109C accomplished using the formula bar second input. The user highlights 'States:' 11033 and clicks the letter color button 11023. This opens the color selector 11034 as per normal color selection and the user clicks the bright red 11024. They follow this up by clicking the italics 'I' button 11027 in FIG. 110B to change the black normal 'States:' 11033 in FIG. 110A (before) to the red italics 'States:' 11046 in FIG. 110B (after). In this embodiment they also see the red italics 'States:' 11047 in the formula bar second input. This example was done in embodiment with HINTs as indicated by the '$f_x$' 11022 which could have been used for the formatting as well. The technology is also compatible to work with our button accessed specifications as exampled by 'CHANGE OPTIONS' button 11076 outcome of the same actions delivering the same outcome in FIG. 110C 11086 as in 11046 in FIG. 110B.

FIG. 109A through FIG. 110B exampled second input value formatting with hidden arguments. The arguments created could have been visible in our technology in argument(s), argument(s) within an argument group, named argument term(s) and/or named argument term group(s). Since we have previously example all of those technologies we will move to exampling the computer system underlying our spreadsheet function application.

Computer System

FIG. 115 is a block diagram of an example computer system, according to one implementation. Computer system 11510 typically includes at least one processor 11514 which communicates with a number of peripheral devices via bus subsystem 11512. These peripheral devices may include a storage subsystem 11524 including, for example, memory devices and a file storage subsystem, user interface input devices 11522, user interface output devices 11520, and a network interface subsystem 11516. The input and output devices allow user interaction with computer system 11510. Network interface subsystem 11516 provides an interface to outside networks, including an interface to communication network 11585, and is coupled via communication network 11585 to corresponding interface devices in other computer systems or in the cloud and usable for cloud applications.

User interface input devices 11538 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 11510 or onto communication network 11585.

User interface output devices 11520 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 11510 to the user or to another machine or computer system.

Storage subsystem 11524 stores programming and data constructs that provide the functionality of some or all of the modules and methods described herein. These software modules are generally executed by processor 11514 alone or in combination with other processors.

Memory 11526 used in the storage subsystem can include a number of memories including a main random-access memory (RAM) 11530 for storage of instructions and data during program execution and a read only memory (ROM) 11532 in which fixed instructions are stored. A file storage subsystem 11528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 11528 in the storage subsystem 11524, or in other machines accessible by the processor.

Bus subsystem 11512 provides a mechanism for letting the various components and subsystems of computer system 11510 communicate with each other as intended. Although bus subsystem 11512 is shown schematically as a single bus, alternative implementations of the bus subsystem may use multiple busses.

Computer system 11510 can be of varying types including a workstation, server, computing cluster, blade server, server farm, or any other data processing system or computing device. Due to the ever-changing nature of computers and networks, the description of computer system 11510 depicted in FIG. 115 is intended only as one example. Many other configurations of computer system 11510 are possible having more or fewer components than the computer system depicted in FIG. 115.

Some Particular Implementations

Some particular implementations and features are described in the following discussion.

Selection List Panel Implementations

Existing spreadsheets have extremely limited ways of entering built-in function arguments as exampled in FIG. 5. Our technology dramatically expands the ways users can construct arguments through a broad spectrum of selection list panels. One implementation of our technology provides an alternative to typing, cell selecting, single list selecting and pasting in arguments for a built-in spreadsheet functions. It is a method for receiving a user action (signal) invoking (opening) a selection list panel (UI) for a built-in (predefined) spreadsheet function in a spreadsheet cell formula. Where the selection list panel triggered by the user action (signal) includes a list of specifications that configure the built-in spreadsheet to manipulate data, perform calculations or output ordered results. That list of specifications is presented as one or more of the following list types, single list, multiple separate lists, multiple related lists, multiple cascading selector lists, reorderable lists or list combining these. From one or more of those list types the user makes at least one argument specification (second signal) configuring it for the built-in function so that when the functional formula is committed (entered) into the spreadsheet cell the argument specification is executed by the spreadsheet functional formula.

Selection List Panel Implementations—Single List

Figures 116A, 116B, 116C, 116D:
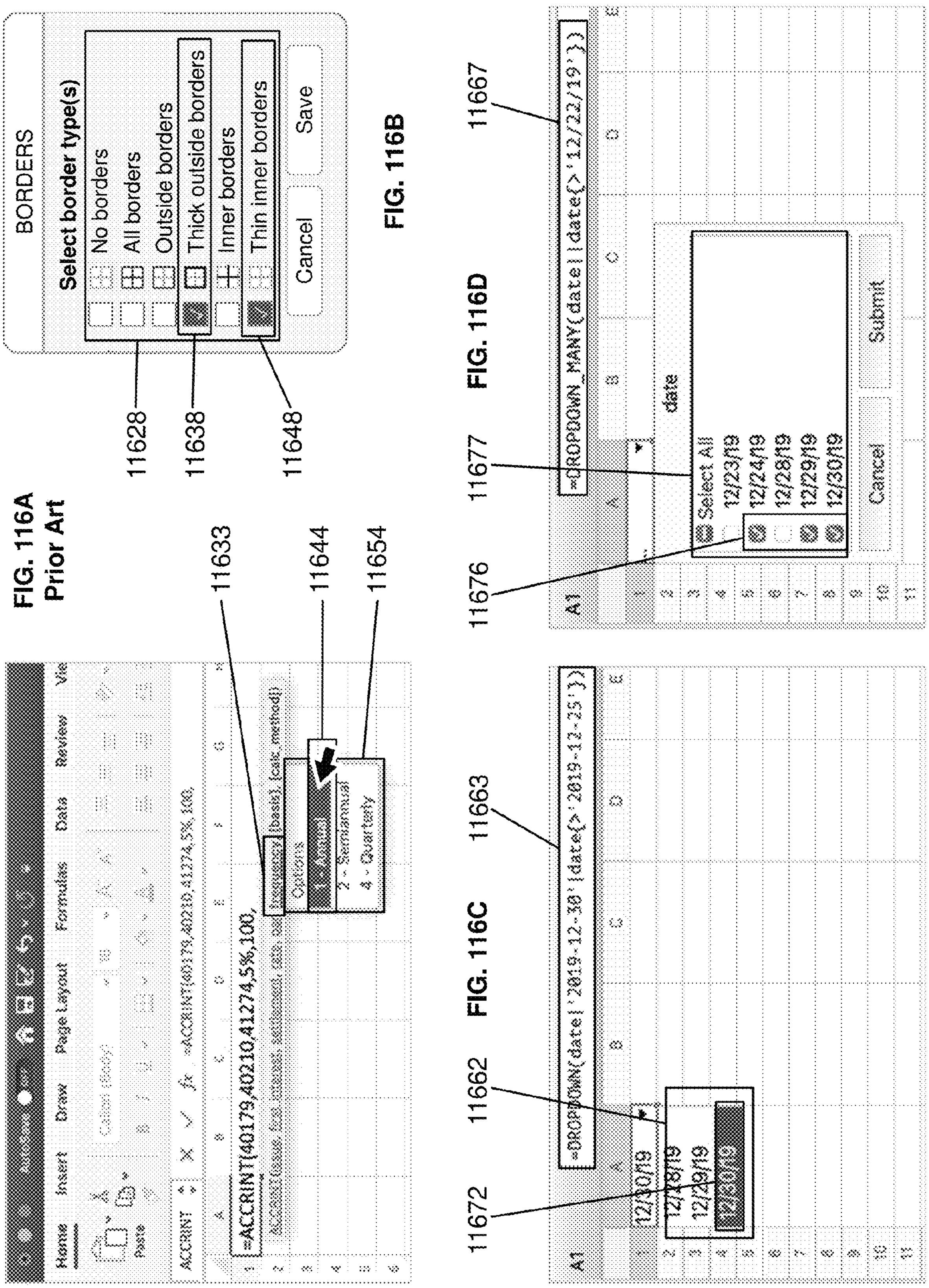

Existing spreadsheets have only one version of the four different single lists laid out in FIG. 6, that is the 'Single list, Fixed Content, 1. Single specification. In addition to that one type, our embodiments support the other three as exampled in FIG. 116B through FIG. 116D. FIG. 116B examples the FIG. 6 'Single list, Fixed Content, 2. Multiple specifications' where the user has specified function or flex copy paste controlled 'Thick outside borders' 11638 and 'Thin inner borders' 11648 from the fixed list 11628 (that does not change based on other function arguments). FIG. 116C examples the FIG. 6 'Single list, Situationally variable content, 3. Single specification' where the list 11662 is situationally dependent on the user specified field and any constraint in the formula 11663 and selects one value 11672. FIG. 116D examples the FIG. 6 'Single list, Situationally variable content, 4. Multiple specifications' where the list 11677 is situationally dependent on the user specified field and any constraint in the formula 11667 and the user has specified three values 11676 in the selector list panel. Thus, these additional selection list panels give users function instantiation options they have not previously had in other spreadsheets.

Selection List Panel Implementations—Multiple Separate Lists

Figures 117A, 117B, 117C, 117D:
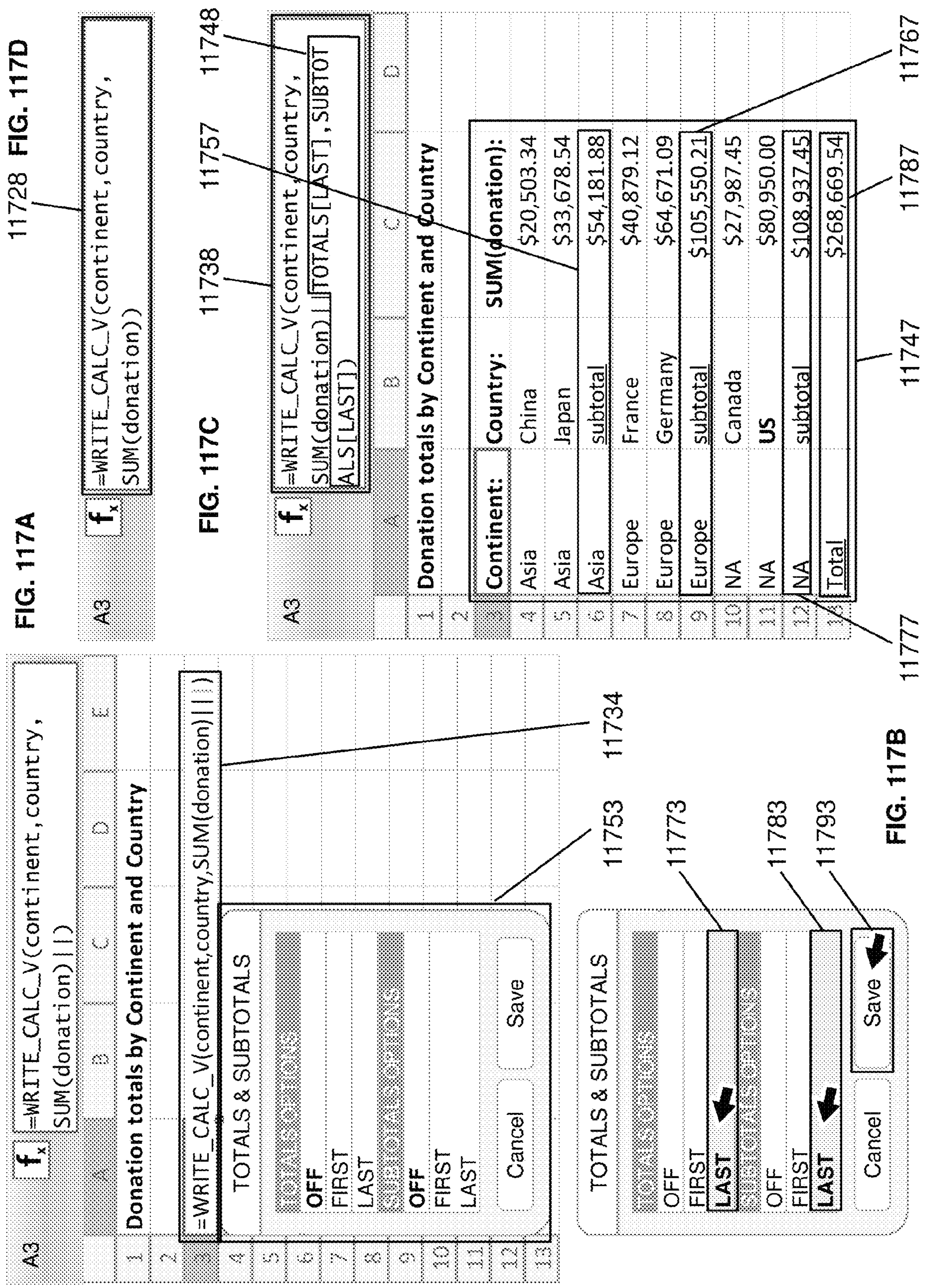

Our filing U.S. Provisional Patent Application No. 63/192,475. ADAP 1009-1 uniquely presents multiple separate lists supporting a single argument specification. This filing uniquely supports multiple separate lists supporting multiple user argument specifications where the argument specifications in the list are all fixed, all situationally variable (change based on the other functional arguments) or a mix of fixed and situationally variable. FIG. 117A through FIG. 117C examples one such example a FIG. 6 'Multiple separate lists, Fixed Content, 6. Multiple specification' selector list panel. Where the user invoked a selection panel with two separate lists (TOTALS OPTIONS' and 'SUBTOTALS OPTIONS') by a first action (signal) that opened the selection list panel 11753 FIG. 117A with the default settings of 'OFF' bolded. The user then made two (multiple) selections/specifications (11773 and 11783) in the selection list panel in FIG. 117B before saving the two specified specification arguments to the 'WRITE_CALC_V' functional formula in cell 'A3' 11734 by clicking the 'Save' button 11793. In this example once the user completes the formula hitting ENTER instantiating in FIG. 117C the two "TOTALS & SUBTOTALS' arguments 11748 in the functional formula 11738 and providing the 'Total' row 11787 and the three 'subtotal' rows 11757, 11767 and 11777 in the functional output 11747 in FIG. 117C. Had these same specifications been made with our invisible arguments technology the result shown in 11747 in FIG. 117C would have been instantiated by the functional formula 11728 in FIG. 117D. Thus, giving the user multiple separate lists presented in a selection list panel supporting multiple selections populated into a functional formula with either visible or invisible arguments.

Selection List Panel Implementations—Multiple Related Lists

Our selection panel list technology presents the user with multiple related lists supporting one or multiple user specifications of spreadsheet formula arguments. The presented lists are all fixed, all situationally variable (change based on the other functional arguments) or a mix of fixed and situationally variable as summarized in FIG. 6 number specifications eleven through sixteen. FIG. 118A and FIG. 118B examples one such example a FIG. 6 'Multiple related lists, Mixed fixed and situationally variable content, 16. Multiple specification' selector list panel. Where the user invoked a selection panel with two lists ('Field' 11862 and 'Selection' 11863) by a first action (signal) that opened the selection list panel FIG. 118A with the default settings of 'OFF' for the two potential selections. Each first list topic has a related second list where the user specifies their selection as exampled for by 'Selection' list 11878 for the 'Field' 'donors' 11868. The user made two (multiple) selections/specifications (11858 and 11888) in the selection list panel FIG. 118B before saving the two specified specification arguments to the functional formula by clicking the 'Save' button. In this example once the user enters the functional formula into its cell as exampled in FIG. 21B the 'BLANK' arguments 2128 are instantiated (visibly or invisibly) and executed by the function as shown in 2157. Thus, giving the user multiple related lists presented in a selection list panel supporting single or multiple selections populated into a functional formula.

Selection List Panel Implementations—Multiple Cascading Selector Lists

This selection panel list presents the user with multiple cascading selector lists supporting one or multiple user specifications of spreadsheet formula arguments. Cascading selector lists are defined by each list requiring the user to make a selection with the first list selection then cascading to a second selection list selection, recognizing in some situations there is a default selection in the cascaded list that the user decides not to change as their selection. The presented lists are all fixed, all situationally variable (change based on the other functional arguments) or a mix of fixed and situationally variable as summarized in FIG. 6 number specifications seventeen through twenty-two. FIG. 119A, FIG. 119B and FIG. 119C examples FIG. 6 'Multiple cascading selector lists, Fixed Content, 17. Single specification set' (FIG. 119A), FIG. 6 'Multiple cascading selector lists, Mixed fixed and situationally variable content, 21. Single specification set' (FIG. 119B), and FIG. 6 'Multiple cascading selector lists, Mixed fixed and situationally variable content, 22. Multiple specification sets' (FIG. 119C).

In each of the examples in FIG. 119A through FIG. 119C the user invoked the selector list panel shown in the figure with its cascading lists. FIG. 119A examples the user making a selection checking the box for 'All cells' 11936 in the first list of 'Select fill(s)' 11926 that then cascades to making a selection in the color selector 11948 in this example of light blue 11929 after an intermediate click 11937 to get to the color selector. FIG. 119B examples for 'TOTALS & SUBTOTALS' first an 'Applicability selection' on/off list 11998 selector/specification that then cascades to a 'Positioning selection' first/last list 11999 selection/specification where in combination the user is making one set of selections. FIG. 119C examples for 'OUTLINES & FILL' three sets of completed selections 11952 (one) and 11972 (two) with a fourth set completing with 11993 and 11965. Thus, giving the user great flexibility in a single selection list panel to make one or many specifications from a very broad set of alternatives.

Selection List Panel Implementations—Reorderable Lists

Reorderable lists presents the user with a very visual selection list panel to set spreadsheet formula arguments controlling the order of function actions (e.g., order of analyses or order of outputs). The presented lists are all fixed, all situationally variable (change based on the other functional arguments) or a mix of fixed and situationally variable and contain a mechanism for reordering as summarized in FIG. 6 number specifications twenty-three through twenty-eight. FIG. 120A through FIG. 120C examples one such example a FIG. 6 'Reorderable specification lists, Mixed fixed and situationally variable content, 27. Movement' where the reordering is done by 'Drag & Drop'. The user invoked a selection list panel exampled in FIG. 120A and was presented a 'Field etc.' list of multiple sorts fields 'code' and 'type' 12024. Each of those fields has a second 'Sort Direction' list which in this example has been selected to either 'A to Z' or 'Z to A' 12025. The user then drags and drops the 'Sort Order' '2' content 12034 in FIG. 120A via the 'Drag & Drop' icon 12032 to 'Sort Order' '1' 12082 in FIG. 120B moving its content 12084. Thereby having reordered the 'HORIZONTAL SORT' so that 'type' is sorted first then 'code' second. FIG. 120B and FIG. 120C example the second list selection with the click 12095 in FIG. 120B exposing the applicable specifications 12098 in FIG. 120C. The user can then change the 'Sort Direction' applicable to its corresponding first list topic. FIG. 24C, FIG. 24D, FIG. 25C, and FIG. 25D example the selection variant of reordering ('Reorderable specification lists'). Like our previous multiple lists, the content in these lists can be all fixed, all situationally variable or a mixture of both types.

Selection List Panel Implementations—Other Embodiments

Our technology supports our selection list panels instantiating the user selection(s) visibly and invisibly into the functional formulas. In an embodiment of our technology the selection list panel specifications are visibly recorded in the function formula as exampled by the single argument text "COLLAPSE[OFF]' 1147 inserted into the functional formula 1138 in FIG. 11B. FIG. 21B examples two arguments 2128 visibly populated into the functional formula 2118 by the specifications made in FIG. 19D 1988 and FIG. 20C 2038 to the "Multiple related lists" selection list panel exampled in FIG. 20D.

In another embodiment of our technology at least some of the selection list panel specifications are visibly recorded in the selection list panel, as exampled in FIG. 44D 4488, but not visibly shown as an argument in the functional formula as exampled in FIG. 45B 4558 for a single argument. The formula in FIG. 45B 4558 delivers the same output 4578 as 1178 in FIG. 11B without the text argument 'COLLAPSE [OFF]' 1147 in its formula. FIG. 54B does a similar comparison to FIG. 21B for two arguments from the same selection list panel, where the arguments are visible in FIG. 21B 2128 for the functional formula 2118 but invisible in the formula 5418 in FIG. 54B which delivers the same outcomes. While the arguments in this embodiment are invisible in the functional formulas, they are user accessible (visible) and editable by reopening their respective selector list panels.

In another embodiment of our technology the selection list panel displays configuration status descriptions, e.g., ON, OFF and DEFAULT, aligned with at least some of the respective specifications in the list of specifications as exampled in FIG. 12 1266 for visible arguments and exampled in FIG. 46 4676 for invisible arguments.

In another embodiment of our technology one or more specifications in the selector panel list are formatting specifications that configure all or parts (segments) of the output range instantiated by the built-in spreadsheet function deploying the selector panel list. The function-controlled formatting overrides any cell formatting otherwise applied to the spreadsheet range as exampled in FIG. 31A through FIG. 36B and FIG. 59A through FIG. 86B.

Another embodiment of our technology includes multiple separate lists with multiple value selections that each result in different results from the spreadsheet function as exampled in FIG. 117B where the first specification 11773 results in the 'Total' row 'LAST' as exampled in FIG. 117C 11787 and the second specification 11783 in FIG. 117B results in the three 'subtotal' rows 11757, 11767 and 11777

FIG. 17C 'LAST' in their sections. Our technology allows user to select multiple specifications with different outcomes in a functional formula from the same list UI as summarized in FIG. 6 number specifications six, eight and ten.

Another embodiment of our technology includes multiple related lists including a first list of selection (specification) topics each of which is accompanied by a second list of specification alternatives applicable to their respective specification topic in the first list as exampled by FIG. 118A and FIG. 118B. FIG. 118A examples the two lists, the topic list 'Field' 11862 and the specification alternative list 'Selection' 11863. FIG. 118B examples the specification alternative list 11878 for the second topic 'donors' 11868 and in this example the user making a second specification. These lists can have fixed content, situationally variable content or a mixture of both as laid out in FIG. 6 'Number specifications' eleven through sixteen and exampled in more detail FIG. 15 through FIG. 21B and FIG. 51A through FIG. 54B. They allow the user to make one specification or multiple specifications.

Another embodiment of our technology includes multiple cascading selector lists where the user is presented specification alternatives in the first list, not just topics but alternatives requiring a specification to then proceed to the second list. With a specification each first list alternative cascades to second list specification alternatives applicable to that specification as exampled in FIG. 119A through FIG. 119C. With more detailed examples in FIG. 31A through FIG. 36B and FIG. 81A through FIG. 86B. We summarize these selector panel list options in FIG. 6 number specifications seventeen through twenty-two as specification sets because they require a specification from both lists, realizing in some situations that second specification could be accepting the default selection (once the first selection is made) for the second list alternative.

Another embodiment of our technology includes a selection panel list where the content of the lists can be reordered by movement (e.g., drag & drop) or by selection, as exampled in FIG. 23 through FIG. 26B. In one embodiment the first list can be ordered by a drag and drop operation as exampled in FIG. 120A 12032 and FIG. 120B 12082 reordering the first and second list content 12084 in FIG. 120B (vs. 12034 in FIG. 120A). The second list specification alternatives are then applicable to their respective first list topic as exampled in FIG. 120C 12098. In another embodiment the first list can be ordered by a reordering UI selection as exampled in FIG. 24C, FIG. 24D, FIG. 25C, and FIG. 25D. FIG. 6 'Number specifications' twenty-three through twenty-eight summarize different embodiments of our 'Reorderable selection lists' selection list panels.

Figure 121A:
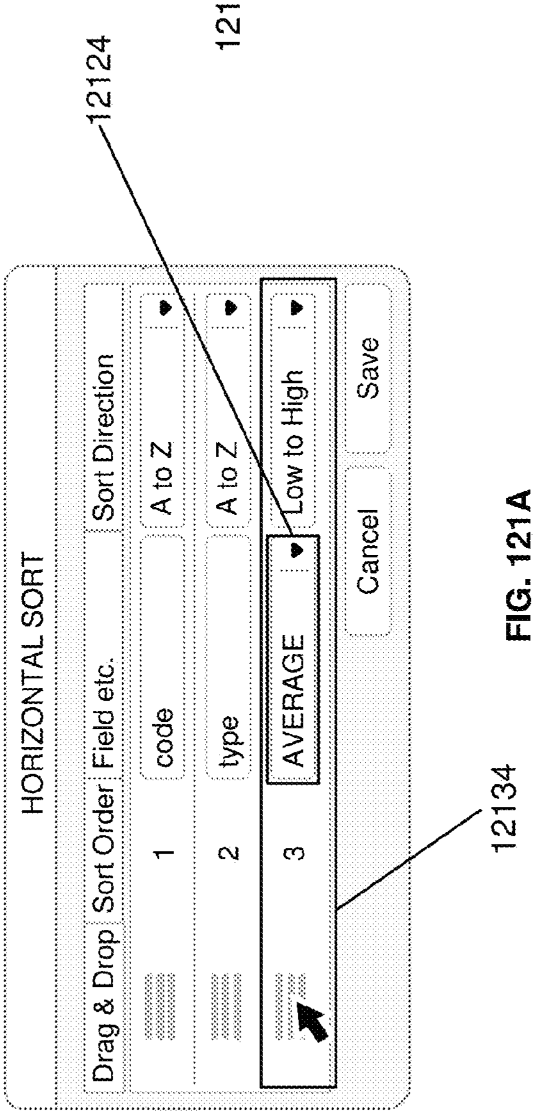
Figure 121B:
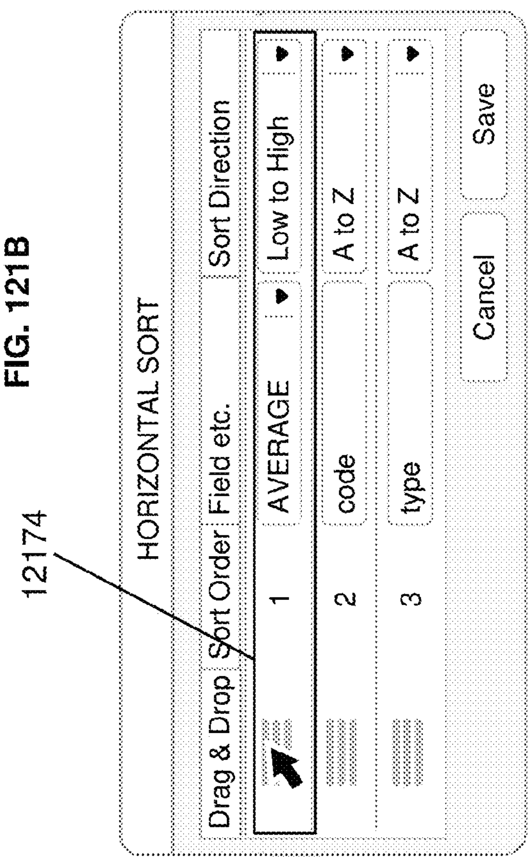
Figure 121C:
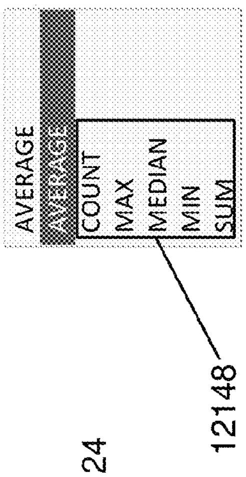
Figure 121D:
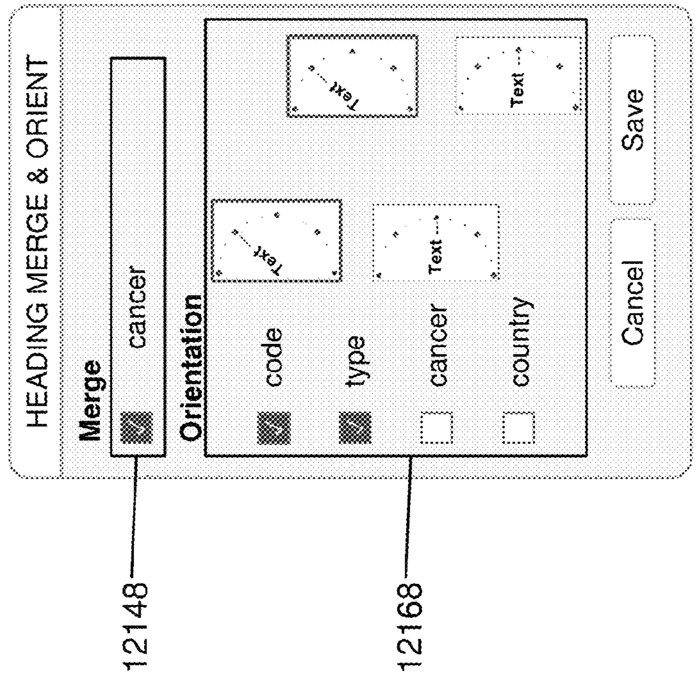
Figure 122A:
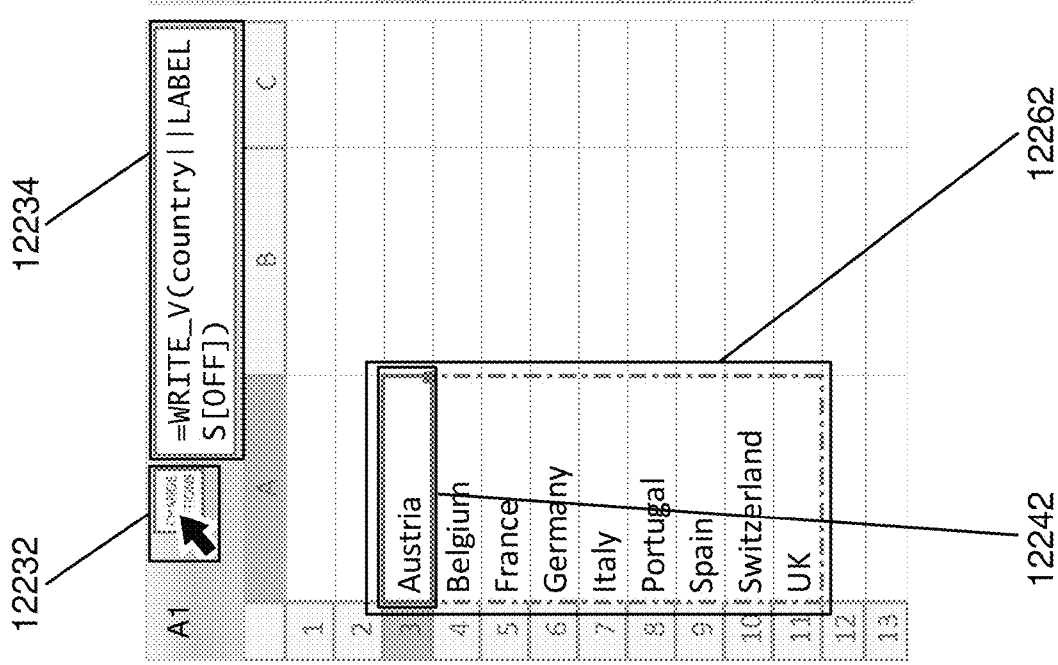
Figure 122B:
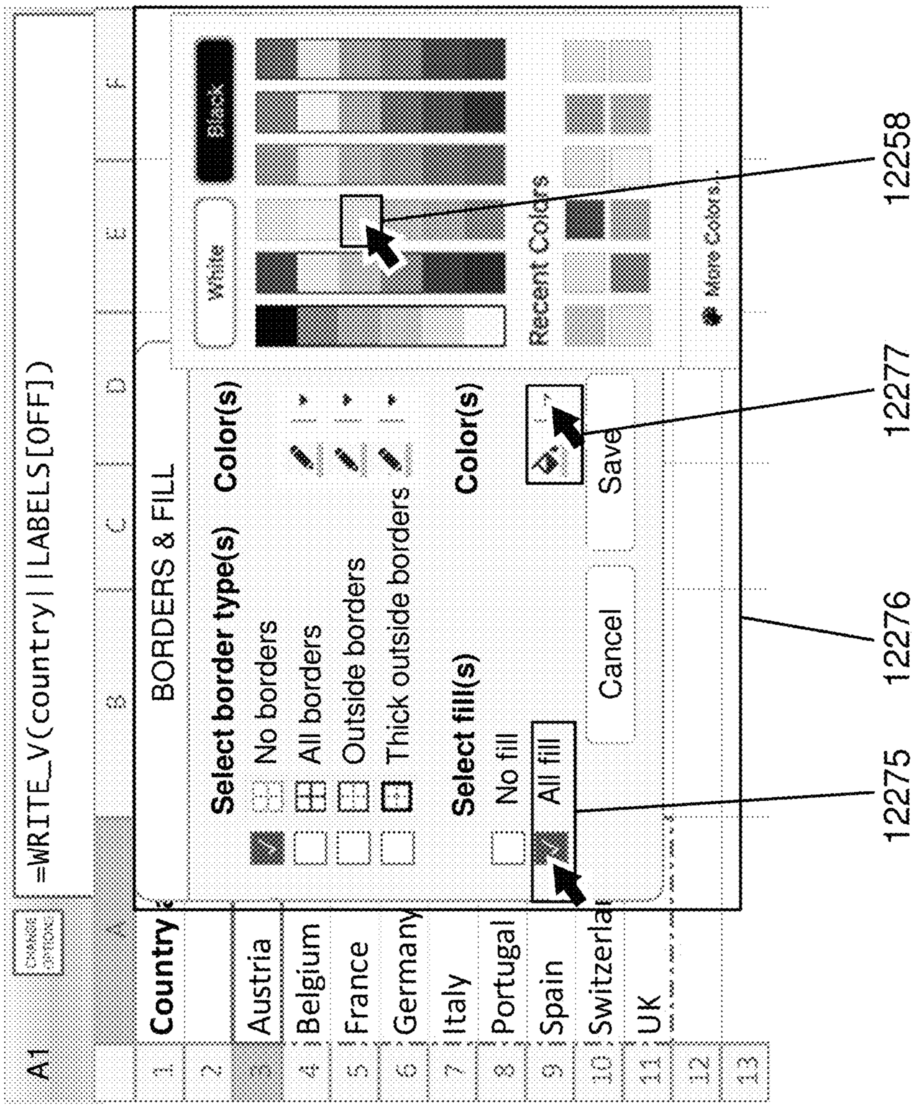
Figure 123A:
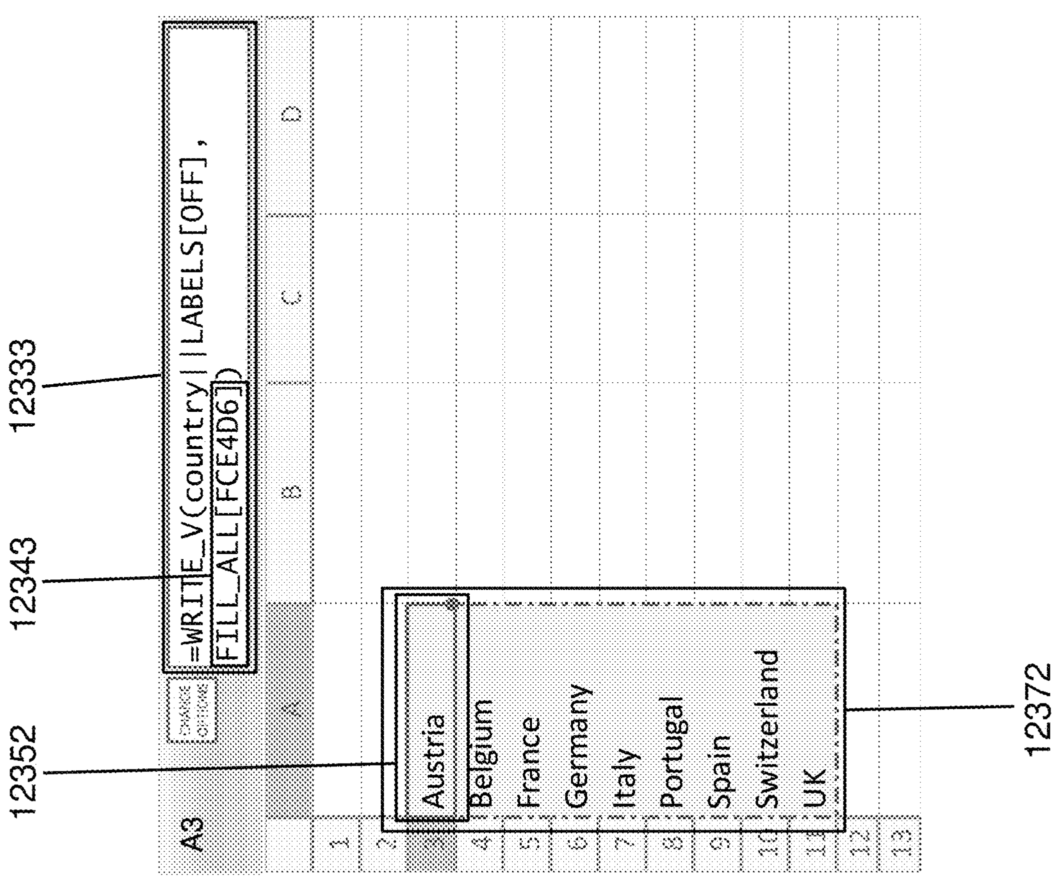
Figure 123B:
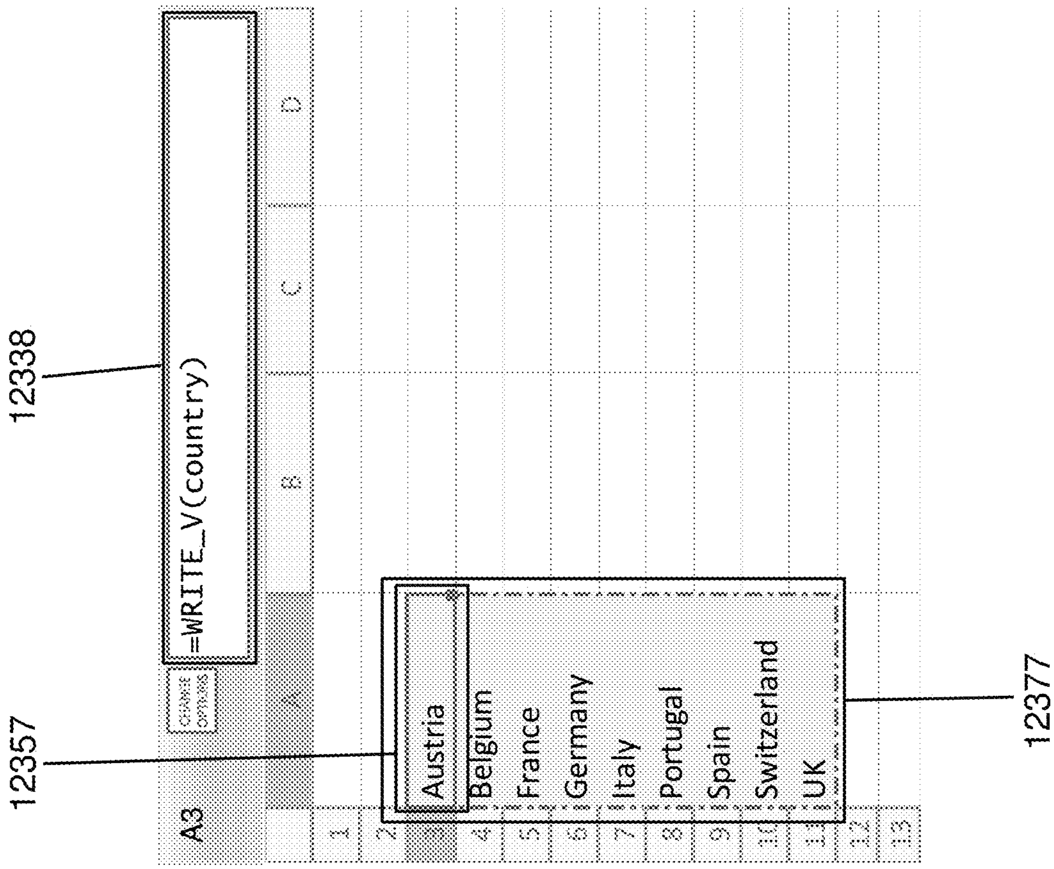

In another embodiment of our technology more than one of the function specification types 661 in FIG. 6 can be combined in the lists to create the twenty ninth list type '29, Combinations across options lists'. Examples of these selection list panels are in FIG. 121A through FIG. 121C. FIG. 121A and FIG. 121B example Reorderable specification lists as exampled by the drag and drop movement of 'Sort Order' '3' 12134 FIG. 121A to 'Sort Order' '1' 12174 FIG. 121B. However, this is in combination with 'Multiple cascading selector lists' 12124 FIG. 121A where the user has a selection alternatives 12148 to 'AVERAGE' exampled in FIG. 121C rather than being a fixed sort topic like 'code' and 'type'. If the user were to open that specification alternatives list in this embodiment they would be presented with list in FIG. 121C and the ability to replace 'AVERAGE' with one of the other alternatives. That first list then cascades to a second list with a selection of 'Low to High' currently specified. Thus, combining a FIG. 6 'Multiple cascading selector lists, Situationally variable content (code', 'type', and 'A to Z' situationally varies by formula content and data type), 19. Single specification set' with a FIG. 6 Multiple related lists, Situationally variable content (Low to High and 'AVERAGE' situationally varies by formula data type'), 13. Single specification set. Note, is this embodiment the 'Sort Direction' options across data types vary more than in just the labeling differences making them situationally different. FIG. 121D examples, as described for FIG. 33C, a FIG. 6 '29. Combinations across options' specification type. The 'Merge' 'cancer' check box 12148 is a 'Single list, Situationally variable content, 3. Single specification' which situationally shows only the field(s) which can be merged, which in this function formula is only 'cancer'. The 'Orientation' section 12168 examples a FIG. 6 'Multiple cascading selector lists, Mixed fixed and situationally variable content, 22. Multiple selection sets'.

In another embodiment of our technology the panel selector lists are triggered from a button adjacent to the formula bar formula that accepted the formula configured, as exampled in FIG. 51A 5132 and then FIG. 51A through FIG. 54B. Thus, making accessing these panel selector lists extremely convenient for the user. A related embodiment increases the ease of access with the panel selector lists triggered from a button overlayed on or adjacent to the cell that which holds the functional formula, as exampled in FIG. 42B 4266 and then FIG. 42B through FIG. 45B.

In another embodiment of our technology the panel selection list or lists (including any hints to access them) are triggered automatically from entering the function arguments by placing the cursor after the opening function parenthesis before the closing parenthesis should it exist as exampled in FIG. 8 845, FIG. 12 1245 and FIG. 15 1542.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Automatic Propagation of Spreadsheet Function Argument Change Implementations

In another embodiment of our technology the function argument input changes are automatically propagated to related arguments containing the changed input to eliminate the user needing to make the change and to avoid errors if the user were not to make the change without this capability. The problem of not having this capability and neglecting to make the related change is exampled in FIG. 55A and FIG. 55B. The advantage of having this capability having our technology make the related changes is exampled in FIG. 56A and FIG. 56B. That example is with invisible arguments however our technology supports the auto propagation in functions with visible arguments as well. That example automatically removes the invisible 'BLANK_AS_DASH [contact]' argument group 5543 in FIG. 55A when the user removes the argument 'contact' 5533. Had the 'BLANK_AS_DASH[contact]' been visible the user would have seen it automatically disappear from the 'WRITE_V' spreadsheet function formula. In the example in FIG. 56B where the argument is invisible the user would have seen that the 'BLANK_AS_DASH' option in the selection list panel for the 'WRITE_V' spreadsheet function would not be 'ON' and therefore not being used. In the same way the user would see that the field 'country' 7634 would no longer show up in the custom format for the column labels (all CAPS and underline) in FIG. 76B. However in this example it would be the equivalent of removing 'country' from that argument group not removing the entire argument group in the formula text if the embodiment has that argument visible or in the selection list panel if the argument is invisible.

Invisible Arguments Implementations

Our technology can dramatically simplify functional formulas and flex copy paste formulas through the replacement of visible formula arguments with invisible arguments not displayed to the users in the functional formula but instead displayed to users by UIs. It is a method of reducing spreadsheet function complexity by making some or all of the user specified formula arguments invisible.

Our technology represents an alternative to presenting some or all built-in (predefined) spreadsheet function arguments as visible text with a method that replaces those visible function arguments with invisible ones and visible specifications in one or more UIs. The argument specification may be preceded by other UIs where the user specifies which argument or arguments they want to specify. Our method includes receiving a first action (signal) from a user invoking a selection list panel for a built-in (predefined) spreadsheet function in a spreadsheet cell that populates one or more than one spreadsheet cell with the function results. Where that first action (signal) displays a selection list panel that has multiple of first specifications in a list which specify arguments in the built-in function that manipulate data (e.g., alter blanks, filter data, bucketing), perform calculations (e.g., add totals, subtotals, averages) or output ordered results (e.g., sorting, limiting, labeling). Where at least one second action (signal) from the user selects at least one non-default first argument specification that would add an argument to the built-in function formula. However, in our technology when that functional formula is entered into the cell that argument is not visibly entered into the functional formula (exampled in FIG. 41B 4138) but instead visible to the user in the selection panel list as exampled in FIG. 40D 4088. As opposed to the same functional result exampled in FIG. 11B where the functional formula 1138 giving the same instantiated result (1178 in FIG. 11B is the same as 4178 in FIG. 41B) contains a visible 'COLLAPSE[OFF]' 1147 argument which is not visible in FIG. 41B.

An embodiment of our technology has both visible and invisible arguments in the functional formula. More descriptively where the built-in function has at least one argument visible in its functional formula and at least one argument not reproduced as text in the arguments of the function as exampled in FIG. 41B with the three arguments 'channel', 'country' and 'donations' visibly shown in the functional formula 4138 but the 'COLLAPSE[OFF]' argument displayed in the selector list panel in FIG. 40D specification 4088 not shown as visible text in its functional formula 4138 in FIG. 41B.

In another embodiment of our technology the invisible function arguments can be applied to our new function-controlled formatting arguments as exampled in the function formula 6933 in FIG. 69A delivering the same function-controlled formatting outcome (6948) as FIG. 69B (6988) but without the visible formatting argument 6957 in FIG. 69B. Where our method is such that the one or more of the specifications in the list are for formatting that configure all or segments of the output produced by the built-in function. Formatting one or more cells overriding any cell formatting applied to those cell(s). Where those configured specifications are visible in the selection list panel but not reproduced as visible text argument(s) in the functional formula. FIG. 62A examples a prebuilt function with some of the different segments. e.g., headings, labels and body, applicable to this function-controlled formatting situation. Additionally, the user may be given only one segment option for a situation or a function as is the standard situation functions that only have one segment or for the flex copy paste format control we discuss next. Within the formula segment our technology can format all of the cells or only a specific cell or cell range segment. Where flex copy paste only has the later segment as it has no different formula segments.

In another embodiment our flex copy paste technology employs our invisible arguments as exampled in FIG. 87A through FIG. 97B excluding FIG. 93B (which examples the visible argument equivalent formula). Our flex copy paste technology requires at least one formulaic data field (for the data end versions) or one formulaic data field referencing row or column header cells containing one of our multi-cell populating functions (e.g., WRITE_H or WRITE_V). This combines with our new technology where the flex copy paste controls the content of the cells it populates. That formulaic data field could be by itself, in a functional formula, in an algebraic formula, in a combination algebraic and functional formula or as exampled in in FIG. 87A through FIG. 97B excluding FIG. 93B in all of the preceding with multiple functions, multiple formulaic data fields and algebraic operators. These copy paste controlled specifications can be for formatting as exampled in FIG. 87A through FIG. 103A or other capabilities, e.g., 'ALL' display of duplicates.

In embodiments of our technology the flex copy paste controlled formatted cell area is either the entire instantiated cell range, as exampled in FIG. 97A 9753, or the user selected cell or cell range, as exampled FIG. 97B 9794.

In another embodiment of our technology the list or lists display configuration status descriptions, e.g., ON, OFF and DEFAULT, information for invisible arguments as exampled in FIG. 46 4676 and FIG. 91A 9135.

In another embodiment of our technology the selection list panel includes a single list with one or multiple specifications as exampled in FIG. 116A through FIG. 116D that instantiate invisible arguments in the functional formula. Arguments specifications that are visible in the selection list panel but not populated as text inf the function formula in the spreadsheet cell. These arguments can manipulate data (e.g., alter blanks, filter data, bucketing), perform calculations (e.g., add totals, subtotals, averages), output ordered results (e.g., sorting, limiting, labeling) or control formatting (e.g., fonts, fills, borders).

Another embodiment of our technology includes multiple separate lists with multiple value selections that each instantiate different results from the spreadsheet function as exampled in FIG. 117B where the first specification 11773 results in the 'Total' row 'LAST' as exampled in FIG. 117C 11787 and the second specification 11783 in FIG. 117B results in the three 'subtotal' rows 11757, 11767 and 11777 FIG. 17C 'LAST' in their sections from invisible arguments exampled in the formula 11728 in FIG. 117D (in contrast to the visible text arguments 11748 in FIG. 117C).

Another embodiment of our technology includes multiple related lists including a first list of selection (specification) topics each of which is accompanied by a second list of specification alternatives applicable to their respective specification topic in the first list as exampled by FIG. 118A and FIG. 118B. FIG. 118A examples the two lists, the topic list 'Field' 11862 and the specification alternative list 'Selection' 11863. FIG. 118B examples the alternative list 11878 for the second topic 'donors' 11868 and in this example the user making a second specification. These lists can have fixed content, situationally variable content or a mixture of both as laid out in FIG. 6 'Number specifications' eleven through sixteen and exampled in more detail with invisible functional arguments in FIG. 51A through FIG. 54B.

Another embodiment of our technology includes multiple cascading selector lists where the user is presented specification alternatives in the first list, not just topics but alternatives requiring a specification to then proceed to the second list. With a specification each first list alternative cascades to second list specification alternatives applicable to that specification as exampled in FIG. 119A through FIG. 119C. We summarize these selector panel list options in FIG. 6 number specifications seventeen through twenty-two as specification sets because they require a specification from both lists, realizing in some situations that second specification could be accepting the default selection for the second list alternative. More detailed examples with invisible arguments are in FIG. 37B and its supporting user specifications in FIG. 32A through FIG. 34C.

Another embodiment of our technology includes a selection panel list where the content of the lists can be reordered by movement (e.g., drag & drop) or by selection as exampled in FIG. 23 through FIG. 26C with our invisible argument technology. Where the functional formula result 2678 in FIG. 26B is instantiated by the formula 2627 in FIG. 26C with all the option arguments invisible. In one embodiment the first list can be ordered by a drag and drop operation as exampled in FIG. 120A 12032 and FIG. 120B 12082 reordering the first and second list content 12084 in FIG. 120B (vs. 12034 in FIG. 120A). The second list specification alternatives are then applicable to their respective first list topic as exampled in FIG. 120C 12098. In another embodiment the first list can be ordered by a reordering UI selection as exampled in FIG. 24C, FIG. 24D, FIG. 25C, and FIG. 25D. FIG. 6 'Number specifications' twenty-three through twenty-eight summarize different embodiments of our 'Reorderable selection lists'. Where our invisible argument technology support any of these reorderable selection panel lists.

In another embodiment of our technology the panel selector lists are triggered from a button adjacent to the formula bar formula that accepted the formula configured as exampled in FIG. 51A 5132 and then FIG. 51A through FIG. 54B. Thus, making accessing these panel selector list extremely convenient for the user when the functions have invisible arguments. A related embodiment increases the ease of access with the panel selector lists triggered from a button overlayed on or adjacent to the cell which holds the functional formula employing the invisible arguments, as exampled in FIG. 42B 4266 and then FIG. 42B through FIG. 45B.

In another embodiment of our technology the panel selection list or lists are triggered automatically from entering the function arguments by placing the cursor after the opening function parenthesis before the closing parenthesis should it exist as exampled in FIG. 38D and FIG. 39 through FIG. 41B.

In another embodiment of our technology input changes are automatically propagated to related invisible arguments containing the changed input to eliminate the user needing to make the change and to avoid errors if the user were not to make the change as exampled in in FIG. 56A and FIG. 56B, FIG. 76A and FIG. 76B and FIG. 98A and FIG. 98B.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Function Control of Formatting Implementations

Our technology brings a whole new capability set to functions adding the ability of the function, not the cell, to control the formatting of the cells it populates. It is a method for a spreadsheet function to control the formatting of spreadsheets cells into which a table of data and formulas is delivered as exampled in FIG. 31A through FIG. 36B and FIG. 59A through FIG. 86B.

Our technology is a method applying formatting as a new argument or arguments of a built-in (predefined) spreadsheet function. Where the user either directly or through another UI provides a first action (single) invoking a selection list panel for a built-in spreadsheet function that populates one or more spreadsheet cells. That selection panel list displays a list of specifications appropriate to the context of the function and the first signal that is useable with the built-in function. Where more than one of the specifications in the selector list panel (including additional lists that open from the selector list panel) are formatting specifications that configure the output of the function (e.g., one or more cells) overriding any cell formatting applied to those output cells. Where the user then makes one or more specifications from the selector list panel configuring the built-in spreadsheet function either immediately or when the spreadsheet function formula is committed to the cell. Where the function specified formatting automatically flexes it propagation of the formats with the changes in the instantiation of the function formula as exampled in FIG. 63A through FIG. 65B and FIG. 76A through FIG. 77B for those functions that can change their output range. Our technology works such that when the cells populated by the built-in spreadsheet functions further expands the formatted range, that expanded range further oven-ides the cell formatting otherwise applied to the new cells in the spreadsheet range as exampled in FIG. 63B changing to become FIG. 63A. Whereas when cells populated by the built-in spreadsheet functions contracts the formatted range, the built-in function formatted cells no longer occupied by the function revert to the cell formatting otherwise applied to those cells or no formatting as exampled in FIG. 63A changing to become FIG. 63B.

In another embodiment of our technology the formatting is regular cell formatting, as opposed to conditional formatting. Formatting controlled by the function, such as borders, fill and cell merge exampled in FIG. 36A and FIG. 36B and font color, italics exampled in FIG. 72A through FIG. 73B. Our technology supports the function control of the broader set of formatting including all the typical spreadsheet font (4812 in FIG. 48), alignment (4813 in FIG. 48), and number (4814 in FIG. 48) capabilities, as well as more specialized formatting capabilities like cell styles (4815 in FIG. 48).

In another embodiment of our technology the formatting is conditional cell formatting as exampled in FIG. 81A through FIG. 86B. Formatting such as font color, cell fill or bolding, automatically applied when the value populated into the cell by the functions meets specific criteria. However, function applied and controlled rather than cell applied and controlled.

In another embodiment of our technology the formatting arguments are visibly populated in the built-in function formula as text arguments as exampled in FIG. 36A and FIG. 36B and in FIG. 69B. Those formatting arguments may be populated by specification in selection list panel, as exampled in FIG. 32A through FIG. 34C. FIG. 59B, FIG.

66A, and FIG. 72A. Or a user could type the arguments directly into the prebuilt function formula.

In another embodiment of our technology at least some of the formatting specifications are visible in the selection list panel but are not visibly populated in the function formula as exampled in FIG. 70B (vs. FIG. 69B having visible arguments for the same result) and FIG. 64A and FIG. 64B (vs. FIG. 63A and FIG. 63B having visible arguments for the same result).

In another embodiment of our technology the selection list panel displays configuration status descriptions, e.g., ON, OFF and DEFAULT, aligned with at least some of the respective specifications in the list of specifications as exampled in FIG. 34E 3489 and FIG. 35 3565.

Function Control of Formatting Implementations—Different Selection List Panels

In another embodiment of our technology the selection list panel includes a single list with one or multiple specifications, as exampled in FIG. 116B, that instantiates visible or invisible arguments in the functional formula controlling the formats. Selection panel lists summarized in FIG. 116B number specifications one through four.

Figure 124B:
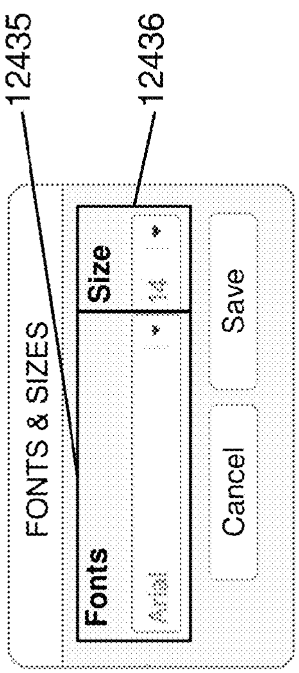
Figure 124C:
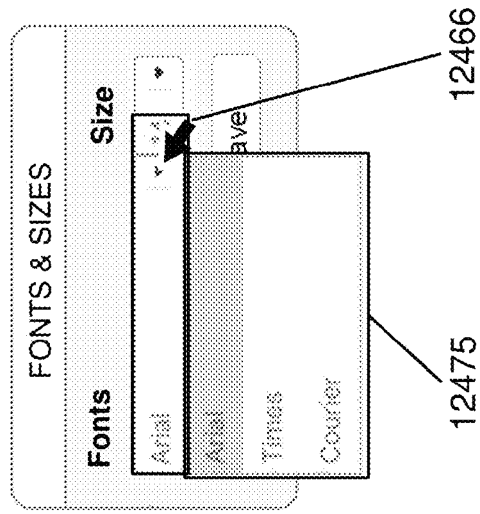
Figure 124D:
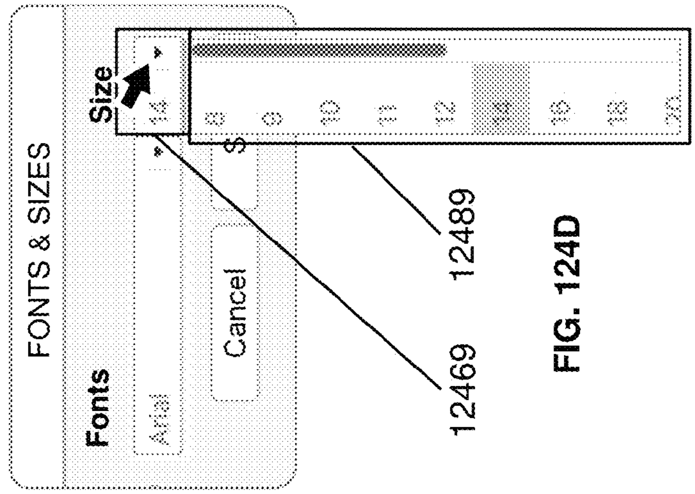
Figure 124A:
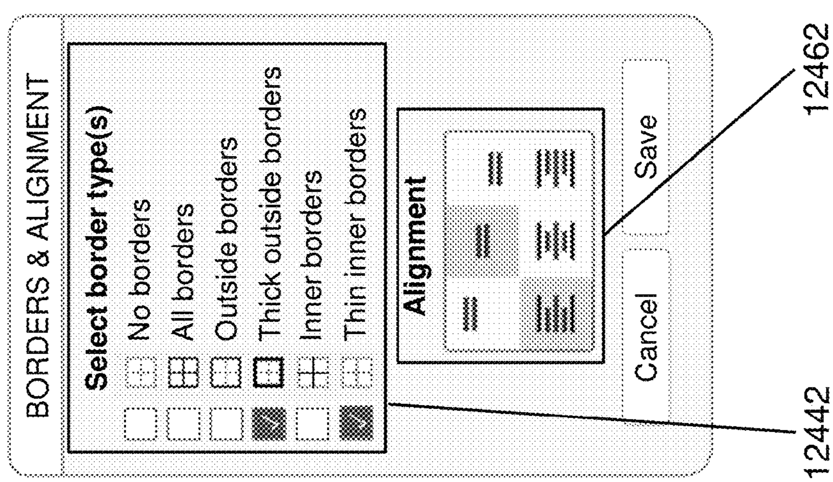

Another embodiment of our technology includes multiple separate lists with single or multiple value selections as exampled in FIG. 124A. Where each specification instantiates different results from the spreadsheet function as exampled by each of the border types in the 'Select border type(s)' 12442 and each of alignments in the 'Alignment' specification list 12462. The user can select one or more specifications from one or both of the lists for the function-controlled formats as outlined in the options numbered five through ten in FIG. 6.

Another embodiment of our technology includes multiple related lists including a first list of selection (specification) topics each of which is accompanied by a second list of specification alternatives applicable to their respective specification topic in the first list as exampled by FIG. 124B through FIG. 124D. FIG. 124B examples the two lists, the 'Fonts' list 12435 and the 'Size' list 12436. FIG. 124C examples the alternative list 12475 for the 'Fonts' list in this example accessed through a dropdown 12466. FIG. 124D examples the alternative list 12489 for the 'Size' list also accessed in this embodiment through a dropdown button 12469. These two lists have fixed content although our technology also supports situationally variable content or a mixture of both as laid out in FIG. 6 'Number specifications' eleven through sixteen for the specification of function-controlled formatting.

Another embodiment of our technology includes multiple cascading selector lists where the user is presented specification alternatives in the first list, not just topics but alternatives requiring a specification to then proceed to the second list. With a specification each first list alternative cascades to second list specification alternatives applicable to that specification as exampled in FIG. 119A and FIG. 119B and by more detailed examples in FIG. 31A through FIG. 37B. Our technology supports function-controlled formatting via cascading selector lists for 'Number specifications' options seventeen through twenty-two in FIG. 6.

Function Control of Formatting Implementations—Selector Panel List Access

In another embodiment of our technology the formatting parameter(s) are selected from one or more lists as exampled in FIG. 31A through FIG. 36B. Where those lists can be any of the list types listed in FIG. 6. In a related embodiment of our technology the list or lists for the function-controlled formatting is triggered from a button overlayed on or adjacent to the cell or adjacent to the formula bar formula as exampled in FIG. 65A 6521 and FIG. 65B 6526. In another related embodiment the list or lists is triggered automatically from entering the function arguments by placing the cursor after the opening function parenthesis before the closing parenthesis should it exist as exampled in FIG. 31A 3136 through FIG. 36B and FIG. 81A 8136 through FIG. 84B.

Function Control of Formatting Implementations—Conversion of Normal Cell Formatting UI Specifications In another embodiment of our technology the formatting parameter(s) are selected by normal cell formatting UIs and then converted from cell control to function control as exampled in FIG. 59A through FIG. 62B. At that point the built-in spreadsheet function controls the formatting of specified segment or segments of the output of the function overriding any cell formatting otherwise applied to those cells. In a related embodiment where the conversion is done through a list specification or multiple list specifications of the function output specified cell(s), segment or segments as exampled by FIG. 60B 6046 accessed by right click menu FIG. 60A 6044, button FIG. 65B 6526 or other UI.

In another embodiment of our technology the formatting parameter(s) are selected by normal cell formatting UIs and then automatically converted from cell control to function control by the function that instantiates that cell or cells as exampled in FIG. 66A through FIG. 75. Automatically responding to function formula changes as exampled in in FIG. 76A through FIG. 77B. Working for function formulas with visible (FIG. 77A and FIG. 77B) and invisible (FIG. 76A and FIG. 76B) formatting arguments. A related embodiment where the auto conversion from cell-controlled formats to function-controlled formats automatically applies to the entire function segment area including the cell or cells as exampled in FIG. 66A and FIG. 66B. Where a segment can be an argument, an argument group or some other part (e.g., heading labels 3677 and FIG. 36B) of the function output (instantiated cells). A further related embodiment where the automatic application to the entire function argument area can be reverted to the selected cell or cells by a user action (e.g., ribbon button, right click menu selection or shortcut such as 'UNDO' as exampled in FIG. 67A (relative to FIG. 66B). An additional capability would be to revert back to its non-formatted state (default cell state) or prior cell formatted state by an additional 'UNDO' actions or similar control setting actions as exampled in FIG. 67B (relative to FIG. 67A).

Function Control of Formatting Implementations—Conversion of Normal Cell Formatting UI Specifications to Function Arguments In another embodiment of our technology the formatting parameter(s) are selected by normal cell formatting UIs applied to an argument or arguments in the function formula which are then controlled and applied by the function as exampled in FIG. 78A through FIG. 80B. Where the built-in function propagates the formatting from the functional argument text to the output cells populated by that argument. Those output cells having function-controlled formatting when instantiated by the function.

Function Control of Formatting Implementations—Automatic Propagation of Changes

In another embodiment of our technology the function argument input changes are automatically propagated to related cell formatting arguments containing the changed input to eliminate the user needing to make the change and to avoid errors if the user were not to make the change without this capability as exampled in FIG. 77A and FIG.

77B for visible arguments and exampled in FIG. 76A and FIG. 76B for invisible arguments.

Function Control of Formatting Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Flex Copy-Paste Control of Formatting Implementations

Our technology brings a whole new capability set to our flex copy-paste technology adding the ability of the flex copy-paste, not the cell, to control the formatting of the cells the flex copy paste populates. It is a method for a spreadsheet flex copy-paste to control the formatting of spreadsheets cells into which a table of data and formulas is delivered as exampled in FIG. 126A through FIG. 138C, FIG. 87A through FIG. 103B.

Our technology is a method applying formatting as an argument of a flex copy pasted formula. Where the user either directly or through another UI provides a first action (single) invoking a selection list panel for a spreadsheet flex copy paste that populates one or more spreadsheet cells. That selection panel list displays a list of specifications usable for a spreadsheet flex copy paste. Where more than one of the specifications in the selector list panel (including additional lists that open from the selector list panel) are formatting specifications (e.g., fill, borders, font, value type) that configure the output of the function (e.g., one or more cells) overriding any cell formatting applied to those output cells. Where the user then makes one or more specifications from the selector list panel configuring the flex copy paste results either immediately or when the spreadsheet flex copy paste is executed. Where the flex copy paste specified formatting automatically flexes it propagation of the formats with the changes in its instantiation as exampled in FIG. 87A and FIG. 87B, FIG. 98A and FIG. 98B, FIG. 128A through FIG. 128C, and FIG. 133A through FIG. 133C. Our technology works such that when the cells populated by the flex copy-paste further expands the formatted range, that expanded range further overrides the cell formatting otherwise applied to the new cells in the spreadsheet range as exampled in FIG. 133A or FIG. 133B changing to become FIG. 133C or in FIG. 136A or FIG. 136B changing to become FIG. 136C. Whereas when cells populated by the flex copy-paste contracts the formatted range, the flex copy-paste formatted cells no longer occupied by the function revert to the cell formatting otherwise applied to those cells or no formatting as exampled in FIG. 133B changing to become FIG. 133A or FIG. 133C or in FIG. 136B changing to become FIG. 136A or FIG. 136C.

In another embodiment of our technology the formatting is regular cell formatting, as opposed to conditional formatting. Formatting such as 'BORDERS', 'FILL', 'FONT', 'LOOK' ('Bold, Italics, Underline, . . . ') and 'NUMBER' as exampled in FIG. 91B 9183, FIG. 126C through FIG. 130B. Our flex copy-paste formatting technology supports the function control of the broader set of formatting including all the typical spreadsheet font (4812 in FIG. 48), alignment (4813 in FIG. 48), and number (4814 in FIG. 48) capabilities, as well as more specialized formatting capabilities like cell styles (4815 in FIG. 48).

In another embodiment of our technology the formatting is conditional cell formatting as exampled in FIG. 99A through FIG. 103B. Formatting such as font color, cell fill or bolding, automatically applied when the value populated into the cell by the flex copy paste meets specific criteria. However, flex copy paste applied and controlled rather than cell applied and controlled.

In another embodiment of our technology the automatically populated formatting arguments are visibly populated in the flex copy pasted formula(s) as text arguments as exampled in FIG. 93B 9356.

In another embodiment of our technology at least some of the formatting specifications are visible in the selection list panel but are not visibly populated in the flex copy pasted formula(s) as exampled in FIG. 93A 9324 and FIG. 100B 10064.

In another embodiment of our technology the selection list panel displays configuration status descriptions, e.g., ON, OFF and DEFAULT, aligned with at least some of the respective specifications in the list of specifications as exampled in FIG. 127A, FIG. 127D and FIG. 91A 9135.

Flex Copy-Paste Control of Formatting Implementations—Different Selection List Panels In another embodiment of our technology the selection list panel includes a single list with one or multiple specifications, as exampled in FIG. 116B, that instantiates visible or invisible arguments in flex copy paste formula controlling the formats. Selection panel lists summarized in FIG. 6 number specifications one through four.

Another embodiment of our technology includes multiple separate lists with single or multiple value selections as exampled in FIG. 124A. Where each specification instantiates different results from the spreadsheet flex copy-paste as exampled by each of the border types in the 'Select border type(s)' 12442 and each of alignments in the 'Alignment' specification list 12462. The user can select one or more specifications from one or both of the lists for the flex copy-paste controlled formats as outlined in the options numbered five through ten in FIG. 6.

Another embodiment of our technology includes multiple related lists including a first list of selection (specification) topics each of which is accompanied by a second list of specification alternatives applicable to their respective specification topic in the first list as exampled by FIG. 124B through FIG. 124D. FIG. 124B examples the two lists, the 'Fonts' list 12435 and the 'Size' list 12436. FIG. 124C examples the alternative list 12475 for the 'Fonts' list in this example accessed through a dropdown 12466. FIG. 124D examples the alternative list 12489 for the 'Size' list also accessed through a dropdown arrow button 12469. These two lists have fixed content although our technology also supports situationally variable content or a mixture of both as laid out in FIG. 6 'Number specifications' eleven through sixteen for the specification of function-controlled formatting.

Another embodiment of our technology includes multiple cascading selector lists where the user is presented specification alternatives in the first list, not just topics but alternatives requiring a specification to then proceed to the second list. With a specification each first list alternative cascades to second list specification alternatives applicable to that specification as exampled in FIG. 119A through FIG. 119C and by more detailed examples in FIG. 127B and FIG. 127C. Our technology supports flex copy paste controlled formatting for 'Number specifications' options seventeen through twenty-two in FIG. 6.

Flex Copy-Paste Control of Formatting Implementations—Selector Panel List Access In another embodiment of our technology the formatting parameter(s) are selected from one or more lists as exampled in FIG. 126C through FIG. 128A, FIG. 91A through FIG. 93D and FIG. 99A through FIG. 100B. Where those lists can be any of the list types listed in FIG. 6. In a related embodiment of our technology the list or lists for the function-controlled formatting is triggered from a button overlayed on or adjacent to the cell or adjacent to the formula bar formula as exampled in FIG. 91A 9122 and FIG. 126C 12637. In another related embodiment the list or lists is triggered automatically from entering the function arguments by placing the cursor after the opening function parenthesis before the closing parenthesis should it exist as previously exampled for functions but applicable to flex copy paste in a manner similar to FIG. 31A 3136 through FIG. 36B and FIG. 81A 8136 through FIG. 84B (where the user is clicking into a flex copy pasted formula).

Flex Copy-Paste Control of Formatting Implementations—Conversion of Normal Cell Formatting UI Specifications In another embodiment of our technology the formatting parameter(s) are selected by normal cell formatting UIs and then converted from cell control to flex copy-paste control as exampled in FIG. 129A through FIG. 130B and FIG. 111A through FIG. 112B. At that point the spreadsheet flex copy-paste controls the formatting of a specified range or the entire flex copy paste populated area overriding any cell formatting otherwise applied to those cells. In a related embodiment where the conversion is done through a list specification or multiple list specifications of the flex copy-paste output specified cell(s), as exampled in FIG. 111A through FIG. 112B.

In another embodiment of our technology the formatting parameter(s) are selected by normal cell formatting UIs and then automatically converted from cell control to flex copy-paste control by the function that instantiates that cell or cells as exampled in FIG. 129A through FIG. 130B and FIG. 94A and FIG. 94B. Automatically responding to flex copy paste formula changes as exampled in FIG. 98A and FIG. 98B. Working for flex copy pasted formulas with visible (FIG. 93B) and invisible (FIG. 93A) formatting arguments. A related embodiment where the auto conversion from cell-controlled formats to flex copy paste controlled formats automatically applies to the entire flex copy paste area as exampled in FIG. 94A and FIG. 94B. A further related embodiment where the automatic application to the entire flex copy paste area can be reverted to the selected cell or cells by a user action (e.g., ribbon button, right click menu selection or shortcut such as 'UNDO') as exampled in FIG. 95A (relative to FIG. 94B). An additional capability would be to revert back to its non-formatted state by an additional 'UNDO' or similar control setting actions as exampled in FIG. 95B (relative to FIG. 95A). A different embodiment of our technology would add an additional 'UNDO' where it reverts to cell control before doing the undo to the unformatted or prior formatting state. These capabilities can then be replicated for changes to an already flex paste formatted area as exampled in FIG. 96A through FIG. 97B. That is setting more than one fill within the flex copy paste instantiated area.

Flex Copy-Paste Control of Formatting Implementations—Automatic Propagation of Changes In another embodiment of our technology flex copy paste input changes are automatically propagated to related cell formatting arguments containing the changed input to eliminate the user needing to make the change and to avoid errors if the user were not to make the change without this capability as exampled in FIG. 98A and FIG. 98B. This is particular helpful because in this example the resulting formula, whether visible or invisible, is changed by an input to the formula not actual user direct changes to the formula, i.e., the green fill disappearing with the input change.

Flex Copy-Paste Control of Formatting Implementations—Other Implementations

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Function Controlled Formatting Via Formula Argument Formatting Implementations

Our technology supports an additional approach of applying function controls of formatting, using formatting of the cell formula arguments as exampled in FIG. 78A through FIG. 80B and FIG. 109A through FIG. 110C. Formatting is applied to an argument or an argument group in the functional formula at which point the function takes over control of the formatting for the cells populated by that argument or argument group and replicates in those cells the formatting applied to the function formula argument or argument group as exampled by 7838 and 7886/7876 in FIG. 78B. The control of the cell formatting then expands and contracts as has been previously exampled for our functionally controlled formatting. In expansion the functionally controlled formatted cells override previous cell-controlled formats and in contraction the functionally formatted cells no longer populated by the function revert to their previous cell-controlled formatting or no formatting at all.

In an embodiment of our technology the cell-controlled formatting is applied by the typical spreadsheet UI to the formula argument or argument group and then automatically converted to function control as exampled in FIG. 78A and FIG. 109A.

In another embodiment of our technology the second input accepts function-controlled formatting as exampled in FIG. 109A through FIG. 110C.

Two Separate Function Inputs Implementations

Our technology creates situations where the formula in a cell does more than populate that cell and where changing the value displayed in the cell is easier done by a second input. It is a method of reducing the complexity of function formula/value specification in a spreadsheet cell where a second formula value input appears controlled by a spreadsheet function. Where that second input location is proximate to the in-cell formula and/or proximate to the formula bar formula. Where that second input can be automatically populated by the function and accepts user inputs and edits for cell population and formula input as exampled in FIG. 104B through FIG. 107C.

In another embodiment of our technology the second input supports invisible arguments as exampled in the formula 10578 in FIG. 105C unchanged versus 10534 in FIG. 105A despite the second input change of 'State Abr:' 10577 in FIG. 105C from 'State:' 10523 in FIG. 105A recording in the cell 'A4' 10586 in FIG. 105C.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

All Implementations

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope the claims that follow our clauses.

Clauses

Selection List Panel Implementations

1. As an alternative to typing, cell selecting, single list selecting and pasting in arguments for a built-in spreadsheet function, a method including:
   receiving a first signal from a user invoking a selection list panel, in a context of a user-specified built-in spreadsheet function in a spreadsheet cell;
   responsive to the first signal, causing display of the selection list panel that includes a list of specifications appropriate to the context that are useable with the built-in spreadsheet function;
      wherein a plurality of first specifications in the list are argument specifications that configure the built-in spreadsheet to manipulate data, perform calculations or output ordered results, wherein the list of the first specifications is presented as one or more of:
         multiple separate lists with multiple value selections,
         multiple related lists,
         multiple cascading selector lists or
         reorderable lists; and
   receiving at least one second signal from the user selecting at least one argument specification, configuring the built-in spreadsheet function accordingly when the spreadsheet function is committed to the spreadsheet cell.
2. The method of clause 1, further including configuring the built-in spreadsheet function by inserting text of a first argument into position in the built-in spreadsheet function in the cell.
3. The method of clause 1, wherein at least some of the argument specifications are visible in the selection list panel and not reproduced as text in an arguments of the built-in spreadsheet function in the spreadsheet cell.
4. The method of clause 1, further including the selection list panel displaying configuration status descriptions aligned with at least some respective specifications in the list of specifications.
5. The method of clause 1, further wherein a plurality of second specifications in the list are formatting specifications that configure ranges of output cells produced by the built-in spreadsheet function, wherein the formatting specifications override cell formatting otherwise applied to the spreadsheet range.
6. The method of clause 1, further including in the selection list panel the multiple separate lists with the multiple value selections, wherein the multiple lists present the multiple value selections for respective ones of the argument specifications.
7. The method of clause 1, further including in the selection list panel a first list of specification topics, each of which is accompanied by a second list of specifications applicable to the specification topics in the first list.
8. The method of clause 1, further including in the selection list panel a first list of specifications, each of which is accompanied by a second cascading list, that is selectable using a control, that presents specification alternatives applicable to specifications in the first list.
9. The method of clause 1, further including in the selection list panel a first list of specification topics that can be ordered by a drag & drop operation, each of which is accompanied by a second list of specifications applicable to the specification topics in the first list.
10. The method of clause 1, further including in the selection list panel a combination of two of the single lists, multiple separate lists with multiple value selections, multiple related lists, multiple cascading selector lists, or reorderable lists.
11. The method of clause 1, wherein a user selectable selection list panel button is positioned adjacent to a formula bar of the spreadsheet, further including generating the signal responsive to the user interacting with the selection list panel button.
12. The method of clause 1, wherein a user selectable selection list panel button becomes visible when the spreadsheet cell that holds the built-in spreadsheet function is selected, further including generating the signal responsive to the user interacting with the selection list panel button.
13. The method of clause 1, wherein a user selectable selection list panel button becomes visible when a cursor is moved to an argument list of the built-in spreadsheet function.
14. The method of clause 1, wherein function argument input changes are automatically propagated to related arguments with the changed input.
15. A non-transitory computer readable memory, the memory impressed with computer instructions that, when executed on hardware, cause the hardware to carry out the method of any of clauses 1-14.
16. A system including processing hardware coupled to memory, the memory impressed with computer instructions that, when executed, cause the hardware to carry out the method of any of clauses 1-14.

Automatic Propagation of Spreadsheet Function Argument Changes

17. An automatically propagated input change to related arguments in a spreadsheet function to eliminate user changes and avoid errors through a method including:
   a first removal of an argument of a prebuilt spreadsheet function formula;
   an automated removal of the same argument from any other arguments within the same prebuilt spreadsheet function formula
18. The method of clause 17, wherein the automatically removed argument is within a named argument group.
19. The method of clause 18, wherein the automatically removed argument removes the entire argument group.
20. The method of clause 17, wherein the removed argument was text in an argument list of the built-in spreadsheet function in the spreadsheet cell.
21. The method of clause 17, wherein the removed argument was visible in the selection list panel and not visible in an argument of the built-in spreadsheet function in the spreadsheet cell.

Invisible Arguments Implementations

22. As an alternative to representing arguments of at least one built-in spreadsheet function as text in a cell of a spreadsheet, a method including:
   receiving a first signal from a user invoking a selection list panel, in a context of a user-specified built-in spreadsheet function in a spreadsheet cell that populates a plurality of cells in a spreadsheet range with function results;
   responsive to the first signal, causing display of the selection list panel that includes a plurality of first specifications in a list which are argument specifications that configure the built-in spreadsheet function to manipulate data, perform calculations or output ordered results; and receiving at least one second signal from the user selecting at least one non-default first argument specification, configuring a first argument of the built-in spreadsheet function accordingly, and committing the configured built-in spreadsheet function to the spreadsheet cell;

wherein the non-default first argument specification of the first argument is visible in the selection list panel and not reproduced as text in an argument of the built-in spreadsheet function in the spreadsheet cell.

23. The method of clause 22, wherein the built-in spreadsheet function has second arguments reproduced as text in the arguments, in addition to the first argument that is not reproduced as text.

24. The method of clause 22, further wherein a plurality of second specifications in the list are formatting specifications that configure segments of output produced by the built-in spreadsheet function and populating a plurality of cells in the segments of a spreadsheet range, wherein the formatting specifications override cell formatting otherwise applied to the spreadsheet range, and configured second specifications are visible in the selection list panel and not reproduced as text in the argument list of the built-in spreadsheet function in the spreadsheet cell.

25. The method of clause 24, wherein there is only one segment

26. The method of clause 22, further wherein a plurality of second specifications in the list are formatting specifications that configure a segment of output produced by the spreadsheet flex copy paste and populating a plurality of cells in the segments of a spreadsheet range, wherein the formatting specifications override cell formatting otherwise applied to the spreadsheet range, and configured second specifications are visible in the selection list panel and not reproduced as text in the arguments of the flex copy paste cell(s).

27. The method of clause 26, wherein the segment is the entire flex copy paste instantiated cell range.

28. The method of clause 26, wherein the segment is a selected cell or cell range within the flex copy paste instantiated cell range.

29. The method of clause 26, further including the selection list panel displaying configuration status descriptions aligned with at least some respective specifications in the list of specifications.

30. The method of clause 26, further including in the selection list panel multiple separate lists with multiple value selections, wherein the multiple lists present the multiple value selections for respective ones of the argument specifications.

31. The method of clause 26, further including in the selection list panel a first list of specification topics, each of which is accompanied by a second list of specifications applicable to the specification topics in the first list.

32. The method of clause 26, further including in the selection list panel a first list of specifications, each of which is accompanied by a second cascading list, that is selectable using a control, that presents specification alternatives applicable to specifications in the first list.

33. The method of clause 26, further including in the selection list panel a first list of specification topics that can be ordered by a drag & drop operation, each of which is accompanied by a second list of specifications applicable to the specification topics in the first list.

34. The method of clause 26, wherein a user selectable selection list panel button is positioned adjacent to a formula bar of the spreadsheet, further including generating the signal responsive to the user interacting with the selection list panel button.

35. The method of clause 26, wherein a user selectable selection list panel button becomes visible when the spreadsheet cell that holds the built-in spreadsheet function is selected, further including generating the signal responsive to the user interacting with the selection list panel button.

36. The method of clause 26, wherein a user selectable selection list panel button becomes visible when a cursor is moved to an argument list of the built-in spreadsheet function.

37. The method of clause 26, wherein function argument input changes are automatically propagated to related arguments with the changed input.

38. A non-transitory computer readable memory, the memory impressed with computer instructions that, when executed on hardware, cause the hardware to carry out the method of any of clauses 26-37.

39. A system including processing hardware coupled to memory, the memory impressed with computer instructions that, when executed, cause the hardware to carry out the method of any of clauses 26-37.

Function Control of Formatting

40. As an alternative to formatting cells, when the cells are populated by a built-in spreadsheet function contained in a cell of a spreadsheet, a method applying formatting as an argument of the built-in spreadsheet function including:

receiving a first signal from a user invoking a selection list panel, in a context of a user-specified built-in spreadsheet function in a spreadsheet cell that populates a plurality of cells in a spreadsheet range with function results;

responsive to the first signal, causing display of the selection list panel that includes a list of specifications appropriate to the context that are useable with the built-in spreadsheet function, wherein a plurality of first specifications in the list are formatting specifications that configure output the built-in spreadsheet to populate a plurality of cells in a spreadsheet range and override cell formatting otherwise applied to the spreadsheet range.

receiving at least one second signal from the user selecting at least one formatting specification, configuring the built-in spreadsheet function accordingly when the spreadsheet function is committed to the spreadsheet cell.

41. The method of clause 40, wherein when the change in cells populated by the built-in spreadsheet function further expands the formatted range, that expanded range overrides the cell formatting otherwise applied to the spreadsheet range.

42. The method of clause 40, wherein when the change in cells populated by the built-in spreadsheet function contracts the formatted range, the built-in function formatted cells no longer occupied by the function revert to the cell formatting otherwise applied to those cells or no formatting.

43. The method of clause 40, wherein the user selected formatting specification is non-conditional cell formatting.

44. The method of clause 40, wherein the user selected formatting specification is conditional formatting.
45. The method of clause 40, wherein the selected formatting parameter is populated as argument text in an argument list of the built-in spreadsheet function in the spreadsheet cell.
46. The method of clause 40, wherein at least some of the formatting specifications are visible in the selection list panel and not visible in an argument of the built-in spreadsheet function in the spreadsheet cell.
47. The method of clause 40, further including the selection list panel displaying corresponding selected configuration descriptions aligned with at least some of the specifications in the list of specifications.
48. The method of clause 40, further including in the selection list panel multiple separate lists with multiple value selections, wherein the multiple lists present the multiple value selections for respective ones of the argument specifications.
49. The method of clause 40, further including in the selection list panel a first list of specification topics, each of which is accompanied by a second list of specifications applicable to the specification topics in the first list.
50. The method of clause 40, further including in the selection list panel a first list of specifications, each of which is accompanied by a second cascading list, that is selectable using a control, that presents specification alternatives applicable to specifications in the first list.
51. The method of clause 40, wherein a user selectable selection list panel button is positioned adjacent to a formula bar of the spreadsheet.
52. The method of clause 40, wherein a user selectable selection list panel button becomes visible when the spreadsheet cell that holds the built-in spreadsheet function is selected.
53. The method of clause 40, wherein a user selectable selection list panel button becomes visible when a cursor is moved to an argument list of the built-in spreadsheet function.
54. The method of clause 40, wherein the formatting specifications are selected by the normal cell formatting UIs and then converted to formatting specifications that configure the output of the built-in spreadsheet to populate a plurality of cells in a spreadsheet range and override cell formatting otherwise applied to the spreadsheet range.
55. The method of clause 54, wherein the conversion is done by manual selection of the applicable cell, cells, segment or segments of the built-in function output.
56. The method of clause 40, further including receiving a user application of cell formatting to a cell or cells within a target range of a built-in function and then automatically converting the cell formatting to configuration of the built-in spreadsheet function.
57. The method of clause 56, wherein the automatically converting extends the user application of the cell formatting throughout the target segment or segments of the built-in function.
58. The method of clause 40, wherein the automatically extension of the built-in function formatting throughout the target segment can be reverted to the built-in formatting control of the user selected cell or cells by a ribbon action or shortcut.
59. The method of clause 40, wherein the automatically converting can be reverted to the formatted cell or cells by a ribbon action or shortcut.
60. The method of clause 40, wherein function argument input changes are automatically propagated to related arguments using the changed input.
61. A non-transitory computer readable memory, the memory impressed with computer instructions that, when executed on hardware, cause the hardware to carry out the method of any of clauses 40-60.
62. A system including processing hardware coupled to memory, the memory impressed with computer instructions that, when executed, cause the hardware to carry out the method of any of clauses 40-60.

Conversion of Formatting to Function Control

63. As an alternative to formatting cells, when the cells are populated by a built-in spreadsheet function contained in a cell of a spreadsheet, a method converting formatting to an argument of the built-in spreadsheet function including:
formatting a cell or range of cells within the plurality of cells populated by a built-in spreadsheet function;
then converting control of that formatting from control of the cell or cells to the built-in spreadsheet function so that when the range of the formatted cells expands it overrides the cell formatting otherwise applied to those cells; and when the range of the formatted cells contracts the cells no longer occupied revert to the cell formatting otherwise applied to those cells.
64. The method of clause 63, wherein the formatting specifications are selected by the normal cell formatting UI or UIs.
65. The method of clause 64, wherein the conversion is done by manual selection of the applicable cell, cells, segment or segments of the built-in function output.
66. The method of clause 63, further including receiving a user application of cell formatting to a cell or cells within a target range of a built-in function and then automatically converting the cell formatting to configuration of the built-in spreadsheet function.
67. The method of clause 66, wherein the automatically converting extends the user application of the cell formatting throughout the target segment or segments of the built-in function.
68. The method of clause 63, wherein the automatically extension of the built-in function formatting throughout the target segment can be reverted to the built-in formatting control of the user selected cell or cells by a ribbon action or shortcut.
69. The method of clause 63, wherein the automatically converting can be reverted to the formatted cell or cells by a ribbon action or shortcut.
70. A non-transitory computer readable memory, the memory impressed with computer instructions that, when executed on hardware, cause the hardware to carry out the method of any of clauses 63-69.
71. A system including processing hardware coupled to memory, the memory impressed with computer instructions that, when executed, cause the hardware to carry out the method of any of clauses 63-69.

Flex Copy-Paste Formatting Control

72. As an alternative to formatting cells, when the cells are populated by a spreadsheet flex copy-paste, a method applying formatting as an argument of the spreadsheet flex copy-paste including:
receiving a first signal from a user invoking a selection list panel, in a context of a user-specified spreadsheet copy paste that populates a plurality of cells in a spreadsheet range with copy-paste results;

responsive to the first signal, causing display of the selection list panel that includes a list of specifications appropriate to the context that are useable with the spreadsheet flex copy-paste, wherein a plurality of first specifications in the list are formatting specifications that configure the output of a plurality of cells in a spreadsheet flex copy-paste range and override cell formatting otherwise applied to the spreadsheet range.

receiving at least one second signal from the user selecting at least one formatting specification, configuring the spreadsheet flex copy paste accordingly when the spreadsheet flex copy-paste is committed to the spreadsheet cells.

73. The method of clause 72, wherein when the change in cells populated by the flex copy-paste expands the formatted range, that expanded range overrides the cell formatting otherwise applied to the spreadsheet range.

74. The method of clause 72, wherein when the change in cells populated by the flex copy-paste contracts the formatted range, the flex copy-paste formatted cells no longer occupied by the flex copy-paste revert to the cell formatting otherwise applied to those cells or no formatting.

75. The method of clause 72, wherein the user selected formatting specification is non-conditional cell formatting.

76. The method of clause 72, wherein the user selected formatting specification is conditional formatting.

77. The method of clause 72, wherein the selected formatting parameter is populated as argument text in an argument list of the built-in spreadsheet function in the spreadsheet cell.

78. The method of clause 72, wherein at least some of the formatting specifications are visible in the selection list panel and not visible in an argument of the built-in spreadsheet function in the spreadsheet cell.

79. The method of clause 72, further including the selection list panel displaying corresponding selected configuration descriptions aligned with at least some of the specifications in the list of specifications.

80. The method of clause 72, further including in the selection list panel multiple separate lists with multiple value selections, wherein the multiple lists present the multiple value selections for respective ones of the argument specifications.

81. The method of clause 72, further including in the selection list panel a first list of specification topics, each of which is accompanied by a second list of specifications applicable to the specification topics in the first list.

82. The method of clause 72, further including in the selection list panel a first list of specifications, each of which is accompanied by a second cascading list, that is selectable using a control, that presents specification alternatives applicable to specifications in the first list 83. The method of clause 72, wherein a user selectable selection list panel button is positioned adjacent to a formula bar of the spreadsheet.

84. The method of clause 72, wherein a user selectable selection list panel button becomes visible when the spreadsheet cell that holds the built-in spreadsheet function is selected.

85. The method of clause 72, wherein a user selectable selection list panel button becomes visible when a cursor is moved to an argument list of the built-in spreadsheet function.

86. The method of clause 72, wherein the formatting parameter(s) are selected by the normal cell formatting UIs and then applied to the flex-copy of the cell and the target range of the flex-copy.

87. The method of clause 86, wherein the conversion from normal cell formatting to flex copy-paste controlled formatting is done by manual selection.

88. The method of clause 72, further including receiving a user application of cell formatting to cells within the target range of the flex-copy and then automatically converting the cell formatting to configuration of the built-in spreadsheet function.

89. The method of clause 88, wherein the automatically converting extends the user application of the cell formatting throughout the target range of the flex-copy.

90. The method of clause 88, wherein the automatically extension of the built-in function formatting throughout the entire flex copy-paste range can be reverted to the flex copy-paste control of the user selected cell or cells by a ribbon action or shortcut.

91. The method of clause 88, wherein the automatic application to the entire function argument area can be reverted to the formatted cell or cells by a ribbon action or shortcut.

92. The method of clause 72, wherein copy paste formula and format argument input changes are automatically propagated to related arguments using the changed input.

93. A non-transitory computer readable memory, the memory impressed with computer instructions that, when executed on hardware, cause the hardware to carry out the method of any of clauses 72-92.

94. A system including processing hardware coupled to memory, the memory impressed with computer instructions that, when executed, cause the hardware to carry out the method of any of clauses 72-92.

Conversion of Formatting to Function Control

95. As an alternative to formatting cells, when the cells are populated by a built-in flex copy-paste, a method converting formatting to an argument of the flex copy-paste including:

formatting a cell or range of cells within the plurality of cells populated by a flex copy-paste;

then converting control of that formatting from control of the cell or cells to the flex copy-paste so that when the range of the formatted cells expands it overrides the cell formatting otherwise applied to those cells; and when the range of the formatted cells contracts the cells no longer occupied revert to the cell formatting otherwise applied to those cells.

96. The method of clause 95, wherein the formatting specifications are selected by the normal cell formatting UIs.

97. The method of clause 96, wherein the conversion is done by manual selection of the applicable cell or cells.

98. The method of clause 95, further including receiving a user application of cell formatting to a cell or cells within a target range of the flex copy-paste and then automatically converting the cell formatting all the cells instantiated by the flex copy-paste.

99. The method of clause 95, wherein the automatically extension of the formatting can be reverted to flex copy-paste formatting control of the user selected cell or cells by a ribbon action or shortcut.

100. The method of clause 95, wherein the automatically converting can be reverted to the formatted cell or cells by a ribbon action or shortcut.

101. A non-transitory computer readable memory, the memory impressed with computer instructions that, when executed on hardware, cause the hardware to carry out the method of any of clauses 95-100.

102. A system including processing hardware coupled to memory, the memory impressed with computer instructions that, when executed, cause the hardware to carry out the method of any of clauses 95-100.

Function Controlled Formatting Via Formula Argument Formatting

103. As an alternative to formatting cells, when the cells are populated by a built-in spreadsheet function contained in a cell of a spreadsheet, a method of applying formatting via formatting the arguments including:

formatting an argument of a built-in spreadsheet function formula;

replicating that formatting to the cell or cells populated by that argument;

converting control of that formatting from control of the cell or cells to the built-in spreadsheet function so that when the range of the formatted cells populated by that argument expands it overrides the cell formatting otherwise applied to those cells; and when the range of the formatted cells populated by that argument contracts the cells no longer occupied revert to the cell formatting otherwise applied to those cells.

104. The method of clause 103, wherein the formatting is applied by the regular spreadsheet formatting UI or UIs.

105. The method of clause 103 wherein the formatting is applied to the second input to the functional formula.

106. A non-transitory computer readable memory, the memory impressed with computer instructions that, when executed on hardware, cause the hardware to carry out the method of any of clauses 103-105.

107. A system including processing hardware coupled to memory, the memory impressed with computer instructions that, when executed, cause the hardware to carry out the method of any of clauses 103-105.

Two Separate Function Inputs

108. As quick way to alter the output in a spreadsheet cell containing a multi-cell populating functional formula, a method of creating a second cell formula input:

creating a second formula input for a spreadsheet cell containing a built-in spreadsheet function that populates multiple cells;

where the second input is proximate to the formula bar formula or the in-cell formula;

where the second input overrides a value created by another argument in the formula; and where the second input populates the value shown in the cell holding the built in function formula.

109. The method of clause 108, wherein the second input is automatically populated by the function formula once its argument is populated.

110. The method of clause 108, wherein the second input built-in function argument is visible in the selection list panel and not visible in an argument of the built-in spreadsheet function in the spreadsheet cell.

111. A non-transitory computer readable memory, the memory impressed with computer instructions that, when executed on hardware, cause the hardware to carry out the method of any of clauses 108-110.

112. A system including processing hardware coupled to memory, the memory impressed with computer instructions that, when executed, cause the hardware to carry out the method of any of clauses 108-110.

We claim as follows:

1. As an alternative to formatting cells, when the cells are populated by a built-in spreadsheet function contained in a cell of a spreadsheet, a method applying formatting as an argument of the built-in spreadsheet function including:

receiving a first signal from a user invoking a selection list panel, in a context of a user-specified built-in spreadsheet function in a spreadsheet cell that populates a plurality of cells in a spreadsheet range with function results;

responsive to the first signal, causing display of the selection list panel that includes a list of specifications appropriate to the context that are useable with the built-in spreadsheet function, wherein a plurality of first specifications in the list are formatting specifications that configure formatting of output from the built-in spreadsheet to populate a plurality of cells in a spreadsheet range and override cell formatting otherwise applied to the spreadsheet range; and receiving at least one second signal from the user selecting at least one of the formatting specifications, and configuring the formatting of the output from the built-in spreadsheet function accordingly when the spreadsheet function is committed to the spreadsheet cell.

2. The method of claim 1, wherein when a change in cells populated by the built-in spreadsheet function expands the formatted range, that expanded range overrides the cell formatting otherwise applied to the spreadsheet range.

3. The method of claim 1, wherein when a change in cells populated by the built-in spreadsheet function contracts the formatted range, the built-in function formatted cells no longer occupied by the function revert to the cell formatting otherwise applied to those cells or no formatting.

4. The method of claim 1, wherein the user selected formatting specification is non-conditional cell formatting.

5. The method of claim 1, wherein the user selected formatting specification is conditional formatting.

6. The method of claim 1, wherein the selected formatting specification is populated as argument text in an argument list of the built-in spreadsheet function in the spreadsheet cell.

7. The method of claim 1, wherein at least some of the formatting specifications are visible in the selection list panel and not visible as argument text in an argument list of the built-in spreadsheet function in the spreadsheet cell.

8. The method of claim 1, further including the selection list panel displaying corresponding selected configuration descriptions aligned with at least some of the specifications in the list of specifications.

9. The method of claim 1, further including, in the selection list panel, multiple separate lists with multiple value selections, wherein the multiple lists present the multiple value selections for respective ones of the formatting specifications.

10. The method of claim 1, further including in the selection list panel a first list of specification topics, each of which is accompanied by a second list of specifications applicable to the specification topics in the first list.

11. The method of claim 1, further including in the selection list panel a first list of specifications, each of which is accompanied by a second cascading list, that is selectable using a control, that presents specification alternatives applicable to specifications in the first list.

12. The method of claim 1, wherein a user selectable selection list panel button is positioned adjacent to a formula bar of the spreadsheet.

13. The method of claim 1, wherein a user selectable selection list panel button becomes visible when the spreadsheet cell that holds the built-in spreadsheet function is selected or when a cursor is moved to an argument list of the built-in spreadsheet function.

14. The method of claim 1, wherein the formatting of the spreadsheet range targeted for the output of the built-in spreadsheet function, that initially was formatted by normal cell formatting UIs before the display of the selection list panel, is automatically converted to preselected formatting specifications in the selection list panel that the user can choose to override.

15. The method of claim 1, wherein initial preselection of formatting specifications displayed in the selection list panel is based on a manual selection of a cell, range of cells, a segment or segments of the spreadsheet range holding the output of the built-in spreadsheet function.

16. The method of claim 1, further including receiving a user application of cell formatting to a cell or cells within a target range of a built-in function and then automatically converting the cell formatting to configuration of the argument of the built-in spreadsheet function that controls the formatting of the output of at least a segment from the built-in spreadsheet function.

17. The method of claim 16, wherein the automatically converting extends the user-applied cell formatting throughout the target range of at least the segment of the built-in function.

18. The method of claim 17, wherein the automatically converting and extension of user-applied cell formatting throughout at least the segment of the target range can be reverted to the built-in function formatting control effective prior to the automatic converting and extension.

19. The method of claim 16, wherein the automatically converting can be reverted using a ribbon action or shortcut.

20. The method of claim 1, wherein function argument input changes are automatically propagated to related arguments using the changed input.

21. A non-transitory computer readable medium holding program instructions that, when executed on a processor as an alternative to formatting cells, when the cells are populated by a built-in spreadsheet function contained in a cell of a spreadsheet, implement a method applying formatting as an argument of the built-in spreadsheet function including:

receiving a first signal from a user invoking a selection list panel, in a context of a user-specified built-in spreadsheet function in a spreadsheet cell that populates a plurality of cells in a spreadsheet range with function results;

responsive to the first signal, causing display of the selection list panel that includes a list of specifications appropriate to the context that are useable with the built-in spreadsheet function, wherein a plurality of first specifications in the list are formatting specifications that configure formatting of output from the built-in spreadsheet to populate a plurality of cells in a spreadsheet range and override cell formatting otherwise applied to the spreadsheet range; and receiving at least one second signal from the user selecting at least one of the formatting specifications, and configuring the formatting of the output from the built-in spreadsheet function accordingly when the spreadsheet function is committed to the spreadsheet cell.

22. The non-transitory computer readable medium of claim 21, wherein when a change in cells populated by the built-in spreadsheet function expands the formatted range, that expanded range overrides the cell formatting otherwise applied to the spreadsheet range.

23. The non-transitory computer readable medium of claim 21, wherein when a change in cells populated by the built-in spreadsheet function contracts the formatted range, the built-in function formatted cells no longer occupied by the function revert to the cell formatting otherwise applied to those cells or no formatting.

24. The non-transitory computer readable medium of claim 21, wherein the user selected formatting specification is non-conditional cell formatting.

25. The non-transitory computer readable medium of claim 21, wherein the user selected formatting specification is conditional formatting.

26. The non-transitory computer readable medium of claim 21, wherein a user selectable selection list panel button is positioned adjacent to a formula bar of the spreadsheet.

27. The non-transitory computer readable medium of claim 21, wherein a user selectable selection list panel button becomes visible when the spreadsheet cell that holds the built-in spreadsheet function is selected or when a cursor is moved to an argument list of the built-in spreadsheet function.

28. A computer-implemented system including at least one processor and memory coupled to the processor, the memory holding program instructions that as an alternative to formatting cells, when the cells are populated by a built-in spreadsheet function contained in a cell of a spreadsheet, implement a method applying formatting as an argument of the built-in spreadsheet function including:

receiving a first signal from a user invoking a selection list panel, in a context of a user-specified built-in spreadsheet function in a spreadsheet cell that populates a plurality of cells in a spreadsheet range with function results;

responsive to the first signal, causing display of the selection list panel that includes a list of specifications appropriate to the context that are useable with the built-in spreadsheet function, wherein a plurality of first specifications in the list are formatting specifications that configure formatting of output from the built-in spreadsheet to populate a plurality of cells in a spreadsheet range and override cell formatting otherwise applied to the spreadsheet range; and receiving at least one second signal from the user selecting at least one of the formatting specifications, and configuring the formatting of the output from the built-in spreadsheet function accordingly when the spreadsheet function is committed to the spreadsheet cell.

29. The system of claim 28, wherein when a change in cells populated by the built-in spreadsheet function expands the formatted range, that expanded range overrides the cell formatting otherwise applied to the spreadsheet range.

30. The system of claim 28, wherein when a change in cells populated by the built-in spreadsheet function contracts the formatted range, the built-in function formatted cells no longer occupied by the function revert to the cell formatting otherwise applied to those cells or no formatting.

31. The system of claim 28, wherein the user selected formatting specification is non-conditional cell formatting.

32. The system of claim 28, wherein the user selected formatting specification is conditional formatting.

33. The system of claim 28, wherein the selected formatting specification is populated as argument text in an argument list of the built-in spreadsheet function in the spreadsheet cell.

34. The system of claim 28, further including in the selection list panel a first list of specification topics, each of which is accompanied by a second list of specifications applicable to the specification topics in the first list.

35. The system of claim 28, further including in the selection list panel a first list of specifications, each of which is accompanied by a second cascading list, that is selectable using a control, that presents specification alternatives applicable to specifications in the first list.

36. The system of claim 28, wherein the formatting of the spreadsheet range targeted for the output of the built-in spreadsheet function, that initially was formatted by normal cell formatting UIs before the display of the selection list panel, is automatically converted to preselected formatting specifications in the selection list panel that the user can choose to override.

37. The system of claim 36, wherein initial preselection of formatting specifications displayed in the selection list panel is based on a manual selection of a cell, range of cells, a segment or segments of the spreadsheet range holding the output of the built-in spreadsheet function.

38. The system of claim 28, further including receiving a user application of cell formatting to a cell or cells within a target range of a built-in function and then automatically converting the cell formatting of the output of at least a segment from the built-in spreadsheet function.

39. The system of claim 38, wherein the automatically converting extends the user-applied cell formatting throughout the target range of at least the segment of the built-in function.

40. The system of claim 39, wherein the automatically converting and extension of user-applied cell formatting throughout at least the segment of the target range can be reverted to the built-in function formatting control effective prior to the automatic converting and extension.

* * * * *